US006574361B1

(12) United States Patent
Kawakami et al.

(10) Patent No.: US 6,574,361 B1
(45) Date of Patent: Jun. 3, 2003

(54) IMAGE MEASUREMENT METHOD, IMAGE MEASUREMENT APPARATUS AND IMAGE MEASUREMENT PROGRAM STORAGE MEDIUM

(75) Inventors: Susumu Kawakami, Kawasaki (JP); Masahiro Matsuoka, Kawasaki (JP); Hiroaki Okamoto, Kawasaki (JP); Shinya Hosogi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/543,027

(22) Filed: Apr. 4, 2000

(30) Foreign Application Priority Data

Apr. 12, 1999 (JP) ........................................ 11-139021
Jan. 20, 2000 (JP) ...................................... 2000-014170

(51) Int. Cl.[7] ............................................ G06K 9/00
(52) U.S. Cl. ...................................... 382/154; 700/259
(58) Field of Search ................ 382/154; 356/3.13–3.16, 356/27, 28; 700/56, 61, 63, 245, 250, 255, 259

(56) References Cited

U.S. PATENT DOCUMENTS 4,736,436 A * 4/1988 Yasukawa et al. .......... 382/154
5,446,798 A * 8/1995 Morita et al. ............... 382/154
5,917,732 A * 6/1999 Kawakami et al. ......... 708/201
6,246,412 B1 * 6/2001 Shum et al. ................ 345/419

* cited by examiner

*Primary Examiner*—Amelia M. Au
*Assistant Examiner*—Ryan J. Hesseltine
(74) *Attorney, Agent, or Firm*—Staas & Halsey LLP

(57) ABSTRACT

There is disclosed a technology of measuring three-dimensional geometric information on a plane and position information on a point from an image such as the optical flow pattern and a stereo image. It is to determine an azimuth of a measuring plane and/or a superposing time in which the measuring plane is superposed on a predetermined observation point, using a compound ratio $\{p_{inf}p_0p_1p_c\}$, which is determined by four positions $p_{inf}$, $p_0$, $p_1$, $p_c$ of a measuring point, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses, and $p_c$ denotes a position of the measuring point at a superposing time in which a measuring plane including the measuring point is superposed on the observation point in the moving continuous state.

290 Claims, 174 Drawing Sheets

Fig.163

| ADDRESS (i,j) | | CONTENTS $_{ij}\tau$ |
|---|---|---|
| 1 | 1 | $_{11}\tau$ |
| 1 | 2 | $_{12}\tau$ |
| 1 | . . . | . . . |
| 1 | j | $_{1j}\tau$ |
| 1 | . . . | . . . |
| 2 | 1 | $_{21}\tau$ |
| 2 | 2 | $_{22}\tau$ |
| 2 | . . . | . . . |
| 2 | j | $_{2j}\tau$ |
| 2 | . . . | . . . |
| . . . | . . . | . . . |
| . . . | . . . | . . . |
| i | 1 | $_{i1}\tau$ |
| i | 2 | $_{i2}\tau$ |
| i | . . . | . . . |
| i | j | $_{ij}\tau$ |
| i | . . . | . . . |
| . . . | . . . | . . . |
| . . . | . . . | . . . |

| ADDRESS (i,j) | | CONTENTS {$ij\tau$} |
|---|---|---|
| 1 | 1 | $11\tau$ |
| 1 | 2 | $12\tau$ |
| 1 | . . . | . . . |
| 1 | j | $1j\tau$ |
| 1 | . . . | . . . |
| 2 | 1 | $21\tau$ |
| 2 | 2 | $22\tau$ |
| 2 | . . . | . . . |
| 2 | j | $2j\tau$ |
| 2 | . . . | . . . |
| . . . | . . . | . . . |
| . . . | . . . | . . . |
| i | 1 | $i1\tau$ |
| i | 2 | $i2\tau$ |
| i | . . . | . . . |
| i | j | $ij\tau$ |
| i | . . . | . . . |
| . . . | . . . | . . . |
| . . . | . . . | . . . |

Fig.165

| ADDRESS (i,k) | | CONTENTS $\{_{ik}^{j}\}$ |
|---|---|---|
| 1 | 1 | $\{_{11}^{j}\}$ |
| 1 | 2 | $\{_{12}^{j}\}$ |
| 1 | . . . | . . . |
| 1 | k | $\{_{1K}^{j}\}$ |
| 1 | . . . | . . . |
| 2 | 1 | $\{_{21}^{j}\}$ |
| 2 | 2 | $\{_{22}^{j}\}$ |
| 2 | . . . | . . . |
| 2 | k | $\{_{2K}^{j}\}$ |
| 2 | . . . | . . . |
| . . . | . . . | . . . |
| . . . | . . . | . . . |
| i | 1 | $\{_{i1}^{j}\}$ |
| i | 2 | $\{_{i2}^{j}\}$ |
| i | . . . | . . . |
| i | k | $\{_{ik}^{j}\}$ |
| i | . . . | . . . |
| . . . | . . . | . . . |
| . . . | . . . | . . . |

Fig.166 v

| ADDRESS (i,k) | | CONTENTS $\{_{ik}^{j}\}$ |
|---|---|---|
| 1 | 1 | $\{_{11}^{j}\}$ |
| 1 | 2 | $\{_{12}^{j}\}$ |
| 1 | . . . | . . . |
| 1 | k | $\{_{1K}^{j}\}$ |
| 1 | . . . | . . . |
| 2 | 1 | $\{_{21}^{j}\}$ |
| 2 | 2 | $\{_{22}^{j}\}$ |
| 2 | . . . | . . . |
| 2 | k | $\{_{2K}^{j}\}$ |
| 2 | . . . | . . . |
| . . . | . . . | . . . |
| . . . | . . . | . . . |
| i | 1 | $\{_{i1}^{j}\}$ |
| i | 2 | $\{_{i2}^{j}\}$ |
| i | . . . | . . . |
| i | k | $\{_{ik}^{j}\}$ |
| i | . . . | . . . |
| . . . | . . . | . . . |
| . . . | . . . | . . . |

Fig.171

| ADDRESS (i,j) | | CONTENTS $_{ij}\sigma$ |
|---|---|---|
| 1 | 1 | $_{11}\sigma$ |
| 1 | 2 | $_{12}\sigma$ |
| 1 | . . . | . . . |
| 1 | j | $_{1j}\sigma$ |
| 1 | . . . | . . . |
| 2 | 1 | $_{21}\sigma$ |
| 2 | 2 | $_{22}\sigma$ |
| 2 | . . . | . . . |
| 2 | j | $_{2j}\sigma$ |
| 2 | . . . | . . . |
| . . . | . . . | . . . |
| . . . | . . . | . . . |
| i | 1 | $_{i1}\sigma$ |
| i | 2 | $_{i2}\sigma$ |
| i | . . . | . . . |
| i | j | $_{ij}\sigma$ |
| i | . . . | . . . |
| . . . | . . . | . . . |
| . . . | . . . | . . . |

Fig. 172 axis

| ADDRESS (i,j) | | CONTENTS $_{ij}\sigma$ |
|---|---|---|
| 1 | 1 | $_{11}\sigma$ |
| 1 | 2 | $_{12}\sigma$ |
| 1 | . . . | . . . |
| 1 | j | $_{1j}\sigma$ |
| 1 | . . . | . . . |
| 2 | 1 | $_{21}\sigma$ |
| 2 | 2 | $_{22}\sigma$ |
| 2 | . . . | . . . |
| 2 | j | $_{2j}\sigma$ |
| 2 | . . . | . . . |
| . . . | . . . | . . . |
| . . . | . . . | . . . |
| i | 1 | $_{i1}\sigma$ |
| i | 2 | $_{i2}\sigma$ |
| i | . . . | . . . |
| i | j | $_{ij}\sigma$ |
| i | . . . | . . . |
| . . . | . . . | . . . |
| . . . | . . . | . . . |

Fig.173

| ADDRESS (i,k) | | CONTENTS $\{ik^j\}$ |
|---|---|---|
| 1 | 1 | $\{11^j\}$ |
| 1 | 2 | $\{12^j\}$ |
| 1 | . . . | . . . |
| 1 | k | $\{1K^j\}$ |
| 1 | . . . | . . . |
| 2 | 1 | $\{21^j\}$ |
| 2 | 2 | $\{22^j\}$ |
| 2 | . . . | . . . |
| 2 | k | $\{2K^j\}$ |
| 2 | . . . | . . . |
| . . . | . . . | . . . |
| . . . | . . . | . . . |
| i | 1 | $\{i1^j\}$ |
| i | 2 | $\{i2^j\}$ |
| i | . . . | . . . |
| i | k | $\{ik^j\}$ |
| i | . . . | . . . |
| . . . | . . . | . . . |
| . . . | . . . | . . . |

Fig.174 axis

| ADDRESS (i,k) | | CONTENTS $\{ik^j\}$ |
|---|---|---|
| 1 | 1 | $\{11^j\}$ |
| 1 | 2 | $\{12^j\}$ |
| 1 | . . . | . . . |
| 1 | k | $\{1K^j\}$ |
| 1 | . . . | . . . |
| 2 | 1 | $\{21^j\}$ |
| 2 | 2 | $\{22^j\}$ |
| 2 | . . . | . . . |
| 2 | k | $\{2K^j\}$ |
| 2 | . . . | . . . |
| . . . | . . . | . . . |
| . . . | . . . | . . . |
| i | 1 | $\{i1^j\}$ |
| i | 2 | $\{i2^j\}$ |
| i | . . . | . . . |
| i | k | $\{ik^j\}$ |
| i | . . . | . . . |
| . . . | . . . | . . . |
| . . . | . . . | . . . |

IMAGE MEASUREMENT METHOD, IMAGE MEASUREMENT APPARATUS AND IMAGE MEASUREMENT PROGRAM STORAGE MEDIUM

BACKGROUND OF THE INVENTION

1. Field of the Invention

The present invention relates to an image measurement method of measuring positions and azimuths of a point and a surface, which appear on an image, in space, an image measurement apparatus for implementing the measurement method, and an image measurement program storage medium storing an image measurement program for implementing the image measurement.

2. Description of the Related Art

In order to move a mobile robot, a motorcar, an airplane, etc. to meet surroundings, there is a need to measure surroundings on a three-dimensional basis from a dynamic picture image on a camera and the like. Now, let us consider as to how a person performs a three-dimensional measurement through a visual sensation (exactly to say, a movement vision) in the event that a person lands an airplane and a person walks.

FIG. 1 shows an optical flow pattern which is reflected in the retinas of a pilot. The pilot exactly lands an airplane in accordance with this pattern through perceiving a slope (three-dimensional azimuth) of a runway and information as to such a matter that "continuous traveling of the airplane brings about an arrival at the runway after what second". That is, the pilot measures a three-dimensional azimuth of a plane (the runway) and a "time up to crossing the plane" to land the airplane.

Next, let us consider a case where we walk a passage. When a person walks in a direction that the person runs against a wall of the passage, the optical flow pattern as mentioned above is reflected in the retinas of the person. A time up to going across the wall, that is, a time up to running against the wall, is measured from the pattern, and the person moves in a direction to avoid the wall in accordance with a three-dimensional azimuth, which is simultaneously measured with the time up to running against the wall. On the other hand, in the event that the person walks in parallel to the wall, it is measured that the person does not run against to the wall always, in other words, the person runs against the wall after the infinite time elapses, and thus the person continues to walk in that direction. In this manner, the person can exactly avoid the wall and walk even if it is a curved passage. Also in the event that a person walks in an office, in a similar fashion, the person can avoid an "object constituted of a plane", such as a white board, a desk, a locker. Further, in the event that a person drives a motor car, the person performs driving on a high way, putting a car into the garage, and the like through performing the similar "three-dimensional measurement on a plane".

In this manner, our visual sensation makes it possible to perform an exact movement through a measurement of three-dimensional geometric information (a three-dimensional azimuth on a plane, and a time up to crossing the plane) of an object constituting of a plane (there are a lot of such objects). Also with respect to a curved object, it is possible to spatially recognize the curved object through a measurement of three-dimensional geometric information of a "group of planes contacting to the curved object".

If such "three-dimensional geometric information on a plane" can be measured from an image, it is possible to move a mobile robot, a motorcar, an airplane, etc. so as to meet surroundings or so as to avoid the obstacles.

With respect to the respective velocity elements of the optical flow pattern shown in FIG. 1, that is, a motion (a local motion) on a local area, there is reported a technology of measuring those elements from a dynamic picture image (Japanese Patent Laid Open Gazettes Hei. 05-165956, Hei. 06-165957, Hei. 06-044364, and Hei. 09-081369; "A method of performing a two-dimensional correlation and a convolution along the ρ coordinates on the Hough plane on a one-dimensional basis" by Kawakami, S. and Okamoto, H., SINNGAKUGIHOU, vol. IE96-19, pp. 31–38, 1996; and "A cell model for the detection of local image motion on the magnocellular pathway of the visual cortex," Kawakami, S. and Okamoto., H., Vision Research, vol. 36, pp. 117–147, 1996).

However, there is no report as to a method of measuring "three-dimensional geometric information on a plane (a three-dimensional azimuth on a plane, a time up to crossing the plane, and a shortest distance to the plane)" through unifying the optical flow pattern.

Further, there is reported a technology of measuring three-dimensional geometric information (a three-dimensional azimuth on those elements, the shortest distance on those elements, etc.) as to a straight line and a column in a space from a dynamic picture image (Japanese Patent Publications Hei. 03-52106, Hei. 06-14356, Hei. 06-14335, and Hei. 06-10603, and Japanese Patent Laid Open Gazette Hei. 02-816037; "A measurement of three-dimensional azimuth and distance of a line segment by a spherical mapping" by Inamoto, Y., et al., a society for the study of COMPUTER VISION, vol. 45-2, pp. 1–8, 1986; "Implementation of monocular stereoscopic vision with bird-mimicry" by Science Asahi, June, pp. 28–33, 1987; "Measurement in three dimensions by motion stereo and spherical mapping" by Morita, T., et al., CVPR, pp. 422–428, 1989; "Motion stereo vision system" by Inamoto, Y., Proceeding of '91 ISART, pp. 239–246, 1991; and Section 4.2.2.1, "Report of Sho. 60 Utility Nuclear Electric Power Generation Institution Robot Development Contract Research (Advanced Robot Technology Research Association)").

However, there is no report as to a method of measuring three-dimensional geometric information on a plane.

SUMMARY OF THE INVENTION

In view of the foregoing, it is an object of the present invention to provide a technology of measuring three-dimensional geometric information on a plane and position information on a point from an image such as the optical flow pattern. Incidentally, as will be described later, a measuring of the three-dimensional geometric information includes a measurement of the shortest distance to a plane.

It is another object of the present invention to provide a technology of measuring three-dimensional geometric information on a plane from a stereo image.

To achieve the above-mentioned objects, the present invention provides, of image measurement methods, a first image measurement method of determining an azimuth of a measuring plane and/or a physical quantity indexing a superposing time in which the measuring plane is superposed on a predetermined observation point, using a compound ratio $\{p_{inf}p_0p_1p_c\}$, which is determined by four positions $p_{inf}$, $p_0$, $p_1$, $p_c$ of a measuring point, or an operation equivalent to said compound ratio, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, and $p_c$ denotes a position of the measuring point at a superposing time in which a measuring plane including the measuring point is superposed on the observation point in the moving continuous state.

In the first image measurement method as mentioned above, said compound ratio $\{p_{inf}p_0p_1p_c\}$ or the operation equivalent to said compound ratio include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the first image measurement method as mentioned above, it is acceptable that as said physical quantity indexing the superposing time, a normalized time ${}_nt_c$, which is expressed by the following equation, is adopted, $${}_nt_c=t_c/\Delta t$$

where $t_c$ denotes a time between the one measuring time of said two measuring times and said superposing time, and $\Delta t$ denotes a time between said two measuring times, and said normalized time ${}_nt_c$ is determined in accordance with the following equation $${}_nt_c=\{p_{inf}p_0p_1p_c\}$$

or an equation equivalent to the above equation.

In the first image measurement method as mentioned above, it is acceptable that an azimuth of a measuring plane including a plurality of measuring points associated with a plurality of polar lines intersecting at a cross point and/or a physical quantity indexing a superposing time in which the measuring plane is superposed on the observation point are determined in such a manner that a process of determining a polar line associated with the position $p_c$ of the measuring point at the superposing time through a polar transformation for the position $p_c$ is executed as to a plurality of measuring points existing in the measurement space, and cross points of polar lines, which are formed when a plurality of polar lines determined through an execution of said process are drawn on a polar line drawing space, are determined.

In the first image measurement method as mentioned above, it is acceptable that the measuring point appearing on the image has information as to intensity, and an azimuth-of a measuring plane including a plurality of measuring points associated with a plurality of polar lines joining a voting for a maximal point and/or a physical quantity indexing a superposing time in which the measuring plane is superposed on the observation point are determined in such a manner that a process of determining a polar line associated with the measuring point through a polar transformation for the position $p_c$ at the superposing time on the measuring point, and of voting a value associated with intensity of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value.

In the first image measurement method as mentioned above, it is acceptable that the measuring point appearing on the image has information as to intensity, and an azimuth of a measuring plane including a plurality of measuring points associated with a plurality of polar lines joining a voting for a maximal point and/or a physical quantity indexing a superposing time in which the measuring plane is superposed on the observation point are determined in such a manner that a process of determining a polar line associated with the measuring point through a polar transformation for the position $p_c$ at the superposing time on the measuring point, and determining a response intensity associated with a motion parallax $\tau$ between the two measuring positions $p_0$ and $p_1$ of the measuring point at the two measuring times, and of voting the response intensity associated with the motion parallax $\tau$ of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value is determined.

In the first image measurement method as mentioned above, it is acceptable that the position $p_c$ of the measuring point at the superposing time is determined using said compound ratio $\{p_{inf}p_0p_1p_c\}$ or the operation equivalent to said compound ratio, upon determination of a physical quantity indexing the superposing time, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state.

In the first image measurement method as mentioned above, it is acceptable that the image measurement method comprises:

- a first step of setting up the physical quantity indexing the superposing time in form of a parameter;
- a second step of determining the position $p_c$ of the measuring point at the superposing time, using said compound ratio $\{p_{inf}p_0p_1p_c\}$ or the operation equivalent to said compound ratio, in accordance with the physical quantity indexing the superposing time set up in the first step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state; and
- a third step of determining a polar line associated with the measuring point through a polar transformation of the position $p_c$ of the measuring point at the superposing time, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing a superposing time in which the measuring plane is superposed on the observation point in such a manner that cross points of polar lines, which are formed when a plurality of polar lines determined through a repetition of said first to third steps by a plurality of number of times are drawn on a polar line drawing space, are determined.

In this case, it is preferable that the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement method further comprises a fifth step of setting up a motion parallax $\tau$, which is a positional difference between the two measuring positions $p_0$ and $p_1$ at the two measuring times on the measuring point, in form of a second parameter, said second step is a step of determining the position $p_c$ of the measuring point at the superposing time using the physical quantity indexing the superposing time, which is set up in said first step, the measuring position $p_0$ at one measuring time of said two measuring times on said measuring point, the motion parallax $\tau$, which is set up in said fifth step, and the position $p_{inf}$ of the measuring point after an infinite time elapses in the moving continuous state, said third step is a step of determining a polar line associated with the measuring point, and determining a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of said first, fifth, second and third steps by a plurality of number of times offers a maximal value is determined, instead of determination of said cross point.

It is also preferable said third step is a step of determining a polar line drawn on a sphere in form of a large circle through a polar transformation of the position $p_c$.

It is also preferable said third step is a step of determining a polar line drawn in form of a large circle on a sphere through a polar transformation of the position $p_c$, and projected into an inside of a circle on a plane.

It is also preferable said third step is a step of determining a polar line drawn on a plane in form of a straight line through a polar transformation of the position $p_c$.

In the first image measurement method as mentioned above, it is acceptable that the image measurement method comprises:

a first step of setting up the position $p_{inf}$ of the measuring point after an infinite time elapses in the moving continuous state through setting up the moving direction v in form of a first parameter;

a second step of setting up the physical quantity indexing the superposing time in form of a second parameter;

a third step of determining the position $p_c$ of the measuring point at the superposing time, using said compound ratio $\{p_{inf}p_0p_1p_c\}$ or the operation equivalent to said compound ratio, in accordance with the position $p_{inf}$ set up in said first step, the physical quantity indexing the superposing time set up in the second step, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point,; and a fourth step of determining a polar line associated with the measuring point through a polar transformation of the position $p_c$ of the measuring point at the superposing time, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true moving direction, and of determining an azimuth of a measuring plane including a plurality of measuring points associated with a plurality of polar lines intersecting at a cross point determined on a polar line drawing space associated with the true moving direction, and/or a physical quantity indexing a superposing time in which the measuring plane is superposed on the observation point in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true moving direction relative to said observation point on said measuring point is selected in accordance with information as to a number of polar lines intersecting at the cross points.

In this case, it is preferable that the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of said first to fourth steps offers a maximal value, instead of determining of the cross point, is determined on each polar line drawing space, and a polar line drawing space associated with the true moving direction is selected in accordance with information as to a maximal value at the maximal point.

It is also preferable that the measuring point appearing on the image has information as to intensity, said image measurement method further comprises a sixth step of setting up a motion parallax $\tau$, which is a positional difference between the two measuring positions $p_0$ and $p_1$ at the two measuring times on the measuring point, in form of a third parameter, said third step is a step of determining the position $p_c$ of the measuring point at the superposing time using the position $p_{inf}$, which is set up in said first step, the physical quantity indexing the superposing time, which is set up in said second step, the measuring position $p_0$ at one measuring time of said two measuring times on said measuring point, and the motion parallax $\tau$, which is set up in said sixth step, said fourth step is a step of determining a polar line associated with the measuring point, and determining a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true moving direction is selected in accordance with information as to a maximal value at the maximal point.

To achieve the above-mentioned objects, the present invention provides, of image measurement methods, a second image measurement method of determining an azimuth $n_s$ of a measuring plane and/or a physical quantity indexing a shortest distance from a predetermined observation point to the measuring plane at one measuring time of two measuring times, using a compound ratio $\{p_{inf}p_0p_1p_c\}$, which is determined by four positions $p_{inf}$, $p_0$, $p_1$, $p_c$ of a measuring point, or an operation equivalent to said compound ratio, and an inner product $(n_s \cdot v)$ of the azimuth $n_s$ of the measuring plane and a moving direction v, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, $p_c$ denotes a position of the measuring point at a superposing time in which a measuring plane including the measuring point is superposed on the observation point in the moving continuous state, and $n_s$ denotes the azimuth of the measuring plane.

In the second image measurement method as mentioned above, said compound ratio $\{p_{inf}p_0p_1p_c\}$ or the operation equivalent to said compound ratio include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the second image measurement method as mentioned above, it is acceptable that as said physical quantity indexing the shortest distance, a normalization shortest distance $_n d_s$, which is expressed by the following equation, is adopted, $$_n d_s = d_s / \Delta x$$

and said normalization shortest distance $_n d_s$ is determined in accordance with the following equation, $$_n d_s = {_n t_c} (n_s \cdot v)$$

using a normalized time $_n t_c$, which is expressed by the following equation, and the inner product $(n_s \cdot v)$ $$_n t_c = t_c / \Delta t$$

where $d_s$ denotes a shortest distance between the observation point and the measuring plane at one measuring time of said two measuring times, $t_c$ denotes a time between the one measuring time of said two measuring times and said superposing time, $\Delta x$ denotes a moving distance of the measuring point, which is relative to the observation point, between said two measuring times, and $\Delta t$ denotes a time between said two measuring times.

In the second image measurement method as mentioned above, it is acceptable that the image measurement method comprises:

a first step of setting up the physical quantity indexing the shortest distance in form of a first parameter;

a second step of setting up the inner product $(n_s \cdot v)$ in form of a second parameter;

a third step of determining the position $p_c$ of the measuring point at the superposing time, using said compound ratio $\{p_{inf}p_0p_1p_c\}$ or the operation equivalent to said compound ratio, in accordance with the physical quantity indexing the shortest distance set up in the first step, the inner product $(n_s \cdot v)$ set up in the second step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state;

a fourth step of determining a polar line associated with the position $p_c$ of the measuring point at the superposing time through a polar transformation of the position $p_c$, and a fifth step of determining a point on the polar line, said point being given with an angle r with respect to the moving direction v, $$r = \cos^{-1}(n_s \cdot v)$$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance from said observation point to the measuring plane at one measuring time of the two measuring times in such a manner that cross points of curved lines, which are formed when a plurality of curved lines determined through a repetition of said first to fifth steps by a plurality of number of times are drawn on a curved line drawing space, are determined.

In this case, it is preferable that the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of said first to fifth steps by a plurality of number of times offers a maximal value, instead of determining of the cross point, is determined.

It is also preferable that the measuring point appearing on the image has information as to intensity, said image measurement method further comprises a seventh step of setting up a motion parallax $\tau$, which is a positional difference between the two measuring positions $p_0$ and $p_1$ at the two measuring times on the measuring point, in form of a third parameter, said third step is a step of determining the position $p_c$ of the measuring point at the superposing time using the physical quantity indexing the shortest distance set up in the first step, the inner product $(n_s \cdot v)$ set up in the second step, the measuring position $p_0$ at one measuring time of said two measuring times on said measuring point, the motion parallax $\tau$, which is set up in said seventh step, and the position $p_{inf}$ of the measuring point after an infinite time elapses in the moving continuous state, said fifth step is a step of determining said point on a polar line associated with the measuring point, and determining a response intensity associated with the motion parallax $\tau$ on the measuring point, and of voting the response intensity associated with the motion parallax $\tau$ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of said first, second, seventh and third to fifth steps by a plurality of number of times offers a maximal value is determined, instead of determination of said cross point.

It is also preferable that said fifth step is a step of determining a curved line drawn on a sphere in form of a curved line coupling a plurality of lines involved in one measuring point, which is determined through repetition of said fifth step.

It is also preferable that said fifth step is a step of determining a curved line drawn on a sphere in form of a curved line coupling a plurality of lines involved in one measuring point, which is determined through repetition of said fifth step, said curved line being projected into an inside of a circle on a plane.

In the second image measurement method as mentioned above, it is acceptable that the image measurement method comprises:

a first step of setting up the position $p_{inf}$ of the measuring point after an infinite time elapses in the moving continuous state through setting up the moving direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the measuring point at the superposing time, using said compound ratio $\{p_{inf} p_0 p_1 p_c\}$ or the operation equivalent to said compound ratio, in accordance with the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, and the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point;

a fifth step of determining a polar line associated with the position $p_c$ of the measuring point at the superposing time through a polar transformation of the position $p_c$; and a sixth step of determining a point on the polar line, said point being given with an angle r with respect to the moving direction v, $$r = \cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true moving direction, and of determining an azimuth $n_s$ of a measuring plane including a plurality of measuring points associated with a plurality of curved lines intersecting at a cross point determined on a curved line drawing space associated with the true moving direction, and/or a physical quantity indexing a shortest distance from the observation point to the measuring plane at one measuring time of the two measuring times in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true moving direction relative to said observation point on said measuring point is selected in accordance with information as to a number of curved lines intersecting at the cross points.

In this case, it is preferable that the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of said first to sixth steps offers a maximal value, instead of determining of the cross point, is determined on each curved line drawing space, and a curved line drawing space associated with the true moving direction is selected in accordance with information as to a maximal value at the maximal point.

It is also preferable that the measuring point appearing on the image has information as to intensity, said image measurement method further comprises an eighth step of setting up a motion parallax τ, which is a positional difference between the two measuring positions $p_0$ and $p_1$ at the two measuring times on the measuring point, in form of a fourth parameter, said fourth step is a step of determining the position $p_c$ of the measuring point at the superposing time using the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, the measuring position $p_0$ at one measuring time of said two measuring times on said measuring point, and a motion parallax τ, which is set up in said eighth step, said sixth step is a step of determining said point associated with the measuring point, and determining a response intensity associated with the motion parallax τ on the measuring point, and of voting the response intensity associated with the motion parallax τ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true moving direction is selected in accordance with information as to a maximal value at the maximal point.

To achieve the above-mentioned objects, the present invention provides, of image measurement methods, a third image measurement method of determining an azimuth of a measuring plane and/or a physical quantity indexing a shortest distance from a predetermined observation point to the measuring plane at one measuring time of two measuring times, using a simple ratio($p_{inf}p_0p_1$), which is determined by three positions $p_{inf}$, $p_0$, $p_1$ of a measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

In the third image measurement method, said simple ratio ($p_{inf}p_0p_1$) or the operation equivalent to said simple ratio include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the third image measurement method, it is acceptable that as the positions $p_{inf}$, $p_0$, $p_1$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x$$

where $d_s$ denotes a shortest distance between the observation point and the measuring plane at one measuring time of said two measuring times, and $\Delta x$ denotes a moving distance of the measuring point, which is relative to the observation point, between said two measuring times, wherein said image measurement method comprises:

a first step of setting up the normalization shortest distance $_nd_s$ in form of a parameter;

a second step of determining a radius R defined by the following equation or the equivalent equation;

$$R=\cos^{-1}(_nd_s/(p_{inf}p_0p_1))$$

using the normalization shortest distance $_nd_s$ set up in the first step and the simple ratio ($p_{inf}p_0p_1$) or the operation equivalent to said simple ratio; and a third step of determining a small circle of a radius R taking as a center a measuring position of the measuring point at one measuring time of said two measuring times, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance $_nd_{s0}$ on the measuring plane in such a manner that cross points of small circles, which are formed when a plurality of small circles determined through a repetition of said first to third steps by a plurality of number of times are drawn on a small circle drawing space, are determined.

In this case, it is preferable that wherein the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement method further comprises a fifth step of setting up a motion parallax $\tau$, which is a positional difference between the two measuring positions $p_0$ and $p_1$ at the two measuring times on the measuring point, in form of a second parameter, said second step is a step of determining the radius R using the normalization shortest distance $_nd_s$ set up in the first step, the position $p_{inf}$ of the measuring point after an infinite time elapses in the moving continuous state, the measuring position $p_0$ at one measuring time of said two measuring times on said measuring point, and the motion parallax $\tau$, which is set up in said fifth step, said third step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{s0}$ of a measuring plane including a plurality of measuring points associated with a plurality of small circles joining a voting for a maximal point and/or a normalization shortest distance $_n d_{s0}$ on the measuring plane in such a manner that a maximal point wherein a value by a voting through a repetition of said first, fifth, second and third steps by a plurality of number of times offers a maximal value is determined, instead of determination of said cross point.

It is also preferable that said third step is a step of determining a small circle of a radius R on the sphere, and also determining a small circle in which said small circle of a radius R on the sphere is projected into an inside of a circle on a plane.

In the third image measurement method as mentioned above, it is acceptable that as the positions $p_{inf}$, $p_0$, $p_1$ of the measuring point, positions projected on a sphere are adopted, and as said physical quantity indexing the shortest distance, a normalization shortest distance $_n d_s$, which is expressed by the following equation, is adopted, $$_n d_s = d_s/\Delta x$$

where $d_s$ denotes a shortest distance between the observation point and the measuring plane at one measuring time of said two measuring times, and $\Delta x$ denotes a moving distance of the measuring point, which is relative to the observation point, between said two measuring times, wherein said image measurement method comprises:

a first step of setting up the position $p_{inf}$ of the measuring point after an infinite time elapses in the moving continuous state through setting up the moving direction v in form of a first parameter;

a second step of setting up the normalization shortest distance $_n d_s$ in form of a second parameter;

a third step of determining a radius R defined by the following equation or the equivalent equation;

$$R = \cos^{-1}(_n d_s/(p_{inf} p_0 p_1))$$

using the position $p_{inf}$ of the measuring point after an infinite time elapses in the moving continuous state, which is set up in the first step, the normalization shortest distance $_n d_s$ set up in the second step and the simple ratio $(p_{inf} p_0 p_1)$ or the operation equivalent to said simple ratio; and a fourth step of determining a small circle of a radius R taking as a center a measuring position of the measuring point at one measuring time of said two measuring times, wherein said third step and said fourth step are repeated by a plurality of number of times on a plurality of measuring points in said measurement space, while values of the first and second parameters are altered in said first step and said second step, and thereafter, effected is a fifth step of determining a true moving direction, and of determining an azimuth $n_{s0}$ of a measuring plane including a plurality of measuring points associated with a plurality of small circles intersecting at a cross point determined on a small circle drawing space associated with the true moving direction, and/or a a normalization shortest distance $_n d_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true moving direction relative to said observation point on said measuring point is selected in accordance with information as to a number of small circles intersecting at the cross points.

In this case, it is preferable that the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance $_n d_{s0}$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true moving direction is selected in accordance with information as to the maximal value on the maximal point.

It is also preferable that the measuring point appearing on the image has information as to intensity, said image measurement method further comprises a sixth step of setting up a motion parallax $\tau$, which is a positional difference between the two measuring positions $p_0$ and $p_1$ at the two measuring times on the measuring point, in form of a third parameter, said second step is a step of determining the radius R using the position $p_{inf}$ of the measuring point after an infinite time elapses in the moving continuous state, which is set up in said first step, the normalization shortest distance $_n d_s$ set up in the second step, the measuring position $p_0$ at one measuring time of said two measuring times on said measuring point, and the motion parallax $\tau$, which is set up in said fifth step, said fourth step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance $_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true moving direction is selected in accordance with information as to the maximal value on the maximal point.

To achieve the above-mentioned objects, the present invention provides, of image measurement methods, a fourth image measurement method of determining a physical quantity indexing a distance between a predetermined observation point and a measuring point at one measuring time of two measuring times, using a simple ratio ($p_{inf}p_0p_1$), which is determined by three positions $p_{inf}$, $p_0$, $p_1$ of the measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

In the fourth image measurement method, said simple ratio ($p_{inf}p_0p_1$) or the operation equivalent to said simple ratio include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$ at the two measuring times on the measuring point.

In the fourth image measurement method as mentioned above, it is acceptable that as said physical quantity indexing the distance, a normalized distance $_nd_0$, which is expressed by the following equation, is adopted, $$_nd_0=d_0/\Delta x$$

where $d_0$ denotes a distance between the observation point and the measuring point at one measuring time of the two measuring times, and Δx denotes a moving distance of the measuring point between said two measuring times with respect to the observation point, and said normalized distance $_nd_0$ is determined in accordance with the following equation $$_nd_0=(p_{inf}p_0p_1)$$

or an equation equivalent to the above equation.

To achieve the above-mentioned objects, the present invention provides, of image measurement methods, a fifth image measurement method comprising:

a first step of setting up coordinates in a voting space in form of a parameter, said coordinates being defined by a physical quantity indexing a superposing time in which a measuring plane, including an arbitrary measuring point appearing on an image obtained through viewing a predetermined measurement space from a predetermined observation point inside the measurement space, is superposed on the observation point, and an azimuth $n_s$ of the measuring plane, in a moving continuous state wherein it is expected that a movement of the measuring point appearing on an image obtained through viewing the measurement space from the observation point inside the measurement space, said measuring point being relative with respect to the observation point, is continued in a direction identical to a moving direction relative with respect to the observation point between mutually different two measuring times on the measuring point and at a velocity identical to a moving velocity between said two measuring times;

a second step of determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ of the measuring point after an infinite time elapses in the moving continuous state, and the coordinates in the voting space, which is set up in the first step;

a third step of determining a response intensity associated with the motion parallax τ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a sixth image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a superposing time in which a measuring plane including the measuring point is superposed on the observation point, and an azimuth $n_s$ of the measuring plane;

a third step of determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax $\tau$ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a seventh image measurement method comprising:

a first step of setting up coordinates in a voting space in form of a parameter, said coordinates being defined by a physical quantity indexing a shortest distance between a predetermined observation point inside a predetermined measurement space for observation of the measurement space and a measuring plane, including an arbitrary measuring point appearing on an image obtained through viewing the measurement space from the observation point inside the measurement space, at one measuring time of mutually different two measuring times, and an azimuth $n_s$ of the measuring plane;

a second step of determining a motion parallax $\tau$, which is a positional difference between two measuring positions $p_0$ and $p_1$ at the two measuring times on the measuring point, in accordance with a measuring position $p_0$ at one measuring time of the two measuring times on the measuring point, a position $p_{inf}$ of the measuring point after an infinite time elapses in a moving continuous state wherein it is expected that a movement of the measuring point is continued in a direction identical to a moving direction relative with respect to the observation point between mutually different two measuring times and at a velocity identical to a moving velocity between said two measuring times, and the coordinates in the voting space, which is set up in the first step;

a third step of determining a response intensity associated with the motion parallax $\tau$ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the, first to fourth steps, are effected by a plurality of number of times on a plurality of measuring points in the measurement space, while a value of the parameter is altered in the first step.

To achieve the above-mentioned objects, the present invention provides, of image measurement methods, an eighth image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a shortest distance from the observation point to a measuring plane including the measuring point at one measuring time of the two measuring times, and an azimuth $n_s$ of the measuring plane;

a third step of determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax $\tau$ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a ninth image measurement method comprising:

a first step of setting up in form of a parameter a motion parallax $\tau$, which is a positional difference between two measuring positions $p_0$ and $p_1$ at mutually different two measuring times, of an arbitrary measuring point appearing on an image obtained through viewing a predetermined measurement space from a predetermined observation point inside the measurement space;

a second step of determining coordinates in a voting space, said coordinates being defined by a physical quantity indexing a superposing time in which a measuring plane, including the measuring point, is superposed on the observation point, and an azimuth $n_s$ of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, in accordance with a measuring position $p_0$ at one measuring time of said two measuring times on said measuring point, a position $p_{inf}$ of the measuring point after an infinite time elapses in the moving continuous state, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a tenth image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a superposing time in which a measuring plane, including the measuring point, is superposed on the observation point, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a eleventh image measurement method comprising:

a first step of setting up in form of a parameter a motion parallax $\tau$, which is a positional difference between two measuring positions $p_0$ and $p_1$ at mutually different two measuring times on the measuring point, of an arbitrary measuring point appearing on an image obtained through viewing a predetermined measurement space from a predetermined observation point inside the measurement space;

a second step of determining coordinates in a voting space, said coordinates being defined by a physical quantity indexing a shortest distance from the observation point to a measuring plane including the measuring point at one measuring time of the two measuring times, and an azimuth $n_s$ of the measuring plane, in accordance with a measuring position $p_0$ at one measuring time of said two measuring times on said measuring point, a position $p_{inf}$ of the measuring point after an infinite time elapses in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a twelfth image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a shortest distance from the observation point to a measuring plane including the measuring point at one measuring time of the two measuring times, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax τ set up in the second step;

a fourth step of determining a response intensity associated with the motion parallax τ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a thirteenth image measurement method comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the first step and the second step are effected by a plurality of number of times on a plurality of measuring points in the measurement space.

In the thirteenth image measurement method, it is acceptable that said image measurement method further comprises a third step of determining an azimuth of a measuring plane including a plurality of measuring points joining a voting for a maximal point and/or a physical quantity indexing a superposing time in which the measuring plane is superposed on the observation point in such a manner that a maximal point wherein a value by said voting in the voting space offers a maximal value is determined.

To achieve the above-mentioned objects, the present invention provides, of image measurement methods, a fourteenth image measurement method comrising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the second step and the third step, of the first to third steps, are effected by a plurality of number of times on a plurality of measuring points in the measurement space, while a value of the parameter is altered in the first step.

In the fourteenth image measurement method, it is acceptable that said image measurement method further comprises a fourth step of determining a true moving direction relative to the observation point on the measuring point, and of determining an azimuth of a measuring plane including a plurality of measuring points joining a voting for a maximal point determined on a voting space associated with the true moving direction, and/or a physical quantity indexing a superposing time in which the measuring plane is superposed on the observation point, in such a manner that a maximal point wherein a value by a voting is determined on each voting space, and the voting space associated with the true moving direction is selected in accordance with information as to the maximal value on the maximal point.

To achieve the above-mentioned objects, the present invention provides, of image measurement methods, a fifteenth image measurement method comrising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a shortest distance from the observation point to a measuring plane, including the measuring point, at one measuring time of the two measuring times, and an azimuth of the measuring plane;

wherein the first step and the second step are effected by a plurality of number of times on a plurality of measuring points in the measurement space.

In the fifteenth image measurement method, it is acceptable that said image measurement method further comprises a third step of determining an azimuth of a measuring plane including a plurality of measuring points joining a voting for a maximal point and/or a physical quantity indexing a shortest distance from the observation point to the measuring plane at one measuring time of the two measuring times in such a manner that a maximal point wherein a value by said voting offers a maximal value is determined in the voting space.

To achieve the above-mentioned objects, the present invention provides, of image measurement methods, a sixteenth image measurement method comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a shortest distance from the observation point to the measuring plane at one measuring time of the two measuring times, including the measuring point, and an azimuth of the measuring plane;

wherein the second step and the third step, of the first to third steps, are effected by a plurality of number of times on a plurality of measuring points in the measurement space, while a value of the parameter is altered in the first step.

In the sixteenth image measurement method, it is acceptable that said image measurement method further comprises a fourth step of determining a true moving direction, and of determining an azimuth of a measuring plane including a plurality of measuring points joining a voting for a maximal point determined on a voting space associated with the true moving direction, and/or a shortest distance from the observation point to the measuring plane at one measuring time of the two measuring times, in such a manner that a maximal point wherein a value by said voting offers a maximal value is determined on each voting space, and a voting space associated with the true moving direction relative to the observation point on the measuring point is selected in accordance with information as to the maximal value on the maximal point.

To achieve the above-mentioned objects, the present invention provides, of image measurement methods, a seventeenth image measurement method of determining an azimuth of a measuring plane and/or a physical quantity indexing a distance between the measuring plane and one observation point of predetermined two observation points in an optical axis direction v coupling said two observation points, using a compound ratio $\{p_{axis}p_R p_L p_c\}$, which is determined by four positions $p_{axis}$, $p_R$, $p_L$, $p_c$, or an operation equivalent to said compound ratio, where $p_R$ and $p_L$ denote measuring positions through observation of said two observation points on an arbitrary measuring point appearing on an image obtained through viewing a predetermined measurement space from said two observation points inside the measurement space, respectively, $p_{axis}$ denotes a position of an infinite-point on a straight line extending in a direction identical to the optical axis direction v, including the measuring point, and $p_c$ denotes a position of an intersection point with said straight line on an observation plane extending in parallel to a measuring plane including the measuring point, including one observation point of said two observation points.

In the seventeenth image measurement method, said compound ratio $\{p_{axis}p_R p_L p_c\}$ or the operation equivalent to said compound ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the seventeenth image measurement method as mentioned above, it is acceptable that as said physical quantity indexing a distance between the measuring plane and one observation point of said two observation points in the optical axis direction, a normalized distance ${}_n d_c$, which is expressed by the following equation, is adopted, $${}_n d_c = d_c / \Delta x_{LR}$$

where $d_c$ denotes a distance between the measuring plane and one observation point of said two observation points in the optical axis direction, and $\Delta x_{LR}$ denotes a distance between said two observation points, and said normalized distance ${}_n d_c$ is determined in accordance with the following equation $${}_n d_c = \{p_{axis} p_R p_L p_c\}$$

or an equation equivalent to the above equation.

In the seventeenth image measurement method as mentioned above, it is acceptable that an azimuth of a measuring plane including a plurality of measuring points associated with a plurality of polar lines intersecting at a cross point and/or a physical quantity indexing a distance between the measuring plane and one observation point of said two observation points in the optical axis direction are determined in such a manner that a process of determining a polar line associated with the position $p_c$ of the intersection point on the observation plane through a polar transformation for the position $p_c$ is executed as to a plurality of measuring points existing in the measurement space, and cross points of polar lines, which are formed when a plurality of polar lines determined through an execution of said process are drawn on a polar line drawing space, are determined.

In the seventeenth image measurement method as mentioned above, it is acceptable that the measuring point appearing on the image has information as to intensity, and an azimuth of a measuring plane including a plurality of measuring points associated with a plurality of polar lines joining a voting for a maximal point and/or a physical quantity indexing a distance between the measuring plane and one observation point of said two observation points in the optical axis direction are determined in such a manner that a process of determining a polar line associated with the measuring point through a polar transformation for the position $p_c$ of the intersection point on the observation plane, and of voting a value associated with intensity of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value.

In the seventeenth image measurement method as mentioned above, it is acceptable that the measuring point appearing on the image has information as to intensity, and an azimuth of a measuring plane including a plurality of measuring points associated with a plurality of polar lines joining a voting for a maximal point and/or a physical quantity indexing a distance between the measuring plane and one observation point of said two observation points in the optical axis direction are determined in such a manner that a process of determining a polar line associated with the measuring point through a polar transformation for the position $p_c$ of the intersection point on the observation plane, and determining a response intensity associated with a binocular parallax σ, which is a positional difference between the two measuring positions $p_R$ and $p_L$ through observation on said measuring point from said two observation points, and of voting the response intensity associated with the binocular parallax σ of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value is determined.

In the seventeenth image measurement method as mentioned above, it is acceptable that the position $p_c$ of the intersection point on the observation plane is determined using said compound ratio $\{p_{axis}p_Rp_Lp_c\}$ or the operation equivalent to said compound ratio, upon determination of a physical quantity indexing a distance between the measuring plane and one observation point of said two observation points in the optical axis direction, the two measuring positions $p_R$ and $p_L$ of the measuring point through observation from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point.

In the seventeenth image measurement method as mentioned above, it is acceptable that the image measurement method comprises:

a first step of setting up the physical quantity indexing a distance between the measuring plane and one observation point of said two observation points in the optical axis direction in form of a parameter;

a second step of determining the position $p_c$ of the intersection point on the observation plane, using said compound ratio $\{p_{axis}p_Rp_Lp_c\}$ or the operation equivalent to said compound ratio, in accordance with the physical quantity indexing a distance between the measuring plane and one observation point of said two observation points in the optical axis direction set up in the first step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point; and a third step of determining a polar line associated with the measuring point through a polar transformation of the position $p_c$ of the intersection point on the observation plane, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing said physical quantity indexing a distance between the measuring plane and one observation point of said two observation points in the optical axis direction in such a manner that cross points of polar lines, which are formed when a plurality of polar lines determined through a repetition of said first to third steps by a plurality of number of times are drawn on a polar line drawing space, are determined.

In this case, it is preferable that the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement method further comprises a fifth step of setting up a binocular parallax σ, which is a positional difference between the two measuring positions $p_R$ and $p_L$ through observation on said measuring point from said two observation points, in the form of a second parameter, said second step is a step of determining the position $p_c$ of the intersection point on the observation plane using the physical quantity indexing a distance between the measuring plane and one observation point of said two observation points in the optical axis direction, which is set up in said first step, the measuring position $p_R$ through observation on said measuring point from one observation point of said two observation points, the binocular parallax σ, which is set up in said fifth step, and the position $p_{axis}$ of said infinite-point of the measuring point, said third step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of said first, fifth, second and third steps by a plurality of number of times offers a maximal value is determined, instead of determination of said cross point.

It is also preferable that said third step is a step of determining a polar line drawn on a sphere in form of a large circle through a polar transformation of the position $p_c$.

It is also preferable that said third step is a step of determining a polar line drawn in form of a large circle on a sphere through a polar transformation of the position $p_c$, and projected into an inside of a circle on a plane.

It is also preferable that said third step is a step of determining a polar line drawn on a plane in form of a straight line through a polar transformation of the position $p_c$.

In the seventeenth image measurement method as mentioned above, it is acceptable that the image measurement method comprises:

a first step of setting up the position $p_{axis}$ of said infinite-point of the measuring point through setting up the optical axis direction v in form of a first parameter;

a second step of setting up the physical quantity indexing a distance between the measuring plane and one observation point of said two observation points in the optical axis direction in form of a second parameter;

a third step of determining the position $p_c$ of the intersection point on the observation plane, using said compound ratio $\{p_{axis}p_R p_L p_c\}$ or the operation equivalent to said compound ratio, in accordance with the position $p_{axis}$ set up in said first step, the physical quantity indexing a distance between the measuring plane and one observation point of said two observation points in the optical axis direction set up in the second step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a fourth step of determining a polar line associated with the measuring point through a polar transformation of the position $p_c$ of the intersection point on the observation plane, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true optical axis direction, and of determining an azimuth of a measuring plane including a plurality of measuring points associated with a plurality of polar lines intersecting at a cross point determined on a polar line drawing space associated with the true optical axis direction, and/or said physical quantity indexing a distance between the measuring plane and one observation point of said two observation points in the optical axis direction in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true optical axis, direction relative to said observation point on said measuring point is selected in accordance with information as to a number of polar lines intersecting at the cross points.

In this case, it is preferable that the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction and/or said physical quantity indexing a distance between the measuring plane and one observation point of said two observation points in the optical axis direction in such a manner that a maximal point wherein a value by a voting through a repetition of execution of said first to fourth steps offers a maximal value, instead of determining of the cross point, is determined on each polar line drawing space, and a polar line drawing space associated with the true optical axis direction is selected in accordance with information as to a maximal value at the maximal point.

It is also preferable that the measuring point appearing on the image has information as to intensity, said image measurement method further comprises a sixth step of setting up a binocular parallax σ, which is a positional difference between the two measuring positions $p_R$ and $p_L$ through observation on said measuring point from said two observation points, in the form of a third parameter, said third step is a step of determining the position $p_c$ of the intersection point on the observation plane using the position $p_{axis}$, which is set up in said first step, the physical quantity indexing a distance between the measuring plane and one observation point of said two observation points in the optical axis direction which is set up in said second step, the measuring position $p_R$ through observation on said measuring point from one observation point of said two observation points, and the binocular parallax σ, which is set up in said sixth step, said fourth step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true optical axis direction is selected in accordance with information as to a maximal value at the maximal point.

To achieve the above-mentioned objects, the present invention provides, of image measurement methods, a eighteenth image measurement method of determining an azimuth $n_s$ of a measuring plane and/or a physical quantity indexing a shortest distance between the measuring plane and one observation point of predetermined two observation points, using a compound ratio $\{p_{axis}p_Rp_Lp_c\}$ which is determined by four positions $p_{axis}$, $p_R$, $p_L$, $p_c$ of a measuring point, or an operation equivalent to said compound ratio, and an inner product $(n_s \cdot v)$ of the azimuth $n_s$ of the measuring plane and an optical axis direction v, where $p_R$ and $p_L$ denote measuring positions through observation of said two observation points on an arbitrary measuring point appearing on an image obtained through viewing a predetermined measurement space from predetermined two observation points inside the measurement space, respectively, v denotes the optical axis direction coupling said two observation points, $p_{axis}$ denotes a position of an infinite-point on a straight line extending in a direction identical to the optical axis direction v, including the measuring point, $p_c$ denotes a position of an intersection point with said straight line on an observation plane extending in parallel to a measuring plane including the measuring point, including one observation point of said two observation points, and $n_s$ denotes the azimuth of the measuring plane.

In the eighteenth image measurement method as mentioned above, wherein said compound ratio $\{p_{axis}p_Rp_Lp_c\}$ or the operation equivalent to said compound ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the eighteenth image measurement method as mentioned above, it is preferable that as said physical quantity indexing the shortest distance, a normalization shortest distance $_nd_s$ which is expressed by the following equation, is adopted, $$_nd_s=d_s/\Delta x_{LR}$$

and said normalization shortest distance $_nd_s$ is determined in accordance with the following equation, $$_nd_s={}_nd_c(n_s \cdot v)$$

using a normalized distance $_nd_c$, which is expressed by the following equation, and the inner product $(n_s \cdot v)$ $$_nd_c=d_c/\Delta x_{LR}$$

where $d_s$ denotes a shortest distance between the measuring plane and one observation point of said two observation points, $d_c$ denotes a distance between the measuring plane and one observation point of said two observation points in an optical axis direction, and $\Delta x_{LR}$ denotes a distance between said two observation points.

In the eighteenth image measurement method as mentioned above, it is acceptable that the image measurement method comprises:

a first step of setting up the physical quantity indexing the shortest distance in form of a first parameter;

a second step of setting up the inner product $(n_s \cdot v)$ in form of a second parameter;

a third step of determining the position $p_c$ of the intersection point on the observation plane, using said compound ratio $\{p_{axis}p_Rp_Lp_c\}$ or the operation equivalent to said compound ratio, in accordance with the physical quantity indexing the shortest distance set up in the first step, the inner product $(n_s \cdot v)$ set up in the second step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points, and the position $P_{axis}$ of said infinite-point of the measuring point;

a fourth step of determining a polar line associated with the position $p_c$ of the intersection point on the observation plane through a polar transformation of the position $p_c$, and a fifth step of determining a point on the polar line, said point being given with an angle r with respect to the optical axis direction v, $$r = \cos^{-1}(n_s \cdot v)$$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance between the measuring plane and one observation point of said two observation points in such a manner that cross points of curved lines, which are formed when a plurality of curved lines determined through a repetition of said first to fifth steps by a plurality of number of times are drawn on a curved line drawing space, are determined.

In this case, it is preferable that the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of predetermined two observation points in such a manner that a maximal point wherein a value by a voting through a repetition of execution of said first to fifth steps by a plurality of number of times offers a maximal value, instead of determining of the cross point, is determined.

It is also preferable that the measuring point appearing on the image has information as to intensity, said image measurement method further comprises a seventh step of setting up a binocular parallax σ, which is a positional difference between the two measuring positions $p_R$ and $p_L$ through observation on said measuring point from said two observation points, in the form of a third parameter, said third step is a step of determining the position $p_c$ of the intersection point on the observation plane using the.physical quantity indexing the shortest distance set up in the first step, the inner product $(n_s \cdot v)$ set up in the second step, the measuring position $p_R$ through observation on said measuring point from one observation point of said two observation points, the binocular parallax σ, which is set up in said seventh step, and the position $p_{axis}$ of said infinite-point of the measuring point, said fifth step is a step of determining said point on a polar line associated with the measuring point, and determining a response intensity associated with the binocular parallax σ on the measuring point, and of voting the response intensity associated with the binocular parallax σ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of said two observation points in such a manner that a maximal point wherein a value by a voting through a repetition of said first, second, seventh and third to fifth steps by a plurality of number of times offers a maximal value is determined, instead of determination of said cross point.

It is also preferable that said fifth step is a step of determining a curved line drawn on a sphere in form of a curved line coupling a plurality of lines involved in one measuring point, which is determined through repetition of said fifth step.

It is also preferable that said fifth step is a step of determining a curved line drawn on a sphere in form of a curved line coupling a plurality of lines involved in one measuring point, which is determined through repetition of said fifth step, said curved line being projected into an inside of a circle on a plane.

In the eighteenth image measurement method as mentioned above, it is acceptable that the image measurement method comprises:

a first step of setting up the position $p_{axis}$ of said infinite-point of the measuring point through setting up the optical axis direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the intersection point on the observation plane, using said compound ratio $\{p_{axis} p_R p_L p_c\}$ or the operation equivalent to said compound ratio, in accordance with the position $p_{axis}$ of said infinite-point of the measuring point, which is set up in said first step, the physical quantity indexing the shortest distance, which is set up in the second step, the inner product $(n_s \cdot v)$ set up in the third step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points;

a fifth step of determining a polar line associated with the position $p_c$ of the intersection point on the observation plane through a polar transformation of the position $p_c$; and a sixth step of determining a point on the polar line, said point being given with an angle r with respect to the optical axis direction v, $$r=\cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true optical axis direction, and of determining an azimuth $n_s$ of a measuring plane including a plurality of measuring points associated with a plurality of curved lines intersecting at a cross point determined on a curved line drawing space associated with the true optical axis direction, and/or a physical quantity indexing a shortest distance between the measuring plane and one observation point of predetermined two observation points in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true optical axis direction relative to said observation point on said measuring point is selected in accordance with information as to a number of curved lines intersecting at the cross points.

In this case, it is preferable that the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of said first to sixth steps offers a maximal value, instead of determining of the cross point, is determined on each curved line drawing space, and a curved line drawing space associated with the true optical axis direction is selected in accordance with information as to a maximal value at the maximal point.

It is also preferable that the measuring point appearing on the image has information as to intensity, said image measurement method further comprises a eighth step of setting up a binocular parallax σ, which is a positional difference between the two measuring positions $p_R$ and $p_L$ through observation on said measuring point from said two observation points, in the form of a fourth parameter, said fourth step is a step of determining the position $p_c$ of the intersection point on the observation plane using the position $P_{axis}$ of said infinite-point of the measuring point, which is set up in said first step, the physical quantity indexing the shortest distance, which is set up in the second step, the inner product $(n_s \cdot v)$ set up in the third step, the measuring position $p_R$ through observation on said measuring point from one observation point of said two observation points, and a binocular parallax σ, which is set up in said eighth step, said sixth step is a step of determining said point associated with the measuring point, and determining a response intensity associated with the binocular parallax σ on the measuring point, and of voting the response intensity associated with the binocular parallax σ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true optical axis direction is selected in accordance with information as to a maximal value at the maximal point.

To achieve the above-mentioned objects, the present invention provides, of image measurement methods, a nineteenth image measurement method of determining an azimuth of a measuring plane and/or a physical quantity indexing a shortest distance between the measuring plane and one observation point of predetermined two observation points, using a simple ratio$(p_{axis}p_Rp_L)$, which is determined by three positions $p_{axis}$, $p_R$, $p_L$ of a measuring point, or an operation equivalent to said simple ratio, where $p_R$ and $p_L$ denote measuring positions through observation of said two observation points on an arbitrary measuring point appearing on an image obtained through viewing a predetermined measurement space from a predetermined observation point inside the measurement space, respectively, v denotes an optical axis direction coupling said two observation points, and $p_{axis}$ denotes a position of an infinite-point on a straight line extending in a direction identical to the optical axis direction v, including the measuring point.

In the nineteenth image measurement method, said simple ratio $(p_{axis}p_Rp_L)$ or the operation equivalent to said simple ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the nineteenth image measurement method as mentioned above, it is acceptable that as the positions $p_{axis}$, $p_R$, $p_L$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x_{LR}$$

where $d_s$ denotes a shortest distance between the measuring plane and one observation point of said two observation points, and $\Delta x_{LR}$ denotes a distance between said two observation points, wherein said image measurement method comprises:

a first step of setting up the normalization shortest distance $_nd_s$ in form of a parameter;

a second step of determining a radius R defined by the following equation or the equivalent equation;

$$R=\cos^{-1}(_nd_s/(p_{axis}p_Rp_L))$$

using the normalization shortest distance $_nd_s$ set up in the first step and the simple ratio $(p_{axis}p_Rp_L)$ or the operation equivalent to said simple ratio; and a third step of determining a small circle of a radius R taking as a center a measuring position through observation on said measuring point from one observation point of said two observation points, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance $_nd_{s0}$ on the measuring plane in such a manner that cross points of small circles, which are formed when a plurality of small circles determined through a repetition of said first to third steps by a plurality of number of times are drawn on a small circle drawing space, are determined.

In this case, it is preferable that the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement method further comprises a fifth step of setting up a binocular parallax σ, which is a positional difference between the two measuring positions $p_R$ and $p_L$ through observation on said measuring point from said two observation points, in form of a second parameter, said second step is a step of determining the radius R using the normalization shortest distance $_nd_s$ set up in the first step, the position $p_{axis}$ of said infinite-point of the measuring point, the measuring position $p_R$ through observation on said measuring point from one observation point of said two observation points, and the binocular parallax σ, which is set up in said fifth step, said third step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{sR}$ of a measuring plane including a plurality of measuring points associated with a plurality of small circles joining a voting for a maximal point and/or a normalization shortest distance $_nd_{sR}$ on the measuring plane in such a manner that a maximal point wherein a value by a voting through a repetition of said first, fifth, second and third steps by a plurality of number of times offers a maximal value is determined, instead of determination of said cross point.

It is also preferable that said third step is a step of determining a small circle of a radius R on the sphere, and also determining a small circle in which said small circle of a radius R on the sphere is projected into an inside of a circle on a plane.

In the nineteenth image measurement method as mentioned above, it is acceptable that as the positions $p_{axis}$, $p_R$, $p_L$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x_{LR}$$

where $d_s$ denotes a shortest distance between the measuring plane and one observation point of said two observation points, and $\Delta x_{LR}$ denotes a distance between said two observation points, wherein said image measurement method comprises:

a first step of setting up the position $p_{axis}$ of said infinite-point of the measuring point through setting up the optical axis direction v in form of a first parameter;

a second step of setting up the normalization shortest distance $_nd_s$ in form of a second parameter;

a third step of determining a radius R defined by the following equation or the equivalent equation;

$$R=\cos^{-1}(_nd_s/(p_{axis}p_Rp_L)$$

using the position $p_{axis}$ of said infinite-point of the measuring point, which is set up in the first step, the normalization shortest distance ${}_nd_s$ set up in the second step and the simple ratio $(p_{axis}p_Rp_L)$ or the operation equivalent to said simple ratio, and a fourth step of determining a small circle of a radius R taking as a center a measuring position through observation on said measuring point from one observation point of said two observation points, wherein said third step and said fourth step are repeated by a plurality of number of times on a plurality of measuring points in said measurement space, while values of the first and second parameters are altered in said first step and said second step, and thereafter, effected is a fifth step of determining a true optical axis direction, and of determining an azimuth $n_{s0}$ of a measuring plane including a plurality of measuring points associated with a plurality of small circles intersecting at a cross point determined on a small circle drawing space associated with the true optical axis direction, and/or a a normalization shortest distance ${}_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true optical axis direction relative to said observation point on said measuring point is selected in accordance with information as to a number of small circles intersecting at the cross points.

In this case, it is preferable that the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_{s0}$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

It is also preferable that the measuring point appearing on the image has information as to intensity, said image measurement method further comprises a sixth step of setting up a binocular parallax σ, which is a positional difference between the two measuring positions $p_R$ and $p_L$ through observation on said measuring point from said two observation points, in form of a third parameter, said third step is a step of determining the radius R using the position $p_{axis}$ of said infinite-point of the measuring point, which is set up in said first step, the normalization shortest distance ${}_nd_s$ set up in the second step, the measuring position $p_R$ through observation on said measuring point from one observation point of said two observation points, and the binocular parallax σ, which is set up in said sixth step, said fourth step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

To achieve the above-mentioned objects, the present invention provides, of image measurement methods, a twentieth image measurement method of determining a physical quantity indexing a distance between an arbitrary measuring point appearing on an image obtained through viewing a predetermined measurement space from a predetermined observation point inside the measurement space and one observation point of predetermined two observation points, using a simple ratio $(p_{axis}p_Rp_L)$, which is determined by three positions $p_{axis}$, $p_R$, $p_L$ of the measuring point, or an operation equivalent to said simple ratio, where $p_R$ and $p_L$ denote measuring positions through observation of said two observation points on the measuring point, respectively, and $p_{axis}$ denotes a position of an infinite-point on a straight line extending in a direction identical to an optical axis direction v coupling said two observation points, including the measuring point.

In the twentieth image measurement method as mentioned above said simple ratio $(p_{axis}p_Rp_L)$ or the operation equivalent to said simple ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the twentieth image measurement method as mentioned above, it is acceptable that as said physical quantity indexing the distance, a normalized distance ${}_n d_0$, which is expressed by the following equation, is adopted, $$ {}_n d_0 = d_0/\Delta x_{LR} $$

where $d_0$ denotes a distance between the measuring point and one observation point of said two observation points, and $\Delta x_{LR}$ denotes a distance between said two observation points, and said normalized distance ${}_n d_0$ is determined in accordance with the following equation $$ {}_n d_0 = (p_{axis} p_R p_L) $$

or an equation equivalent to the above equation.

To achieve the above-mentioned objects, the present invention provides, of image measurement methods, a twenty-first image measurement method comprising:

a first step of setting up coordinates in a voting space in form of a parameter, said coordinates being defined by a physical quantity indexing a distance between a measuring plane, including an arbitrary measuring point appearing on an image obtained through viewing a predetermined measuring space from predetermined two observation points in the measuring space and one observation point of said two observation points in an optical axis direction coupling said two observation points, and an azimuth of the measuring plane;

a second step of determining a binocular parallax $\sigma$, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax $\sigma$ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a twenty-second image measurement method comprising:

a first step of setting up in form of a first parameter an optical axis direction v coupling predetermined two observation points through viewing a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a distance between a measuring plane, including the measuring point and one observation point of said two observation points in an optical axis direction, and an azimuth $n_s$ of the measuring plane;

a third step of determining a binocular parallax $\sigma$, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax $\sigma$ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a twenty-third image measurement method comprising:

a first step of setting up coordinates in a voting space in form of a parameter, said coordinates being defined by a physical quantity indexing a shortest distance between one observation point of predetermined two observation points inside a predetermined measurement space for observation of the measurement space and a measuring plane, including an arbitrary measuring point appearing on an image obtained through viewing the measurement space from the two observation points, and an azimuth $n_s$ of the measuring plane;

a second step of determining a binocular parallax $\sigma$, which is a positional difference between two measuring positions $p_R$ and $p_L$ through observation on said measuring point from said two observation points, in accordance with a measuring position $p_R$ through observation on said measuring point from one observation point of the two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax $\sigma$ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a twenty-fourth image measurement method comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a shortest distance from one observation point of the two observation points to a measuring plane including the measuring point, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a twenty-fifth image measurement method comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a distance between a measuring plane, including the measuring point and one observation point of said two observation points in an optical axis direction, and an azimuth $n_s$ of the measuring plane;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a twenty-sixth image measurement method comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a distance between a measuring plane, including the measuring point and one observation point of said two observation points in an optical axis direction, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a twenty-seventh image measurement method comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of said two observation points, a position $p_{axis}$ of an infinite-point on a straight line extending in a direction identical to the optical axis direction, including the measuring point, and the binocular parallax σ set up in the first step;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement methods, a twenty-eighth image measurement method comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement methods, a twenty-ninth image measurement method comprising:

a first step of determining a response intensity associated with a binocular parallax, which is a positional difference between two measuring positions through observation of predetermine two observation points on an arbitrary measuring point in a predetermined measurement space, in accordance with two images obtained through viewing the measurement space from said two observation points; and a second step of voting the response intensity determined in the first step for coordinates associated with the measuring point and the binocular parallax in a voting space, said coordinates being defined by a physical quantity indexing a distance between a measuring plane, including the measuring point, and one observation point of said two observation points in an optical axis direction coupling said two observation points, and an azimuth of the measuring plane;

wherein the first step and the second step are effected by a plurality of number of times on a plurality of measuring points in the measurement space.

In the twenty-ninth image measurement method, it is acceptable that said image measurement method further comprises a third step of determining an azimuth of a measuring plane including a plurality of measuring points joining a voting for a maximal point and/or a physical quantity indexing a distance between the measuring plane and one observation point of said two observation points in the optical axis direction in such a manner that a maximal point wherein a value by said voting in the voting space offers a maximal value is determined.

To achieve the above-mentioned objects, the present invention provides, of image measurement methods, a thirtieth image measurement method comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on an arbitrary measuring point in the measurement space from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a distance between a measuring plane, including the measuring point and one observation point of said two observation points in the optical axis direction, and an azimuth of the measuring plane;

wherein the second step and the third step, of the first to third steps, are effected by a plurality of number of times on a plurality of measuring points in the measurement space, while a value of the parameter is altered in the first step.

In the thirtieth image measurement method as mentioned above, it is acceptable that said image measurement method further comprises a fourth step of determining a true optical axis direction, and of determining an azimuth of a measuring plane including a plurality of measuring points joining a voting for a maximal point determined on a voting space associated with the true optical axis direction, and/or a physical quantity indexing a physical quantity indexing a distance between the measuring plane and one observation point of said two observation points in the true optical axis direction, in such a manner that a maximal point wherein a value by a voting is determined on each voting space, and the voting space associated with the true optical axis direction is selected in accordance with information as to the maximal value on the maximal point.

To achieve the above-mentioned objects, the present invention provides, of image measurement methods, a thirty-first image measurement method comprising:

a first step of determining a response intensity associated with a binocular parallax σ, which is a positional difference between two measuring positions through observation on an arbitrary measuring point in a measurement space from predetermined two observation points, in accordance with two images obtained through viewing the measurement space from said two observation points; and a second step of voting the response intensity determined in the first step for coordinates associated with the measuring point and the binocular parallax σ in a voting space, said coordinates being defined by a physical quantity indexing a shortest distance between one observation point of the two observation points and a measuring plane, including the measuring point, and an azimuth of the measuring plane;

wherein the first step and the second step are effected by a plurality of number of times on a plurality of measuring points in the measurement space.

In the thirty-first image measurement method, it is acceptable that said image measurement method further comprises a third step of determining an azimuth $n_s$ of a measuring plane including a plurality of measuring points joining a voting for a maximal point and/or a physical quantity indexing a shortest distance between one observation point of said two observation points and the measuring plane in such a manner that a maximal point wherein a value by said voting offers a maximal value is determined in the voting space.

To achieve the above-mentioned objects, the present invention provides, of image measurement methods, a thirty-second image measurement method comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on said measuring point from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a shortest distance between one observation point of said two observation points and a measuring plane including the measuring point, and an azimuth of the measuring plane;

wherein the second step and the third step, of the first to third steps, are effected by a plurality of number of times on a plurality of measuring points in the measurement space, while a value of the parameter is altered in the first step.

In the thirty-second image measurement method, it is acceptable that said image measurement method further comprises a fourth step of determining a true optical axis direction, and of determining an azimuth of a measuring plane including a plurality of measuring points joining a voting for a maximal point determined on a voting space associated with the true optical axis direction, and/or a shortest distance between one observation point of said two observation points and the measuring plane, in such a manner that a maximal point wherein a value by said voting offers a maximal value is determined on each voting space, and a voting space associated with the true optical axis direction relative to the observation point on the measuring point is selected in accordance with information as to the maximal value on the maximal point.

An image measuring method of the present invention may be defined by alternative expressions as set forth below.

(1) An image measurement method of determining a three-dimensional azimuth $n_s$ of a plane and/or a normalized time ${}_nt_c$ up to crossing the plane, using a compound ratio $\{p_{inf}p_0p_1p_c\}$, which is determined by four positions $p_{inf}$, $p_0$, $p_1$, $p_c$, where $p_0$ and $p_1$ denote measuring positions at mutually different two measuring times, that is, the present time and the subsequent time, on an arbitrary measuring point appearing on an image, respectively, $p_{inf}$ denotes a position of the measuring point after an infinite time elapses, and $p_c$ denotes a position of the measuring point at a "time in which a plane including the measuring point crosses a camera center". Here, the normalized time ${}_nt_c$, which is expressed by the following equation, is a time wherein time $t_c$ is normalized by a time difference Δt, $$ {}_nt_c=t_c/\Delta t \tag{a} $$

where $t_c$ denotes a time up to crossing the plane, and Δt denotes a time between said two measuring times, that is, the present time and the subsequent time.

(2) An image measurement method according to paragraph (1), wherein the normalized time ${}_nt_c$ up to crossing the plane is determined in accordance with the following equation $$ {}_nt_c=\{p_{inf}p_0p_1p_c\} \tag{b} $$

(2-1) An image measurement method according to paragraph (1), wherein with respect to a plurality of measuring points on an image, the position $p_c$ of the measuring point at a "time in which a plane including the measuring points crosses a camera center" is subjected to a polar transformation (or a duality transformation) to determine a three-dimensional azimuth $n_s$ of a plane in form of a cross point of the polar line thus obtained.

(2-2) An image measurement method according to paragraph (1), wherein the normalized time ${}_nt_c$ and the "positions $p_0$, $p_1$, $p_{inf}$ at three times" are determined, and the position $p_c$ of is computed using the formula (b). This method is referred to as a compound ratio transformation, since the compound ratio $\{p_{inf}p_0p_1p_c\}$ is used.

(3) An image measurement method according to paragraph (1), wherein with respect to a plurality of measuring points on an image, the position $p_c$ of the measuring point at a "time in which a plane including the measuring points crosses a camera center" is determined through the polar transformation of the paragraph (2-1) to determine a three-dimensional azimuth $n_s$ of a plane in form of a cross point of the polar line subjected to the polar transformation as to those points.

(4) An image measurement method according to paragraph (3), wherein the following steps are executed to determine a three-dimensional azimuth $n_{s0}$ of a plane and/or a normalized time ${}_nt_{c0}$ up to crossing the plane.

Step 1: A normalized time parameter ${}_nt_c$ is arbitrarily set up, and the compound transformation in the paragraph (2-2) for the position $p_c$ is executed as to a plurality of measuring points to compute the position $p_c$.

Step 2: The positions are subjected to the polar transformation to draw the respective corresponding polar lines. The intensity of the polar line implies "brightness of the position $p_0$ on the image", and the intensity is added in a place wherein a plurality of polar lines are intersected one another.

Step 3: Steps 1 and 2 are executed while the normalized time parameter $_nt_c$ is altered to determine a parameter value $_nt_{c0}$ in which a plurality of polar lines drawn in the step 2 intersect at one point. As the parameter value, the "normalized time $_nt_{c0}$ up to crossing the plane" is obtained. Further, as the coordinates of the cross point, the azimuth $n_{s0}$ of the plane is obtained.

(5) An image measurement method according to paragraph (4), wherein the polar line in the step 2 is drawn on a sphere in form of a large circle.

(5-1) An image measurement method according to paragraph (5), wherein the large circle in paragraph (5) is drawn through projection into the inner part of a circle on a plane.

(6) An image measurement method according to paragraph (4), wherein the polar line in the step 2 is drawn on a plane in form of a straight line.

(7) An image measurement method according to paragraphs (3) or (4), wherein a three-dimensional azimuth $n_s$ of a plane and/or a normalized time $_nt_c$ up to crossing the plane are determined in accordance with the following steps, without determining a moving direction v (that is, the position $p_{inf}$ after an infinite time elapses).

Step 1: Arbitrarily set up a moving direction parameter v.

Step 2: Define a direction of the moving direction parameter v as the "position $p_{inf}$ after an infinite time elapses".

Step 3: Execute paragraphs (3) or (4).

Step 4: Steps 1 to 3 are executed while the moving direction parameter v is altered to determine a parameter value $v_0$ in which a plurality of polar lines drawn in the step 3 intersect at one point. This parameter value thus determined is a true moving direction $v_0$. As the coordinates of the cross point, the azimuth $n_s$ of the plane and/or the normalized time $_nt_c$ up to crossing the plane is obtained.

(8) An image measurement method of determining a three-dimensional azimuth $n_s$ of a plane and/or a normalization shortest distance $_nd_s$ up to the plane, using formula (b) and formula (c), where $p_0$ and $p_1$ denote measuring positions at mutually different two measuring times, that is, the present time and the subsequent time, on an arbitrary measuring point appearing on an image, respectively, $p_{inf}$ denotes a position of the measuring point after an infinite time elapses, and $p_c$ denotes a position of the measuring point at a "time in which a plane including the measuring point crosses a camera center". Here, the normalization shortest distance $_nd_s$, which is expressed by formula (d), is a distance wherein a distance $d_s$ is normalized by a distance $\Delta x$, $$_nd_s={_nt_c}(n_s\cdot v) \qquad (c)$$

$$_nd_s=d_s/\Delta x \qquad (d)$$

where $d_s$ denotes a shortest distance up to the plane, and $\Delta x$ denotes a moving distance of a camera (or the plane) between the present time and the subsequent time. In formula (c), v denotes a moving direction of the camera or the plane.

(9) An image measurement method according to paragraph (8), wherein the following steps are executed to determine a three-dimensional azimuth $n_{s0}$ of a plane and/or a normalization shortest distance $_nd_{s0}$ up to crossing the plane.

Step 1: A normalization shortest distance parameter $_nd_s$ is arbitrarily set up.

Step 2: An angle r between the moving direction v and the three-dimensional azimuth $n_s$ is arbitrarily set up, that is, the inner product $(n_s\cdot v)$ is arbitrarily set up in form of cos (r), and the normalized time parameter $_nt_c$ is computed in form of $_nd_s/\cos(r)$ using formula (c).

Step 3: The compound transformation in the paragraph (2-2) for the position $p_c$ is executed as to a plurality of measuring points to compute the position $p_c$.

Step 4: Determine a point offering an angle r with respect to the moving direction on a polar line in which the positions are subjected to the polar transformation.

Step 5: Compute the points in step 4, while the angle r is altered, to draw a curve consisting of the points given in form of a group. The intensity of the curve implies "brightness of the position $p_0$ on the image", and the intensity is added in a place wherein a plurality of curves are intersected one another.

Step 6: Steps 1 to 5 are executed while the normalization shortest distance parameter $_nd_s$ is altered to determine a parameter value $_nd_{s0}$ in which a plurality of curves drawn in the step 5 intersect at one point. As the parameter value, the "normalization shortest distance $_nd_{s0}$ up to the plane" is obtained. Further, as the coordinates of the cross point, the azimuth $n_{s0}$ of the plane is obtained.

(10) An image measurement method according to paragraph (8), wherein the following steps are executed to determine a three-dimensional azimuth $n_{s0}$ of a plane and/or a normalization shortest distance $_nd_{s0}$ up to crossing the plane.

Step 1: A normalization shortest distance parameter $_nd_s$ is arbitrarily set up to compute parameter R as to the respective points on an image in accordance with formula (e) using a "simple ratio$(p_{inf}p_0p_1)$, which is determined by three positions $p_{inf}$, $p_0$, $p_1$ of a measuring point".

$$R=\cos^{-1}({_nd_s}/(p_{inf}p_0p_1)) \qquad (e)$$

Step 2: Draw a small circle R taking the "position $p_0$ at the present time" as the center. The intensity of the small circle implies "brightness of the position $p_0$ on the image", and the intensity is added in a place wherein a plurality of small circles are intersected one another.

Step 3: Steps 1 and 2 are executed while the normalization shortest distance parameter $_nd_s$ is altered to determine a parameter value $_nd_{s0}$ in which a plurality of small circles drawn in the step 2 intersect at one point. As the parameter value, the "normalization shortest distance $_nd_{s0}$ up to the plane" is obtained. Further, as the coordinates of the cross point, the azimuth $n_{s0}$ of the plane is obtained.

(11) An image measurement method according to paragraphs (9) and (10), wherein the curve in step 5 in paragraph (9) and the small circle in step 2 in paragraph (10) are drawn on a sphere.

(11-1) An image measurement method according to paragraph (11), wherein the curve or small circle in paragraph (11) is drawn through projection into the inner part of a circle on a plane.

(12) An image measurement method according to paragraph (9) and (10), wherein the curve in the step 5 and the small circle in step 2 in paragraph (10) are drawn on a plane through projection onto a plane.

(13) An image measurement method according to paragraphs (8), (9) or (10), wherein a three-dimensional azimuth $n_s$ of a plane and/or a normalization shortest distance $_nd_s$ up to crossing the plane are determined in accordance with the following steps, without determining a moving direction v (that is, the position $p_{inf}$ after an infinite time elapses).

Step 1: Arbitrarily set up a moving direction parameter v.

Step 2: Define a direction of the moving direction parameter v as the "position $p_{inf}$ after an infinite time elapses".

Step 3: Execute paragraphs (8), (9) or (10).

Step 4: Steps 1 to 3 are executed while the moving direction parameter v is altered to determine a parameter value $v_0$ in which curves (or small circles) drawn in the step 3 intersect at one point. This parameter value thus determined is a true moving direction $v_0$. As the coordinates of the cross point, the azimuth $n_s$ of the plane and/or the normalization shortest distance ${}_nd_s$ up to the plane is obtained.

(14) An image measurement method of determining a normalized distance ${}_nd_0$ between a camera center and a position of a point in a space in accordance with formula (f), using a simple ratio($p_{inf}p_0p_1$), which is determined by three positions $p_{inf}$, $p_0$, $p_1$ of a measuring point, where $p_0$ and $p_1$ denote measuring positions at mutually different two measuring times, that is, the present time and the subsequent time, on an arbitrary measuring point appearing on an image, respectively, and $p_{inf}$ denotes a position of the measuring point after an infinite time elapses. Here, the normalized distance ${}_nd_0$, which is expressed by formula (g), is a distance wherein a distance do is normalized by a distance Δx, $$ {}_nd_0=(p_{inf}p_0p_1) \tag{f}$$

$$ {}_nd_0=d_0/\Delta x \tag{g}$$

where $d_0$ denotes a distance up to the point, and Δx denotes a moving distance of a camera (or the plane) between the present time and the subsequent time.

(15) An image measurement method according to step 1 of paragraph (10), wherein a parameter R is computed in accordance with the following formula (h) using a "normalized point distance ${}_nd_0$".

$$ R=\cos^{-1}({}_nd_s/{}_nd_0) \tag{h}$$

(16) An image measurement method according to paragraphs (1) to (15), wherein the position at the subsequent time is replaced by a "positional difference (motion parallax) between the position at the present time and the position at the subsequent time".

(17) An image measurement method according to paragraphs (1) to (7), of determining a three-dimensional azimuth $n_s$ of a plane and/or a normalized distance ${}_nd_c$ up to crossing the plane in accordance with a stereo image, wherein the position $p_0$ at the present time, the position $p_1$ at the subsequent time, the position $p_{inf}$ after an infinite time elapses, the moving direction v, and the normalized time ${}_nt_c$ up to crossing the plane are replaced by a position $p_R$ on an image of a right camera, a position $p_L$ on an image of a left camera, a position $p_{axis}$ on an optical axis coupling the right camera to the left camera, an optical axis direction $a_{xis}$, and the "normalized distance ${}_nd_c$ up to crossing the plane in the optical axis direction", respectively. Here, the normalized distance ${}_nd_c$ is a distance wherein the distance $d_c$ up to crossing the plane in the optical axis direction is normalized by a distance $\Delta x_{LR}$ between the right camera and the left camera. It is acceptable that the right camera and the left camera are exchanged one another.

(18) An image measurement method according to paragraphs (8) to (13) and (15), of determining a three-dimensional azimuth $n_s$ of a plane and/or a normalization shortest distance ${}_nd_s$ up to the plane in accordance with a stereo image, wherein the position $p_0$ at the present time, the position $p_1$ at the subsequent time, the position $p_{inf}$ after an infinite time elapses, the moving direction v, and the normalization shortest distance ${}_nd_s$ up to the plane are replaced by a position $p_R$ on an image of a right camera, a position $p_L$ on an image of a left camera, a position $p_{axis}$ on an optical axis coupling the right camera to the left camera, an optical axis direction $a_{xis}$, and the "normalization shortest distance ${}_nd_{s,stero}$ up to the plane on the stereo image", respectively. Here, the normalization shortest distance ${}_nd_{s,stero}$ is a distance wherein the shortest distance $d_s$ up to the plane is normalized by a distance $\Delta x_{LR}$ between the right camera and the left camera. It is acceptable that the right camera and the left camera are exchanged one another.

(19) An image measurement method according to paragraph (14), of determining the "normalized distance ${}_nd_0$ up to the position of a point in a space" in accordance with a stereo image, wherein the position $p_0$ at the present time, the position $p_1$ at the subsequent time, and the position $p_{inf}$ after an infinite time elapses are replaced by a position $p_R$ on an image of a right camera, a position $p_L$ on an image of a left camera, and a "position $p_{axis}$ on an optical axis coupling the right camera to the left camera", respectively. Here, the normalized distance ${}_nd_0$ is a distance wherein the distance $d_0$ up to the point is normalized by a distance $\Delta x_{LR}$ between the right camera and the left camera. It is acceptable that the right camera and the left camera are exchanged one another.

(20) An image measurement method according to paragraphs (17) to (19), wherein the position $p_L$ on the image of the left camera is replaced by a "positional difference (binocular parallax) between the position on the image of the right camera and the position on the image of the left camera".

(21) An image measurement method according to paragraphs (1) to (20), wherein an image obtained through a planar camera is adopted as an input image.

(22) An image measurement method according to paragraphs (1) to (20), wherein an image obtained through a spherical camera is adopted as an input image.

(23) An image measurement method according to paragraph (10), wherein the "positional difference (motion parallax) between the position at the present time and the position at the subsequent time" is determined from an image on the planar camera, and the motion parallax thus determined is projected onto a sphere.

(24) An image measurement method according to paragraph (13), wherein the "positional difference (binocular parallax) between the position on the image of the right camera and the position on the image of the left camera" is determined from an image on the planar camera, and the binocular parallax thus determined is projected onto a sphere.

(25) A method of controlling a moving machine such as a robot, a hobby machine, a motor car and an airplane on the basis of the "three-dimensional azimuth $n_s$ of a plane" and/or the "normalized time ${}_nt_c$ up to crossing the plane" measured in accordance with an image measurement method related to paragraph (3) of paragraphs (21), (22) and (23).

(26) A method of "depth-separating a plurality of objects and surrounds, which are overlapped in sight on an image", on the basis of the "three-dimensional azimuth $n_s$ of a plane" and/or the "normalization shortest distance ${}_nd_s$ up to the plane" (or the "normalized time ${}_nt_c$ up to crossing the plane") measured in accordance with an image measurement method related to paragraph (8) (paragraph (3)) of paragraphs (21), (22) and (23).

(27) A method of "depth-separating a plurality of objects and surrounds, which are overlapped in sight on an image", on the basis of the "three-dimensional azimuth $n_s$ of a plane" and/or the "normalization shortest distance ${}_nd_s$ up to the plane" (or the "normalized distance ${}_nd_c$ up to crossing the plane in the optical axis direction") measured in accordance with an image measurement method related to paragraph (18) or paragraph (17) of paragraphs (21), (22) and (23).

(I) Forward Direction Method (I-1) Normalized Time

An image measurement method according to paragraph (4) of paragraph (16), wherein a response intensity obtained by a method (or an apparatus) of detecting a motion parallax is voted.

(I-2) Normalized Time+v Unknown

An image measurement method according to paragraphs (7) and (4) of paragraph (16), wherein a response intensity obtained by a method (or an apparatus) of detecting a motion parallax is voted.

(I-3) Normalization Shortest Distance

An image measurement method according to paragraph (10) of paragraph (16), wherein a response intensity v obtained by a method (or an apparatus) of detecting a motion parallax is voted.

(I-4) Normalization Shortest Distance+v Unknown

An image measurement method according to paragraphs (13) and (10) of paragraph (16), wherein a response intensity obtained by a method (or an apparatus) of detecting a motion parallax is voted.

(I-5) Stereo+Normalized Distance

An image measurement method according to paragraphs (17) and (4) of paragraph (20), wherein a response intensity obtained by a method (or an apparatus) of detecting a binocular parallax is voted.

(I-6) Stereo+Normalized Distance+$a_{xis}$ unknown

An image measurement method according to paragraphs (17), (7) and (4) of paragraph (20), wherein a response intensity obtained by a method (or an apparatus) of detecting a binocular parallax is voted.

(I-7) Stereo+Normalization Shortest Distance

An image measurement method according to paragraphs (18) and (10) of paragraph (20), wherein a response intensity obtained by a method (or an apparatus) of detecting a binocular parallax is voted.

(I-8) Stereo+Normalization Shortest Distance+$a_{xis}$ Unknown

An image measurement method according to paragraphs (18), (13) and (10) of paragraph (20), wherein a response intensity obtained by a method (or an apparatus) of detecting a binocular parallax is voted.

(I-9) Normalization Shortest Distance

An image measurement method according to paragraph (9) of paragraph (16), wherein a response intensity obtained by a method (or an apparatus) of detecting a motion parallax is voted.

(I-10) Normalization Shortest Distance+v Unknown

An image measurement method according to paragraphs (13) and (9) of paragraph (16), wherein a response intensity obtained by a method (or an apparatus) of detecting a motion parallax is voted.

(I-11) Stereo+Normalization Shortest Distance

An image measurement method according to paragraphs (18) and (9) of paragraph (20), wherein a response intensity obtained by a method (or an apparatus) of detecting a binocular parallax is voted.

(I-12) Stereo+Normalization Shortest Distance+$a_{xis}$ Unknown

An image measurement method according to paragraphs (18), (13) and (9) of paragraph (20), wherein a response intensity obtained by a method (or an apparatus) of detecting a binocular parallax is voted.

(II) Reverse Direction Method (II-1) Normalized Time

Step 1: Consider number i of an arbitrary pixel ${}_ip_0$ on an image at the present time.

Step 2: Consider number j of an arbitrary element $(n_{sj}, {}_nt_{cj})$ on a three-degree-of-freedom arrangement (two degree of freedom on an azimuth vector $n_s$ of a plane, and one degree of freedom on a normalized time ${}_nt_c$).

Step 3: Compute a "motion parallax ${}_{ij}\tau$ on a pixel ${}_ip_0$" associated with the numbers i and j.

Step 4: Compute from an input image a response intensity on the motion parallax ${}_{ij}\tau$ in accordance with a method (or an apparatus) of detecting a motion parallax.

Step 5: Vote the response intensity for the element $(n_{sj}, {}_nt_{cj})$ on the three-degree-of-freedom arrangement.

Step 6: Repeat the above steps 1-5 on pixels i and elements j of a predetermined range.

Detect an element, which offers a maximal response, of the three-degree-of-freedom arrangement thus voted, so that an "azimuth of a plane and a normalized time" can be detected from the address $(n_{s0}, {}_nt_{c0})$.

(II-2) Normalized Time+v Unknown

An image measurement method according to paragraph (II-1), wherein a three-dimensional azimuth n of a plane and/or a normalized time ${}_nt_c$ up to crossing the plane are determined in accordance with the following steps, without determining a moving direction v (that is, the position $p_{inf}$ after an infinite time elapses).

Step 1: Arbitrarily set up a moving direction parameter v.

Step 2: Execute paragraph (II-1).

Step 3: Steps 1 and 2 are executed while the moving direction parameter v is altered.

Determine a parameter value v0, which offers a maximum response, of the three-degree-of-freedom arrangement thus voted, so that a true moving direction $v_0$ can be detected in form of the parameter value. Further, it is possible to detect an "azimuth of a plane and a normalized time" from the address $(n_{s0}, {}_nt_{c0})$, which offers a maximal response, of the three-degree-of-freedom arrangement (step 2).

(II-3) Normalization Shortest Distance

Step 1: Consider number i of an arbitrary pixel ${}_ip_0$ on an image at the present time.

Step 2: Consider number j of an arbitrary element $(n_{sj}, {}_nd_{sj})$ on a three-degree-of-freedom arrangement (two degree of freedom on an azimuth vector $n_s$ of a plane, and one degree of freedom on a normalization shortest distance ${}_nd_s$).

Step 3: Compute a "motion parallax ${}_{ij}\tau$ on a pixel ${}_ip_0$" associated with the numbers i and j.

Step 4: Compute from an input image a response intensity on the motion parallax ${}_{ij}\tau$ in accordance with a method (or an apparatus) of detecting a motion parallax.

Step 5: Vote the response intensity for the element $(n_{sj}, {}_nd_{sj})$ on the three-degree-of-freedom arrangement.

Step 6: Repeat the above steps 1-5 on pixels i and elements j of a predetermined range.

Detect an element, which offers a maximal response, of the three-degree-of-freedom arrangement thus voted, so that an "azimuth of a plane and a normalized time" can be detected from the address $(n_{s0}, {}_nd_{s0})$.

(II-4) Normalization Shortest Distance+v Unknown

An image measurement method according to paragraph (II-3), wherein a three-dimensional azimuth $n_s$ of a plane and/or a normalization shortest distance ${}_nd_s$ are determined in accordance with the following steps, without determining a moving direction v (that is, the position $p_{inf}$ after an infinite time elapses).

Step 1: Arbitrarily set up a moving direction parameter v.

Step 2: Execute paragraph (II-3).

Step 3: Steps 1 and 2 are executed while the moving direction parameter v is altered.

Determine a parameter value $v_0$, which offers a maximum response, of the three-degree-of-freedom arrangement thus voted, so that a true moving direction $v_0$ can be detected in form of the parameter value. Further, it is possible to detect an "azimuth of a plane and a normalization shortest distance" from the address ($n_{s0}$, ${}_nd_{s0}$), which offers a maximal response, of the three-degree-of-freedom arrangement (step 2).

(II-5) Stereo+Normalized Distance

Step 1: Consider number i of an arbitrary pixel ${}_ip_R$ on an image of the right camera.

Step 2: Consider number j of an arbitrary element ($n_{sj}$, ${}_nd_{cj}$) on a three-degree-of-freedom arrangement (two degree of freedom on an azimuth vector $n_s$ of a plane, and one degree of freedom on a normalized distance ${}_nd_c$).

Step 3: Compute a "binocular parallax ${}_{ij}\sigma$ on a pixel ${}_ip_R$" associated with the numbers i and J.

Step 4: Compute from an input image a response intensity on the binocular parallax ${}_{ij}\sigma$ in accordance with a method (or an apparatus) of detecting a binocular parallax.

Step 5: Vote the response intensity for the element ($n_{sj}$, ${}_nd_{cj}$) on the three-degree-of-freedom arrangement.

Step 6: Repeat the above steps 1-5 on pixels i and elements j of a predetermined range.

Detect an element, which offers a maximal response, of the three-degree-of-freedom arrangement thus voted, so that an "azimuth of a plane and a normalized distance" can be detected from the address ($n_{s0}$, ${}_nd_{c0}$).

(II-6) Stereo+Normalized Distance+$a_{xis}$ Unknown

An image measurement method according to paragraph (II-5), wherein a three-dimensional azimuth $n_s$ of a plane and/or a normalized distance ${}_nd_c$ are determined in accordance with the following steps, without determining an optical axis direction $a_{xis}$ (that is, the position $p_{axis}$ on an optical axis coupling the right camera to the left camera).

Step 1: Arbitrarily set up an optical axis direction parameter $a_{xis}$.

Step 2: Execute paragraph (II-5).

Step 3: Steps 1 and 2 are executed while the parameter $a_{xis}$ is altered.

Determine a parameter value $a_{xis0}$, which offers a maximum response, of the three-degree-of-freedom arrangement thus voted, so that a true optical axis direction $a_{xis0}$ can be detected in form of the parameter value. Further, it is possible to detect an "azimuth of a plane and a normalized distance" from the address ($n_{s0}$, ${}_nd_{c0}$), which offers a maximal response, of the three-degree-of-freedom arrangement (step 2).

(II-7) Stereo+Normalization Shortest Distance

Step 1: Consider number i of an arbitrary pixel ${}_ip_R$ on an image of the right camera.

Step 2: Consider number j of an arbitrary element ($n_{sj}$, ${}_nd_{sj}$) on a three-degree-of-freedom arrangement (two degree of freedom on an azimuth vector $n_s$ of a plane, and one degree of freedom on a normalized distance ${}_nd_s$).

Step 3: Compute a "binocular parallax ${}_{ij}\sigma$ a on a pixel ${}_ip_R$" associated with the numbers i and j.

Step 4: Compute from an input image a response intensity on the binocular parallax ${}_{ij}\sigma$ in accordance with a method (or an apparatus) of detecting a binocular parallax .

Step 5: Vote the response intensity for the element ($n_{sj}$, ${}_nd_{sj}$) on the three-degree-of-freedom arrangement.

Step 6: Repeat the above steps 1-5 on pixels i and elements j of a predetermined range.

Detect an element, which offers a maximal response, of the three-degree-of-freedom arrangement thus voted, so that an "azimuth of a plane and a normalized distance" can be detected from the address ($n_{s0}$, ${}_nd_{s0}$)

(II-8) Stereo+Normalization Shortest Distance+$a_{xis}$ Unknown

An image measurement method according to paragraph (II-7), wherein a three-dimensional azimuth $n_s$ of a plane and/or a normalization shortest distance ${}_nd_s$ are determined in accordance with the following steps, without determining an optical axis direction $a_{xis}$ (that is, the position $p_{axis}$ on an optical axis coupling the right camera to the left camera).

Step 1: Arbitrarily set up an optical axis direction parameter $a_{xis}$.

Step 2: Execute paragraph (II-7).

Step 3: Steps 1 and 2 are executed while the parameter $a_{xis}$ is altered.

Determine a parameter value $a_{xis0}$, which offers a maximum response, of the three-degree-of-freedom arrangement thus voted, so that a true optical axis direction $a_{xis0}$ can be detected in form of the parameter value. Further, it is possible to detect an "azimuth of a plane and a normalized distance" from the address ($n_{s0}$, ${}_nd_{s0}$), which offers a maximal response, of the three-degree-of-freedom arrangement (step 2).

(III) Composite Algorithm (III-1) Normalized Time

Step 1: Consider number i of an arbitrary pixel ${}_ip_0$ on an image at the present time.

Step 2: Consider number k of an arbitrary motion parallax ${}_k\tau$.

Step 3: Determine an "element group {($n_{sj}$, ${}_nt_{cj}$)} on a three-degree-of-freedom arrangement (two degree of freedom on an azimuth vector $n_s$ of a plane, and one degree of freedom on a normalized time ${}_nt_c$)" associated with the numbers i and k.

Step 4: Compute from an input image a response intensity on the motion parallax ${}_k\tau$ in accordance with a method (or an apparatus) of detecting a motion parallax.

Step 5: Vote the response intensity for the element group {($n_{sj}$, ${}_nt_{cj}$)}.

Step 6: Repeat the above steps 1-5 on i and k of a predetermined range.

Detect an element, which offers a maximal response, of the three-degree-of-freedom arrangement thus voted, so that an "azimuth of a plane and a normalized time" can be detected from the address ($n_{s0}$, ${}_nt_{c0}$).

(III-2) Normalized Time+v Unknown

An image measurement method according to paragraph (III-1), wherein a three-dimensional azimuth $n_s$ of a plane and/or a normalized time ${}_nt_c$ up to crossing the plane are determined in accordance with the following steps, without determining a moving direction v (that is, the position $p_{inf}$ after an infinite time elapses).

Step 1: Arbitrarily set up a moving direction parameter v.

Step 2: Execute paragraph (III-1).

Step 3: Steps 1 and 2 are executed while the moving direction parameter v is altered.

Determine a parameter value $v_0$, which offers a maximum response, of the three-degree-of-freedom arrangement thus voted, so that a true moving direction $v_0$ can be detected in form of the parameter value. Further, it is possible to detect an "azimuth of a plane and a normalized time" from the address ($n_{s0}$, ${}_nt_{c0}$), which offers a maximal response, of the three-degree-of-freedom arrangement (step 2).

(III-3) Normalization Shortest Distance

Step 1: Consider number i of an arbitrary pixel ${}_ip_0$ on an image at the present time.

Step 2: Consider number k of an arbitrary motion parallax ${}_k\tau$.

Step 3: Determine an "element group $\{(n_{sj}, {}_n d_{sj})\}$ on a three-degree-of-freedom arrangement (two degree of freedom on an azimuth vector $n_s$ of a plane, and one degree of freedom on a normalization shortest distance ${}_n d_s$)" associated with the numbers i and k.

Step 4: Compute from an input image a response intensity on the motion parallax ${}_k\tau$ in accordance with a method (or an apparatus) of detecting a motion parallax.

Step 5: Vote the response intensity for the element group $\{(n_{sj}, {}_n d_{sj})\}$.

Step 6: Repeat the above steps 1-5 on i and k of a predetermined range.

Detect an element, which offers a maximal response, of the three-degree-of-freedom arrangement thus voted, so that an "azimuth of a plane and a normalization shortest distance" can be detected from the address $(n_{s0}, {}_n d_{s0})$.

(III-4) Normalization Shortest Distance+v Unknown

An image measurement method according to paragraph (III-3), wherein a three-dimensional azimuth $n_s$ of a plane and/or a normalization shortest distance ${}_n d_s$ are determined in accordance with the following steps, without determining a moving direction v (that is, the position $p_{inf}$ after an infinite time elapses).

Step 1: Arbitrarily set up a moving direction parameter v.

Step 2: Execute paragraph (III-3).

Step 3: Steps 1 and 2 are executed while the moving direction parameter v is altered.

Determine a parameter value $v_0$, which offers a maximum response, of the three-degree-of-freedom arrangement thus voted, so that a true moving direction $v_0$ can be detected in form of the parameter value. Further, it is possible to detect an "azimuth of a plane and a normalization shortest distance" from the address $(n_{s0}, {}_n d_{s0})$, which offers a maximal response, of the three-degree-of-freedom arrangement (step 2).

(III-5) Stereo+Normalized Distance

Step 1: Consider number i of an arbitrary pixel ${}_i p_R$ on an image of the right camera.

Step 2: Consider number k of an arbitrary binocular parallax ${}_k\sigma$.

Step 3: Determine an "element group $\{(n_{sj}, {}_n d_{cj})\}$ on a three-degree-of-freedom arrangement (two degree of freedom on an azimuth vector $n_s$ of a plane, and one degree of freedom on a normalized distance ${}_n d_c$)" associated with the numbers i and k.

Step 4: Compute from an input image a response intensity on the binocular parallax ${}_k\sigma$ in accordance with a method (or an apparatus) of detecting a binocular parallax.

Step 5: Vote the response intensity for the element group $\{(n_{sj}, {}_n d_{cj})\}$.

Step 6: Repeat the above steps 1-5 on i and k of a predetermined range.

Detect an element, which offers a maximal response, of the three-degree-of-freedom arrangement thus voted, so that an "azimuth of a plane and a normalized distance" can be detected from the address $(n_{s0}, {}_n d_{c0})$.

(III-6) Stereo+Normalized Distance+$a_{xis}$ Unknown

An image measurement method according to paragraph (III-5), wherein a three-dimensional azimuth $n_s$ of a plane and/or a normalized distance ${}_n d_c$ are determined in accordance with the following steps, without determining an optical axis direction $a_{xis}$ (that is, the position $p_{axis}$ on an optical axis coupling the right camera to the left camera).

Step 1: Arbitrarily set up an optical axis direction parameter $a_{xis}$.

Step 2: Execute paragraph (III-5).

Step 3: Steps 1 and 2 are executed while the parameter $a_{xis}$ is altered.

Determine a parameter value $a_{xis0}$, which offers a maximum response, of the three-degree-of-freedom arrangement thus voted, so that a true optical axis direction $a_{xis0}$ can be detected in form of the parameter value. Further, it is possible to detect an "azimuth of a plane and a normalized distance" from the address $(n_{s0}, {}_n d_{c0})$, which offers a maximal response, of the three-degree-of-freedom arrangement (step 2).

(III-7) Stereo+Normalization Shortest Distance

Step 1: Consider number i of an arbitrary pixel ${}_i p_k$ on an image of the right camera.

Step 2: Consider number k of an arbitrary binocular parallax ${}_k\sigma$.

Step 3: Determine an "element group $\{(n_{sj}, {}_n d_{sj})\}$ on a three-degree-of-freedom arrangement (two degree of freedom on an azimuth vector $n_s$ of a plane, and one degree of freedom on a normalization shortest distance ${}_n d_s$)" associated with the numbers i and k.

Step 4: Compute from an input image a response. intensity on the binocular parallax ${}_k\sigma$ in accordance with a method (or an apparatus) of detecting a binocular parallax.

Step 5: Vote the response intensity for the element group $\{(n_{sj}, {}_n d_{sj})\}$.

Step 6: Repeat the above steps 1-5 on i and k of a predetermined range.

Detect an element, which offers a maximal response, of the three-degree-of-freedom arrangement thus voted, so that an "azimuth of a plane and a normalization shortest distance" can be detected from the address $(n_{s0}, {}_n d_{s0})$.

(III-8) Stereo+Normalization Shortest Distance+$a_{xis}$ Unknown

An image measurement method according to paragraph (III-7), wherein a three-dimensional azimuth $n_s$ of a plane and/or a normalized distance ${}_n d_s$ are determined in accordance with the following steps, without determining an optical axis direction $a_{xis}$ (that is, the position $p_{axis}$ on an optical axis coupling the right camera to the left camera).

Step 1: Arbitrarily set up an optical axis direction parameter $a_{xis}$.

Step 2: Execute paragraph (III-7).

Step 3: Steps 1 and 2 are executed while the parameter $a_{xis}$ is altered.

Determine a parameter value $a_{xis0}$, which offers a maximum response, of the three-degree-of-freedom arrangement thus voted, so that a true optical axis direction $a_{xis0}$ can be detected in form of the parameter value. Further, it is possible to detect an "azimuth of a plane and a normalized distance" from the address $(n_{s0}, {}_n d_{s0})$, which offers a maximal response, of the three-degree-of-freedom arrangement (step 2).

(IV) Generalization (IV-1) Normalized Time

A method of voting a response intensity obtained by a method (or an apparatus) of detecting a motion parallax for a three-degree-of-freedom arrangement (two degree of freedom on an azimuth vector $n_s$ of a plane, and one degree of freedom on a normalized time ${}_n t_c$). Detect an element, which offers a maximal response, of the three-degree-of-freedom arrangement thus voted, so that an "azimuth of a plane and a normalized time" can be detected from the address $(n_{s0}, {}_n t_{c0})$.

Incidentally, in the present invention in its entirety, it is acceptable that "voting a response intensity obtained by a method (or an apparatus) of detecting a parallax" is replaced by "voting a quantity related to luminance of an input image". Further, it is acceptable that "a method (or an apparatus) of detecting a parallax" is replaced by "a method (or an apparatus) of detecting a velocity on an image".

(IV-2) Normalized Time+v Unknown

Step 1: Arbitrarily set up a moving direction parameter v.

Step 2: Execute paragraph (IV-1).

Step 3: Steps 1 and 2 are executed while the moving direction parameter v is altered.

Determine a parameter value $v_0$, which offers a maximum response, of the three-degree-of-freedom arrangement thus voted, so that a true moving direction $v_0$ can be detected in form of the parameter value. Further, it is possible to detect an "azimuth of a plane and a normalized time" from the address ($n_{s0}$, ${}_nt_{c0}$), which offers a maximal response, of the three-degree-of-freedom arrangement (step 2).

(IV-3) Normalization Shortest Distance

A method of voting a response intensity obtained by a method (or an apparatus) of detecting a motion parallax for a three-degree-of-freedom arrangement (two degree of freedom on an azimuth vector $n_s$ of a plane, and one degree of freedom on a normalization shortest distance ${}_nd_s$). Detect an element, which offers a maximal response, of the three-degree-of-freedom arrangement thus voted, so that an "azimuth of a plane and a normalization shortest distance" can be detected from the address ($n_{s0}$, ${}_nd_{s0}$).

(IV-4) Normalization Shortest Distance+v Unknown

Step 1: Arbitrarily set up a moving direction parameter v.

Step 2: Execute paragraph (IV-3).

Step 3: Steps 1 and 2 are executed while the moving direction parameter v is altered.

Determine a parameter value $v_0$, which offers a maximum response, of the three-degree-of-freedom arrangement thus voted, so that a true moving direction $v_0$ can be detected in form of the parameter value. Further, it is possible to detect an "azimuth of a plane and a normalization shortest distance" from the address ($n_{s0}$, ${}_nd_{s0}$), which offers a maximal response, of the three-degree-of-freedom arrangement (step 2).

(IV-5) Stereo+Normalized Distance

A method of voting a response intensity obtained by a method (or an apparatus) of detecting a binocular parallax for a three-degree-of-freedom arrangement (two degree of freedom on an azimuth vector $n_s$ of a plane, and one degree of freedom on a normalized distance ${}_nd_c$). Detect an element, which offers a maximal response, of the three-degree-of-freedom arrangement thus voted, so that an "azimuth of a plane and a normalized distance" can be detected from the address ($n_{s0}$, ${}_nd_{c0}$).

(IV-6) Stereo+Normalized Distance+$a_{xis}$ Unknown

Step 1: Arbitrarily set up an optical axis direction parameter $a_{xis}$.

Step 2: Execute paragraph (IV-5).

Step 3: Steps 1 and 2 are executed while the parameter $a_{xis}$ is altered.

Determine a parameter value $a_{xis0}$, which offers a maximum response, of the three-degree-of-freedom arrangement thus voted, so that a true optical axis direction $a_{xis0}$ can be detected in form of the parameter value. Further, it is possible to detect an "azimuth of a plane and a normalized distance" from the address ($n_{s0}$, ${}_nd_{c0}$), which offers a maximal response, of the three-degree-of-freedom arrangement (step 2).

(IV-7) Stereo+Normalization Shortest Distance

A method of voting a response intensity obtained by a method (or an apparatus) of detecting a binocular parallax for a three-degree-of-freedom arrangement (two degree of freedom on an azimuth vector $n_s$ of a plane, and one degree of freedom on a normalization shortest distance ${}_nd_s$). Detect an element, which offers a maximal response, of the three-degree-of-freedom arrangement thus voted, so that an "azimuth of a plane and a normalization shortest distance" can be detected from the address ($n_{s0}$, ${}_nd_{s0}$).

(IV-8) Stereo+Normalization Shortest Distance+$a_{xis}$ Unknown

Step 1: Arbitrarily set up an optical axis direction parameter $a_{xis}$.

Step 2: Execute paragraph (IV-7).

Step 3: Steps 1 and 2 are executed while the parameter $a_{xis}$ is altered.

Determine a parameter value $a_{xis0}$, which offers a maximum response, of the three-degree-of-freedom arrangement thus voted, so that a true optical axis direction $a_{xis0}$ can be detected in form of the parameter value. Further, it is possible to detect an "azimuth of a plane and a normalized distance" from the address ($n_{s0}$, ${}_nd_{s0}$), which offers a maximal response, of the three-degree-of-freedom arrangement (step 2).

To achieve the above-mentioned objects, the present invention provides, of image measurement apparatuses, a first image measurement apparatus comprising an operating unit for determining an azimuth of a measuring plane and/or a physical quantity indexing a superposing time in which the measuring plane is superposed on a predetermined observation point, using a compound ratio $\{p_{inf}p_0p_c\}$, which is determined by four positions $p_{inf}$, $p_0$, $p_1$, $p_c$ of a measuring point, or an operation equivalent to said compound ratio, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, and $p_c$ denotes a position of the measuring point at a superposing time in which a measuring plane including the measuring point is superposed on the observation point in the moving continuous state.

In the first image measurement apparatus as mentioned above, said compound ratio $\{p_{inf}p_0p_1p_c\}$ or the operation equivalent to said compound ratio, which are executed in said operating unit, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the first image measurement apparatus as mentioned above, it is acceptable that in said operating unit, as said physical quantity indexing the superposing time, a normalized time, ${}_nt_c$, which is expressed by the following equation, is adopted, $$ {}_nt_c = t_c/\Delta t $$

where $t_c$ denotes a time between the one measuring time of said two measuring times and said superposing time, and $\Delta t$ denotes a time between said two measuring times, and said normalized time ${}_{n}t_c$ is determined in accordance with the following equation $${}_{n}t_c=\{p_{inf}p_0p_1p_c\}$$

or an equation equivalent to the above equation.

In the first image measurement apparatus as mentioned above, it is acceptable that said operating unit comprises:

a parameter altering unit for altering a value of a parameter in which the physical quantity indexing the superposing time is set up in form of the parameter;

a compound ratio transformation unit for determining the position $p_c$ of the measuring point at the superposing time, using said compound ratio $\{p_{inf}p_0\ p_1p_c\}$ or the operation equivalent to said compound ratio, in accordance with the physical quantity indexing the superposing time set up in the first step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state; and a polar transformation unit for determining a polar line associated with the measuring point through a polar transformation of the position $p_c$ of the measuring point at the superposing time, wherein said compound ratio transformation unit and said polar transformation unit repeatedly perform operations by a plurality of number of times on a plurality of measuring points in said measurement space, while a value of said parameter is altered in said parameter altering unit, and said operating unit further comprises a detection unit for determining an azimuth of a measuring plane including a plurality of measuring points associated with a plurality of polar lines intersecting at a cross point and/or a physical quantity indexing a superposing time in which the measuring plane is superposed on the observation point in such a manner that cross points of polar lines, which are formed when a plurality of polar lines determined through a repetition of execution of operations of said parameter altering unit, said compound ratio transformation unit and said polar transformation unit by a plurality of number of times are drawn on a polar line drawing space, are determined.

In this case, it is preferable that the measuring point appearing on the image has information as to intensity, said polar transformation unit determines the polar line, and votes a value associated with intensity of a measuring point associated with the polar line for each point on a locus of the polar line, which is formed when the polar line thus determined is drawn on a polar line drawing space, and said detection unit determines an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of execution of said parameter altering unit, said compound ratio transformation unit and said polar transformation unit by a plurality of number of times offers a maximal value, instead of determining of the cross point, is determined.

In the first image measurement apparatus as mentioned above, it is also preferable that the measuring point appearing on the image has information as to intensity, said operating unit further-comprises a second parameter altering unit for altering a value of a second parameter in which a motion parallax $\tau$, which is a positional difference between the two measuring positions $p_0$ and $p_1$ at the two measuring times on the measuring point, is set up in form of the second parameter, said compound ratio transformation unit determines the position $p_c$ of the measuring point at the superposing time using the physical quantity indexing the superposing time, which is set up in said parameter altering unit, the measuring position $p_0$ at one measuring time of said two measuring times on said measuring point, the motion parallax $\tau$, which is set up in said second parameter altering unit, and the position $p_{inf}$ of the measuring point after an infinite time elapses in the moving continuous state, said polar transformation unit determines a polar line associated with the measuring point, and determines a response intensity associated with the motion parallax $\tau$ on the measuring point, and votes the response intensity associated with the motion parallax $\tau$ of a measuring point associated with the polar line for each point on a locus of the polar line, which is formed when the polar line thus determined is drawn on a polar line drawing space, said compound ratio transformation unit and said polar transformation unit repeatedly perform operations by a plurality of number of times on a plurality of measuring points in said measurement space, while values of said parameters are altered in said parameter altering unit and said second parameter altering unit, and said detection unit determines an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition execution of operations of said parameter altering unit and said second parameter altering unit, said compound ratio transformation unit and said polar transformation unit by a plurality of number of times offers a maximal value is determined, instead of determination of said cross point.

In the first image measurement apparatus as mentioned above, it is preferable that said operating unit comprises:

a first parameter altering unit for altering the position $p_{inf}$ of the measuring point after an infinite time elapses in the moving continuous state through altering a value of a first parameter in which the moving direction v is set up in form of the first parameter;

a second parameter altering unit for altering a value of a second parameter in which the physical quantity indexing the superposing time is set up in form of the second parameter;

a compound ratio transformation unit for determining the position $p_c$ of the measuring point at the superposing time, using said compound ratio $\{p_{inf}p_0p_1p_c\}$ or the operation equivalent to said compound ratio, in accordance with the position $p_{inf}$ set up in said first parameter altering unit, the physical quantity indexing the superposing time set up in the second parameter unit, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point,; and a polar transformation unit for determining a polar line associated with the measuring point through a polar transformation of the position $p_c$ of the measuring point at the superposing time, wherein said compound ratio transformation unit and said polar transformation unit repeatedly perform operations by a plurality of number of times on a plurality of measuring points in said measurement space, while values of said first parameter and said second parameter are altered in said first parameter altering unit and said parameter altering unit, respectively, and said operating unit further comprises a detection unit for determining a true moving direction, and for determining an azimuth of a measuring plane including a plurality of measuring points associated with a plurality of polar lines intersecting at a cross point determined on a polar line drawing space associated with the true moving direction, and/or a physical quantity indexing a superposing time in which the measuring plane is superposed on the observation point in such a manner that cross points of polar lines, which are formed when a plurality of polar lines determined through a repetition of execution of operations of said first parameter altering unit, said second parameter altering unit, said compound ratio transformation unit and said polar transformation unit are drawn on an associated polar line drawing space of a plurality of polar line drawing spaces according to said first parameter, are determined on each polar line drawing space, and a polar line drawing space associated with the true moving direction relative to said observation point on said measuring point is selected in accordance with information as to a number of polar lines intersecting at the cross points.

In this case, it is preferable that the measuring point appearing on the image has information as to intensity, said polar transformation unit determines the polar line, and votes a value associated with intensity of a measuring point associated with the polar line for each point on a locus of the polar line, which is formed when the polar line thus determined is drawn on the polar line drawing space, said detection unit determines the true moving direction, and determines an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of operations of said compound ratio transformation unit and said polar transformation unit offers a maximal value, instead of determining of the cross point, is determined on each polar line drawing space, and a polar line drawing space associated with the true moving direction is selected in accordance with information as to a maximal value at the maximal point.

It is also preferable that the measuring point appearing on the image has information as to intensity, said operating unit further comprises a third parameter altering unit for altering a value of a third parameter in which a motion parallax $\tau$, which is a positional difference between the two measuring positions $p_0$ and $p_1$ at the two measuring times on the measuring point, is set up in form of the third parameter, said compound ratio transformation unit determines the position $p_c$ of the measuring point at the superposing time using the position $p_{inf}$, which is set up in said first parameter altering unit, the physical quantity indexing the superposing time, which is set up in said second parameter altering unit, the measuring position $p_0$ at one measuring time of said two measuring times on said measuring point, and the motion parallax $\tau$, which is set up in said third parameter altering unit, said polar transformation unit determines a polar line associated with the measuring point, and determines a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said compound ratio transformation unit and said polar transformation unit repeatedly perform operations by a plurality of number of times on a plurality of measuring points in said measurement space, while values of said parameters are altered in said second parameter altering unit and said third parameter altering unit, and said detection unit determines the true moving direction, and determines an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of said first parameter altering unit, said second parameter altering unit, said third parameter altering unit, said compound ratio transformation unit and said polar transformation unit by a plurality of number of times offers a maximal value, instead of determining of the cross point, is determined on each polar line drawing space, and a polar line drawing space associated with the true moving direction is selected in accordance with information as to a maximal value at the maximal point.

To achieve the above-mentioned objects, the present invention provides, of image measurement apparatuses, a second image measurement apparatus comprising an operating unit for determining an azimuth $n_s$ of a measuring plane and/or a physical quantity indexing a shortest distance from a predetermined observation point to the measuring plane at one measuring time of two measuring times, using a compound ratio $\{p_{inf}p_0p_1p_c\}$, which is determined by four positions $p_{inf}$, $p_0$, $p_1$, $p_c$ of a measuring point, or an operation equivalent to said compound ratio, and an inner product $(n_s \cdot v)$ of the azimuth $n_s$ of the measuring plane and a moving direction v, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, $p_c$ denotes a position of the measuring point at a superposing time in which a measuring plane including the measuring point is superposed on the observation point in the moving continuous state, and $n_s$ denotes the azimuth of the measuring plane.

In the second image measurement apparatus as mentioned above, said compound ratio $\{p_{inf}p_0p_1p_c\}$ or the operation equivalent to said compound ratio, which are executed in said operating unit, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the second image measurement apparatus as mentioned above, it is acceptable that in said operating unit, as said physical quantity indexing the shortest distance, a normalization shortest distance ${}_nd_s$, which is expressed by the following equation, is adopted, $${}_nd_s = d_s/\Delta x$$

and said normalization shortest distance ${}_nd_s$ is determined in accordance with the following equation, $${}_nd_s = {}_nt_c(n_s \cdot v)$$

using a normalized time ${}_nt_c$, which is expressed by the following equation, and the inner product $(n_s \cdot v)$ $${}_nt_c = t_c/\Delta t$$

where $d_s$ denotes a shortest distance between the observation point and the measuring plane at one measuring time of said two measuring times, $t_c$ denotes a time between the one measuring time of said two measuring times and said superposing time, $\Delta x$ denotes a moving distance of the measuring point, which is relative to the observation point, between said two measuring times, and $\Delta t$ denotes a time between said two measuring times.

In the second image measurement apparatus as mentioned above, it is acceptable that said operating unit comprises:

a first parameter altering unit for altering a value of a first parameter in which the physical quantity indexing the shortest distance is set up in form of the first parameter;

a second parameter altering unit for altering a value of a second parameter in which the inner product $(n_s \cdot v)$ in form of the second parameter;

a compound ratio transformation unit for determining the position $p_c$ of the measuring point at the superposing time, using said compound ratio $\{p_{inf}p_0p_1p_c\}$ or the operation equivalent to said compound ratio, in accordance with the physical quantity indexing the shortest distance set up in the first parameter altering unit, the inner product $(n_s \cdot v)$ set up in the second parameter altering unit, the two measuring positions $p_0$ and $p_1$ of the measuring point at the two measuring times or the Omeasuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state;

a polar transformation unit for determining a polar line associated with the position $p_c$ of the measuring point at the superposing time through a polar transformation of the position $p_c$, and a point operating unit for determining a point on the polar line, said point being given with an angle r with respect to the moving direction v, $$r = \cos^{-1}(n_s \cdot v)$$

wherein said compound ratio transformation unit, said polar transformation unit and said point operating unit repeatedly perform operations by a plurality of number of times on a plurality of measuring points in said measurement space, while values of said first parameter and said second parameter are altered in said first parameter altering unit and said second parameter altering unit, so that a curved line, which couples a plurality of points determined through an execution of said point operating unit as to one measuring point by a plurality of number of times wherein a value of said first parameter is identical and a value of said second parameter is varied, is determined on the plurality of measuring points for each value of said first parameter, and, said operating unit further comprises a detection unit for determining an azimuth$n_s$ of a measuring plane including a plurality of measuring points associated with a plurality of curved lines intersecting at a cross point and/or a physical quantity indexing a shortest distance from said observation point to the measuring plane at one measuring time of the two measuring times in such a manner that cross points of curved lines, which are formed when a plurality of curved lines determined through a repetition of execution of operations of said compound ratio transformation unit, said polar transformation unit and said point operating unit by a plurality of number of times are drawn on a curved line drawing space, are determined.

In this case, it is preferable that the measuring point appearing on the image has information as to intensity, said point operating unit determines said point, and votes a value associated with intensity of a measuring point associated with said point for a point associated with said point in said curved line drawing space, said detection unit determines an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of said compound ratio transformation unit, said polar transformation unit and said point operating unit by a plurality of number of times offers a maximal value, instead of determining of the cross point, is determined.

It is also preferable that the measuring point appearing on the image has information as to intensity, said operating unit further comprises a third parameter altering unit for altering a value of a third parameter in which a motion parallax $\tau$, which is a positional difference between the two measuring positions $p_0$ and $p_1$ at the two measuring times on the measuring point, is set up in form of the third parameter, said compound ratio transformation unit determines the position $p_c$ of the measuring point at the superposing time using the physical quantity indexing the shortest distance set up in said first parameter altering unit, the inner product $(n_s \cdot v)$ set up in said second parameter altering unit, the measuring position $p_0$ at one measuring time of said two measuring times on said measuring point, the motion parallax $\tau$, which is set up in said third parameter altering unit, and the position $p_{inf}$ of the measuring point after an infinite time elapses in the moving continuous state, said point operating unit determines said point on a polar line associated with the measuring point, and determining a response intensity associated with the motion parallax $\tau$ on the measuring point, and of voting the response intensity associated with the motion parallax $\tau$ of a measuring point associated with said point on the polar line for a point associated with said point on the polar line in said curved line drawing space, said compound ratio transformation unit, said polar transformation unit and said point operating unit repeatedly perform operations by a plurality of number of times on a plurality of measuring points in said measurement space, while values of the parameters are altered in said first parameter altering unit, said second parameter altering unit and said third parameter altering unit, and said detection unit determines an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of operations of said first, second, third parameter altering units and said compound ratio transformation unit, said polar transformation unit and said point operating unit by a plurality of number of times offers a maximal value is determined, instead of determination of said cross point.

In the second image measurement apparatus as mentioned above, it is acceptable that said operating unit comprises:

a first parameter altering unit for altering the position $p_{inf}$ of the measuring point after an infinite time elapses in the moving continuous state through altering a value of a first parameter in which the moving direction v is set up in form of the first parameter;

a second parameter altering unit for altering a value of a second parameter in which the physical quantity indexing the shortest distance is set up in form of the second parameter;

a third parameter altering unit for altering a value of a third parameter in which the inner product $(n_s \cdot v)$ is set up in form of the third parameter;

a compound ratio transformation unit for determining the position $p_c$ of the measuring point at the superposing time, using said compound ratio $\{p_{inf} p_0 p_1 p_c\}$ or the operation equivalent to said compound ratio, in accordance with the position $p_{inf}$ of the measuring point after an infinite time elapses in the moving continuous state, which is set up in said first parameter altering unit, the physical quantity indexing the shortest distance, which is set up in the second parameter altering unit, the inner product $(n_s \cdot v)$ set up in the third parameter altering unit, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point;

a polar transformation unit for determining a polar line associated with the position $p_c$ of the measuring point at the superposing time through a polar transformation of the position $p_c$; and a point operating unit for determining a point on the polar line, said point being given with an angle r with respect to the moving direction v, $$r = \cos^{-1}(n_s \cdot v)$$

wherein said compound ratio transformation unit, said polar transformation unit and said point operating unit repeatedly perform operations by a plurality of number of times on a plurality of measuring points in said measurement space, while values of said first parameter to said third parameter are altered in said first parameter altering unit to said third parameter altering unit, so that a curved line, which couples a plurality of points determined through an execution of said point operating unit as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and said operating unit further comprises a detection unit for determining a true moving direction, and of determining an azimuth $n_s$ of a measuring plane including a plurality of measuring points associated with a plurality of curved lines intersecting at a cross point determined on a curved line drawing space associated with the true moving direction, and/or a physical quantity indexing a shortest distance from the observation point to the measuring plane at one measuring time of the two measuring times in such a manner that cross points of curved lines, which are formed when a plurality of curved lines determined through a repetition of execution of operations of said compound ratio transformation unit, said polar transformation and said point operating unit are drawn on an associated curved line drawing space of a plurality of curved line drawing spaces according to said first parameter, are determined on each curved line drawing space, and a curved line drawing space associated with the true moving direction relative to said observation point on said measuring point is selected in accordance with information as to a number of curved lines intersecting at the cross points.

In this case, it is preferable that the measuring point appearing on the image has information as to intensity, said point operating unit determines said point, and of voting a value associated with intensity of a measuring point associated with said point for points in the curved line drawing space wherein a curved line including said point is drawn, said detection unit determines the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of operations of said compound ratio transformation unit, said polar transformation and said point operating unit offers a maximal value, instead of determining of the cross point, is determined on each curved line drawing space, and a curved line drawing space associated with the true moving direction is selected in accordance with information as to a maximal value at the maximal point.

It is also preferable that the measuring point appearing on the image has information as to intensity, said operating unit further comprises a fourth parameter altering unit of setting up a motion parallax $\tau$, which is a positional difference between the two measuring positions $p_0$ and $p_1$ at the two measuring times on the measuring point, in the form of a fourth parameter, said compound ratio transformation unit determines the position $p_c$ of the measuring point at the superposing time using the position $p_{inf}$ of the measuring point after an infinite time elapses in the moving continuous state, which is set up in said first parameter altering unit, the physical quantity indexing the shortest distance, which is set up in the second parameter altering unit, the inner product $(n_s \cdot v)$ set up in the third parameter altering unit, the measuring position $p_0$ at one measuring time of said two measuring times on said measuring point, and a motion parallax $\tau$, which is set up in said fourth parameter altering unit, said point operating unit determines said point associated with the measuring point, and determines a response intensity associated with the motion parallax $\tau$ on the measuring point, and votes the response intensity associated with the motion parallax $\tau$ of a measuring point associated with said point on the polar line for points in the curved line drawing space, said compound ratio transformation unit, said polar transformation and said point operating unit repeatedly perform operations by a plurality of number of times on a plurality of measuring points in said measurement space, while values of said parameters are altered in said first, second, third and fourth parameter altering units, and said detection unit determines the true moving direction, and determines an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of operations of said first, second, third, fourth parameter altering units, and said compound ratio transformation unit, said polar transformation and said point operating unit by a plurality of number of times offers a maximal value, instead of determining of the cross point, is determined on each curved line drawing space, and a curved line drawing space associated with the true moving direction is selected in accordance with information as to a maximal value at the maximal point.

To achieve the above-mentioned objects, the present invention provides, of image measurement apparatuses, a third image measurement apparatus comprising an operating unit for determining an azimuth of a measuring plane and/or a physical quantity indexing a shortest distance from a predetermined observation point to the measuring plane at one measuring time of two measuring times, using a simple ratio$(p_{inf}p_0p_1)$, which is determined by three positions $p_{inf}$, $p_0$, $p_1$ of a measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

In the third image measurement apparatus as mentioned above, said simple ratio $(p_{inf}p_0p_1)$ or the operation equivalent to said simple ratio, which are executed in said operating unit, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the third image measurement apparatus as mentioned above, it is acceptable that in said operating unit, as the positions $p_{inf}$, $p_0$, $p_1$ of the measuring point, positions projected on a sphere are adopted, and as said physical quantity indexing the shortest distance, a normalization shortest distance ${}_nd_s$, which is expressed by the following equation, is adopted, $${}_nd_s = ds/\Delta x$$

where $d_s$ denotes a shortest distance between the observation point and the measuring plane at one measuring time of said two measuring times, and $\Delta x$ denotes a moving distance of the measuring point, which is relative to the observation point, between said two measuring times, wherein said operating unit comprises:

a parameter altering unit for altering a parameter in which the normalization shortest distance ${}_nd_s$ is set up in form of the parameter;

a parameter operating unit for determining a radius R defined by the following equation or the equivalent equation;

$$R\cos^{-1}({}_nd_s/(p_{inf}p_0p_1))$$

using the normalization shortest distance ${}_nd_s$ set up in said parameter altering unit and the simple ratio $(p_{inf}p_0p_1)$ or the operation equivalent to said simple ratio; and a small circle operating unit for determining a small circle of a radius R taking as a center a measuring position of the measuring point at one measuring time of said two measuring times, wherein said parameter operating unit and said small circle operating unit repeatedly perform oprations by a plurality of number of times on a plurality of measuring points in said measurement space, while the parameter is altered in said parameter operating unit, and said operating unit further comprises a detection unit for determining an azimuth $n_{s0}$ of a measuring plane including a plurality of measuring points associated with a plurality of small circles intersecting at a cross point and/or a normalization shortest distance ${}_nd_{s0}$ on the measuring plane in such a manner that cross points of small circles, which are formed when a plurality of small circles. determined through a repetition of execution of operations of said parameter operating unit, said small circle operating unit and said parameter altering unit by a plurality of number of times are drawn on a small circle drawing space, are determined.

In this case, it is preferable that the measuring point appearing on the image has information as to intensity, said small circle operating unit determines said small circle, and votes a value associated with intensity of a measuring point associated with said small circle for each point on a locus of the small circle, which is formed when the small circle thus determined is drawn on a small circle drawing space, said detection unit determines an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of execution of operations of said parameter operating unit, said small circle operating unit and said parameter altering unit by a plurality of number of times offers a maximal value, instead of determining of the cross point, is determined.

It is also preferable that the measuring point appearing on the image has information as to intensity, said operating unit further comprises a second parameter altering unit for altering a second parameter in which a motion parallax τ, which is a positional difference between the two measuring positions $p_0$ and $p_1$ at the two measuring times on the measuring point, is set up in form of the second parameter, said parameter operating unit determines the radius R using the normalization shortest distance ${}_nd_s$ set up in said parameter operating unit, the position $p_{inf}$ of the measuring point after an infinite time elapses in the moving continuous state, the measuring position $p_0$ at one measuring time of said two measuring times on said measuring point, and the motion parallax τ, which is set up in said second parameter altering unit, said small circle operating unit determines said small circle associated with the measuring point, and determines a response intensity associated with the motion parallax τ on the measuring point, and votes the response intensity associated with the motion parallax τ of a measuring point associated with said small circle for each point on a locus of the small circle, which is formed when the small circle thus determined is drawn on a small circle drawing space, said parameter operating unit, said small circle operating unit, said parameter altering unit and said second parameter altering unit repeatedly perform operations by a plurality of number of times on a plurality of measuring points in said measurement space, while values of the parameters are altered in said parameter altering unit and said second parameter altering unit, and p1 said detection unit determines an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of said parameter altering unit, said second parameter altering unit, said parameter operating unit, and said small circle operating unit by a plurality of number of times offers a maximal value is determined, instead of determination of said cross point.

In the third image measurement apparatus as mentioned above, it is acceptable that in said operating unit, as the positions $p_{inf}$, $p_0$, $p_1$ of the measuring point, positions projected on a sphere are adopted, and as said physical quantity indexing the shortest distance, a normalization shortest distance ${}_nd_s$, which is expressed by the following equation, is adopted, $${}_nd_s=d_s/\Delta x$$

where $d_s$ denotes a shortest distance between the observation point and the measuring plane at one measuring time of said two measuring times, and Δx denotes a moving distance of the measuring point, which is relative to the observation point, between said two measuring times, wherein said operating unit comprises:

a first parameter altering unit for altering the position $p_{inf}$ of the measuring point after an infinite time elapses in the moving continuous state through altering a value of a first parameter in which the moving direction v is set up in form of the first parameter;

a second parameter altering unit for altering a value of a second parameter in which the normalization shortest distance ${}_nd_s$ is set up in form of the second parameter;

a parameter operating unit for determining a radius R defined by the following equation or the equivalent equation;

$$R=\cos^{-1}({}_nd_s/(p_{inf}p_0p_1))$$

using the position $p_{inf}$ of the measuring point after an infinite time elapses in the moving continuous state, which is set up in said first parameter altering unit, the normalization shortest distance ${}_nd_s$ set up in said second parameter altering unit and the simple ratio $(p_{inf}p_0p_1)$ or the operation equivalent to said simple ratio; and a small circle operating unit for determining a small circle of a radius R taking as a center a measuring position of the measuring point at one measuring time of said two measuring times, wherein said parameter operating unit and said small circle operating unit repeatedly perform operations by a plurality of number of times on a plurality of measuring points in said measurement space, while values of the first and second parameters are altered in said first parameter altering unit and said second parameter altering unit, and said operating unit further comprises a detection unit for determining a true moving direction, and for determining an azimuth $n_{s0}$ of a measuring plane including a plurality of measuring points associated with a plurality of small circles intersecting at a cross point determined on a small circle drawing space associated with the true moving direction, and/or a normalization shortest distance $_{n}d_{s0}$ on the measuring plane in such a manner that cross points of small circles, which are formed when a plurality of small circles determined through a repetition of execution of operations of said parameter operating unit and said small circle operating unit are drawn on an associated small circle drawing space of a plurality of small circle drawing spaces according to said first parameter, are determined on each small circle drawing space, and a small circle drawing space associated with the true moving direction relative to said observation point on said measuring point is selected in accordance with information as to a number of small circles intersecting at the cross points.

In this case, it is preferable that the measuring point appearing on the image has information as to intensity, said small circle operating unit determines said small circle, and votes a value associated with intensity of a measuring point associated with said small circle for each point on a locus of the small circle, which is formed when the small circle thus determined is drawn on a small circle drawing space, said detection unit determines a true moving direction, and determines an azimuth $n_{s0}$ of a measuring plane including a plurality of measuring points associated with a plurality of small circles joining a voting for a maximal point determined on a small circle drawing space associated with the true moving direction, and/or a normalization shortest distance $_{n}d_{s0}$ on the measuring plane in such a manner that a maximal point wherein a value by a voting through a repetition of execution of operation of said parameter operating unit and said small circle operating unit by a plurality of number of times offers a maximal value, instead of determining of the cross point, is determined on each small circle drawing space, and a small circle drawing space associated with the true moving direction is selected in accordance with information as to the maximal value on the maximal point.

It is also preferable that the measuring point appearing on the image has information as to intensity, said operating unit further comprises a third parameter altering unit for altering a value of a third parameter in which a motion parallax $\tau$, which is a positional difference between the two measuring positions $p_0$ and $p_1$ at the two measuring times on the measuring point, is set up in form of the third parameter, said parameter altering unit determines the radius R using the position $p_{inf}$ of the measuring point after an infinite time elapses in the moving continuous state, which is set up in said first parameter altering unit, the normalization shortest distance $_{n}d_s$ set up in the second parameter altering unit, the measuring position $p_0$ at one measuring time of said two measuring times on said measuring point, and the motion parallax $\tau$, which is set up in said third parameter altering unit, said small circle operating unit determines said small circle associated with the measuring point, and determines a response intensity associated with the motion parallax $\tau$ on the measuring point, and votes the response intensity associated with the motion parallax $\tau$ of a measuring point associated with said small circle for each point on a locus of the small circle, which is formed when the small circle thus determined is drawn on a small circle drawing space associated with the small circle, said parameter operating unit and said small circle operating unit repeatedly perform operations by a plurality of number of times on a plurality of measuring points in said measurement space, while values of the parameters are altered in said first parameter altering unit, said second parameter altering unit and said third parameter unit, and said detection unit determines a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance $_{n}d_{s0}$ on the measuring plane in such a manner that a maximal point wherein a value by a voting through a repetition of execution of operations of said first parameter altering unit, said second parameter altering unit, said third parameter altering unit, said parameter operating unit and said small circle operating unit by a plurality of number of times offers a maximal value, instead of determining of the cross point, is determined on each small circle drawing space, and a small circle drawing space associated with the true moving direction is selected in accordance with information as to the maximal value on the maximal point.

To achieve the above-mentioned objects, the present invention provides, of image measurement apparatuses, a fourth image measurement apparatus comprising an operating unit for determining a physical quantity indexing a distance between a predetermined observation point and a measuring point at one measuring time of two measuring times, using a simple ratio $(p_{inf}p_0p_1)$, which is determined by three positions $p_{inf}$, $p_0$, $p_1$ of the measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

In the fourth image measurement apparatus as mentioned above, it is acceptable that said simple ratio $(p_{inf}p_0p_1)$ or the operation equivalent to said simple ratio, which are executed in said operating unit, include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$ at the two measuring times on the measuring point.

In the fourth image measurement apparatus as mentioned above, it is acceptable that in said operating unit, as said physical quantity indexing the distance, a normalized distance ${}_nd_0$, which is expressed by the following equation, is adopted, $$ {}_nd_0 = d_0/\Delta x $$

where $d_0$ denotes a distance between the observation point and the measuring point at one measuring time of the two measuring times, and Δx denotes a moving distance of the measuring point between said two measuring times with respect to the observation point, and said normalized distance ${}_nd_0$ is determined in accordance with the following equation $$ {}_nd_0 = (p_{inf}p_0p_1) $$

or an equation equivalent to the above equation.

To achieve the above-mentioned objects, the present invention provides, of image measurement apparatuses, a fifth image measurement apparatus comprising:

a parameter setting unit for setting up coordinates in a voting space in form of a parameter, said coordinates being defined by a physical quantity indexing a superposing time in which a measuring plane, including an arbitrary measuring point appearing on an image obtained through viewing a predetermined measurement space from a predetermined observation point inside the measurement space, is superposed on the observation point, and an azimuth $n_s$ of the measuring plane, in a moving continuous state wherein it is expected that a movement of the measuring point appearing on an image obtained through viewing the measurement space from the observation point inside the measurement space, said measuring point being relative with respect to the observation point, is continued in a direction identical to a moving direction relative with respect to the observation point between mutually different two measuring times on the measuring point and at a velocity identical to a moving velocity between said two measuring times;

a motion parallax operating unit for determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ of the measuring point after an infinite time elapses in the moving continuous state, and the coordinates in the voting space, which is set up in said parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space, which is set up in said parameter setting unit, wherein said motion parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a sixth image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up coordinates in a voting space according to the first parameter in form of a second parameter, said coordinates being defined by a physical quantity indexing a superposing time in which a measuring plane including the measuring point is superposed on the observation point, and an azimuth $n_s$ of the measuring plane;

a motion parallax operating unit for determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in said first parameter setting unit, and the coordinates in the voting space, which is set up in said second parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space according to the first parameter, said coordinates being set up in the second parameter setting unit, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, a seventh image measurement apparatus comprising:

a parameter setting unit for setting up coordinates in a voting space in form of a parameter, said coordinates being defined by a physical quantity indexing a shortest distance between a predetermined observation point inside a predetermined measurement space for observation of the measurement space and a measuring plane, including an arbitrary measuring point appearing on an image obtained through viewing the measurement space from the observation point inside the measurement space, at one measuring time of mutually different two measuring times, and an azimuth $n_s$ of the measuring plane;

a motion parallax operating unit for determining a motion parallax τ, which is a positional difference between two measuring positions $p_0$ and $p_1$ at the two measuring times on the measuring point, in accordance with a measuring position $p_0$ at one measuring time of the two measuring times on the measuring point, a position $p_{inf}$ of the measuring point after an infinite time elapses in a moving continuous state wherein it is expected that a movement of the measuring point is continued in a direction identical to a moving direction relative with respect to the observation point between mutually different two measuring times and at a velocity identical to a moving velocity between said two measuring times, and the coordinates in the voting space, which is set up in said parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space, which is set up in said parameter setting unit;, wherein said motion parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, an eighth image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up coordinates in a voting space according to the first parameter in form of a second parameter, said coordinates being defined by a physical quantity indexing a shortest distance from the observation point to a measuring plane including the measuring point at one measuring time of the two measuring times, and an azimuth $n_s$ of the measuring plane;

a motion parallax operating unit for determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in said first parameter setting unit, and the coordinates in the voting space, which is set up in said second parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space according to the first parameter, said coordinates being set up in said second parameter setting unit, wherein said motion parallax operating unit, said response intensity operating unit, and said voting unit perform operations by a plurality of number of times on a plurality of measuring points in the measurement space, while values of the parameters are altered in said first parameter setting unit and said second parameter setting unit.

To achieve the above-mentioned objects, the present invention provides, of image measurement apparatuses, a ninth image measurement apparatus comprising:

a parameter setting unit for setting up in form of a parameter a motion parallax τ, which is a positional difference between two measuring positions $p_0$ and $p_1$ at mutually different two measuring times, of an arbitrary measuring point appearing on an image obtained through viewing a predetermined measurement space from a predetermined observation point inside the measurement space;

a coordinates operating unit for determining coordinates in a voting space, said coordinates being defined by a physical quantity indexing a superposing time in which a measuring plane, including the measuring point, is superposed on the observation point, and an azimuth $n_s$ of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, in accordance with a measuring position $p_0$ at one measuring time of said two measuring times on said measuring point, a position $p_{inf}$ of the measuring point after an infinite time elapses in the moving continuous state, and the motion parallax τ set up in said parameter setting unit;

a response intensity operating unit for determining a response intensity associated with the motion parallax τ of the measuring point, which is set up in said parameter setting unit;, in accordance with two images obtained through viewing the measurement space from the observation point at the two measuring times; and a voting unit for voting the response intensity determined in said response intensity operating unit for the coordinates in the voting space, said coordinates being set up in said coordinates operating unit, wherein said coordinates operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a tenth image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up in form of a second parameter a motion parallax τ, which is a positional difference between two measuring positions $p_0$ and $p_1$ at the two measuring times on the measuring point;

a coordinates operating unit for determining coordinates in a voting space according to the first parameter, said coordinates being defined by a physical quantity indexing a superposing time in which a measuring plane, including the measuring point, is superposed on the observation point, and an azimuth $n_s$ of the measuring plane, in the moving continuous state, in accordance with a measuring position $p_0$ at one measuring time of said two measuring times on the measuring point, a position $p_{inf}$ set up in said first parameter setting unit, and the motion parallax τ set up in said second parameter setting unit;

a response intensity operating unit for determining a response intensity associated with the motion parallax τ of the measuring point, which is set up in said second parameter setting unit, in accordance with two images obtained through viewing the measurement space from the observation point at the two measuring times; and a voting unit for voting the response intensity determined in said response intensity operating unit for the coordinates in the voting space according to the first parameter, said coordinates being set up in the coordinates operating unit, wherein said coordinates operating unit, said response intensity operating unit, and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, an eleventh image measurement apparatus comprising:

a parameter setting unit for setting up in form of a parameter a motion parallax τ, which is a positional difference between two measuring positions $p_0$ and $p_1$ at mutually different two measuring times on the measuring point, of an arbitrary measuring point appearing on an image obtained through viewing a predetermined measurement space from a predetermined observation point inside the measurement space;

a coordinates operating unit for determining coordinates in a voting space, said coordinates being defined by a physical quantity indexing a shortest distance from the observation point to a measuring plane including the measuring point at one measuring time of the two measuring times, and an azimuth $n_s$ of the measuring plane, in accordance with a measuring position $p_0$ at one measuring time of said two measuring times on said measuring point, a position $p_{inf}$ of the measuring point after an infinite time elapses in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, and the motion parallax τ set up in the first parameter setting unit;

a response intensity operating unit for determining a response intensity associated with the motion parallax τ of the measuring point, which is set up in said parameter setting unit, in accordance with two images obtained through viewing the measurement space from the observation point at the two measuring times; and a voting unit for voting the response intensity determined in said response intensity operating unit for the coordinates in the voting space, said coordinates being set up in said coordinates operating unit, wherein said coordinates parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a twelfth image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up in form of a second parameter a motion parallax τ, which is a positional difference between two measuring positions $p_0$ and $p_1$ at the two measuring times on the measuring point;

a coordinates operating unit for determining coordinates in a voting space according to the first parameter, said coordinates being defined by a physical quantity indexing a shortest distance from the observation point to a measuring plane including the measuring point at one measuring time of the two measuring times, and an azimuth $n_s$ of the measuring plane, in the moving continuous state, in accordance with a measuring position $p_0$ at one measuring time of said two measuring times on the measuring point, a position $p_{inf}$ set up in said first parameter setting unit, and the motion parallax τ set up in said second parameter setting unit;

a response intensity operating unit for determining a response intensity associated with the motion parallax τ of the measuring point, which is set up in said second parameter setting unit, in accordance with two images obtained through viewing the measurement space from the observation point at the two measuring times; and a voting unit for voting the response intensity determined in said response intensity operating unit for the coordinates in the voting space according to the first parameter, said coordinates being set up in said coordinates operating unit, wherein said coordinates operating unit, and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, a thirteenth image measurement apparatus comprising:

a response intensity operating unit for determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a voting unit for of voting the response intensity determined in said response intensity operating unit for coordinates associated with the measuring point and the motion parallax in a voting space, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with-respect to the observation point, is continued in a direction identical to a moving direction relative with respect to the observation point between the two measuring times on the measuring point and at a velocity identical to a moving velocity between the two measuring times;

wherein said response intensity operating unit and said voting unit perform operation by a plurality of number of times on a plurality of measuring points in the measurement space.

In the thirteenth image measurement apparatus as mentioned above, it is acceptable that said image measurement apparatus further comprises a detection unit for determining an azimuth of a measuring plane including a plurality of measuring points joining a voting for a maximal point and/or a physical quantity indexing a superposing time in which the measuring plane is superposed on the observation point in such a manner that a maximal point wherein a value by said voting in the voting space offers a maximal value is determined.

To achieve the above-mentioned objects, the present invention provides, of image measurement apparatuses, a fourteenth image measurement apparatus comprising:

a parameter setting unit for setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a response intensity operating unit for determining a response intensity associated with a motion parallax, which is a positional difference between two measuring positions at the two measuring times on the measuring point, in accordance with two images obtained through viewing the measurement space from the observation point at the two measuring times; and a voting unit of voting the response intensity determined in said response intensity operating unit for coordinates associated with the measuring point and the motion parallax in a voting space according to the parameter set up in the parameter setting unit, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein said response intensity operating unit and said voting unit perform operations by a plurality of number of times on a plurality of measuring points in the measurement space, while a value of the parameter is altered in said parameter setting unit.

In the fourteenth image measurement apparatus as mentioned above, it is acceptable that said image measurement apparatus further comprises a detection unit of determining a true moving direction relative to the observation point on the measuring point, and of determining an azimuth of a measuring plane including a plurality of measuring points joining a voting for a maximal point determined on a voting space associated with the true moving direction, and/or a physical quantity indexing a superposing time in which the measuring plane is superposed on the observation point, in such a manner that a maximal point wherein a value by a voting is determined on each voting space, and the voting space associated with the true moving direction is selected in accordance with information as to the maximal value on the maximal point.

To achieve the above-mentioned objects, the present invention provides, of image measurement apparatuses, a fifteenth image measurement apparatus comprising:

a response intensity operating unit for determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a voting unit for voting the response intensity determined in said response intensity operating unit for coordinates associated with the measuring point and the motion parallax in a voting space, said coordinates being defined by a physical quantity indexing a shortest distance from the observation point to a measuring plane, including the measuring point, at one measuring time of the two measuring times, and an azimuth of the measuring plane;

wherein said response intensity operating unit and said voting unit perform operations by a plurality of number of times on a plurality of measuring points in the measurement space.

In the fifteenth image measurement apparatus as mentioned above, it is acceptable that said measurement apparatus further comprises a detection unit for determining an azimuth of a measuring plane including a plurality of measuring points joining a voting for a maximal point and/or a physical quantity indexing a shortest distance from the observation point to the measuring plane at one measuring time of the two measuring times in such a manner that a maximal point wherein a value by said voting offers a maximal value is determined in the voting space.

To achieve the above-mentioned objects, the present invention provides, of image measurement apparatuses, a sixteenth image measurement apparatus comprising:

a parameter setting unit for setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a response intensity operating unit for determining a response intensity associated with a motion parallax, which is a positional difference between two measuring positions at the two measuring times on the measuring point, in accordance with two images obtained through viewing the measurement space from the observation point at the two measuring times; and a voting unit for voting the response intensity determined in said response intensity operating unit for coordinates associated with the measuring point and the motion parallax in a voting space according to the parameter set up in said parameter setting unit, said coordinates being defined by a physical quantity indexing a shortest distance from the observation point to the measuring plane at one measuring time of the two measuring times, including the measuring point, and an azimuth of the measuring plane;

wherein said response intensity operating unit and said voting unit perform operations by a plurality of number of times on a plurality of measuring points in the measurement space, while a value of the parameter is altered in said parameter setting unit.

In the sixteenth image measurement apparatus as mentioned above, it is acceptable that said image measurement apparatus further comprises a detection unit for determining a true moving direction, and determining an azimuth of a measuring plane including a plurality of measuring points joining a voting for a maximal point determined on a voting space associated with the true moving direction, and/or a shortest distance from the observation point to the measuring plane at one measuring time of the two measuring times, in such a manner that a maximal point wherein a value by said voting offers a maximal value is determined on each voting space, and a voting space associated with the true moving direction relative to the observation point on the measuring point is selected in accordance with information as to the maximal value on the maximal point.

To achieve the above-mentioned objects, the present invention provides, of image measurement apparatuses, a seventeenth image measurement apparatus comprising an operating unit for determining an azimuth of a measuring plane and/or a physical quantity indexing a distance between the measuring plane and one observation point of predetermined two observation points in an optical axis direction v coupling said two observation points, using a compound ratio $\{p_{axis}\ p_R p_L p_c\}$, which is determined by four positions $p_{axis}$, $p_R$, $p_L$, $p_c$, or an operation equivalent to said compound ratio, where $p_R$ and $p_L$ denote measuring positions through observation of said two observation points on an arbitrary measuring point appearing on an image obtained through viewing a predetermined measurement space from said two observation points inside the measurement space, respectively, $p_{axis}$ denotes a position of an infinite-point on a straight line extending in a direction identical to the optical axis direction v, including the measuring point, and $p_c$ denotes a position of an intersection point with said straight line on an observation plane extending in parallel to a measuring plane including the measuring point, including one observation point of said two observation points.

In the seventeenth image measurement apparatus as mentioned above, said compound ratio $\{p_{axis}\ p_R p_L p_c\}$ or the operation equivalent to said compound ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the seventeenth image measurement apparatus as mentioned above, it is acceptable that in said operating unit, as said physical quantity indexing a distance between the measuring plane and one observation point of said two observation points in the optical axis direction, a normalized distance ${}_nd_c$, which is expressed by the following equation, is adopted, $$ {}_nd_c=d_c/\Delta x_{LR} $$

where $d_c$ denotes a distance between the measuring plane and one observation point of said two observation points in the optical axis direction, and $\Delta x_{LR}$ denotes a distance between said two observation points, and said normalized distance ${}_nd_c$ is determined in accordance with the following equation $$ {}_nd_c\{p_{axis}p_Rp_Lp_c\} $$

or an equation equivalent to the above equation.

In the seventeenth image measurement apparatus as mentioned above, it is acceptable that said operating unit comprises:

a parameter altering unit for altering a value of a parameter in which the physical quantity indexing a distance between the measuring plane and one observation point of said two observation points in the optical axis direction is set up in form of a parameter;

a compound ratio transformation unit for determining the position $p_c$ of the intersection point on the observation plane, using said compound ratio $\{p_{axis}p_Rp_Lp_c\}$ or the operation equivalent to said compound ratio, in accordance with the physical quantity indexing a distance between the measuring plane and one observation point of said two observation points in the optical axis direction set up in said parameter altering unit, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point; and a polar transformation unit for determining a polar line associated with the measuring point through a polar transformation of the position $p_c$ of the intersection point on the observation plane, wherein said compound ratio transformation unit and said polar transformation unit repeatedly perform operations by a plurality of number of times on a plurality of measuring points in said measurement space, while a value of said parameter is altered in said parameter altering unit, and said operating unit further comprises a detection unit for determining an azimuth of a measuring plane including a plurality of measuring points associated with a plurality of polar lines intersecting at a cross point and/or a physical quantity indexing said physical quantity indexing a distance between the measuring plane and one observation point of said two observation points in the optical axis direction in such a manner that cross points of polar lines, which are formed when a plurality of polar lines determined through a repetition of execution of operations of said parameter altering unit, said compound ratio transformation unit and said polar transformation unit by a plurality of number of times are drawn on a polar line drawing space, are determined.

In this case, it is preferable that the measuring point appearing on the image has information as to intensity, said polar transformation unit determines the polar line, and votes a value associated with intensity of a measuring point associated with the polar line for each point on a locus of the polar line, which is formed when the polar line thus determined is drawn on a polar line drawing space, and said detection unit determines an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of operations of said parameter altering unit, said compound ratio transformation unit and said polar transformation unit by a plurality of number of times offers a maximal value, instead of determining of the cross point, is determined.

It is also preferable that the measuring point appearing on the image has information as to intensity, said operating unit further comprises a second parameter altering unit for altering a value of a second parameter in which a binocular parallax σ, which is a positional difference between the two measuring positions $p_R$ and $p_L$ through observation on said measuring point from said two observation points, is set up in form of the second parameter, said compound ratio transformation unit determines the position $p_c$ of the intersection point on the observation plane using the physical quantity indexing a distance between the measuring plane and one observation point of said two observation points in the optical axis direction, which is set up in said parameter altering unit, the measuring position $p_R$ through observation on said measuring point from one observation point of said two observation points, the binocular parallax σ, which is set up in said fifth step, and the position $p_{axis}$ of said infinite-point of the measuring point, said polar transformation unit determines a polar line associated with the measuring point, and determines a response intensity associated with the binocular parallax σ on the measuring point, and votes the response intensity associated with the binocular parallax σ of a measuring point associated with the polar line for each point on a locus of the polar line, which is formed when the polar line thus determined is drawn on a polar line drawing space, said compound ratio transformation unit and said polar transformation unit repeatedly perform operations by a plurality of number of times on a plurality of measuring points in said measurement space, while values of said parameters are altered in said parameter altering unit and said second parameter altering unit, and said detection unit determines an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of operations of said first parameter altering unit, said second parameter altering unit, said compound ratio transformation unit and said polar transformation unit by a plurality of number of times offers a maximal value is determined, instead of determination of said cross point.

In the seventeenth image measurement apparatus as mentioned above, it is preferable that the image measurement apparatus comprises:

a first parameter altering unit for altering a value of a first parameter in which the position $p_{axis}$ of said infinite-point of the measuring point through setting up the optical axis direction v is altered in form of the first parameter;

a second parameter altering unit for altering a value of a second parameter in which the physical quantity indexing a distance between the measuring plane and one observation point of said two observation points in the optical axis direction is set up in form of the second parameter;

a compound ratio transformation unit for determining the position $p_c$ of the intersection point on the observation plane, using said compound ratio $\{p_{axis} p_r p_L\ p_c\}$ or the operation equivalent to said compound ratio, in accordance with the position $p_{axis}$ set up in said first parameter altering unit, the physical quantity indexing a distance between the measuring plane and one observation point of said two observation points in the optical axis direction set up in the second step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a polar transformation unit for determining a polar line associated with the measuring point through a polar transformation of the position $p_c$ of the intersection point on the observation plane, wherein said compound ratio transformation unit and said polar transformation unit repeatedly perform operations by a plurality of number of times on a plurality of measuring points in said measurement space, while values of said first parameter and said second parameter are altered in said first parameter altering unit and said second parameter altering unit, and said operating unit further comprises a detection unit for determining a true optical axis direction, and of determining an azimuth of a measuring plane including a plurality of measuring points associated with a plurality of polar lines intersecting at a cross point determined on a polar line drawing space associated with the true optical axis direction, and/or said physical quantity indexing a distance between the measuring plane and one observation point of said two observation points in the optical axis direction in such a manner that cross points of polar lines, which are formed when a plurality of polar lines determined through a repetition of execution of operations of said first parameter altering unit, said second parameter altering unit, said compound ratio transformation unit and said polar transformation unit are drawn on an associated polar line drawing space of a plurality of polar line drawing spaces according to said first parameter, are determined on each polar line drawing space, and a polar line drawing space associated with the true optical axis direction relative to said observation point on said measuring point is selected in accordance with information as to a number of polar lines intersecting at the cross points.

In this case, it is preferable that wherein the measuring point appearing on the image has information as to intensity, said polar transformation unit determines the polar line, and votes a value associated with intensity of a measuring point associated with the polar line for each point on a locus of the polar line, which is formed when the polar line thus determined is drawn on the polar line drawing space, said detection unit determines the true optical axis direction, and determines an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of execution of operations of said first parameter altering unit, said second parameter altering unit, said compound ratio transformation unit and said polar transformation unit offers a maximal value, instead of determining of the cross point, is determined on each polar line drawing space, and a polar line drawing space associated with the true optical axis direction is selected in accordance with information as to a maximal value at the maximal point.

It is also preferable that the measuring point appearing on the image has information as to intensity, said operating unit further comprises a third parameter unit for setting up a binocular parallax σ, which is a positional difference between the two measuring positions $p_R$ and $p_L$ through observation on said measuring point from said two observation points, in the form of a third parameter, said compound ratio transformation unit determines the position $p_c$ of the intersection point on the observation plane using the position $p_{axis}$, which is set up in said first parameter altering unit, the physical quantity indexing a distance between the measuring plane and one observation point of said two observation points in the optical axis direction, which is set up in said second parameter altering unit, the measuring position $p_R$ through observation on said measuring point from one observation point of said two observation points, and the binocular parallax σ, which is set up in said third parameter altering unit, said polar transformation unit determines a polar line associated with the measuring point, and determines a response intensity associated with the binocular parallax σ on the measuring point, and of voting the response=intensity associated with the binocular parallax σ of a measuring point associated with the polar line for each point on a locus of the polar line, which is formed when the polar line thus determined is drawn on a polar line drawing space, said compound ratio transformation unit and said polar transformation unit perform operations by a plurality of number of times on a plurality of measuring points in said measurement space, while values of said parameters are altered in said first, second and third parameter units, and said detection unit determines the true optical axis direction, and determines an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of operations of said first parameter altering unit, said second parameter altering unit, said third parameter altering unit, said compound ratio transformation unit and said polar transformation unit by a plurality of number of times offers a maximal value, instead of determining of the cross point, is determined on each polar line drawing space, and a polar line drawing space associated with the true optical axis direction is selected in accordance with information as to a maximal value at the maximal point.

To achieve the above-mentioned objects, the present invention provides, of image measurement apparatuses, an eighteenth image measurement apparatus comprising an operating unit for determining an azimuth $n_s$ of a measuring plane and/or a physical quantity indexing a shortest distance between the measuring plane and one observation point of predetermined two observation points, using a compound ratio $\{p_{axis}p_Rp_Lp_c\}$, which is determined by four positions $p_{axis}$, $p_R$, $p_L$, $p_c$ of a measuring point, or an operation equivalent to said compound ratio, and an inner product $(n_s \cdot v)$ of the azimuth $n_s$ of the measuring plane and an optical axis direction v, where $p_R$ and $p_L$ denote measuring positions through observation of said two observation points on an arbitrary measuring point appearing on an image obtained through viewing a predetermined measurement space from predetermined two observation points inside the measurement space, respectively, v denotes the optical axis direction coupling said two observation points, $p_{axis}$ denotes a position of an infinite-point on a straight line extending in a direction identical to the optical axis direction v, including the measuring point, $p_c$ denotes a position of an intersection point with said straight line on an observation plane extending in parallel to a measuring plane including the measuring point, including one observation point of said two observation points, and $n_s$ denotes the azimuth of the measuring plane.

In the eighteenth image measurement apparatus as mentioned above, said compound ratio $\{p_{axis}p_Rp_Lp_c\}$ or the operation equivalent to said compound ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the eighteenth image measurement apparatus as mentioned above, it is acceptable that as said physical quantity indexing the shortest distance, a normalization shortest distance ${}_nd_s$, which is expressed by the following equation, is adopted, $$ {}_nd_s = d_s/\Delta x_{LR} $$

and said normalization shortest distance ${}_nd_s$ is determined in accordance with the following equation, $$ {}_nd_s = {}_nd_c(n_s \cdot v) $$

using a normalized distance ${}_nd_c$, which is expressed by the following equation, and the inner product $(n_s \cdot v)$ $$ {}_nd_c = d_c/\Delta x_{LR} $$

where $d_s$ denotes a shortest distance between the measuring plane and one observation point of said two observation points, $d_c$ denotes a distance between the measuring plane and one observation point of said two observation points in an optical axis direction, and $\Delta x_{LR}$ denotes a distance between said two observation points.

In the eighteenth image measurement apparatus as mentioned above, it is acceptable that said operating unit comprises:

- a first parameter altering unit for setting up the physical quantity indexing the shortest distance in form of a first parameter;
- a second parameter altering unit for setting up the inner product $(n_s \cdot v)$ in form of a second parameter;
- a compound ratio transformation unit for determining position $p_c$ of the intersection point on the observation plane, using said compound ratio $\{p_{axis}p_Rp_Lp_c\}$ or the operation equivalent to said compound ratio, in accordance with the physical quantity indexing the shortest distance set up in the first parameter altering unit, the inner product $(n_s \cdot v)$ set up in the second parameter altering unit, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points, and the position $p_{axis}$ of said infinite-point of the measuring point;
- a polar transformation unit for determining a polar line associated with the position $p_c$ of the intersection point on the observation plane through a polar transformation of the position $p_c$, and
- a point operating unit for determining a point on the polar line, said point being given with an angle r with respect to the optical axis direction v, $$ r = \cos^{-1}(n_s \cdot v) $$

wherein said compound ratio transformation unit, said polar transformation unit and said point operating unit repeatedly perform operations by a plurality of number of times on a plurality of measuring points in said measurement space, while values of said first parameter and said second parameter are altered in said first parameter altering unit and said second parameter altering unit, so that a curved line, which couples a plurality of points determined through an execution of said point operating unit as to one measuring point by a plurality of number of times wherein a value of said first parameter is identical and a value of said second parameter is varied, is determined on the plurality of measuring points for each value of said first parameter, and said operating unit further comprises a detection unit for determining an azimuth $n_s$ of a measuring plane including a plurality of measuring points associated with a plurality of curved lines intersecting at a cross point and/or a physical quantity indexing a shortest distance between the measuring plane and one observation point of said two observation points in such a manner that cross points of curved lines, which are formed when a plurality of curved lines determined through a repetition of execution of operations of said compound ratio transformation unit, said polar transformation unit and said point operating unit by a plurality of number of times are drawn on a curved line drawing space, are determined.

In this case, it is preferable that the measuring point appearing on the image has information as to intensity, said point operating unit determines said point, and votes a value associated with intensity of a measuring point associated with said point for a point associated with said point in said curved line drawing space, said detection unit determines an azimuth $n_s$ of a measuring plane including a plurality of measuring points associated with a plurality of curved lines joining a voting for a maximal point and/or a physical quantity indexing a shortest distance between the measuring plane and one observation point of predetermined two observation points in such a manner that a maximal point wherein a value by a voting through a repetition of execution of operations of said compound ratio transformation unit, said polar transformation unit and said point operating unit by a plurality of number of times offers a maximal value, instead of determining of the cross point, is determined.

It is also preferable that the measuring point appearing on the image has information as to intensity, said operating unit further comprises a third parameter altering unit for altering a value of a third parameter in which a binocular parallax σ, which is a positional difference between the two measuring positions $p_R$ and $p_L$ through observation on said measuring point from said two observation points, is set up in the form of the third parameter, said compound ratio transformation unit determines the position $p_c$ of the intersection point on the observation plane using the physical quantity indexing the shortest distance set up in the first parameter altering unit, the inner product $(n_s \cdot v)$ set up in the second parameter altering unit step, the measuring position $p_R$ through observation on said measuring point from one observation point of said two observation points, the binocular parallax σ, which is set up in said third parameter altering unit, and the position $p_{axis}$ of said infinite-point of the measuring point, said point operating unit determines said point on a polar line associated with the measuring point, and determining a response intensity associated with the binocular parallax σ on the measuring point, and of voting the response intensity associated with the binocular parallax σ of a measuring point associated with said point on the polar line for a point associated with said point on the polar line in said curved line drawing space, said compound ratio transformation unit, said polar transformation unit and said point operating unit repeatedly perform operations by a plurality of number of times on a plurality of measuring points in said measurement space, while values of the parameters are altered in said first step, second and third parameter altering unit, and said detection unit determines an azimuth $n_s$ of a measuring plane including a plurality of measuring points associated with a plurality of curved lines joining a voting for a maximal point and/or a physical quantity indexing a shortest distance between the measuring plane and one observation point of said two observation points in such a manner that a maximal point wherein a value by a voting through a repetition of execution of operations of said first, second and third parameter altering units, said compound ratio transformation unit, said polar transformation unit and said point operating unit by a plurality of number of times offers a maximal value is determined, instead of determination of said cross point.

In the eighteenth image measurement apparatus as mentioned above, it is acceptable that said operating unit comprises:

a first parameter altering unit for altering the position $p_{axis}$ of said infinite-point of the measuring point through altering a value of a first parameter in which the optical axis direction v is set up in form of the first parameter;

a second parameter altering unit for altering a value of a second parameter in which the physical quantity indexing the shortest distance is set up in form of the second parameter;

a third parameter altering unit for altering a value of a third parameter in which the inner product $(n_s \cdot v)$ in form of the third parameter;

a compound ratio transformation unit for determining the position $p_c$ of the intersection point on the observation plane, using said compound ratio $\{p_{axis} p_R p_L p_c\}$ or the operation equivalent to said compound ratio, in accordance with the position $p_{axis}$ of said infinite-point of the measuring point, which is set up in said first parameter altering unit, the physical quantity indexing the shortest distance, which is set up in said second parameter altering unit, the inner product $(n_s \cdot v)$ set up in said third parameter altering unit, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a polar transformation unit for determining a polar line associated with the position $p_c$ of the intersection point on the observation plane through a polar transformation of the position $p_c$, and a point transformation unit for determining a point on the polar line, said point being given with an angle r with respect to the optical axis direction v, $$r = \cos^{-1}(n_s \cdot v)$$

wherein said first, second and third parameter altering units, said compound ratio transformation unit, said polar transformation unit and said point operating unit repeatedly perform operations by a plurality of number of times on a plurality of measuring points in said measurement space, while values of said first parameter to said third parameter are altered in said first parameter altering unit, and said second parameter altering unit and said third parameter altering unit, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and said operating unit further comprises a detection unit for determining a true optical axis direction, and for determining an azimuth $n_s$ of a measuring plane including a plurality of measuring points associated with a plurality of curved lines intersecting at a cross point determined on a curved line drawing space associated with the true optical axis direction, and/or a physical quantity indexing a shortest distance between the measuring plane and one observation point of predetermined two observation points in such a manner that cross points of curved lines, which are formed when a plurality of curved lines determined through a repetition of execution of operations of said parameter altering unit, said compound ratio transformation unit and said polar transformation unit are drawn on an associated curved line drawing space of a plurality of curved line drawing spaces according to said first parameter, are determined on each curved line drawing space, and a curved line drawing space associated with the true optical axis direction relative to said observation point on said measuring point is selected in accordance with information as to a number of curved lines intersecting at the cross points.

In this case, it is preferable that the measuring point appearing on the image has information as to intensity, said point operating unit determines said point, and of voting a value associated with intensity of a measuring point associated with said point for points in the curved line drawing space wherein a curved line including said point is drawn, said detection unit determines the true optical axis direction, and determines an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of operations of said parameter altering unit, said compound ratio transformation unit and said polar transformation unit offers a maximal value, instead of determining of the cross point, is determined on each curved line drawing space, and a curved line drawing space associated with the true optical axis direction is selected in accordance with information as to a maximal value at the maximal point.

It is also preferable that the measuring point appearing on the image has information as to intensity, said operating unit further comprises a fourth parameter altering unit for altering a value of a fourth parameter in which a binocular parallax σ, which is a positional difference between the two measuring positions $p_R$ and $p_L$ through observation on said measuring point from said two observation points, is set up in form of the fourth parameter, said compound ratio transformation unit determines the position $p_c$ of the intersection point on the observation plane using the position $p_{axis}$ of said infinite-point of the measuring point, which is set up in said first parameter altering unit, the physical quantity indexing the shortest distance, which is set up in the second parameter altering unit, the inner product $(n_s \cdot v)$ set up in the third parameter altering unit, the measuring position $p_R$ through observation on said measuring point from one observation point of said two observation points, and a binocular parallax σ, which is set up in said fourth parameter altering unit, said point operating unit determines said point associated with the measuring point, and determines a response intensity associated with the binocular parallax σ on the measuring point, and votes the response intensity associated with the binocular parallax σ of a measuring point associated with said point on the polar line for points in the curved line drawing space, said compound ratio transformation unit, said polar transformation unit and point operating unit repeatedly perform operations by a plurality of number of times on a plurality of measuring points in said measurement space, while values of said parameters are altered in said first, second, third and fourth parameter altering units, and said detection unit determines the true optical axis direction, and determines an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of operations of said first, second and third parameter altering units, said compound ratio transformation unit, said polar transformation unit and said point operating unit by a plurality of number of times offers a maximal value, instead of determining of the cross point, is determined on each curved line drawing space, and a curved line drawing space associated with the true optical axis direction is selected in accordance with information as to a maximal value at the maximal point.

To achieve the above-mentioned objects, the present invention provides, of image measurement apparatuses, a nineteenth image measurement apparatus comprising an operating unit for determining an azimuth of a measuring plane and/or a physical quantity indexing a shortest distance between the measuring plane and one observation point of predetermined two observation points, using a simple ratio $(p_{axis} p_R p_L)$, which is determined by three positions $p_{axis}$, $p_R$, $p_L$ of a measuring point, or an operation equivalent to said simple ratio, where $p_R$ and $p_L$ denote measuring positions through observation of said two observation points on an arbitrary measuring point appearing on an image obtained through viewing a predetermined measurement space from a predetermined observation point inside the measurement space, respectively, v denotes an optical axis direction coupling said two observation points, and $p_{axis}$ denotes a position of an infinite-point on a straight line extending in a direction identical to the optical axis direction v, including the measuring point.

In the nineteenth image measurement apparatus as mentioned above, said simple ratio $(p_{axis} p_R p_L)$ or the operation equivalent to said simple ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the nineteenth image measurement apparatus as mentioned above, it is acceptable that in said operating unit, as the positions $p_{axis}$, $p_R$, $p_L$ of the measuring point, positions projected on a sphere are adopted, and as said physical quantity indexing the shortest distance, a normalization shortest distance ${}_n d_s$, which is expressed by the following equation, is adopted, $$ {}_n d_a = d_s / \Delta x_{LR} $$

where $d_s$ denotes a shortest distance between the measuring plane and one observation point of said two observation points, and $\Delta x_{LR}$ denotes a distance between said two observation points, wherein said operating unit comprises:

a parameter altering unit for altering a parameter in which the normalization shortest distance ${}_nd_s$ is set up in form of the parameter;

a parameter operating unit for determining a radius R defined by the following equation or the equivalent equation;

$$R=\cos^{-1}({}_nd_s/(p_{axis}p_Rp_L))$$

using the normalization shortest distance ${}_nd_s$ set up in said parameter altering unit and the simple ratio $(p_{axis}p_Rp_L)$ or the operation equivalent to said simple ratio; and a small circle operating unit for determining a small circle of a radius R taking as a center a measuring position through observation on said measuring point from one observation point of said two observation points, wherein said parameter operating unit and said small circle operating unit repeatedly perform operations by a plurality of number of times on a plurality of measuring points in said measurement space, while the parameter is altered in said parameter altering unit, and said operating unit further comprises a detection unit for determining an azimuth $n_{s0}$ of a measuring plane including a plurality of measuring points associated with a plurality of small circles intersecting at a cross point and/or a normalization shortest distance ${}_nd_{s0}$ on the measuring plane in such a manner that cross points of small circles, which are formed when a plurality of small circles determined through a repetition of said parameter altering unit, said parameter operating unit and said small circle operating unit by a plurality of number of times are drawn on a small circle drawing space, are determined.

In this case, it is preferable that the measuring point appearing on the image has information as to intensity, said small circle operating unit determines said small circle, and of voting a value associated with intensity of a measuring point associated with said small circle for each point on a locus of the small circle, which is formed when the small circle thus determined is drawn on a small circle drawing space, said detection unit determines an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of execution of operations of said parameter operating unit and said small circle operating unit by a plurality of number of times offers a maximal value, instead of determining of the cross point, is determined.

It is also preferable that the measuring point appearing on the image has information as to intensity, said operating unit further comprises a fifth step of setting up a binocular parallax σ, which is a positional difference between the two measuring positions $p_R$ and $p_L$ through observation on said measuring point from said two observation points, in form of a second parameter, said parameter operating unit determines the radius R using the normalization shortest distance ${}_nd_s$ set up in said parameter altering unit, the position $p_{axis}$ of said infinite-point of the measuring point, the measuring position $p_R$ through observation on said measuring point from one observation point of said two observation points, and the binocular parallax σ, which is set up in said second parameter altering unit, said small circle operating unit determines said small circle associated with the measuring point, and determines a response intensity associated with the binocular parallax σ on the measuring point, and votes the response intensity associated with the binocular parallax σ of a measuring point associated with said small circle for each point on a locus of the small circle, which is formed when the small circle thus determined is drawn on a small circle drawing space, said parameter altering unit, said parameter operating unit, said small circle operating unit, said second parameter altering unit repeatedly perform operations by a plurality of number of times on a plurality of measuring points in said measurement space, while values of the parameters are altered in said parameter altering unit and said second parameter altering unit, and said detection unit determines an azimuth $n_{sR}$ of a measuring plane including a plurality of measuring points associated with a plurality of small circles joining a voting for a maximal point and/or a normalization shortest distance ${}_nd_{sR}$ on the measuring plane in such a manner that a maximal point wherein a value by a voting through a repetition of execution of operations of said parameter altering unit, said second parameter altering unit, said parameter operating unit and said small circle operating unit by a plurality of number of times offers a maximal value is determined, instead of determination of said cross point.

In the nineteenth image measurement apparatus as mentioned above, it is acceptable that in said operating unit, as the positions $p_{axis}$, $p_R$, $p_L$ of the measuring point, positions projected on a sphere are adopted, and as said physical quantity indexing the shortest distance, a normalization shortest distance ${}_nd_s$, which is expressed by the following equation, is adopted, $${}_nd_s=d_s/\Delta x_{LR}$$

where $d_s$ denotes a shortest distance between the measuring plane and one observation point of said two observation points, and $\Delta x_{LR}$ denotes a distance between said two observation points, wherein said operating unit comprises:

a first parameter altering unit for altering the position $p_{axis}$ of said infinite-point of the measuring point through altering a value of a first parameter in which the optical axis direction v is set up in form of the first parameter;

a second parameter altering unit for altering a value of a second parameter in which the normalization shortest distance ${}_nd_s$ is set up in form of the second parameter;

a parameter operating unit for determining a radius R defined by the following equation or the equivalent equation;

$$R=\cos^{-1}({}_nd_s/(p_{axis}p_Rp_L))$$

using the position $p_{axis}$ of said infinite-point of the measuring point, which is set up in said parameter altering unit, the normalization shortest distance ${}_nd_s$ set up in said second parameter altering unit and the simple ratio $(p_{axis}p_Rp_L)$ or the operation equivalent to said simple ratio; and a small circle operating unit for determining a small circle of a radius R taking as a center a measuring position through observation on said measuring point from one observation point of said two observation points wherein said parameter operating unit and said small circle operating unit repeatedly perform operations by a plurality of number of times on a plurality of measuring points in said measurement space, while values of the first and second parameters are altered in said first parameter altering unit and said second parameter altering unit, and said operating unit further comprises a detection unit for determining a true optical axis direction, and for determining an azimuth $n_{s0}$ of a measuring plane including a plurality of measuring points associated with a plurality of small circles intersecting at a cross point determined on a small circle drawing space associated with the true optical axis direction, and/or a a normalization shortest distance ${}_nd_{s0}$ on the measuring plane in such a manner that cross points of small circles, which are formed when a plurality of small circles determined through a repetition of execution of operations of said first parameter altering unit, said second parameter altering unit, said parameter operating unit and said small circle operating unit are drawn on an associated small circle drawing space of a plurality of small circle drawing spaces according to said first parameter, are determined on each small circle drawing space, and a small circle drawing space associated with the true optical axis direction relative to said observation point on said measuring point is selected in accordance with information as to a number of small circles intersecting at the cross points.

In this case, it is preferable that the measuring point appearing on the image has information as to intensity, said small circle operating unit determines said small circle, and votes a value associated with intensity of a measuring point associated with said small circle for each point on a locus of the small circle, which is formed when the small circle thus determined is drawn on a small circle drawing space, said detection unit determines a true optical axis direction, and determines an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_{s0}$ on the measuring plane in such a manner that a maximal point wherein a value by a voting through a repetition of execution of operations of said parameter operating unit and said small circle operating unit by a plurality of number of times offers a maximal value, instead of determining of the cross point, is determined on each small circle drawing space, and a small circle drawing space associated with the true optical axis direction is selected in accordance with information as to the maximal value on the maximal point.

It is also preferable that the measuring point appearing on the image has information as to intensity, said operating unit further comprises a third parameter altering unit for altering a value of a third parameter in which a binocular parallax σ, which is a positional difference between the two measuring positions $p_R$ and $p_L$ through observation on said measuring point from said two observation points, is set up in form of the third parameter, said parameter operating unit determines the radius R using the position $p_{axis}$ of said infinite-point of the measuring point, which is set up in said first parameter altering unit, the normalization shortest distance ${}_nd_s$ set up in the second parameter altering unit step, the measuring position $p_R$ through observation on said measuring point from one observation point of said two observation points, and the binocular parallax σ, which is set up in said parameter altering unit, said small circle operating unit determines said small circle associated with the measuring point, and determines a response intensity associated with the binocular parallax σ on the measuring point, and votes the response intensity associated with the binocular parallax σ of a measuring point associated with said small circle for each point on a locus of the small circle, which is formed when the small circle thus determined is drawn on a small circle drawing space associated with the small circle, said parameter operating unit and said small circle operating unit repeatedly perform operations by a plurality of number of times on a plurality of measuring points in said measurement space, while values of the parameters are altered in said first parameter operating unit, said second parameter operating unit and said third parameter operating unit, and said detection unit determines a true optical axis direction, and determines an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_{s0}$ on the measuring plane in such a manner that a maximal point wherein a value by a voting through a repetition of execution of operations of said first parameter altering unit, said second parameter altering unit, said third parameter altering unit, said parameter operating unit and said small circle operating unit by a plurality of number of times offers a maximal value, instead of determining of the cross point, is determined on each small circle drawing space, and a small circle drawing space associated with the true optical axis direction is selected in accordance with information as to the maximal value on the maximal point.

To achieve the above-mentioned objects, the present invention provides, of image measurement apparatuses, a twentieth image measurement apparatus comprising an operating unit for determining a physical quantity indexing a distance between an arbitrary measuring point appearing on an image obtained through viewing a predetermined measurement space from a predetermined observation point inside the measurement space and one observation point of predetermined two observation points, using a simple ratio $(p_{axis}p_Rp_L)$, which is determined by three positions $p_{axis}$, $p_R$, $p_L$ of the measuring point, or an operation equivalent to said simple ratio, where $p_R$ and $p_L$ denote measuring positions through observation of said two observation points on the measuring point, respectively, and $p_{axis}$ denotes a position of an infinite-point on a straight line extending in a direction identical to an optical axis direction v coupling said two observation points, including the measuring point.

In the twentieth image measurement apparatus as mentioned above, said simple ratio $(p_{axis}p_Rp_L)$ or the operation equivalent to said simple ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the twentieth image measurement apparatus as mentioned above, it is acceptable that as said physical quantity indexing the distance, a normalized distance ${}_nd_0$, which is expressed by the following equation, is adopted, $$ {}_nd_0 = d_0/\Delta x_{LR} $$

where $d_0$ denotes a distance between the measuring point and one observation point of said two observation points, and $\Delta x_{LR}$ denotes a distance between said two observation points, and said normalized distance ${}_nd_{s0}$ is determined in accordance with the following equation $$ {}_nd_0 = (p_{axis} p_R p_L) $$

or an equation equivalent to the above equation.

To achieve the above-mentioned objects, the present invention provides, of image measurement apparatuses, a twenty-first image measurement apparatus comprising:

a parameter setting unit for setting up coordinates in a voting space in form of a parameter, said coordinates being defined by a physical quantity indexing a distance between a measuring plane, including an arbitrary measuring point appearing on an image obtained through viewing a predetermined measuring space from predetermined two observation points in the measuring space and one observation point of said two observation points in an optical axis direction coupling said two observation points, and an azimuth of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ of an infinite-point on a straight line extending in a direction identical to the optical axis direction, including the measuring point, and the coordinates in the voting space, which is set up in said parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space, which is set up in said parameter setting unit;

wherein said binocular parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a twenty-second image measurement apparatus comprising:

a first parameter setting unit for setting up in form of a first parameter an optical axis direction v coupling predetermined two observation points through viewing a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up coordinates in a voting space according to the first parameter in form of a second parameter, said coordinates being defined by a physical quantity indexing a distance between a measuring plane, including the measuring point and one observation point of said two observation points in an optical axis direction, and an azimuth $n_s$ of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first parameter setting unit, and the coordinates in the voting space, which is set up in said second parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space according to the first parameter, said coordinates being set up in the second step, wherein said binocular parallax operating unit, said response intensity operating unit and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, a twenty-third image measurement apparatus comprising:

a parameter setting unit for setting up coordinates in a voting space in form of a parameter, said coordinates being defined by a physical quantity indexing a shortest distance between one observation point of predetermined two observation points inside a predetermined measurement space for observation of the measurement space and a measuring plane, including an arbitrary measuring point appearing on an image obtained through viewing the measurement space from the two observation points, and an azimuth $n_s$ of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of the two observation points, a position $p_{axis}$ of an infinite-point on a straight line extending in a direction identical to the optical axis direction, including the measuring point, and the coordinates in the voting space, which is set up in said parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space, which is set up in said parameter setting unit;

wherein said motion parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a twenty-fourth image measurement apparatus comprising:

a first parameter setting unit for setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up coordinates in a voting space according to the first parameter in form of a second parameter, said coordinates being defined by a physical quantity indexing a shortest distance from one observation point of the two observation points to a measuring plane including the measuring point, and an azimuth $n_s$ of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first parameter setting unit, and the coordinates in the voting space, which is set up in said second parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space according to the first parameter, said coordinates being set up in the second step, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, a twenty-fifth image measurement apparatus comprising:

a parameter setting unit for setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a coordinates operating unit for determining coordinates in a voting space, said coordinates being defined by a physical quantity indexing a distance between a measuring plane, including the measuring point and one observation point of said two observation points in an optical axis direction, and an azimuth $n_s$ of the measuring plane;

a response intensity operating unit for determining a response intensity associated with the binocular parallax σ of the measuring point, which is set up in said parameter setting unit; in accordance with two images obtained through viewing the measurement space from said two observation points; and a voting unit for voting the response intensity determined in said response intensity operating unit for the coordinates in the voting space, said coordinates being set up in the second step, wherein said motion parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a twenty-sixth image measurement apparatus comprising:

a first parameter setting unit for setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up in form of a second parameter a binocular parallax σ, which is a positional difference between two measuring positions $p_R$ and $p_L$ through observation on said measuring point from said two observation points;

a coordinates operating unit for determining coordinates in a voting space according to the first parameter, said coordinates being defined by a physical quantity indexing a distance between a measuring plane, including the measuring point and one observation point of said two observation points in an optical axis direction, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a response intensity operating unit for determining a response intensity associated with the binocular parallax σ of the measuring point, which is set up in the second step, in accordance with two images obtained through viewing the measurement space from said two observation points; and a voting unit for voting the response intensity determined in said response intensity operating unit for the coordinates in the voting space according to the first parameter, said coordinates being set up in the third step, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, a twenty-seventh image measurement apparatus comprising:

a parameter setting unit for setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a coordinates operating unit for determining coordinates in a voting space, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of said two observation points, a position $p_{axis}$ of an infinite-point on a straight line extending in a direction identical to the optical axis direction, including the measuring point, and the binocular parallax σ set up in the first step;

a response intensity operating unit for determining a response intensity associated with the binocular parallax σ of the measuring point, which is set up in said parameter setting unit, in accordance with two images obtained through viewing the measurement space from said two observation points; and a voting unit for voting the response intensity determined in said response intensity operating unit for the coordinates in the voting space, said coordinates being set up in the second step, wherein said motion parallax operating unit, said response intensity operating unit, and said voting unit perform operations by a plurality of number of times on a plurality of measuring points in the measurement space, while a value of the parameter is altered in said parameter setting unit.

To achieve the above-mentioned objects, the present invention provides, of image measurement apparatuses, a twenty-eighth image measurement apparatus comprising:

a first parameter setting unit for setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up in form of a second parameter a binocular parallax σ, which is a positional difference between two measuring positions $p_R$ and $p_L$ through observation on said measuring point from said two observation points;

a coordinates operating unit for determining coordinates in a voting space according to the first parameter, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of the two observation points, a position $p_{axis}$ set up in the first parameter setting unit, and the binocular parallax σ set up in the second parameter setting unit;

a response intensity operating unit for determining a response intensity associated with the binocular parallax σ of the measuring point, which is set up in the second parameter setting unit, in accordance with two images obtained through viewing the measurement space from said two observation points; and a voting unit for voting the response intensity determined in said response intensity operating unit for the coordinates in the voting space according to the first parameter, said coordinates being set up in said response intensity operating unit, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

To achieve the above-mentioned objects, the present invention provides, of image measurement apparatuses, a twenty-ninth image measurement apparatus comprising:

a response intensity operating unit for determining a response intensity associated with a binocular parallax, which is a positional difference between two measuring positions through observation of predetermine two observation points on an arbitrary measuring point in a predetermined measurement space, in accordance with two images obtained through viewing the measurement space from said two observation points; and a voting unit for voting the response intensity determined in said response intensity operating unit for coordinates associated with the measuring point and the binocular parallax in a voting space, said coordinates being defined by a physical quantity indexing a distance between a measuring plane, including the measuring point, and one observation point of said two observation points in an optical axis direction coupling said two observation points, and an azimuth of the measuring plane;

wherein said response intensity operating unit said voting unit perform operations by a plurality of number of times on a plurality of measuring points in the measurement space.

In the twenty-ninth image measurement apparatus as mentioned above, it is acceptable that said image measurement apparatus further comprises a detecting unit for determining an azimuth of a measuring plane including a plurality of measuring points joining a voting for a maximal point and/or a physical quantity indexing a distance between the measuring plane and one observation point of said two observation points in the optical axis direction in such a manner that a maximal point wherein a value by said voting in the voting space offers a maximal value is determined.

To achieve the above-mentioned objects, the present invention provides, of image measurement apparatuses, a thirtieth image measurement apparatus comprising:

a parameter setting unit for setting up in form of a parameter an optical axis direction coupling predetermined two observation points for observation of a predetermined measurement space;

a response intensity operating unit for determining a response intensity associated with a binocular parallax, which is a positional difference between two measuring positions through observation on an arbitrary measuring point in the measurement space from said two observation points, in accordance with two images obtained through viewing the measurement space from said two observation points; and a voting unit for voting the response intensity determined in said response intensity operating unit for coordinates associated with the measuring point and the binocular parallax in a voting space according to the parameter set up in the first parameter setting unit, said coordinates being defined by a physical quantity indexing a distance between a measuring plane, including the measuring point and one observation point of said two observation points in the optical axis direction, and an azimuth of the measuring plane;

wherein said response intensity operating unit and said voting unit perform operations by a plurality of number of times on a plurality of measuring points in the measurement space, while a value of the parameter is altered in said parameter setting unit In the thirtieth image measurement apparatus as mentioned above, it is acceptable that said image measurement apparatus further comprises a detection unit for determining a true optical axis direction, and for determining an azimuth of a measuring plane including a plurality of measuring points joining a voting for a maximal point determined on a voting space associated with the true optical axis direction, and/or a physical quantity indexing a physical quantity indexing a distance between the measuring plane and one observation point of said two observation points in the true optical axis direction, in such a manner that a maximal point wherein a value by a voting is determined on each voting space, and the voting space associated with the true optical axis direction is selected in accordance with information as to the maximal value on the maximal point.

To achieve the above-mentioned objects, the present invention provides, of image measurement apparatuses, a thirty-first image measurement apparatus comprising:

a response intensity operating unit for determining a response intensity associated with a binocular parallax σ, which is a positional difference between two measuring positions through observation on an arbitrary measuring point in a measurement space from predetermined two observation points, in accordance with two images obtained through viewing the measurement space from said two observation points; and a voting unit for voting the response intensity determined in said response intensity operating unit for coordinates associated with the measuring point and the binocular parallax σ in a voting space, said coordinates being defined by a physical quantity indexing a shortest distance between one observation point of the two observation points and a measuring plane, including the measuring point, and an azimuth of the measuring plane;

wherein said response intensity operating unit and said voting unit perform operations by a plurality of number of times on a plurality of measuring points in the measurement space.

In the thirty-first image measurement apparatus as mentioned above, it is acceptable that said image measurement apparatus further comprises a detection unit for determining an azimuth $n_s$ of a measuring plane including a plurality of measuring points joining a voting for a maximal point and/or a physical quantity indexing a shortest distance between one observation point of said two observation points and the measuring plane in such a manner that a maximal point wherein a value by said voting offers a maximal value is determined in the voting space.

To achieve the above-mentioned objects, the present invention provides, of image measurement apparatuses, a thirty-second image measurement apparatus comprising:

a parameter setting unit for setting up in form of a parameter an optical axis direction coupling predetermined two observation points for observation of a predetermined measurement space;

a response intensity operating unit for determining a response intensity associated with a binocular parallax, which is a positional difference between two measuring positions through observation on said measuring point from said two observation points, in accordance with two images obtained through viewing the measurement space from said two observation points; and a voting unit for voting the response intensity determined in the second step for coordinates associated with the measuring point and the binocular parallax in a voting space according to the parameter set up in said parameter setting unit, said coordinates being defined by a physical quantity indexing a shortest distance between one observation point of said two observation points and a measuring plane including the measuring point, and an azimuth of the measuring plane;

wherein said response intensity operating unit and said voting unit perform operations by a plurality of number of times on a plurality of measuring points in the measurement space, while a value of the parameter is altered in said parameter setting unit.

In the thirty-second image measurement apparatus as mentioned above, it is acceptable that said image measurement apparatus further comprises a detection unit for determining a true optical axis direction, and for determining an azimuth of a measuring plane including a plurality of measuring points joining a voting for a maximal point determined on a voting space associated with the true optical axis direction, and/or a shortest distance between one observation point of said two observation points and the measuring plane, in such a manner that a maximal point wherein a value by said voting offers a maximal value is determined on each voting space, and a voting space associated with the true optical axis direction relative to the observation point on the measuring point is selected in accordance with information as to the maximal value on the maximal point.

To achieve the above-mentioned objects, the present invention provides, of image measurement program storage media, a first image measurement program storage medium storing an image measurement program for determining an azimuth of a measuring plane and/or a physical quantity indexing a superposing time in which the measuring plane is superposed on a predetermined observation point, using a compound ratio $\{p_{inf}p_0p_1p_c\}$, which is determined by four positions $p_{inf}$, $p_0$, $p_1$, $p_c$ of a measuring point, or an operation equivalent to said compound ratio, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, and $p_c$ denotes a position of the measuring point at a superposing time in which a measuring plane including the measuring point is superposed on the observation point in the moving continuous state.

In the first image measurement program storage medium as mentioned above, said compound ratio $\{p_{inf}p_0p_1p_c\}$ or the operation equivalent to said compound ratio, which are executed by said image measurement program, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the first image measurement program storage medium as mentioned above, it is acceptable that in said image measurement program, as said physical quantity indexing the superposing time, a normalized time ${}_nt_c$, which is expressed by the following equation, is adopted, $${}_nt_c = t_c/\Delta t$$

where $t_c$ denotes a time between the one measuring time of said two measuring times and said superposing time, and $\Delta t$ denotes a time between said two measuring times, and said normalized time ${}_nt_c$ is determined in accordance with the following equation $${}_nt_c = \{p_{inf}p_0p_1p_c\}$$

or an equation equivalent to the above equation.

In the first image measurement program storage medium as mentioned above, it is acceptable that said image measurement program comprises:

a first step of setting up the physical quantity indexing the superposing time in form of a parameter;

a second step of determining the position $p_c$ of the measuring point at the superposing time, using said compound ratio $\{p_{inf}p_0p_1p_c\}$ or the operation equivalent to said compound ratio, in accordance with the physical quantity indexing the superposing time set up in the first step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state; and a third step of determining a polar line associated with the measuring point through a polar transformation of the position $p_c$ of the measuring point at the superposing time, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing a superposing time in which the measuring plane is superposed on the observation point in such a manner that cross points of polar lines, which are formed when a plurality of polar lines determined through a repetition of said first to third steps by a plurality of number of times are drawn on a polar line drawing space, are determined.

In this case, it is preferable that the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement program further comprises a fifth step of setting up a motion parallax $\tau$, which is a positional difference between the two measuring positions $p_0$ and $p_1$ at the two measuring times on the measuring point, in the form of a second parameter, said second step is a step of determining the position $p_c$ of the measuring point at the superposing time using the physical quantity indexing the superposing time, which is set up in said first step, the measuring position $p_0$ at one measuring time of said two measuring times on said measuring point, the motion parallax $\tau$, which is set up in said fifth step, and the position $p_{inf}$ of the measuring point after an infinite time elapses in the moving continuous state, said third step is a step of determining a polar line associated with the measuring point, and determining a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of said first, fifth, second and third steps by a plurality of number of times offers a maximal value is determined, instead of determination of said cross point.

In the first image measurement program storage medium as mentioned above, it is acceptable that said image measurement program comprises:

a first step of setting up the position $p_{inf}$ of the measuring point after an infinite time elapses in the moving continuous state through setting up the moving direction v in form of a first parameter;

a second step of setting up the physical quantity indexing the superposing time in form of a second parameter;

a third step of determining the position $p_c$ of the measuring point at the superposing time, using said compound ratio $\{p_{inf}p_0p_1p_c\}$ or the operation equivalent to said compound ratio, in accordance with the position $p_{inf}$ set up in said first step, the physical quantity indexing the superposing time set up in the second step, and the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point; and a fourth step of determining a polar line associated with the measuring point through a polar transformation of the position $p_c$ of the measuring point at the superposing time, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true moving direction, and of determining an azimuth of a measuring plane including a plurality of measuring points associated with a plurality of polar lines intersecting at a cross point determined on a polar line drawing space associated with the true moving direction, and/or a physical quantity indexing a superposing time in which the measuring plane is superposed on the observation point in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true moving direction relative to said observation point on said measuring point is selected in accordance with information as to a number of polar lines intersecting at the cross points.

In this case, it is preferable that the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of said first to fourth steps offers a maximal value, instead of determining of the cross point, is determined on each polar line drawing space, and a polar line drawing space associated with the true moving direction is selected in accordance with information as to a maximal value at the maximal point.

It is also preferable the measuring point appearing on the image has information as to intensity, said image measurement program further comprises a sixth step of setting up a motion parallax τ, which is a positional difference between the two measuring positions $p_0$ and $p_1$ at the two measuring times on the measuring point, in the form of a third parameter, said third step is a step of determining the position $p_c$ of the measuring point at the superposing time using the position $p_{inf}$, which is set up in said first step, the physical quantity indexing the superposing time, which is set up in said second step, the measuring position $p_0$ at one measuring time of said two measuring times on said measuring point, and the motion parallax τ, which is set up in said sixth step, said fourth step is a step of determining a polar line associated with the measuring point, and determining a response intensity associated with the motion parallax τ on the measuring point, and of voting the response intensity associated with the motion parallax τ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters ate altered in said second step and said sixth step, and said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true moving direction is selected in accordance with information as to a maximal value at the maximal point.

To achieve the above-mentioned objects, the present invention provides, of image measurement program storage media, a second image measurement program storage medium storing an image measurement program for determining an azimuth $n_s$ of a measuring plane and/or a physical quantity indexing a shortest distance from a predetermined observation point to the measuring plane at one measuring time of two measuring times, using a compound ratio $\{p_{inf}p_0p_1p_c\}$, which is determined by four positions $p_{inf}$, $p_0$ $p_1$, $p_c$ of a measuring point, or an operation equivalent to said compound ratio, and an inner product $(n_s \cdot v)$ of the azimuth $n_s$ of the measuring plane and a moving direction v, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, $p_c$ denotes a position of the measuring point at a superposing time in which a measuring plane including the measuring point is superposed on the observation point in the moving continuous state, and $n_s$ denotes the azimuth of the measuring plane.

In the second image measurement program storage medium as mentioned above, said compound ratio $\{p_{inf}p_0p_1p_c\}$ or the operation equivalent to said compound ratio, which are executed by said image measurement program, include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$, at the two measuring times on the measuring point.

In the second image measurement program storage medium as mentioned above, it is acceptable that in said image measurement program, as the physical quantity indexing the shortest distance, a normalization shortest distance ${}_nd_s$, which is expressed by the following equation, is adopted, $${}_nd_s = d_s/\Delta x$$

and said normalization shortest distance ${}_nd_s$ is determined in accordance with the following equation, $${}_nd_s = {}_nt_c(n_s \cdot v)$$

using a normalized time ${}_nt_c$, which is expressed by the following equation, and the inner product $(n_s \cdot v)$ $${}_nt_c = t_c/\Delta t$$

where $d_s$ denotes a shortest distance between the observation point and the measuring plane at one measuring time of said two measuring times, $t_c$ denotes a time between the one measuring time of said two measuring times and said superposing time, Δx denotes a moving distance of the measuring point, which is relative to the observation point, between said two measuring times, and Δt denotes a time between said two measuring times.

In the second image measurement program storage medium as mentioned above, it is acceptable that said image measurement program comprises:

a first step of setting up the physical quantity indexing the shortest distance in form of a first parameter;

a second step of setting up the inner product $(n_s \cdot v)$ in form of a second parameter;

a third step of determining the position $p_c$ of the measuring point at the superposing time, using said compound ratio $\{p_{inf}p_0p_1p_c\}$ or the operation equivalent to said compound ratio, in accordance with the physical quantity indexing the shortest distance set up in the first step, the inner product $(n_s \cdot v)$ set up in the second step, the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state;

a fourth step of determining a polar line associated with the position $p_c$ of the measuring point at the superposing time through a polar transformation of the position $p_c$, and a fifth step of determining a point on the polar line, said point being given with an angle r with respect to the moving direction v, $$r = \cos^{-1}(n_s \cdot v)$$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance from said observation point to the measuring plane at one measuring time of the two measuring times in such a manner that cross points of curved lines, which are formed when a plurality of curved lines determined through a repetition of said first to fifth steps by a plurality of number of times are drawn on a curved line drawing space, are determined.

In this case, it is preferable that the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of said first to fifth steps by a plurality of number of times offers a maximal value, instead of determining of the cross point, is determined.

It is also preferable that the measuring point appearing on the image has information as to intensity, said image measurement program further comprises a seventh step of setting up a motion parallax τ, which is a positional difference between the two measuring positions $p_0$ and $p_1$ at the two measuring times on the measuring point, in the form of a third parameter, said third step is a step of determining the position $p_c$ of the measuring point at the superposing time using the physical quantity indexing the shortest distance set up in the first step, the inner product $(n_s \cdot v)$ set up in the second step, the measuring position $p_0$ at one measuring time of said two measuring times on said measuring point, the motion parallax τ, which is set up in said seventh step, and the position $p_{inf}$ of the measuring point after an infinite time elapses in the moving continuous state, said fifth step is a step of determining said point on a polar line associated with the measuring point, and determining a response intensity associated with the motion parallax τ on the measuring point, and of voting the response intensity associated with the motion parallax τ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of said first, second, seventh and third to fifth steps by a plurality of number of times offers a maximal value is determined, instead of determination of said cross point.

In the second image measurement program storage medium as mentioned above, it is acceptable that said image measurement program comprises:

a first step of setting up the position $p_{inf}$ of the measuring point after an infinite time elapses in the moving continuous state through setting up the moving direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the measuring point at the superposing time, using said compound ratio $\{p_{inf}p_0p_1p_c\}$ or the operation equivalent to said compound ratio, in accordance with the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, and the two measuring positions $p_0$ and $p_1$ of the measuring point at the two measuring times or the measuring position $p_0$ at one measuring time of said two measuring times on said measuring point and a motion parallax τ, which is a positional difference between the two measuring positions. $p_0$ and $p_1$ at the two measuring times on the measuring point, instead of the two measuring positions $p_0$ and $p_1$ at the two measuring times on the measuring point,; and a fifth step of determining a polar line associated with the position $p_c$ of the measuring point at the superposing time through a polar transformation of the position $p_c$, and a sixth step of determining a point on the polar line, said point being given with an angle r with respect to the moving direction v, $$r=\cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true moving direction, and of determining an azimuth $n_s$ of a measuring plane including a plurality of measuring points associated with a plurality of curved lines intersecting at a cross point determined on a curved line drawing space associated with the true moving direction, and/or a physical quantity indexing a shortest distance from the observation point to the measuring plane at one measuring time of the two measuring times in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true moving direction relative to said observation point on said measuring point is selected in accordance with information as to a number of curved lines intersecting at the cross points.

In this case, it is preferable that the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of said first to sixth steps offers a maximal value, instead of determining of the cross point, is determined on each curved line drawing space, and a curved line drawing space associated with the true moving direction is selected in accordance with information as to a maximal value at the maximal point.

It is also preferable that the measuring point appearing on the image has information as to intensity, said image measurement program further comprises a eighth step of setting up a motion parallax $\tau$, which is a positional difference between the two measuring positions $p_0$ and $p_1$ at the two measuring times on the measuring point, in the form of a fourth parameter, said fourth step is a step of determining the position $p_c$ of the measuring point at the superposing time using the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, the measuring position $p_0$ at one measuring time of said two measuring times on said measuring point, and a motion parallax $\tau$, which is set up in said eighth step, said sixth step is a step of determining said point associated with the measuring point, and determining a response intensity associated with the motion parallax $\tau$ on the measuring point, and of voting the response intensity associated with the motion parallax $\tau$ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true moving direction is selected in accordance with information as to a maximal value at the maximal point.

To achieve the above-mentioned objects, the present invention provides, of image measurement program storage media, a third image measurement program storage medium storing an image measurement program for determining an azimuth of a measuring plane and/or a physical quantity indexing a shortest distance from a predetermined observation point to the measuring plane at one measuring time of two measuring times, using a simple ratio$(p_{inf} p_0 p_1)$, which is determined by three positions $p_{inf}$, $p_0$, $p_1$ of a measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

In the third image measurement program storage medium as mentioned above, said simple ratio $(p_{inf} p_0 p_1)$ or the operation equivalent to said simple ratio, which are executed by said image measurement program, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the third image measurement program storage medium as mentioned above, it is acceptable that in said image measurement program, as the positions $p_{inf}$, $p_0$, $p_1$ of the measuring point, positions projected on a sphere are adopted, and as said physical quantity indexing the shortest distance, a normalization shortest distance $_n d_s$ which is expressed by the following equation, is adopted, $$_n d_s = d_s \Delta x$$

where $d_s$ denotes a shortest distance between the observation point and the measuring plane at one measuring time of said two measuring times, and $\Delta x$ denotes a moving distance of the measuring point, which is relative to the observation point, between said two measuring times, a first step of setting up the normalization shortest distance $_n d_s$ in form of a parameter;

a second step of determining a radius R defined by the following equation or the equivalent equation;

$$R = \cos^{-1}(_n d_s / (p_{inf} p_0 p_1))$$

using the normalization shortest distance $_n d_s$ set up in the first step and the simple ratio $(p_{inf} p_0 p_1)$ or the operation equivalent to said simple ratio, and a third step of determining a small circle of a radius R taking as a center a measuring position of the measuring point at one measuring time of said two measuring times, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance $_n d_{s0}$ on the measuring plane in such a manner that cross points of small circles, which are formed when a plurality of small circles determined through a repetition of said first to third steps by a plurality of number of times are drawn on a small circle drawing space, are determined.

In this case, it is preferable that the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement program further comprises a fifth step of setting up a motion parallax $\tau$, which is a positional difference between the two measuring positions $p_0$ and $p_1$ at the two measuring times on the measuring point, in form of a second parameter, said second step is a step of determining the radius R using the normalization shortest distance $_nd_s$ set up in the first step, the position $p_{inf}$ of the measuring point after an infinite time elapses in the moving continuous state, the measuring position $p_0$ at one measuring time of said two measuring times on said measuring point, and the motion parallax $\tau$, which is set up in said fifth step, said third step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of said first, fifth, second and third steps by a plurality of number of times offers a maximal value is determined, instead of determination of said cross point.

In the third image measurement program storage medium as mentioned above, it is acceptable that in said image measurement program, as the positions $p_{inf}$, $p_0$, $p_1$ of the measuring point, positions projected on a sphere are adopted, and as said physical quantity indexing the shortest distance, a normalization shortest distance $_nd_s$, which is expressed by the following equation, is adopted, $$_nd_s = d_s/\Delta x$$

where $d_s$ denotes a shortest distance between the observation point and the measuring plane at one measuring time of said two measuring times, and $\Delta x$ denotes a moving distance of the measuring point, which is relative to the observation point, between said two measuring times, a first step of setting up the position $p_{inf}$ of the measuring point after an infinite time elapses in the moving continuous state through setting up the moving direction v in form of a first parameter;

a second step of setting up the normalization shortest distance $_nd_s$ in form of a second parameter;

a third step of determining a radius R defined by the following equation or the equivalent equation;

$$R = \cos^{-1}({}_nd_s/(p_{inf}p_0p_1))$$

using the position $p_{inf}$ of the measuring point after an infinite time elapses in the moving continuous state, which is set up in the first step, the normalization shortest distance $_nd_s$ set up in the second step and the simple ratio $(p_{inf}p_0p_1)$ or the operation equivalent to said simple ratio, and a fourth step of determining a small circle of a radius R taking as a center a measuring position of the measuring point at one measuring time of said two measuring times, wherein said third step and said fourth step are repeated by a plurality of number of times on a plurality of measuring points in said measurement space, while values of the first and second parameters are altered in said first step and said second step, and thereafter, effected is a fifth step of determining a true moving direction, and of determining an azimuth $n_{s0}$ of a measuring plane including a plurality of measuring points associated with a plurality of small circles intersecting at a cross point determined on a small circle drawing space associated with the true moving direction, and/or a a normalization shortest distance $_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true moving direction relative to said observation point on said measuring point is selected in accordance with information as to a number of small circles intersecting at the cross points.

In this case, it is preferable that the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance ${}_nd_{s0}$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true moving direction is selected in accordance with information as to the maximal value on the maximal point.

It is also preferable that the measuring point appearing on the image has information as to intensity, said image measurement program further comprises a sixth step of setting up a motion parallax $\tau$, which is a positional difference between the two measuring positions $p_0$ and $p_1$ at the two measuring times on the measuring point, in form of a third parameter, said second step is a step of determining the radius R using the position $p_{inf}$ of the measuring point after an infinite time elapses in the moving continuous state, which is set up in said first step, the normalization shortest distance ${}_nd_s$ set up in the second step, the measuring position $p_0$ at one measuring time of said two measuring times on said measuring point, and the motion parallax $\tau$, which is set up in said fifth step, said fourth step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance ${}_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true moving direction is selected in accordance with information as to the maximal value on the maximal point.

To achieve the above-mentioned objects, the present invention provides, of image measurement program storage media, a fourth image measurement program storage medium storing an image measurement program for determining a physical quantity indexing a distance between a predetermined observation point and a measuring point at one measuring time of two measuring times, using a simple ratio $(p_{inf}p_0p_1)$, which is determined by three positions $p_{inf}$, $p_0$, $p_1$ of the measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

In the fourth image measurement program storage medium as mentioned above, said simple ratio $(p_{inf}p_0p_1)$ or the operation equivalent to said simple ratio, which are executed by said image measurement program, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

In the fourth image measurement program storage medium as mentioned above, it is acceptable that in said image measurement program, as the physical quantity indexing the distance, a normalized distance ${}_nd_0$, which is expressed by the following equation, is adopted, $$ {}_nd_0=d_0/\Delta x $$

where $d_0$ denotes a distance between the observation point and the measuring point at one measuring time of the two measuring times, and $\Delta x$ denotes a moving distance of the measuring point between said two measuring times with respect to the observation point, and said normalized distance ${}_nd_{s0}$ is determined in accordance with the following equation $$ {}_nd_0=(p_{inf}p_0p_1) $$

or an equation equivalent to the above equation.

To achieve the above-mentioned objects, the present invention provides, of image measurement program storage media, a fifth image measurement program storage medium storing an image measurement program comprising:

a first step of setting up coordinates in a voting space in form of a parameter, said coordinates being defined by a physical quantity indexing a superposing time in which a measuring plane, including an arbitrary measuring point appearing on an image obtained through viewing a predetermined measurement space from a predetermined observation point inside the measurement space, is superposed on the observation point, and an azimuth $n_s$ of the measuring plane, in a moving continuous state wherein it is expected that a movement of the measuring point appearing on an image obtained through viewing the measurement space from the observation point inside the measurement space, said measuring point being relative with respect to the observation point, is continued in a direction identical to a moving direction relative with respect to the observation point between mutually different two measuring times on the measuring point and at a velocity identical to a moving velocity between said two measuring times;

a second step of determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ of the measuring point after an infinite time elapses in the moving continuous state, and the coordinates in the voting space, which is set up in the first step;

a third step of determining a response intensity associated with the motion parallax τ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a sixth image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a superposing time in which a measuring plane including the measuring point is superposed on the observation point, and an azimuth $n_s$ of the measuring plane;

a third step of determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax τ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a seventh image measurement program storage medium storing an image measurement program comprising:

a first step of setting up coordinates in a voting space in form of a parameter, said coordinates being defined by a physical quantity indexing a shortest distance between a predetermined observation point inside a predetermined measurement space for observation of the measurement space and a measuring plane, including an arbitrary measuring point appearing on an image obtained through viewing the measurement space from the observation point inside the measurement space, at one measuring time of mutually different two measuring times, and an azimuth $n_s$ of the measuring plane;

a second step of determining a motion parallax τ, which is a positional difference between two measuring positions $p_0$ and $p_1$ at the two measuring times on the measuring point, in accordance with a measuring position $p_0$ at one measuring time of the two measuring times on the measuring point, a position $p_{inf}$ of the measuring point after an infinite time elapses in a moving continuous state wherein it is expected that a movement of the measuring point is continued in a direction identical to a moving direction relative with respect to the observation point between mutually different two measuring times and at a velocity identical to a moving velocity between said two measuring times, and the coordinates in the voting space, which is set up in the first step;

a third step of determining a response intensity associated with the motion parallax τ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, an eighth image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a shortest distance from the observation point to a measuring plane including the measuring point at one measuring time of the two measuring times, and an azimuth $n_s$ of the measuring plane;

a third step of determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax $\tau$ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a ninth image measurement program storage medium storing an image measurement program comprising:

a first step of setting up in form of a parameter a motion parallax $\tau$, which is a positional difference between two measuring positions $p_0$ and $p_1$ at mutually different two measuring times, of an arbitrary measuring point appearing on an image obtained through viewing a predetermined measurement space from a predetermined observation point inside the measurement space;

a second step of determining coordinates in a voting space, said coordinates being defined by a physical quantity indexing a superposing time in which a measuring plane, including the measuring point, is superposed on the observation point, and an azimuth $n_s$ of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, in accordance with a measuring position $p_0$ at one measuring time of said two measuring times on said measuring point, a position $p_{inf}$ of the measuring point after an infinite time elapses in the moving continuous state, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a tenth image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a superposing time in which a measuring plane, including the measuring point, is superposed on the observation point, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, an eleventh image measurement program storage medium storing an image measurement program comprising:

a first step of setting up in form of a parameter a motion parallax $\tau$, which is a positional difference between two measuring positions $p_0$ and $p_1$ at mutually different two measuring times on the measuring point, of an arbitrary measuring point appearing on an image obtained through viewing a predetermined measurement space from a predetermined observation point inside the measurement space;

a second step of determining coordinates in a voting space, said coordinates being defined by a physical quantity indexing a shortest distance from the observation point to a measuring plane including the measuring point at one measuring time of the two measuring times, and an azimuth $n_s$ of the measuring plane, in accordance with a measuring position $p_0$ at one measuring time of said two measuring times on said measuring point, a position $p_{inf}$ of the measuring point after an infinite time elapses in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a twelfth image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a shortest distance from the observation point to a measuring plane including the measuring point at one measuring time of the two measuring times, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a thirteenth image measurement program storage medium storing an image measurement program comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the first step and the second step are effected by a plurality of number of times on a plurality of measuring points in the measurement space.

In the thirteenth image measurement program storage medium as mentioned above, it is acceptable that said image measurement program further comprises a third step of determining an azimuth of a measuring plane including a plurality of measuring points joining a voting for a maximal point and/or a physical quantity indexing a superposing time in which the measuring plane is superposed on the observation point in such a manner that a maximal point wherein a value by said voting in the voting space offers a maximal value is determined.

To achieve the above-mentioned objects, the present invention provides, of image measurement program storage media, a fourteenth image measurement program storage medium storing an image measurement program comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the second step and the third step, of the first to third steps, are effected by a plurality of number of times on a plurality of measuring points in the measurement space, while a value of the parameter is altered in the first step.

In the fourteenth image measurement program storage medium as mentioned above, it is acceptable that said image measurement program further comprises a fourth step of determining a true moving direction relative to the observation point on the measuring point, and of determining an azimuth of a measuring plane including a plurality of measuring points joining a voting for a maximal point determined on a voting space associated with the true moving direction, and/or a physical quantity indexing a superposing time in which the measuring plane is superposed on the observation point, in such a manner that a maximal point wherein a value by a voting is determined on each voting space, and the voting space associated with the true moving direction is selected in accordance with information as to the maximal value on the maximal point.

To achieve the above-mentioned objects, the present invention provides, of image measurement program storage media, a fifteenth image measurement program storage medium storing an image measurement program comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a shortest distance from the observation point to a measuring plane, including the measuring point, at one measuring time of the two measuring times, and an azimuth of the measuring plane;

wherein the first step and the second step are effected by a plurality of number of times on a plurality of measuring points in the measurement space.

In the fifteenth image measurement program storage medium as mentioned above, it is acceptable that said image measurement program further comprises a third step of determining an azimuth of a measuring plane including a plurality of measuring points joining a voting for a maximal point and/or a physical quantity indexing a shortest distance from the observation point to the measuring plane at one measuring time of the two measuring times in such a manner that a maximal point wherein a value by said voting offers a maximal value is determined in the voting space.

To achieve the above-mentioned objects, the present invention provides, of image measurement program storage media, a sixteenth image measurement program storage medium storing an image measurement program comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a shortest distance from the observation point to the measuring plane at one measuring time of the two measuring times, including the measuring point, and an azimuth of the measuring plane;

wherein the second step and the third step, of the first to third steps, are effected by a plurality of number of times on a plurality of measuring points in the measurement space, while a value of the parameter is altered in the first step.

In the sixteenth image measurement program storage medium as mentioned above, it is acceptable that said image measurement program further comprises a fourth step of determining a true moving direction, and of determining an azimuth of a measuring plane including a plurality of measuring points joining a voting for a maximal point determined on a voting space associated with the true moving direction, and/or a shortest distance from the observation point to the measuring plane at one measuring time of the two measuring times, in such a manner that a maximal point wherein a value by said voting offers a maximal value is determined on each voting space, and a voting space associated with the true moving direction relative to the observation point on the measuring point is selected in accordance with information as to the maximal value on the maximal point.

To achieve the above-mentioned objects, the present invention provides, of image measurement program storage media, a seventeenth image measurement program storage medium storing an image measurement program for determining an azimuth of a measuring plane and/or a physical quantity indexing a distance between the measuring plane and one observation point of predetermined two observation points in an optical axis direction v coupling said two observation points, using a compound ratio $\{p_{axis}\, p_R p_L p_c\}$, which is determined by four positions $p_{axis}$, $p_R$, $p_L$, $p_c$, or an operation equivalent to said compound ratio, where $p_R$ and $p_L$ denote measuring positions through observation of said two observation points on an arbitrary measuring point appearing on an image obtained through viewing a predetermined measurement space from said two observation points inside the measurement space, respectively, $p_{axis}$ denotes a position of an infinite-point on a straight line extending in a direction identical to the optical axis direction v, including the measuring point, and $p_c$ denotes a position of an intersection point with said straight line on an observation plane extending in parallel to a measuring plane including the measuring point, including one observation point of said two observation points.

In the seventeenth image measurement program storage medium as mentioned above, said compound ratio $\{p_{axis} p_R p_L p_c\}$ or the operation equivalent to said compound ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the seventeenth image measurement program storage medium as mentioned above, it is acceptable that in said image measurement program, as the physical quantity indexing a distance between the measuring plane and one observation point of said two observation points in the optical axis direction, a normalized distance ${}_nd_c$, which is expressed by the following equation, is adopted, $${}_nd_c = d_c/\Delta x_{LR}$$

where $d_c$ denotes a distance between the measuring plane and one observation point of said two observation points in the optical axis direction, and $\Delta x_{LR}$ denotes a distance between said two observation points, and said normalized distance ${}_nd_c$ is determined in accordance with the following equation $${}_nd_c = \{p_{axis} p_R p_L p_c\}$$

or an equation equivalent to the above equation.

In the seventeenth image measurement program storage medium as mentioned above, it is acceptable that said image measurement program comprising:

a first step of setting up the physical quantity indexing a distance between the measuring plane and one observation point of said two observation points in the optical axis direction in form of a parameter;

a second step of determining the position $p_c$ of the intersection point on the observation plane, using said compound ratio $\{p_{axis} p_R p_L p_c\}$ or the operation equivalent to said compound ratio, in accordance with the physical quantity indexing a distance between the measuring plane and one observation point of said two observation points in the optical axis direction set up in the first step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point; and a third step of determining a polar line associated with the measuring point through a polar transformation of the position $p_c$ of the intersection point on the observation plane, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing said physical quantity indexing a distance between the measuring plane and one observation point of said two observation points in the optical axis direction in such a manner that cross points of polar lines, which are formed when a plurality of polar lines determined through a repetition of said first to third steps by a plurality of number of times are drawn on a polar line drawing space, are determined.

In this case, it is preferable that the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement program further comprises a fifth step of setting up a binocular parallax σ, which is a positional difference between the two measuring positions $p_R$ and $p_L$ through observation on said measuring point from said two observation points, in the form of a second parameter, said second step is a step of determining the position $p_c$ of the intersection point on the observation plane using the physical quantity indexing a distance between the measuring plane and one observation point of said two observation points in the optical axis direction which is set up in said first step, the measuring position $p_R$ through observation on said measuring point from one observation point of said two observation points, the binocular parallax σ, which is set up in said fifth step, and the position $p_{axis}$ of said infinite-point of the measuring point, said third step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of said first, fifth, second and third steps by a plurality of number of times offers a maximal value is determined, instead of determination of said cross point.

In the seventeenth image measurement program storage medium as mentioned above, it is acceptable that said image measurement program comprises:

a first step of setting up the position $p_{axis}$ of said infinite-point of the measuring point through setting up the optical axis direction v in form of a first parameter;

a second step of setting up the physical quantity indexing a distance between the measuring plane and one observation point of said two observation points in the optical axis direction in form of a second parameter;

a third step of determining the position $p_c$ of the intersection point on the observation plane, using said compound ratio $\{p_{axis}p_R p_L p_c\}$ or the operation equivalent to said compound ratio, in accordance with the position $p_{axis}$ set up in said first step, the physical quantity indexing a distance between the measuring plane and one observation point of said two observation points in the optical axis direction set up in the second step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a fourth step of determining a polar line associated with the measuring point through a polar transformation of the position $p_c$ of the intersection point on the observation plane, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true optical axis direction, and of determining an azimuth of a measuring plane including a plurality of measuring points associated with a plurality of polar lines intersecting at a cross point determined on a polar line drawing space associated with the true optical axis direction, and/or said physical quantity indexing a distance between the measuring plane and one observation point of said two observation points in the optical axis direction in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true optical axis direction relative to said observation point on said measuring point is selected in accordance with information as to a number of polar lines intersecting at the cross points.

In this case, it is preferable that the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction and/or said physical quantity indexing a distance between the measuring plane and one observation point of said two observation points in the optical axis direction in such a manner that a maximal point wherein a value by a voting through a repetition of execution of said first to fourth steps offers a maximal value, instead of determining of the cross point, is determined on each polar line drawing space, and a polar line drawing space associated with the true optical axis direction is selected in accordance with information as to a maximal value at the maximal point.

It is also preferable that the measuring point appearing on the image has information as to intensity, said image measurement program further comprises a sixth step of setting up a binocular parallax σ, which is a positional difference between the two measuring positions $p_R$ and $p_L$ through observation on said measuring point from said two observation points, in the form of a third parameter, said third step is a step of determining the position $p_c$ of the intersection point on the observation plane using the position $p_{axis}$, which is set up in said first step, the physical quantity indexing a distance between the measuring plane and one observation point of said two observation points in the optical axis direction, which is set up in said second step, the measuring position $p_R$ through observation on said measuring point from one observation point of said two observation points, and the binocular parallax σ, which is set up in said sixth step, said fourth step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction and/or said physical quantity indexing a distance between the measuring plane and one observation point of said two observation points in the optical axis direction in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true optical axis direction is selected in accordance with information as to a maximal value at the maximal point.

To achieve the above-mentioned objects, the present invention provides, of image measurement program storage media, an eighteenth image measurement program storage medium storing an image measurement program for determining an azimuth $n_s$ of a measuring plane and/or a physical quantity indexing a shortest distance between the measuring plane and one observation point of predetermined two observation points, using a compound ratio $\{p_{axis}p_Rp_Lp_c\}$, which is determined by four positions $p_{axis}$, $p_R$, $p_L$, $P_c$ of a measuring point, or an operation equivalent to said compound ratio, and an inner product $(n_s \cdot v)$ of the azimuth $n_s$ of the measuring plane and an optical axis direction v, where $p_R$ and $p_L$ denote measuring positions through observation of said two observation points on an arbitrary measuring point appearing on an image obtained through viewing a predetermined measurement space from predetermined two observation points inside the measurement space, respectively, v denotes the optical axis direction coupling said two observation points, $p_{axis}$ denotes a position of an infinite-point on a straight line extending in a direction identical to the optical axis direction v, including the measuring point, $p_c$ denotes a position of an intersection point with said straight line on an observation plane extending in parallel to a measuring plane including the measuring point, including one observation point of said two observation points, and $n_s$ denotes the azimuth of the measuring plane.

In the eighteenth image measurement program storage medium as mentioned above, said compound ratio $\{p_{axis}p_Rp_Lp_c\}$ or the operation equivalent to said compound ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the eighteenth image measurement program storage medium as mentioned above, it is acceptable that in said image measurement program, as the physical quantity indexing the shortest distance, a normalization shortest distance $_nd_s$, which is expressed by the following equation, is adopted, $$_nd_s=d_s/\Delta x_{LR}$$

and said normalization shortest distance $_nd_s$ is determined in accordance with the following equation, $$_nd_s={}_nd_c(n_s \cdot v)$$

using a normalized distance $_nd_c$, which is expressed by the following equation, and the inner product $(n_s \cdot v)$ $$_nd_c=d_c/\Delta x_{LR}$$

where $d_s$ denotes a shortest distance between the measuring plane and one observation point of said two observation points, $d_c$ denotes a distance between the measuring plane and one observation point of said two observation points in an optical axis direction, and $\Delta x_{LR}$ denotes a distance between said two observation points.

In the eighteenth image measurement program storage medium as mentioned above, it is acceptable that said image measurement program comprises:

a first step of setting up the physical quantity indexing the shortest distance in form of a first parameter;

a second step of setting up the inner product $(n_s \cdot v)$ in form of a second parameter;

a third step of determining the position $p_c$ of the intersection point on the observation plane, using said compound ratio $\{p_{axis}p_Rp_Lp_c\}$ or the operation equivalent to said compound ratio, in accordance with the physical quantity indexing the shortest distance set up in the first step, the inner product $(n_s \cdot v)$ set up in the second step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points, and the position $p_{axis}$ of said infinite-point of the measuring point;

a fourth step of determining a polar line associated with the position $p_c$ of the intersection point on the observation plane through a polar transformation of the position $p_c$, and a fifth step of determining a point on the polar line, said point being given with an angle r with respect to the optical axis direction v, $$r=\cos^{-1}(n_s \cdot v)$$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance between the measuring plane and one observation point of said two observation points in such a manner that cross points of curved lines, which are formed when a plurality of curved lines determined through a repetition of said first to fifth steps by a plurality of number of times are drawn on a curved line drawing space, are determined.

In this case, it is preferable that the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of predetermined two observation points in such a manner that a maximal point wherein a value by a voting through a repetition of execution of said first to fifth steps by a plurality of number of times offers a maximal value, instead of determining of the cross point, is determined.

It is also preferable the measuring point appearing on the image has information as to intensity, said image measurement program further comprises a seventh step of setting up a binocular parallax σ, which is a positional difference between the two measuring positions $p_R$ and $p_L$ through observation on said measuring point from said two observation points, in the form of a third parameter, said third step is a step of determining the position $p_c$ of the intersection point on the observation plane using the physical quantity indexing the shortest distance set up in the first step, the inner product $(n_s \cdot v)$ set up in the second step, the measuring position $p_R$ through observation on said measuring point from one observation point of said two observation points, the binocular parallax σ, which is set up in said seventh step, and the position $p_{axis}$ of said infinite-point of the measuring point, said fifth step is a step of determining said point on a polar line associated with the measuring point, and determining a response intensity associated with the binocular parallax σ on the measuring point, and of voting the response intensity associated with the binocular parallax σ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of said two observation points in such a manner that a maximal point wherein a value by a voting through a repetition of said first, second, seventh and third to fifth steps by a plurality of number of times offers a maximal value is determined, instead of determination of said cross point.

In the eighteenth image measurement program storage medium as mentioned above, it is acceptable that said image measurement program comprises:

a first step of setting up the position $p_{axis}$ of said infinite-point of the measuring point through setting up the optical axis direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the intersection point on the observation plane, using said compound ratio $\{p_{axis}p_Rp_Lp_c\}$ or the operation equivalent to said compound ratio, in accordance with the position $p_{axis}$ of said infinite-point of the measuring point, which is set up in said first step, the physical quantity indexing the shortest distance, which is set up in the second step, the inner product $(n_s \cdot v)$ set up in the third step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a fifth step of determining a polar line associated with the position $p_c$ of the intersection point on the observation plane through a polar transformation of the position $p_c$, and a sixth step of determining a point on the polar line, said point being given with an angle r with respect to the optical axis direction v, $$r = \cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true optical axis direction, and of determining an azimuth $n_s$ of a measuring plane including a plurality of measuring points associated with a plurality of curved lines intersecting at a cross point determined on a curved line drawing space associated with the true optical axis direction, and/or a physical quantity indexing a shortest distance between the measuring plane and one observation point of predetermined two observation points in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true optical axis direction relative to said observation point on said measuring point is selected in accordance with information as to a number of curved lines intersecting at the cross points.

In this case, it is preferable that the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of said first to sixth steps offers a maximal value, instead of determining of the cross point, is determined on each curved line drawing space, and a curved line drawing space associated with the true optical axis direction is selected in accordance with information as to a maximal value at the maximal point.

It is also preferable that the measuring point appearing on the image has information as to intensity, said image measurement program further comprises a eighth step of setting up a binocular parallax σ, which is a positional difference between the two measuring positions $p_R$ and $p_L$ through observation on said measuring point from said two observation points, in the form of a fourth parameter, said fourth step is a step of determining the position $p_c$ of the intersection point on the observation plane using the position $p_{axis}$ of said infinite-point of the measuring point, which is set up in said first step, the physical quantity indexing the shortest distance, which is set up in the second step, the inner product $(n_s \cdot v)$ set up in the third step, the measuring position $p_R$ through observation on said measuring point from one observation point of said two observation points, and a binocular parallax σ, which is set up in said eighth step, said sixth step is a step of determining said point associated with the measuring point, and determining a response intensity associated with the binocular parallax σ on the measuring point, and of voting the response intensity associated with the binocular parallax σ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true optical axis direction is selected in accordance with information as to a maximal value at the maximal point.

To achieve the above-mentioned objects, the present invention provides, of image measurement program storage media, a nineteenth image measurement program storage medium storing an image measurement program for determining an azimuth of a measuring plane and/or a physical quantity indexing a shortest distance between the measuring plane and one observation point of predetermined two observation points, using a simple ratio $(p_{axis}p_Rp_L)$, which is determined by three positions $p_{axis}$, $p_R$, $p_L$ of a measuring point, or an operation equivalent to said simple ratio, where $p_R$ and $p_L$ denote measuring positions through observation of said two observation points on an arbitrary measuring point appearing on an image obtained through viewing a predetermined measurement space from a predetermined observation point inside the measurement space, respectively, v denotes an optical axis direction coupling said two observation points, and $p_{axis}$ denotes a position of an infinite-point on a straight line extending in a direction identical to the optical axis direction v, including the measuring point.

In the nineteenth image measurement program storage medium as mentioned above, said simple ratio $(p_{axis}p_Rp_L)$ or the operation equivalent to said simple ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the nineteenth image measurement program storage medium as mentioned above, it is acceptable that in said image measurement program, as the positions $p_{axis}$, $p_R$, $p_L$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x_{LR}$$

where $d_s$ denotes a shortest distance between the measuring plane and one observation point of said two observation points, and $\Delta x_{LR}$ denotes a distance between said two observation points, a first step of setting up the normalization shortest distance $_nd_s$ in form of a parameter;

a second step of determining a radius R defined by the following equation or the equivalent equation;

$$R=\cos^{-1}(_nd_s/(p_{axis}p_Rp_L)$$

using the normalization shortest distance $_nd_s$ set up in the first step and the simple ratio $(p_{axis}p_Rp_L)$ or the operation equivalent to said simple ratio, and a third step of determining a small circle of a radius R taking as a center a measuring position through observation on said measuring point from one observation point of said two observation points, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance $_nd_{s0}$ on the measuring plane in such a manner that cross points of small circles, which are formed when a plurality of small circles determined through a repetition of said first to third steps by a plurality of number of times are drawn on a small circle drawing space, are determined.

In this case, it is preferable that the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of said first to third steps by a plurality of number of times offers a maximal value, instead of determining of the cross point, is determined.

It is also preferable that the measuring point appearing on the image has information as to intensity, said image measurement program further comprises a fifth step of setting up a binocular parallax σ, which is a positional difference between the two measuring positions $p_R$ and $p_L$ through observation on said measuring point from said two observation points, in form of a second parameter, said second step is a step of determining the radius R using the normalization shortest distance $_nd_s$ set up in the first step, the position $p_{axis}$ of said infinite-point of the measuring point, the measuring position $p_R$ through observation on said measuring point from one observation point of said two observation points, and the binocular parallax σ, which is set up in said fifth step, said third step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{sR}$ of a measuring plane including a plurality of measuring points associated with a plurality of small circles joining a voting for a maximal point and/or a normalization shortest distance $_nd_{sR}$ on the measuring plane in such a manner that a maximal point wherein a value by a voting through a repetition of said first, fifth, second and third steps by a plurality of number of times offers a maximal value is determined, instead of determination of said cross point.

In the nineteenth image measurement program storage medium as mentioned above, it is acceptable that in said image measurement program, as the positions $p_{axis}$, $p_R$, $p_L$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x_{LR}$$

where $d_s$ denotes a shortest distance between the measuring plane and one observation point of said two observation points, and $\Delta x_{LR}$ denotes a distance between said two observation points, a first step of setting up the position $p_{axis}$ of said infinite-point of the measuring point through setting up the optical axis direction v in form of a first parameter;

a second step of setting up the normalization shortest distance $_nd_s$ in form of a second parameter;

a third step of determining a radius R defined by the following equation or the equivalent equation;

$$R=\cos^{-1}(_nd_s/(p_{axis}p_Rp_L))$$

using the position $p_{axis}$ of said infinite-point of the measuring point, which is set up in the first step, the normalization shortest distance $_nd_s$ set up in the second step and the simple ratio $(p_{axis}p_Rp_L)$ or the operation equivalent to said simple ratio, and a fourth step of determining a small circle of a radius R taking as a center a measuring position through observation on said measuring point from one observation point of said two observation points, wherein said third step and said fourth step are repeated by a plurality of number of times on a plurality of measuring points in said measurement space, while values of the first and second parameters are altered in said first step and said second step, and thereafter, effected is a fifth step of determining a true optical axis direction, and of determining an azimuth $n_{s0}$ of a measuring plane including a plurality of measuring points associated with a plurality of small circles intersecting at a cross point determined on a small circle drawing space associated with the true optical axis direction, and/or a a normalization shortest distance $_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true optical axis direction relative to said observation point on said measuring point is selected in accordance with information as to a number of small circles intersecting at the cross points.

In this case, it is preferable that the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance $_nd_{s0}$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

It is also preferable that the measuring point appearing on the image has information as to intensity, said image measurement program further comprises a sixth step of setting up a binocular parallax σ, which is a positional difference between the two measuring positions $p_R$ and $p_L$ through observation on said measuring point from said two observation points, in form of a third parameter, said second step is a step of determining the radius R using the position $p_{axis}$ of said infinite-point of the measuring point, which is set up in said first step, the normalization shortest distance $_nd_s$ set up in the second step, the measuring position $p_R$ through observation on said measuring point from one observation point of said two observation points, and the binocular parallax σ, which is set up in said fifth step, said fourth step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance $_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

To achieve the above-mentioned objects, the present invention provides, of image measurement program storage media, a twentieth image measurement program storage medium storing an image measurement program for determining a physical quantity indexing a distance between an arbitrary measuring point appearing on an image obtained through viewing a predetermined measurement space from a predetermined observation point inside the measurement space and one observation point of predetermined two observation points, using a simple ratio ($p_{axis}p_Rp_L$), which is determined by three positions $p_{axis}$, $p_R$, $p_L$ of the measuring point, or an operation equivalent to said simple ratio, where $p_R$ and $p_L$ denote measuring positions through observation of said two observation points on the measuring point, respectively, and $p_{axis}$ denotes a position of an infinite-point on a straight line extending in a direction identical to an optical axis direction v coupling said two observation points, including the measuring point.

In the twentieth image measurement program storage medium as mentioned above, said simple ratio ($p_{axis}p_Rp_L$) or the operation equivalent to said simple ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

In the twentieth image measurement program storage medium as mentioned above, it is acceptable that in said image measurement program, as the physical quantity indexing the distance, a normalized distance $_nd_0$, which is expressed by the following equation, is adopted, $$_nd_0 = d_0/\Delta x_{LR}$$

where $d_0$ denotes a distance between the measuring point and one observation point of said two observation points, and $\Delta x_{LR}$ denotes a distance between said two observation points, and said normalized distance ${}_n d_0$ is determined in accordance with the following equation $${}_n d_0 = (p_{axis} p_R p_L)$$

or an equation equivalent to the above equation.

To achieve the above-mentioned objects, the present invention provides, of image measurement program storage media, a twenty-first image measurement program storage medium storing an image measurement program comprising:

a first step of setting up coordinates in a voting space in form of a parameter, said coordinates being defined by a physical quantity indexing a distance between a measuring plane, including an arbitrary measuring point appearing on an image obtained through viewing a predetermined measuring space from predetermined two observation points in the measuring space and one observation point of said two observation points in an optical axis direction coupling said two observation points, and an azimuth of the measuring plane;

a second step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax σ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a twenty-second image measurement program storage medium storing an image measurement program comprising:

a first step of setting up in form of a first parameter an optical axis direction v coupling predetermined two observation points through viewing a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a distance between a measuring plane, including the measuring point and one observation point of said two observation points in an optical axis direction, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a twenty-third image measurement program storage medium storing an image measurement program comprising:

a first step of setting up coordinates in a voting space in form of a parameter, said coordinates being defined by a physical quantity indexing a shortest distance between one observation point of predetermined two observation points inside a predetermined measurement space for observation of the measurement space and a measuring plane, including an arbitrary measuring point appearing on an image obtained through viewing the measurement space from the two observation points, and an azimuth $n_s$ of the measuring plane;

a second step of determining a binocular parallax σ, which is a positional difference between two measuring positions $p_R$ and $p_L$ through observation on said measuring point from said two observation points, in accordance with a measuring position $p_R$ through observation on said measuring point from one observation point of the two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax σ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a twenty-fourth image measurement program storage medium storing an image measurement program comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a shortest distance from one observation point of the two observation points to a measuring plane including the measuring point, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a twenty-fifth image measurement program storage medium storing an image measurement program comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a distance between a measuring plane, including the measuring point and one observation point of said two observation points in an optical axis direction, and an azimuth $n_s$ of the measuring plane;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a twenty-sixth image measurement program storage medium storing an image measurement program comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a distance between a measuring plane, including the measuring point and one observation point of said two observation points in an optical axis direction, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a twenty-seventh image measurement program storage medium storing an image measurement program comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of said two observation points, a position $p_{axis}$ of an infinite-point on a straight line extending in a direction identical to the optical axis direction, including the measuring point, and the binocular parallax $\sigma$ set up in the first step;

a third step of determining a response intensity associated with the binocular parallax $\sigma$ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

To achieve the above-mentioned objects, the present invention provides, of image measurement program storage media, a twenty-eighth image measurement program storage medium storing an image measurement program comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax $\sigma$, which is a positional difference between two measuring positions $p_R$ and $p_L$ through observation on said measuring point from said two observation points;

a third step of determining coordinates in a voting space according to the first parameter, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of the two observation points, a position $p_{axis}$ set up in the first step, and the binocular parallax $\sigma$ set up in the second step;

a fourth step of determining a response intensity associated with the binocular parallax $\sigma$ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

To achieve the above-mentioned objects, the present invention provides, of image measurement program storage media, a twenty-ninth image measurement program storage medium storing an image measurement program comprising:

a first step of determining a response intensity associated with a binocular parallax, which is a positional difference between two measuring positions through observation of predetermine two observation points on an arbitrary measuring point in a predetermined measurement space, in accordance with two images obtained through viewing the measurement space from said two observation points; and a second step of voting the response intensity determined in the first step for coordinates associated with the measuring point and the binocular parallax in a voting space, said coordinates being defined by a physical quantity indexing a distance between a measuring plane, including the measuring point, and one observation point of said two observation points in an optical axis direction coupling said two observation points, and an azimuth of the measuring plane;

wherein the first step and the second step are effected by a plurality of number of times on a plurality of measuring points in the measurement space.

In the twenty-ninth image measurement program storage medium as mentioned above, it is acceptable that said image measurement program further comprises a third step of determining an azimuth of a measuring plane including a plurality of measuring points joining a voting for a maximal point and/or a physical quantity indexing a distance between the measuring plane and one observation point of said two observation points in the optical axis direction in such a manner that a maximal point wherein a value by said voting in the voting space offers a maximal value is determined.

To achieve the above-mentioned objects, the present invention provides, of image measurement program storage media, a thirtieth image measurement program storage medium storing an image measurement program comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on an arbitrary measuring point in the measurement space from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a distance between a measuring plane, including the measuring point and one observation point of said two observation points in the optical axis direction, and an azimuth of the measuring plane;

wherein the second step and the third step, of the first to third steps, are effected by a plurality of number of times on a plurality of measuring points in the measurement space, while a value of the parameter is altered in the first step.

In the thirtieth image measurement program storage medium as mentioned above, it is acceptable that said image measurement program further comprises a fourth step of determining a true optical axis direction, and of determining an azimuth of a measuring plane including a plurality of measuring points joining a voting for a maximal point determined on a voting space associated with the true optical axis direction, and/or a physical quantity indexing a physical quantity indexing a distance between the measuring plane and one observation point of said two observation points in the true optical axis direction, in such a manner that a maximal point wherein a value by a voting is determined on each voting space, and the voting space associated with the true optical axis direction is selected in accordance with information as to the maximal value on the maximal point.

To achieve the above-mentioned objects, the present invention provides, of image measurement program storage media, a thirty-first image measurement program storage medium storing an image measurement program comprising:

a first step of determining a response intensity associated with a binocular parallax σ, which is a positional difference between two measuring positions through observation on an arbitrary measuring point in a measurement space from predetermined two observation points, in accordance with two images obtained through viewing the measurement space from said two observation points; and a second step of voting the response intensity determined in the first step for coordinates associated with the measuring point and the binocular parallax σ in a voting space, said coordinates being defined by a physical quantity indexing a shortest distance between one observation point of the two observation points and a measuring plane, including the measuring point, and an azimuth of the measuring plane;

wherein the first step and the second step are effected by a plurality of number of times on a plurality of measuring points in the measurement space.

In the thirty-first image measurement program storage medium as mentioned above, it is acceptable that said image measurement program further comprises a third step of determining an azimuth $n_s$ of a measuring plane including a plurality of measuring points joining a voting for a maximal point and/or a physical quantity indexing a shortest distance between one observation point of said two observation points and the measuring plane in such a manner that a maximal point wherein a value by said voting offers a maximal value is determined in the voting space.

To achieve the above-mentioned objects, the present invention provides, of image measurement program storage media, a thirty-second image measurement program storage medium storing an image measurement program comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on said measuring point from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a shortest distance between one observation point of said two observation points and a measuring plane including the measuring point, and an azimuth of the measuring plane;

wherein the second step and the third step, of the first to third steps, are effected by a plurality of number of times on a plurality of measuring points in the measurement space, while a value of the parameter is altered in the first step.

In the thirty-second image measurement program storage medium as mentioned above, it is acceptable that said image measurement program further comprises a fourth step of determining a true optical axis direction, and of determining an azimuth of a measuring plane including a plurality of measuring points joining a voting for a maximal point determined on a voting space associated with the true optical axis direction, and/or a shortest distance between one observation point of said two observation points and the measuring plane, in such a manner that a maximal point wherein a value by said voting offers a maximal value is determined on each voting space, and a voting space associated with the true optical axis direction relative to the observation point on the measuring point is selected in accordance with information as to the maximal value on the maximal point.

Figure 10A:
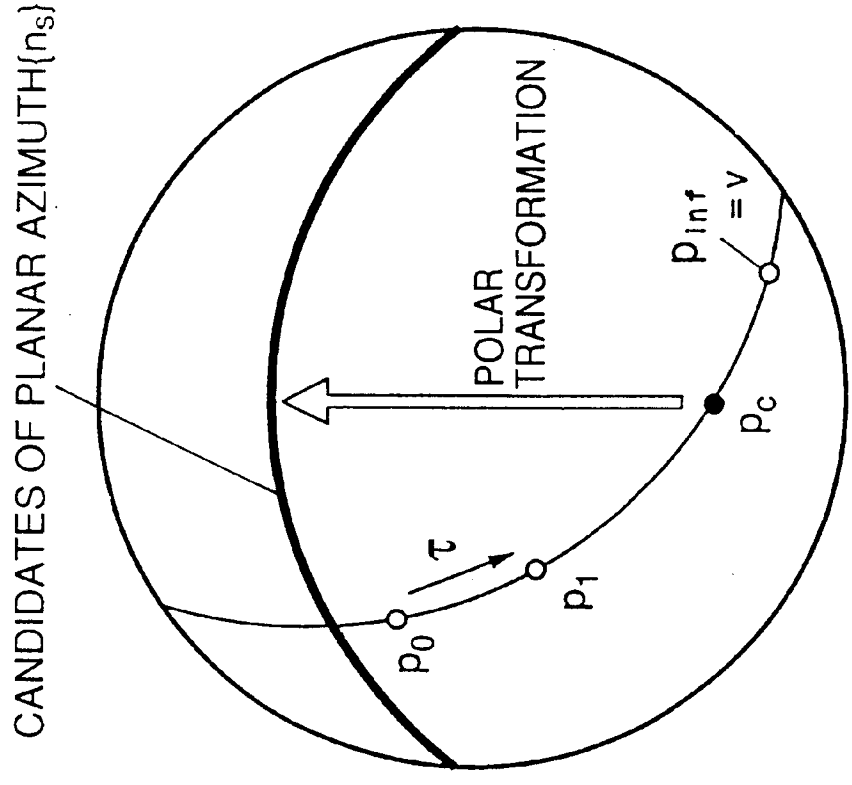
Figure 10B:
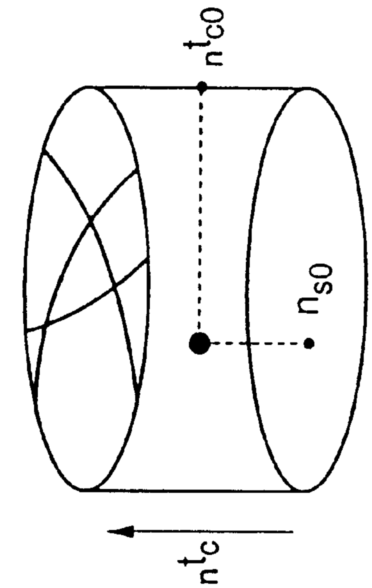

Each of FIGS. 10(A) and 10(B) is an explanatory view useful for understanding a principle of measuring a normalized time by a cylindrical arrangement.

Figure 11:
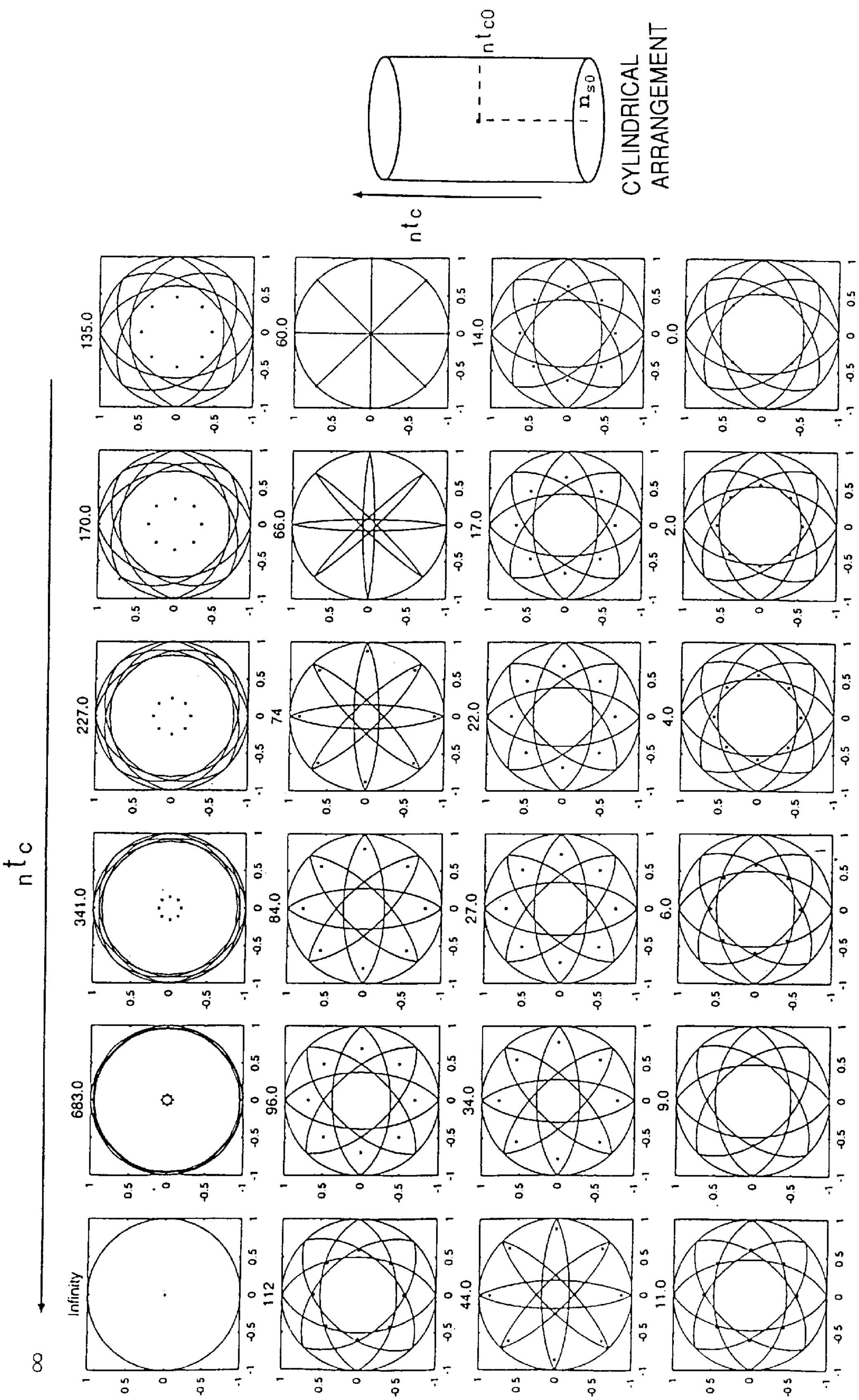

FIG. 11 is an illustration showing a result of a computer simulation as to a measurement of a normalized time.

Figure 12:
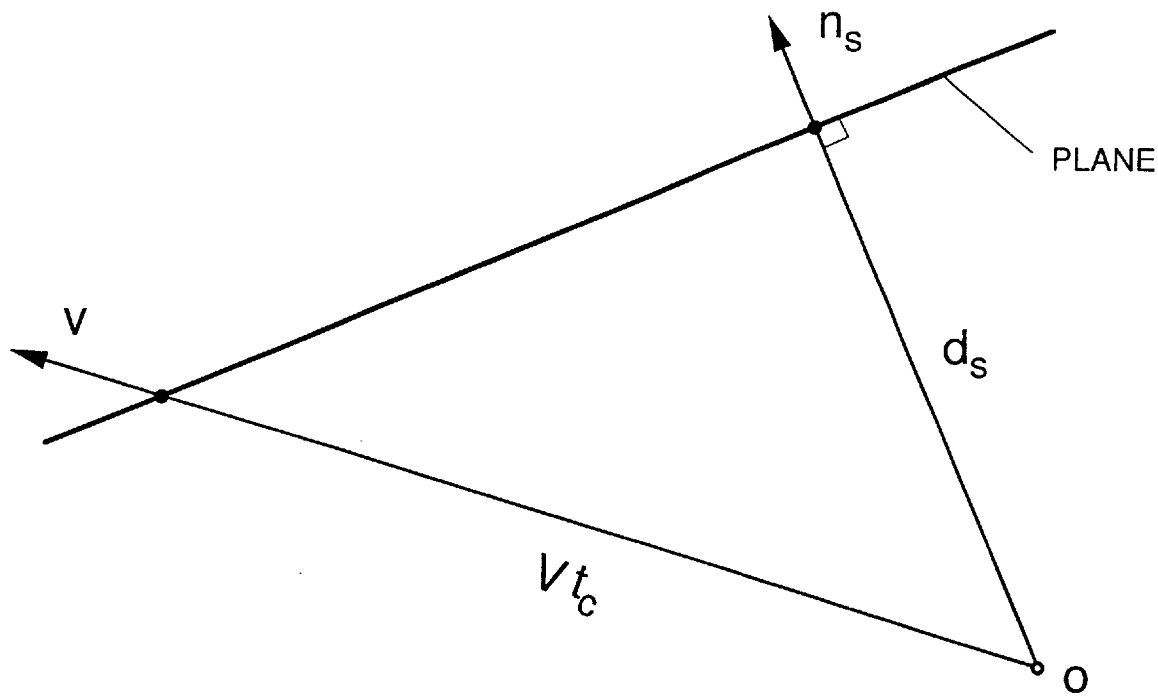

FIG. 12 is an illustration showing a relation between a time up to going across a plane and the shortest distance.

Figure 13:
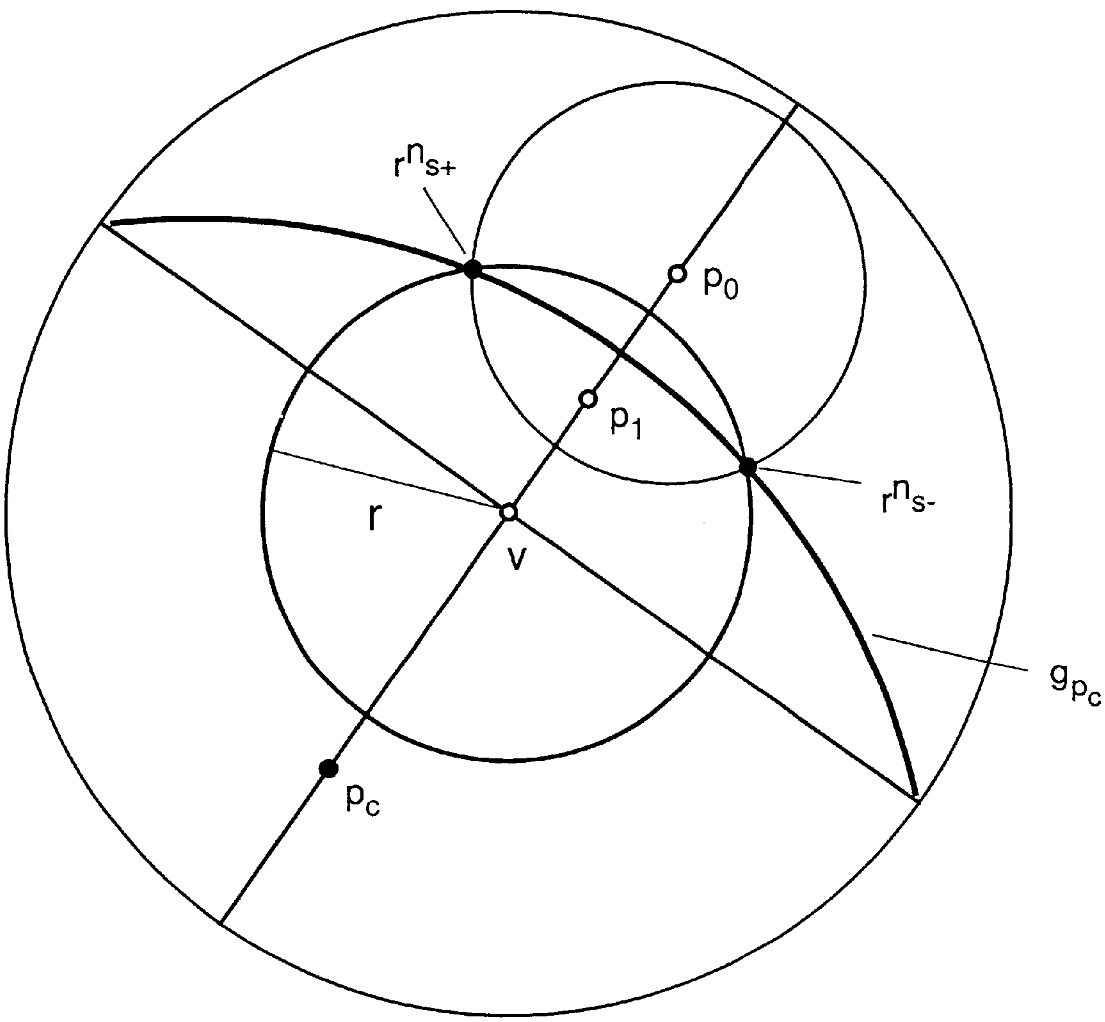

FIG. 13 is an explanatory view useful for understanding a principle of measuring the shortest distance up to a plane.

Figure 14:
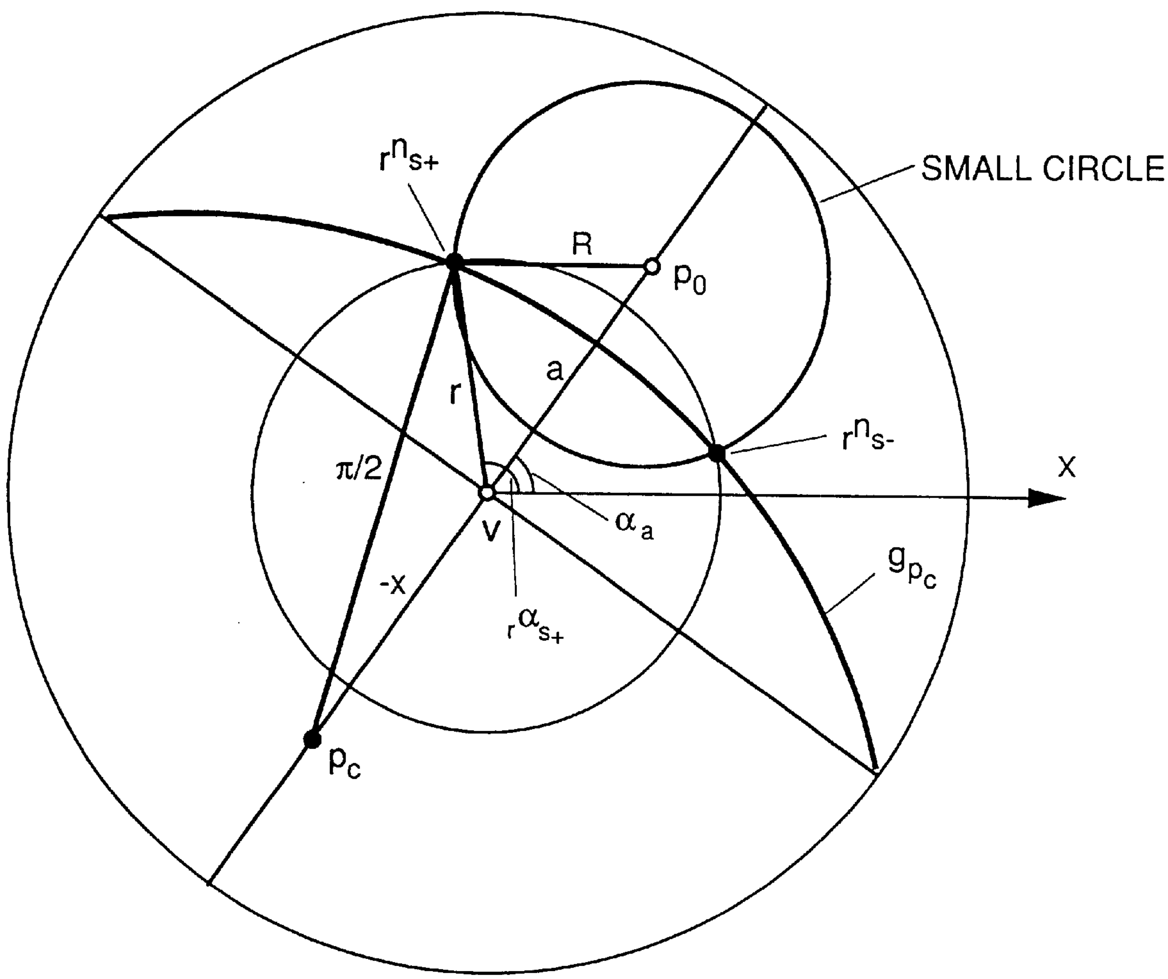

FIG. 14 is a typical illustration for a demonstration of a small circle transformation.

Figure 15:
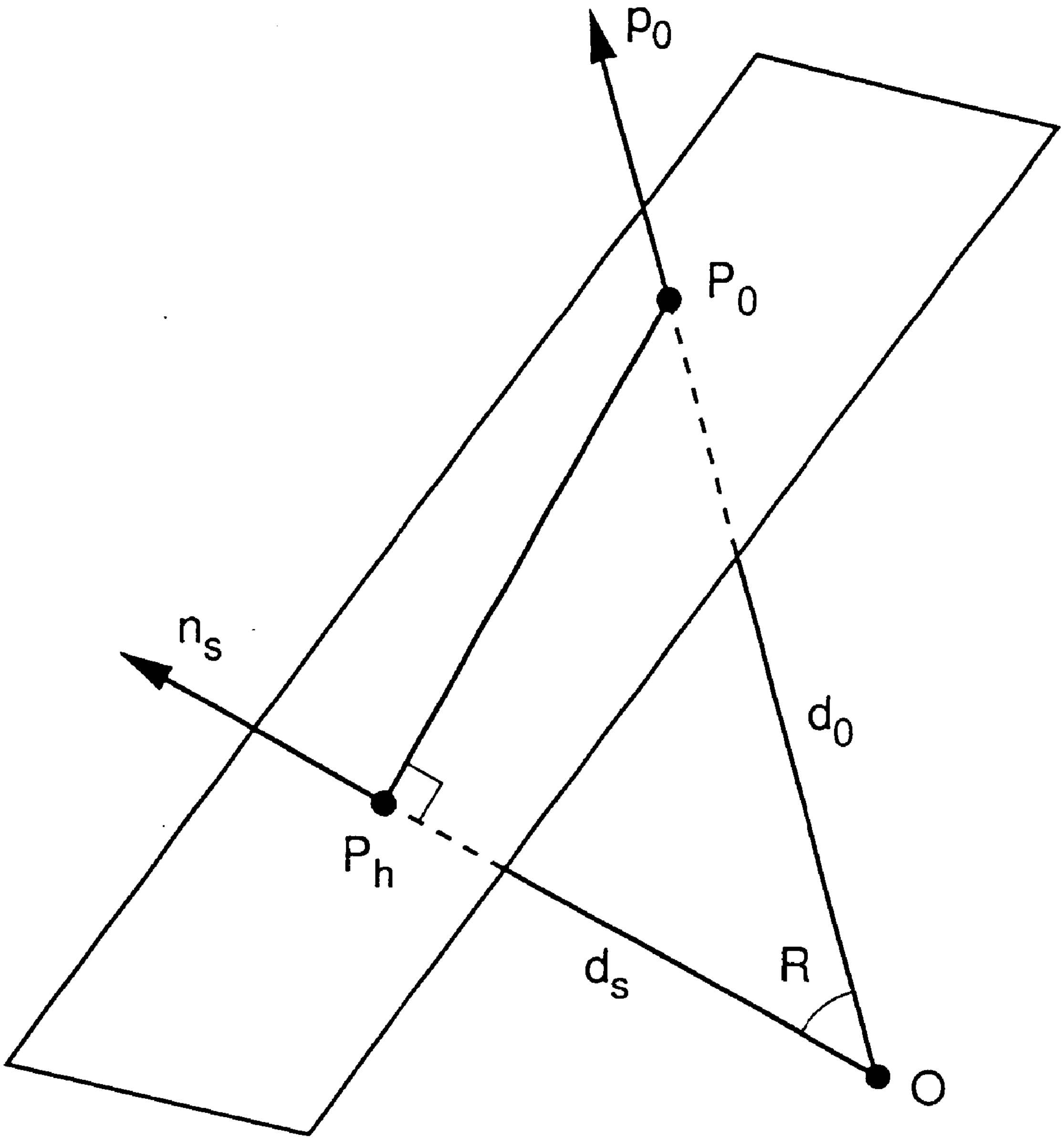

FIG. 15 is an illustration showing a relation between a distance up to a point and the shortest distance up to a plane.

Figure 16:
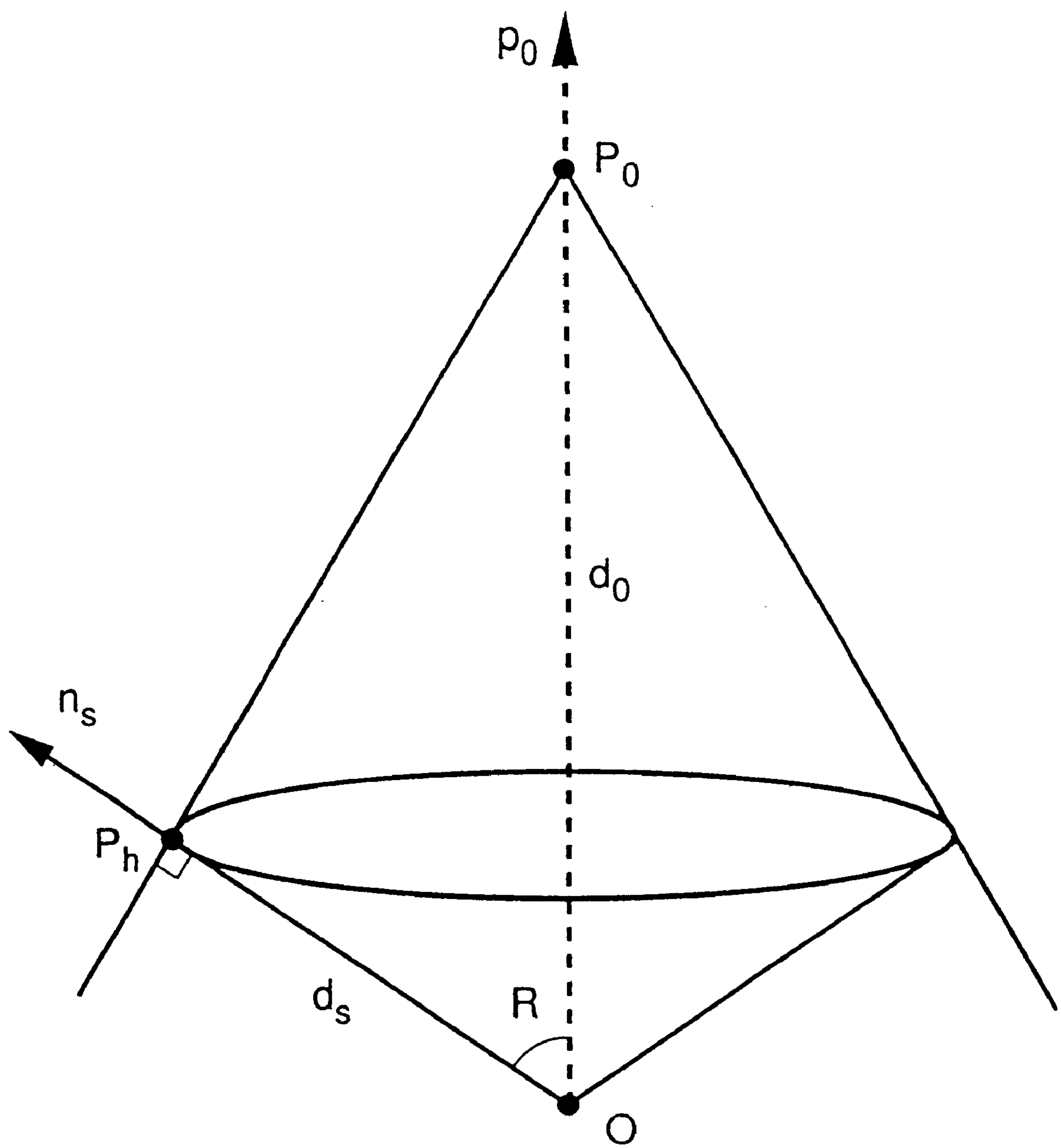

FIG. 16 is an illustration useful for understanding the geometric meaning of the small circle transformation.

Figure 17A:
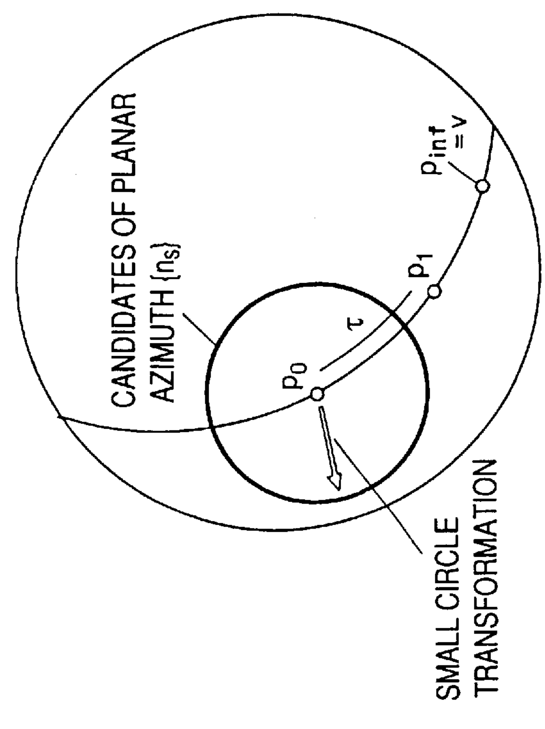
Figure 17B:
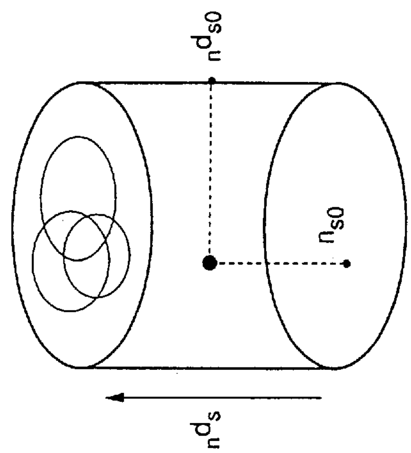
Figure 17C:
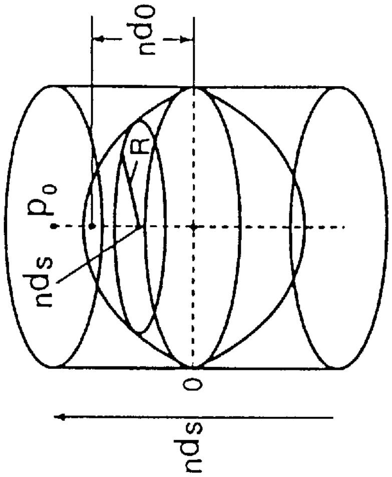

Each of FIGS. 17(A), 17(B) and 17(C) is an explanatory view useful for understanding a principle of measuring a normalization shortest distance by a cylindrical arrangement.

Figure 18:
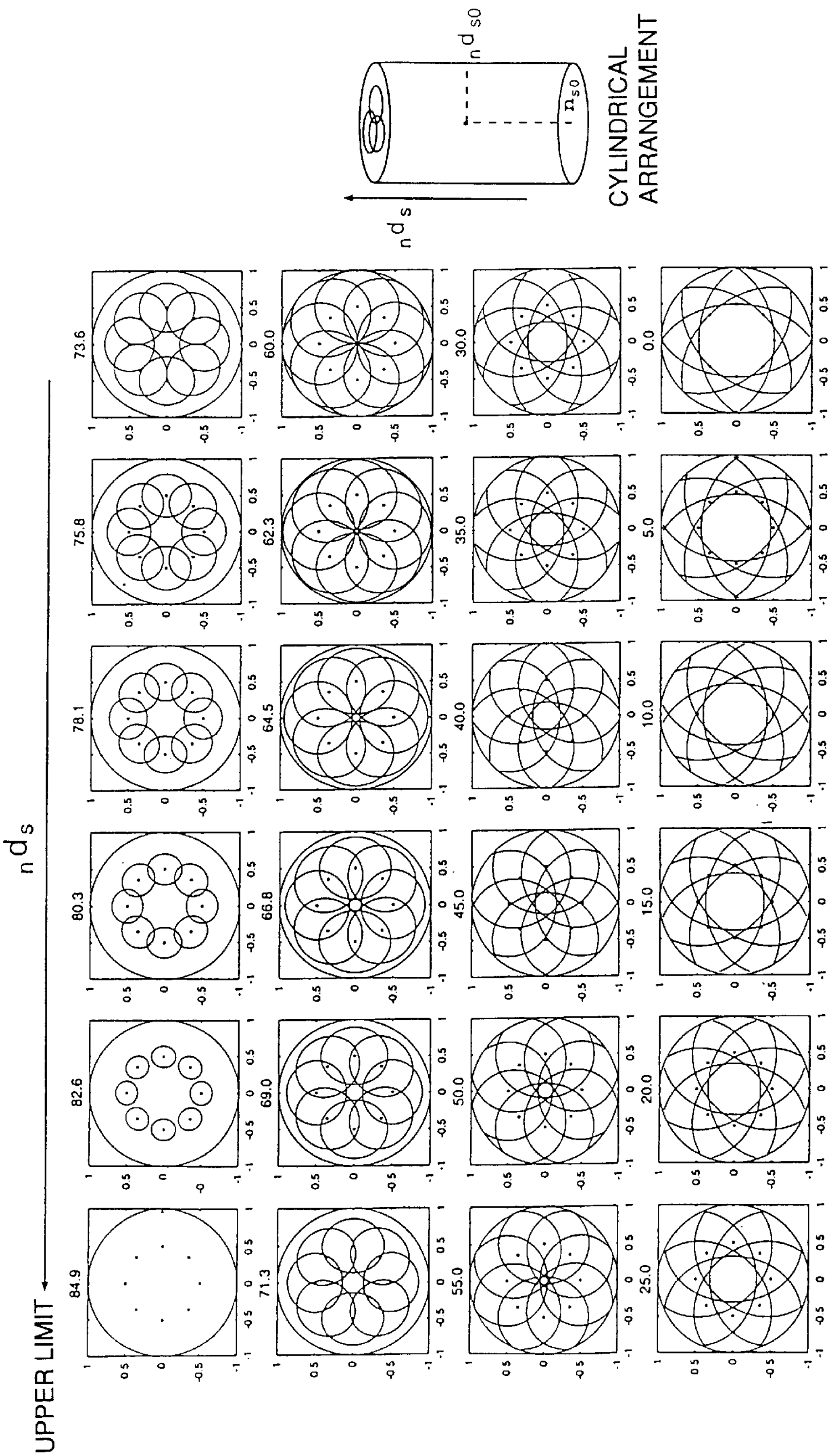

FIG. 18 is an illustration showing a result of a computer simulation as to a measurement of a normalization shortest distance.

Figure 19A:
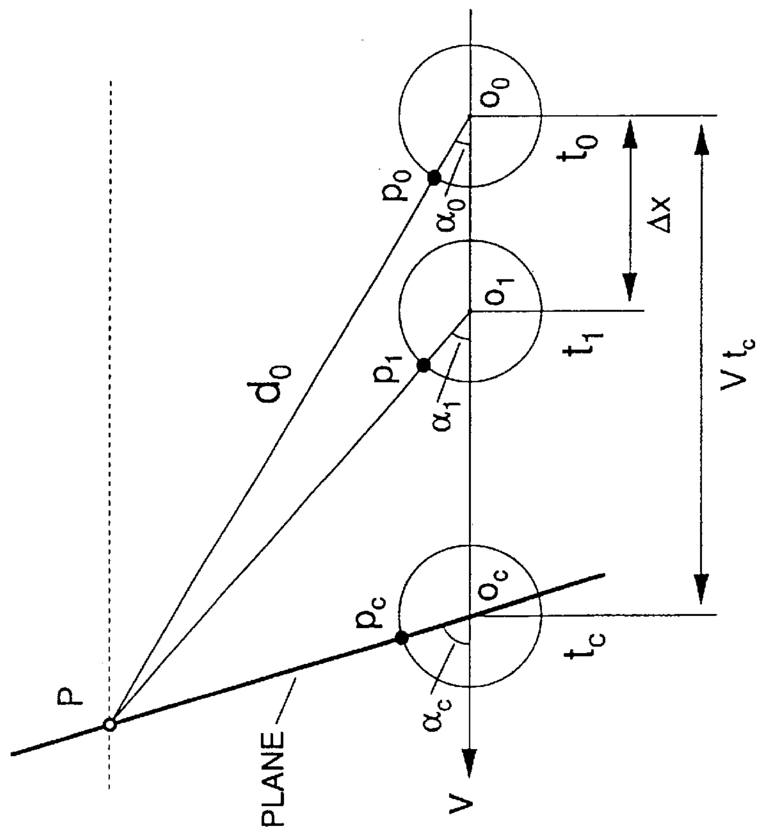
Figure 19B:
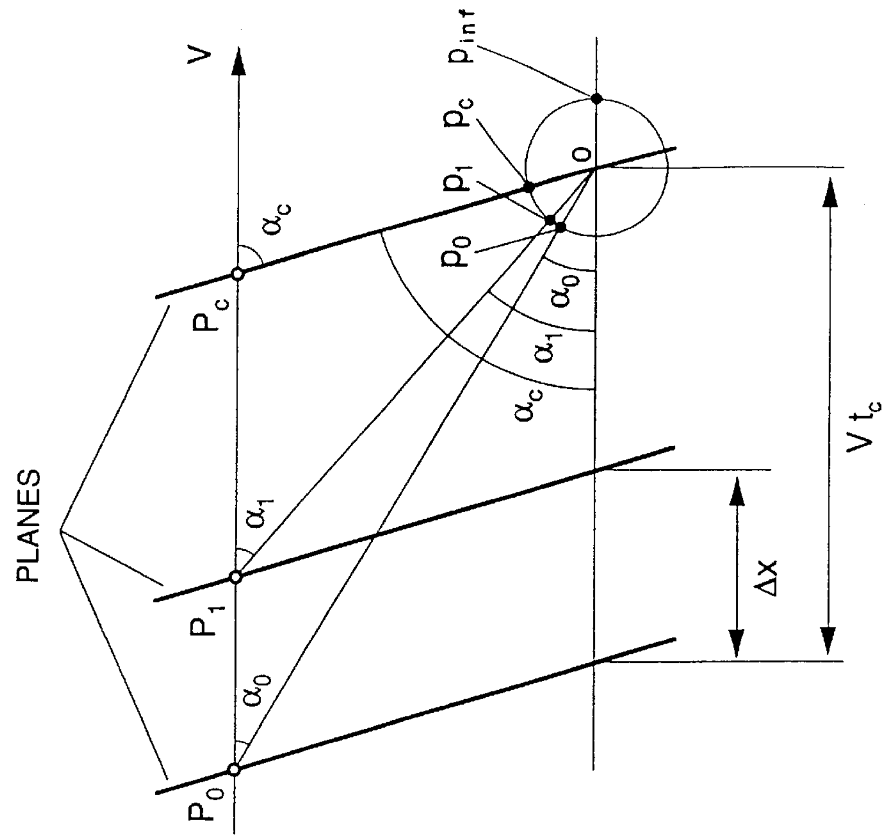

Each of FIGS. 19(A) and 19(B) is an explanatory view useful for understanding equivalence between a camera movement and a plane movement.

Figure 20:
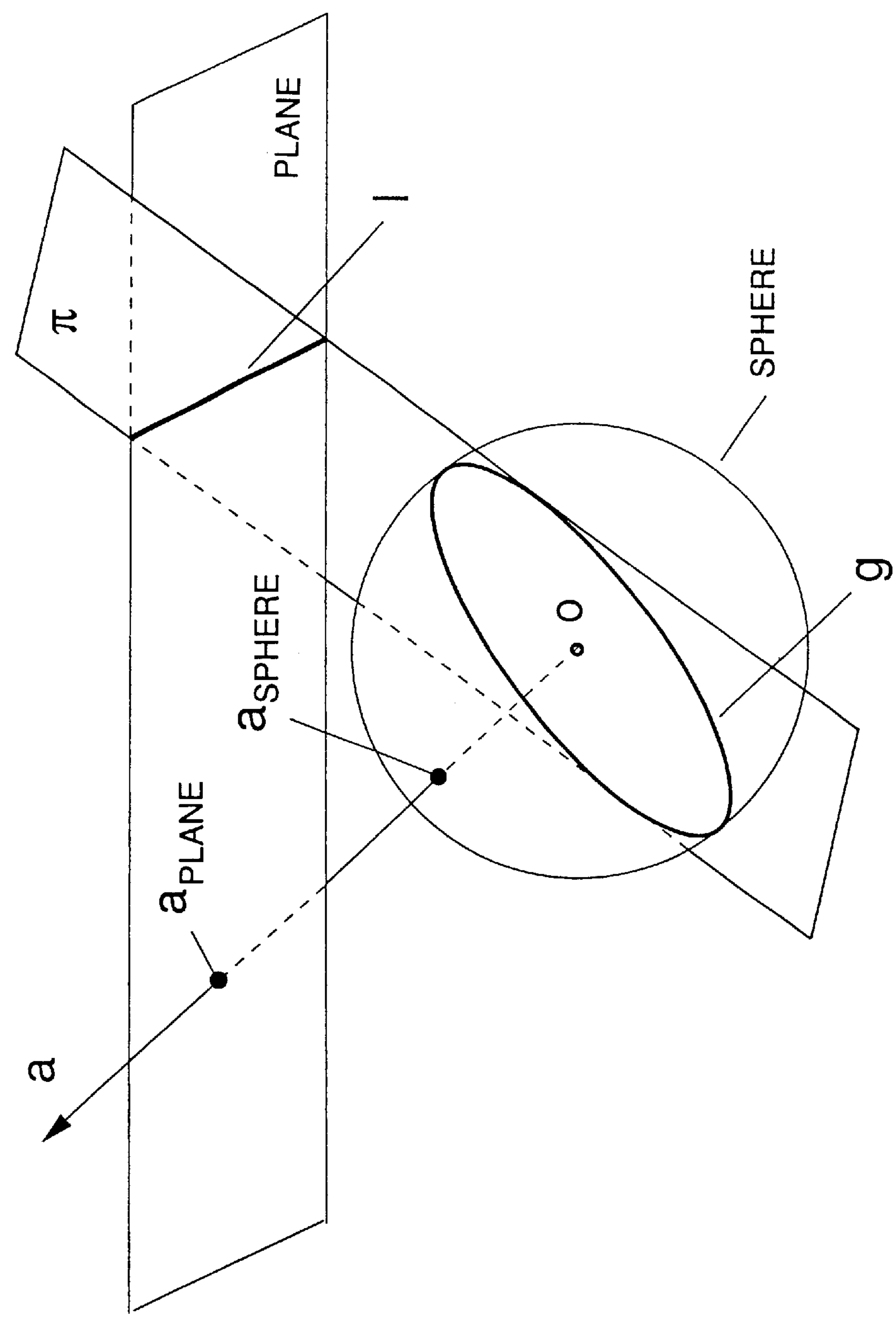

FIG. 20 is an illustration showing a relation between a polar transformation on a sphere and a polar transformation on a plane.

Figure 21:
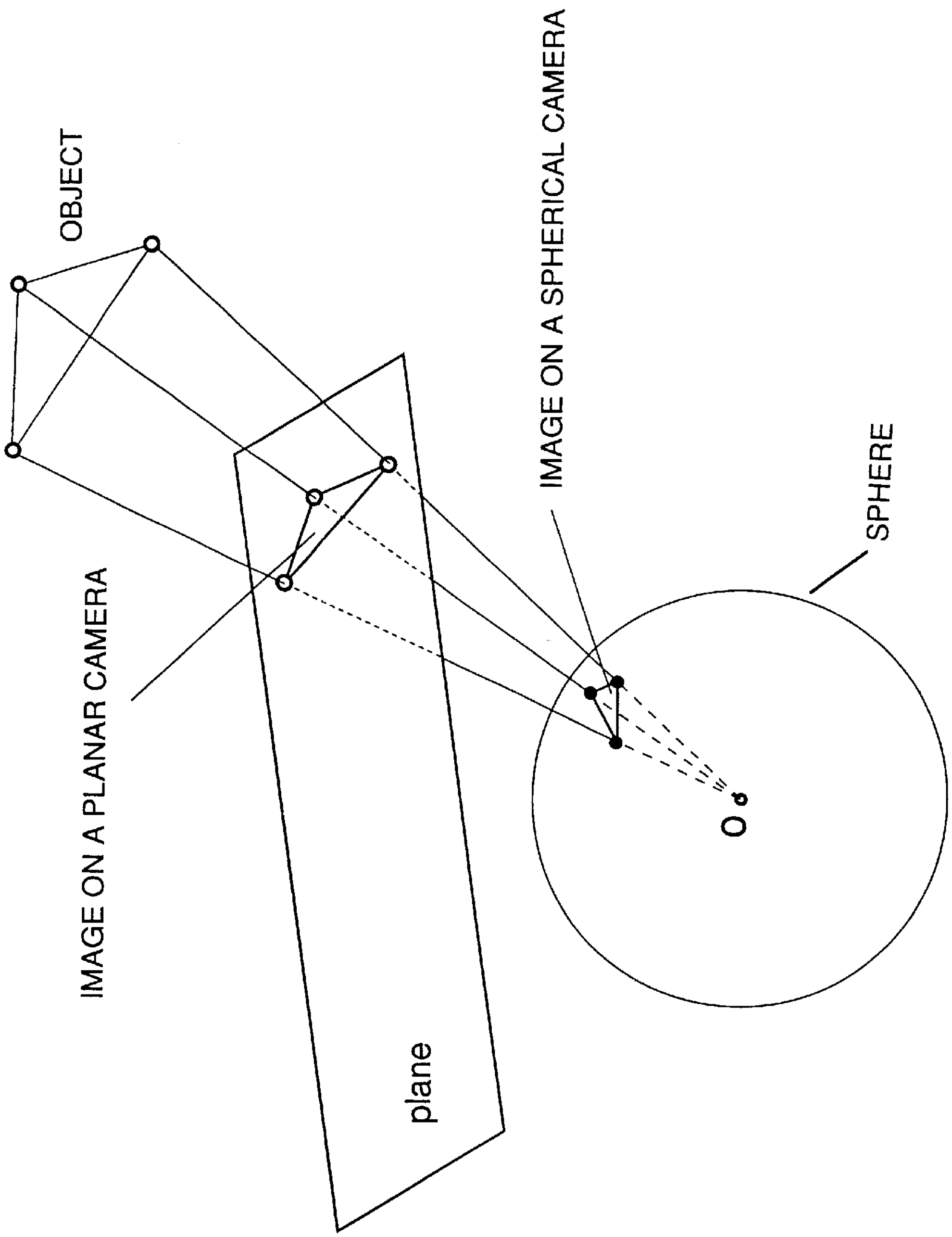

FIG. 21 is an illustration showing a relation between an image on a spherical camera and an image on a planar camera.

Figures 22A, 22B:
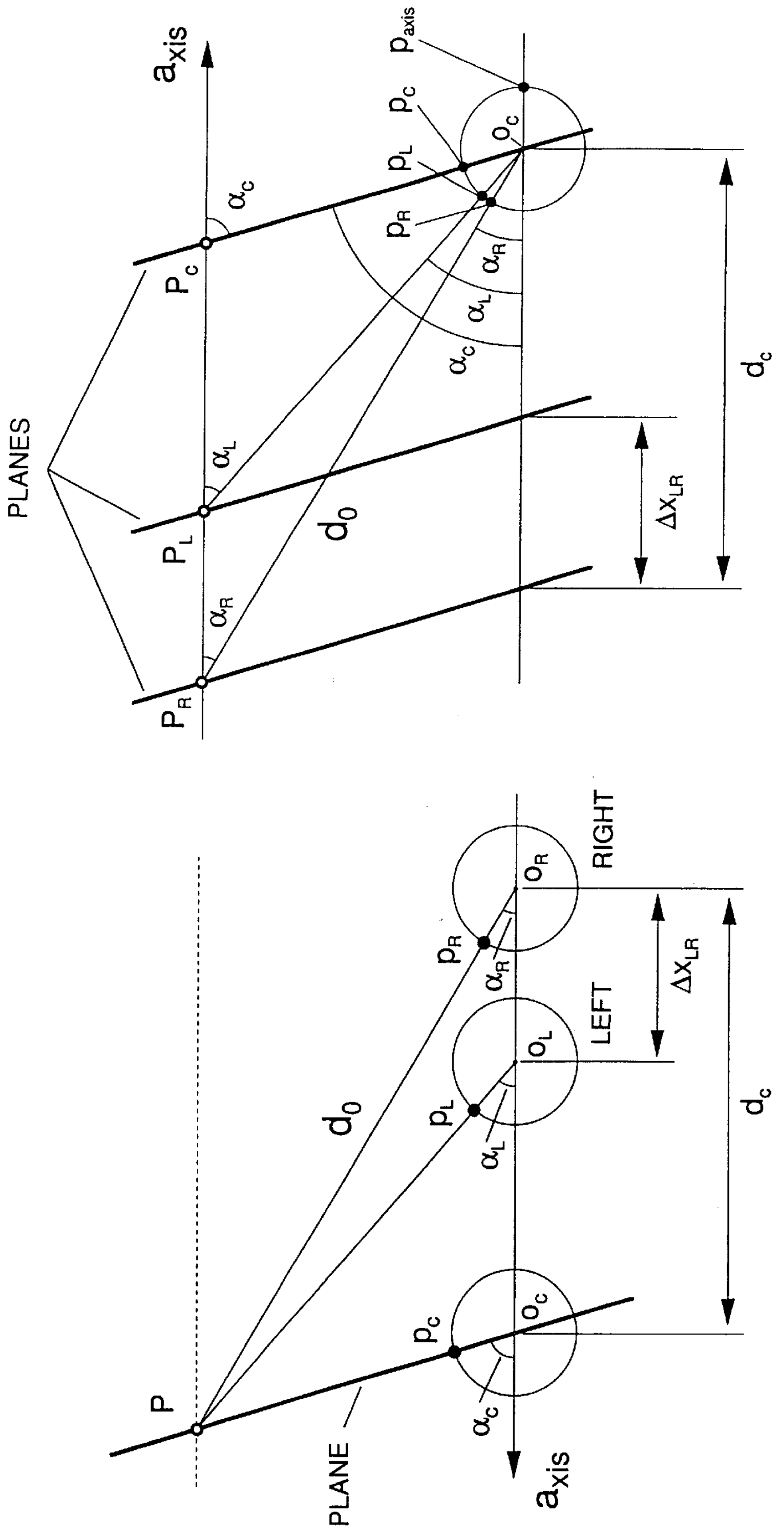

Each of FIGS. 22(A) and 22(B) is an explanatory view useful for understanding a principle of measuring a distance up to going across a plane in an optical axis direction.

Figure 23:
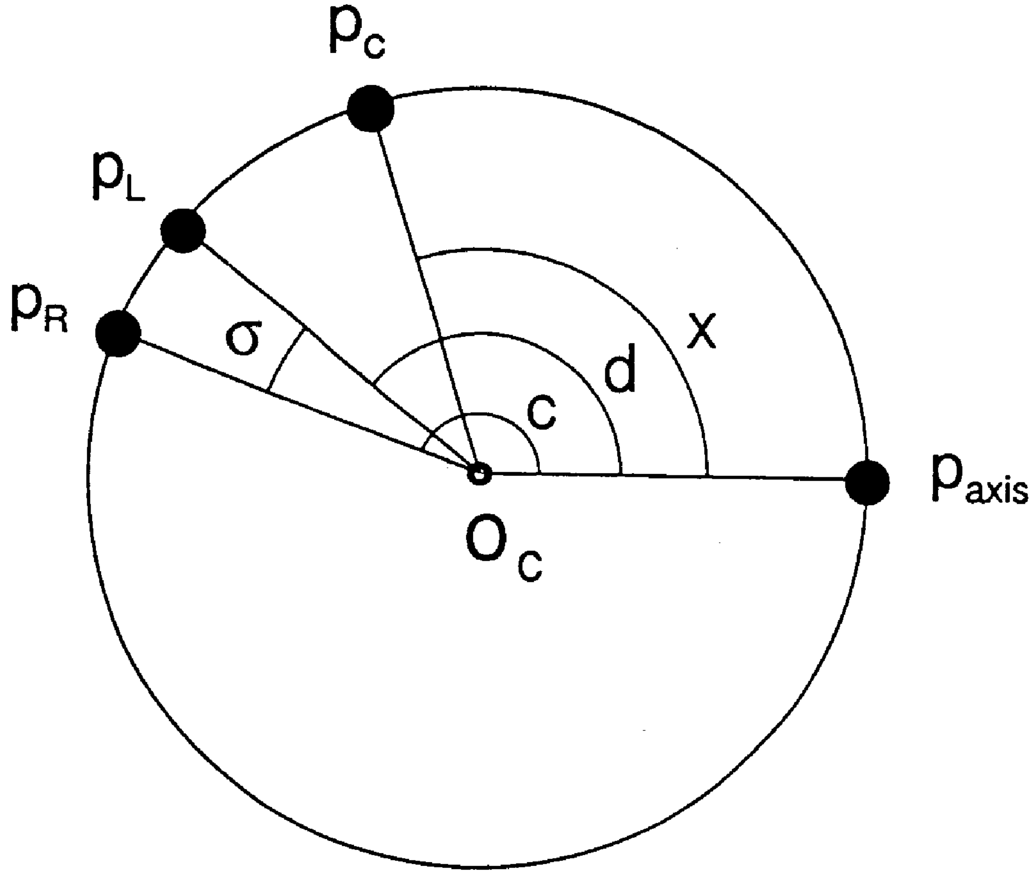

FIG. 23 is an explanatory view useful for understanding a definition of the central angle.

Figure 24B:
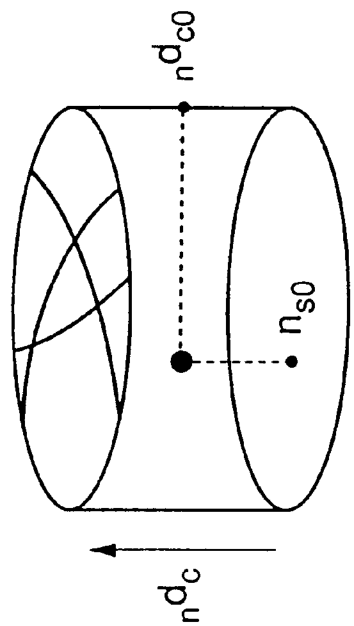
Figure 24:
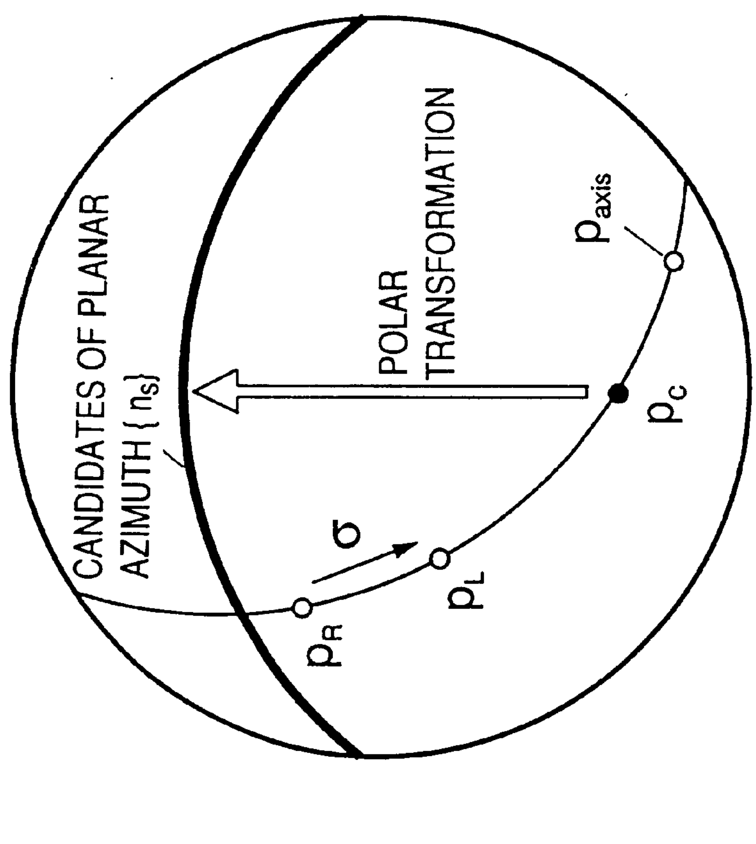

Each of FIGS. 24(A) and 24(B) is an explanatory view useful for understanding a principle of measuring a "normalized distance up to going across a plane in a optical axis direction" by a cylindrical arrangement.

Figure 25:
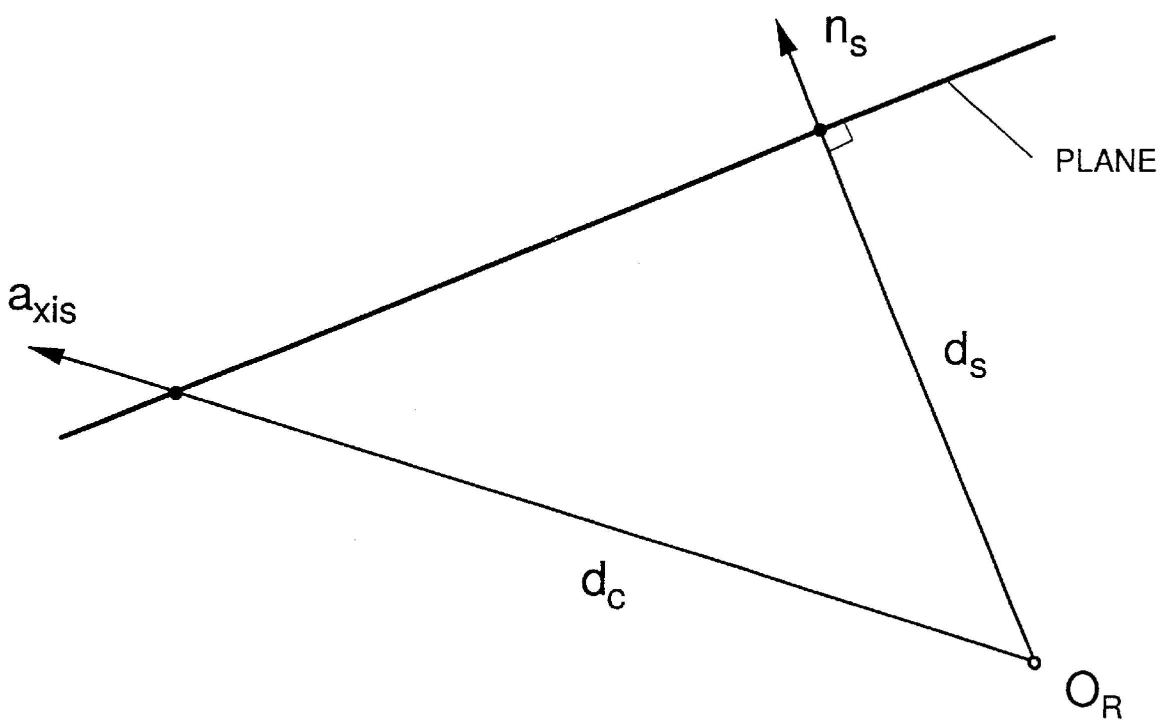

FIG. 25 is an illustration showing a relation between a "normalized distance up to going across a plane in a optical axis direction" and the "shortest distance up to a plane".

Figure 26:
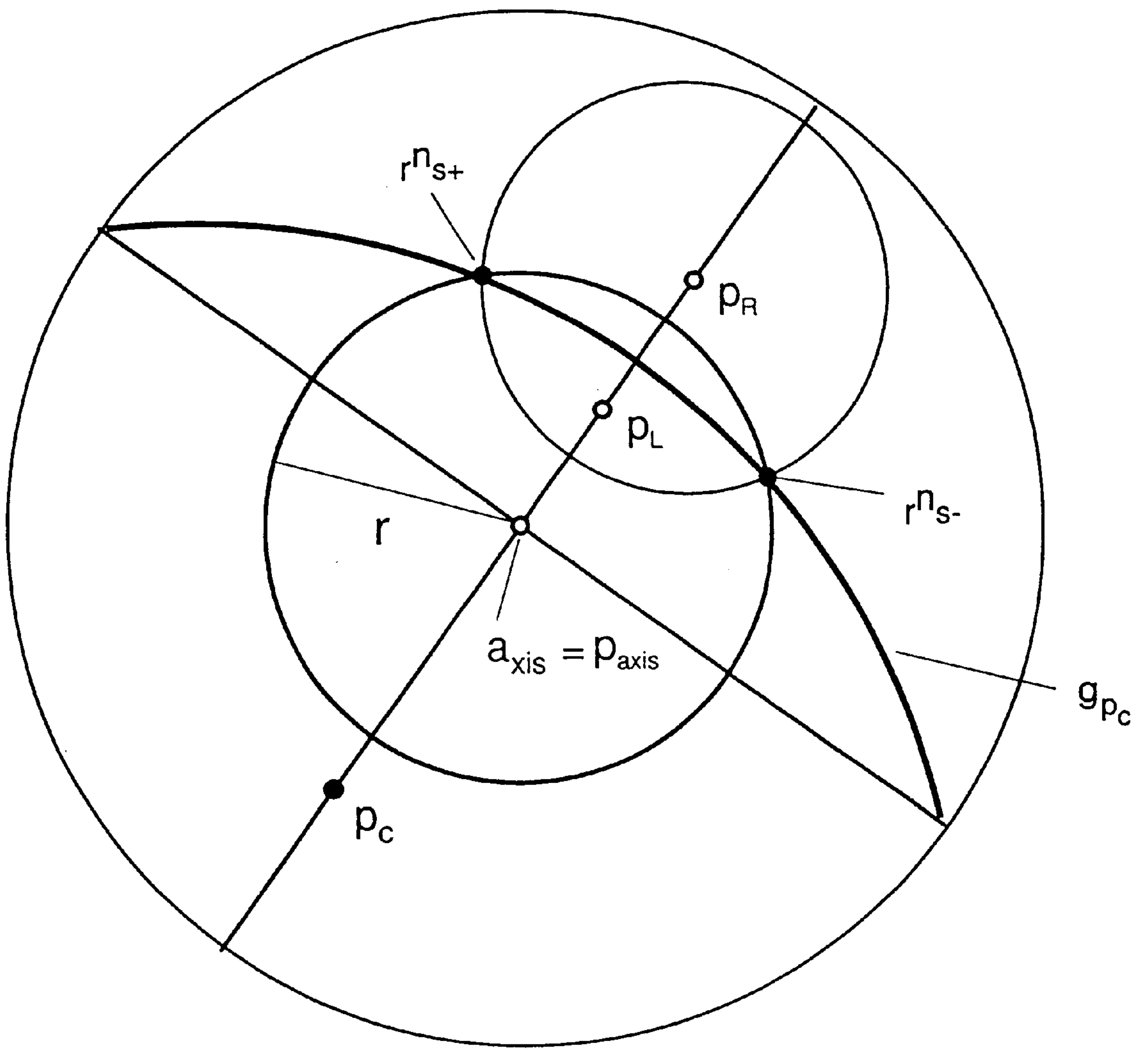

FIG. 26 is an explanatory view useful for understanding a principle of measuring the shortest distance up to a plane.

Figure 27:
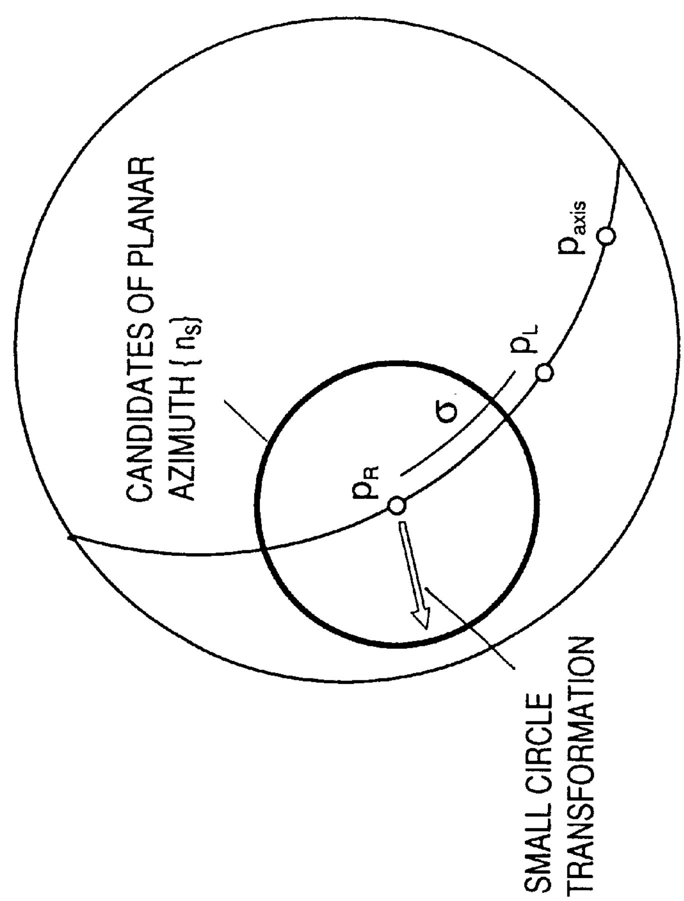
Figure 27B:
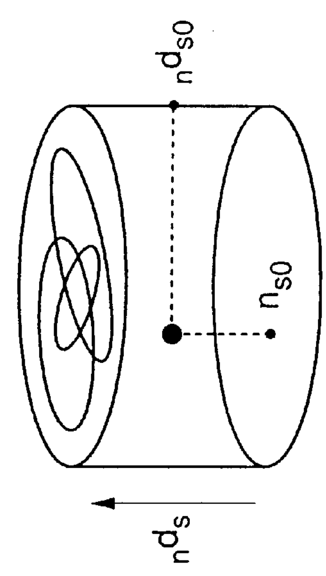

Each of FIGS. 27(A) and 27(B) is an explanatory view useful for understanding a principle of measuring a normalization shortest distance by a cylindrical arrangement.

Figure 28:
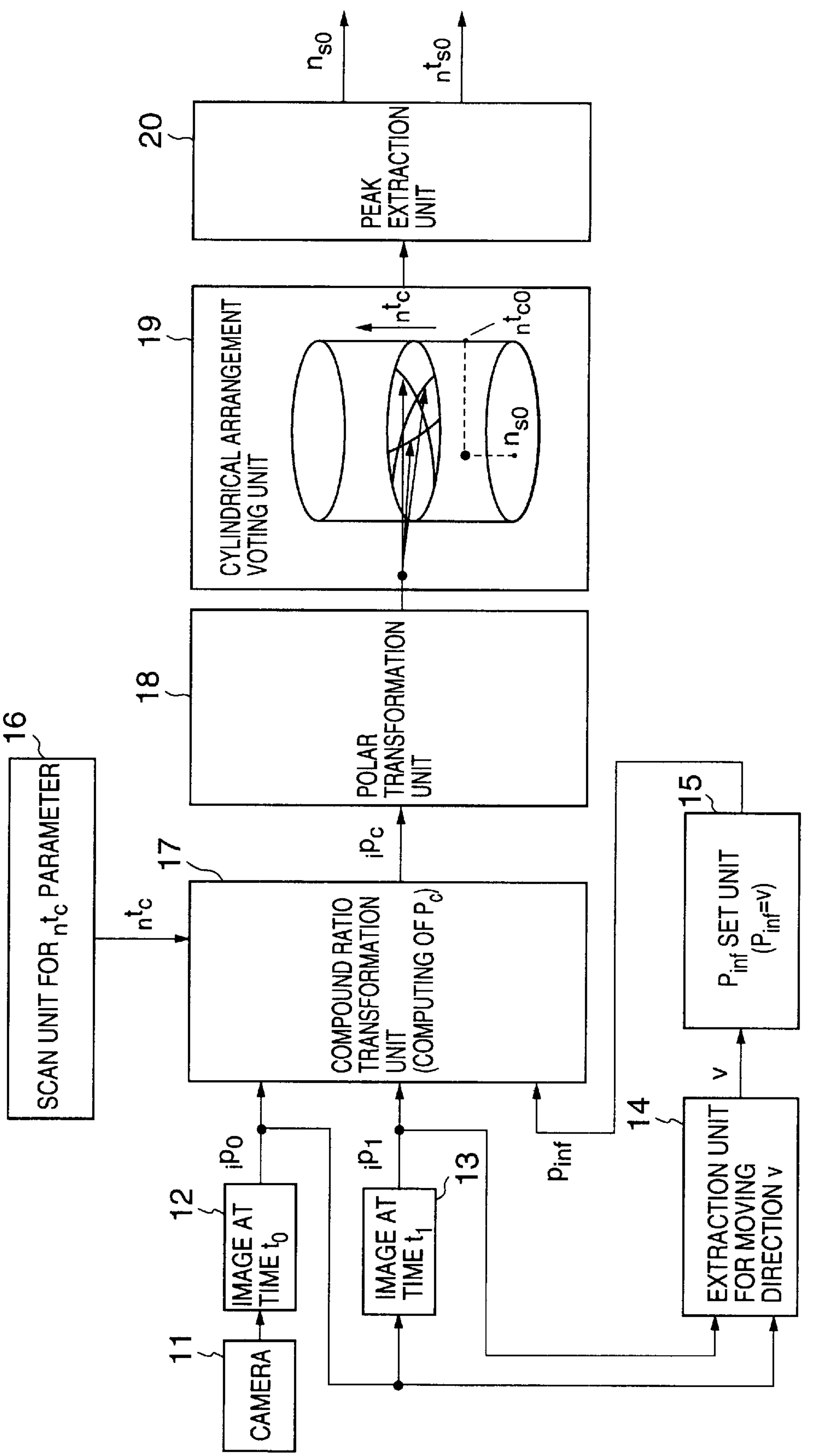

FIG. 28 is a block diagram of an embodiment A-1 of the present invention.

Figure 29:
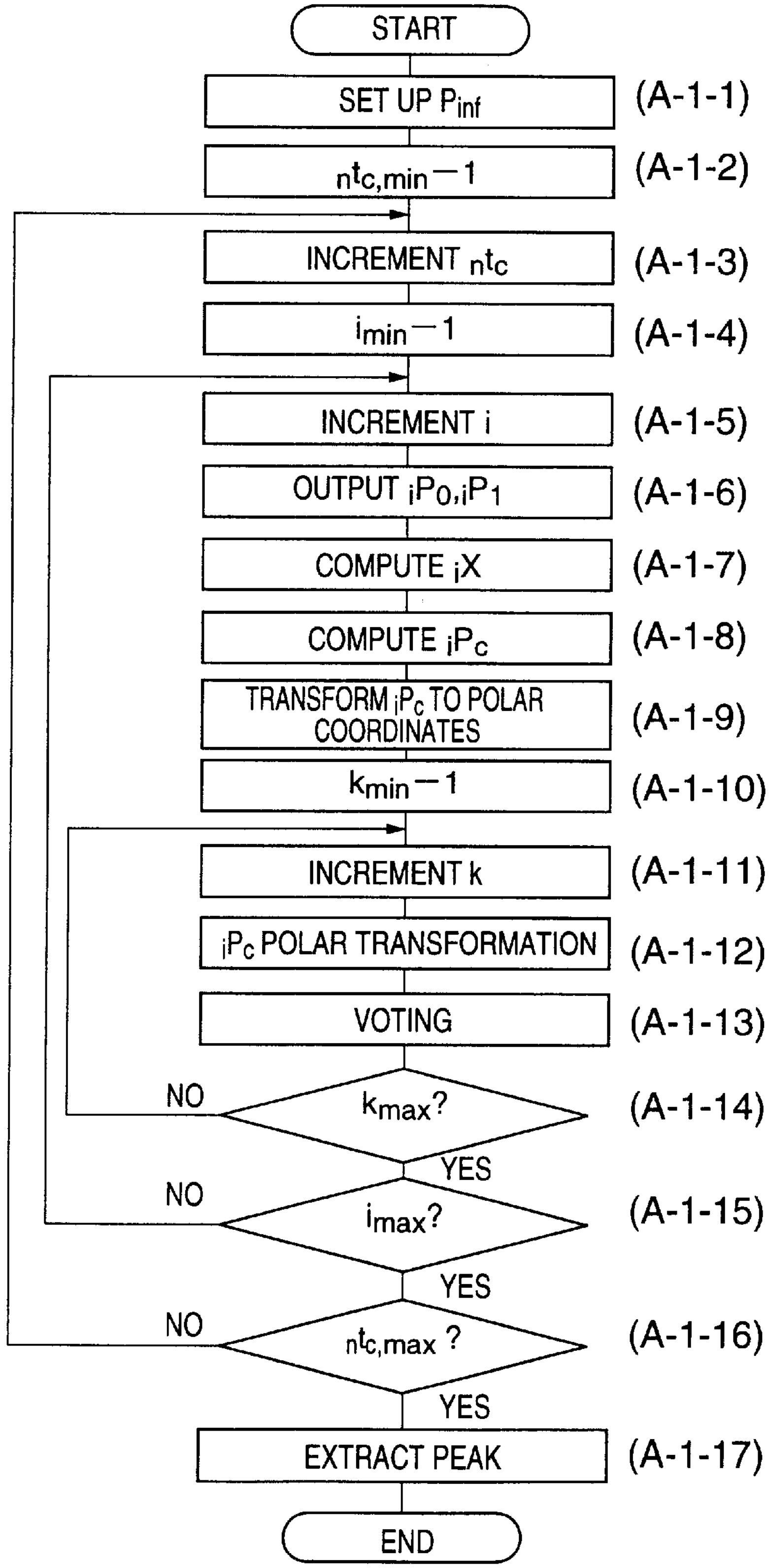

FIG. 29 is a flowchart of the embodiment A-1.

Figure 30A:
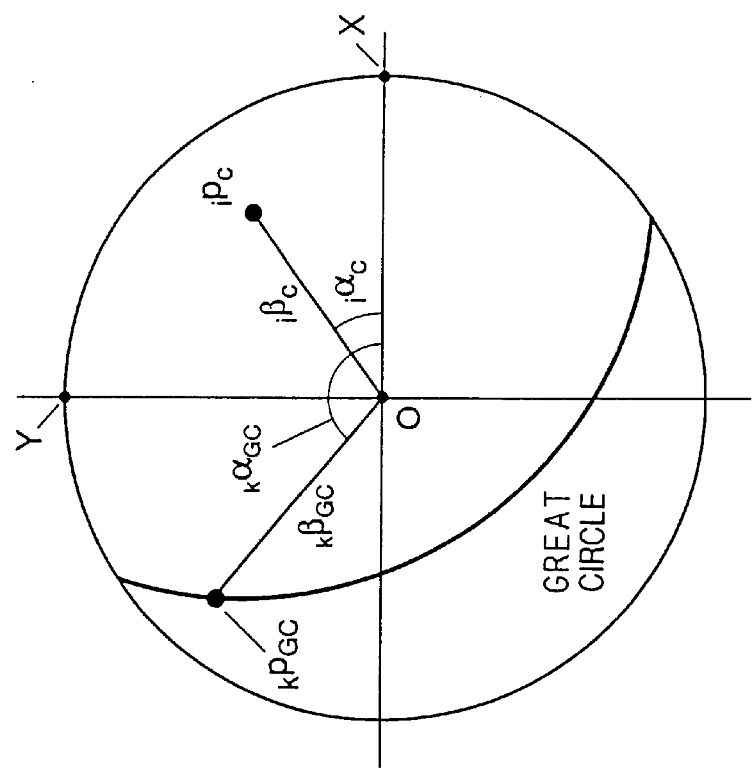
Figure 30B:
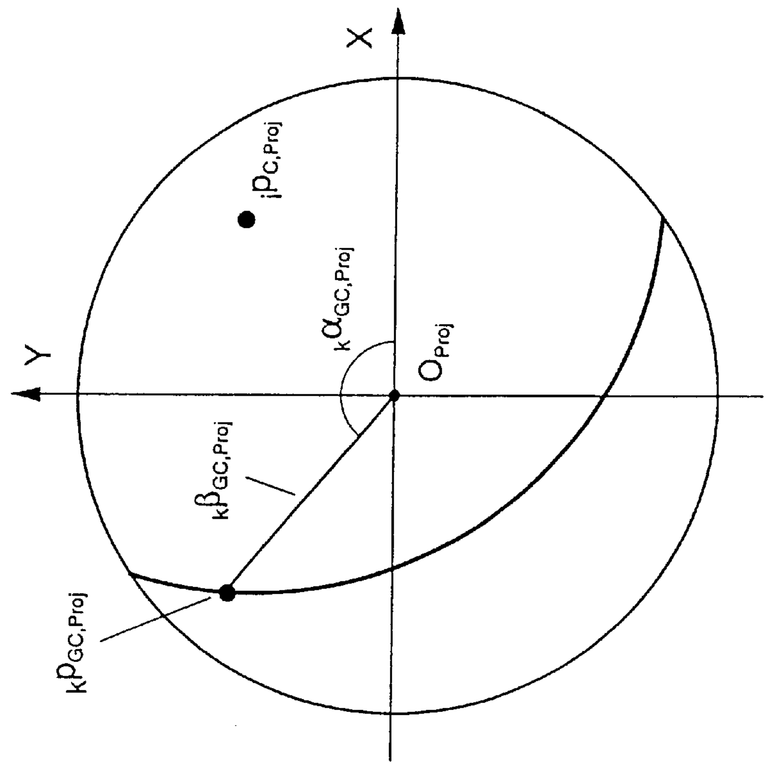

FIG. 30 is an explanatory view useful for understanding the embodiment A-1.

Figure 31:
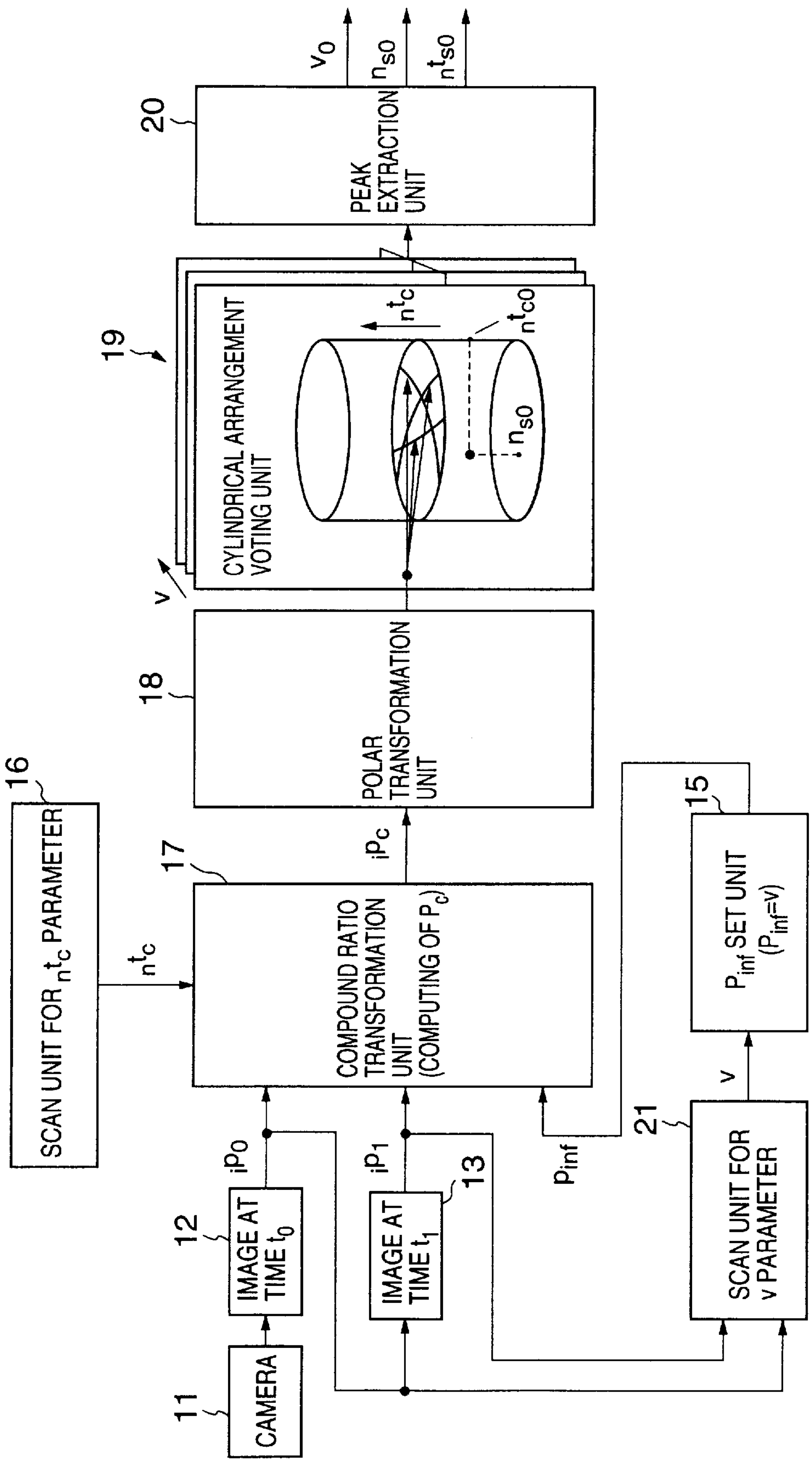

FIG. 31 is a block diagram of an embodiment A-2 of the present invention.

Figure 32:
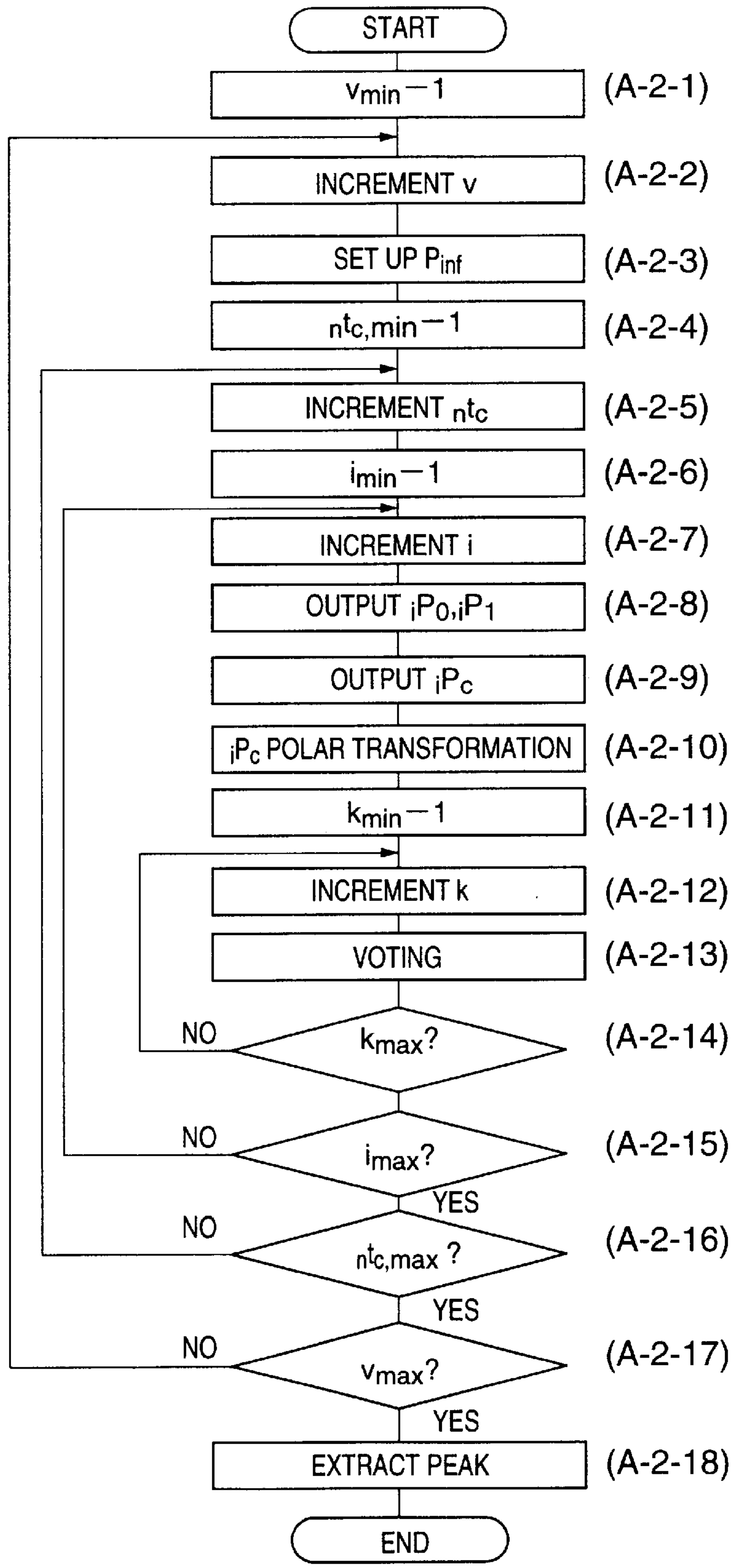

FIG. 32 is a flowchart of the embodiment A-2.

Figure 33:
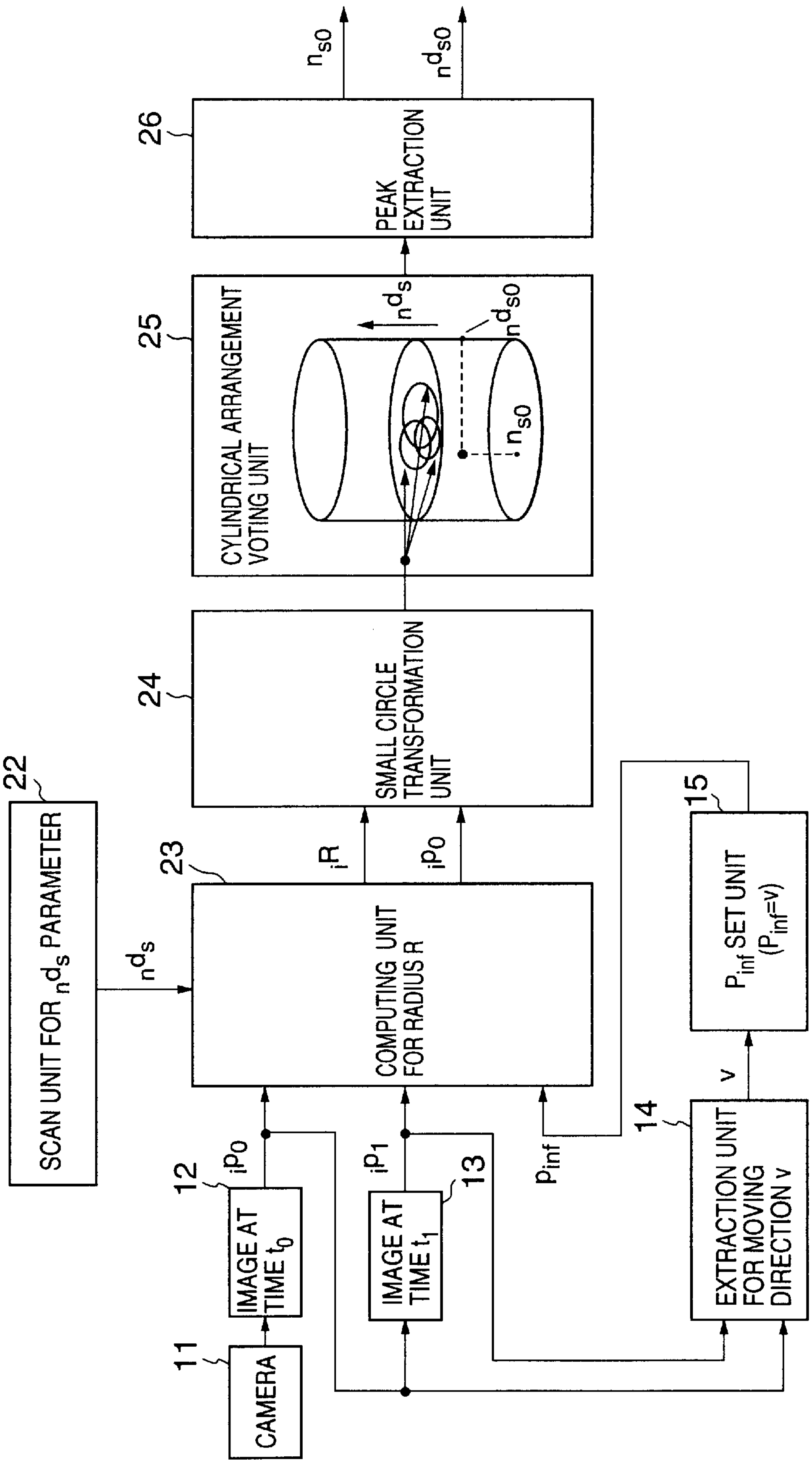

FIG. 33 is a block diagram of an embodiment A-3 of the present invention.

Figure 34:
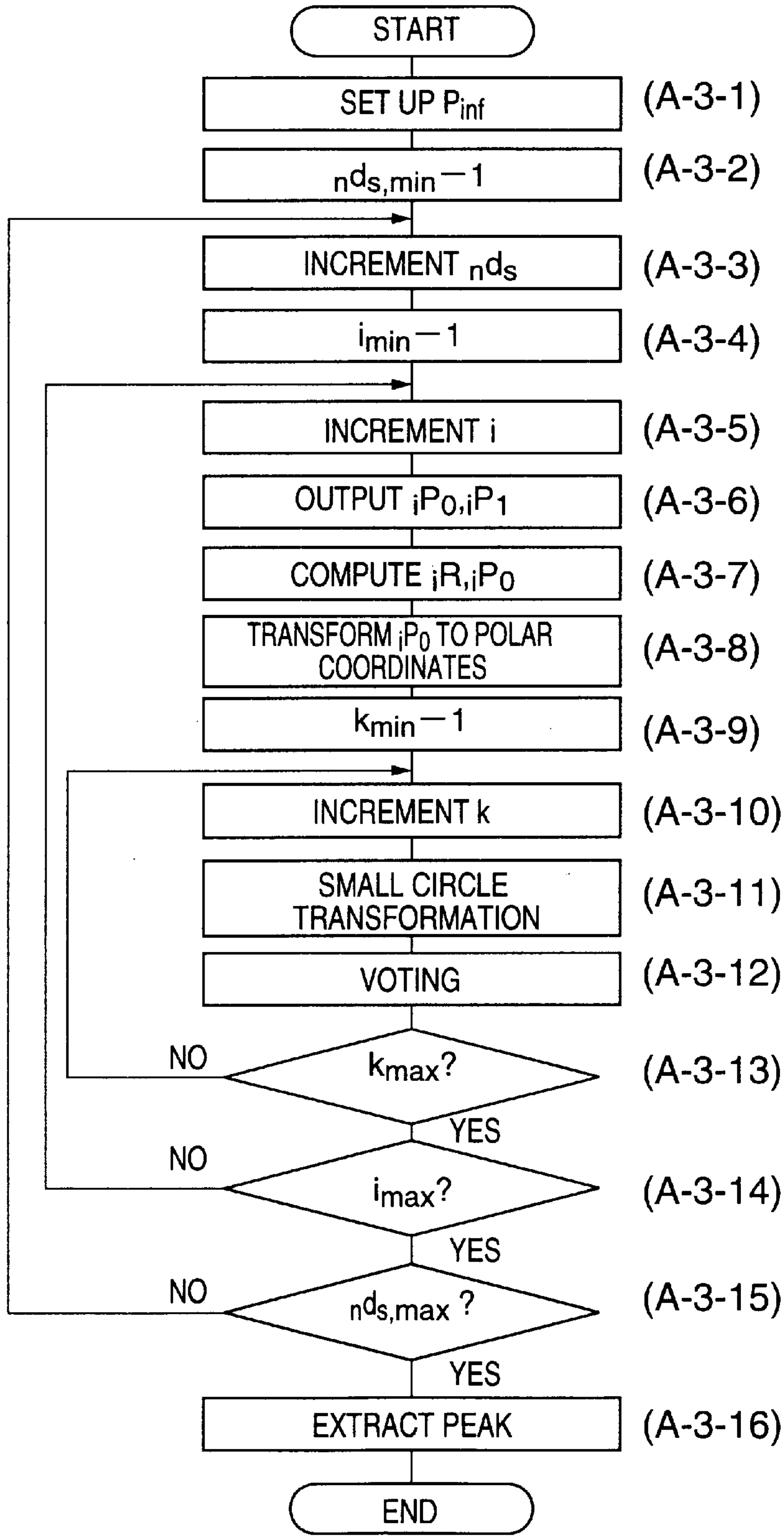

FIG. 34 is a flowchart of the embodiment A-3.

Figure 35A:
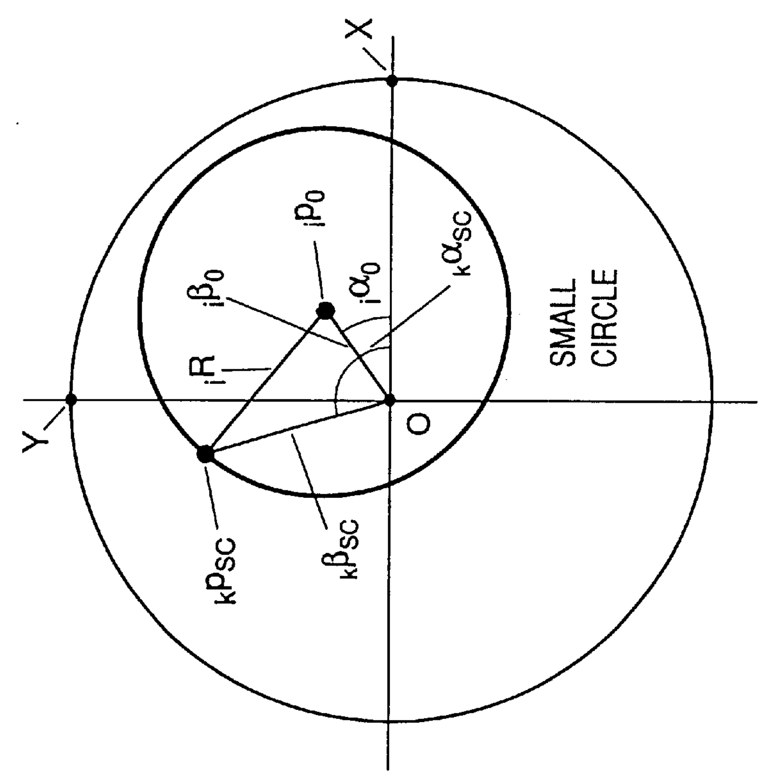
Figure 35B:
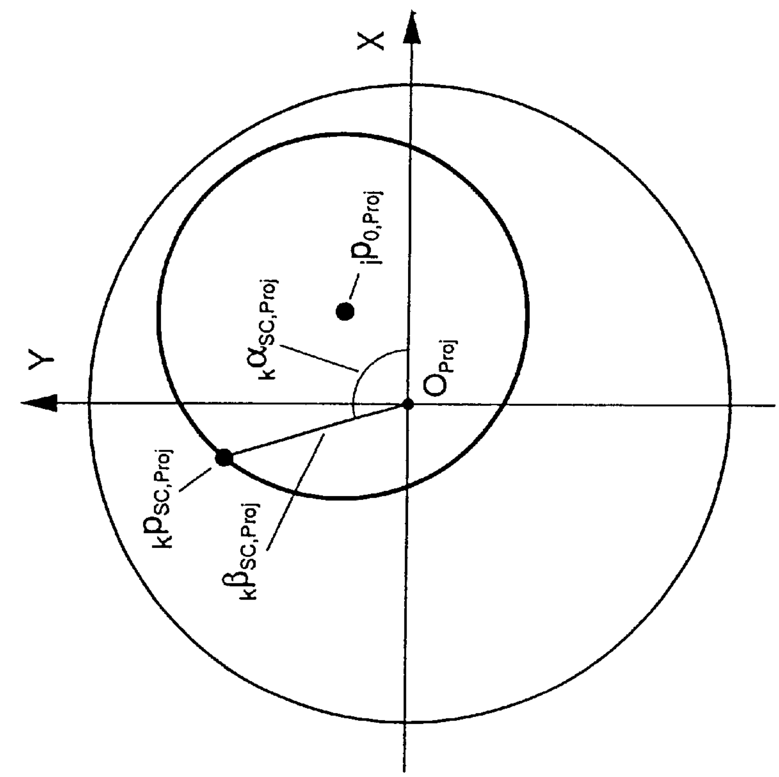

FIG. 35 is an explanatory view useful for understanding the embodiment A-3.

Figure 36:
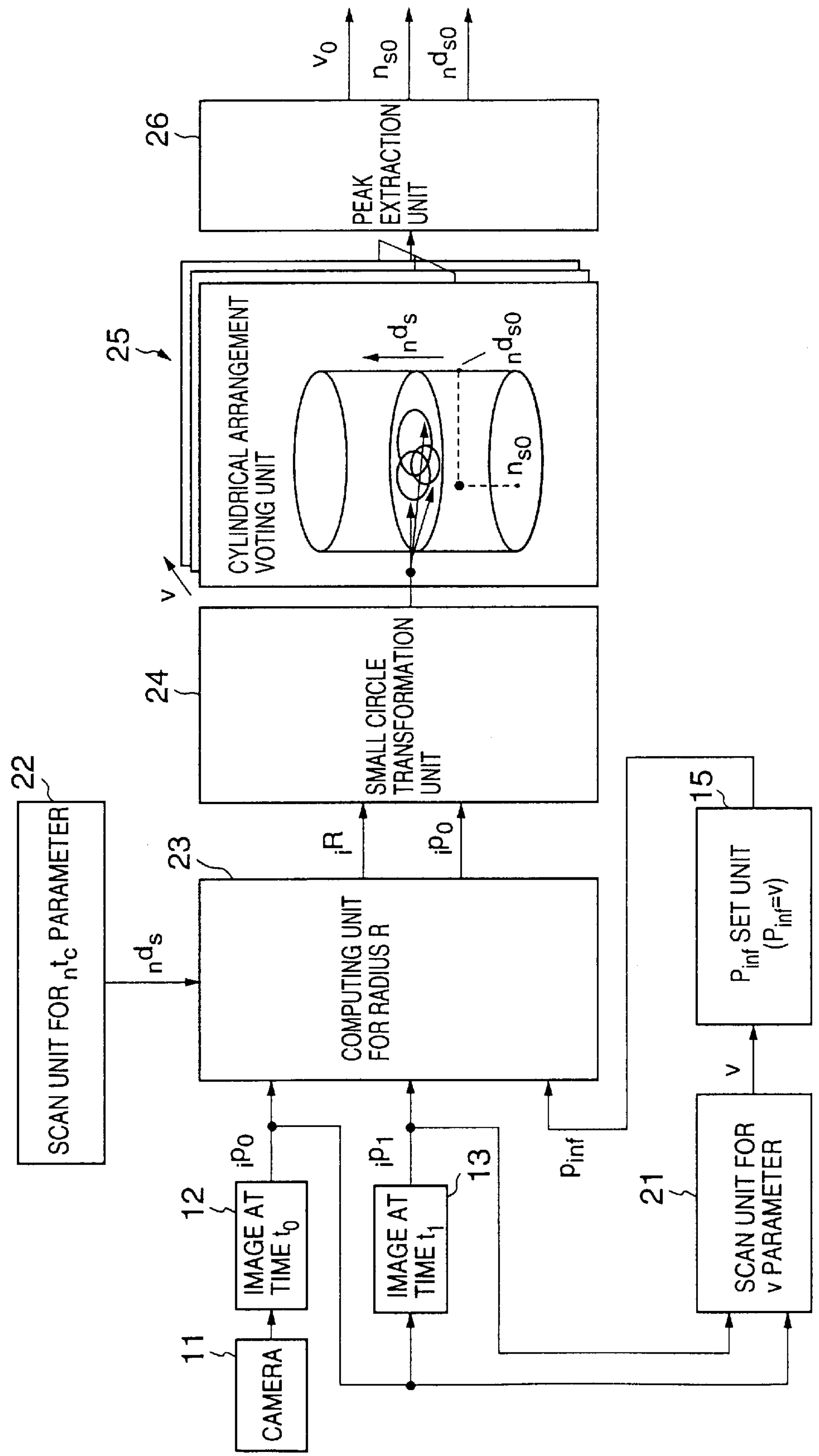

FIG. 36 is a block diagram of an embodiment A-4 of the present invention.

Figure 37:
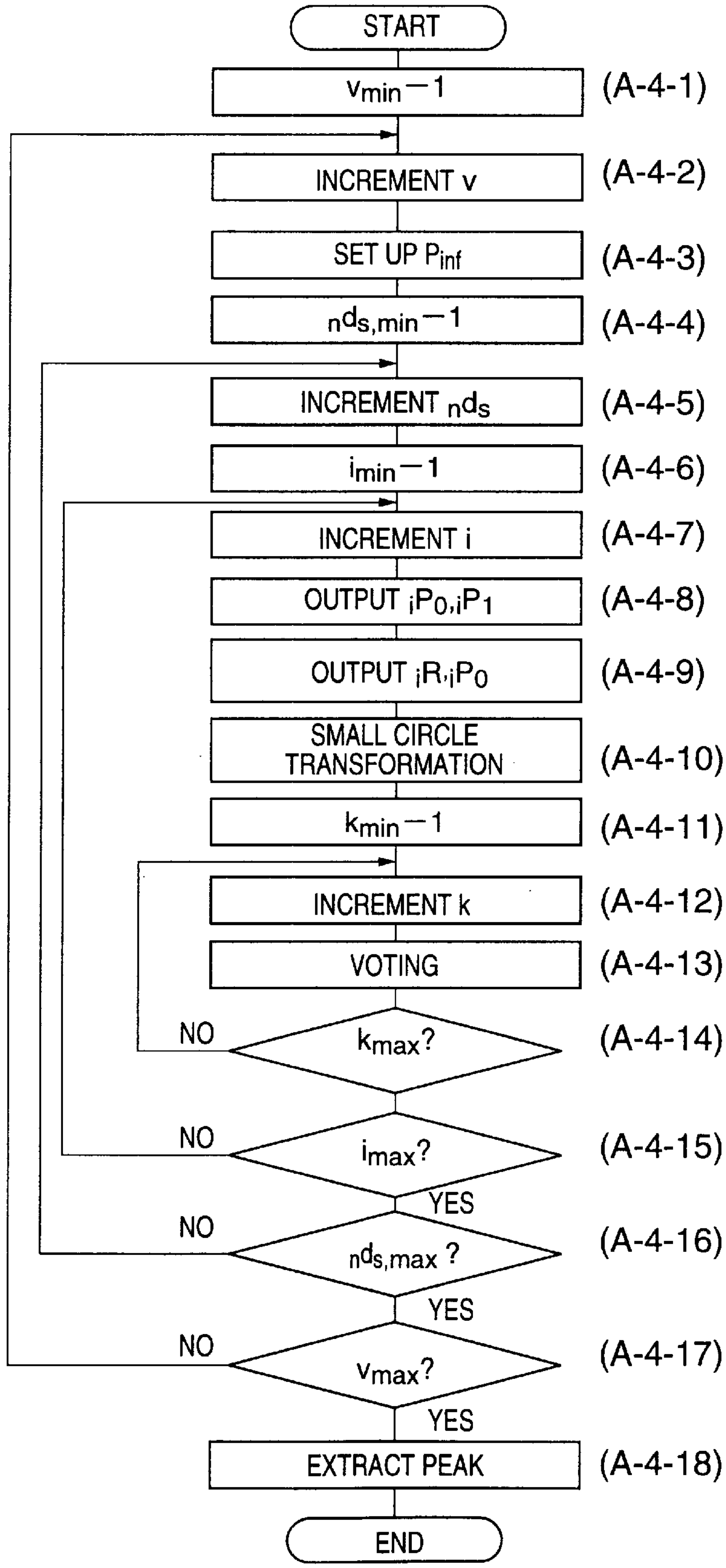

FIG. 37 is a flowchart of the embodiment A-4.

Figure 38:
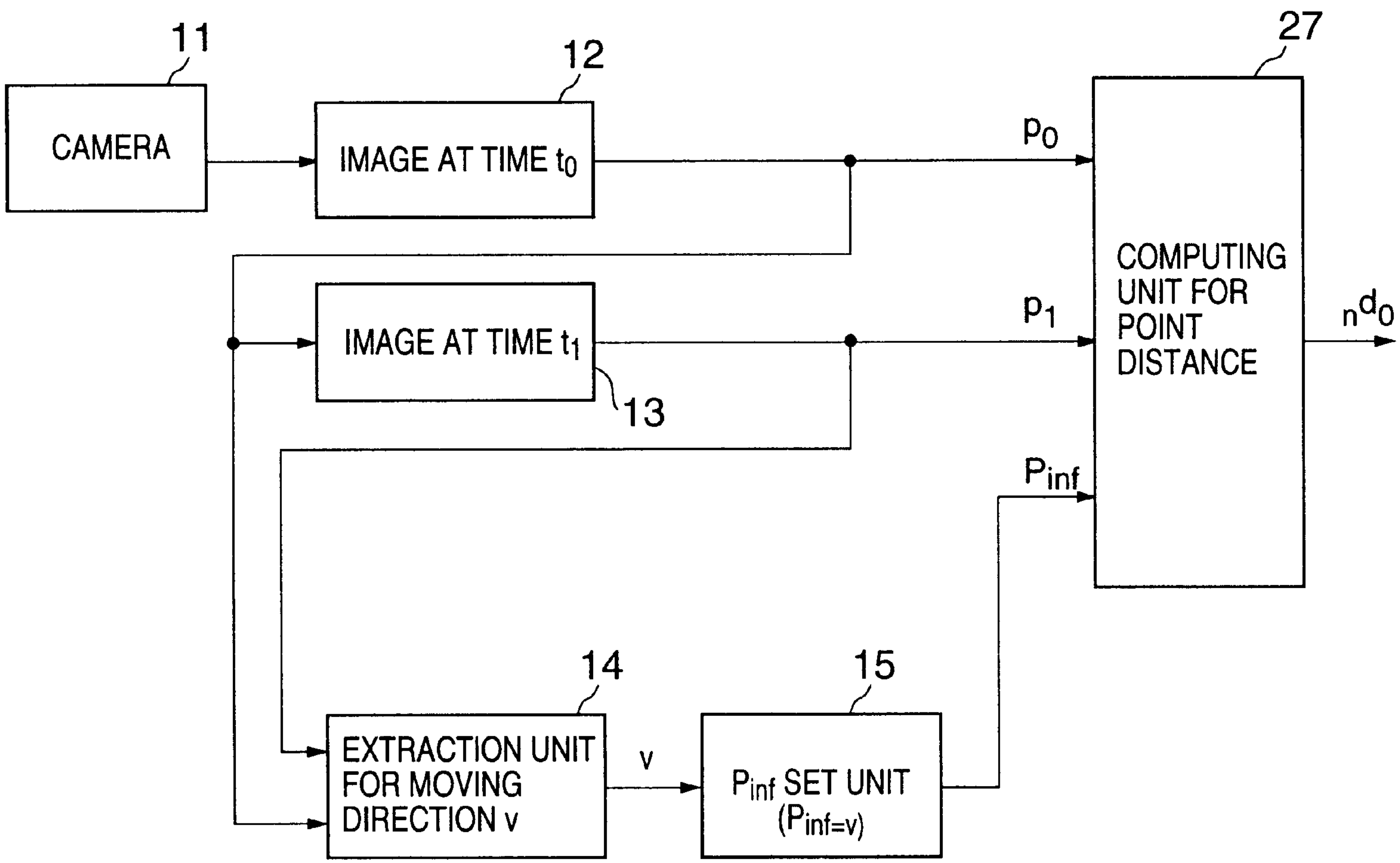

FIG. 38 is a block diagram of an embodiment A-5 of the present invention.

Figure 39:
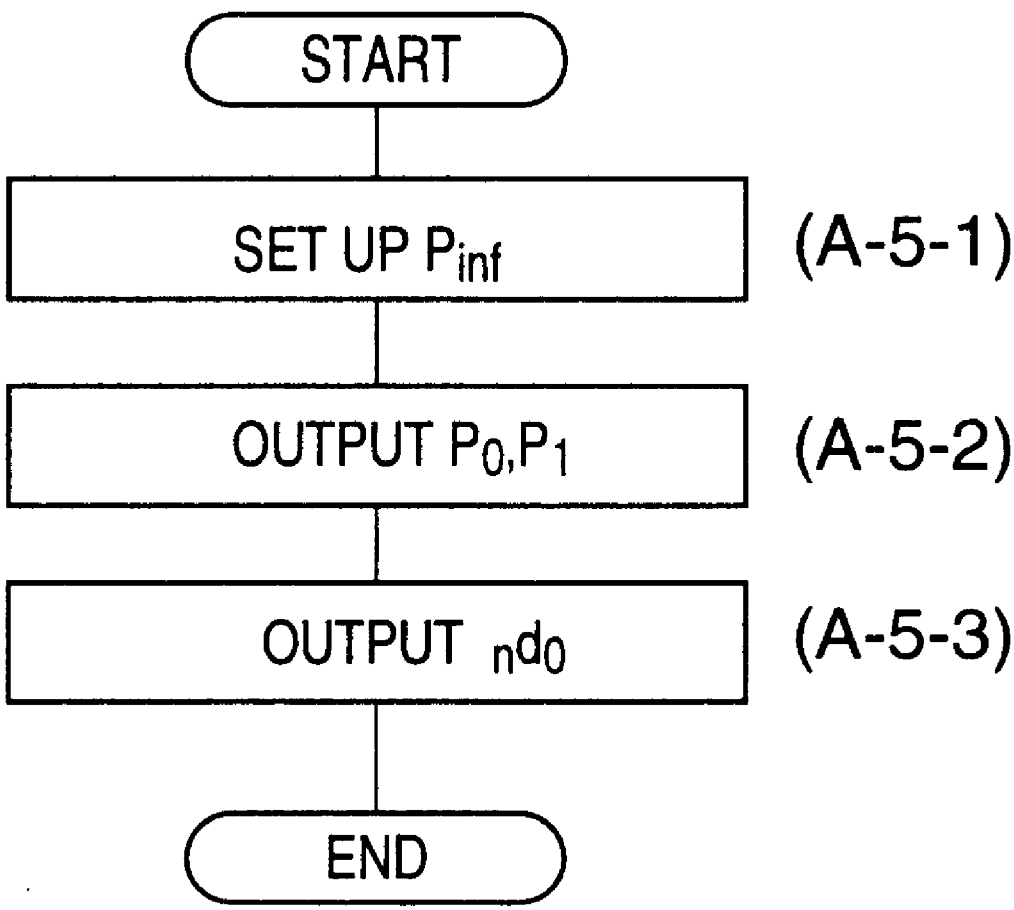

FIG. 39 is a flowchart of the embodiment A-5.

Figure 40:
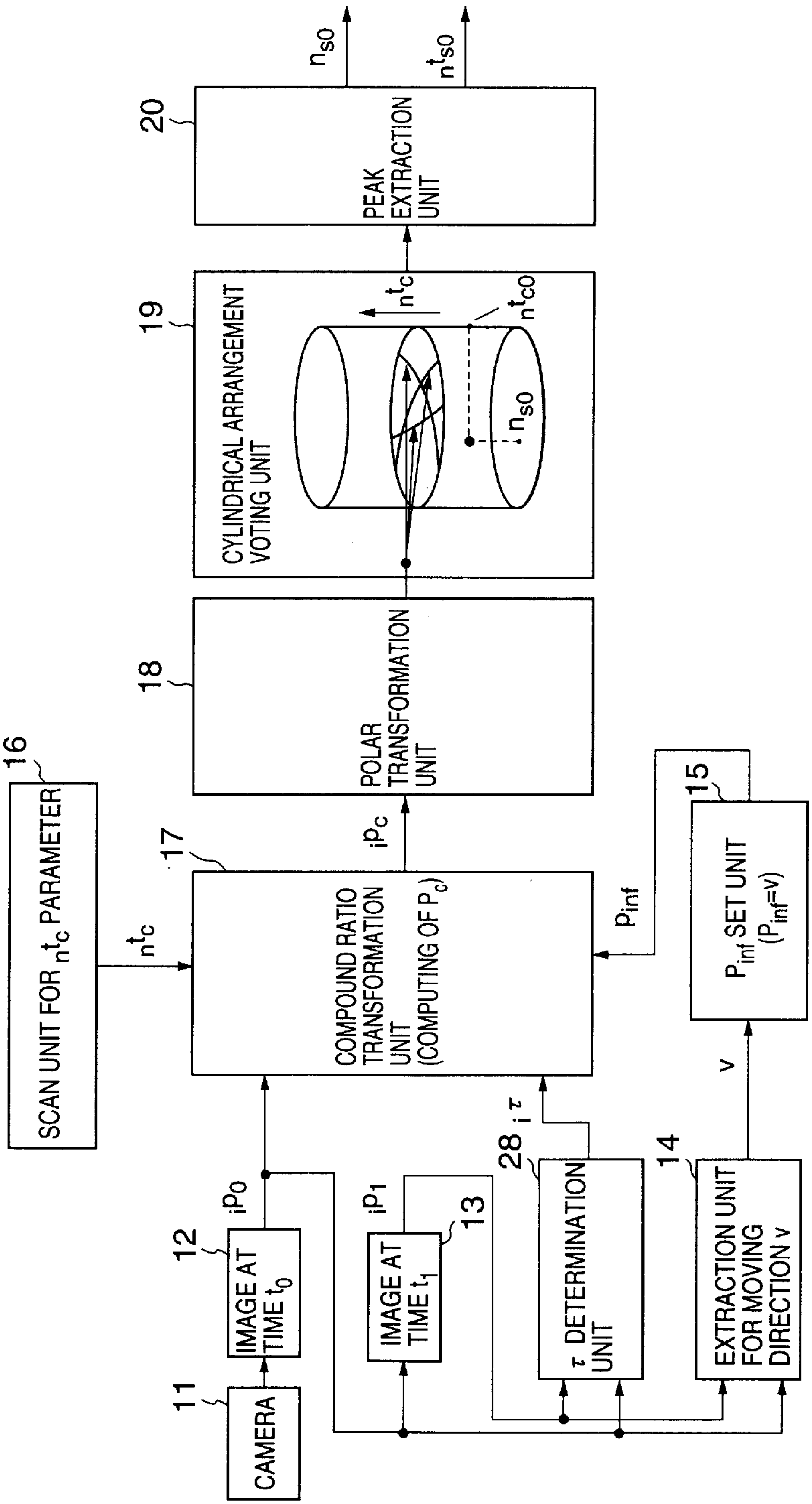

FIG. 40 is a block diagram of an embodiment A-6 of the present invention.

Figure 41:
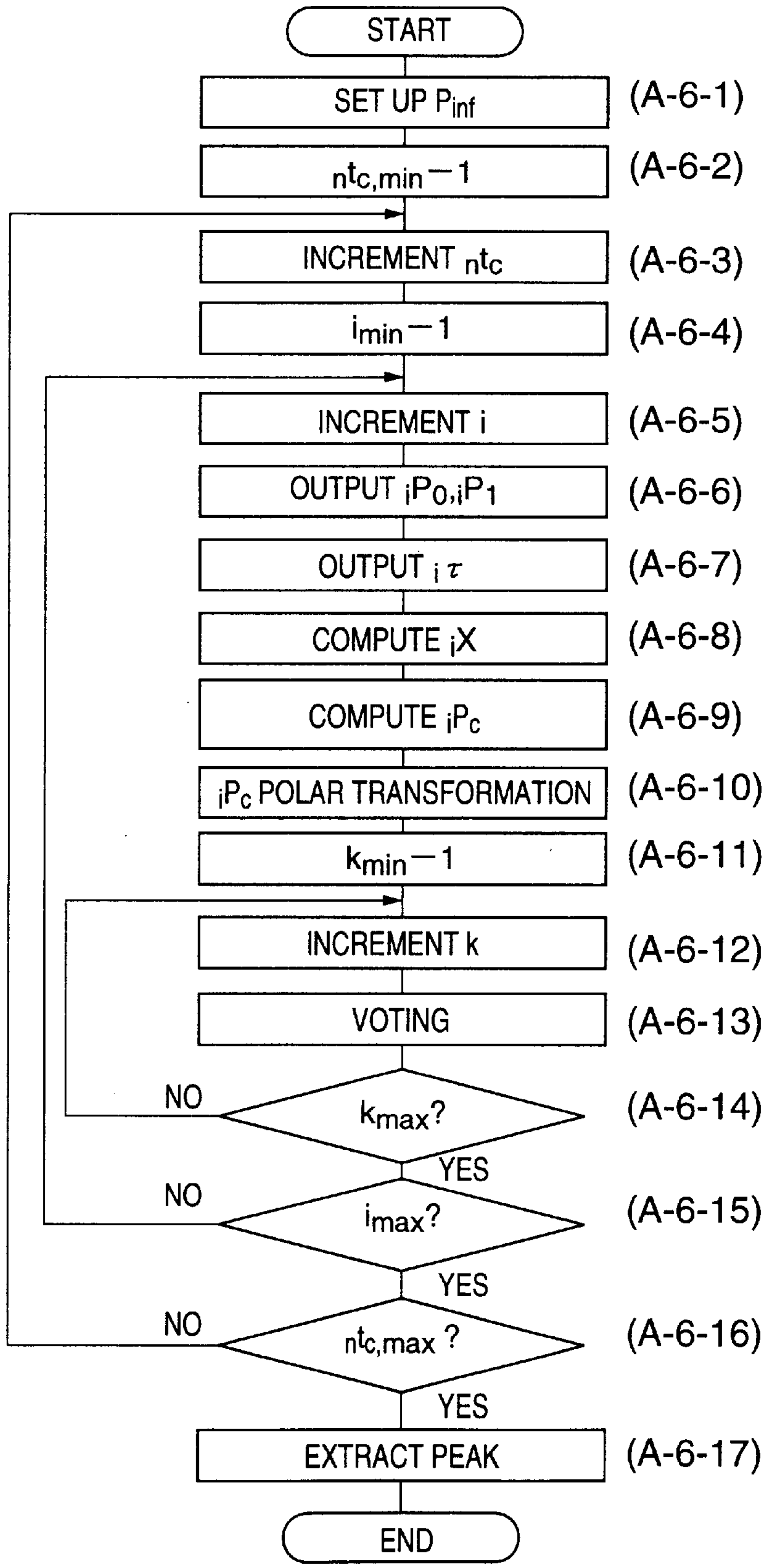

FIG. 41 is a flowchart of the embodiment A-6.

Figure 42:
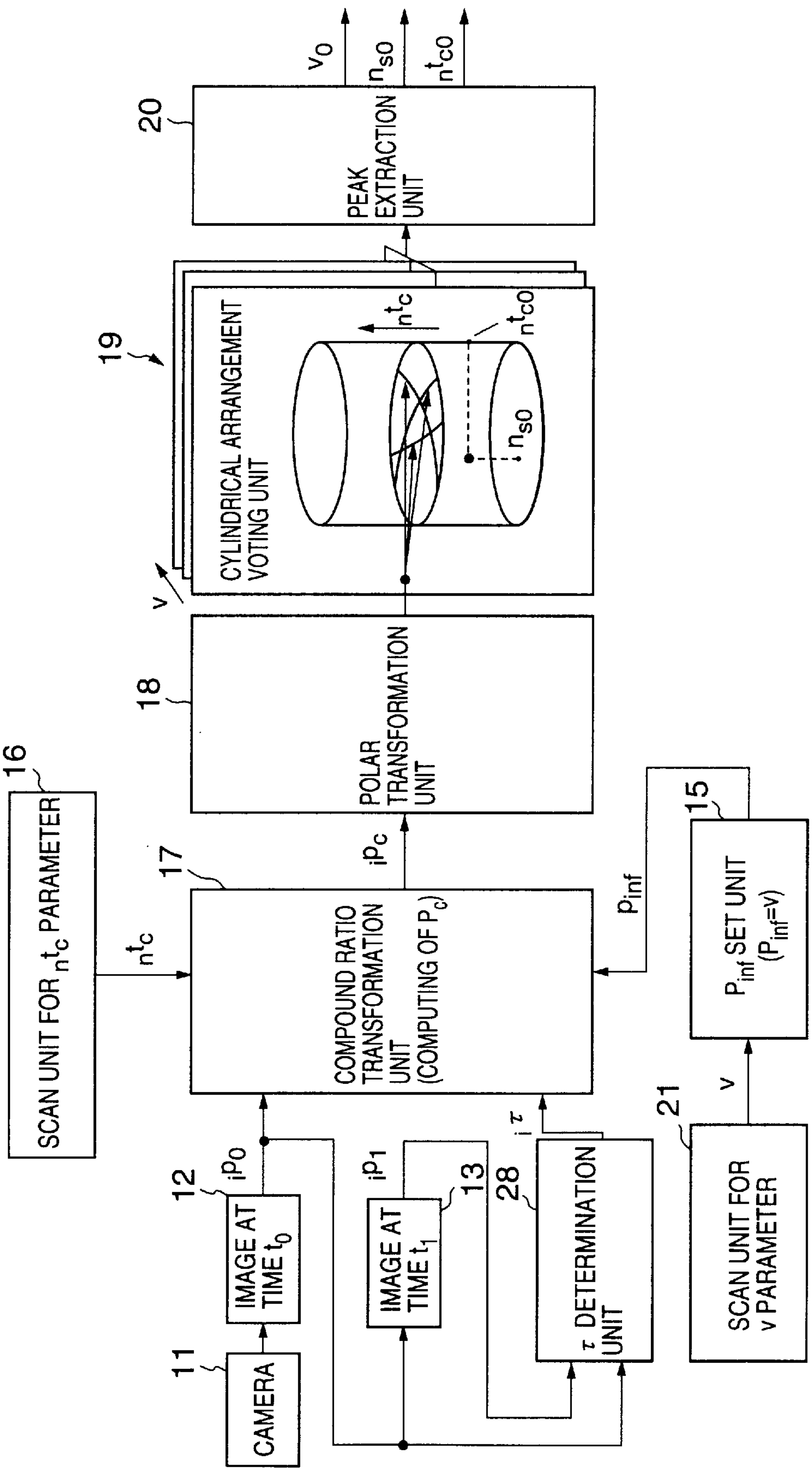

FIG. 42 is a block diagram of an embodiment A-7 of the present invention.

Figure 43:
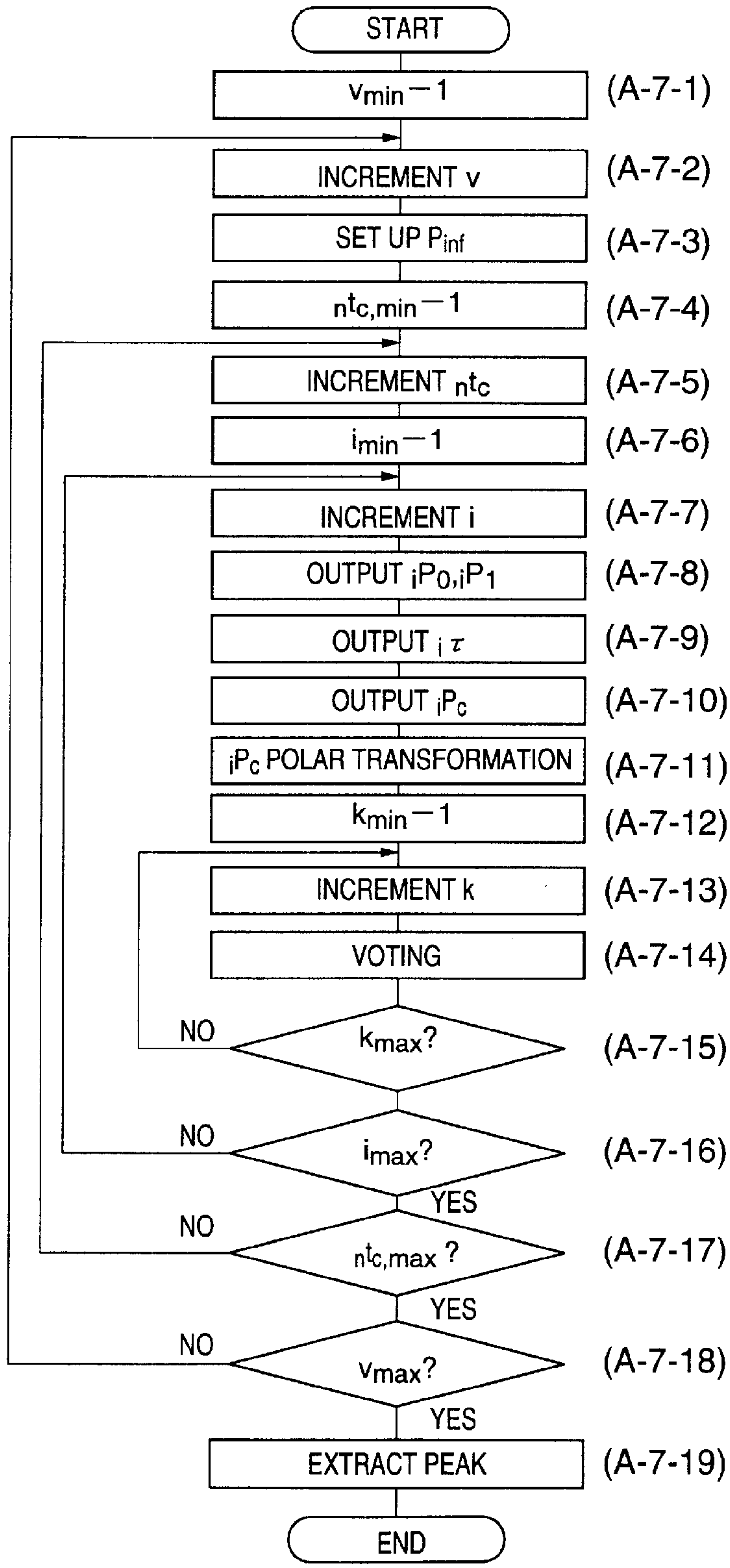

FIG. 43 is a flowchart of the embodiment A-7.

Figure 44:
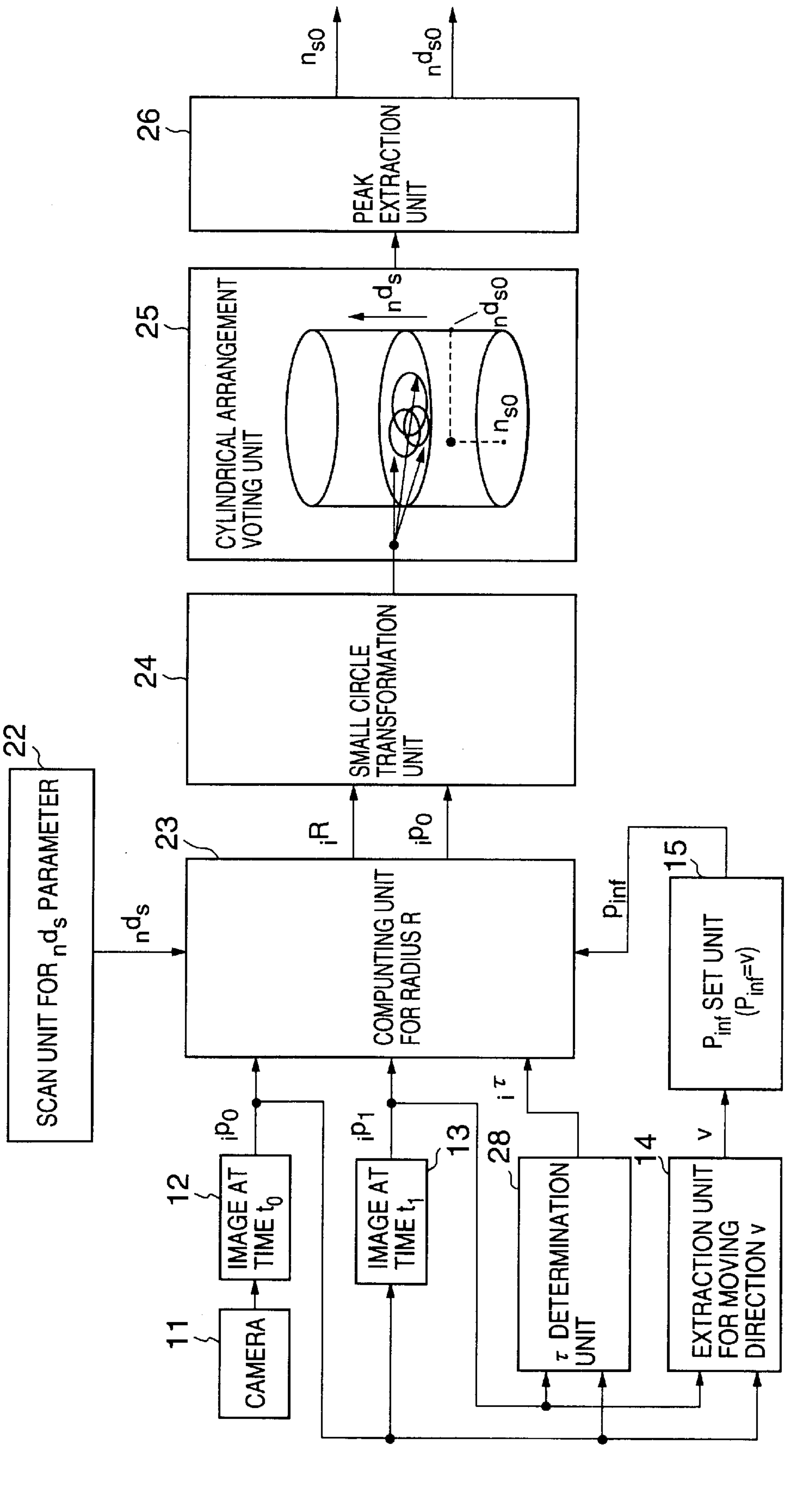

FIG. 44 is a block diagram of an embodiment A-8 of the present invention.

Figure 45:
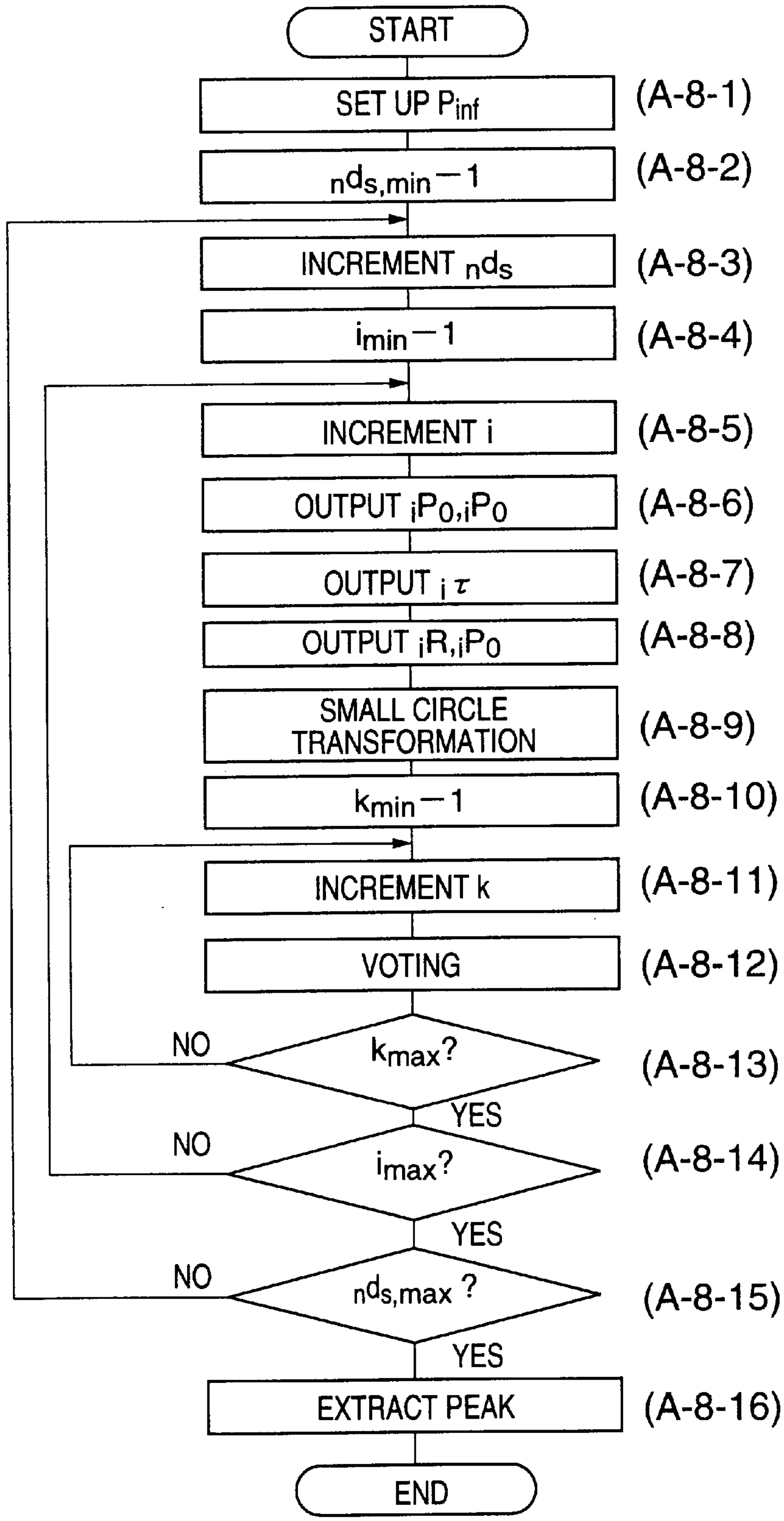

FIG. 45 is a flowchart of the embodiment A-8.

Figure 46:
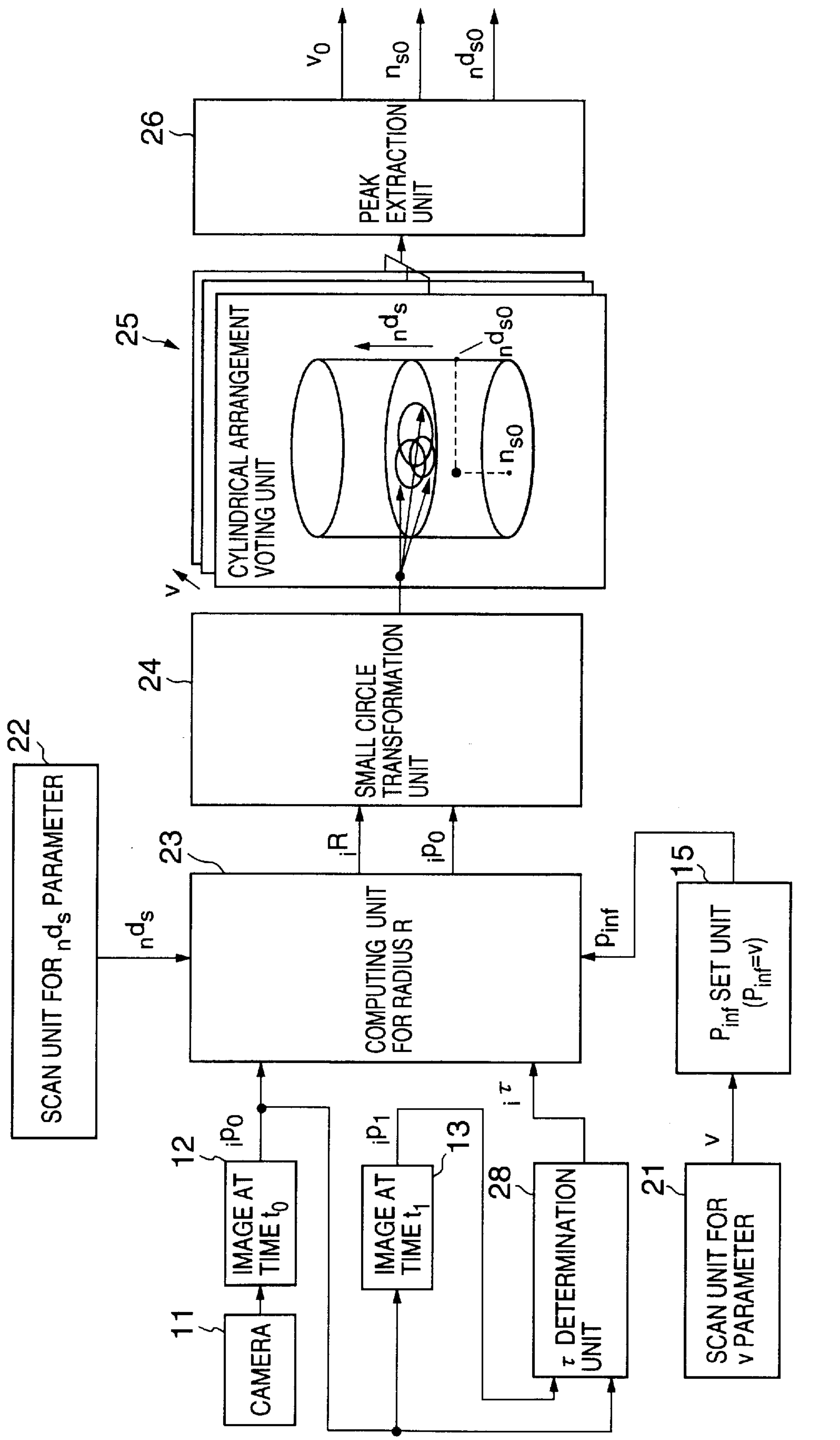

FIG. 46 is a block diagram of an embodiment A-9 of the present invention.

Figure 47:
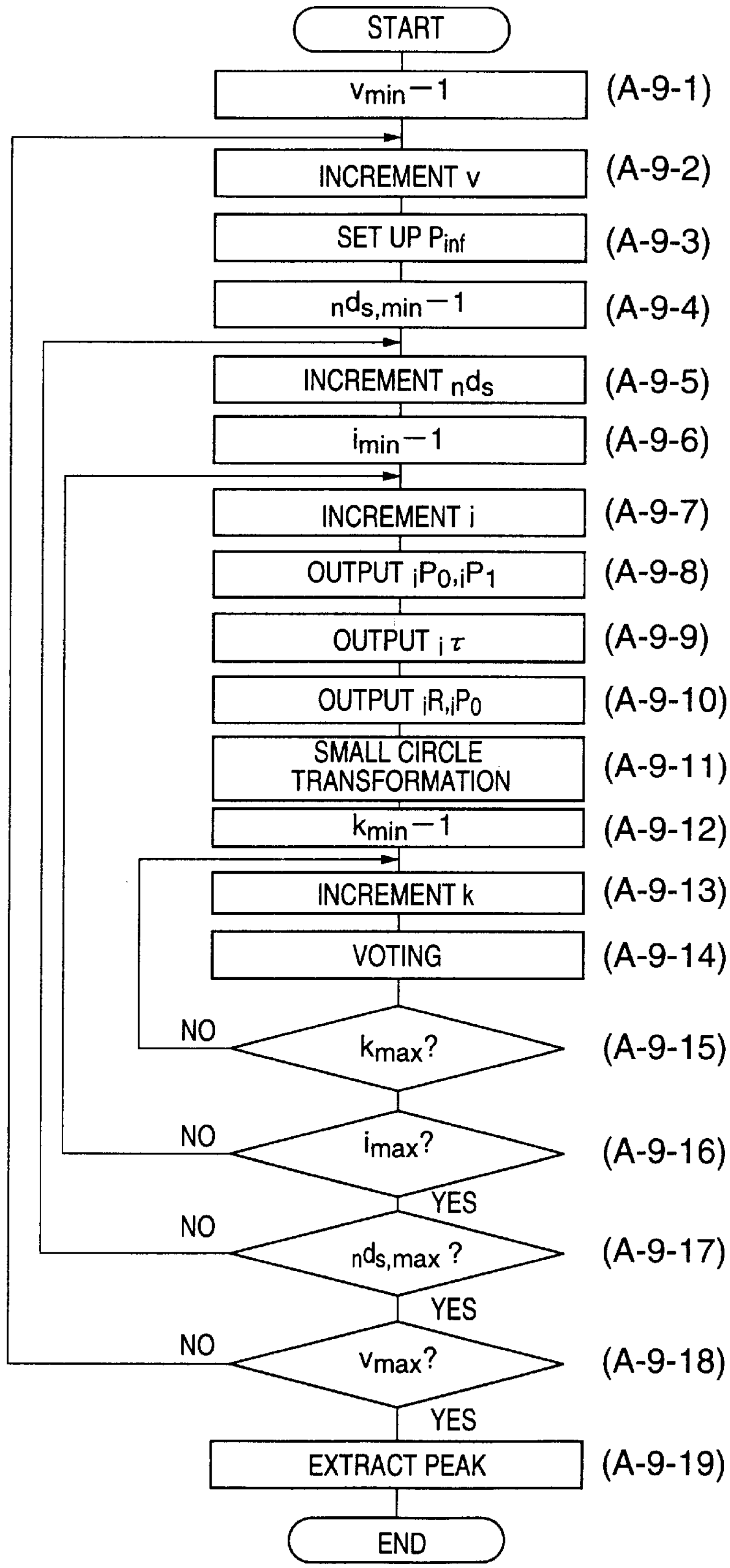

FIG. 47 is a flowchart of the embodiment A-9.

Figure 48:
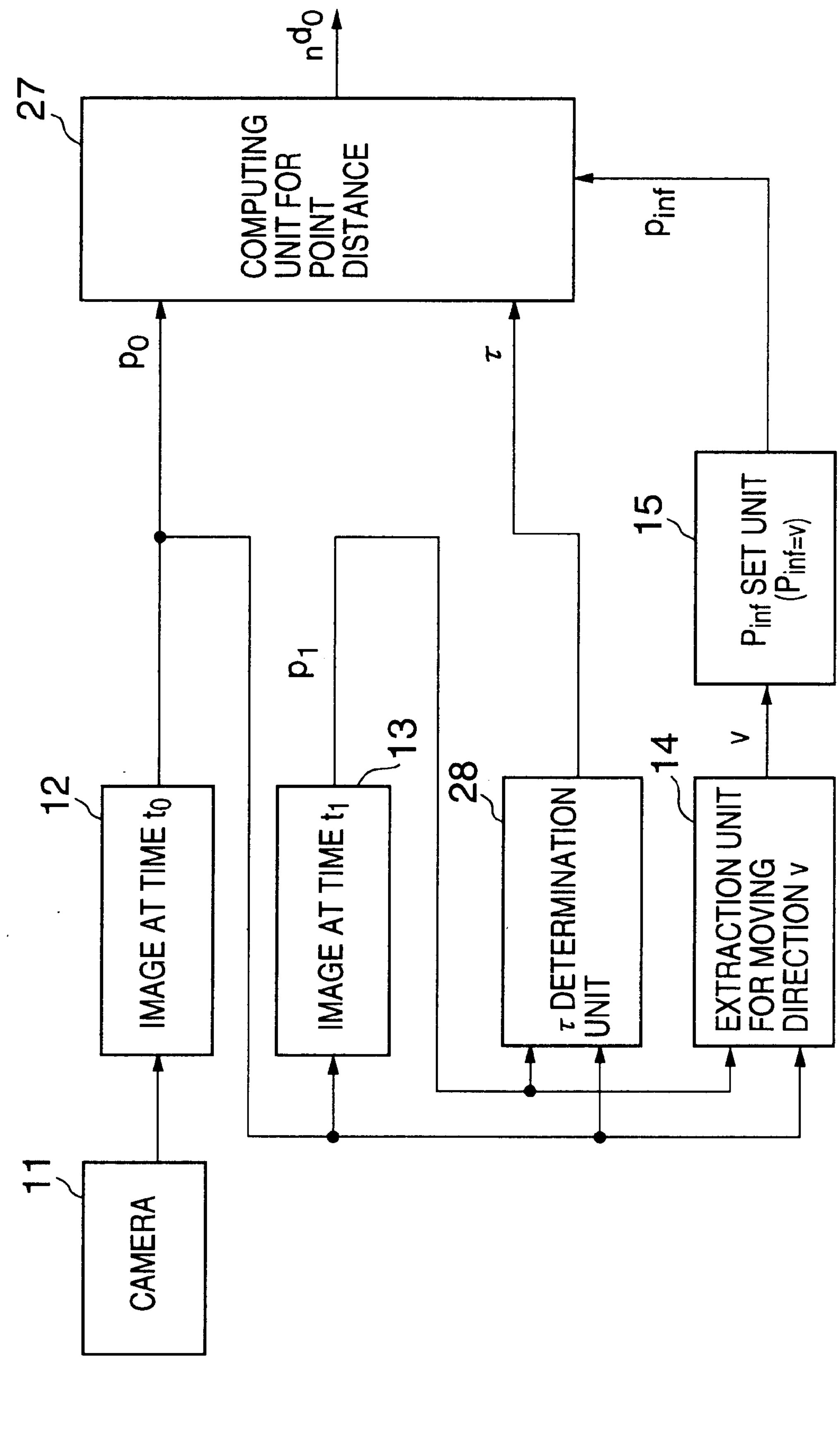

FIG. 48 is a block diagram of an embodiment A-10 of the present invention.

Figure 49:
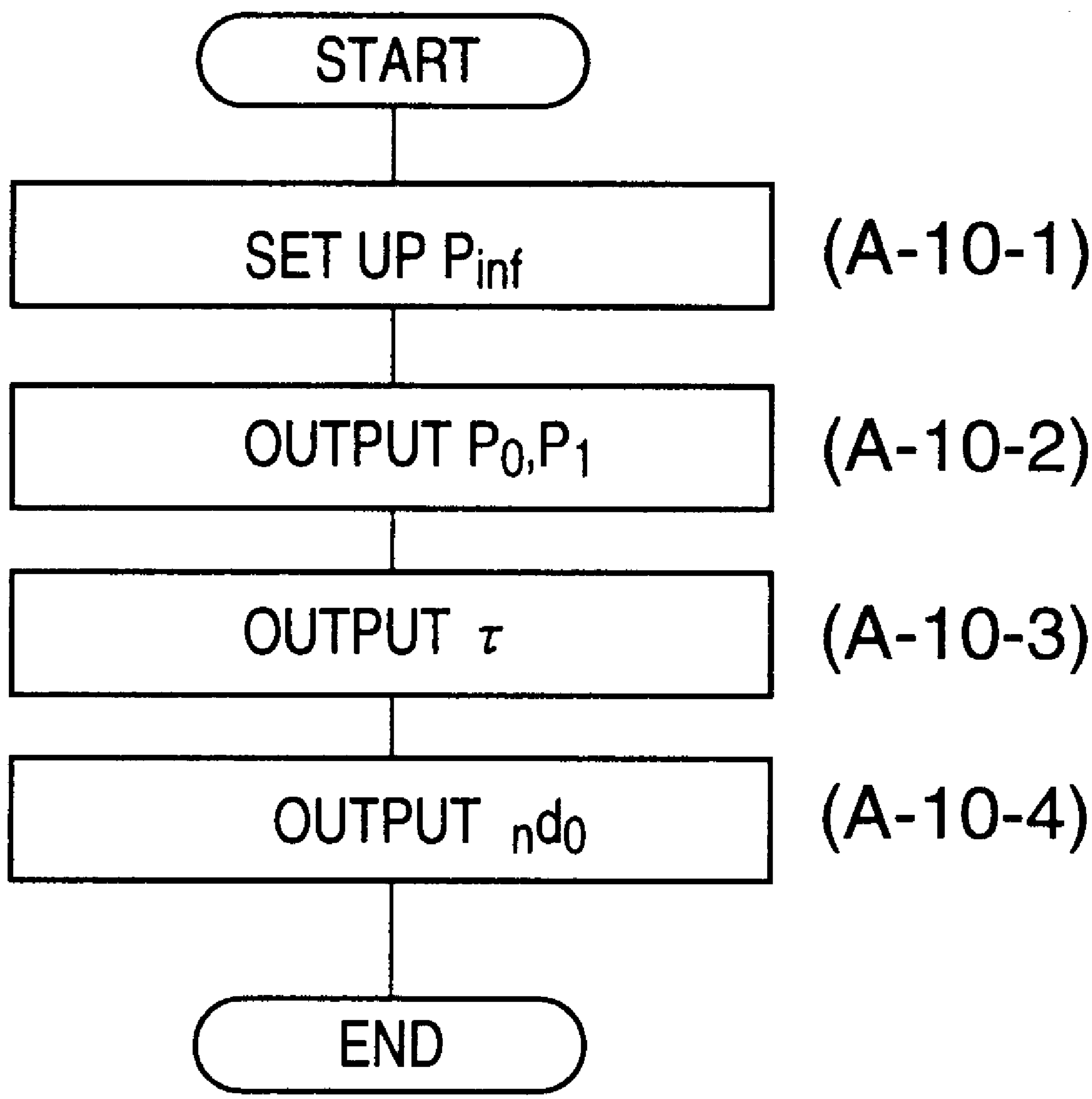

FIG. 49 is a flowchart of the embodiment A-10.

Figure 50:
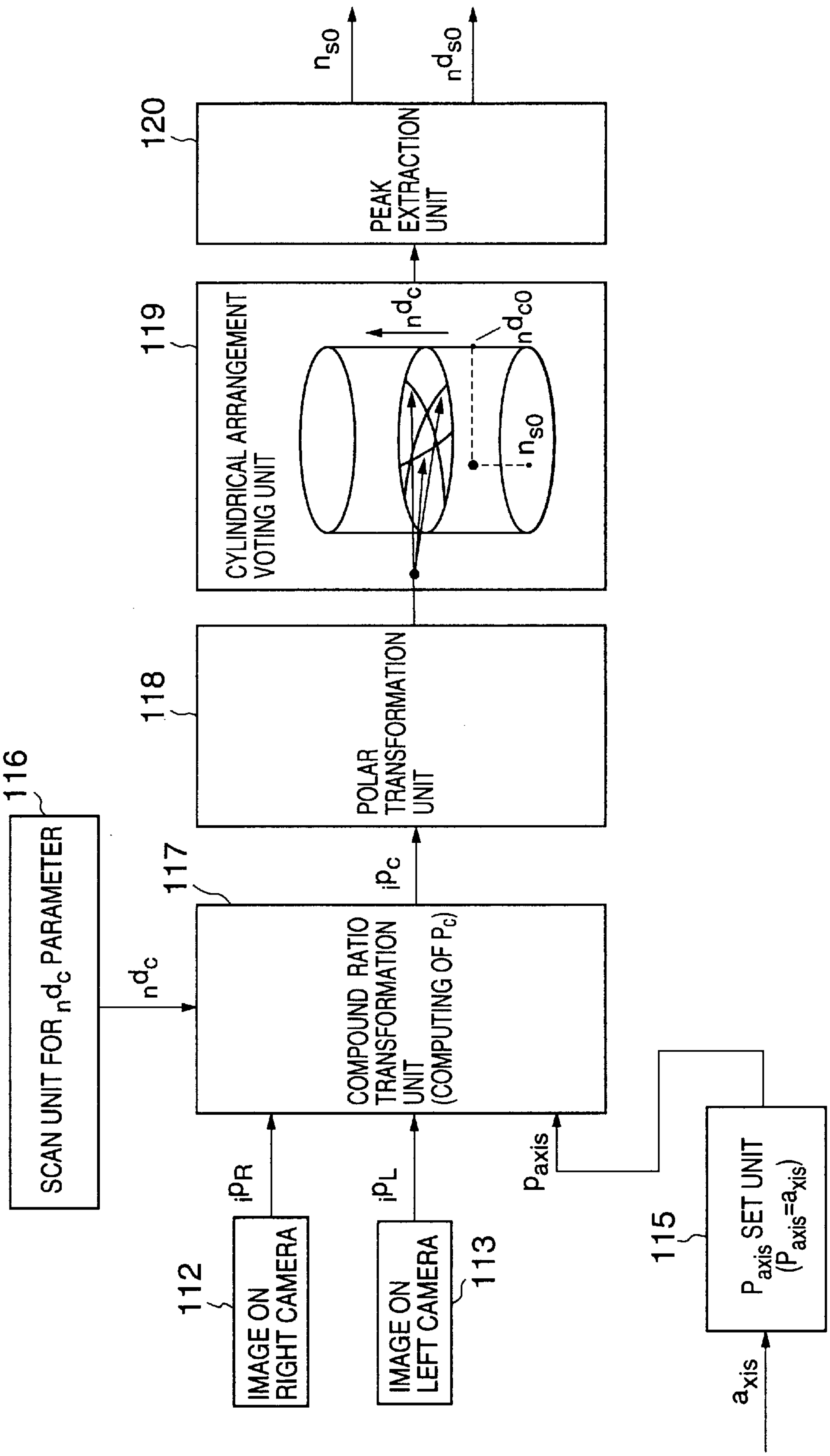

FIG. 50 is a block diagram of an embodiment B-1 of the present invention.

Figure 51:
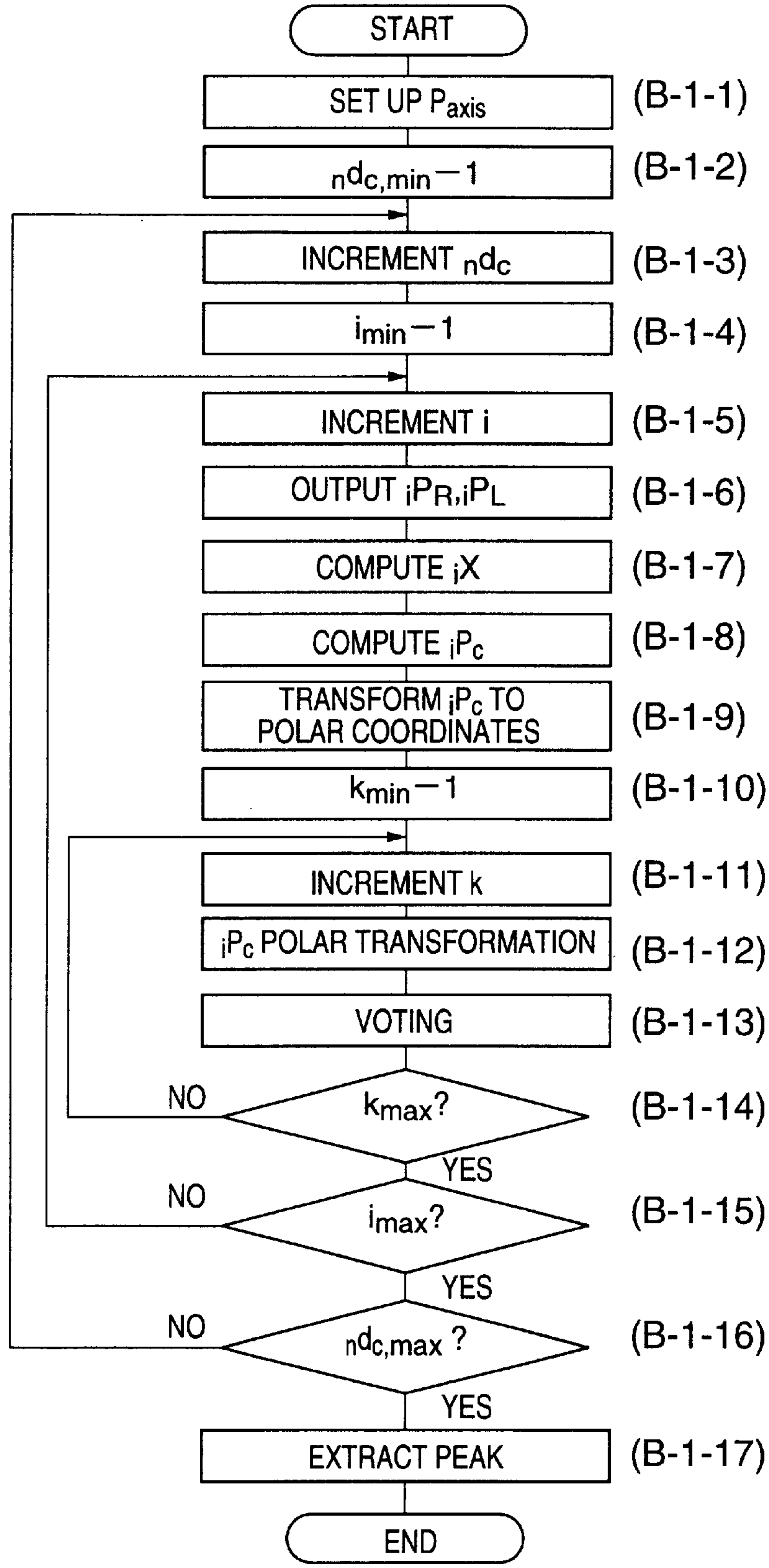

FIG. 51 is a flowchart of the embodiment B-1.

Figure 52:
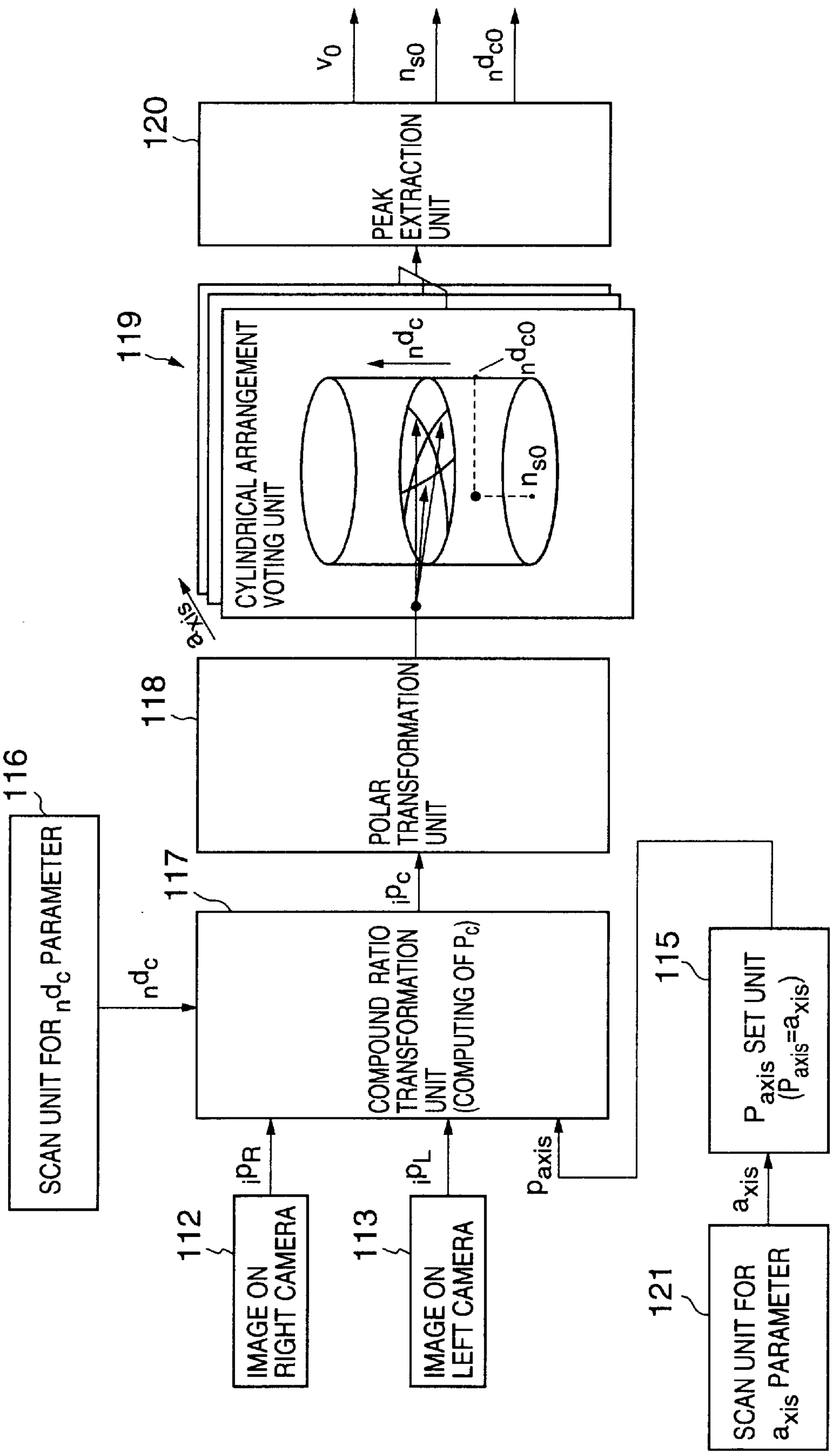

FIG. 52 is a block diagram of an embodiment B-2 of the present invention.

Figure 53:
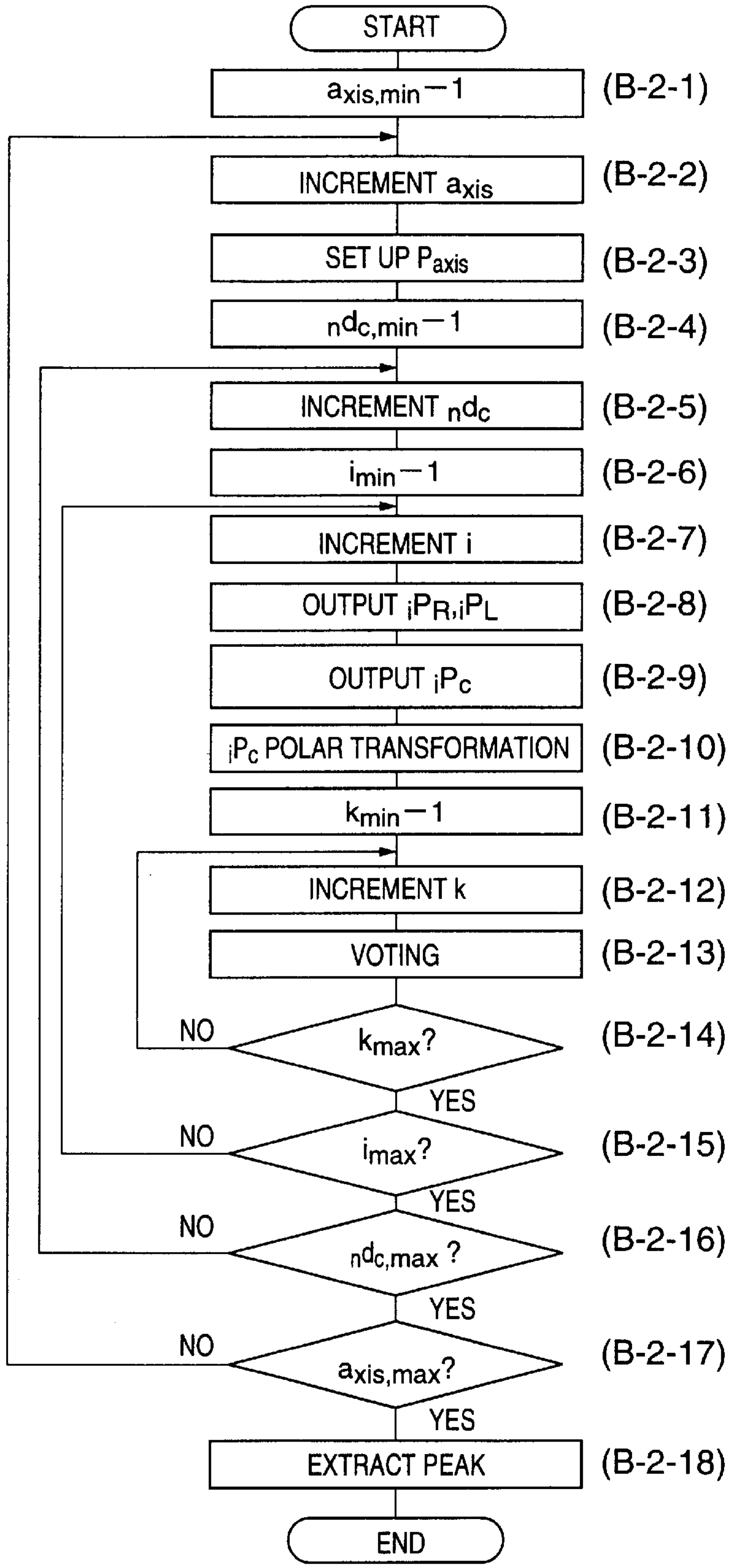

FIG. 53 is a flowchart of the embodiment B-2.

Figure 54:
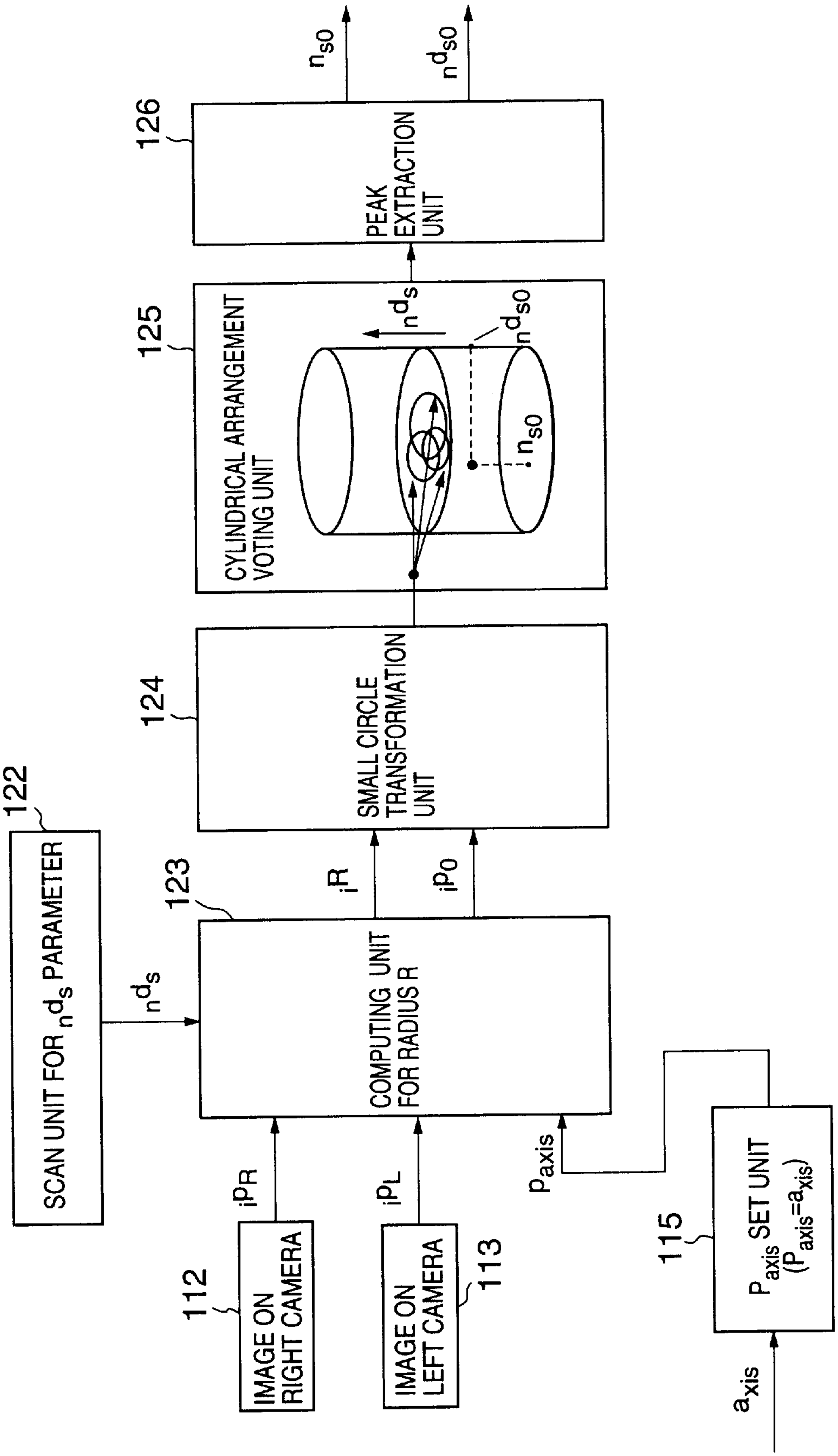

FIG. 54 is a block diagram of an embodiment B-3 of the present invention.

Figure 55:
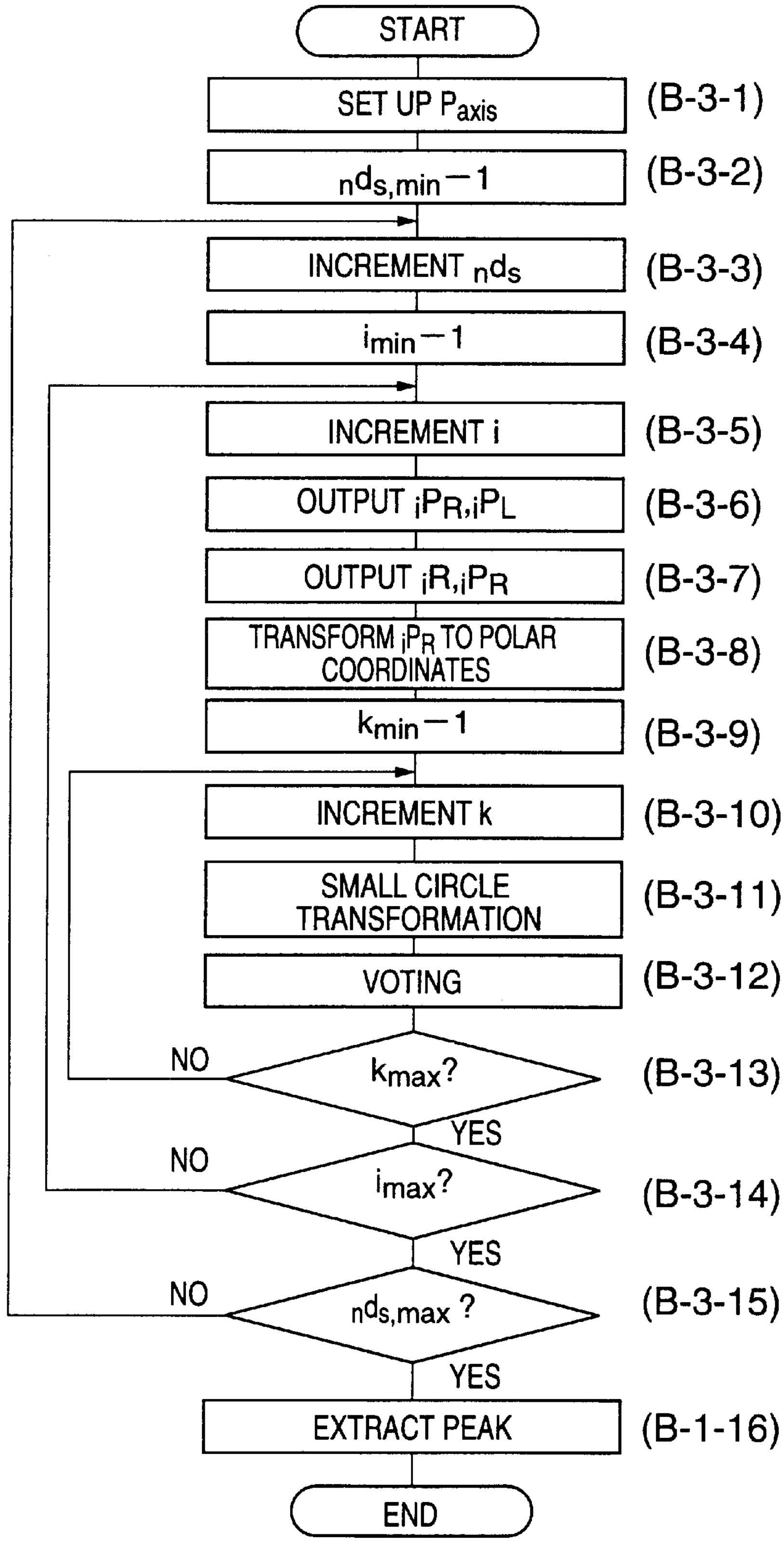

FIG. 55 is a flowchart of the embodiment B-3.

Figure 56A:
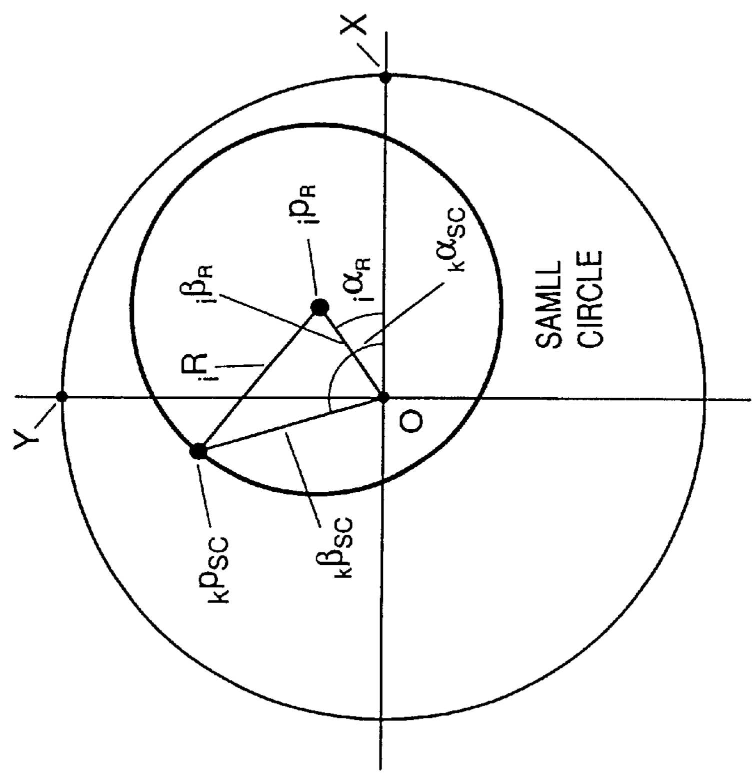
Figure 56B:
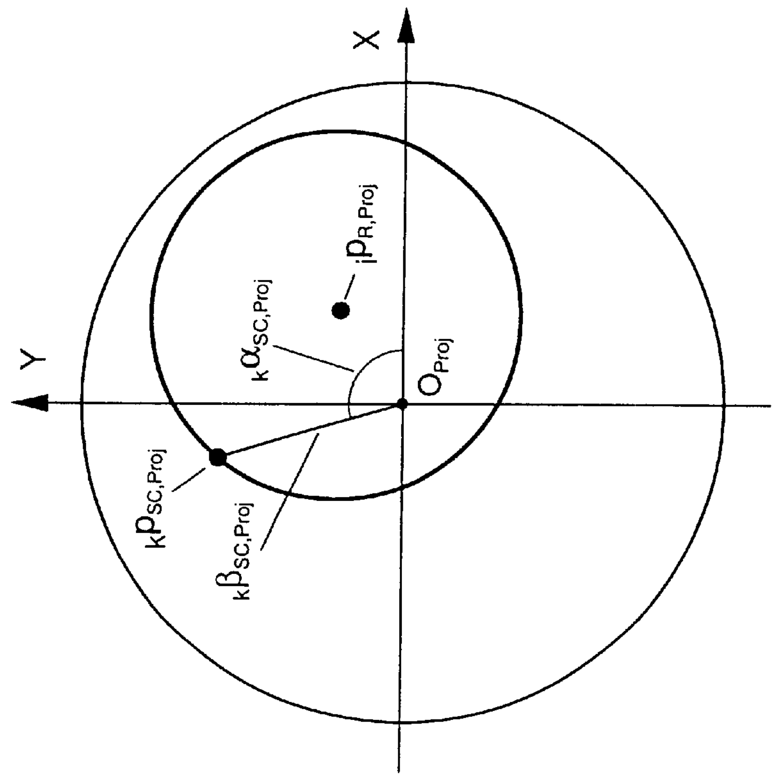

FIG. 56 is an explanatory view useful for understanding the embodiment B-3.

Figure 57:
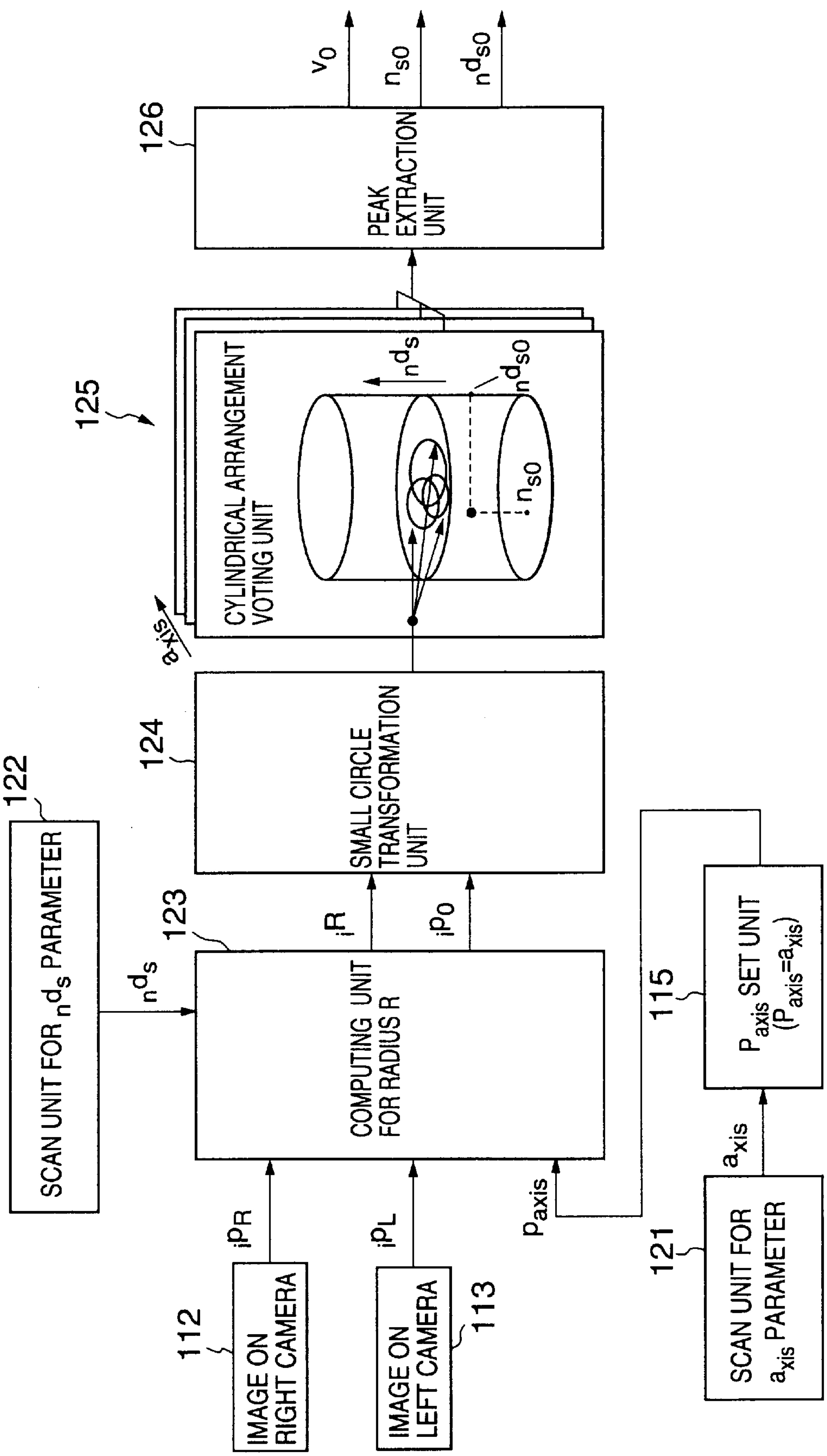

FIG. 57 is a block diagram of an embodiment B-4 of the present invention.

Figure 58:
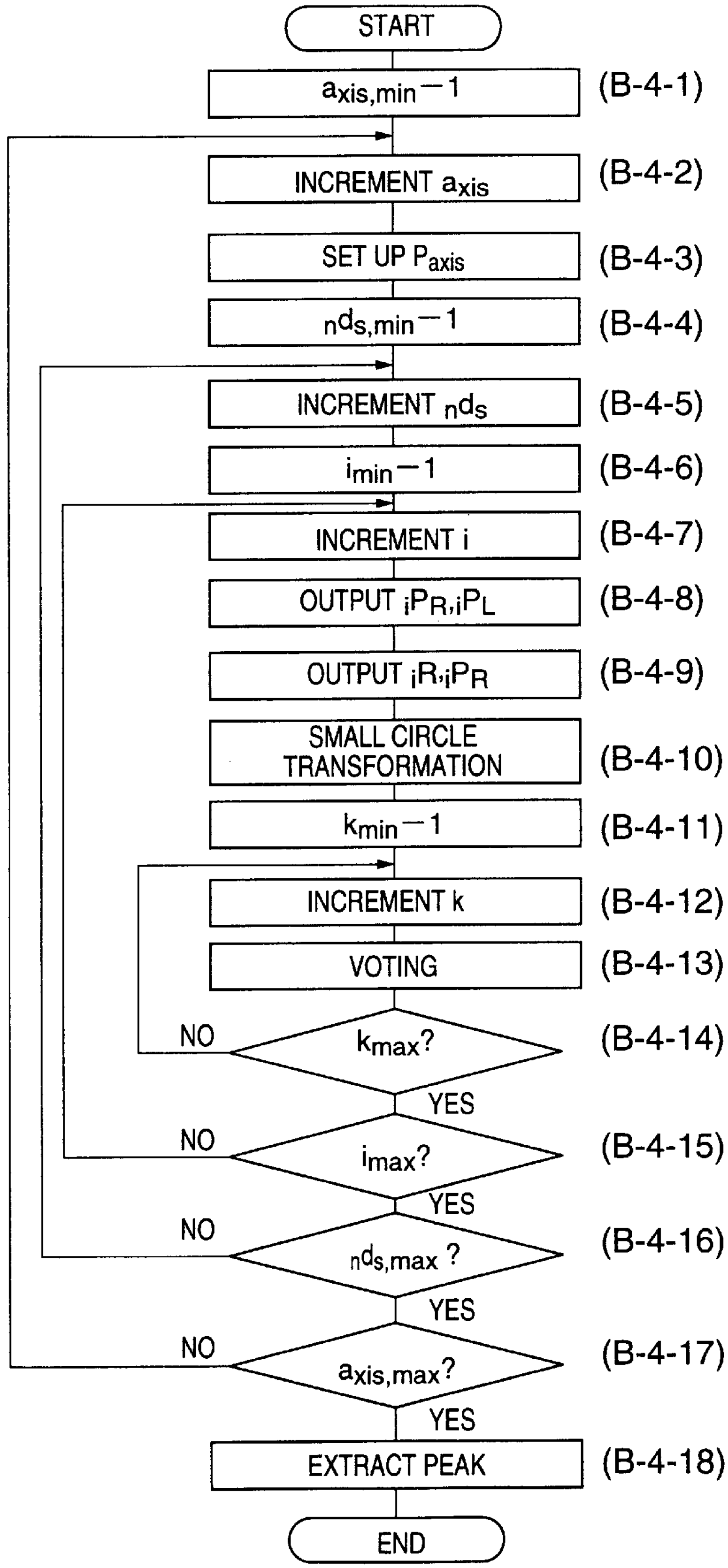

FIG. 58 is a flowchart of the embodiment B-4.

Figure 59:
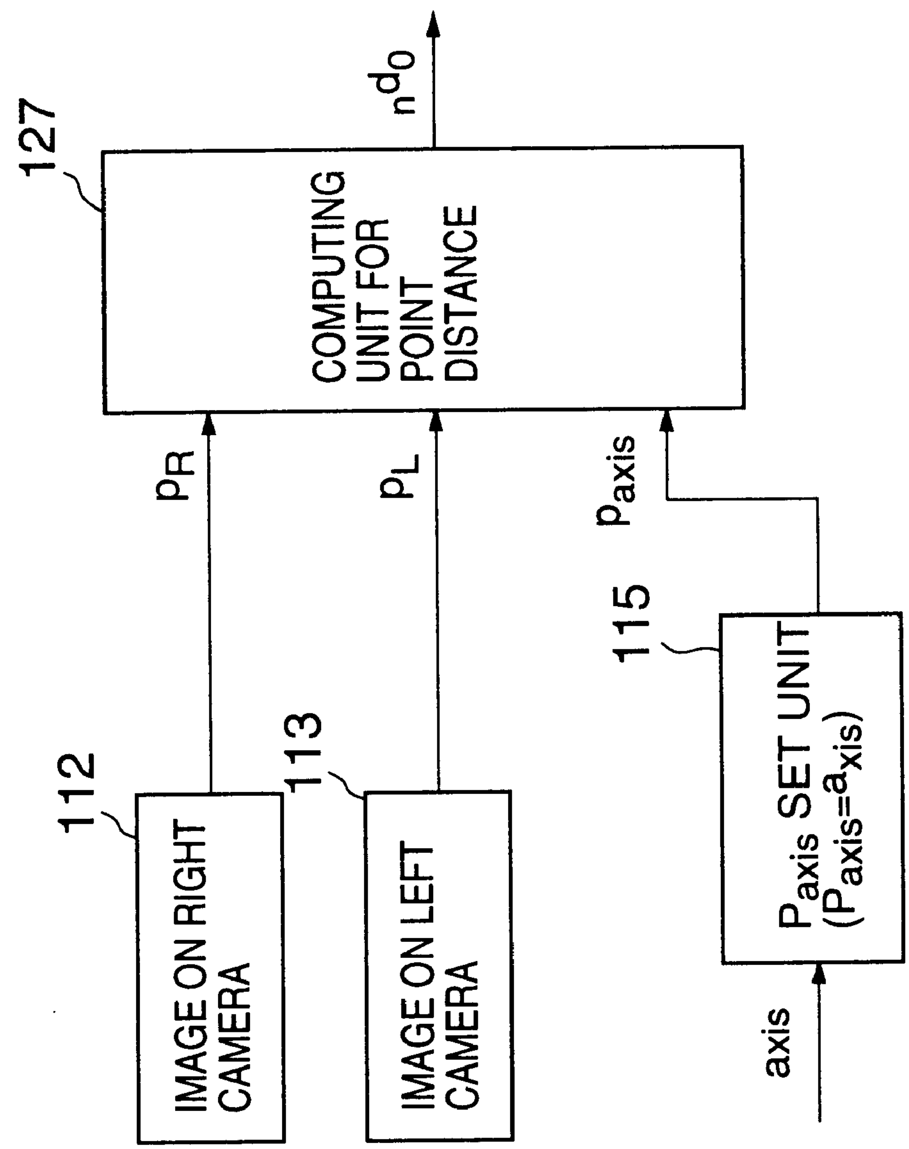

FIG. 59 is a block diagram of an embodiment B-5 of the present invention.

Figure 60:
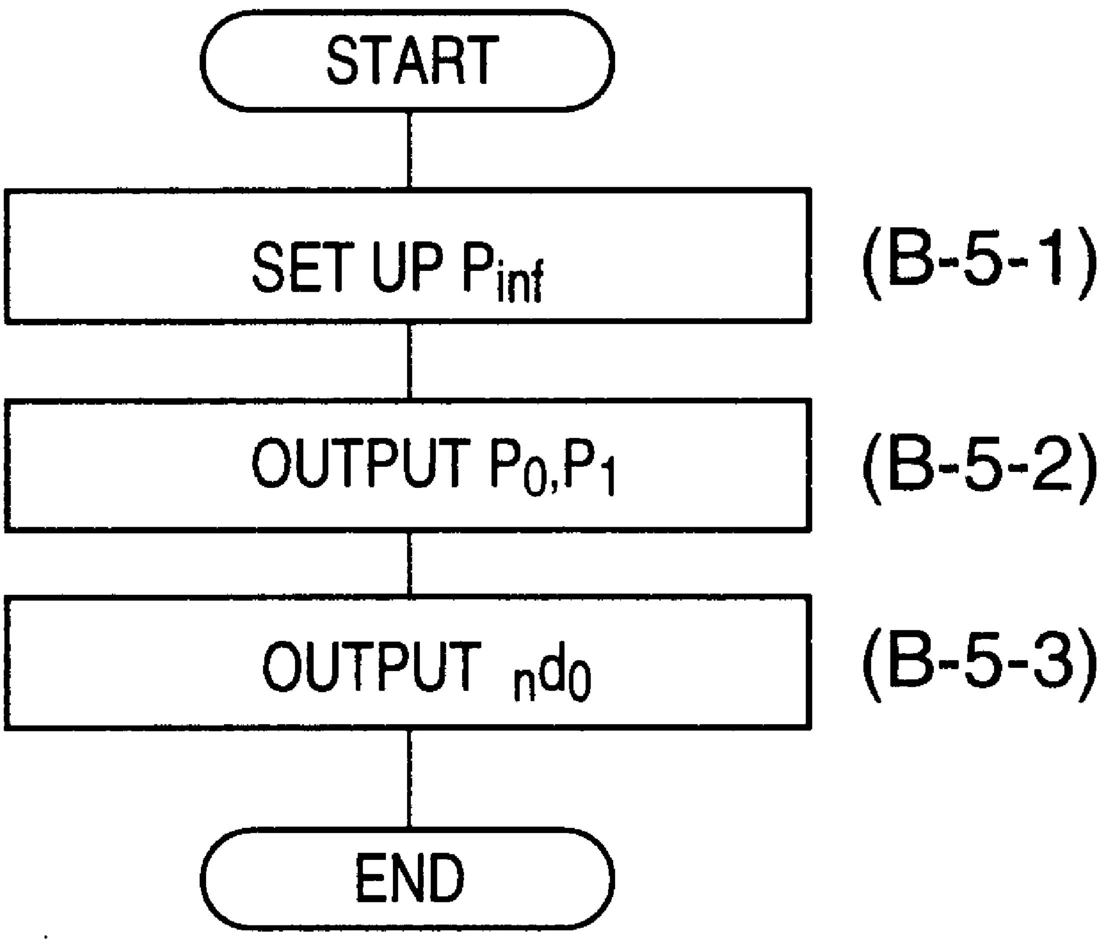

FIG. 60 is a flowchart of the embodiment B-5.

Figure 61:
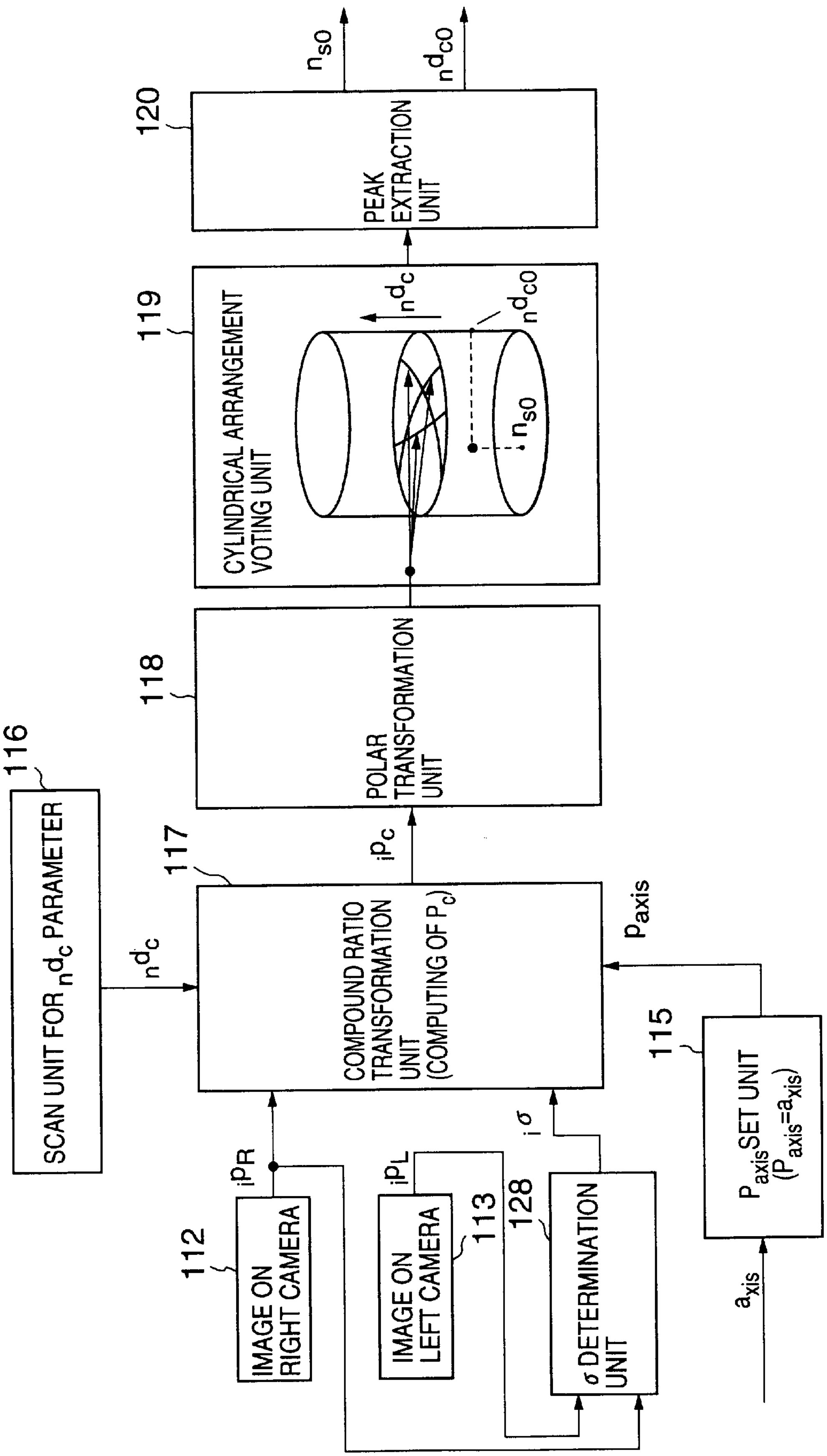

FIG. 61 is a block diagram of an embodiment B-6 of the present invention.

Figure 62:
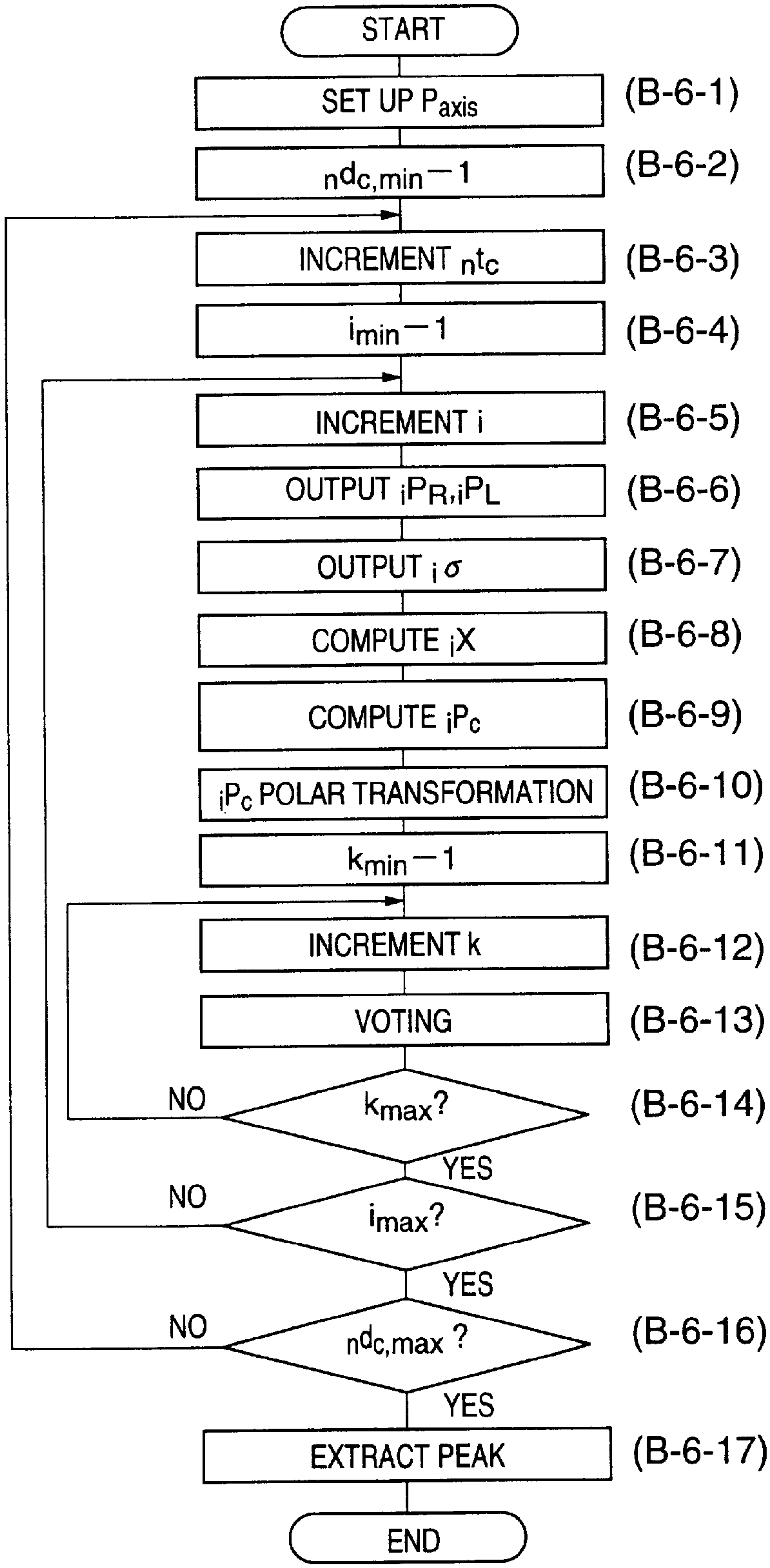

FIG. 62 is a flowchart of the embodiment B-6.

Figure 63:
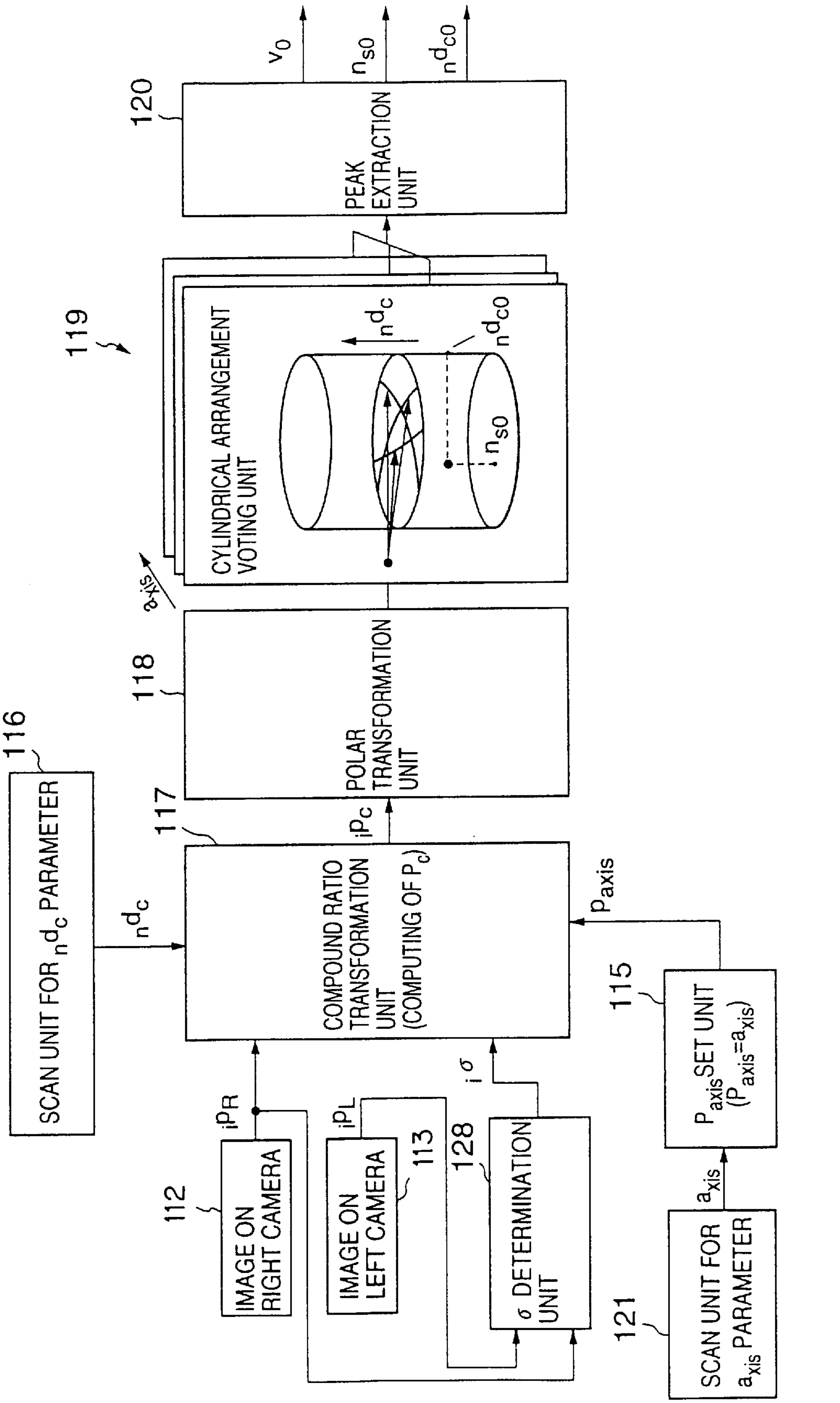

FIG. 63 is a block diagram of an embodiment B-7 of the present invention.

Figure 64:
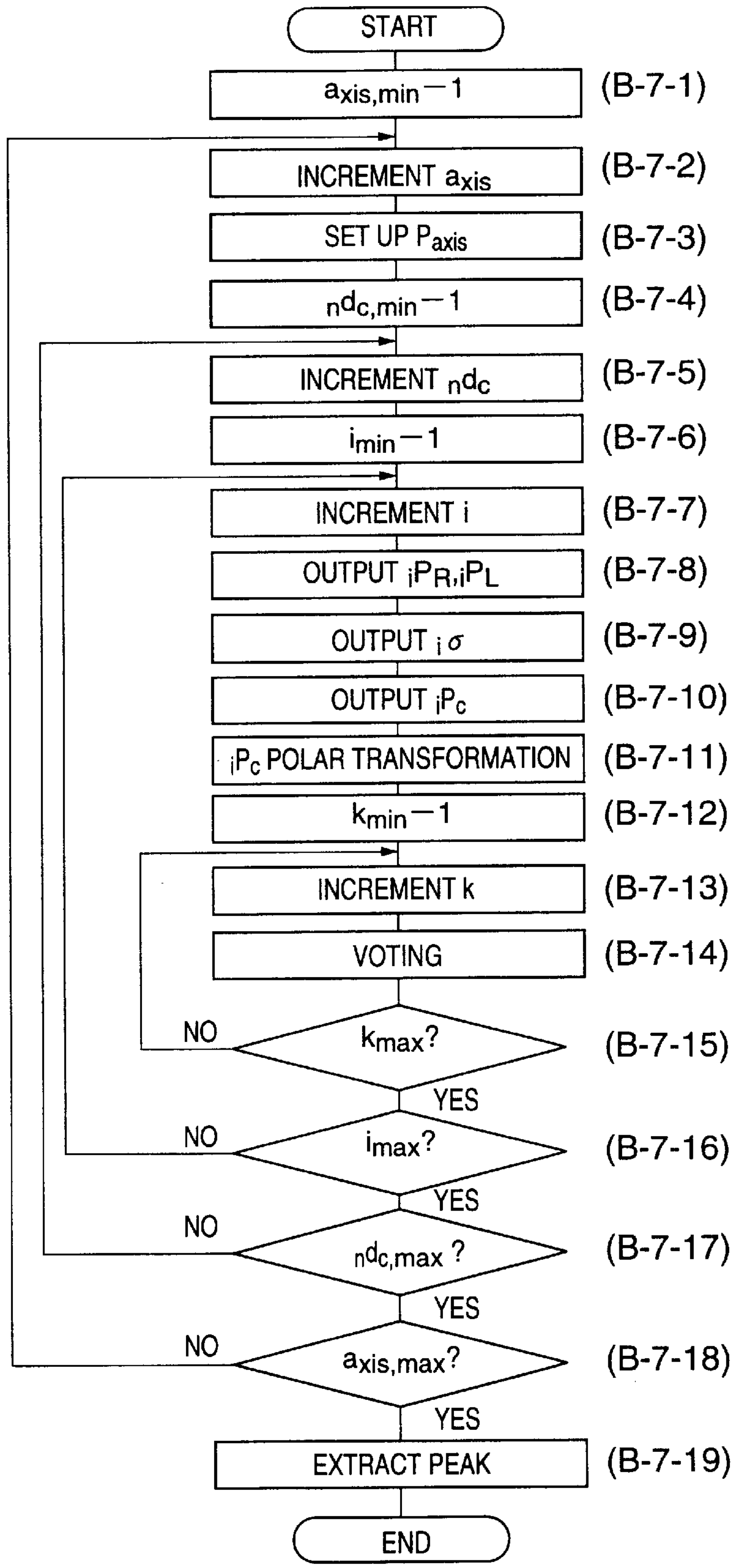

FIG. 64 is a flowchart of the embodiment B-7.

Figure 65:
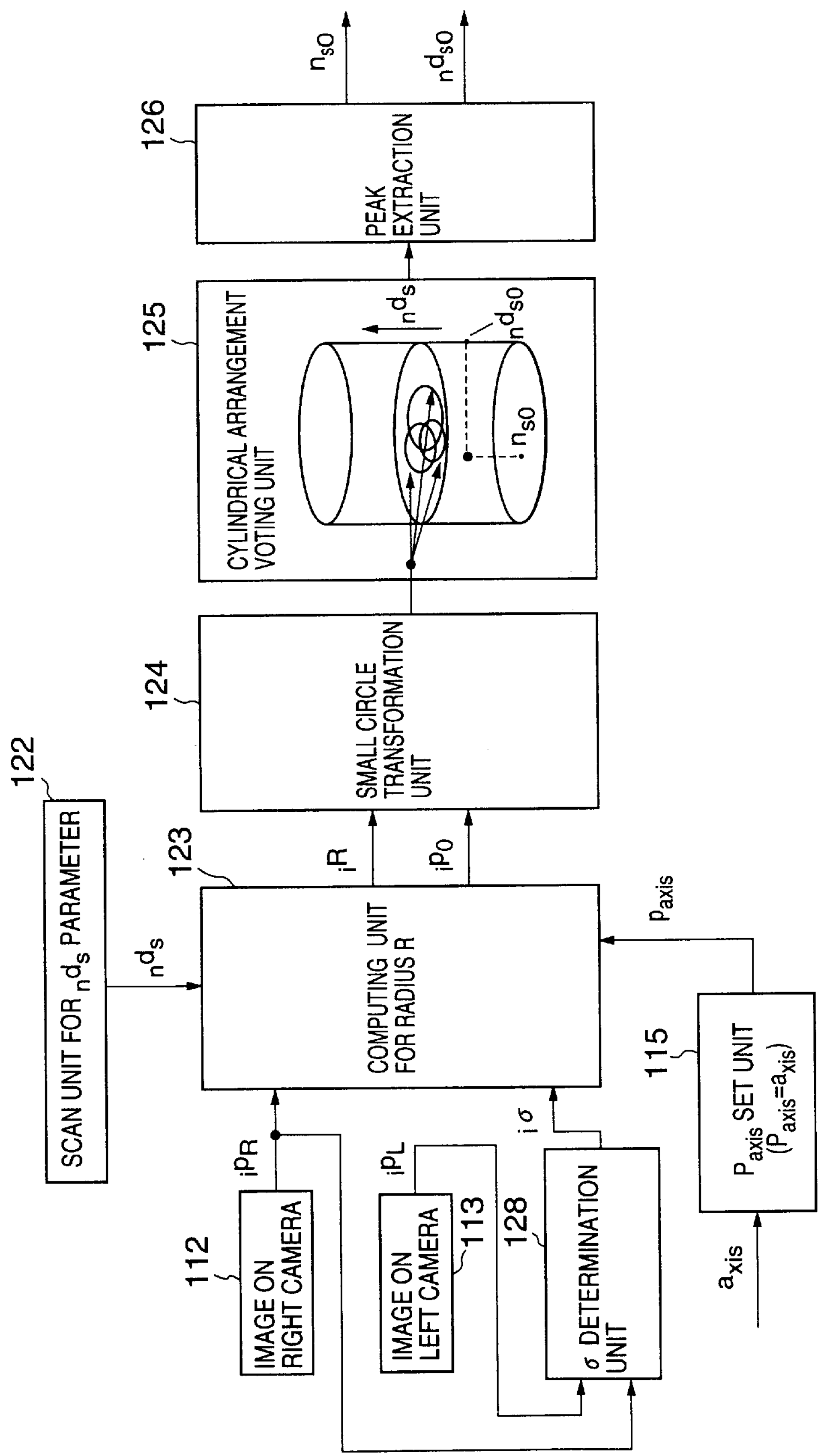

FIG. 65 is a block diagram of an embodiment B-8 of the present invention.

Figure 66:
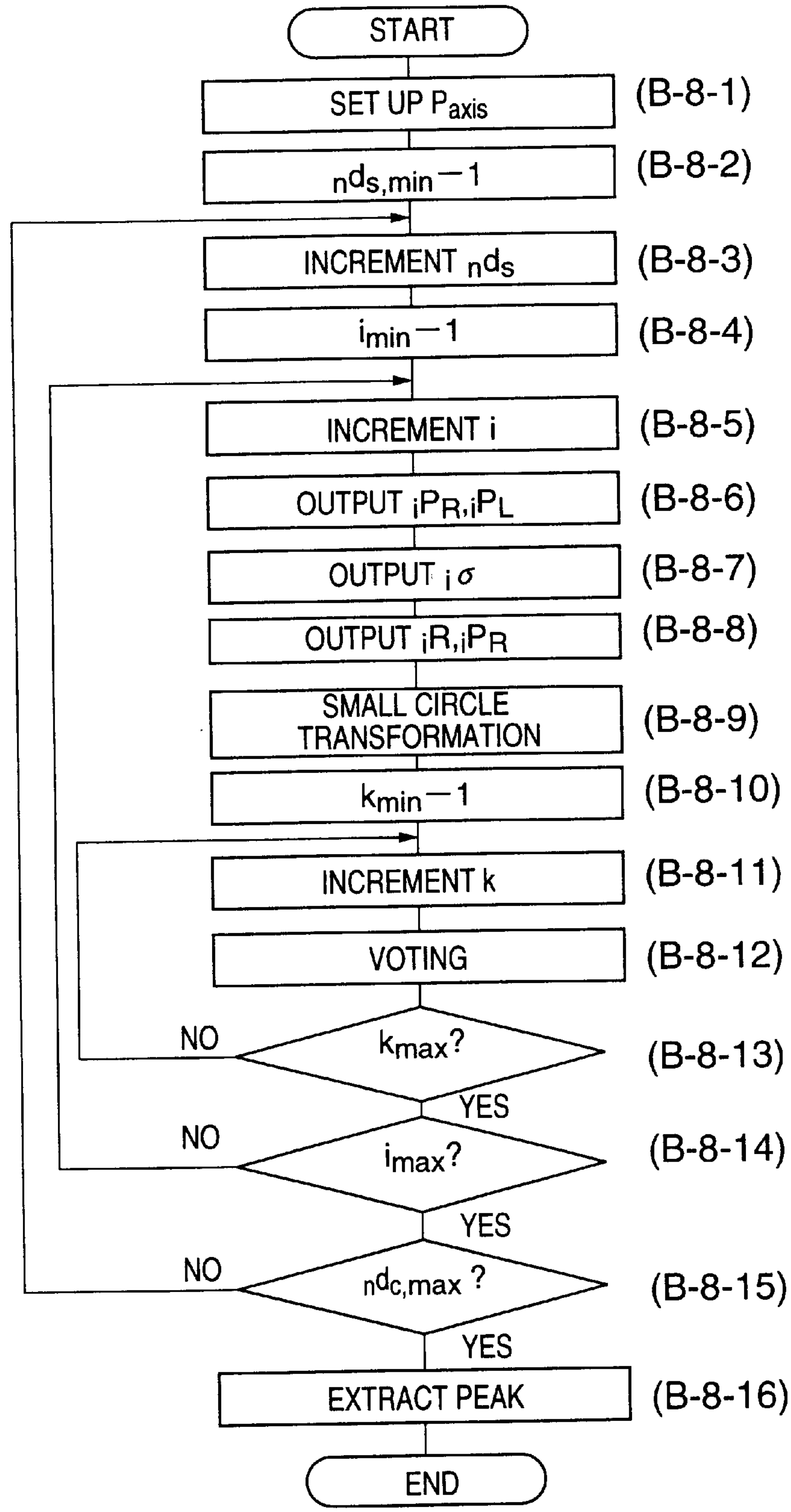

FIG. 66 is a flowchart of the embodiment B-8.

Figure 67:
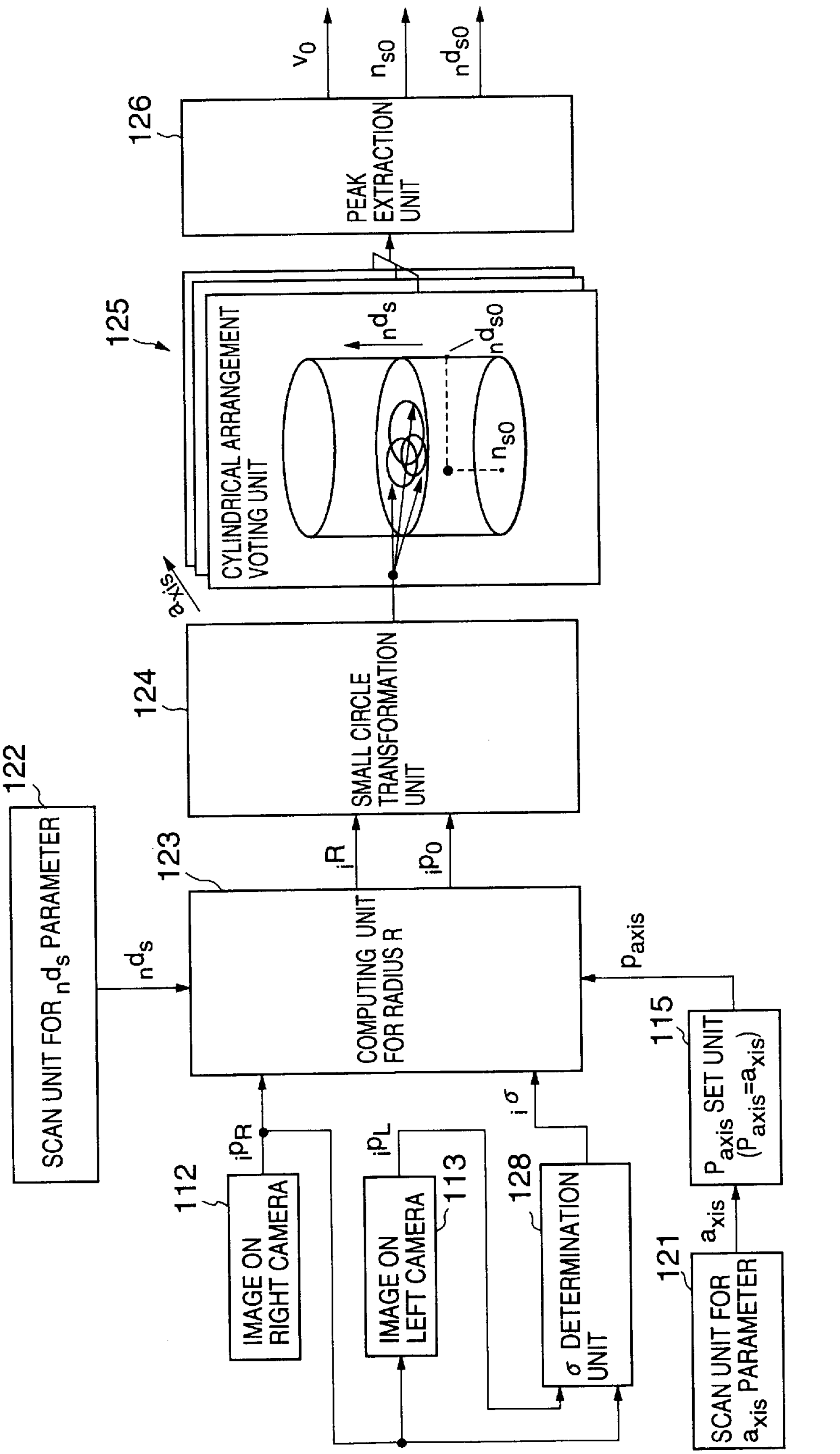

FIG. 67 is a block diagram of an embodiment B-9 of the present invention.

Figure 68:
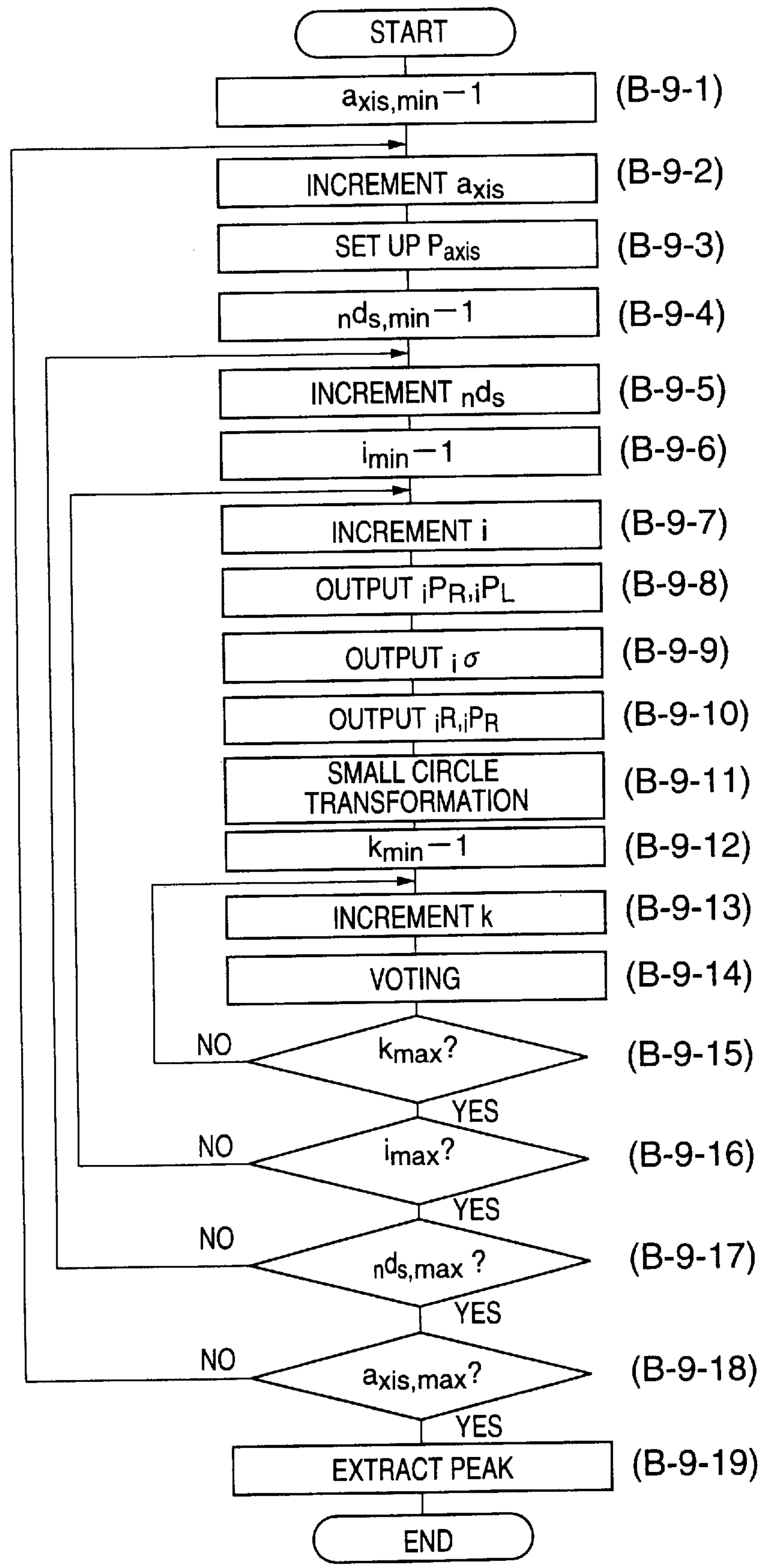

FIG. 68 is a flowchart of the embodiment B-9.

Figure 69:
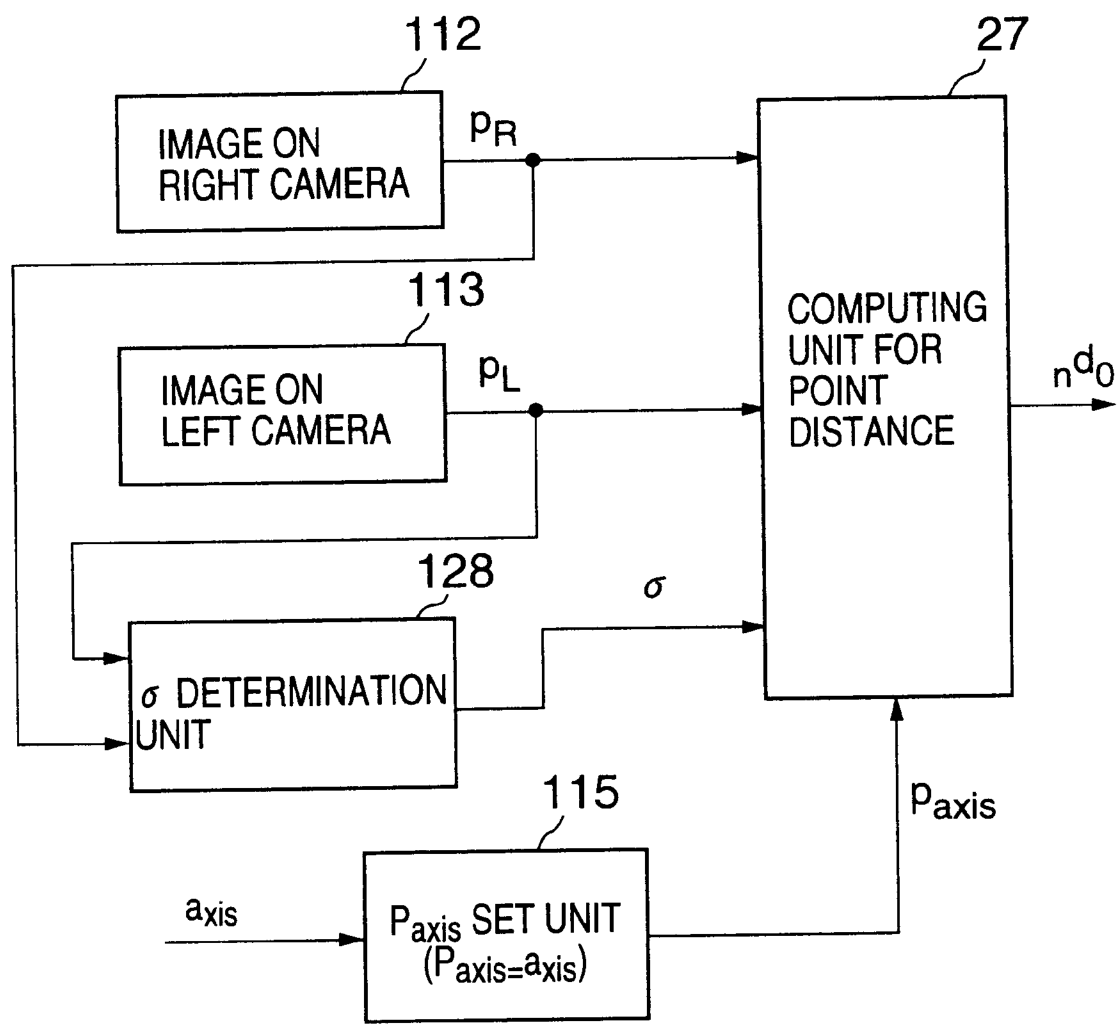

FIG. 69 is a block diagram of an embodiment B-10 of the present invention.

Figure 70:
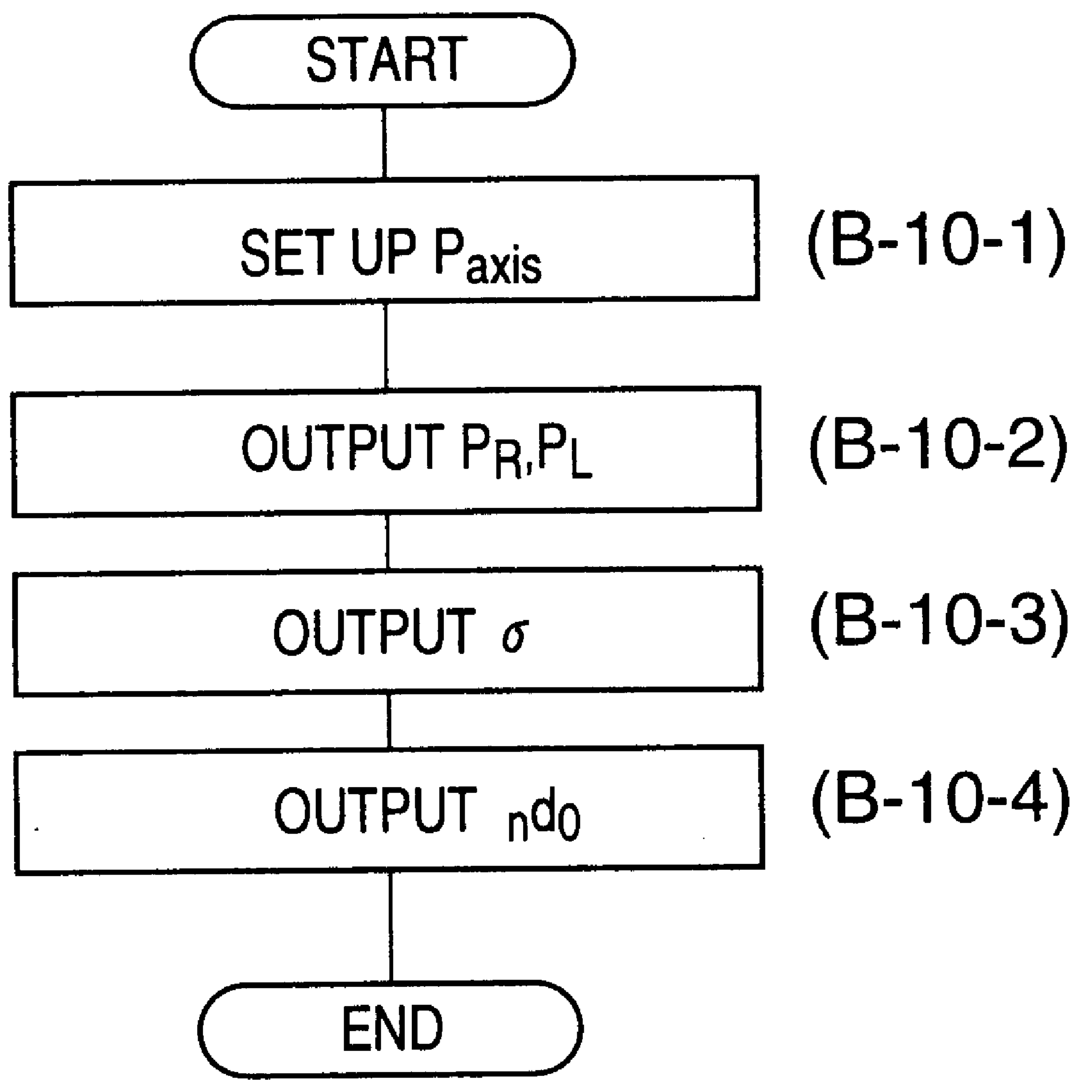

FIG. 70 is a flowchart of the embodiment B-10.

Figure 71:
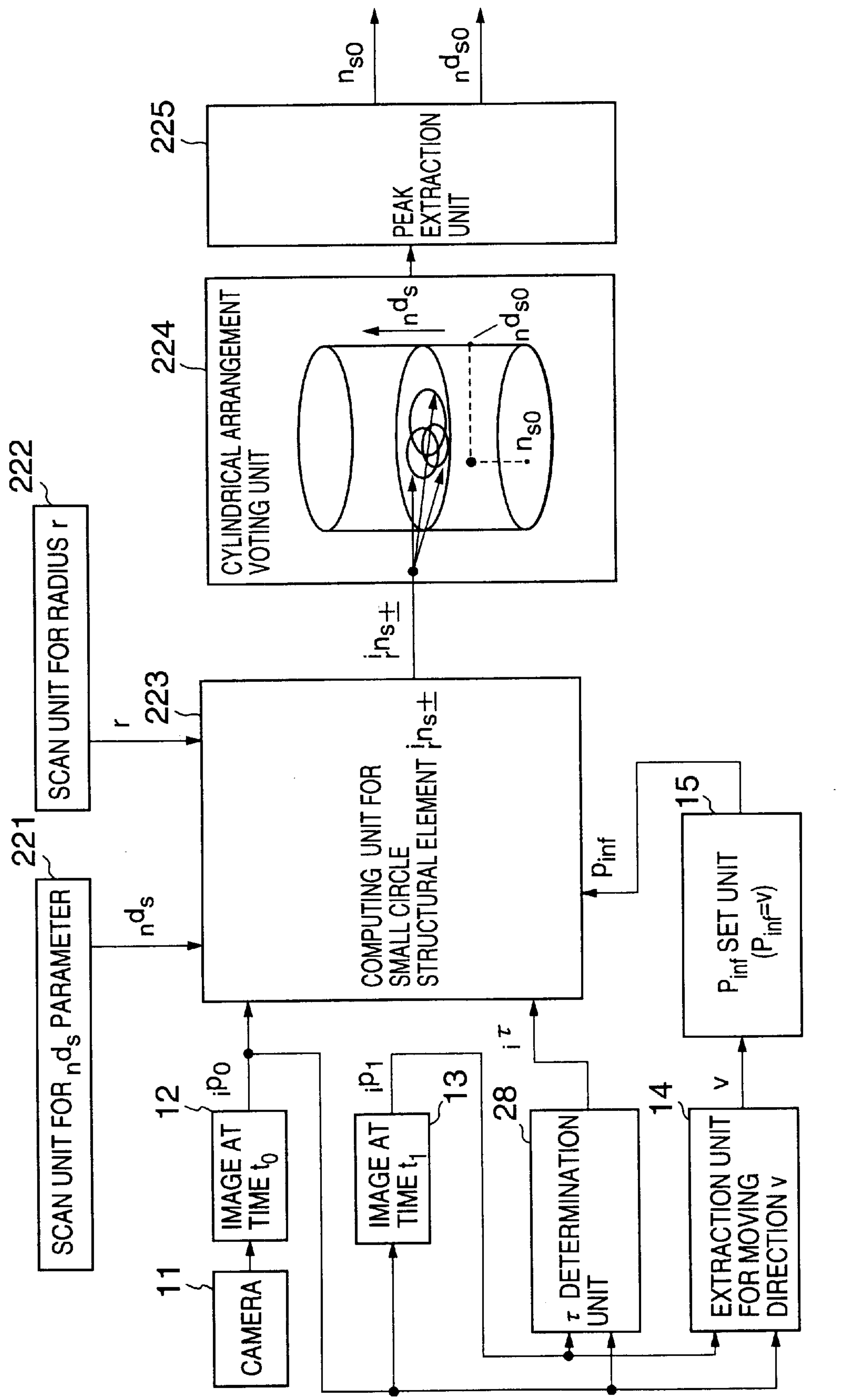

FIG. 71 is a block diagram of an embodiment C-1 of the present invention.

Figure 72:
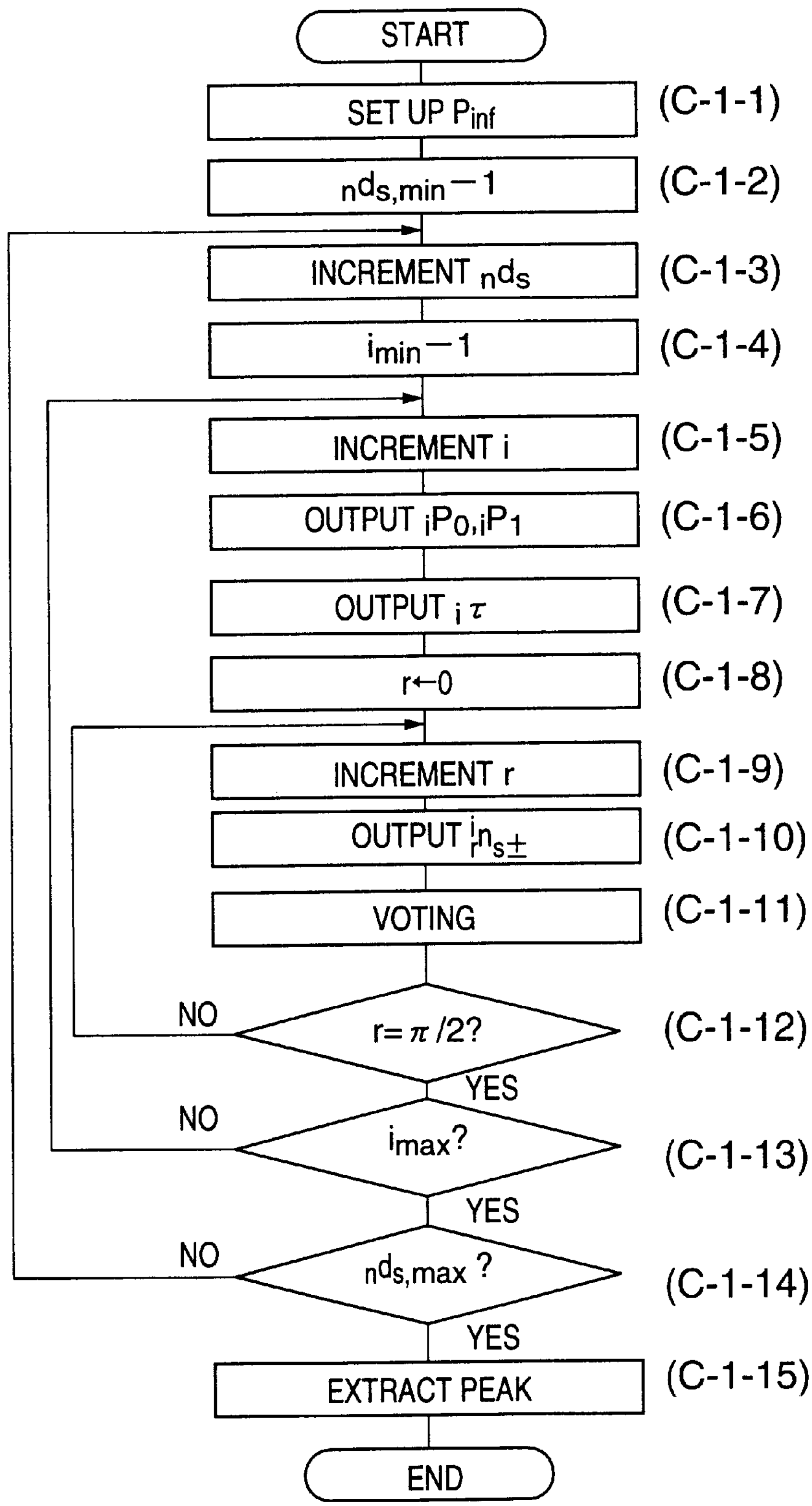

FIG. 72 is a flowchart of the embodiment C-1.

Figure 73:
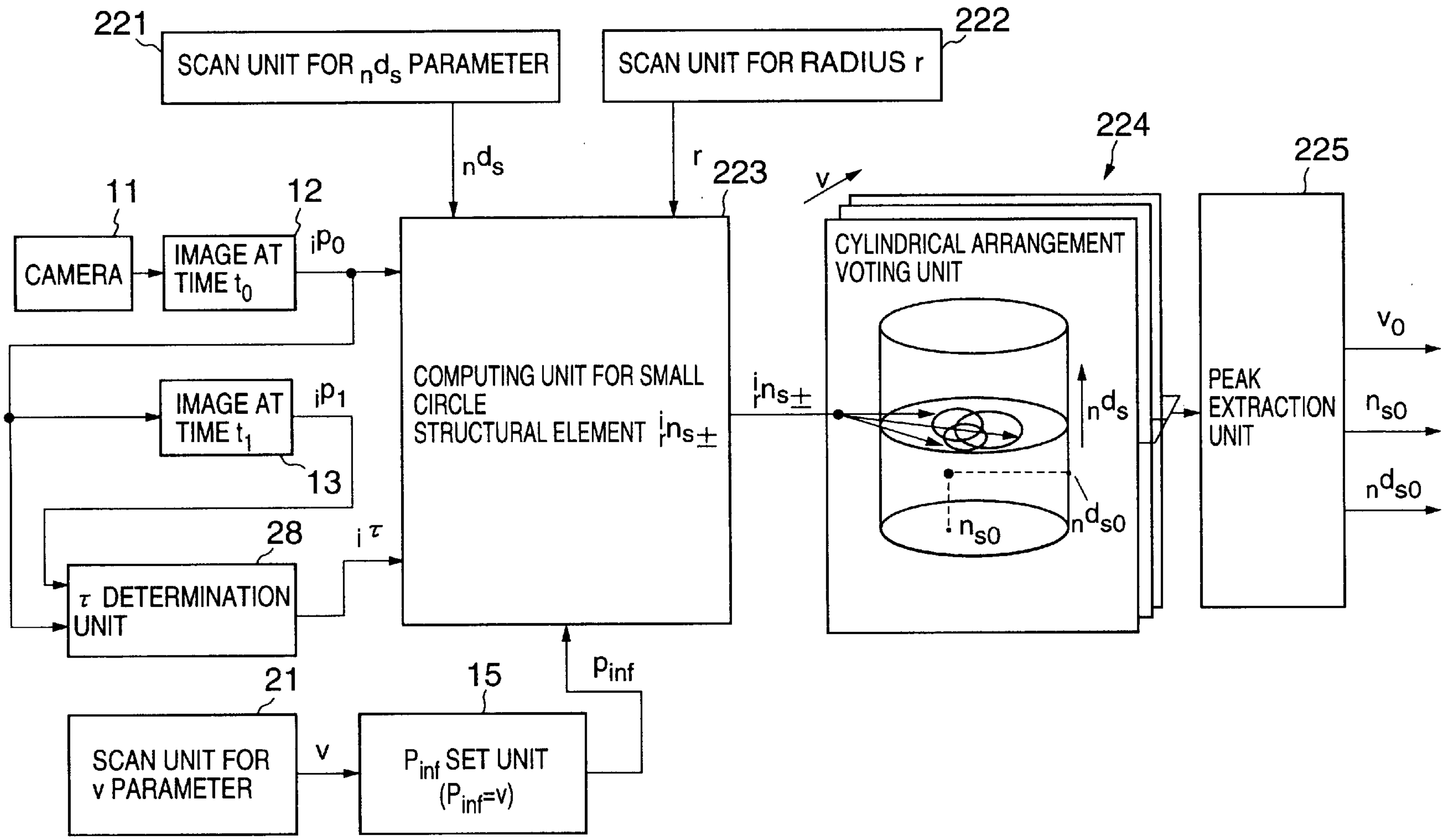

FIG. 73 is a block diagram of an embodiment C-2 of the present invention.

Figure 74:
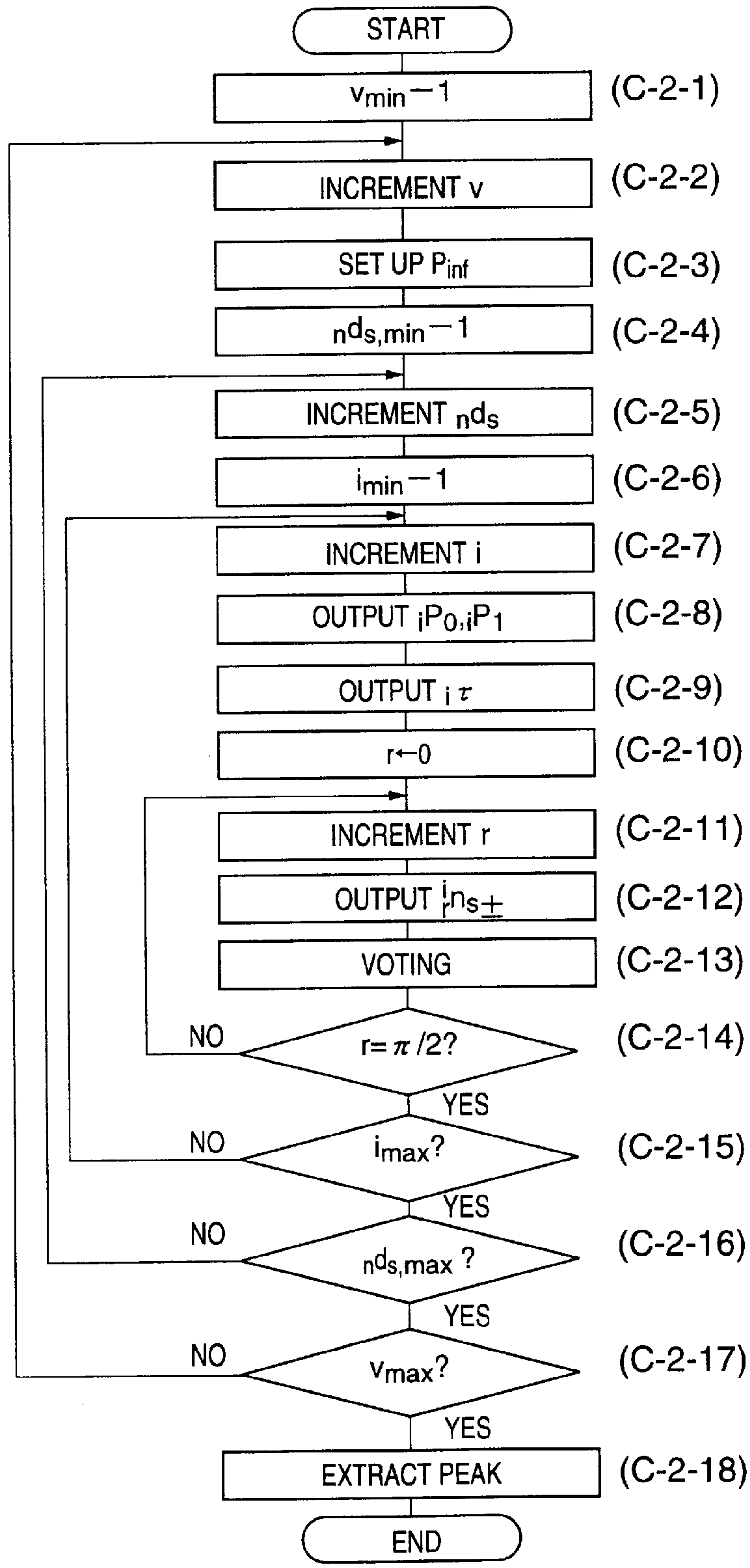

FIG. 74 is a flowchart of the embodiment C-2.

Figure 75:
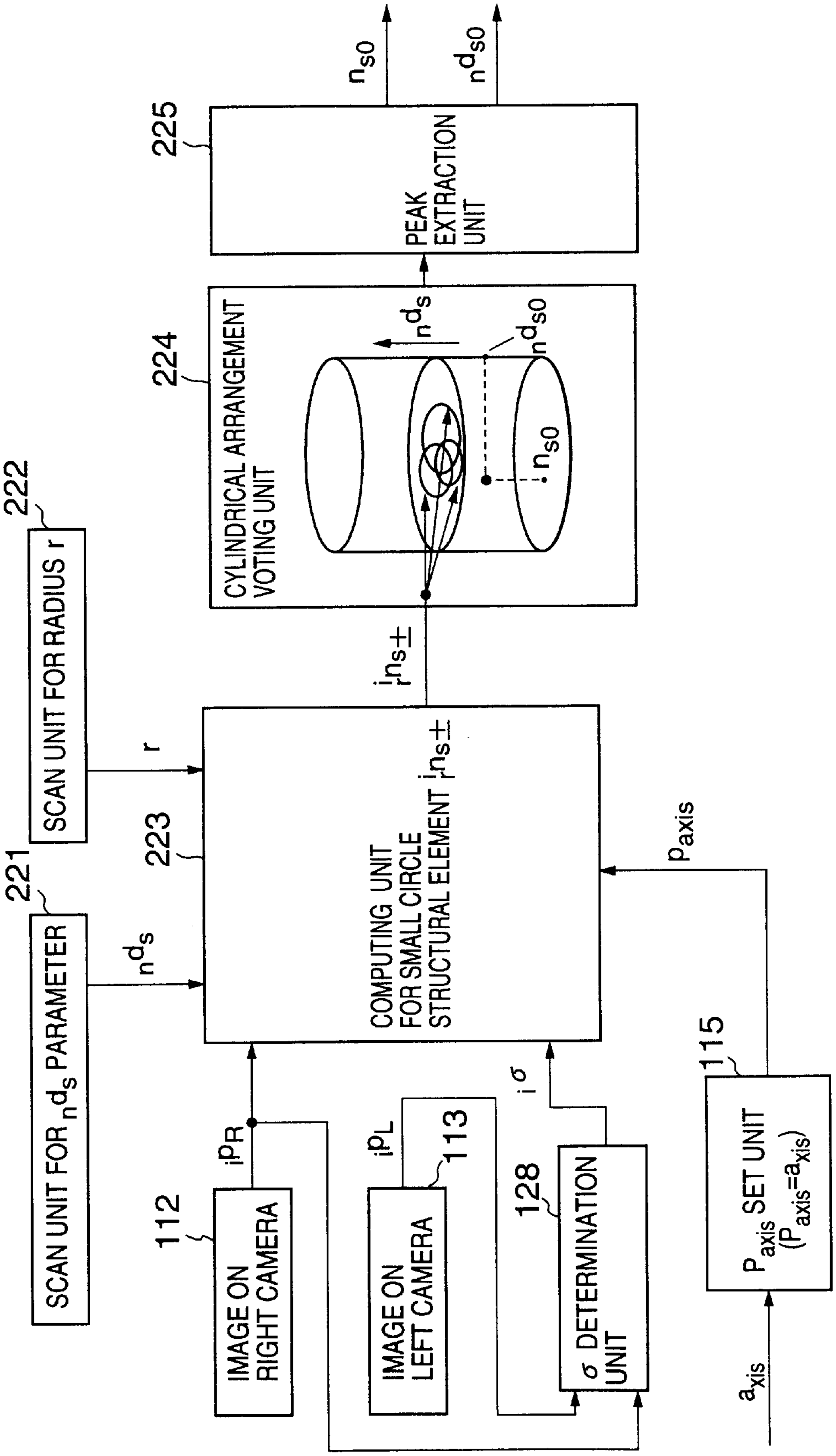

FIG. 75 is a block diagram of an embodiment C-3 of the present invention.

Figure 76:
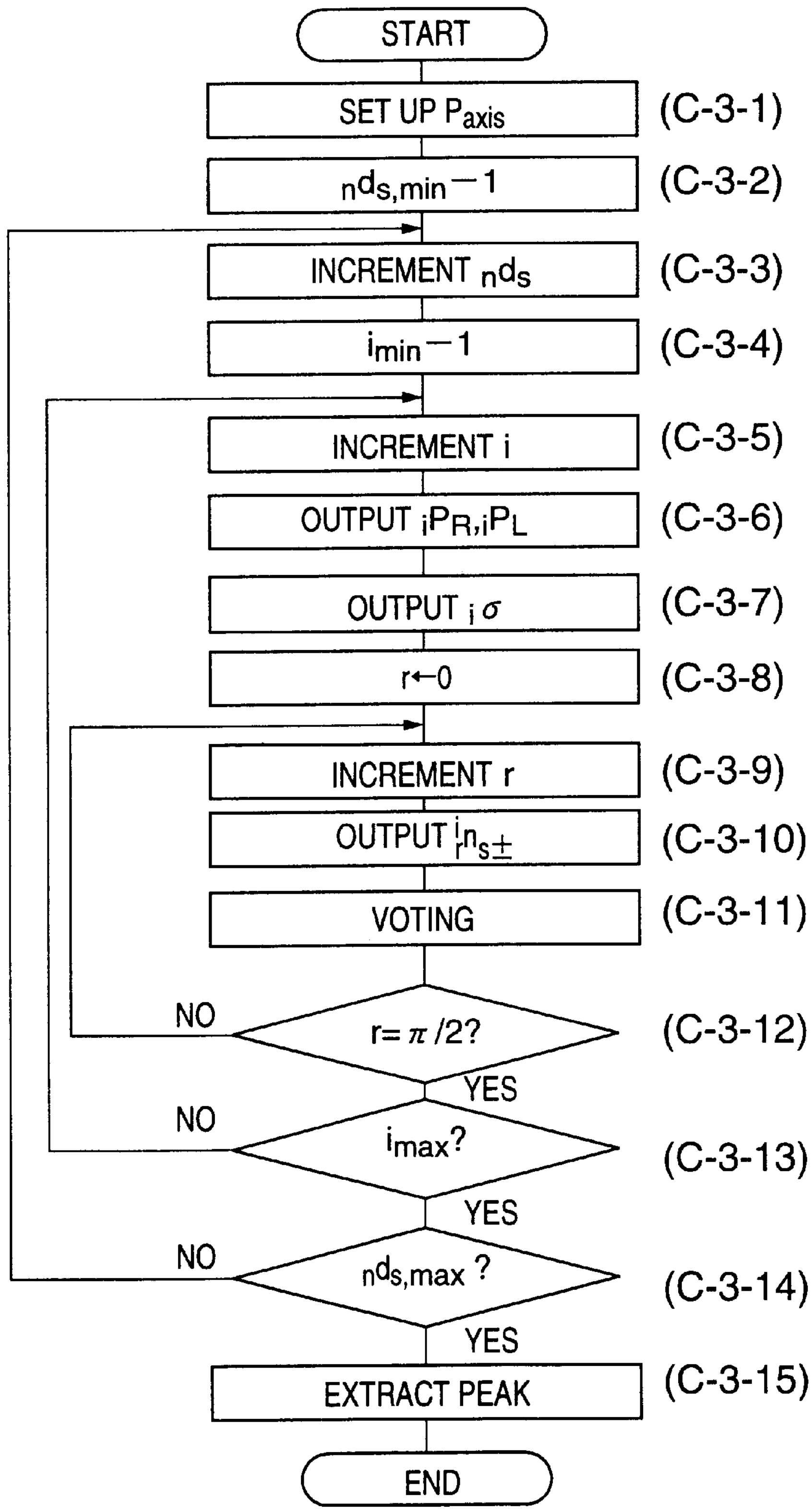

FIG. 76 is a flowchart of the embodiment C-3.

Figure 77:
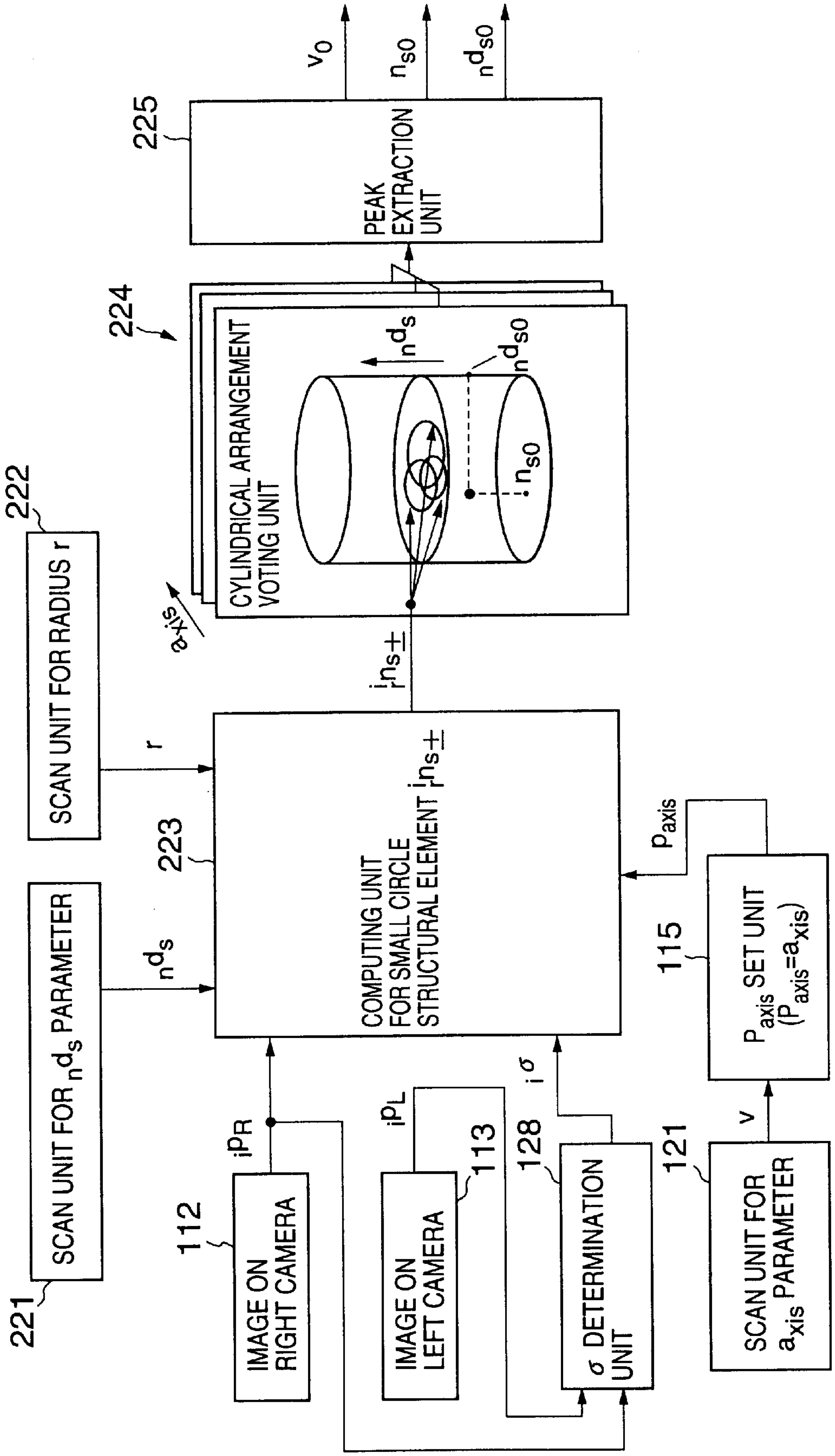

FIG. 77 is a block diagram of an embodiment C-4 of the present invention.

Figure 78:
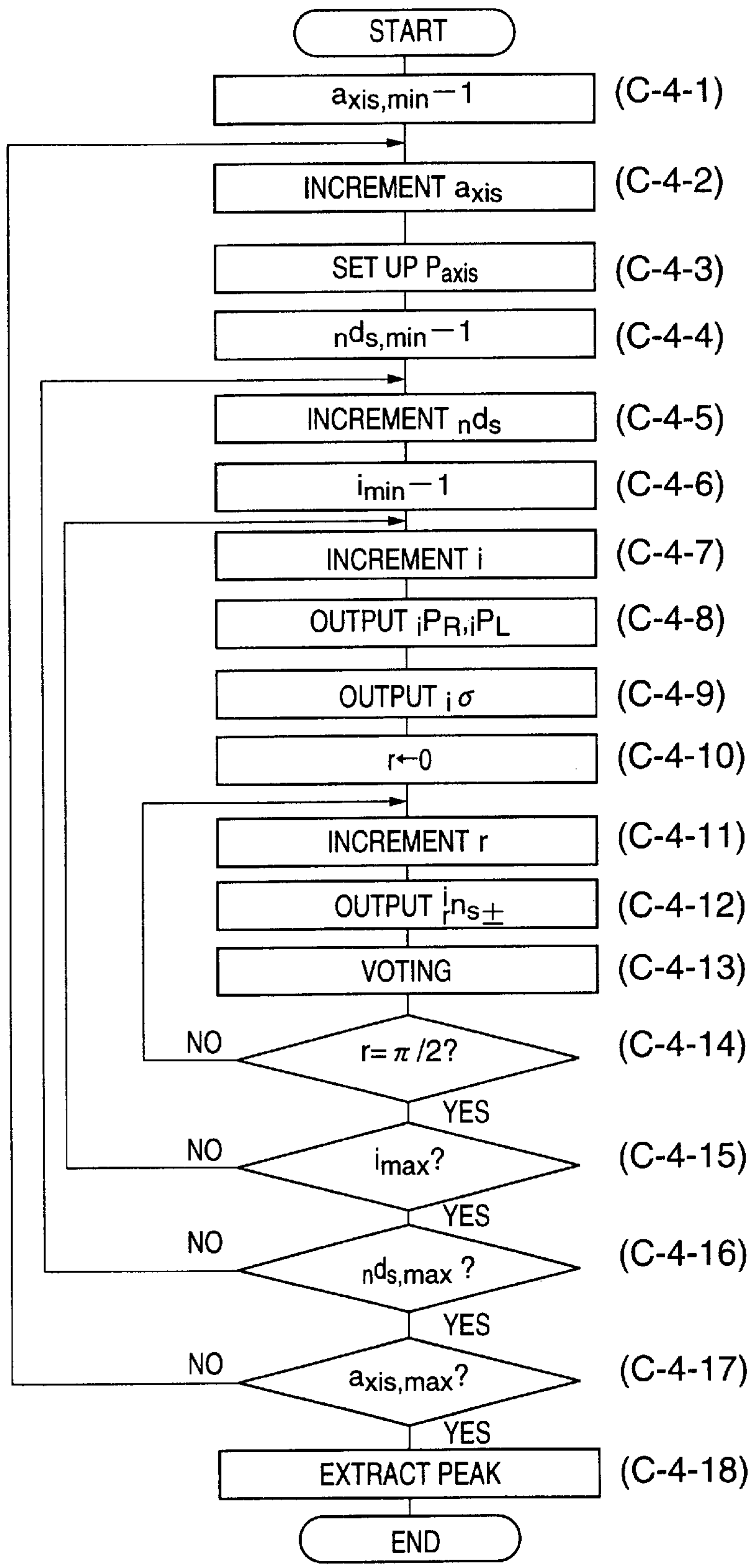

FIG. 78 is a flowchart of the embodiment C-4.

Figure 79:
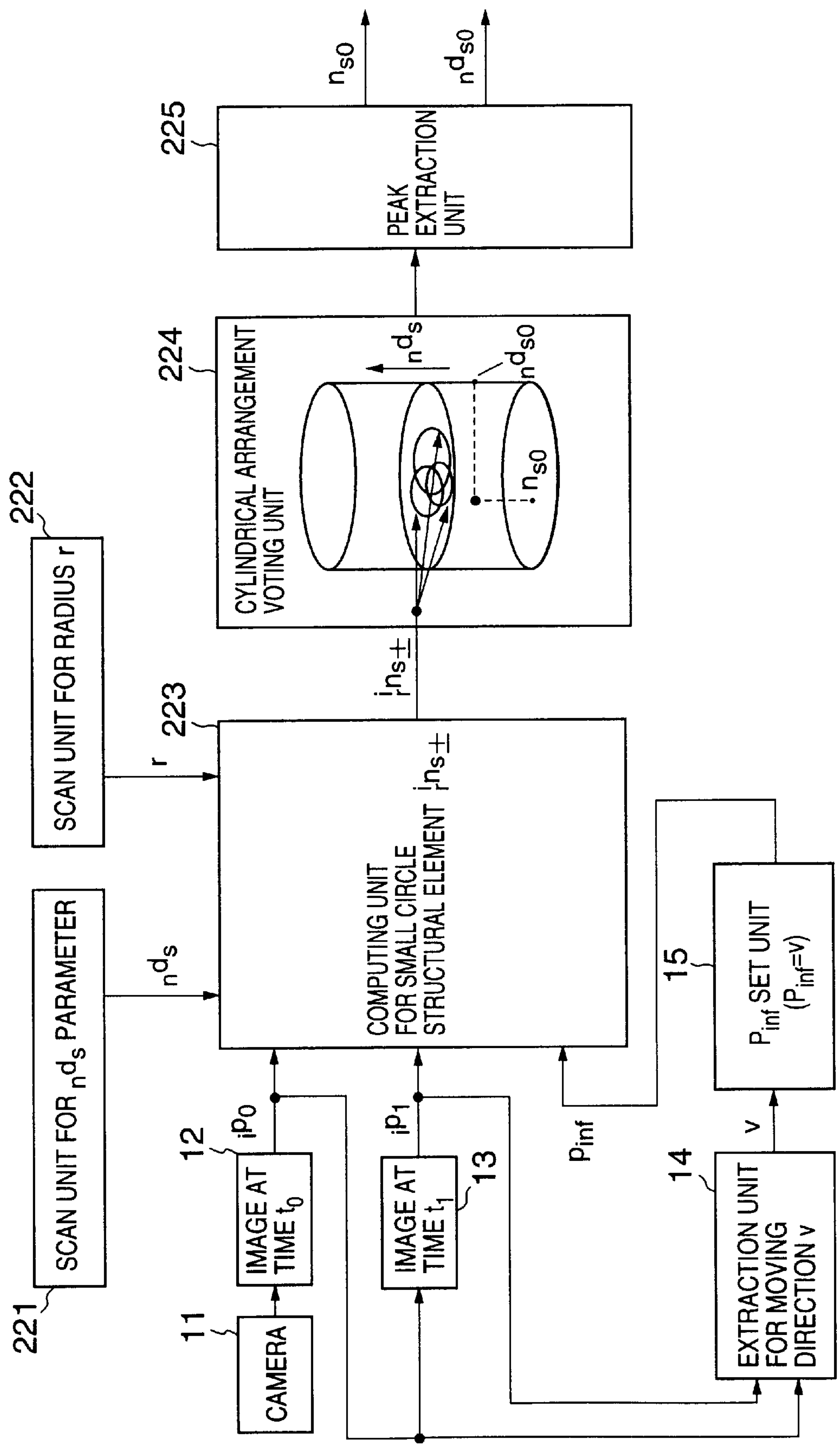

FIG. 79 is a block diagram of an embodiment C-5 of the present invention.

Figure 80:
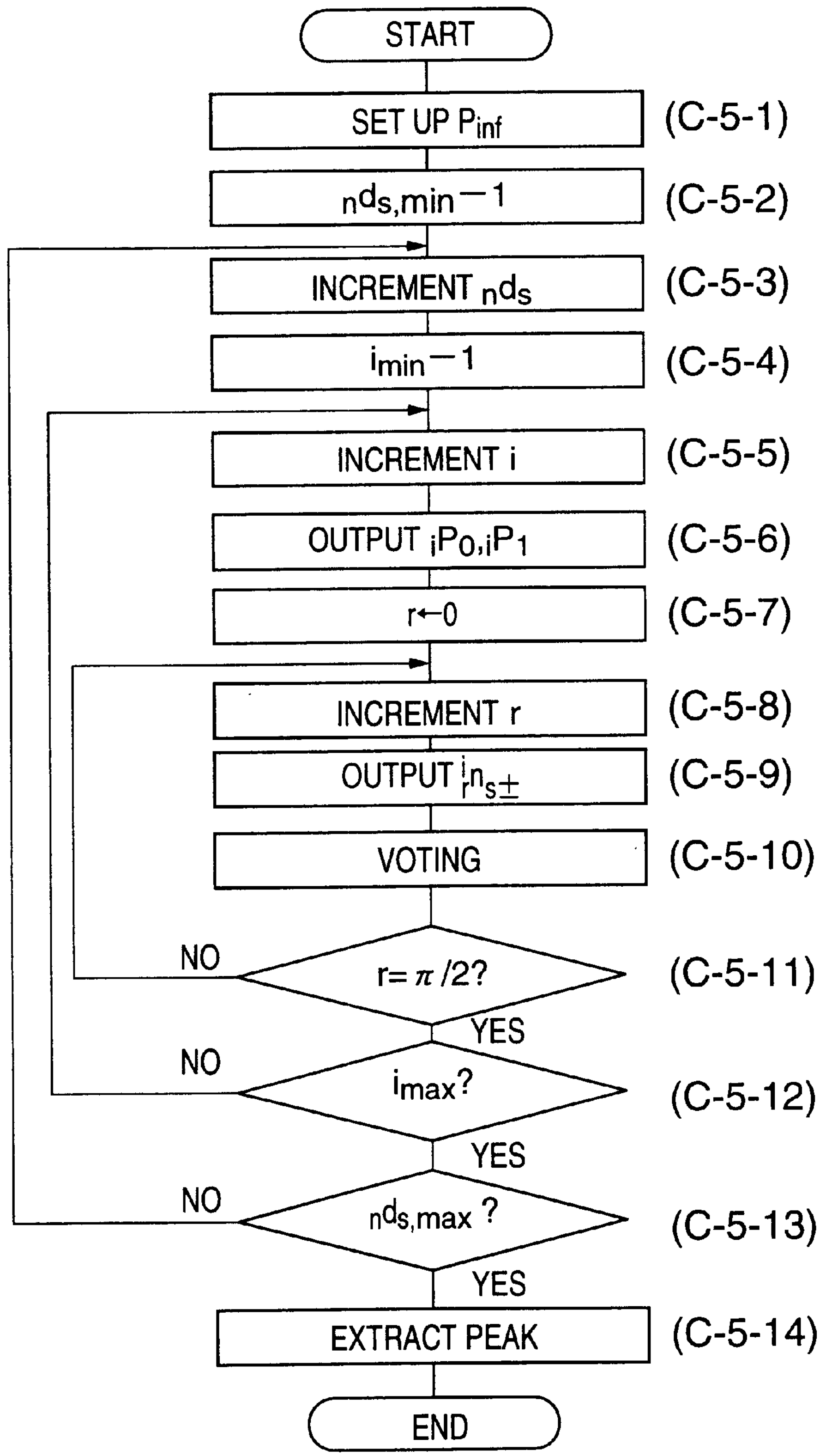

FIG. 80 is a flowchart of the embodiment C-5.

Figure 81:
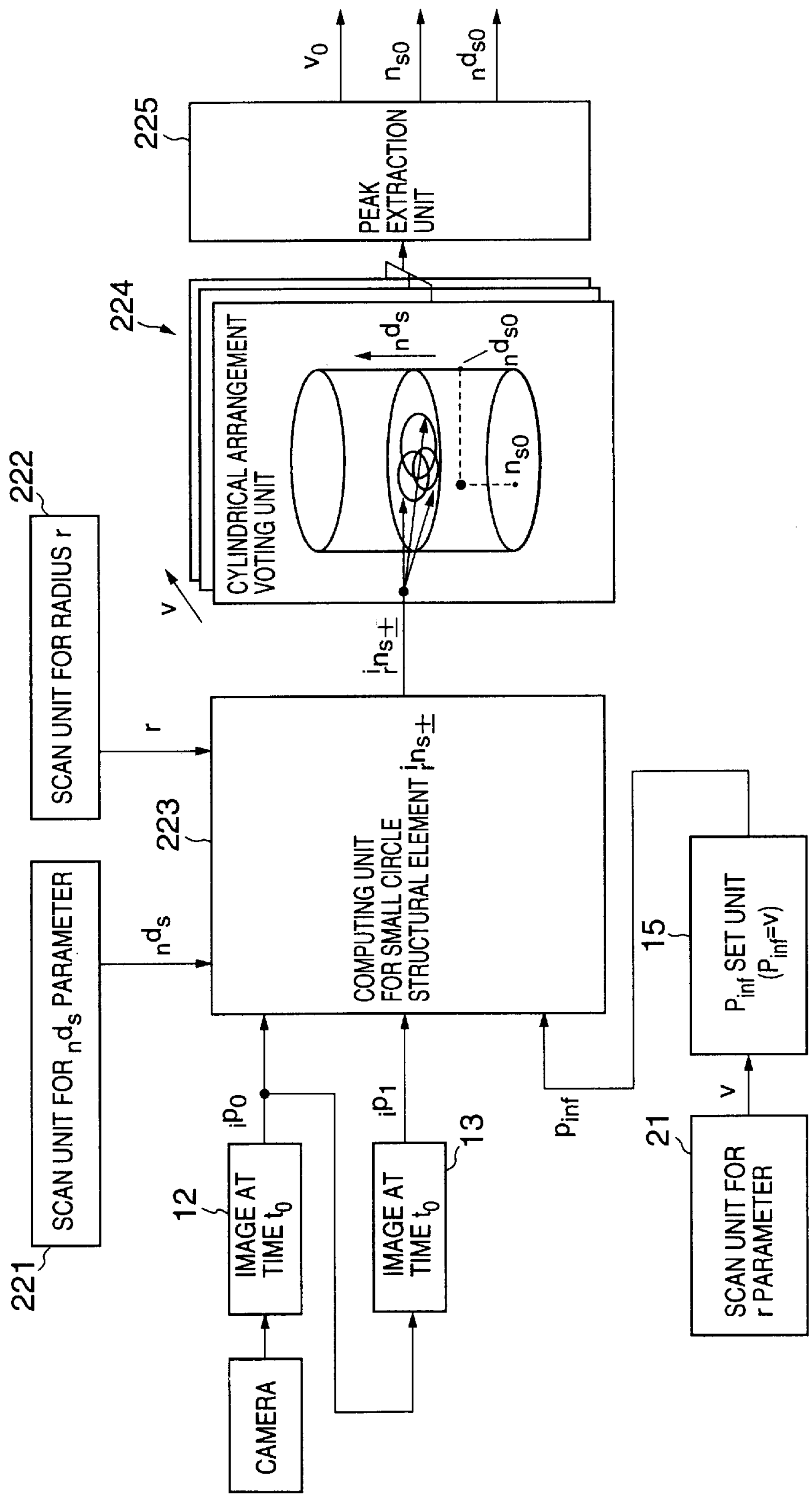

FIG. 81 is a block diagram of an embodiment C-6 of the present invention.

Figure 82:
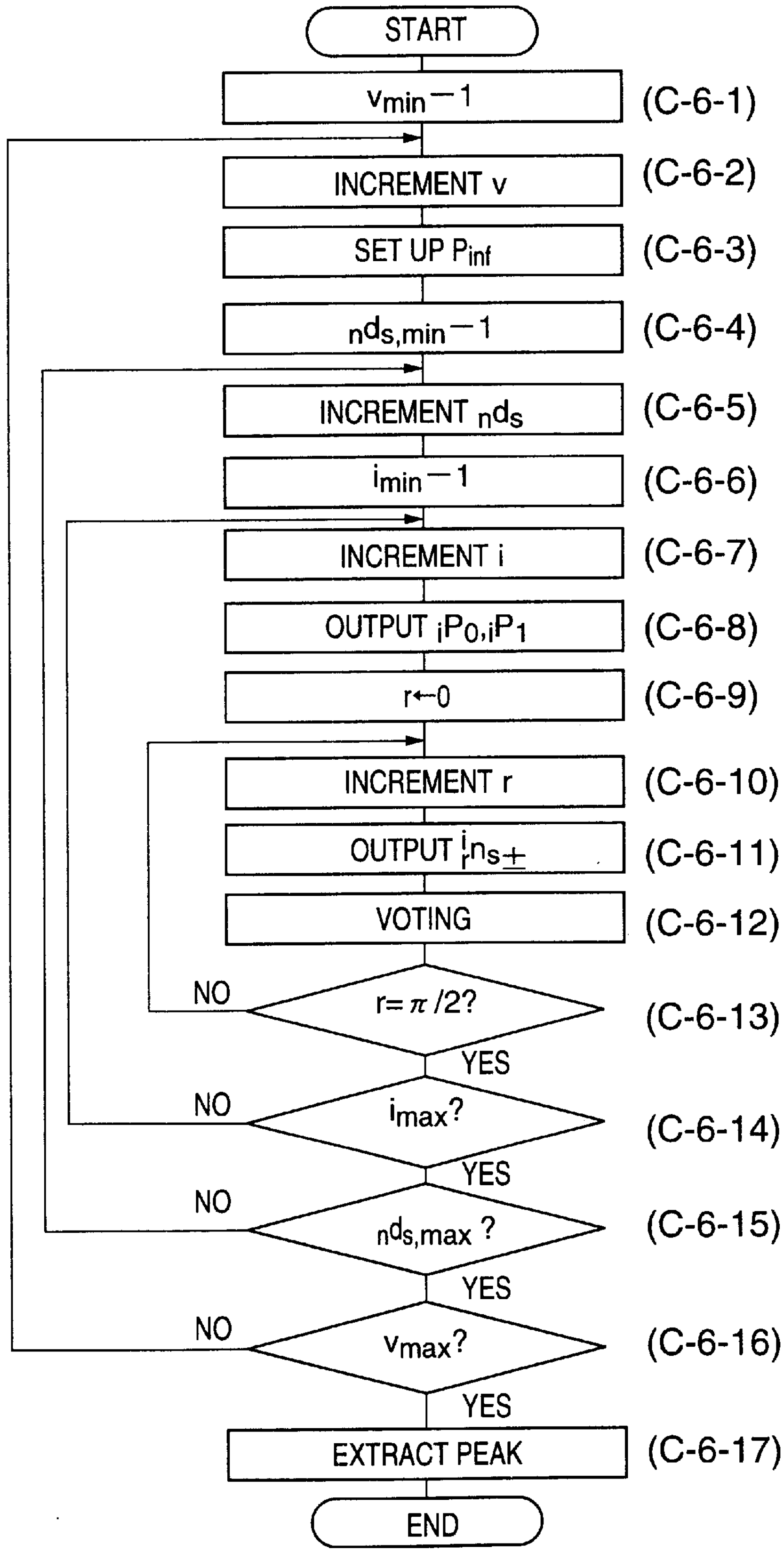

FIG. 82 is a flowchart of the embodiment C-6.

Figure 83:
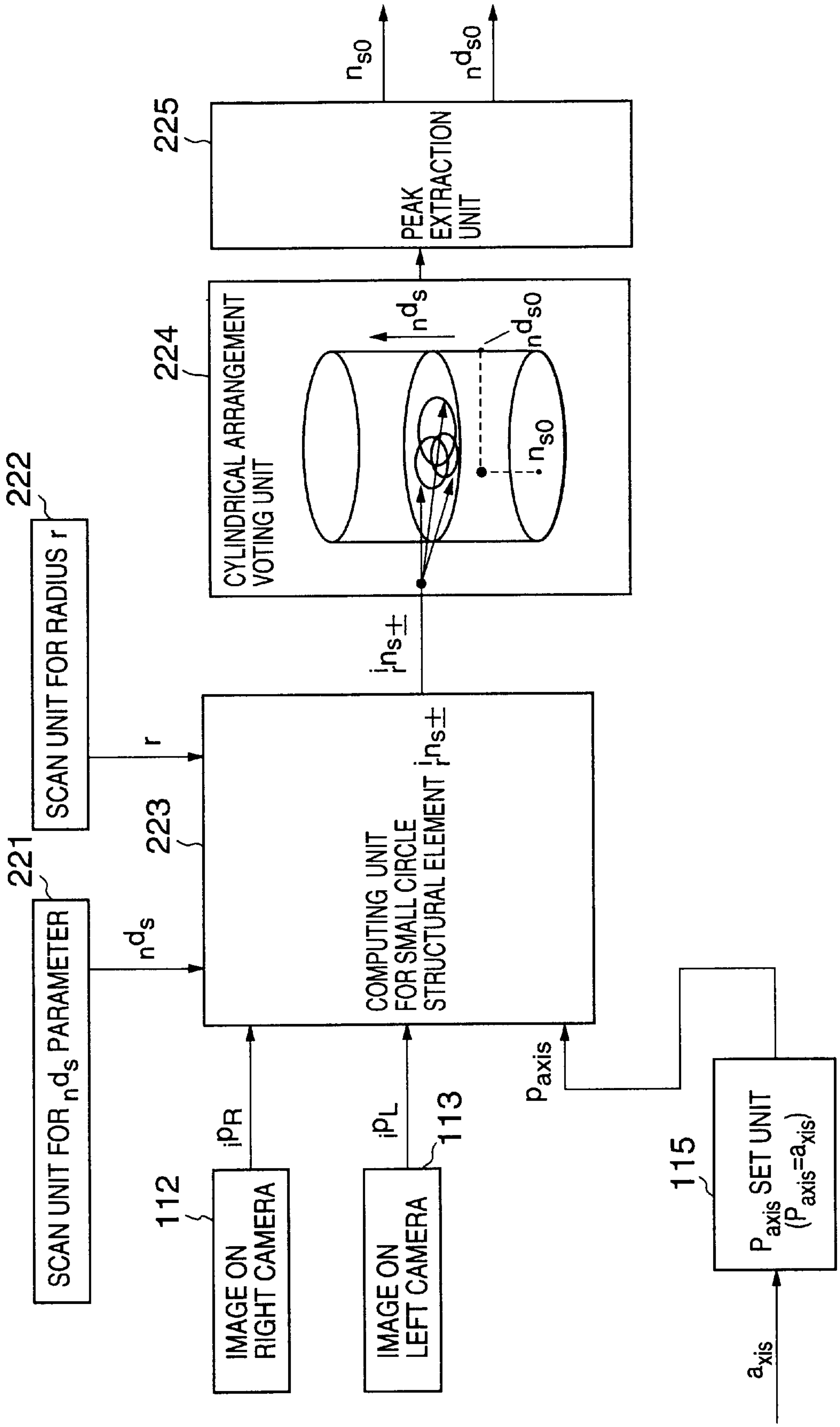

FIG. 83 is a block diagram of an embodiment C-7 of the present invention.

Figure 84:
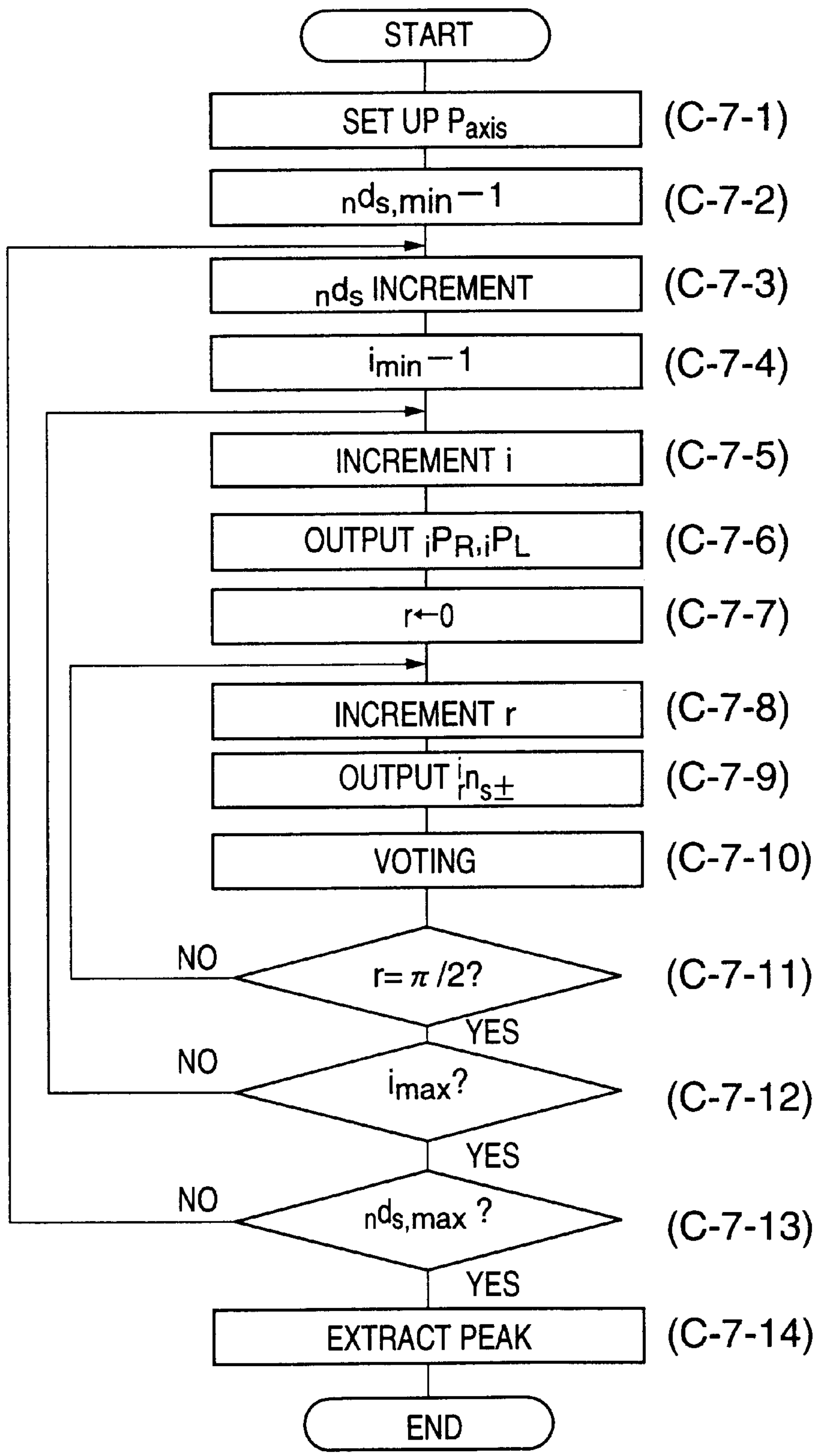

FIG. 84 is a flowchart of the embodiment C-7.

Figure 85:
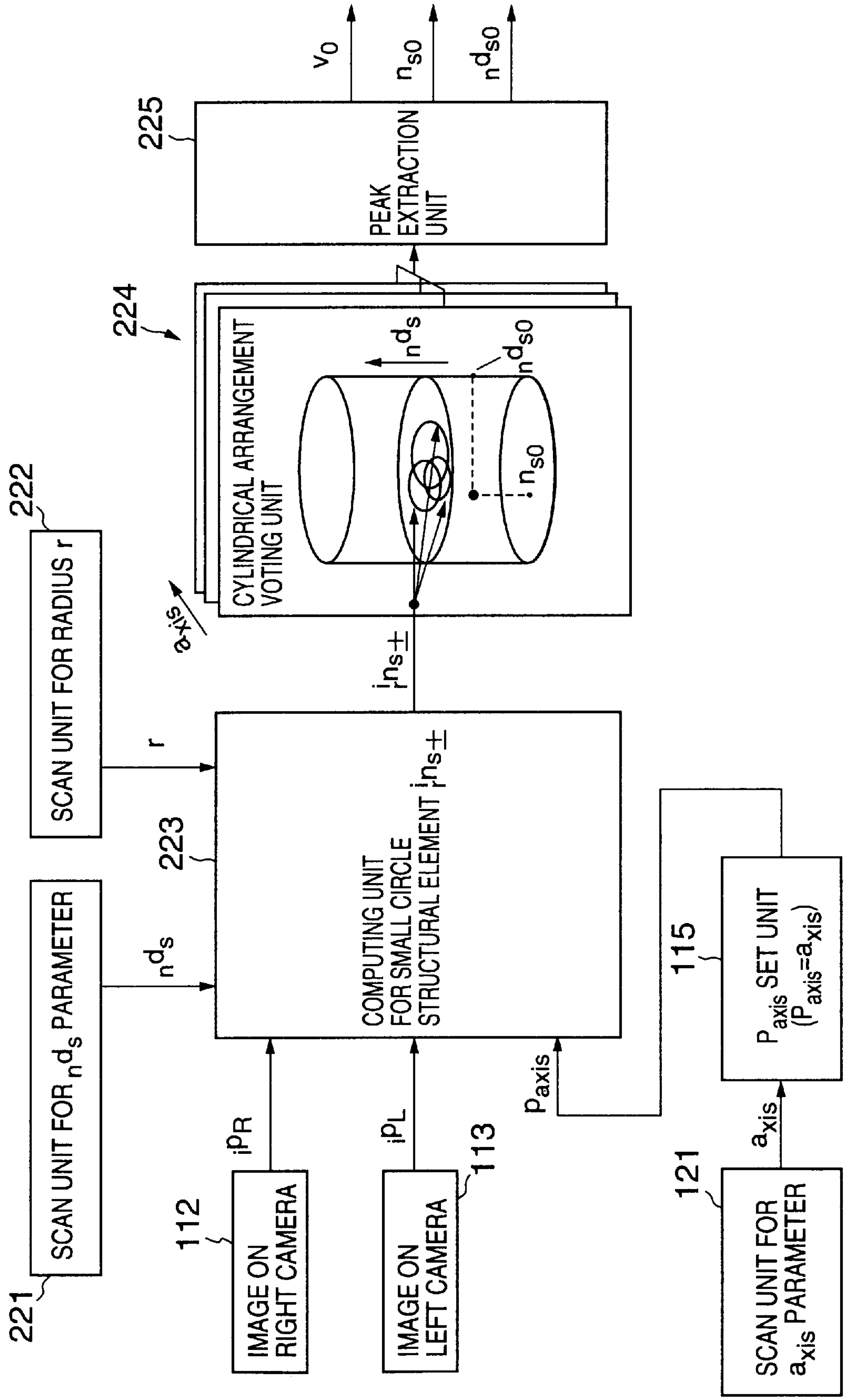

FIG. 85 is a block diagram of an embodiment C-8 of the present invention.

Figure 86:
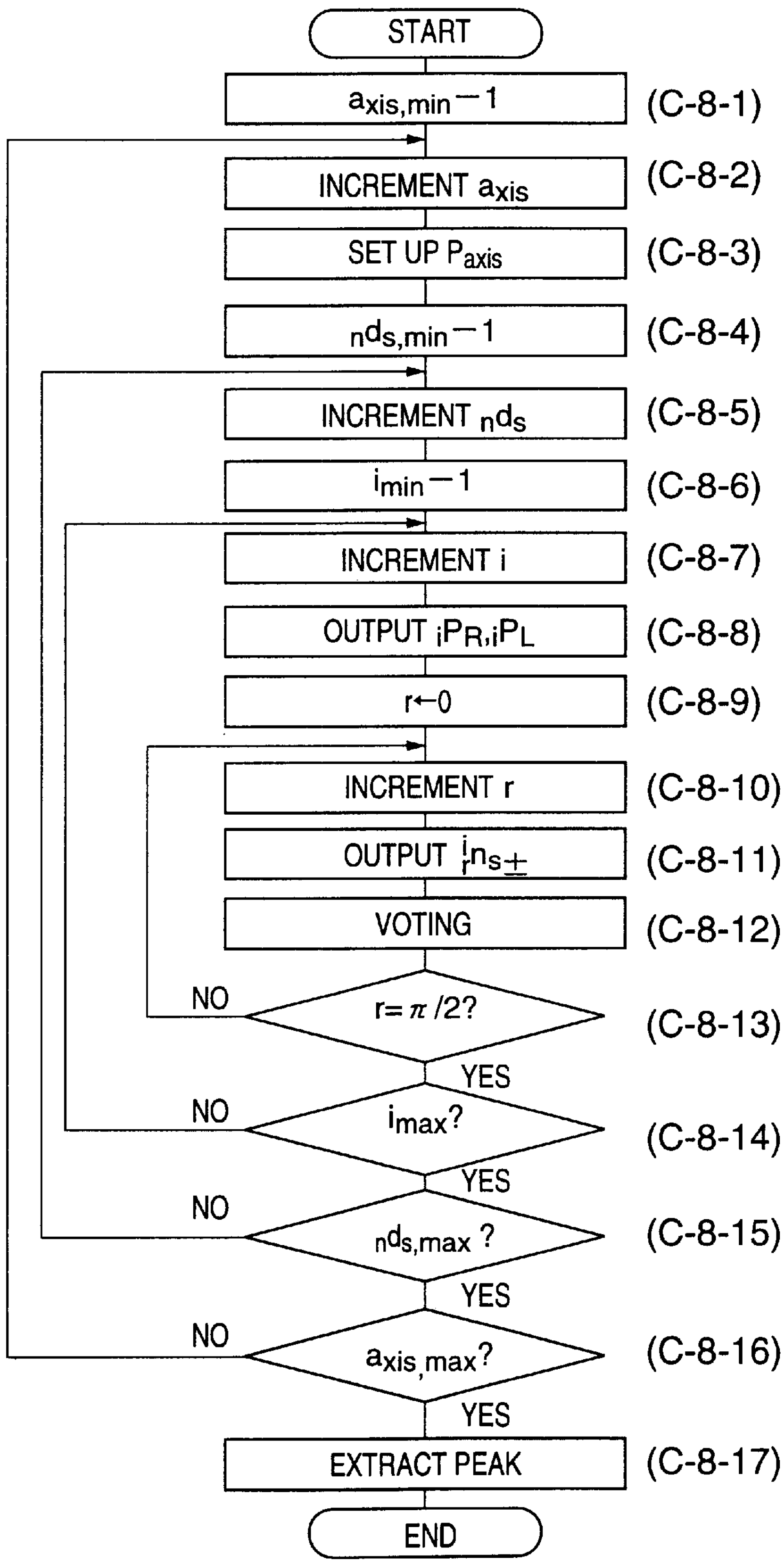

FIG. 86 is a flowchart of the embodiment C-8.

Figure 87:
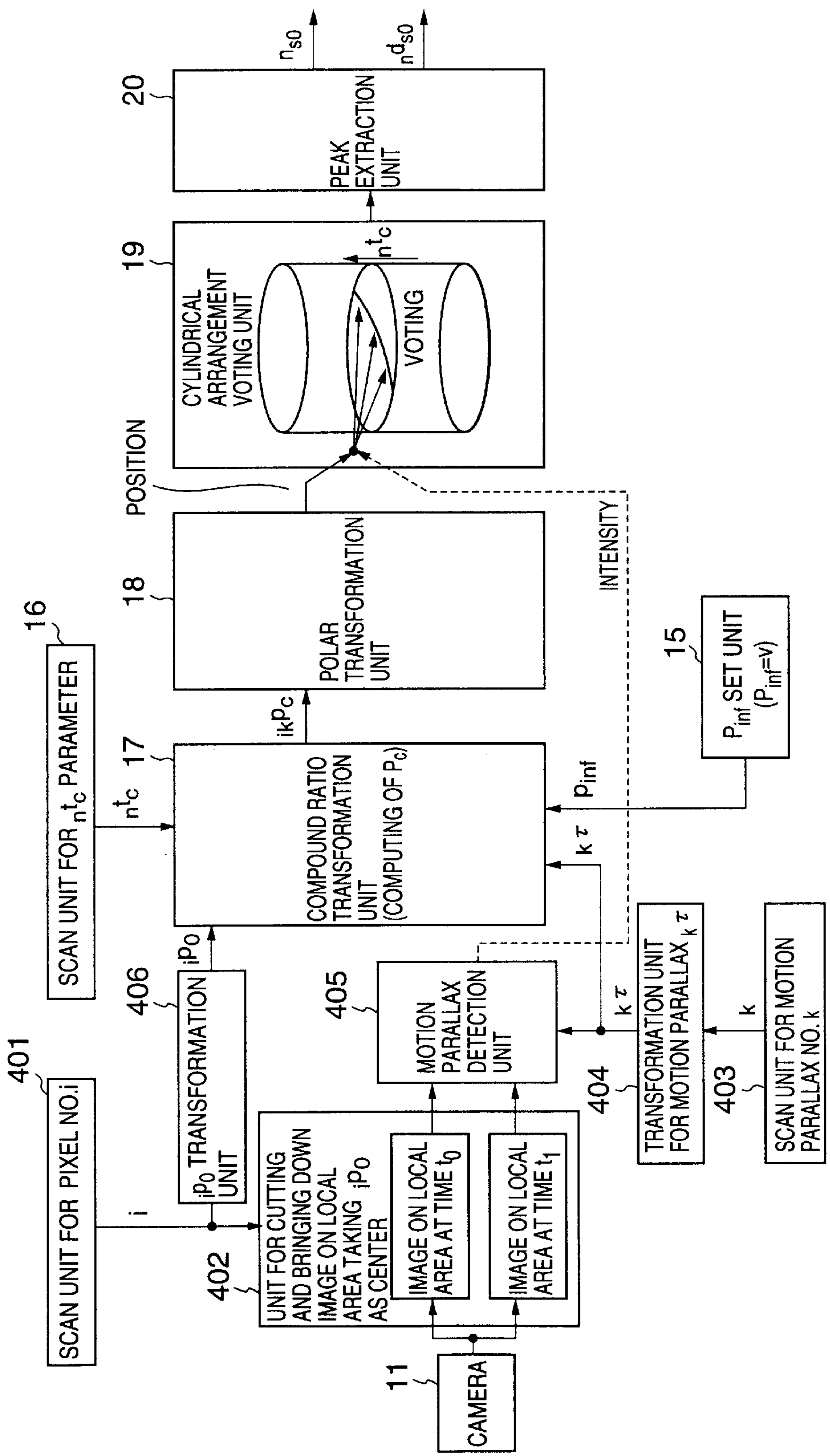

FIG. 87 is a block diagram of an embodiment D-1 of the present invention.

Figure 88:
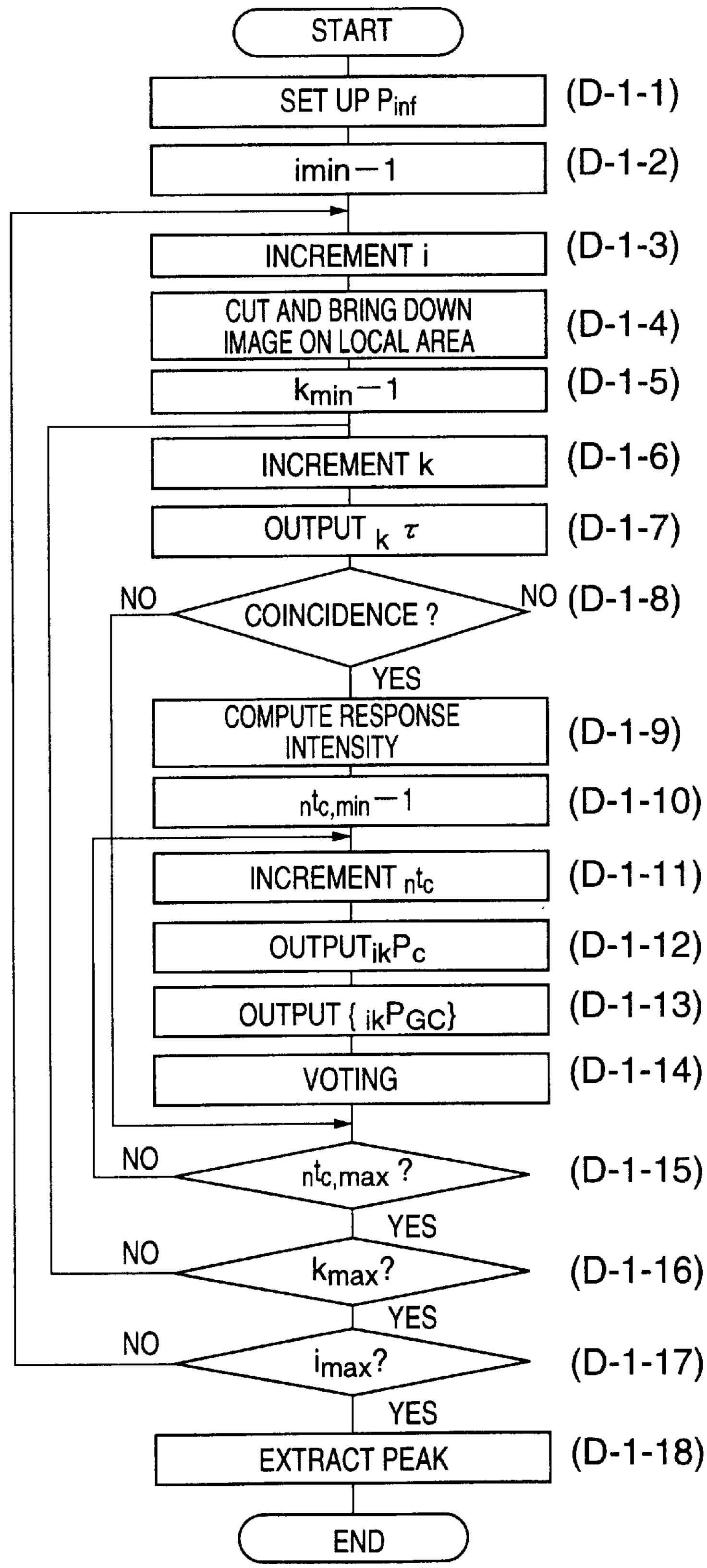

FIG. 88 is a flowchart of the embodiment D-1.

Figure 89:
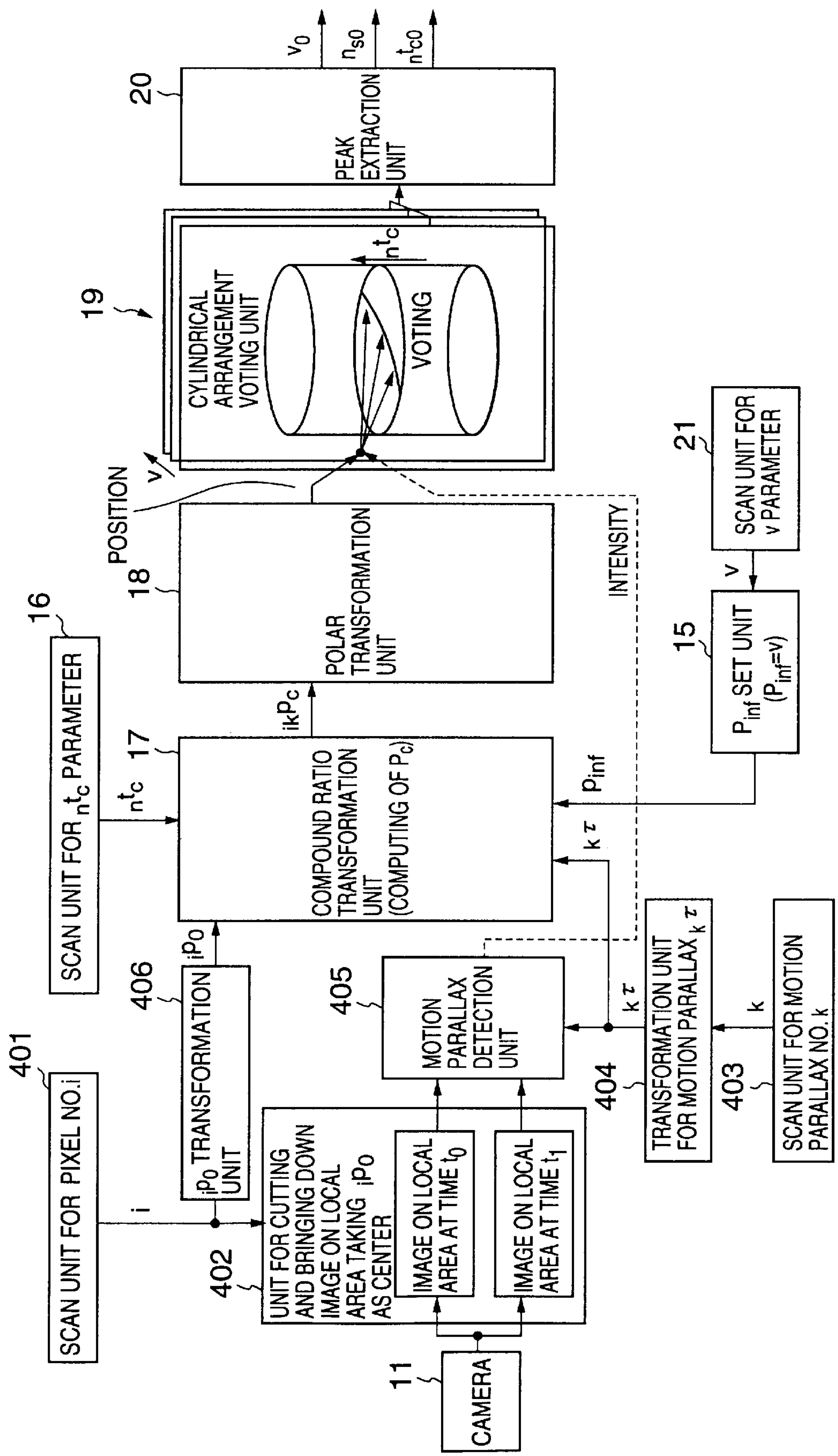

FIG. 89 is a block diagram of an embodiment D-2 of the present invention.

Figure 90:
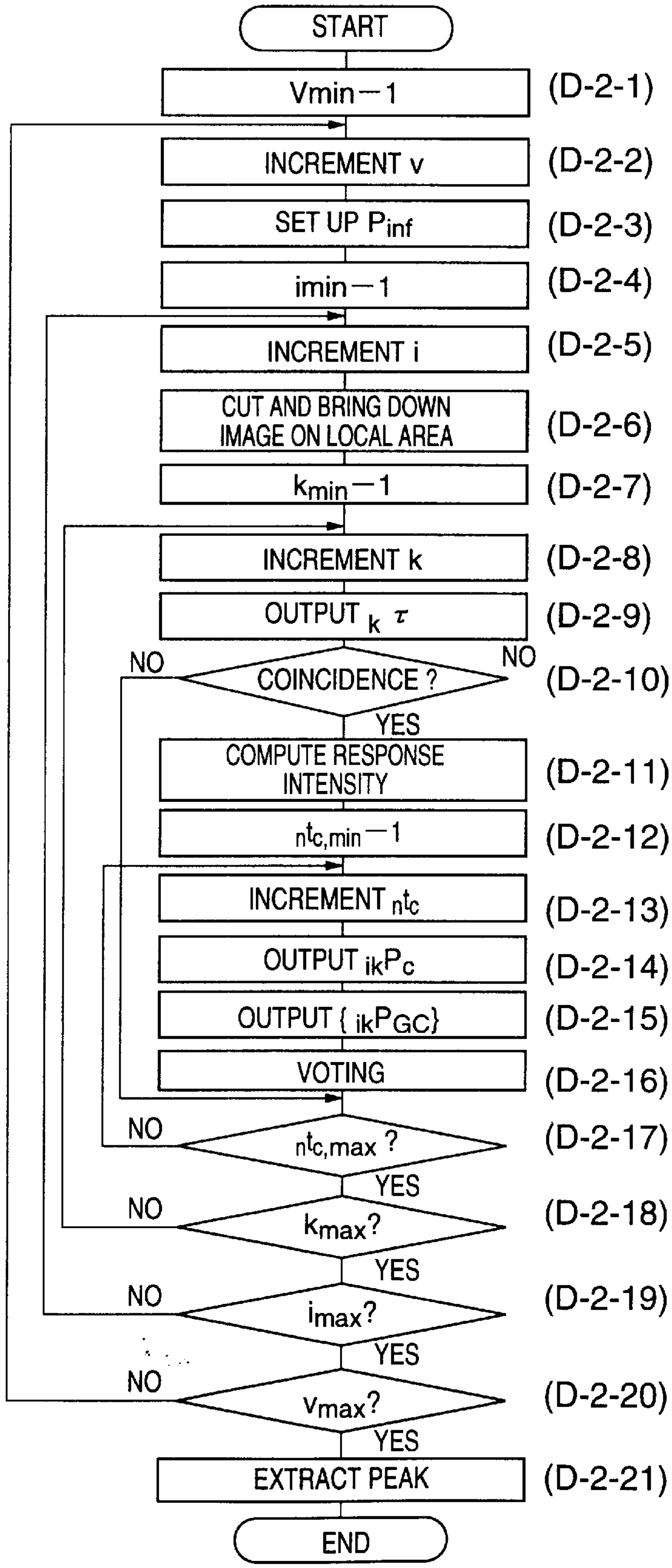

FIG. 90 is a flowchart of the embodiment D-2.

Figure 91:
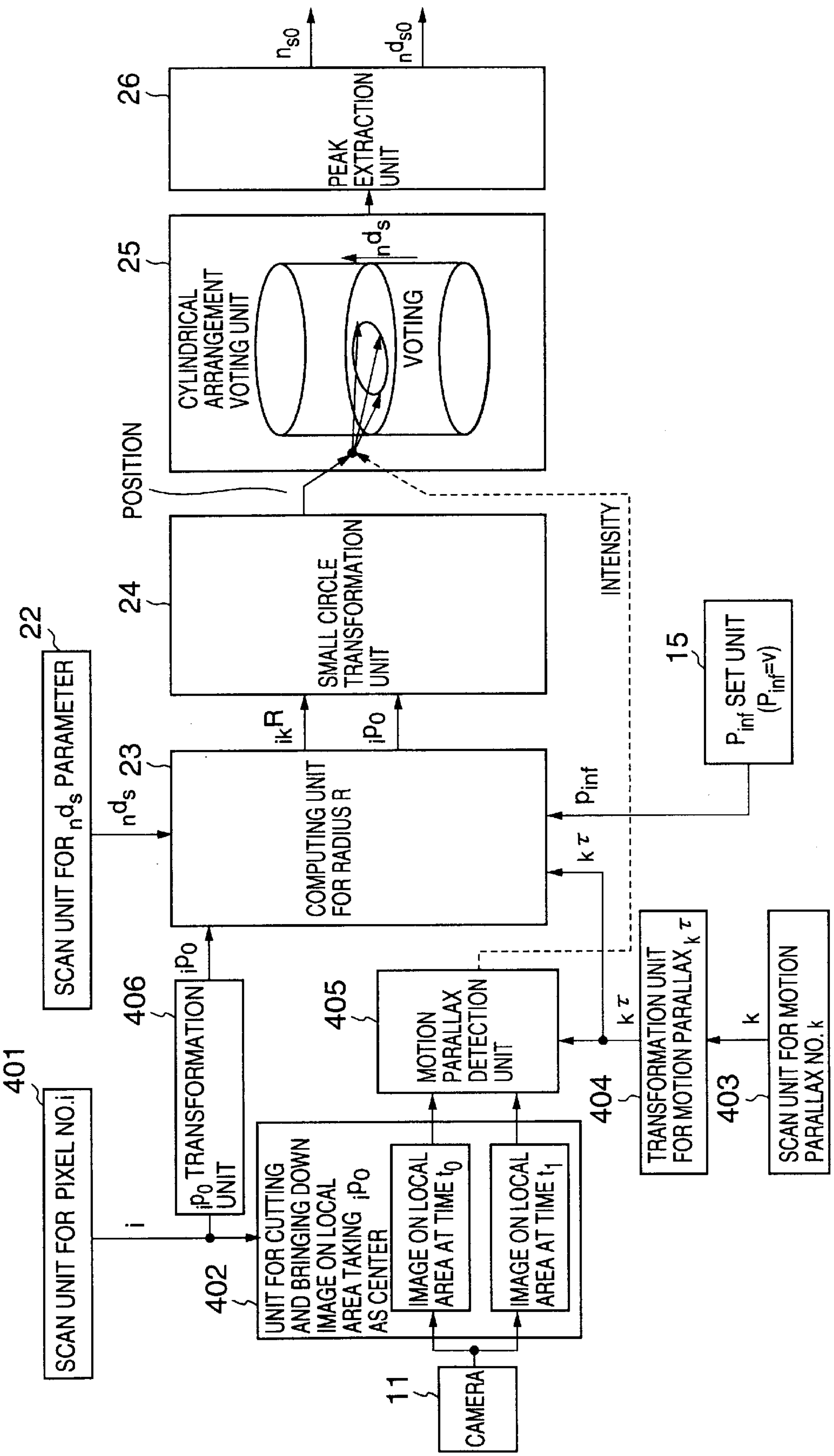

FIG. 91 is a block diagram of an embodiment D-3 of the present invention.

Figure 92:
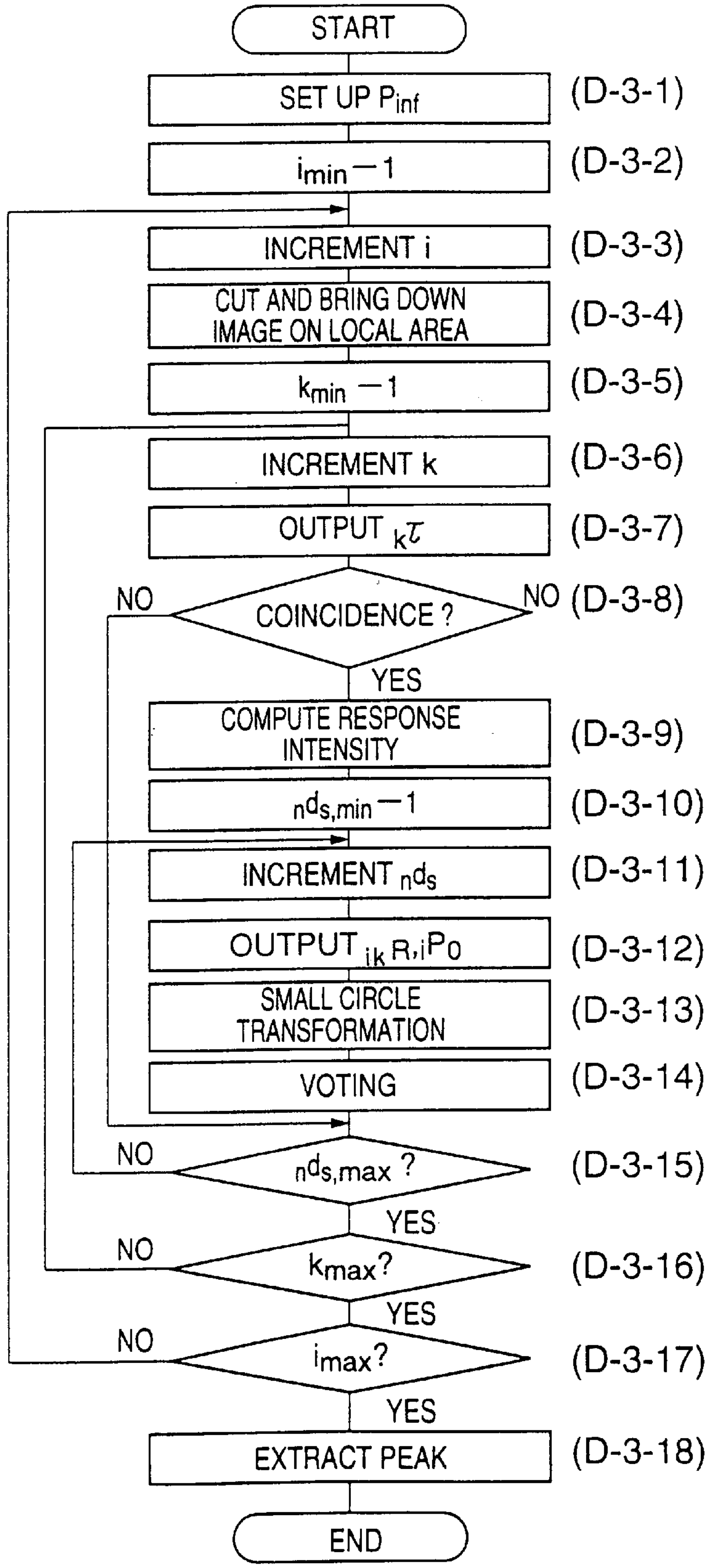

FIG. 92 is a flowchart of the embodiment D-3.

Figure 93:
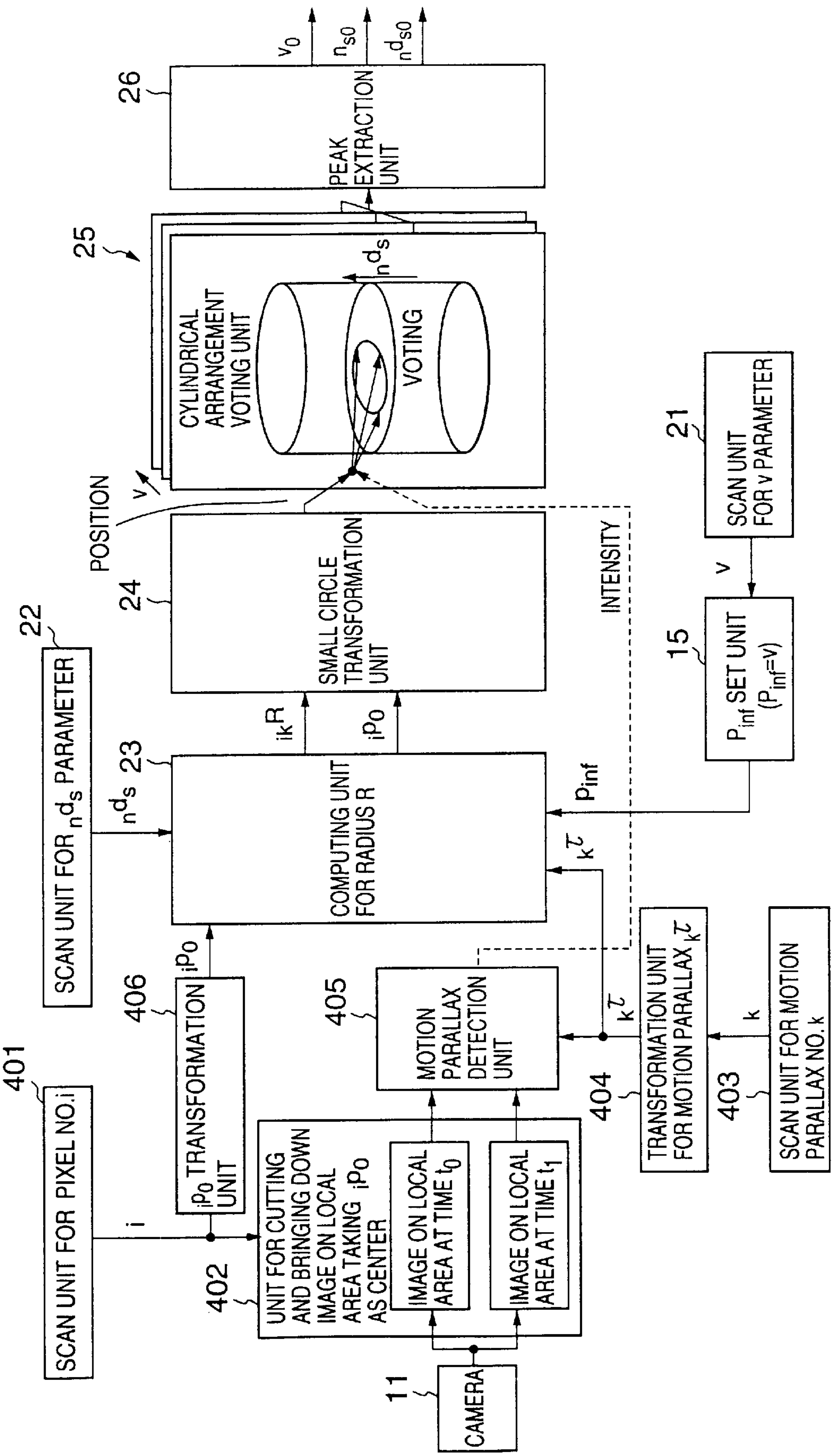

FIG. 93 is a block diagram of an embodiment D-4 of the present invention.

Figure 94:
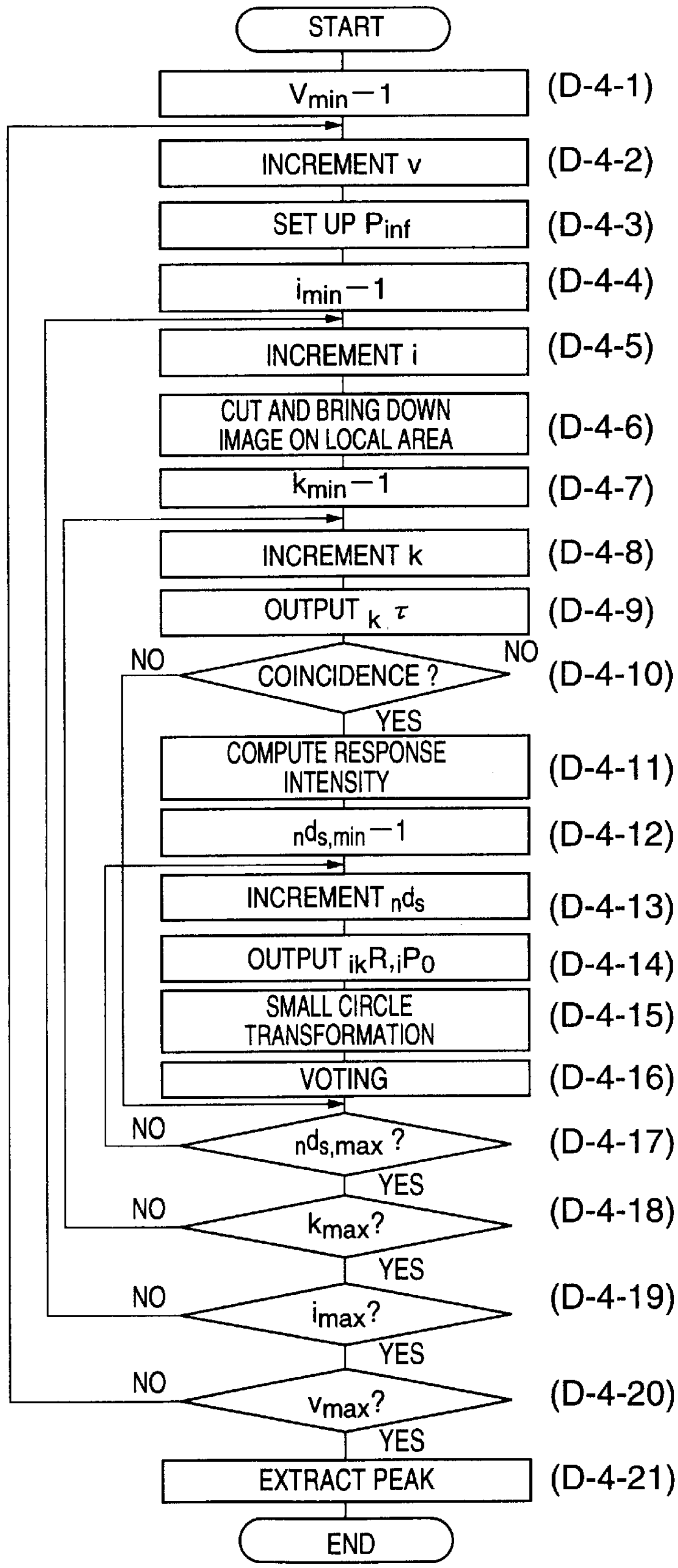

FIG. 94 is a flowchart of the embodiment D-4.

Figure 95:
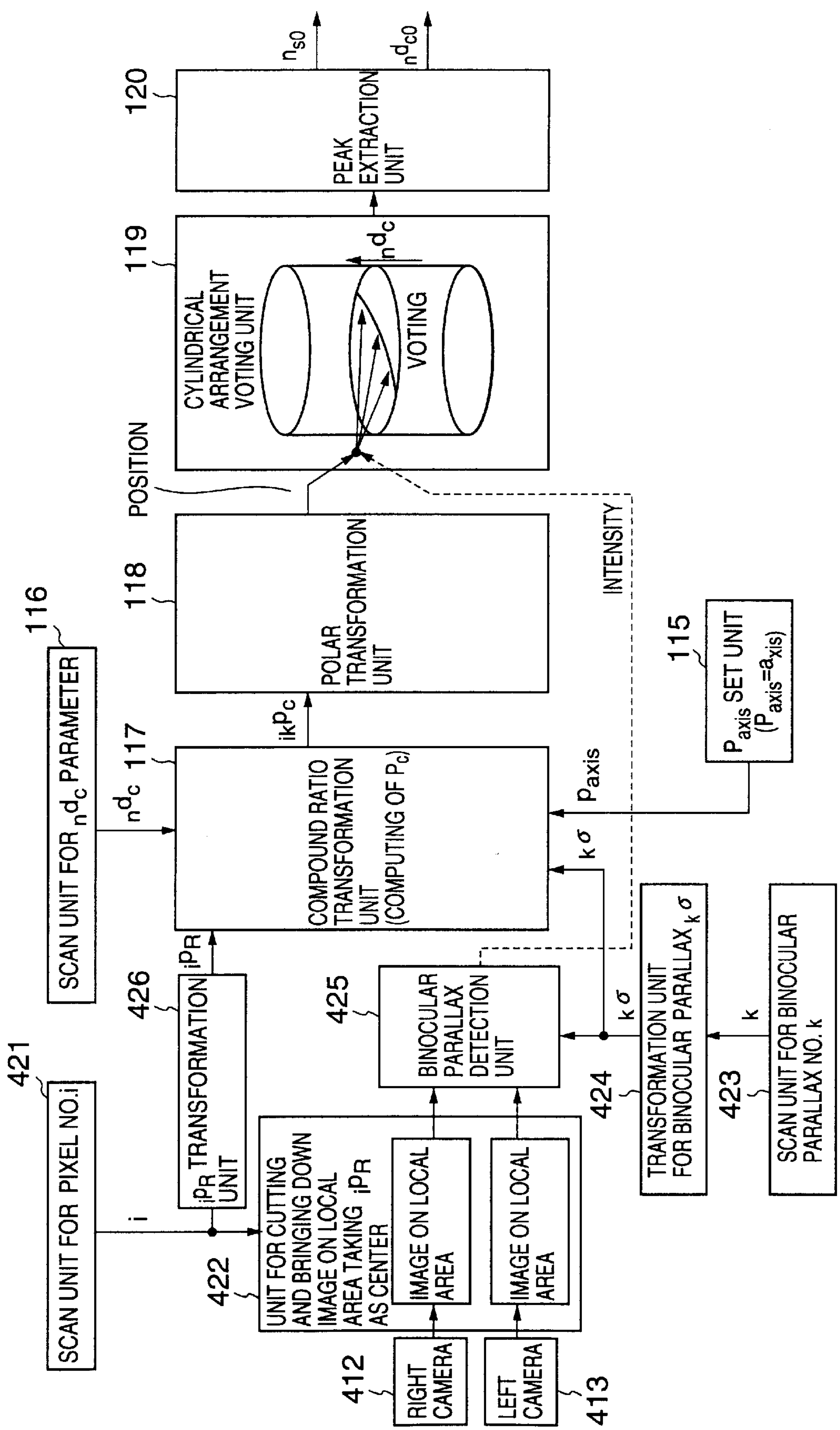

FIG. 95 is a block diagram of an embodiment D-5 of the present invention.

Figure 96:
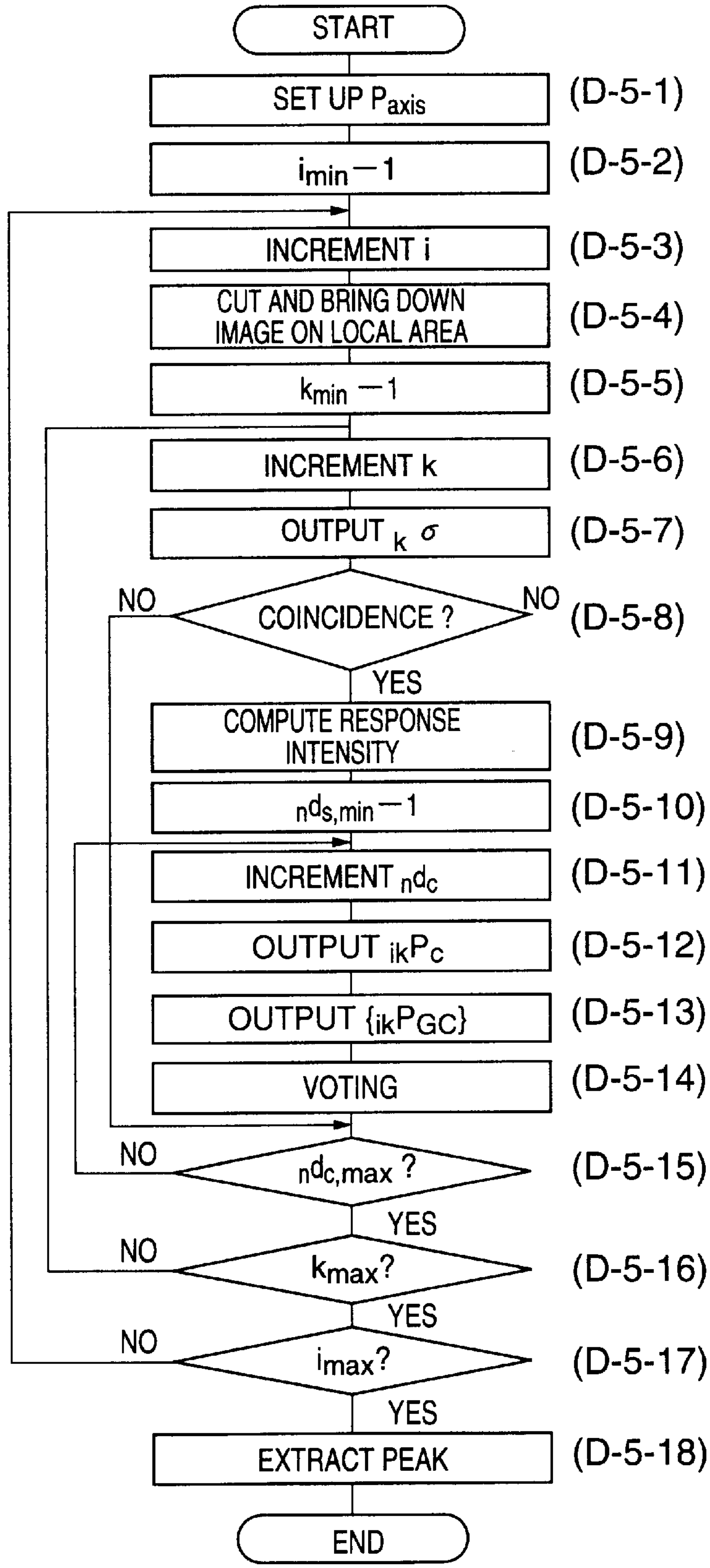

FIG. 96 is a flowchart of the embodiment D-5.

Figure 97:
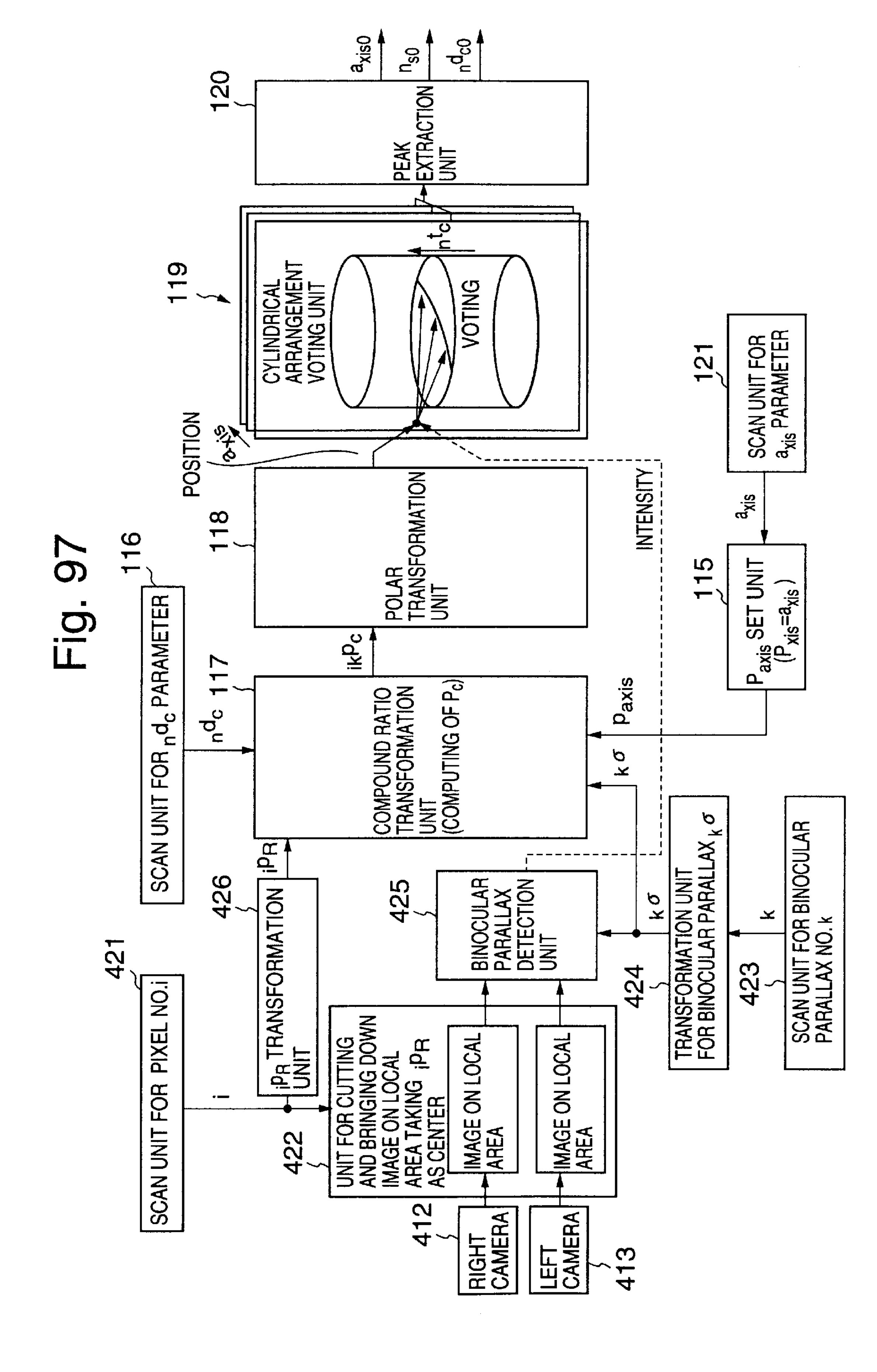

FIG. 97 is a block diagram of an embodiment D-6 of the present invention.

Figure 98:
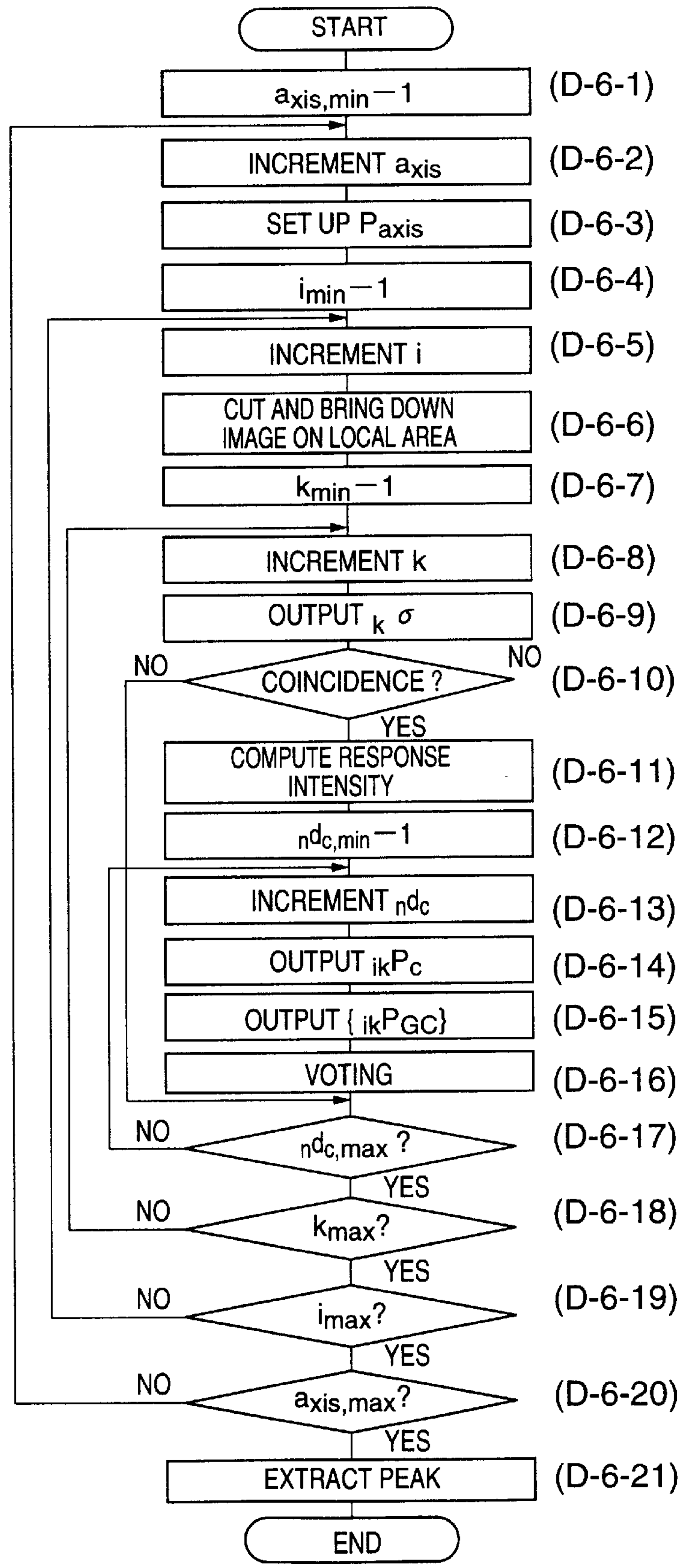

FIG. 98 is a flowchart of the embodiment D-6.

Figure 99:
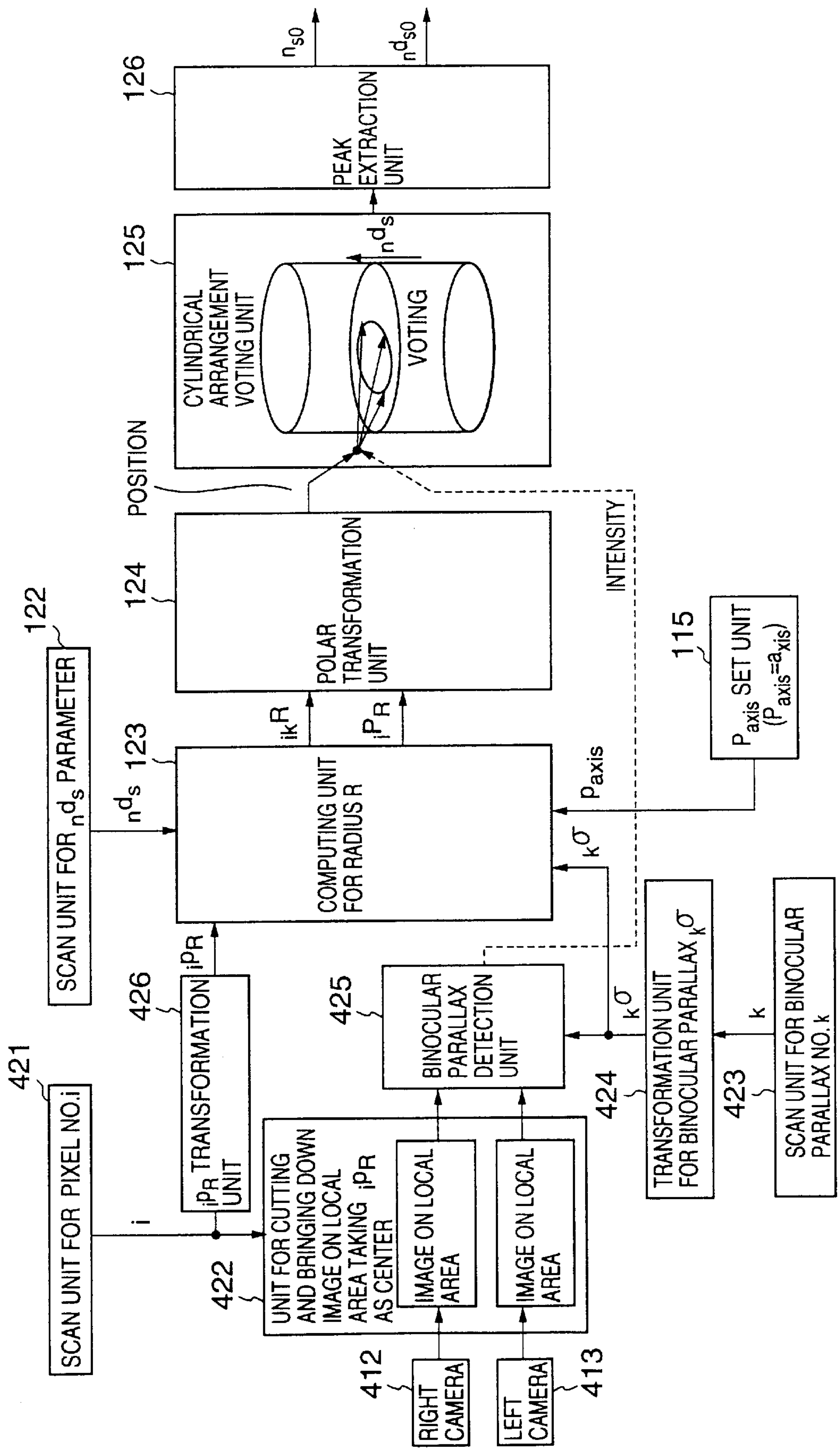

FIG. 99 is a block diagram of an embodiment D-7 of the present invention.

Figure 100:
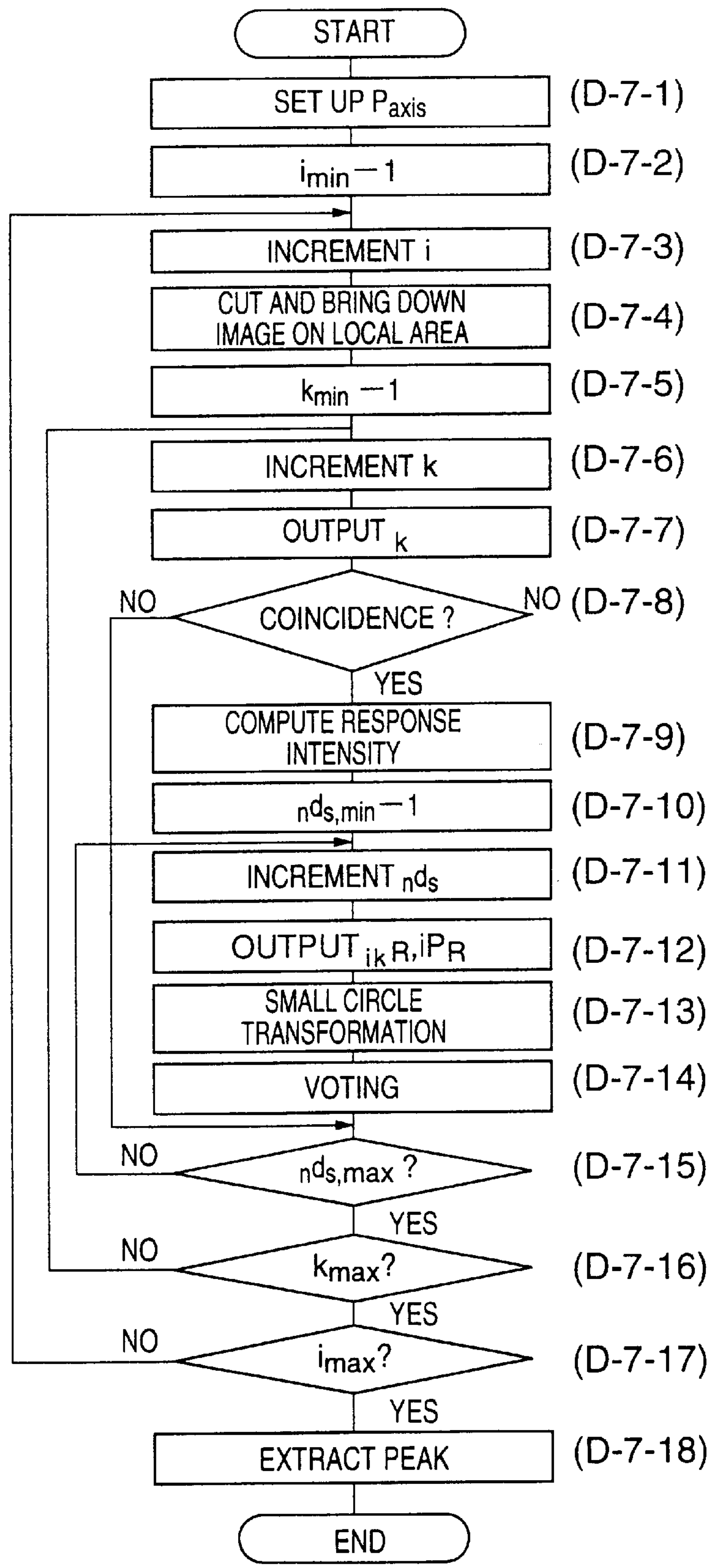

FIG. 100 is a flowchart of the embodiment D-7.

Figure 101:
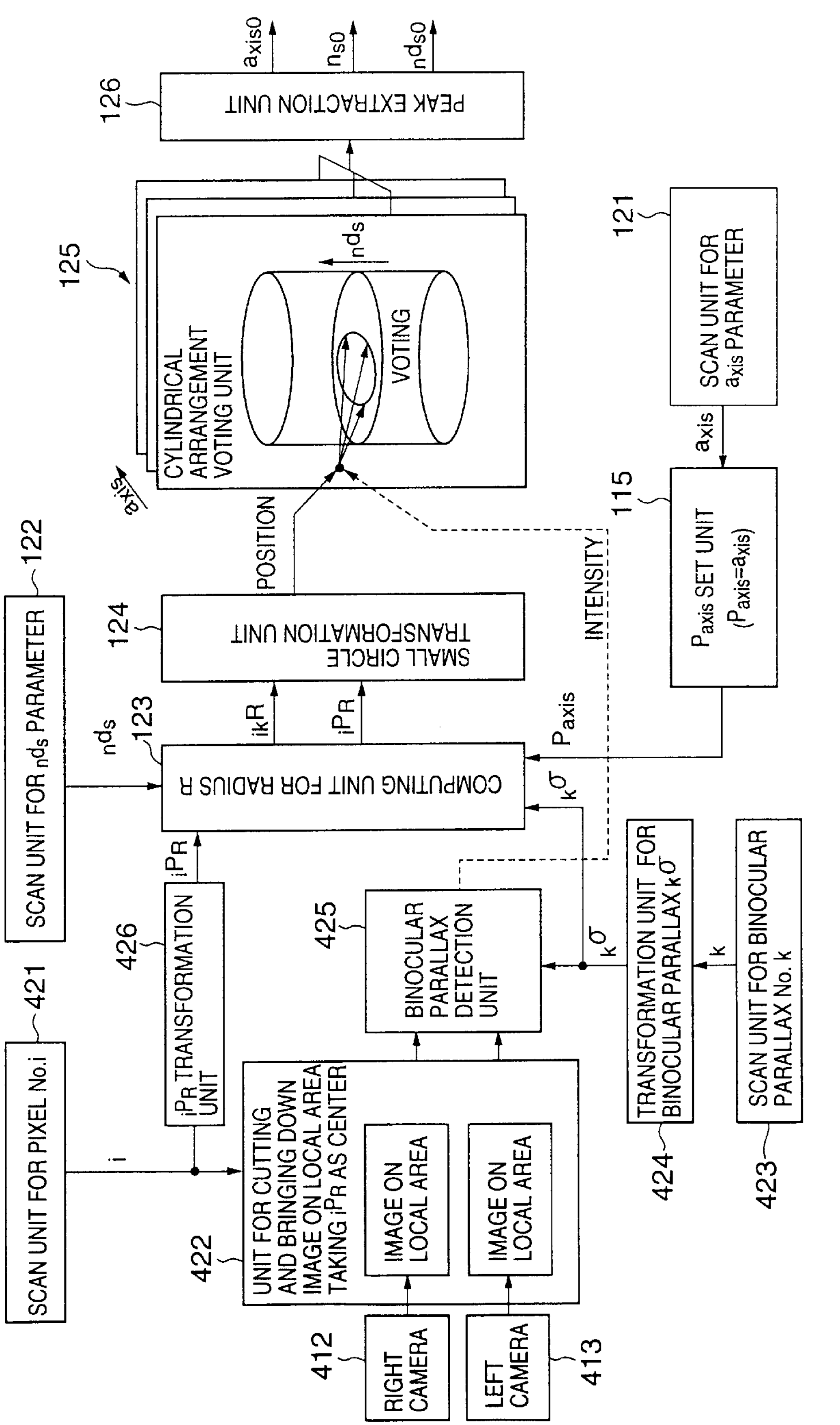

FIG. 101 is a block diagram of an embodiment D-8 of the present invention.

Figure 102:
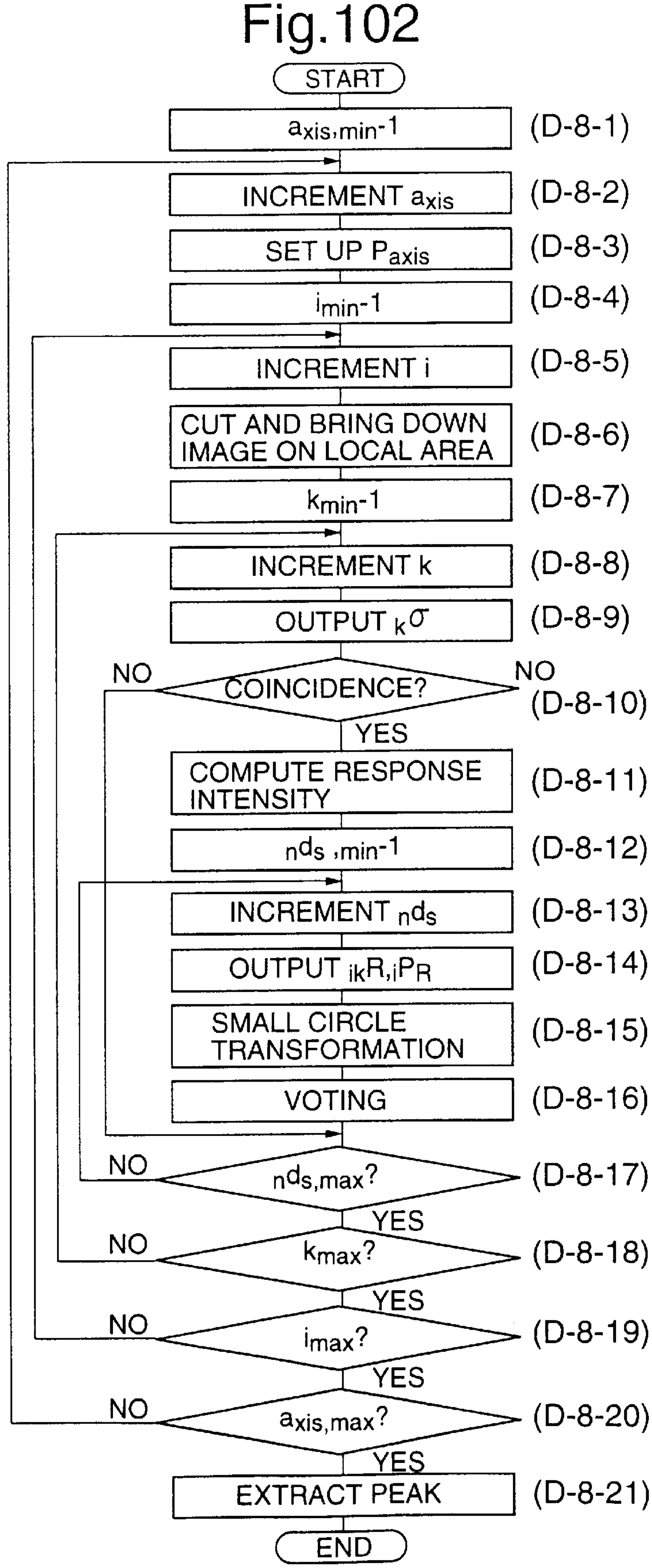

FIG. 102 is a flowchart of the embodiment D-8.

Figure 103:
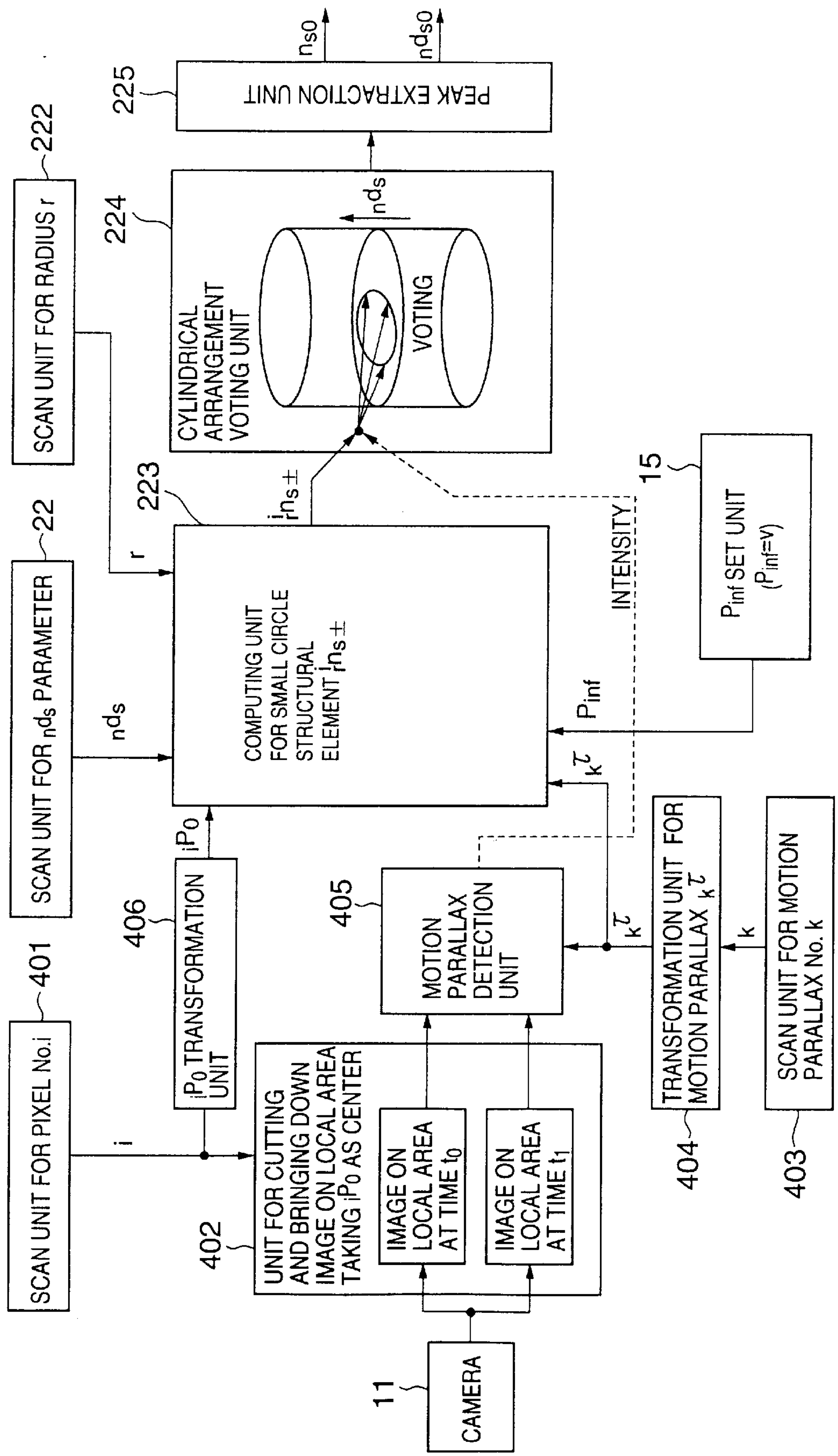

FIG. 103 is a block diagram of an embodiment D-9 of the present invention.

Figure 104:
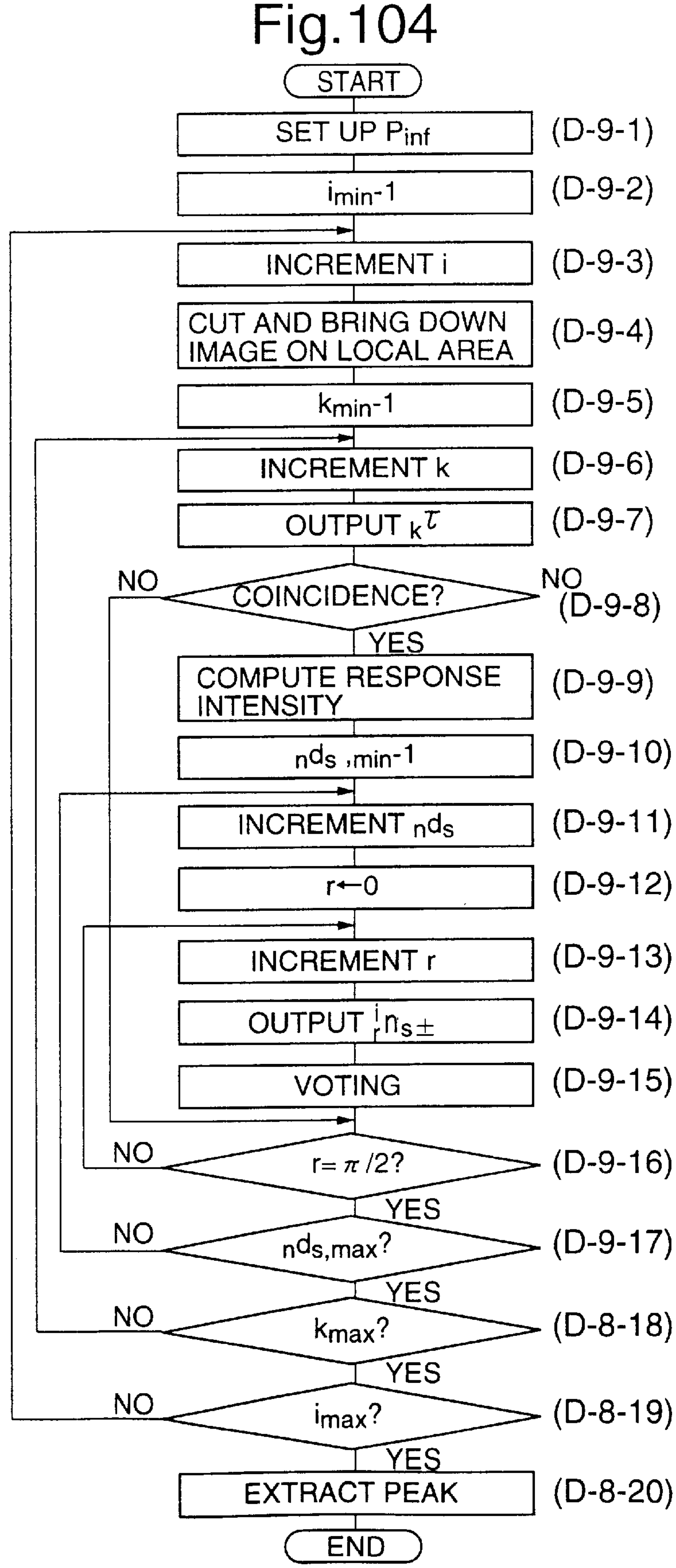

FIG. 104 is a flowchart of the embodiment D-9.

Figure 105:
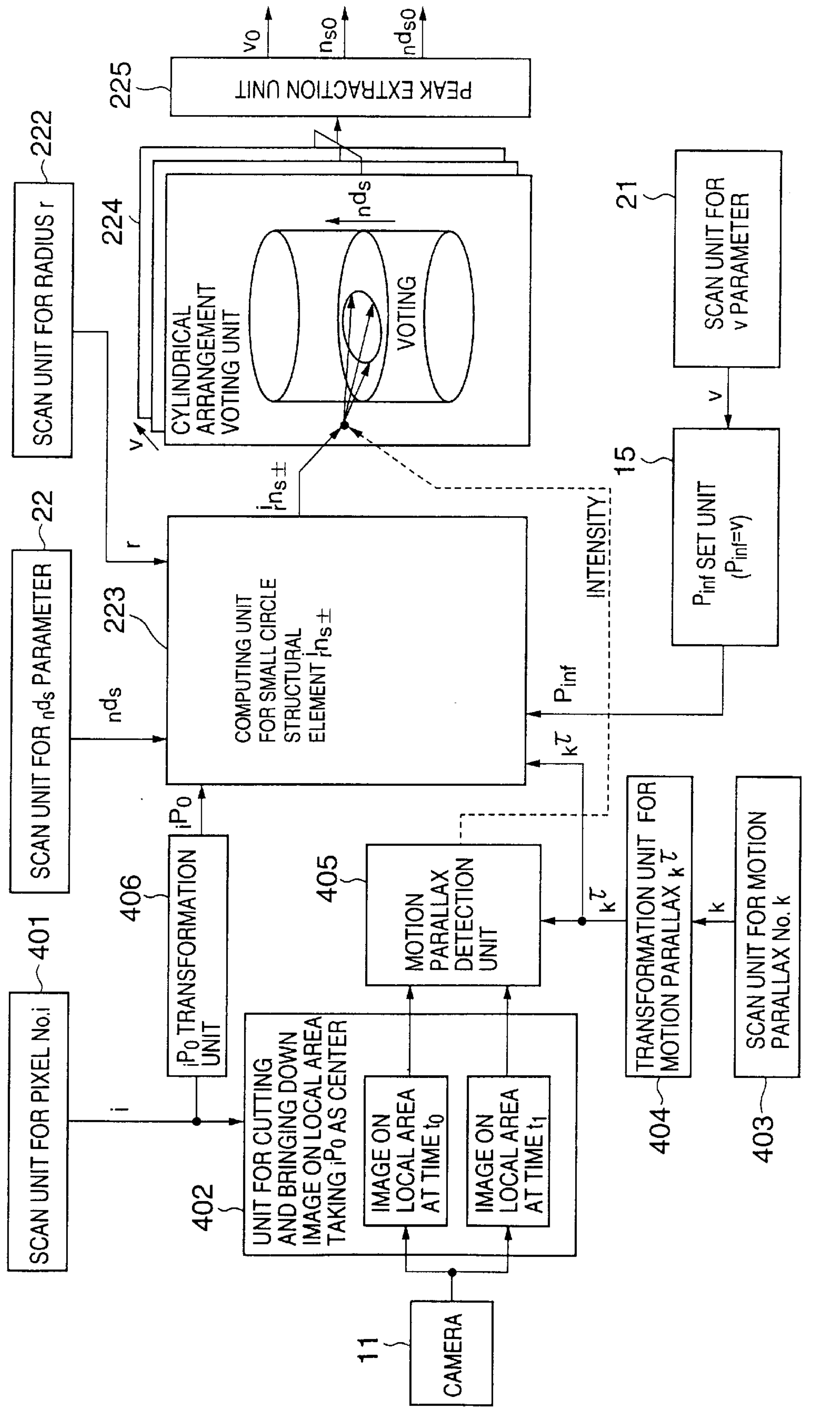

FIG. 105 is a block diagram of an embodiment D-10 of the present invention.

Figure 106:
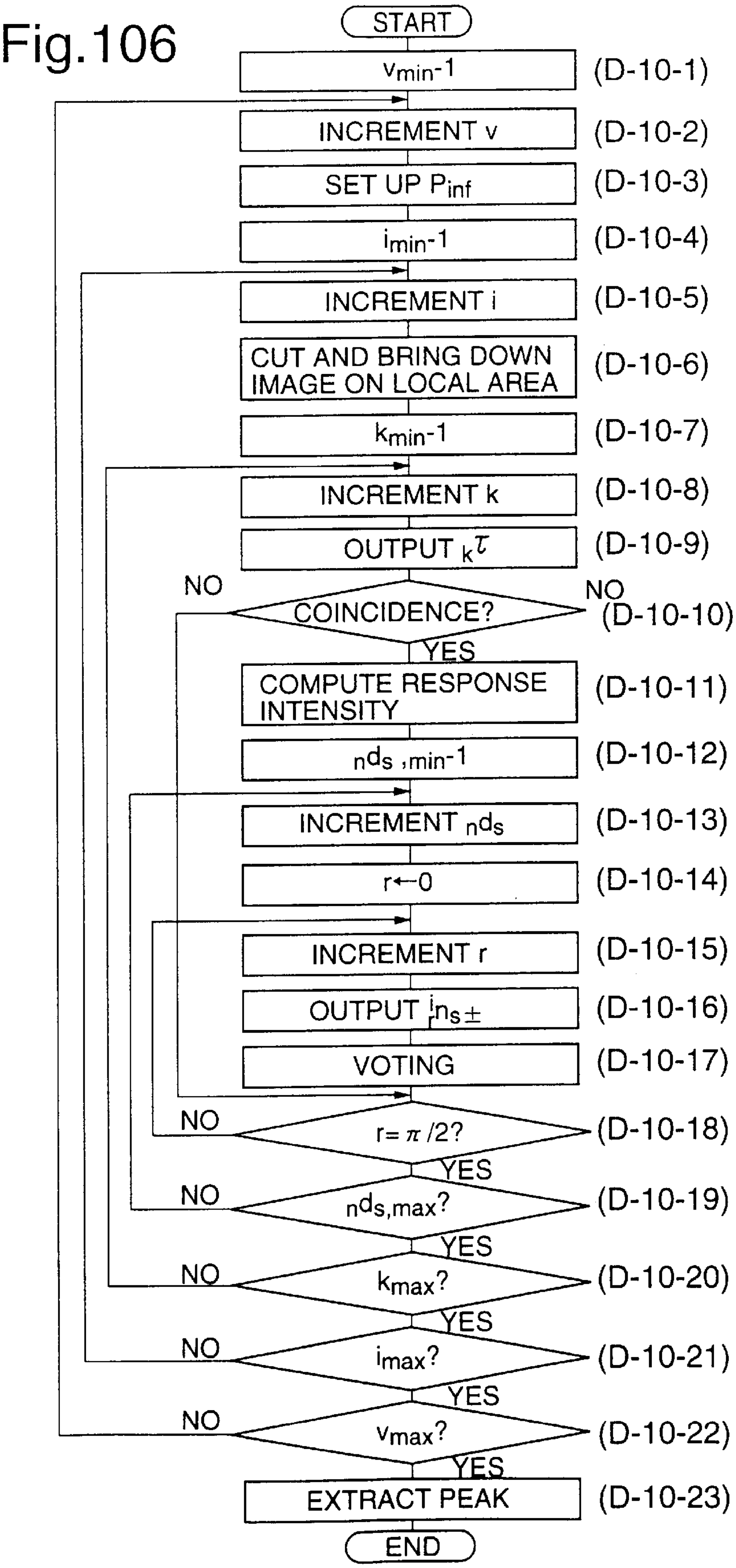

FIG. 106 is a flowchart of the embodiment D-10.

Figure 107:
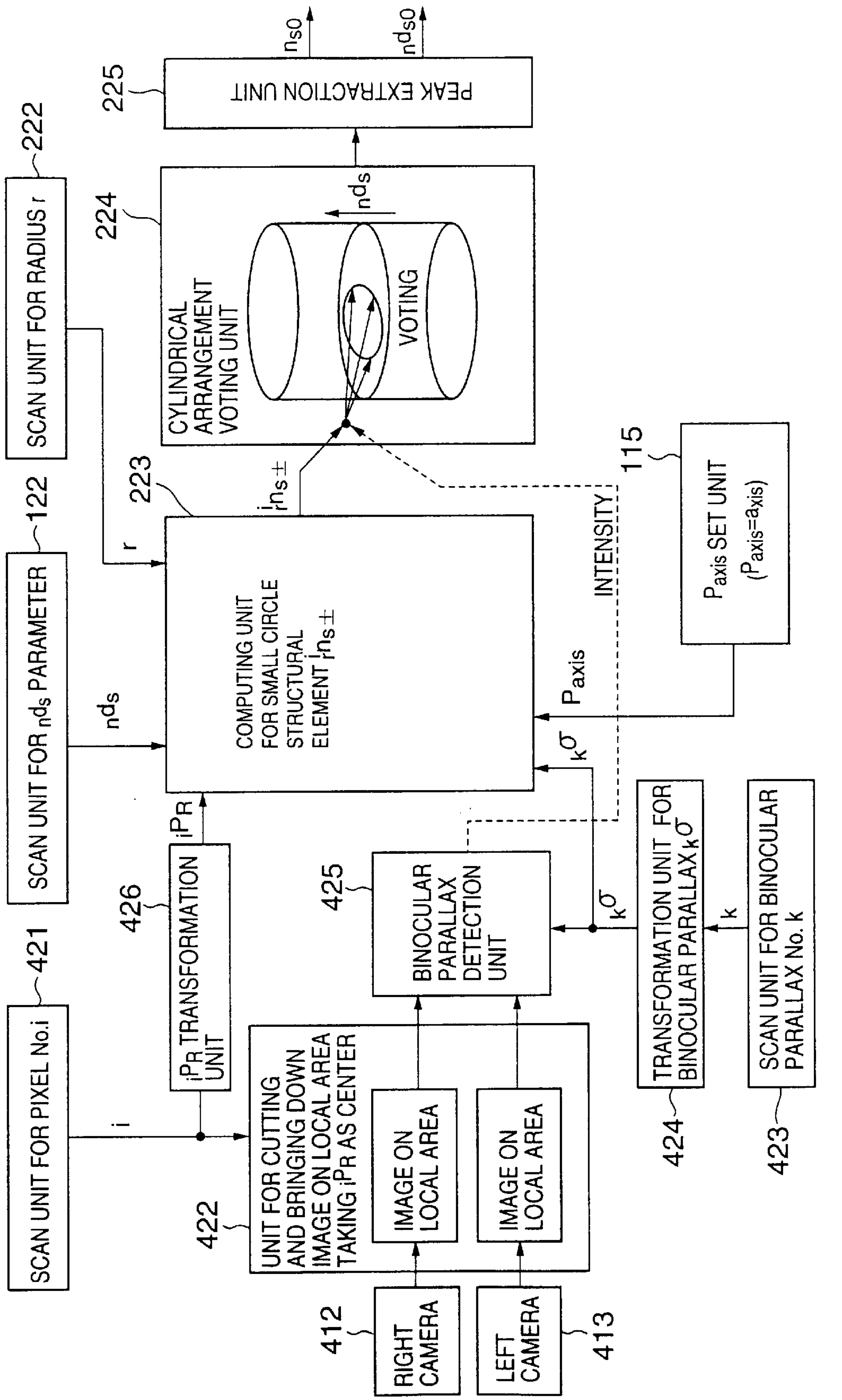

FIG. 107 is a block diagram of an embodiment D-11 of the present invention.

Figure 108:
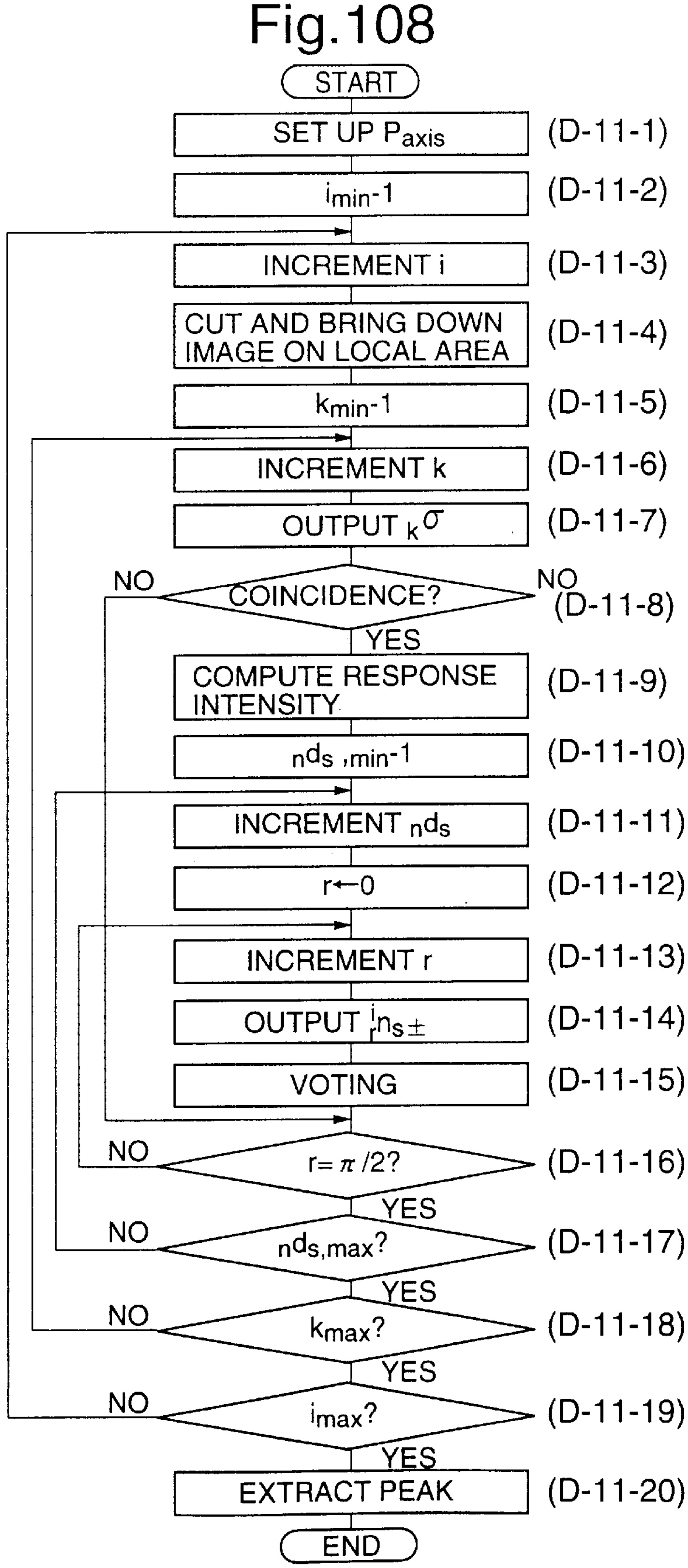

FIG. 108 is a flowchart of the embodiment D-11.

Figure 109:
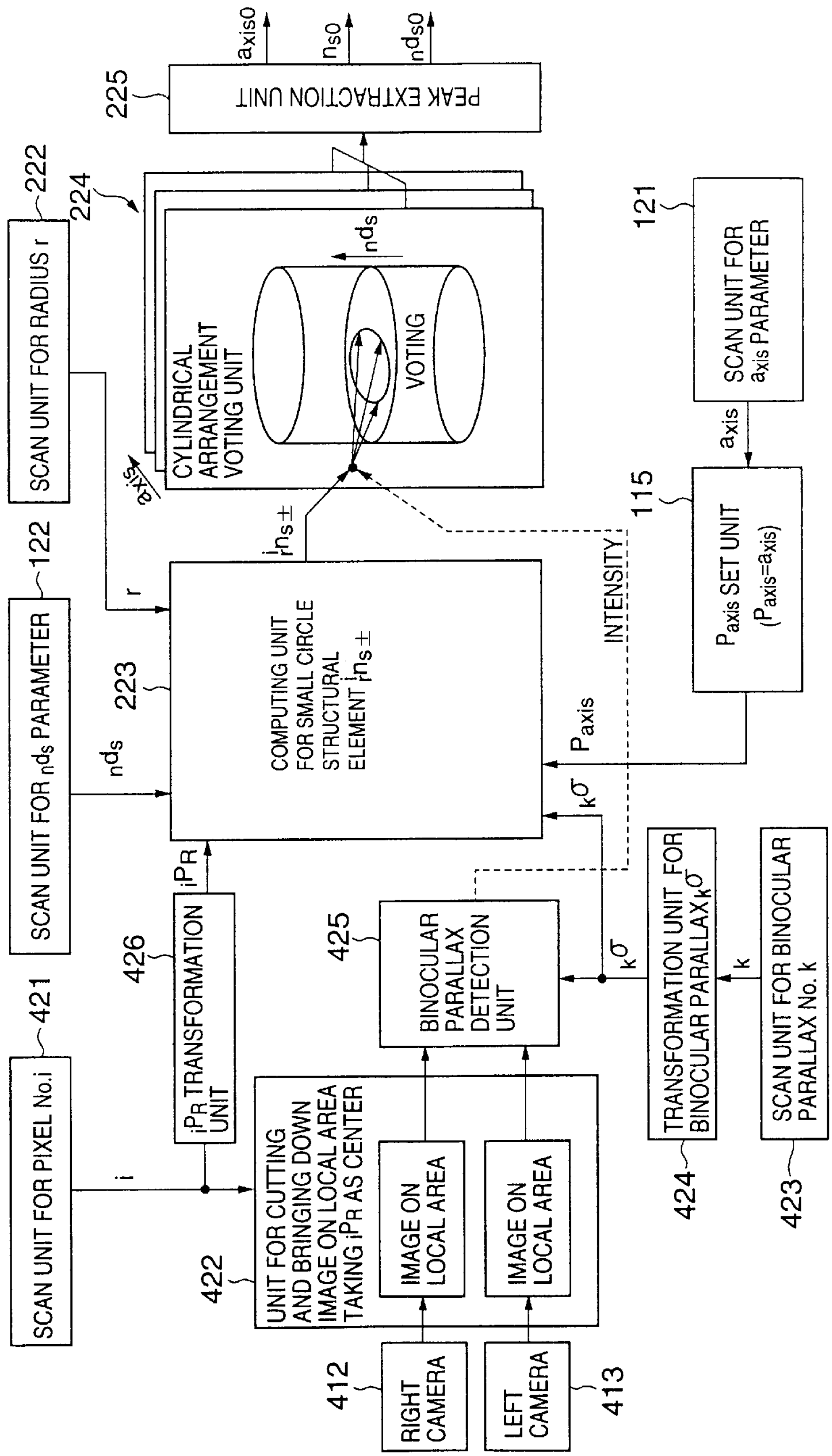

FIG. 109 is a block diagram of an embodiment D-12 of the present invention.

Figure 110:
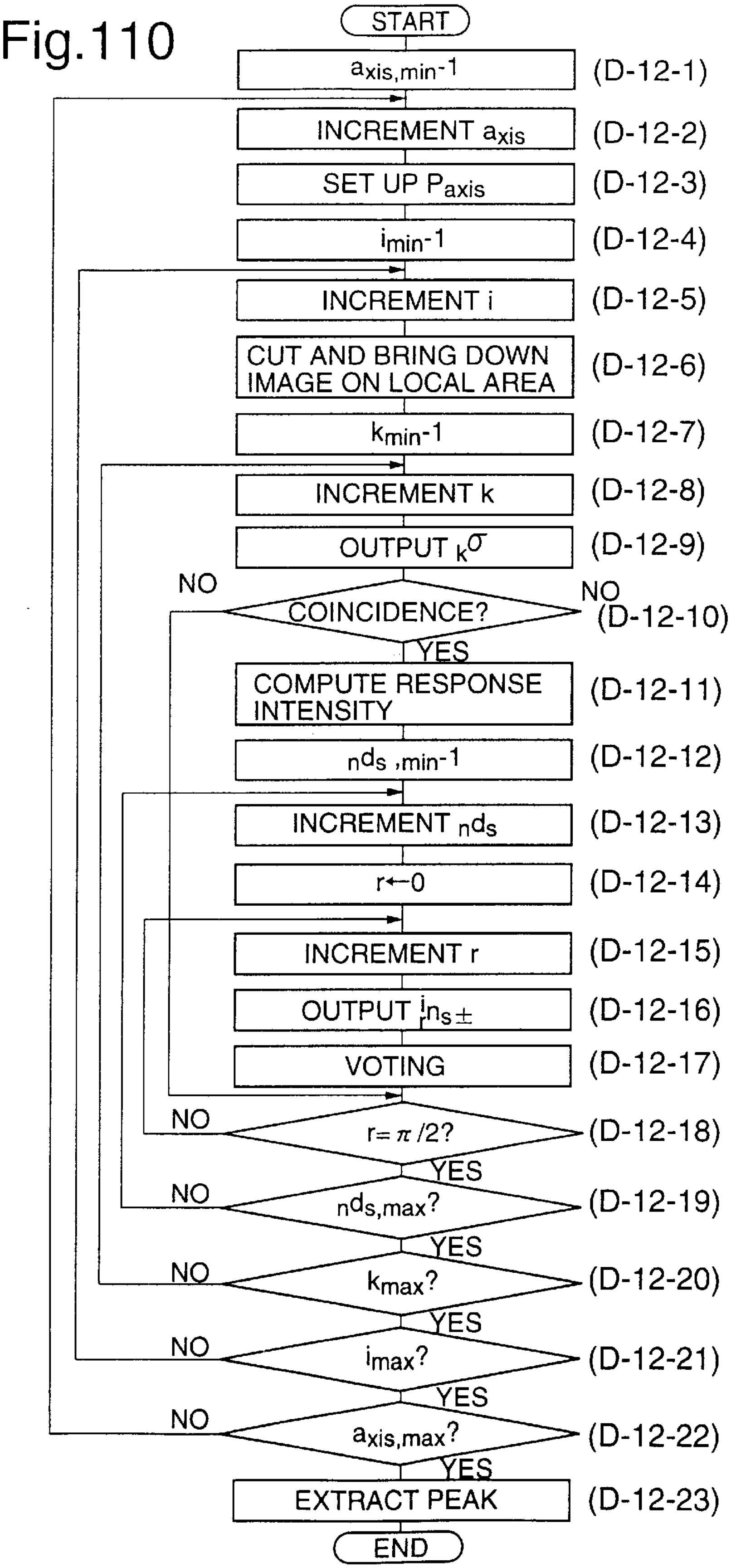

FIG. 110 is a flowchart of the embodiment D-12.

FIG. 111 is a block diagram of an embodiment E-1 of the present invention.

Figure 112:
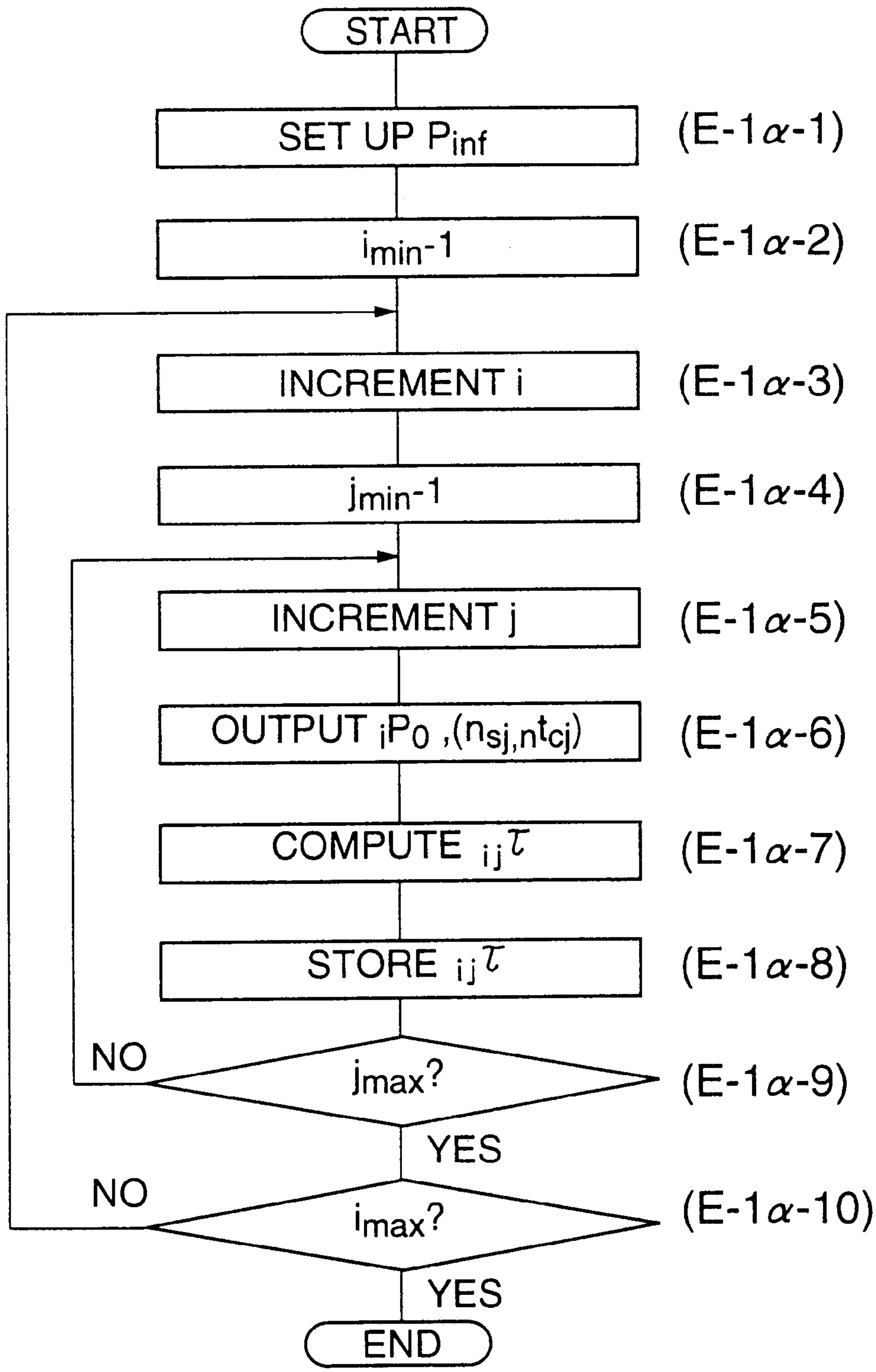

FIG. 112 is a flowchart of the embodiment E-1.

Figure 113:
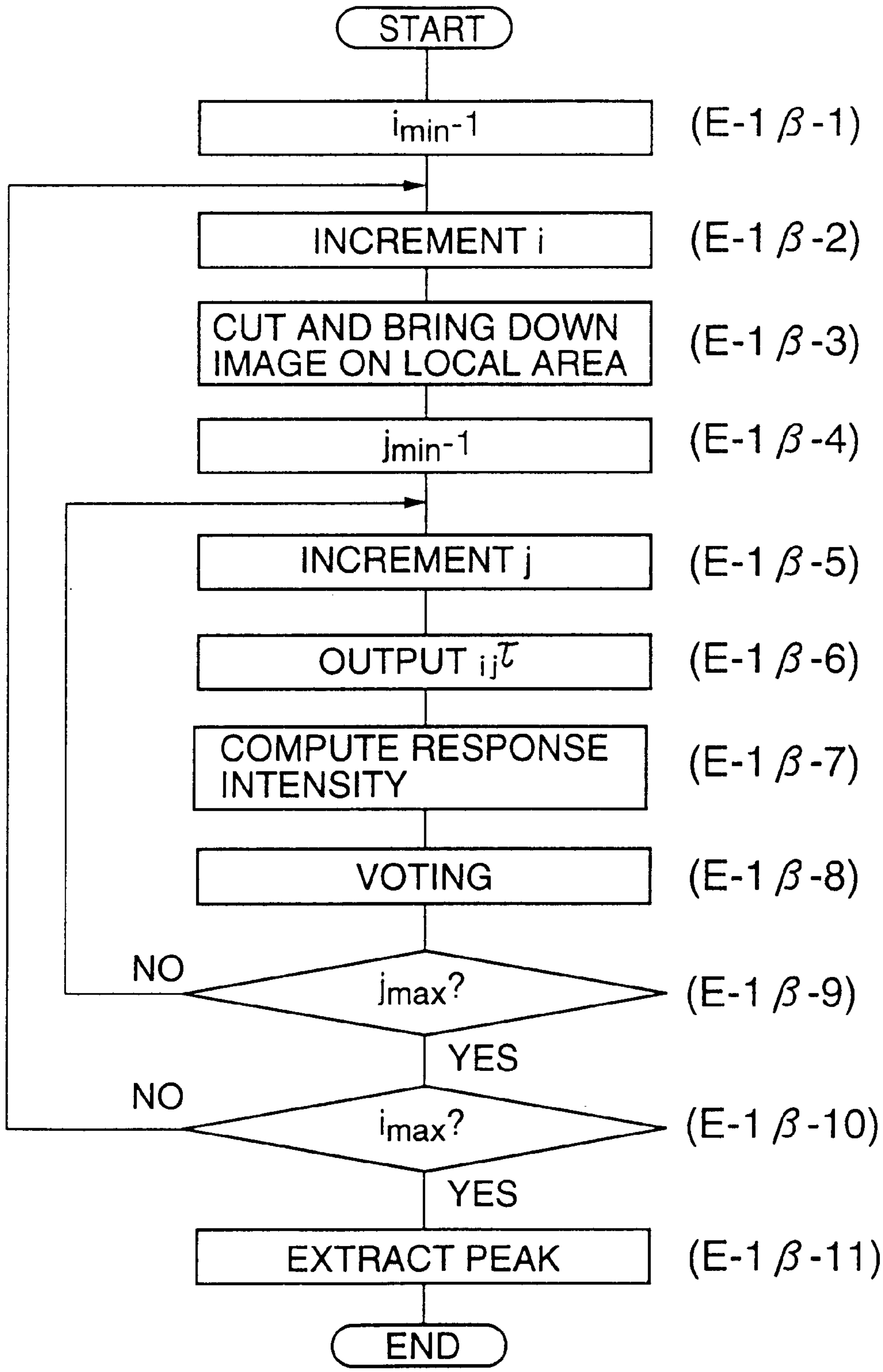

FIG. 113 is a flowchart of the embodiment E-1.

FIG. 114 is a block diagram of an embodiment E-2 of the present invention.

Figure 115:
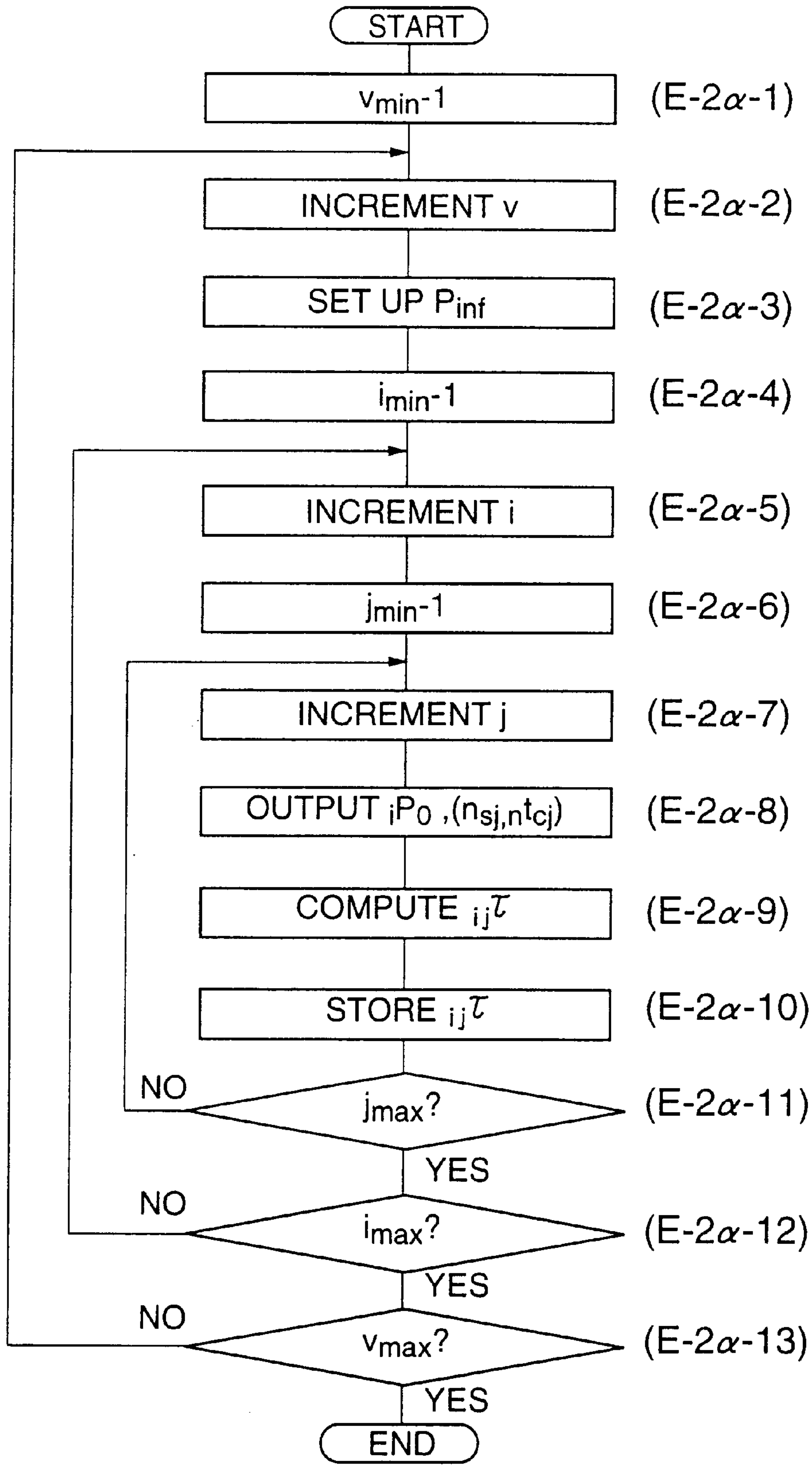

FIG. 115 is a flowchart of the embodiment E-2.

Figure 116:
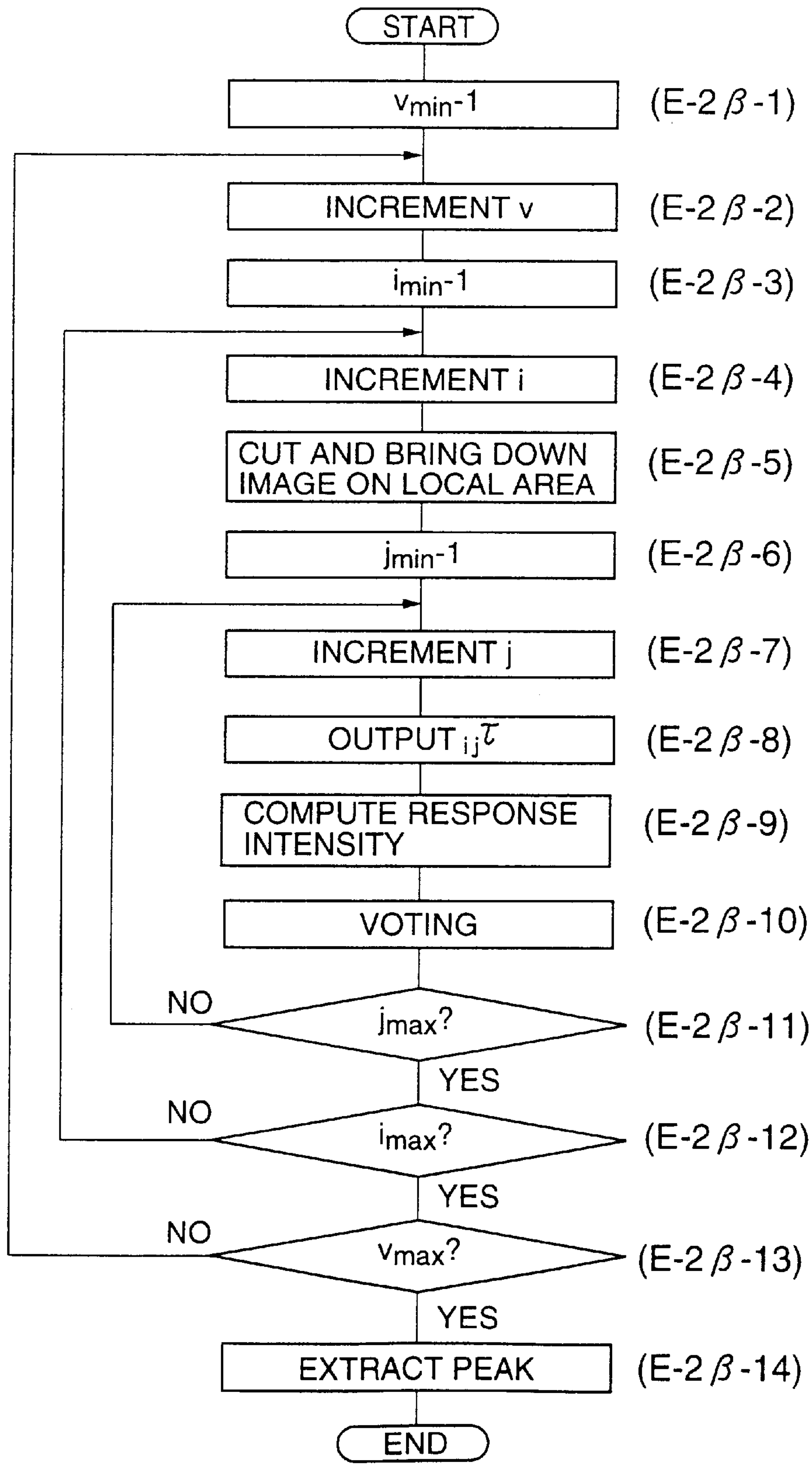

FIG. 116 is a flowchart of the embodiment E-2.

FIG. 117 is a block diagram of an embodiment E-3 of the present invention.

Figure 118:
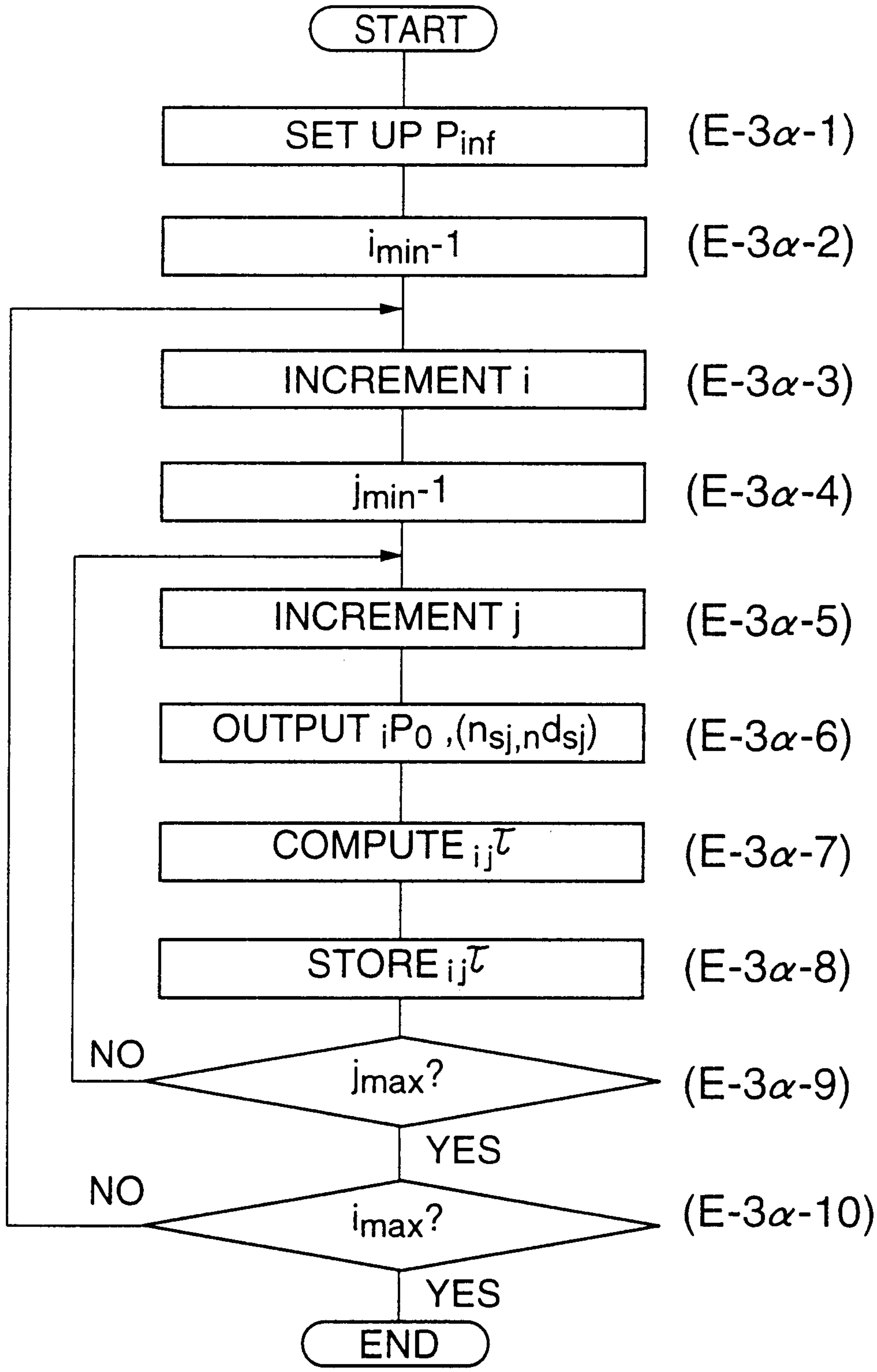

FIG. 118 is a flowchart of the embodiment E-3.

Figure 119:
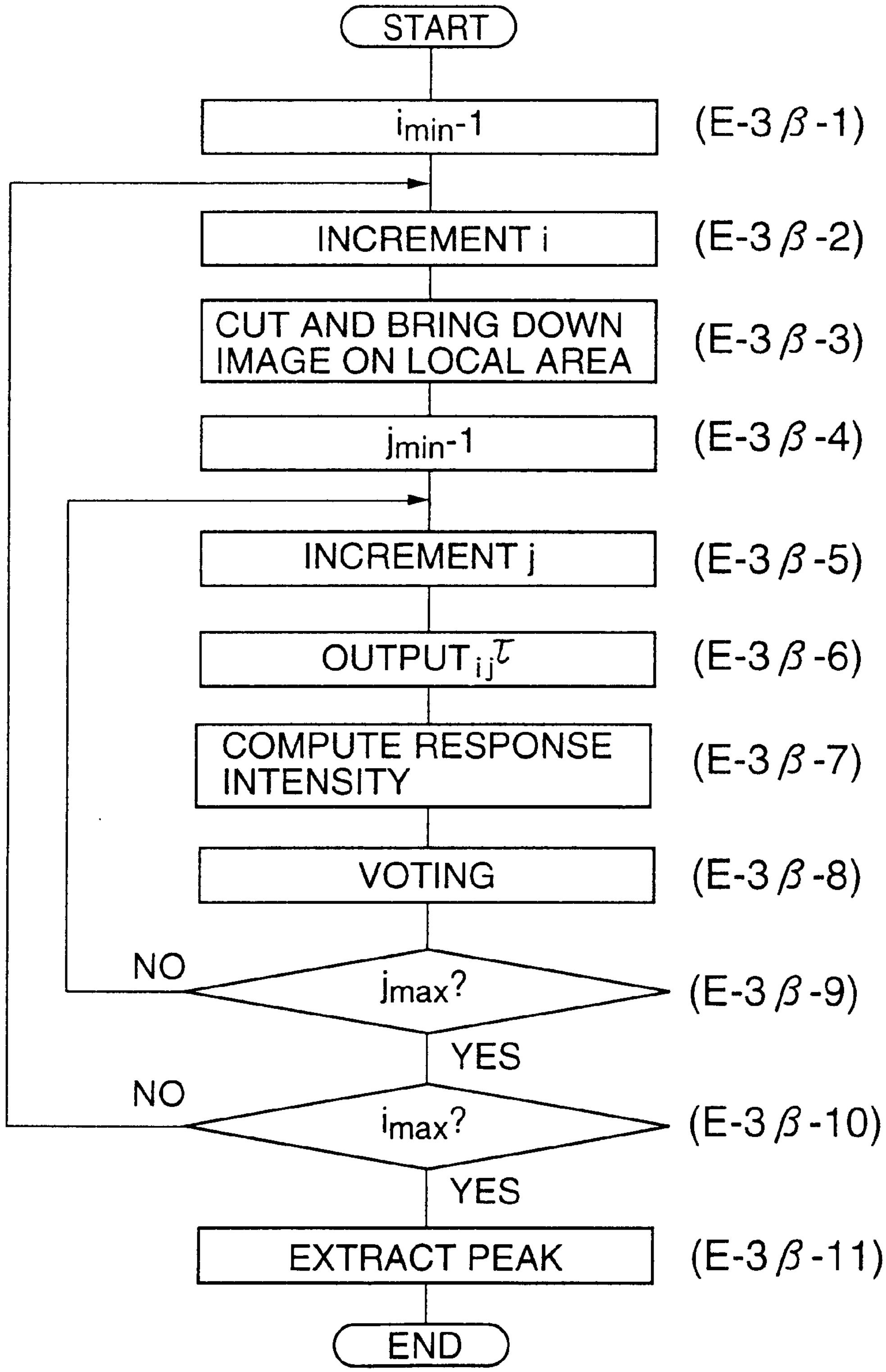

FIG. 119 is a flowchart of the embodiment E-3.

FIG. 120 is a block diagram of an embodiment E-4 of the present invention.

Figure 121:
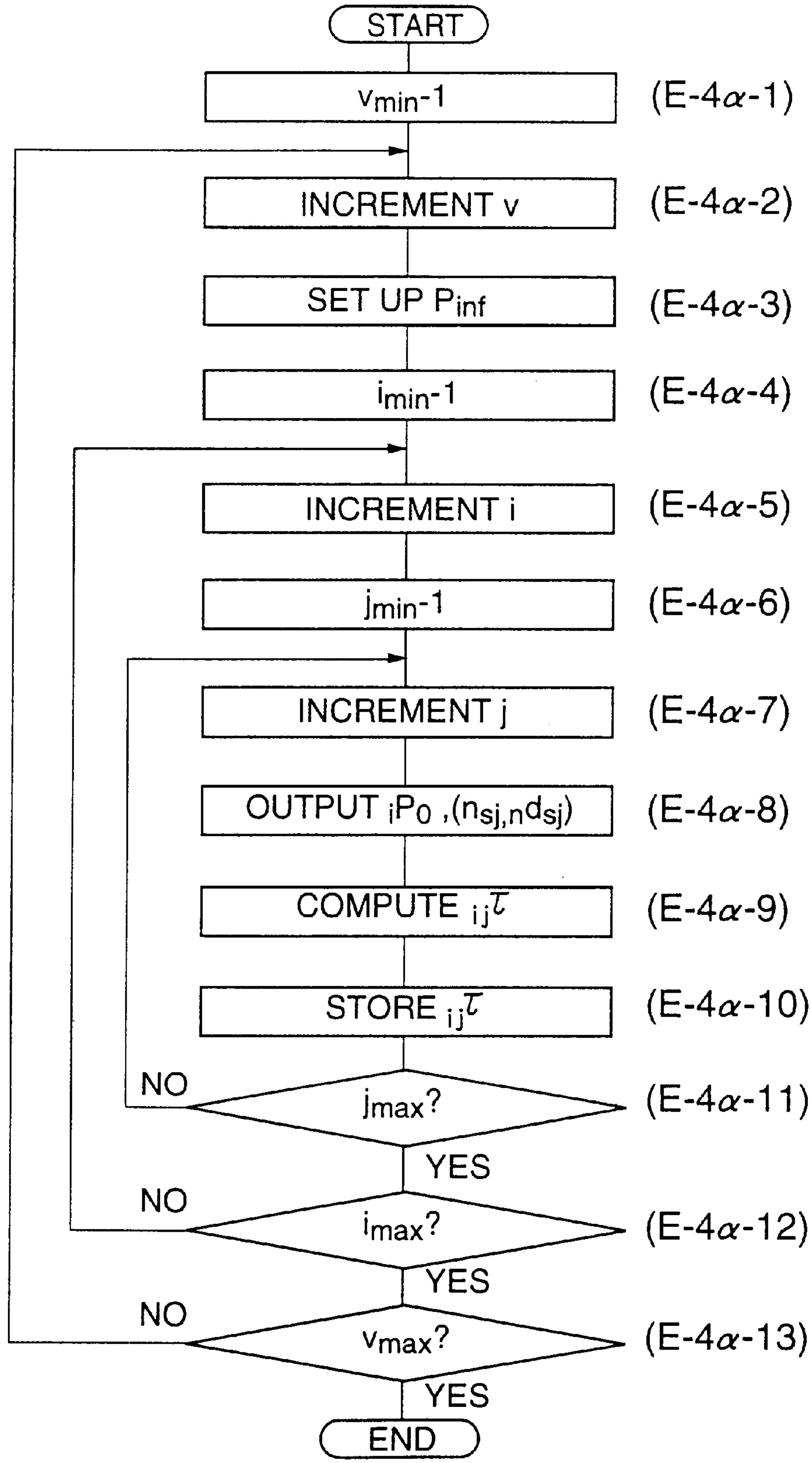

FIG. 121 is a flowchart of the embodiment E-4.

Figure 122:
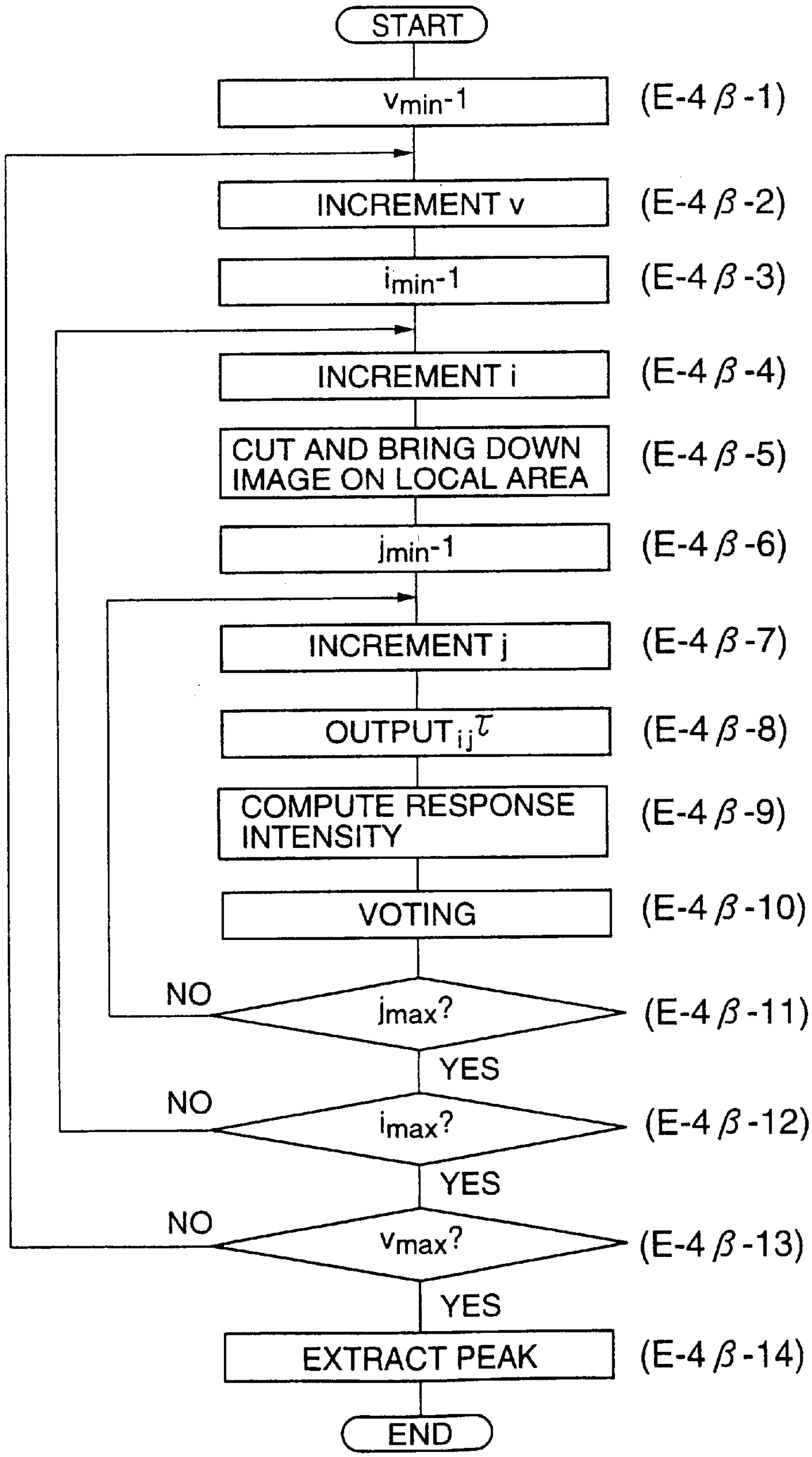

FIG. 122 is a flowchart of the embodiment E-4.

FIG. 123 is a block diagram of an embodiment E-5 of the present invention.

Figure 124:
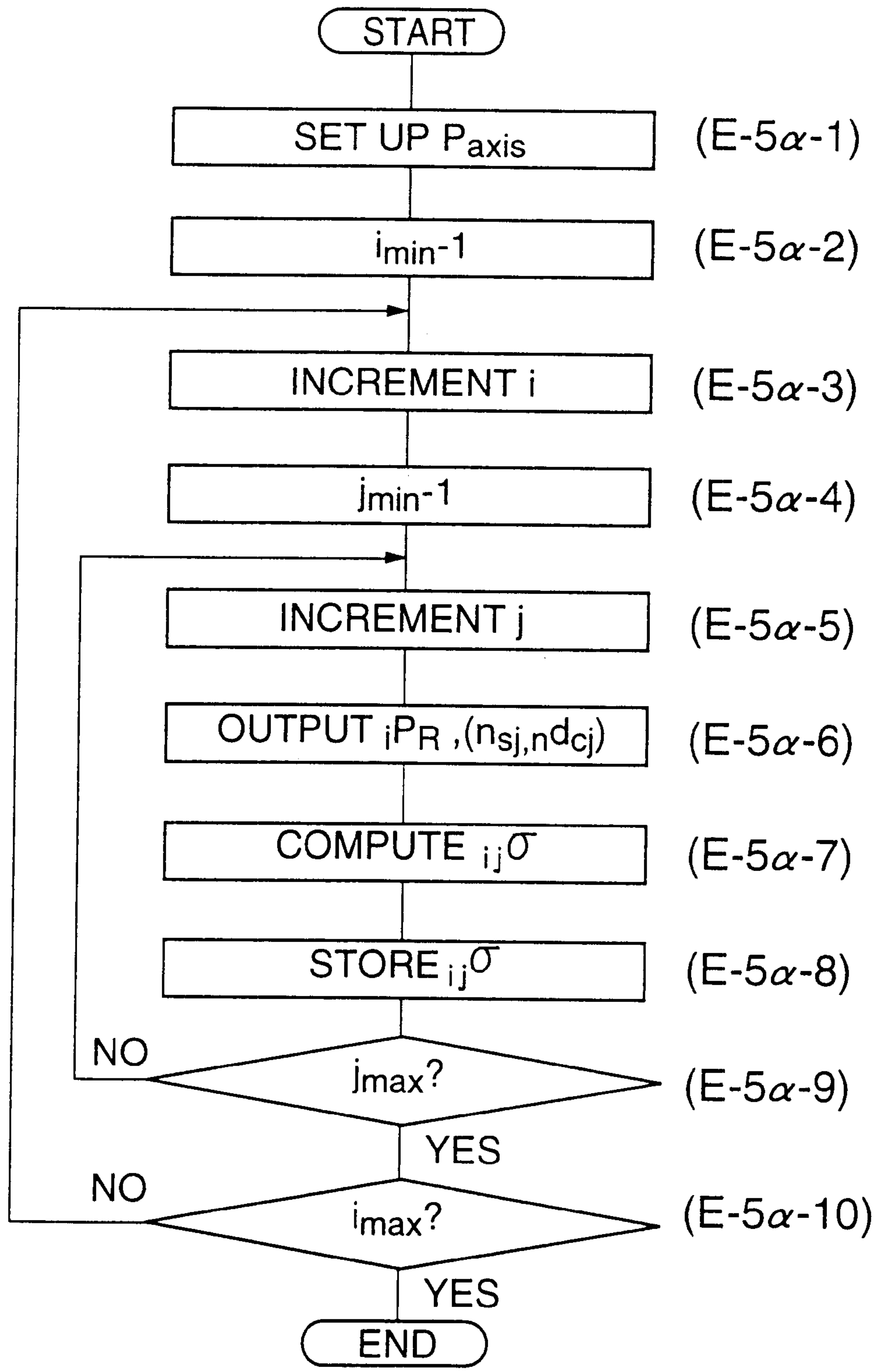

FIG. 124 is a flowchart of the embodiment E-5.

Figure 125:
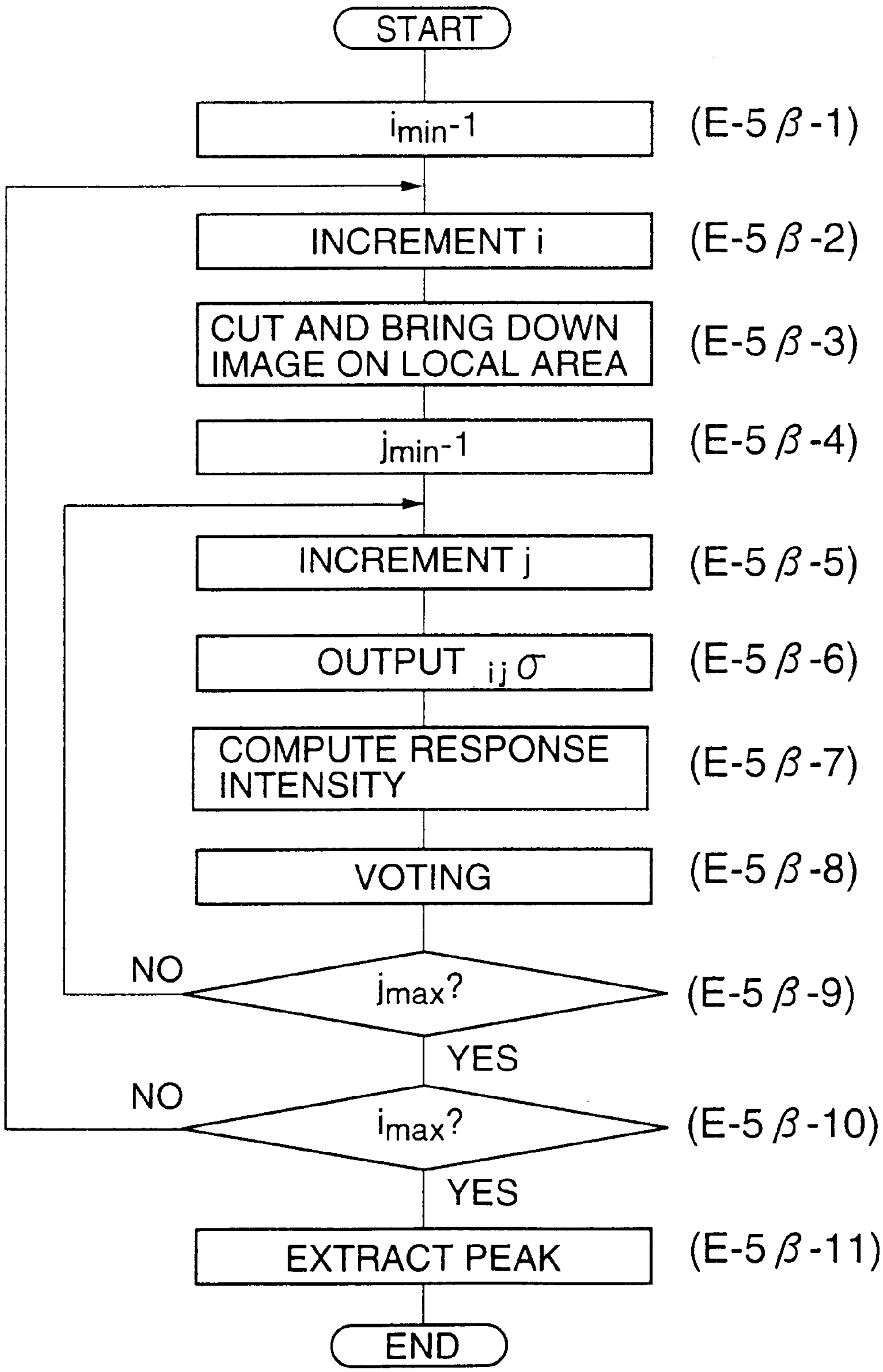

FIG. 125 is a flowchart of the embodiment E-5.

FIG. 126 is a block diagram of an embodiment E-6 of the present invention.

Figure 127:
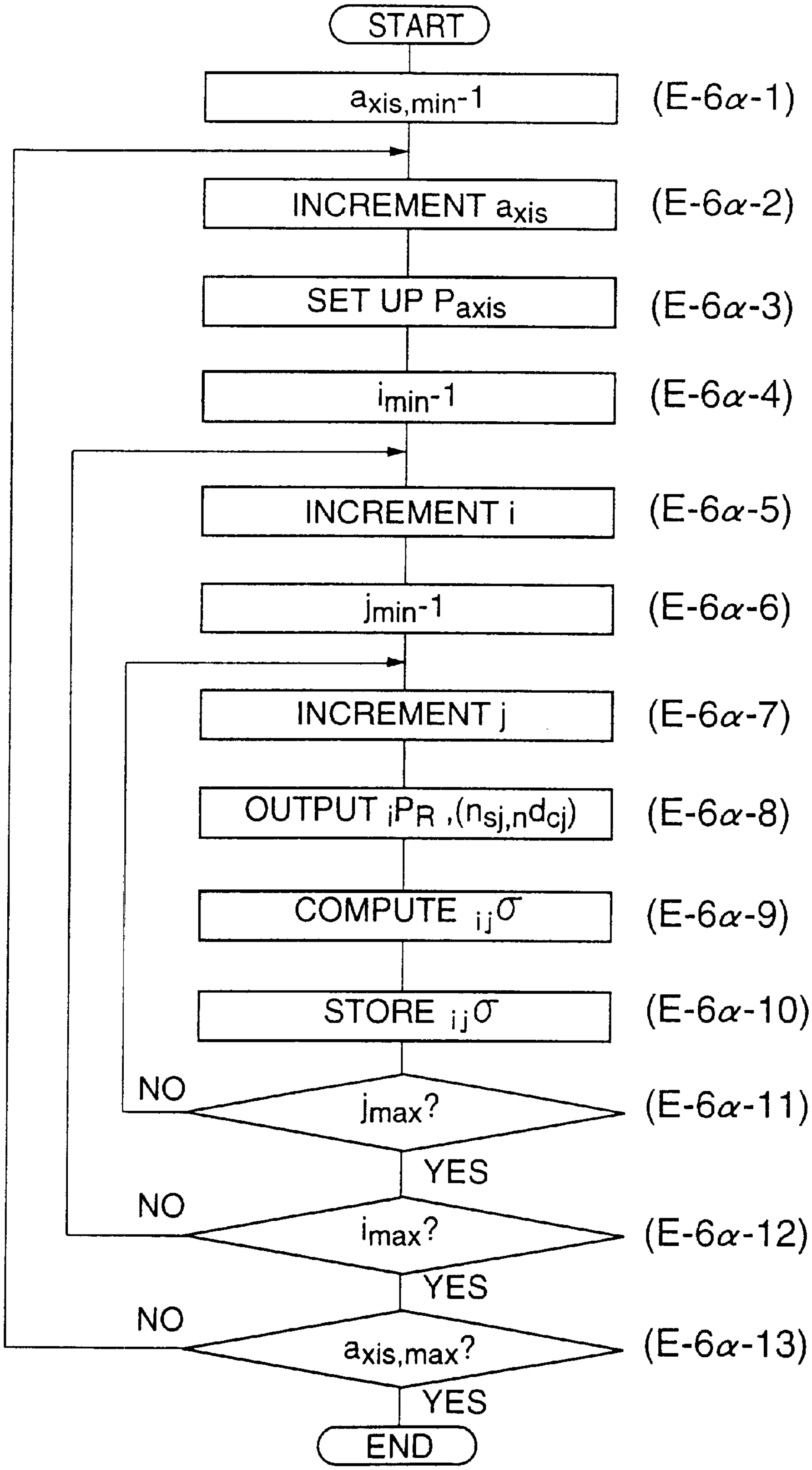

FIG. 127 is a flowchart of the embodiment E-6.

Figure 128:
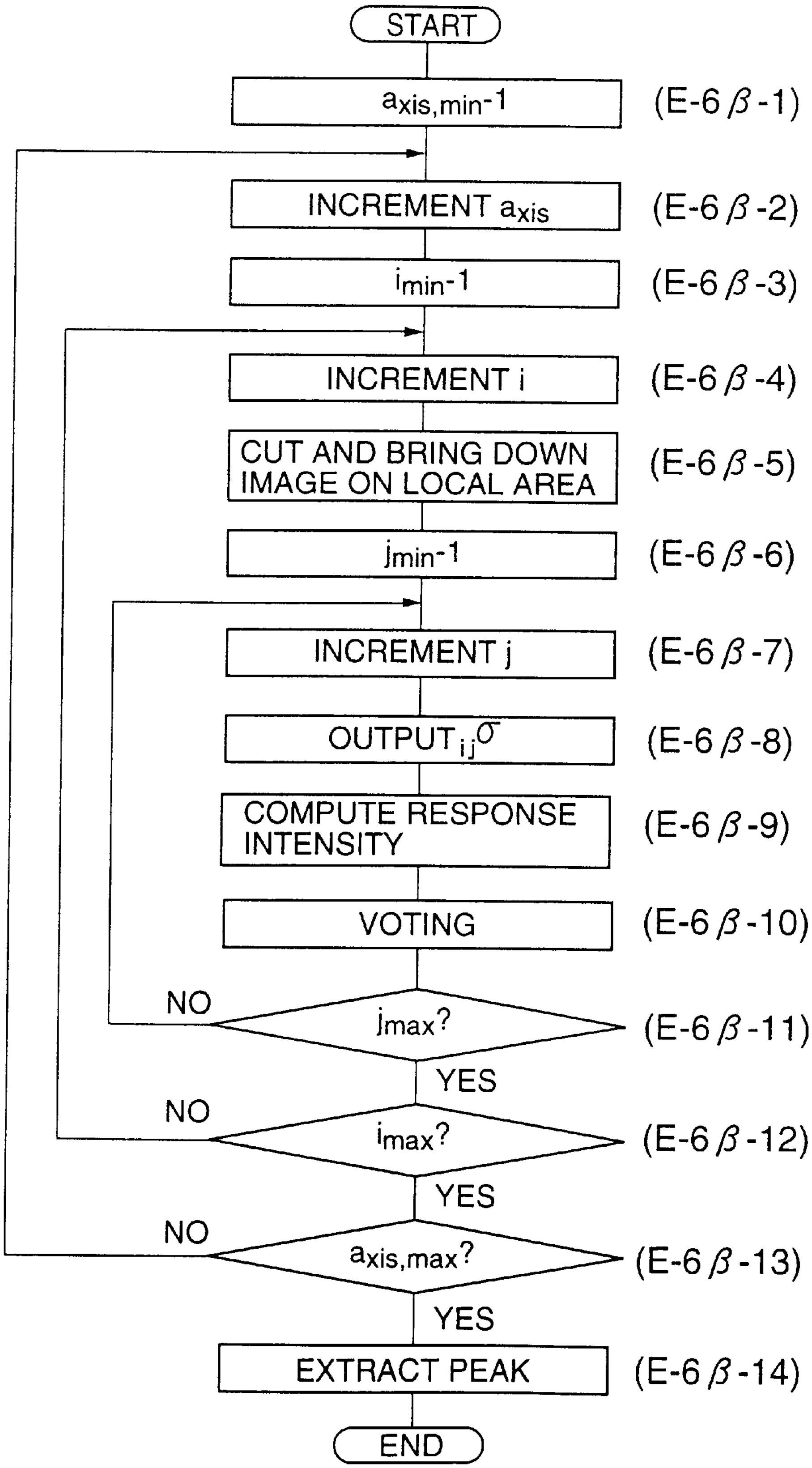

FIG. 128 is a flowchart of the embodiment E-6.

FIG. 129 is a block diagram of an embodiment E-7 of the present invention.

Figure 130:
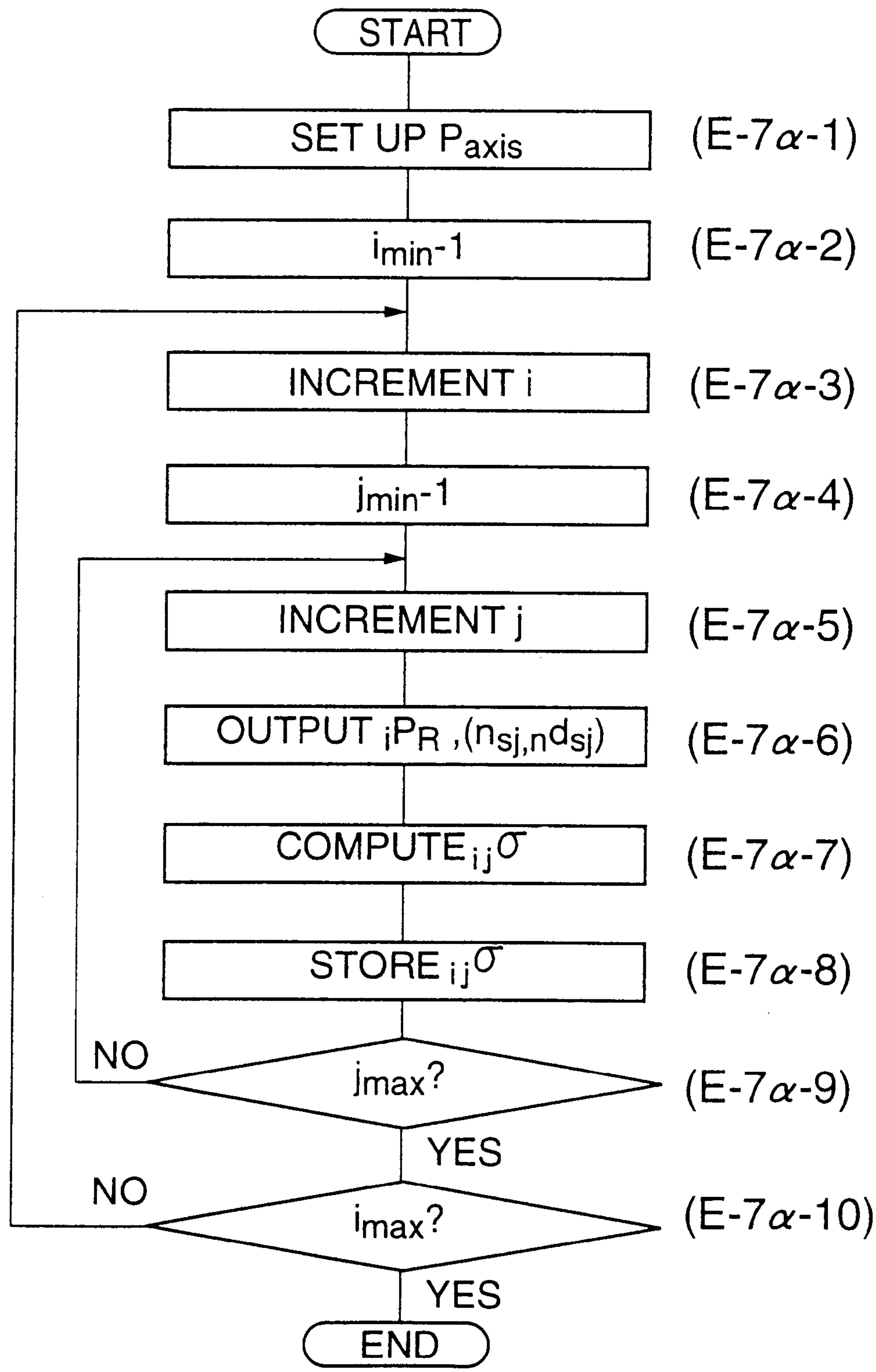

FIG. 130 is a flowchart of the embodiment E-7.

Figure 131:
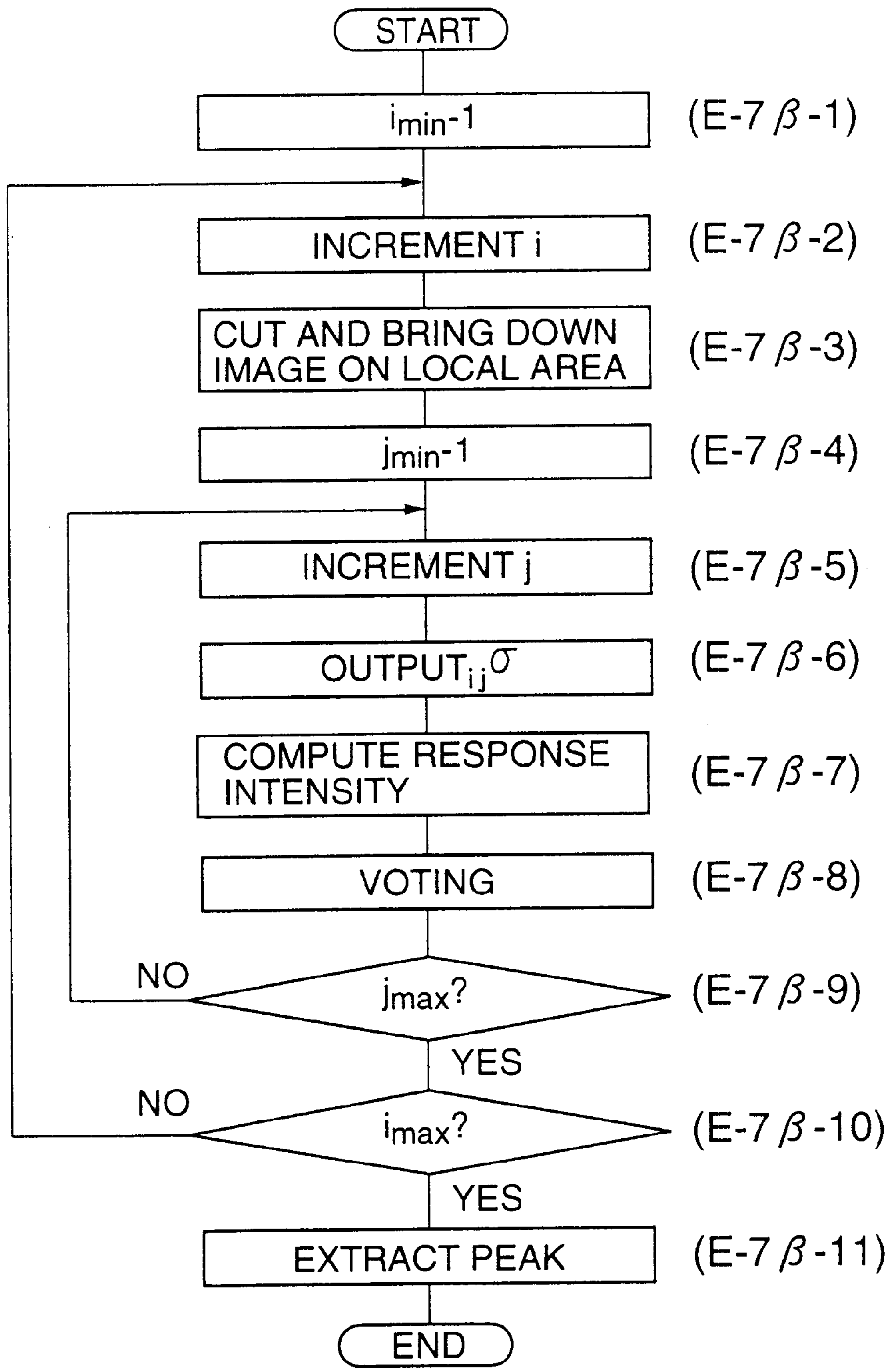

FIG. 131 is a flowchart of the embodiment E-7.

FIG. 132 is a block diagram of an embodiment E-8 of the present invention.

Figure 133:
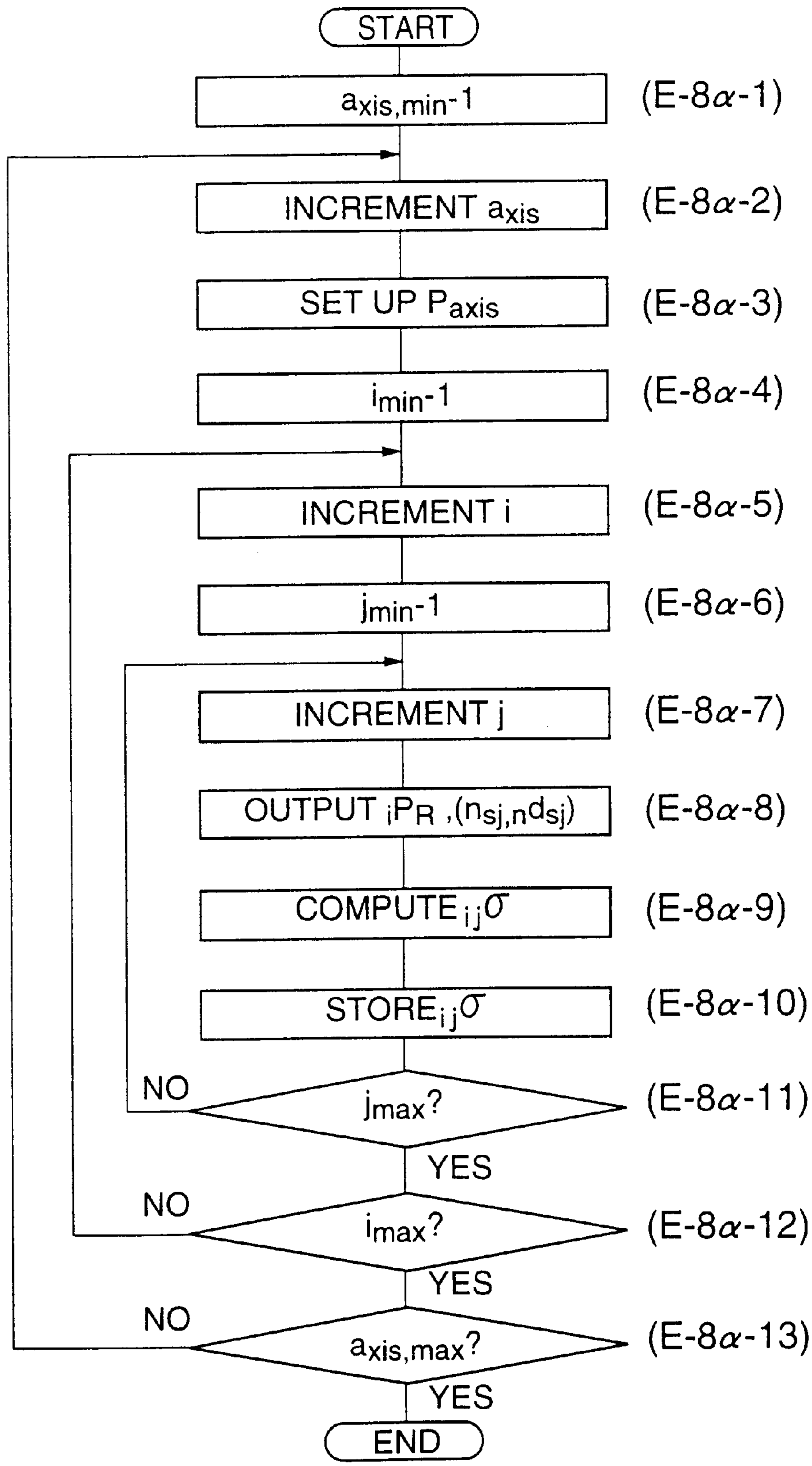

FIG. 133 is a flowchart of the embodiment E-8.

Figure 134:
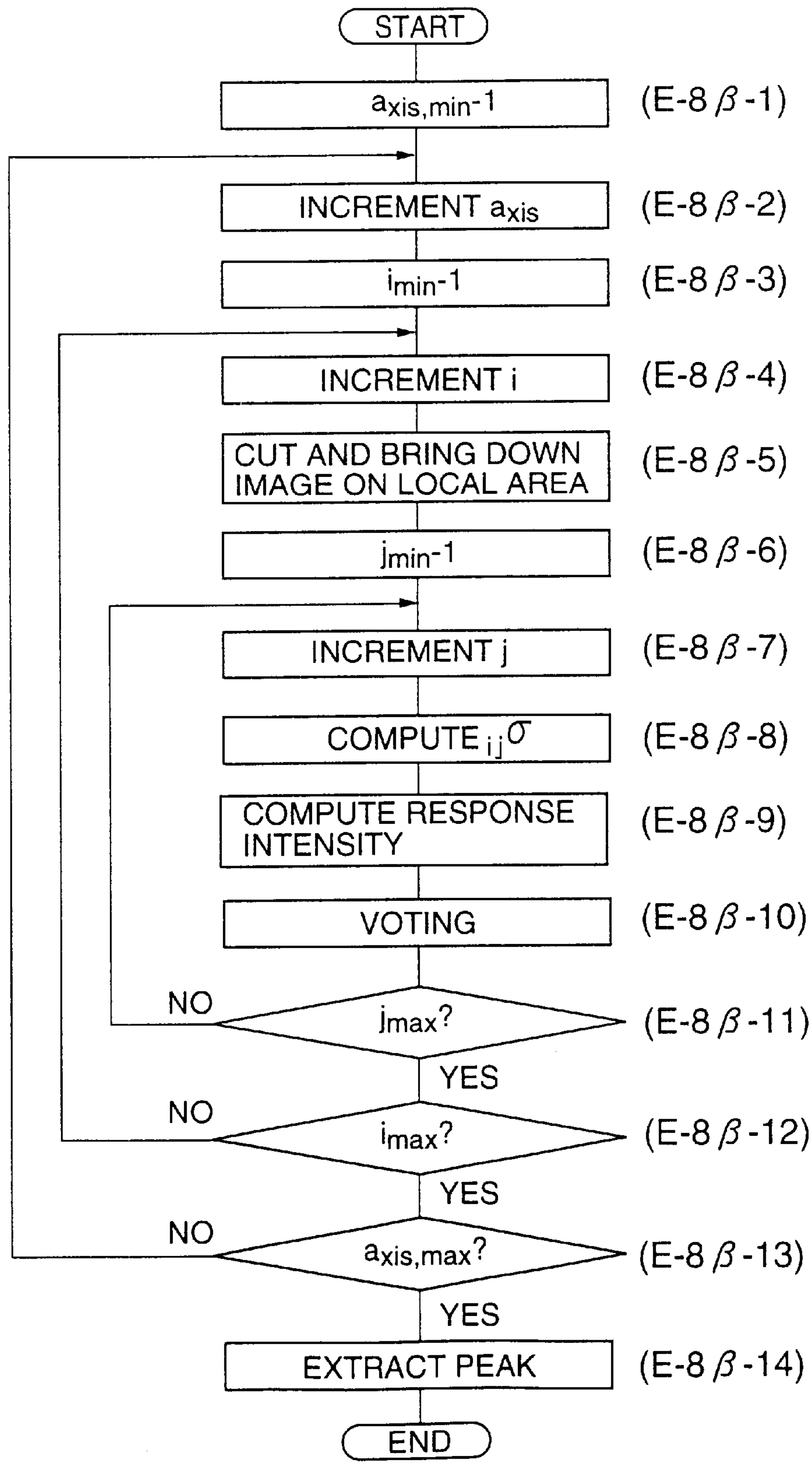

FIG. 134 is a flowchart of the embodiment E-8.

FIG. 135 is a block diagram of an embodiment F-1 of the present invention.

Figure 136:
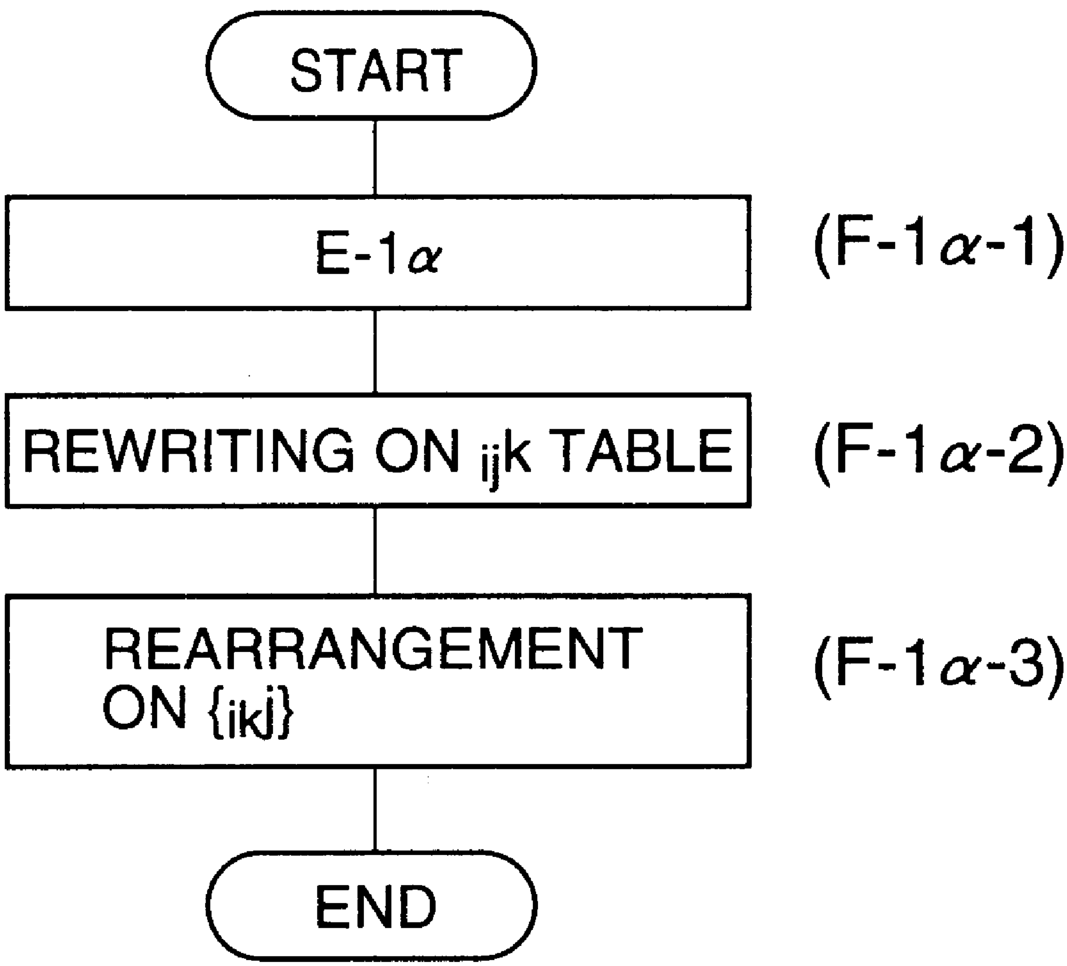

FIG. 136 is a flowchart of the embodiment F-1.

Figure 137:
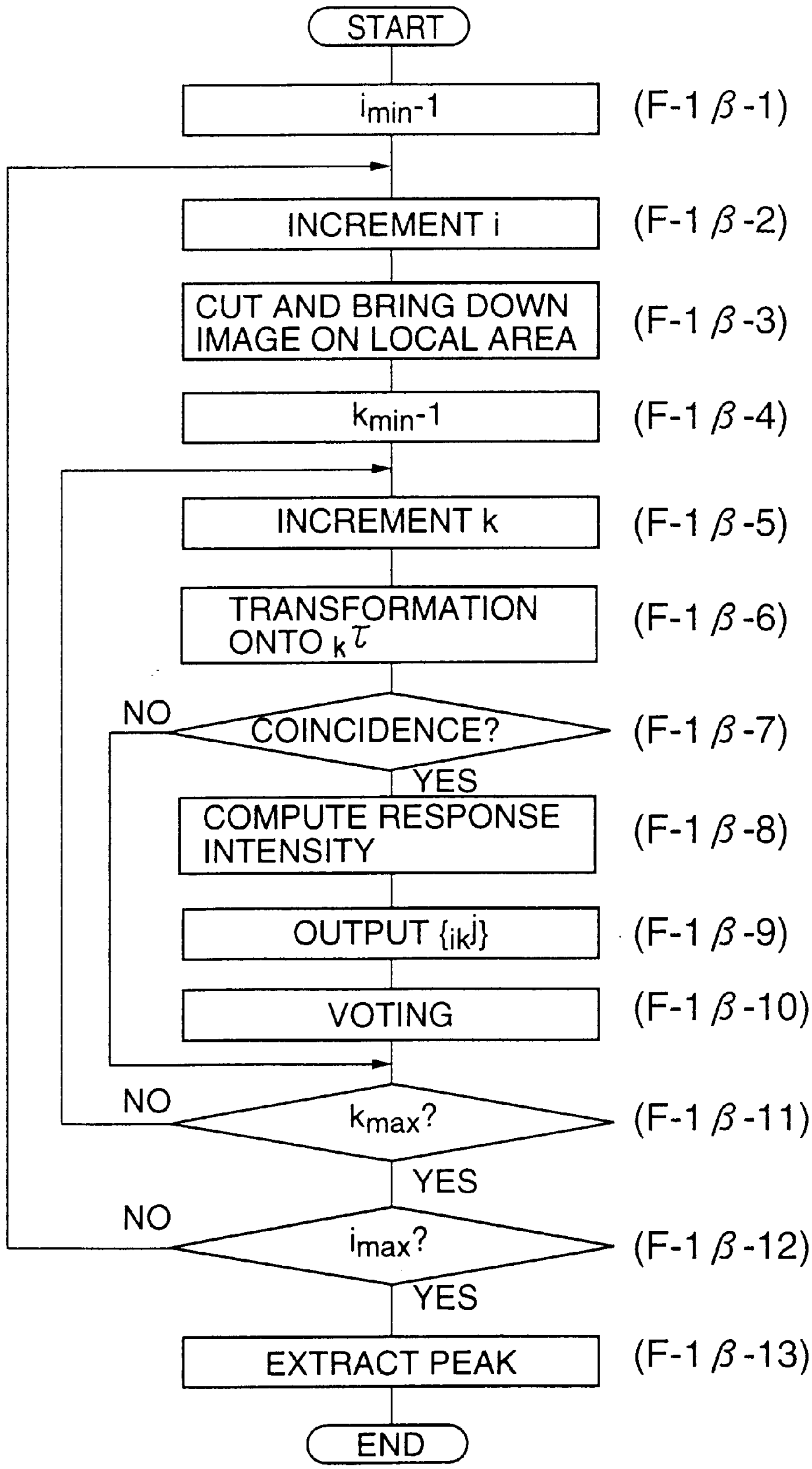

FIG. 137 is a flowchart of the embodiment F-1.

FIG. 138 is a block diagram of an embodiment F-2 of the present invention.

Figure 139:
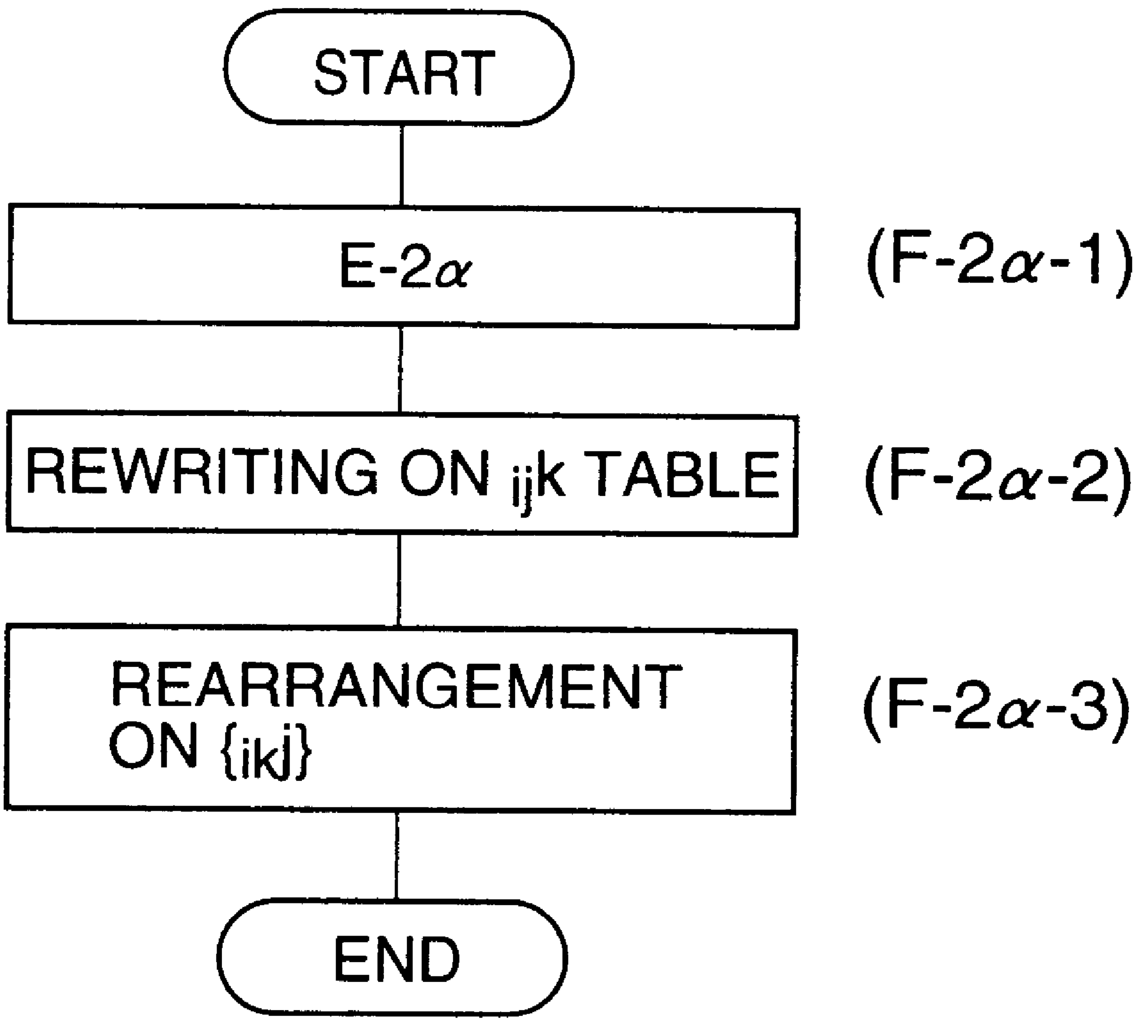

FIG. 139 is a flowchart of the embodiment F-2.

Figure 140:
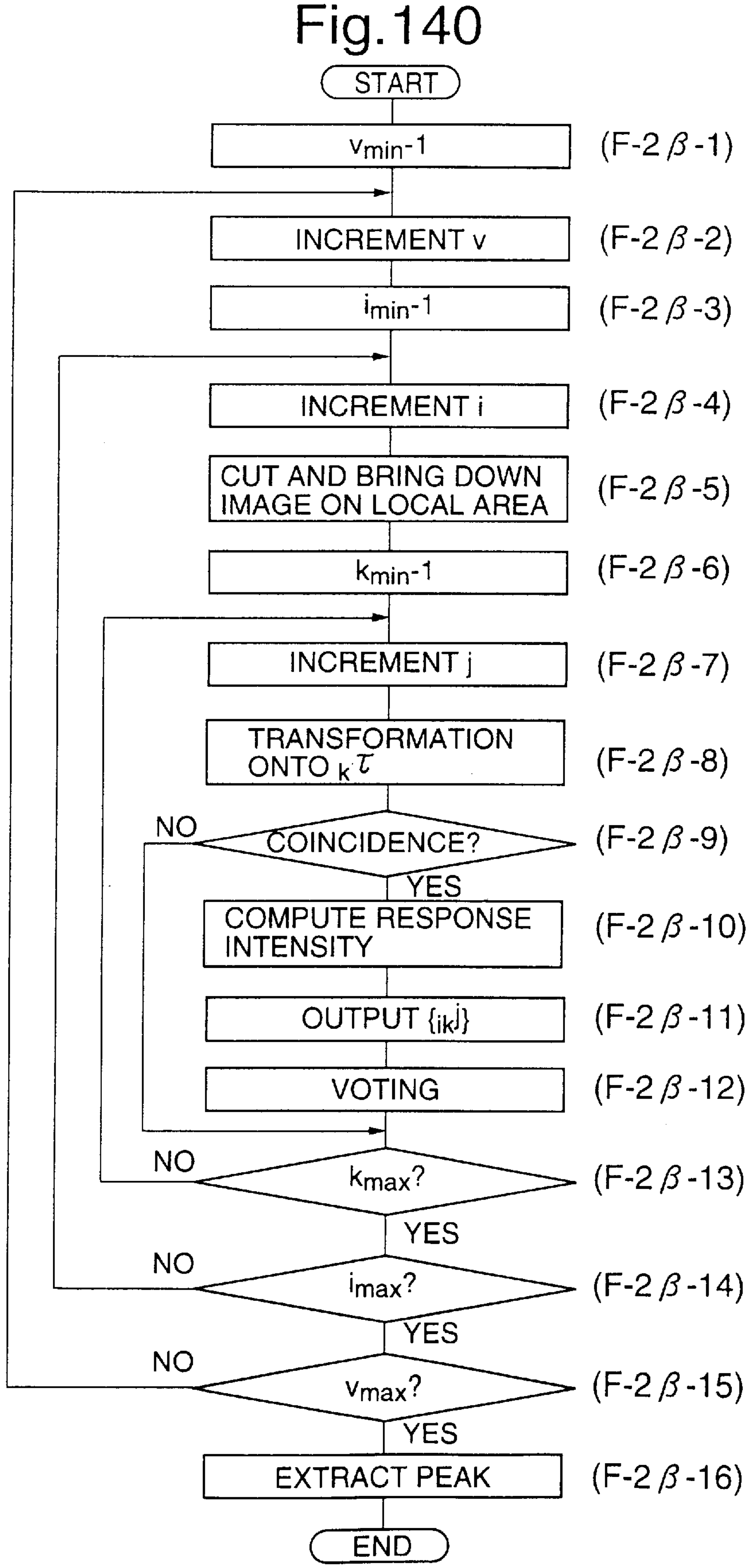

FIG. 140 is a flowchart of the embodiment F-2.

FIG. 141 is a block diagram of an embodiment F-3 of the present invention.

Figure 142:
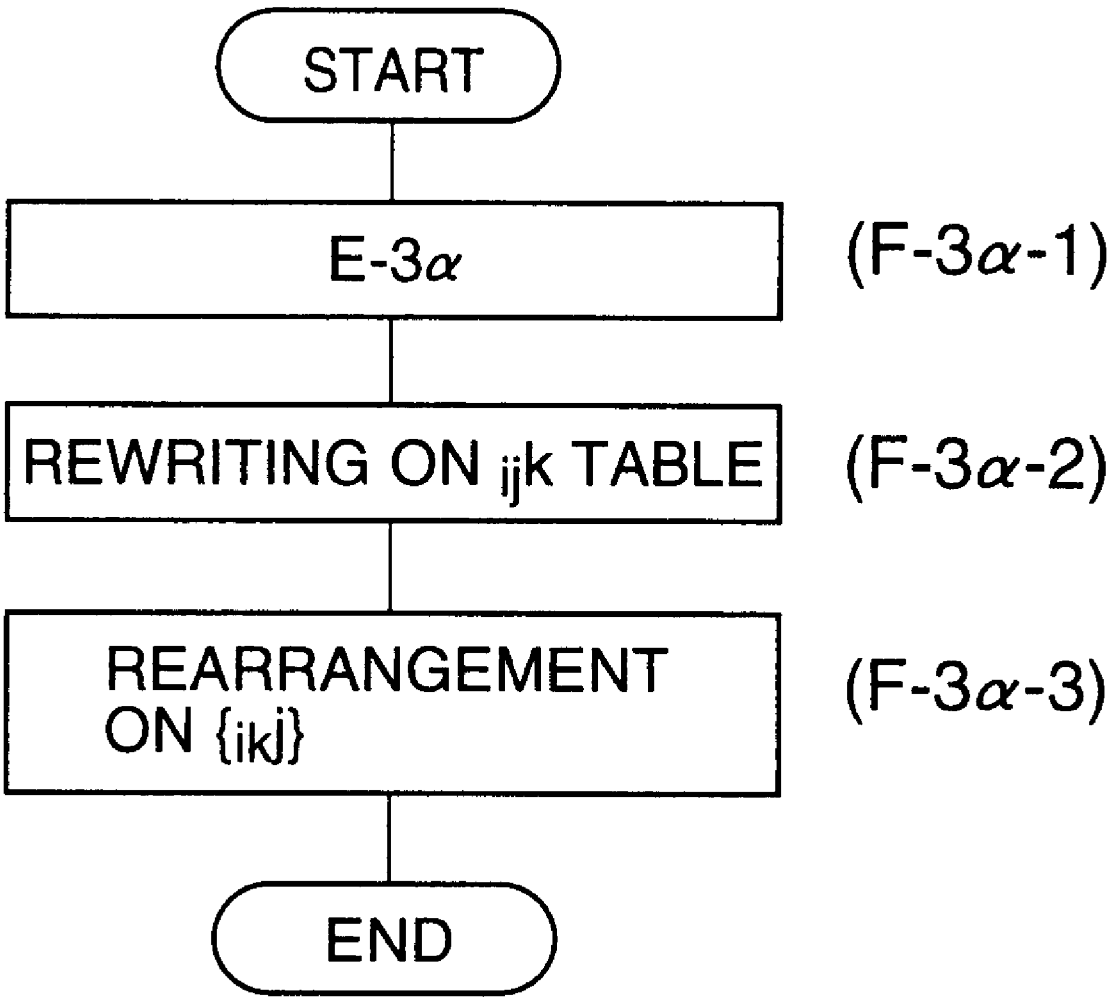

FIG. 142 is a flowchart of the embodiment F-3.

Figure 143:
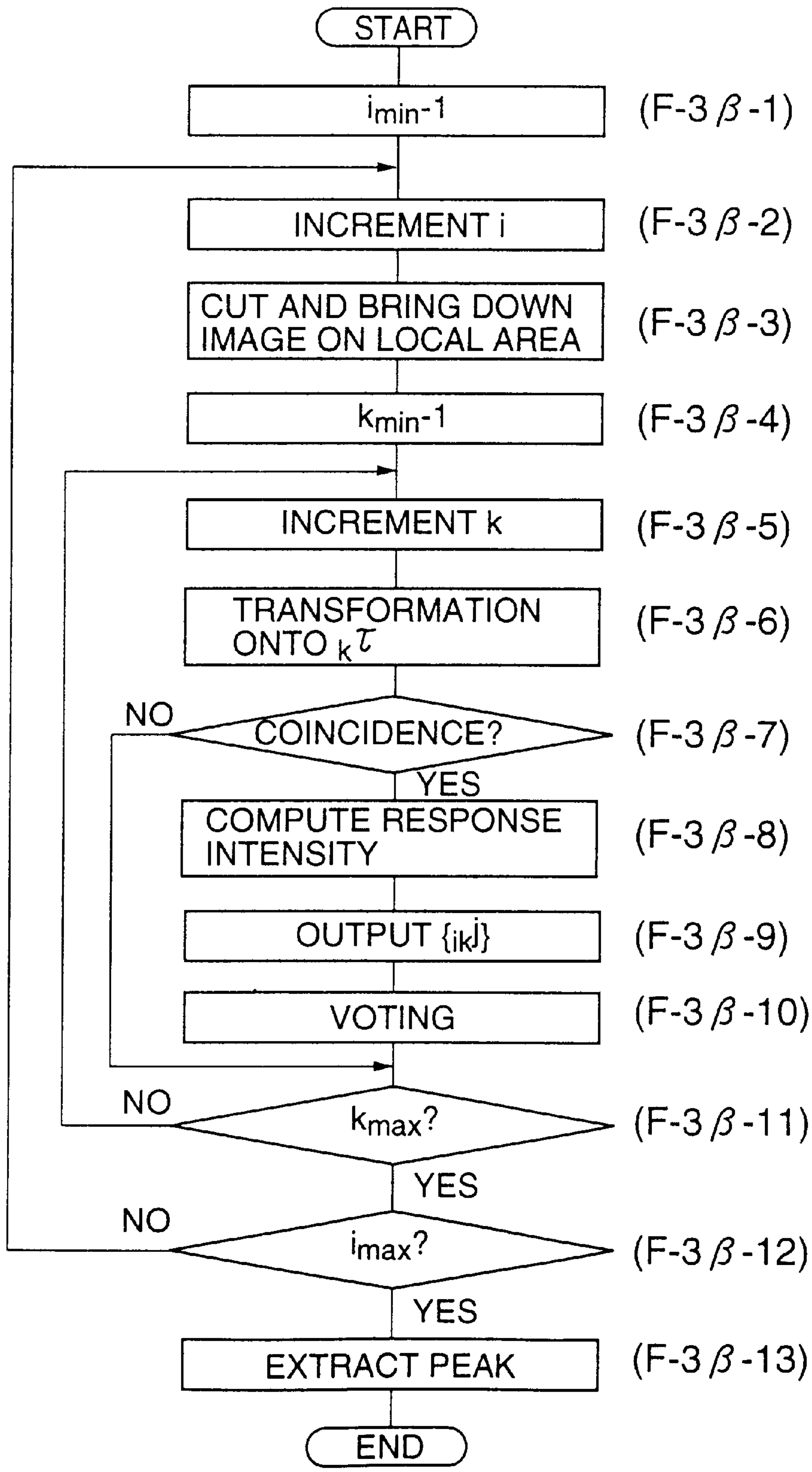

FIG. 143 is a flowchart of the embodiment F-3.

FIG. 144 is a block diagram of an embodiment F-4 of the present invention.

Figure 145:
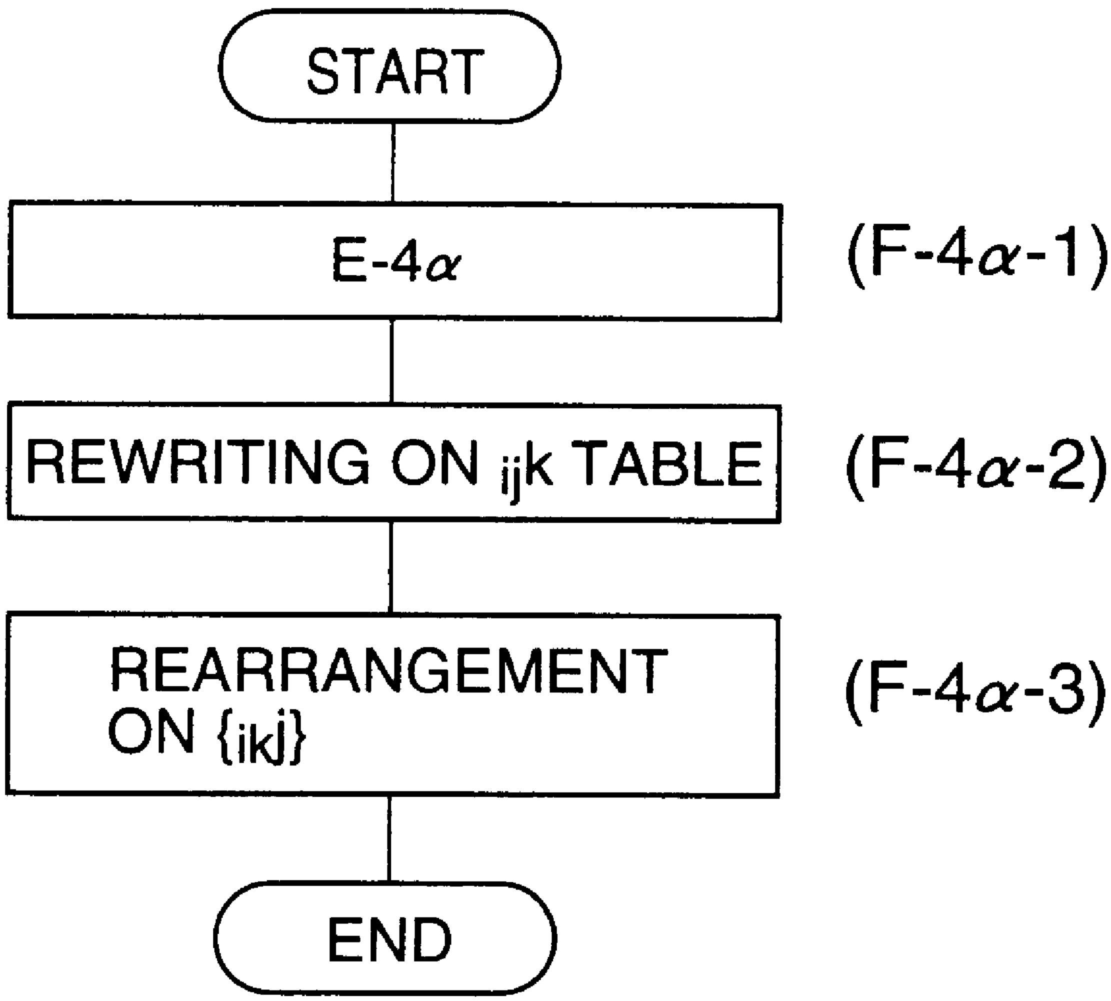

FIG. 145 is a flowchart of the embodiment F-4.

Figure 146:
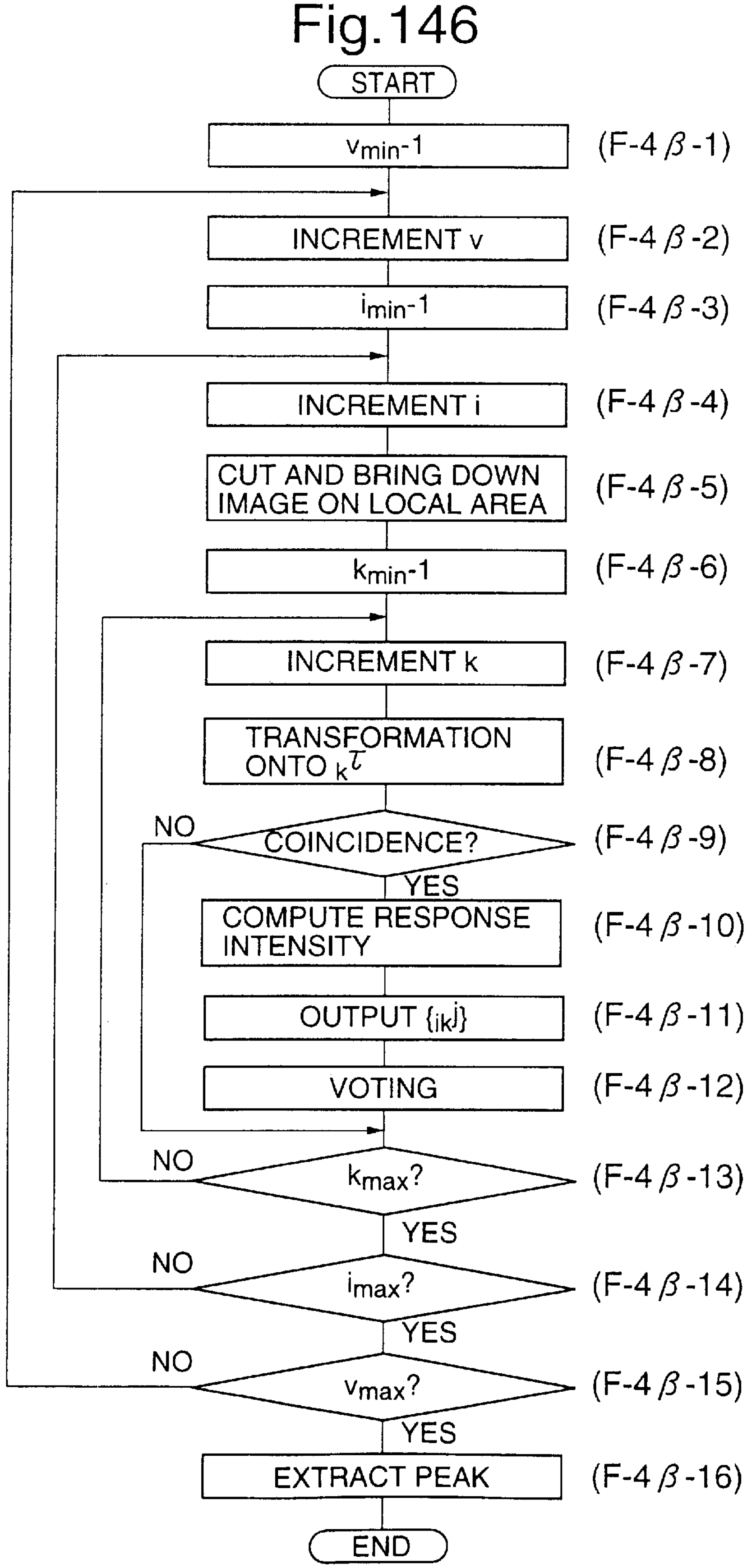

FIG. 146 is a flowchart of the embodiment F-4.

FIG. 147 is a block diagram of an embodiment F-5 of the present invention.

Figure 148:
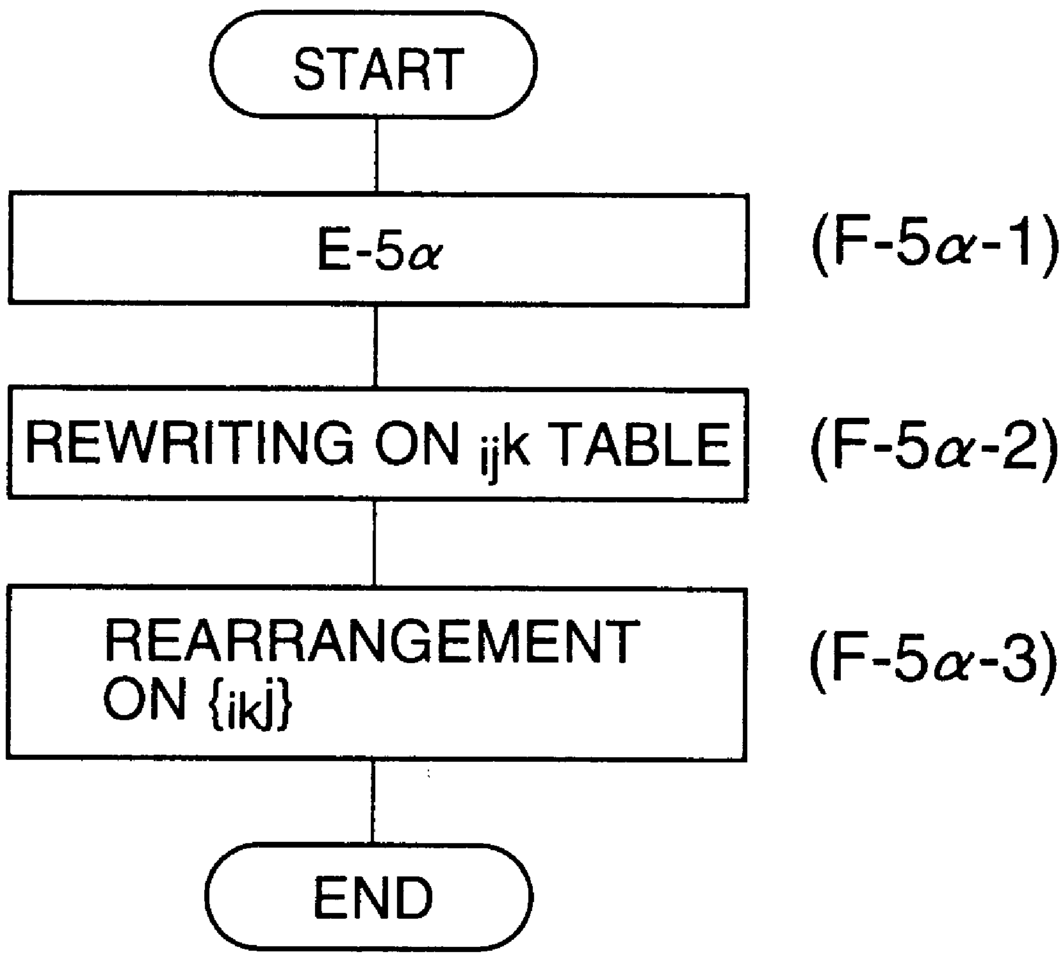

FIG. 148 is a flowchart of the embodiment F-5.

Figure 149:
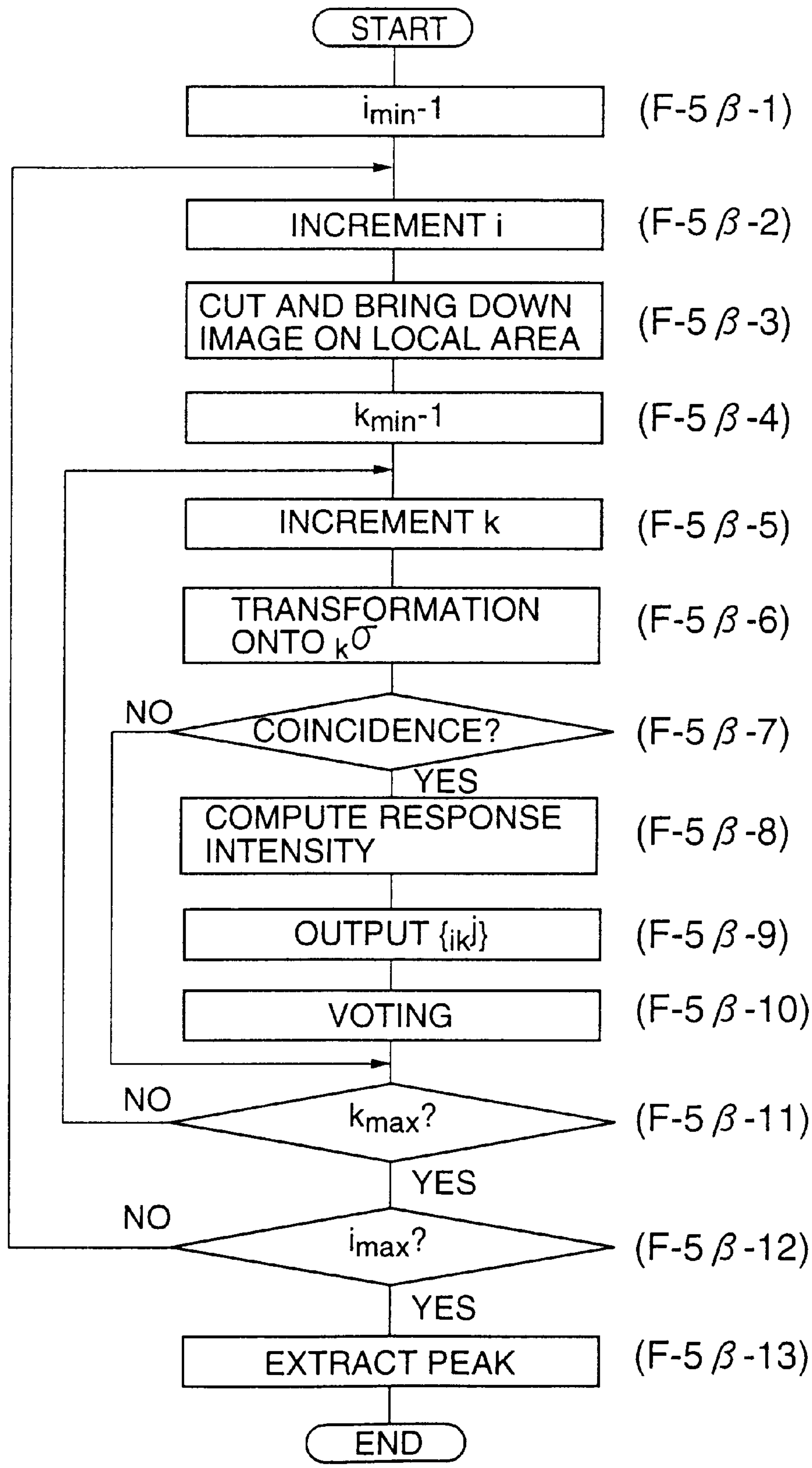

FIG. 149 is a flowchart of the embodiment F-5.

FIG. 150 is a block diagram of an embodiment F-6 of the present invention.

Figure 151:
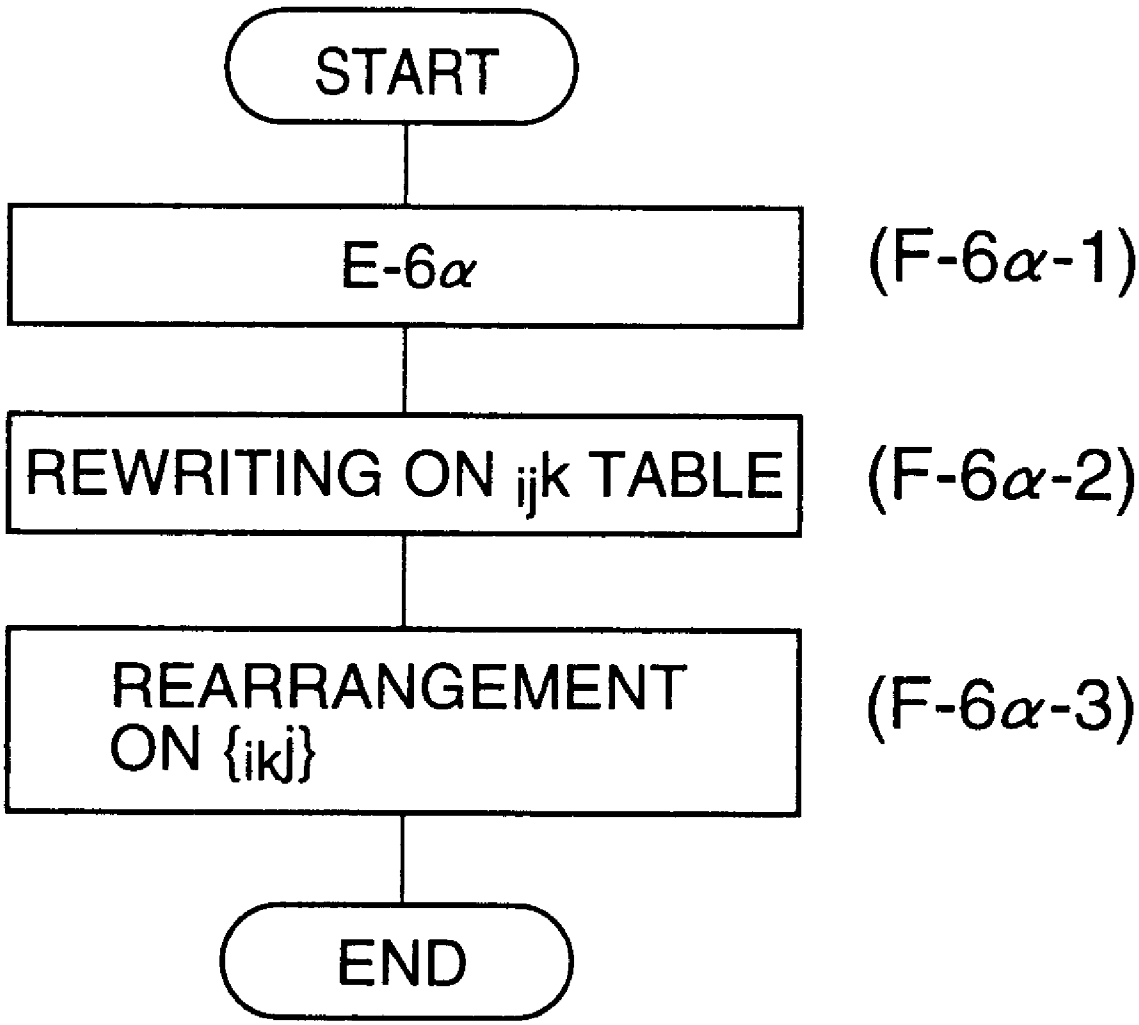

FIG. 151 is a flowchart of the embodiment F-6.

Figure 152:
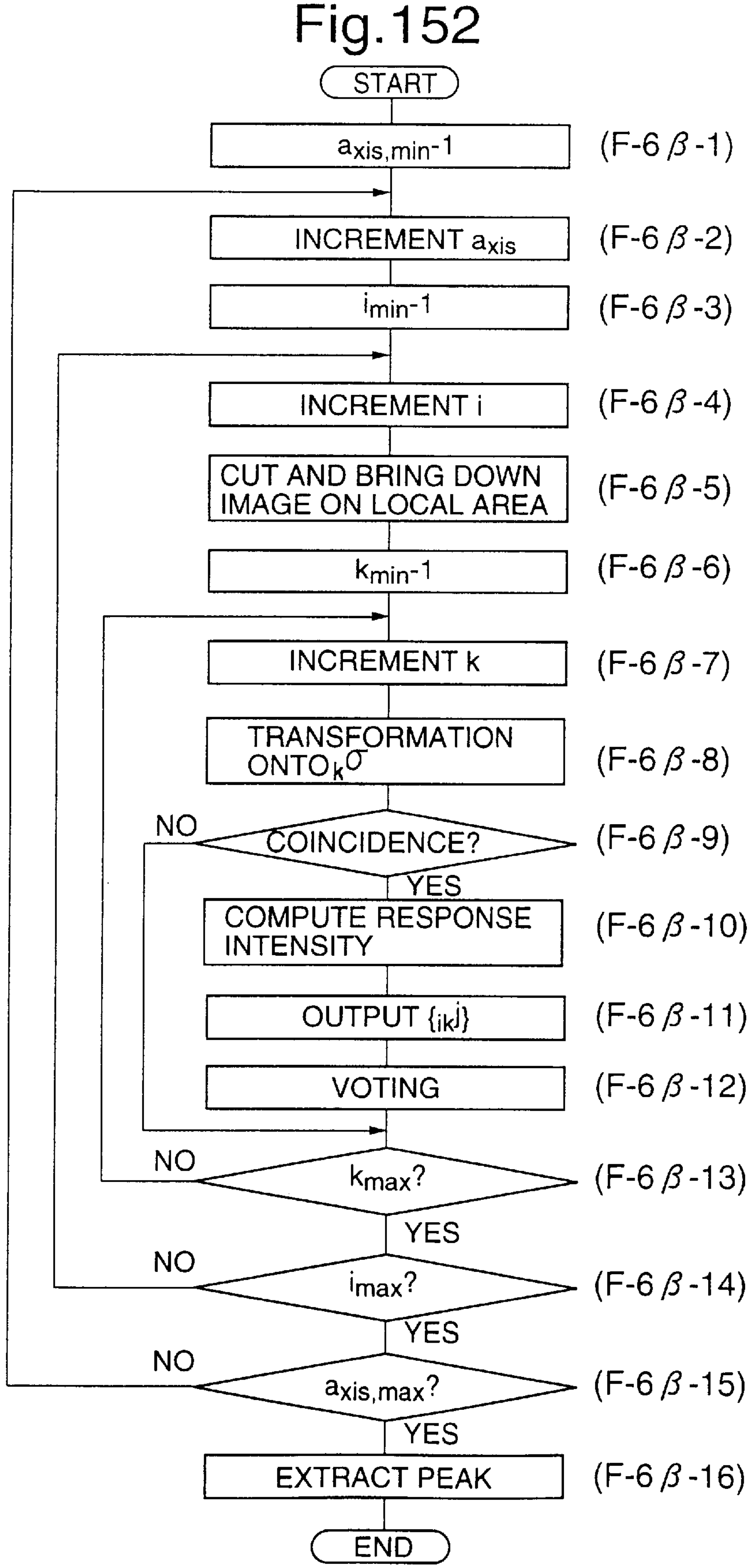

FIG. 152 is a flowchart of the embodiment F-6.

FIG. 153 is a block diagram of an embodiment F-7 of the present invention.

Figure 154:
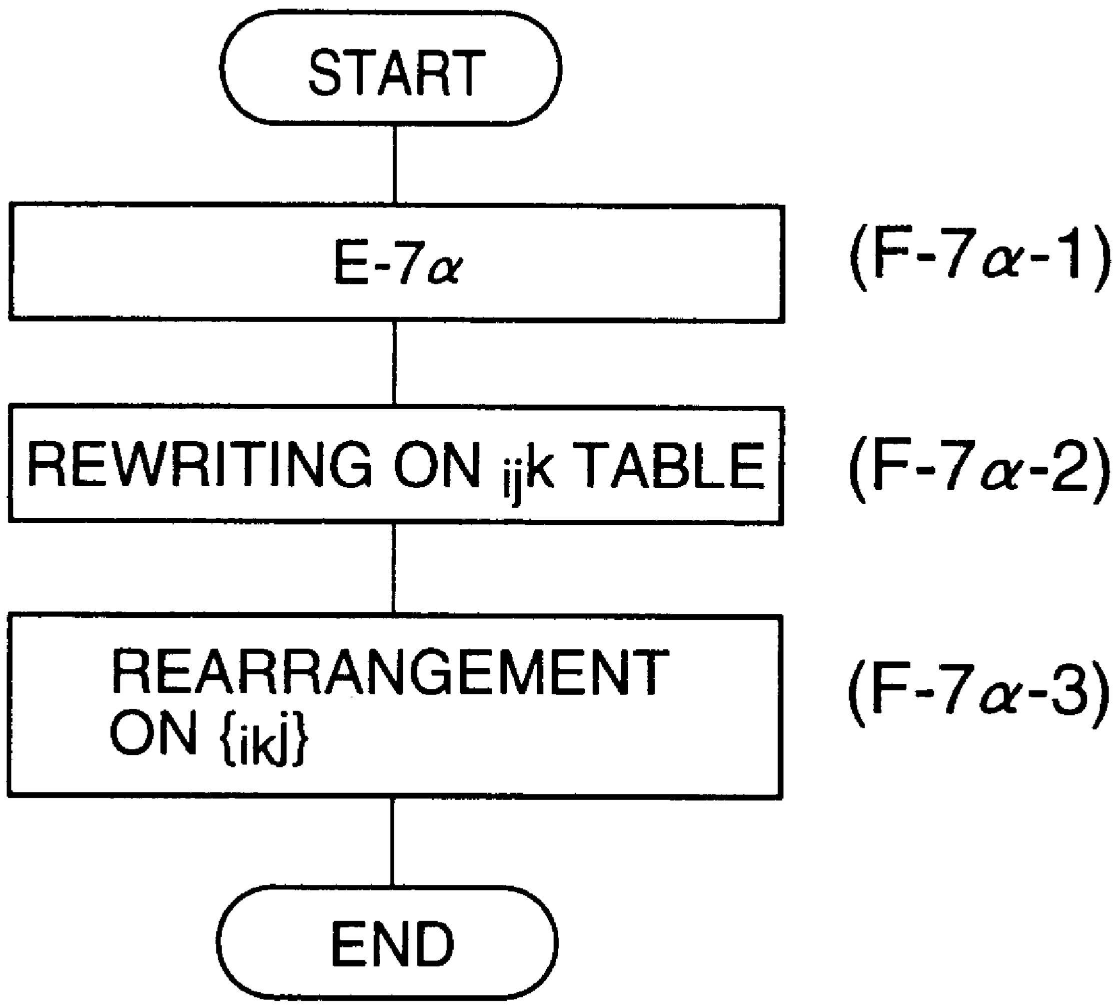

FIG. 154 is a flowchart of the embodiment F-7.

Figure 155:
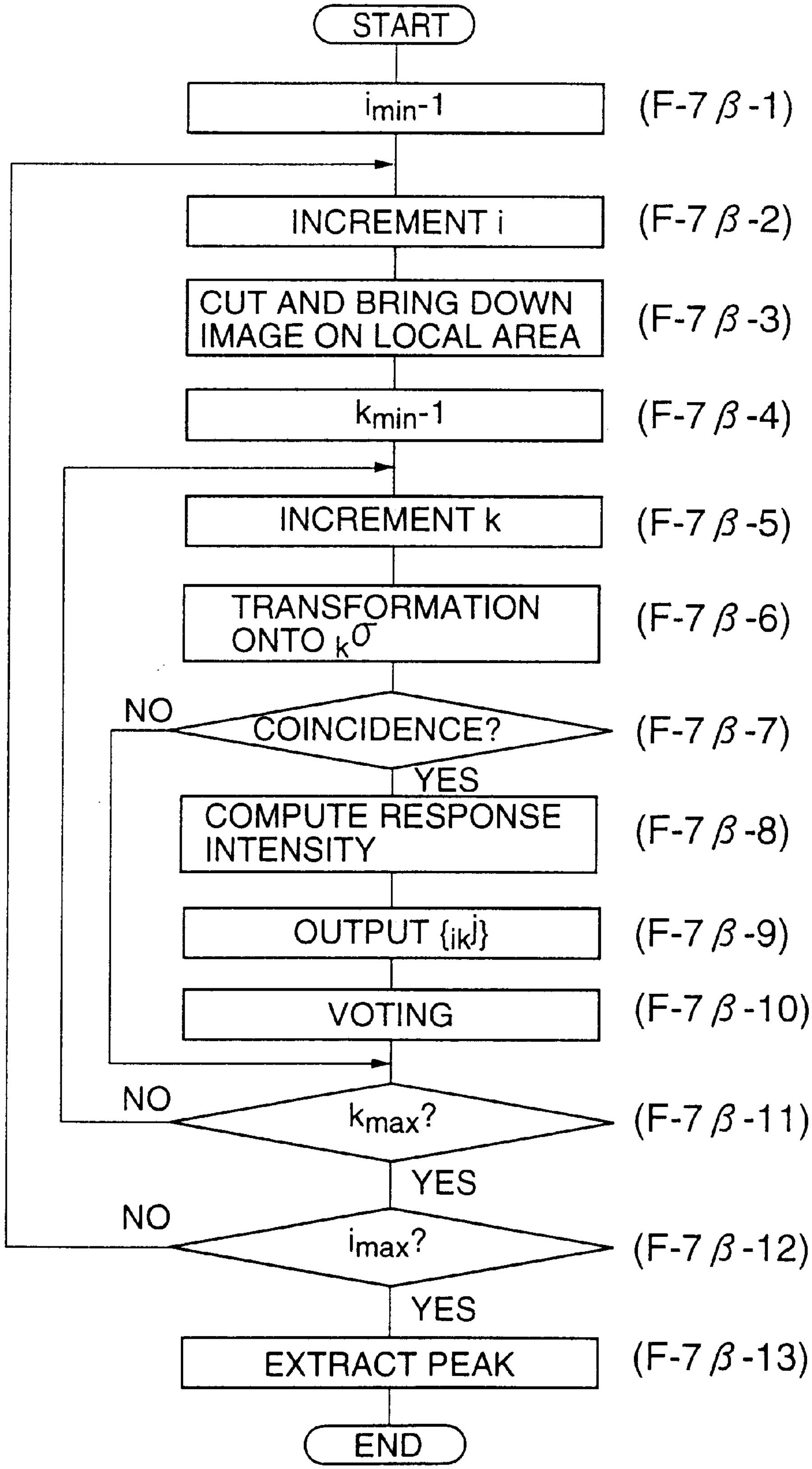

FIG. 155 is a flowchart of the embodiment F-7.

FIG. 156 is a block diagram of an embodiment F-8 of the present invention.

Figure 157:
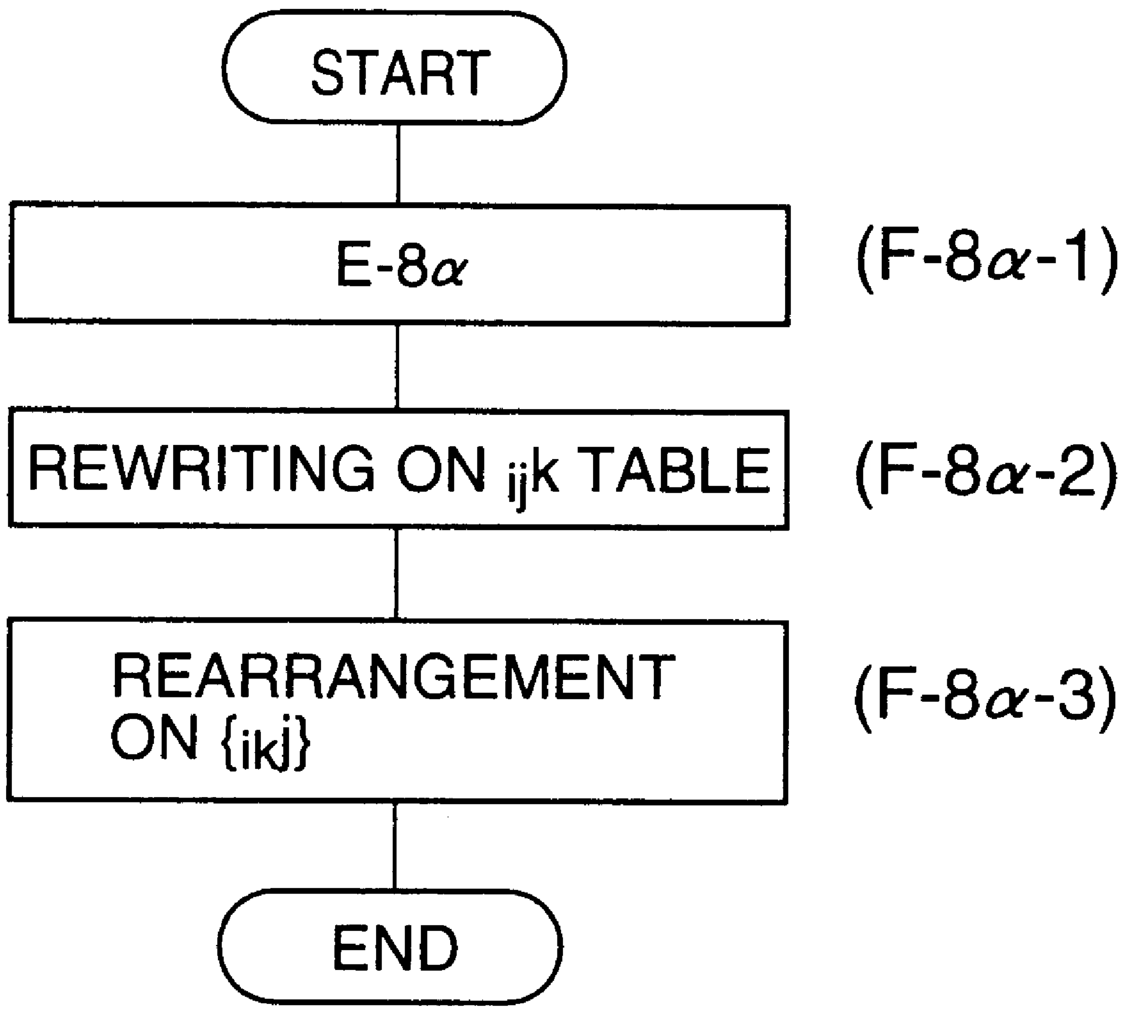

FIG. 157 is a flowchart of the embodiment F-8.

Figure 158:
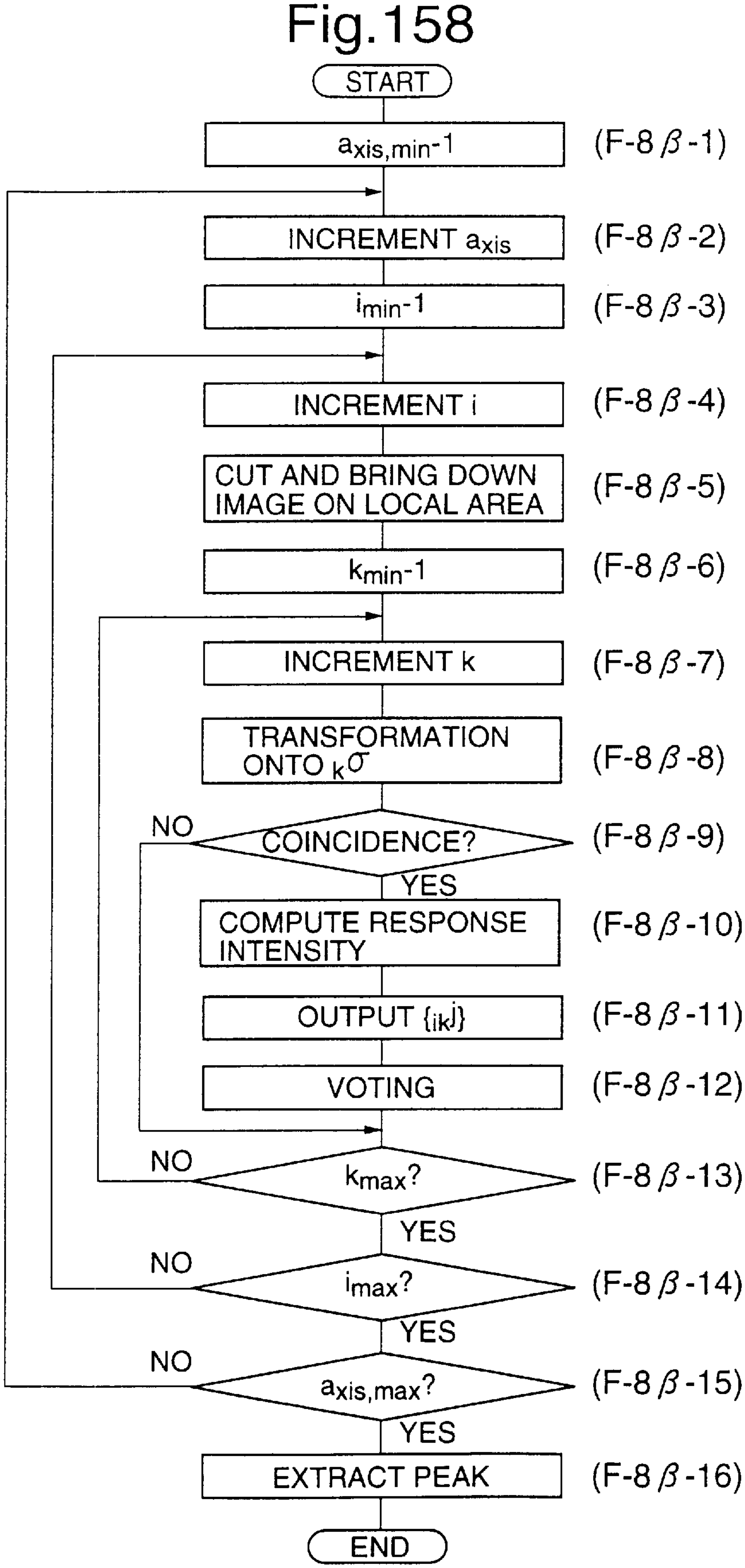

FIG. 158 is a flowchart of the embodiment F-8.

Figure 159:
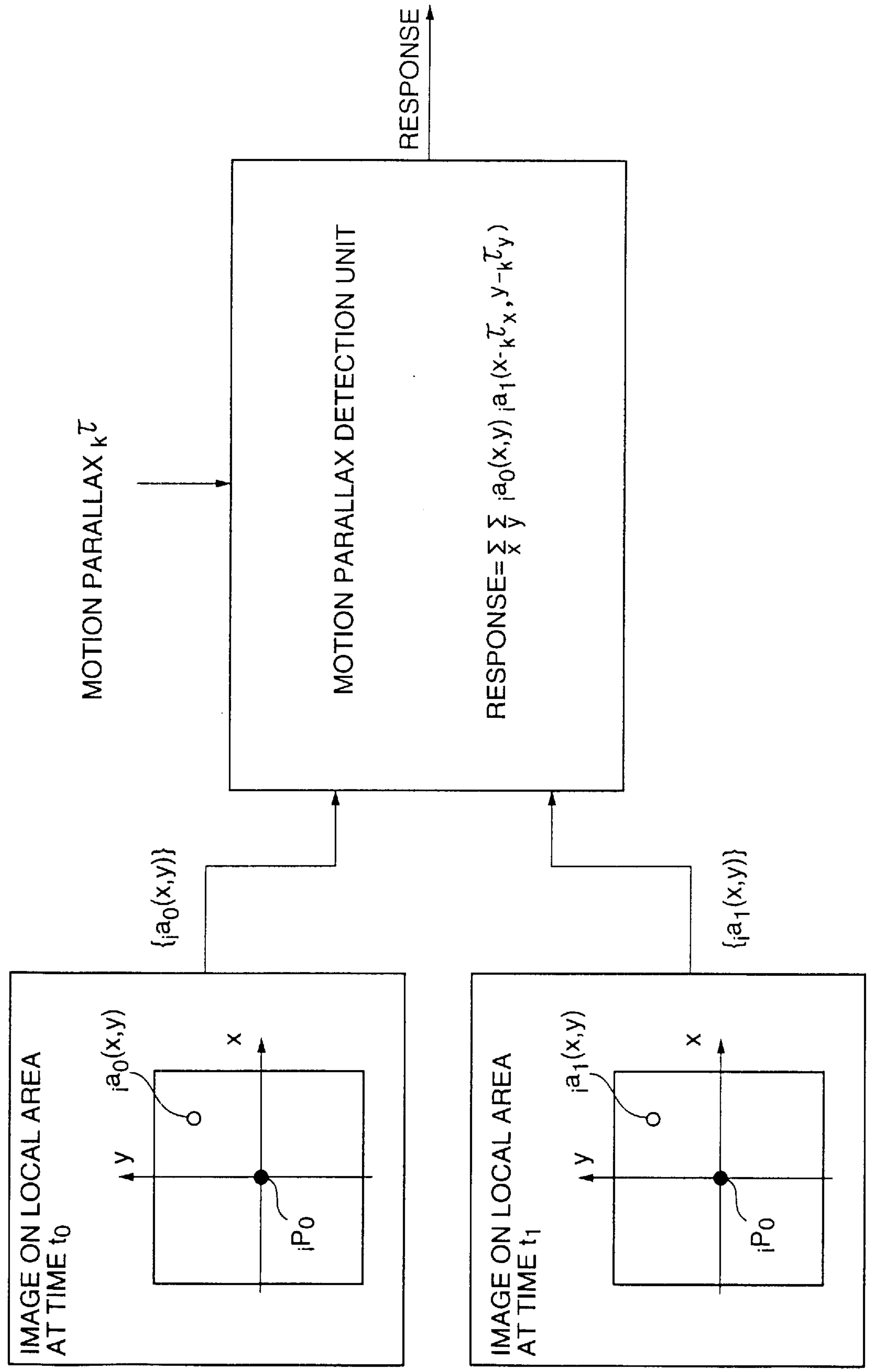

FIG. 159 is a block diagram of a motion parallax detection unit.

Figure 160:
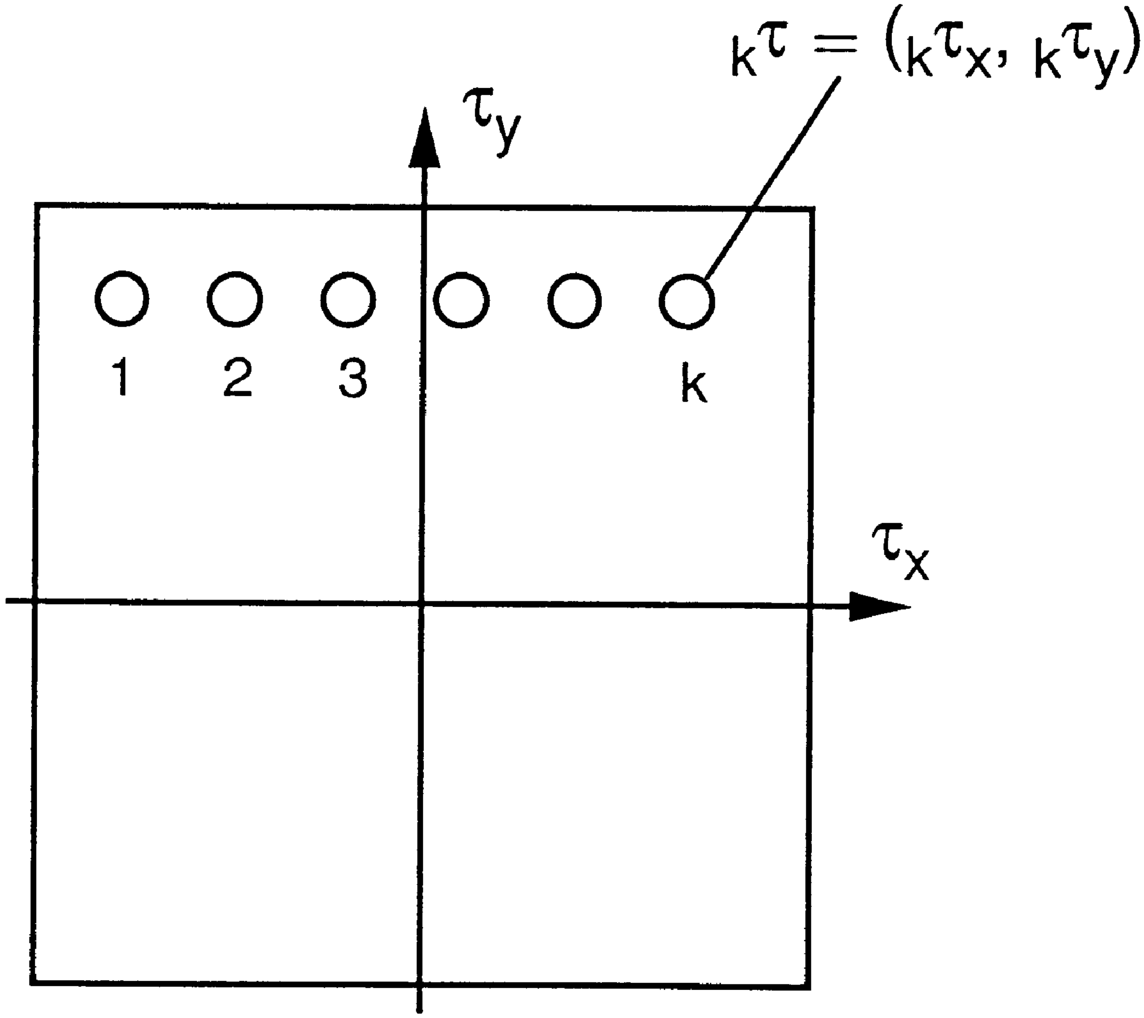

FIG. 160 is an illustration useful for understanding an association between a motion parallax ${}_k\tau$ and a parallactic vector (${}_k\sigma_x$, ${}_k\sigma_y$).

Figure 161A:
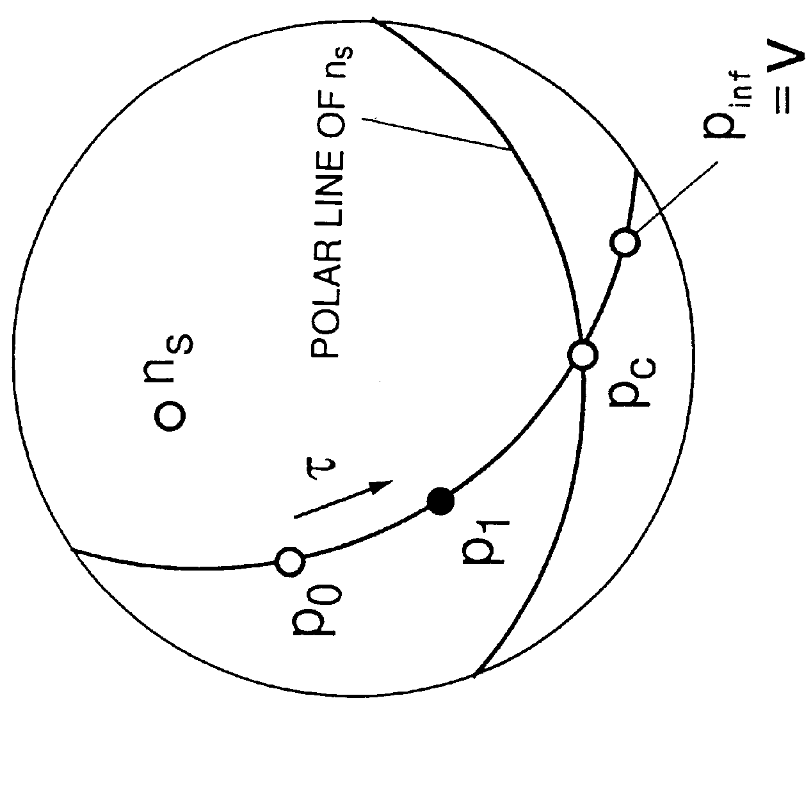
Figure 161B:
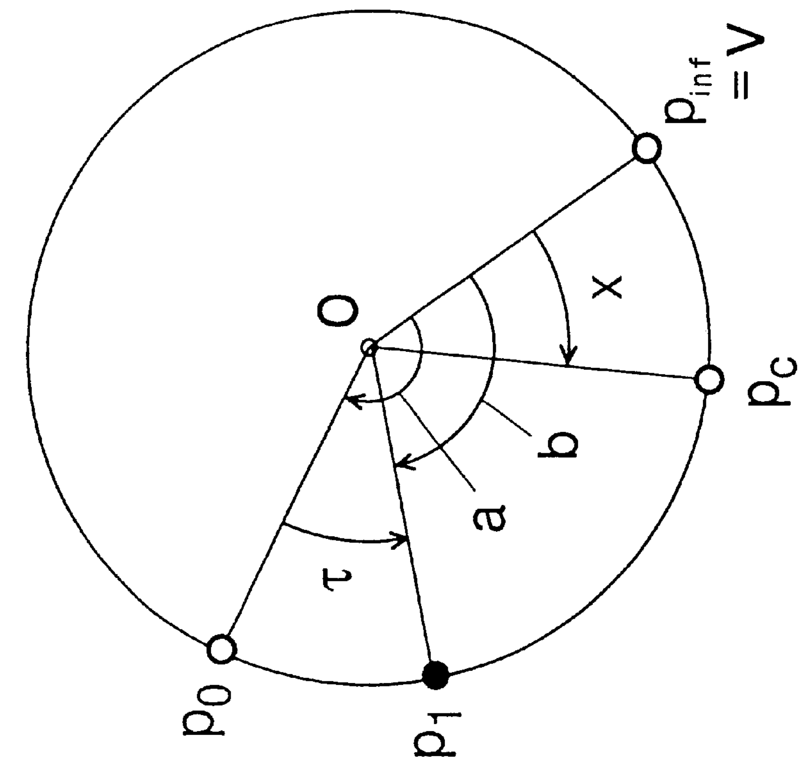

Each of FIGS. 161(A) and 161(B) is explanatory view useful for understanding a calculation method of a motion parallax $\tau$ by the compound ratio and polar transformations.

Figure 162A:
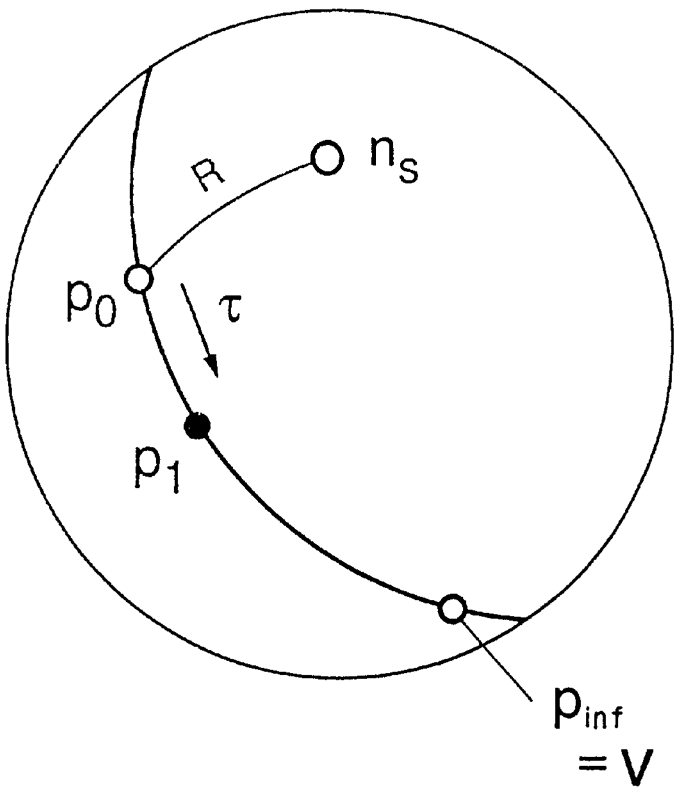
Figure 162B:
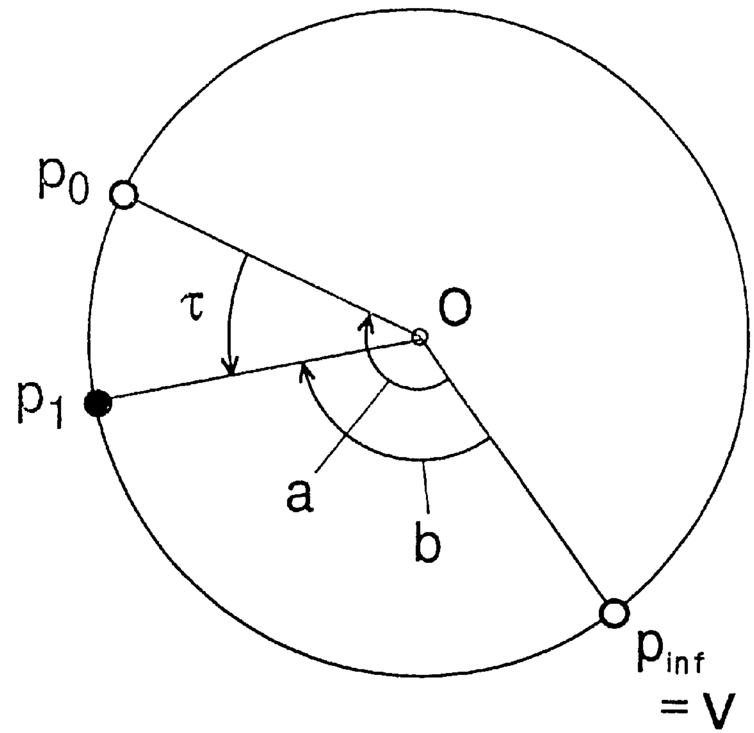

Each of FIGS. 162(A) and 162(B) is explanatory view useful for understanding a calculation method of a motion parallax $\tau$ by the small circle transformation.

FIG. 163 is a typical illustration of an ${}_{ij}\tau$ table.

FIG. 164 is a typical illustration of an ${}_{ij}\tau$ table.

FIG. 165 is a typical illustration of a $\{{}_{ik}j\}$ table.

FIG. 166 is a typical illustration of a $\{{}_{ik}j\}$ table.

Figure 167:
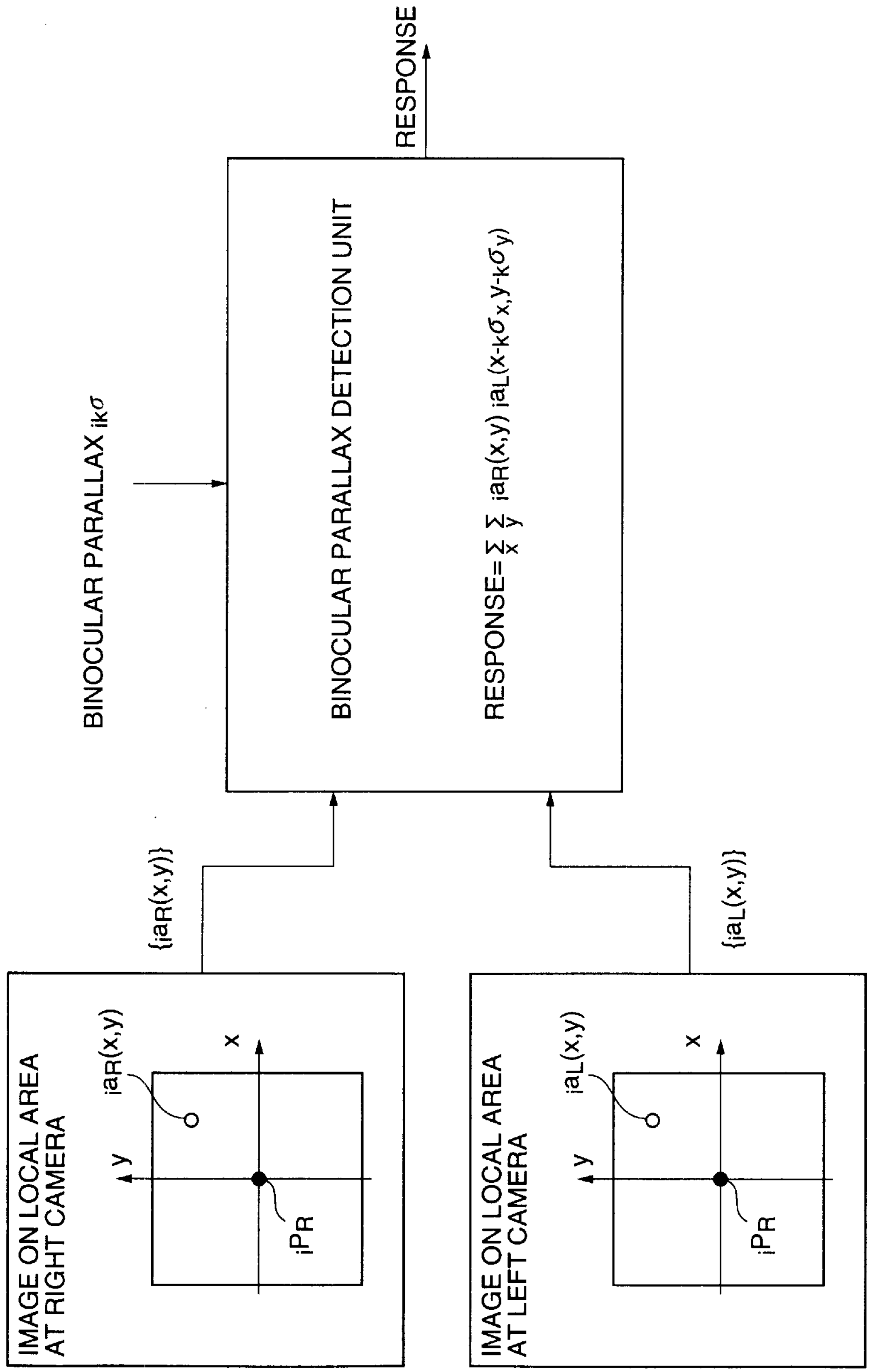

FIG. 167 is a block diagram of a binocular parallax detection unit.

Figure 168:
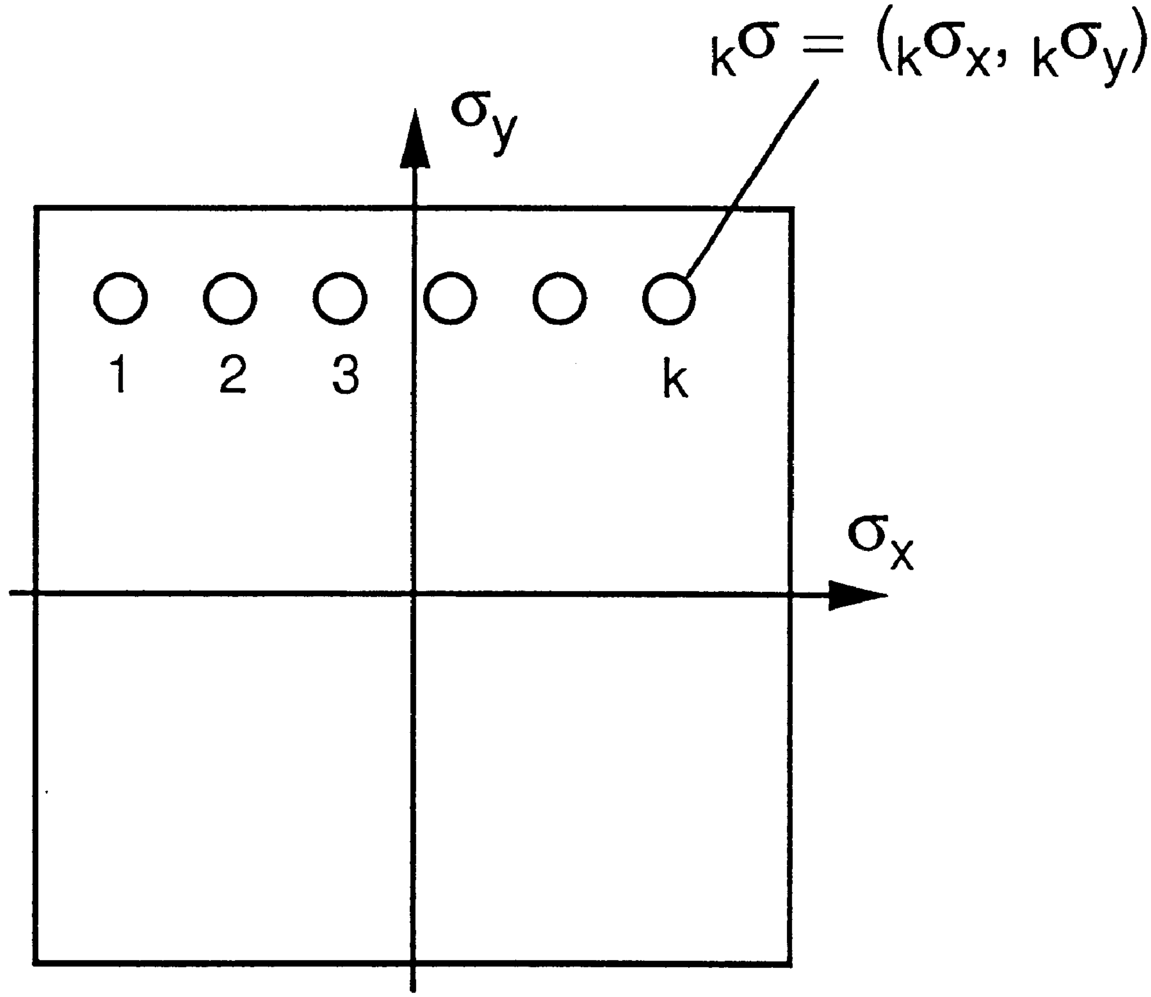

FIG. 168 is an illustration useful for understanding an association between a binocular parallax ${}_k\sigma$ and a parallactic vector (${}_k\sigma_x$,${}_k\sigma_y$).

Figure 169A:
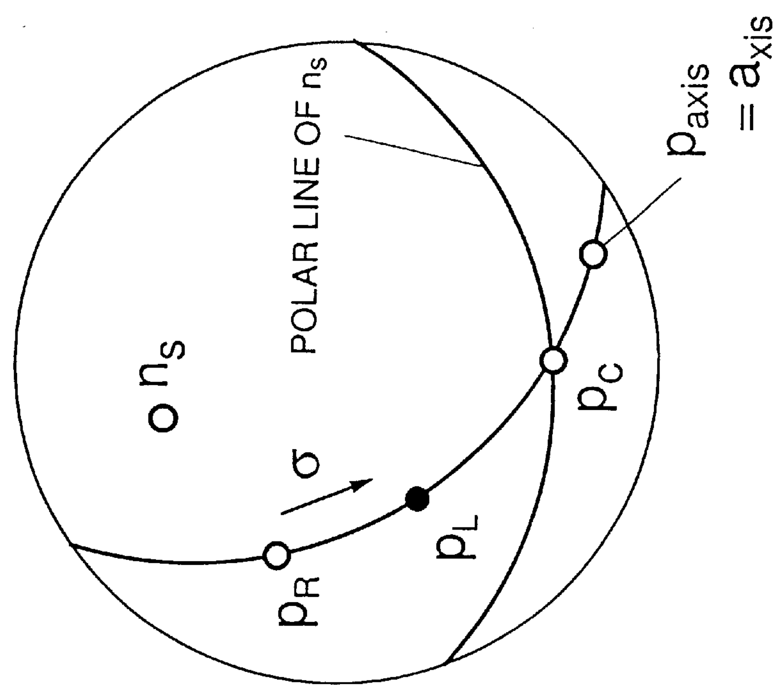
Figure 169B:
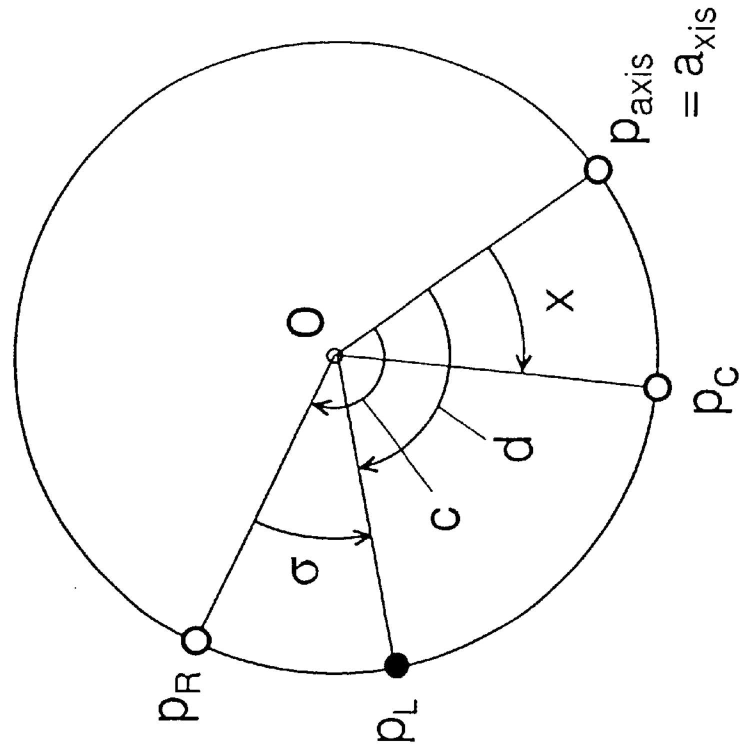

Each of FIGS. 169(A) and 169(B) is explanatory view useful for understanding a calculation method of a binocular parallax $\tau$ by the compound ratio and polar transformations.

Figure 170B:
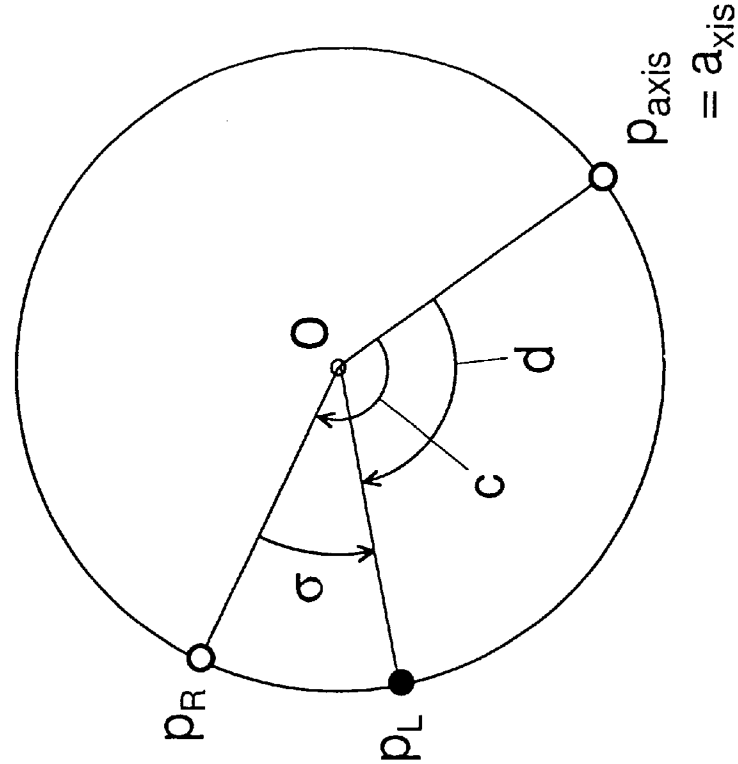

Each of FIGS. 170(A) and 170(B) is explanatory view useful for understanding a calculation method of a binocular parallax $\tau$ by the small circle transformation.

FIG. 171 is a typical illustration of an ${}_{ij}\sigma$ table.

FIG. 172 is a typical illustration of an ${}_{ij}\sigma$ table.

FIG. 173 is a typical illustration of a $\{{}_{ik}j\}$ table.

FIG. 174 is a typical illustration of a $\{{}_{ik}j\}$ table.

DETAILED DESCRIPTION OF PREFERRED EMBODIMENTS

Embodiments of the present invention will be described with reference to the accompanying drawings.

Figure 2:
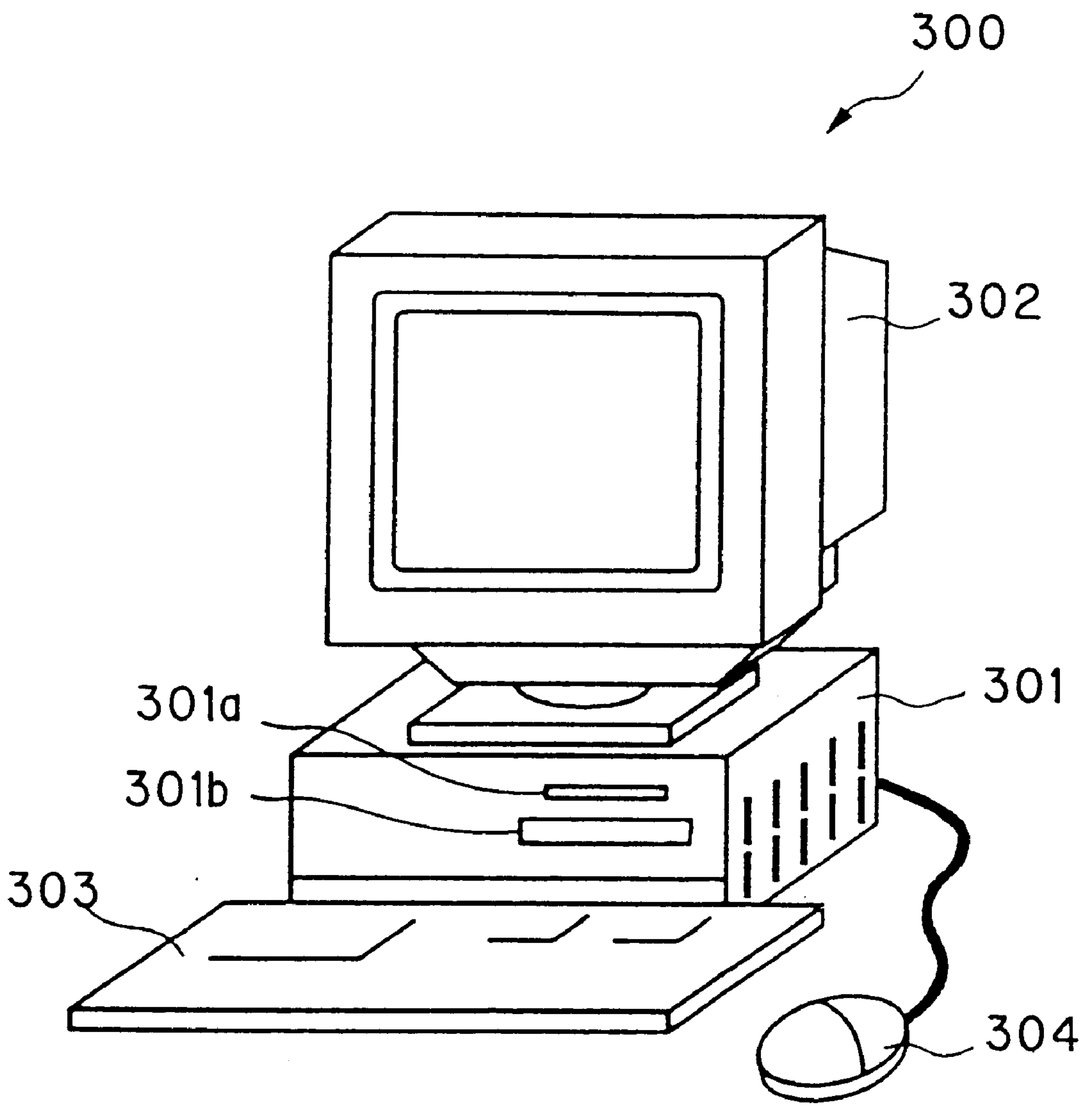
FIG. 2 is a perspective illustration of a computer system which is adopted as one embodiment of an image measurement apparatus of the present invention.

FIG. 2 is a perspective illustration of a computer system which is adopted as one embodiment of an image measurement apparatus of the present invention.

A computer system 300 comprises a main frame 301 incorporating thereinto a CPU, a RAM memory, a magnetic disk, a communication board, an image input board, etc., a CRT display 302 for performing an image display in accordance with an instruction from the main frame 301, a keyboard 303 for inputting a user's instruction and character information into the computer, and a mouse 304 for designating an arbitrary position on a display screen of the CRT display 302 to input an instruction according to an icon displayed on the position. The main frame 301 has on appearances a floppy disk loading slot 301*a* and an MO (magneto-optic disk) loading slot 301*b* onto which a floppy disk and an MO (magneto-optic disk) are detachably loaded, respectively. And the main frame 301 also incorporates thereinto a floppy disk driver for driving the loaded floppy disk and an MO (magneto-optic disk) driver for driving the loaded MO.

Figure 3:
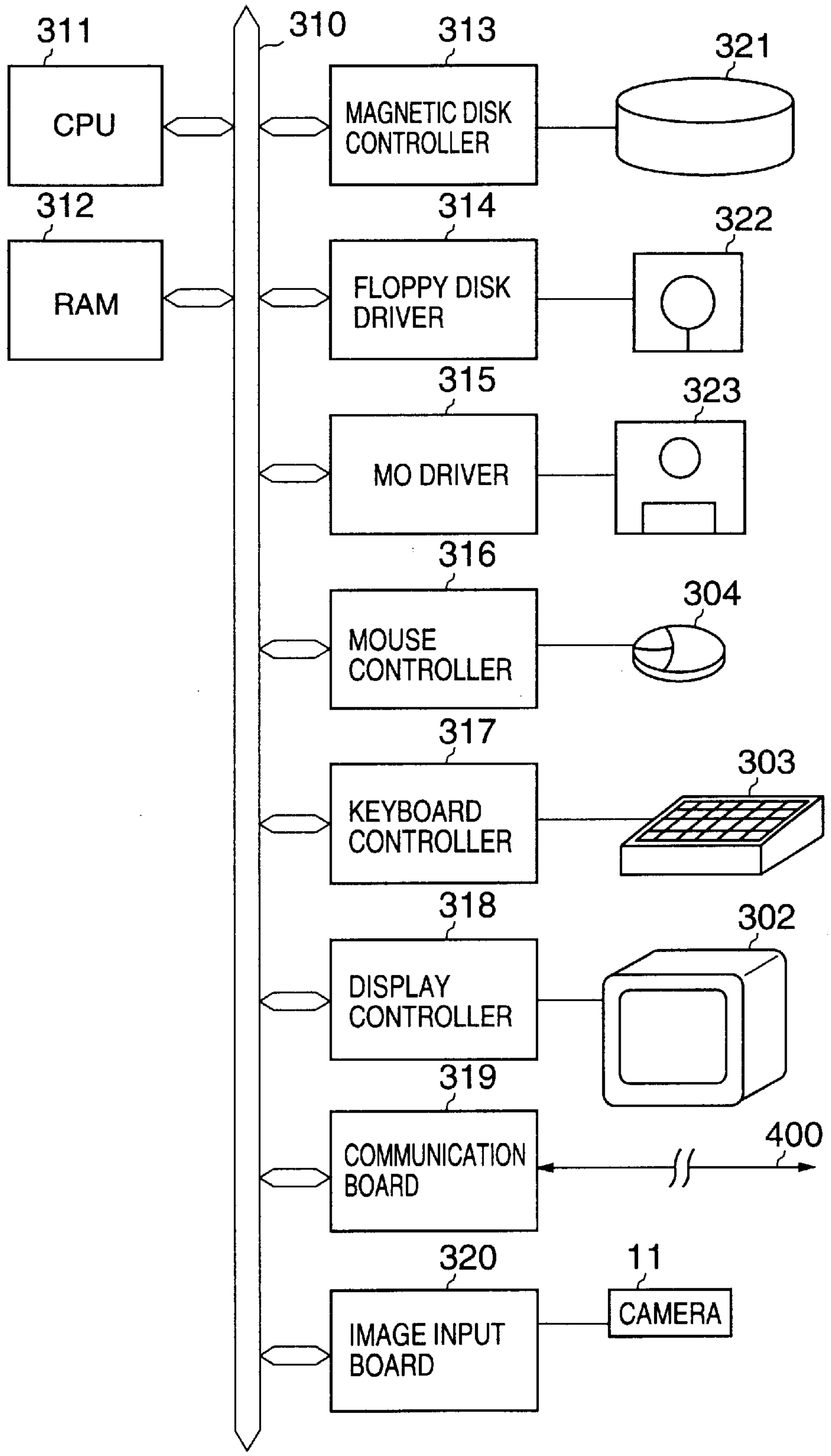
FIG. 3 is a block diagram of the computer system shown in FIG. 2.

FIG. 3 is a block diagram of the computer system shown in FIG. 2.

The computer system shown in FIG. 3 comprises a central processing unit (CPU) 311, a RAM 312, a magnetic disk controller 313, a floppy disk driver 314, an MO (magneto-optic disk) driver 315, a mouse controller 316, a keyboard controller 317, a display controller 318, a communication board 319, and an image input board 320. Those constituting elements are coupled with a bus 310.

The magnetic disk controller 313 serves to access a magnetic disk 321 incorporated into the main frame 301 (cf. FIG. 2).

The floppy disk driver 314 and the MO driver 315, onto which a floppy disk 322 and an MO (magneto-optic disk) 323 are detachably loaded, respectively, serve to access the floppy disk 322 and the MO 323, respectively.

The mouse controller 316 and the keyboard controller 317 serve to transmit operations of the mouse 304 and the keyboard 303 into the computer.

The display controller 318 causes the CRT display 302 to display an image in accordance with a program operative in the CPU 311.

The communication board 319 is connected through a communication line 400 to a communication network such as a LAN and an internet, and serves to receive image data via the communication network for instance.

The image input board 320 is connected to an external camera 11 (e.g. an electronic still camera, or a video camera), and serves to take in image data obtained through a photography by the camera 11 inside the computer. While FIG. 3 shows only one camera, it is acceptable that two cameras are connected to the image input board 320, so that two sheets of image, which are obtained through a simultaneous photography for the same subject by the two cameras from mutually different directions corresponding to human's binocular parallax for example, can be entered.

A program, which is stored in the floppy disk 322 and the MO 323, or a program, which is transmitted via the communication line 400, is installed in the computer system 300, so that the computer system 300 is operable as an image measurement apparatus according to the present invention which will be described latter. Thus, an embodiment of an image measurement apparatus according to the present invention is implemented in the form of a combination of a hardware of the computer system shown in FIGS. 2 and 3 and a program installed in the computer system and to be executed. A program, which causes the computer system to be operative as an image measurement apparatus according to the present invention, corresponds to an image measurement program referred to in the present invention. In the event that the image measurement program is stored in the floppy disk 322 and the MO 323, the floppy disk 322 and the MO 323, which store the image measurement program, correspond to an image measurement program storage medium referred to in the present invention. When the image measurement program is installed in the computer system, the installed image measurement program is stored in the magnetic disk 321. Thus, the magnetic disk 321, which stores the image measurement program, also corresponds to an image measurement program storage medium referred to in the present invention.

Here, functions of the computer system 300 shown in FIGS. 2 and 3 as the image measurement apparatus are shown in the various types of function block diagrams, which will be described later, and the contents of the image measurement program operative in the computer system 300 are shown in the various types of flowcharts, which will be described later. The various types of flowcharts, which will be described later, can be understood in the form of "methods", and thus the various types of flowcharts, which will be described later, correspond to the various embodiments of an image measurement method according to the present invention.

Here, the explanation of the embodiments of the present invention is discontinued, and the principle of the image measurement according to the present invention will be described and thereafter the various embodiments of the present invention will be described.

1. A Measurement Method of a Three-dimensional Azimuth of a Plane and a Time up to Crossing There will be provided hereinafter a method of measuring a three-dimensional azimuth $n_s$ of a plane and a time $t_c$ up to crossing the plane, of the three-dimensional geometric information of the plane.

Figure 4:
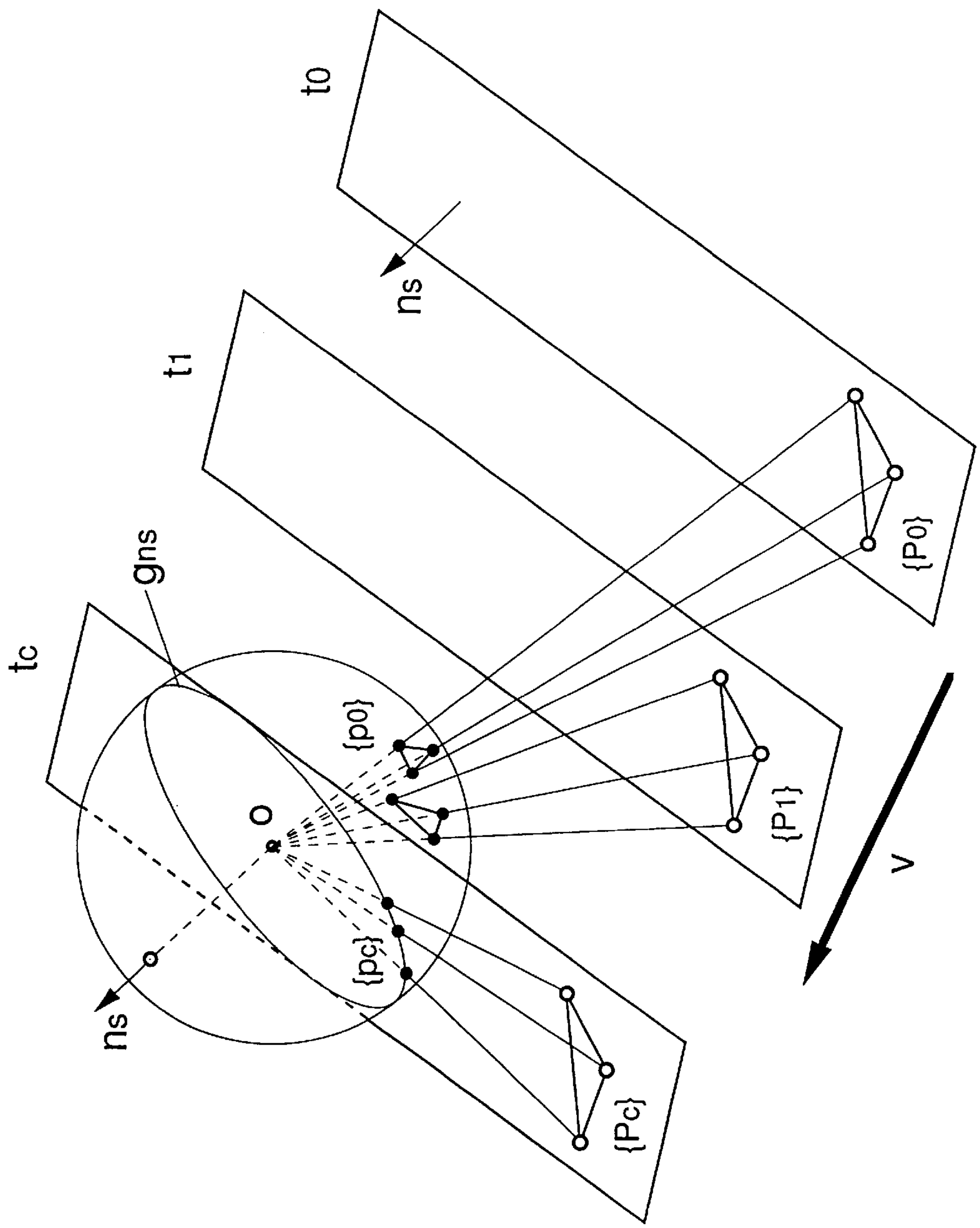
FIG. 4 is a view showing a state that a plane is moved.

It is assumed that a plane is moved in a direction v. FIG. 4 shows a state that a plane wherein a normal vector is given by $n_s$ (a plane wherein a three-dimensional azimuth is given by $n_s$) is moved from the present time $t_0$ to the subsequent time $t_1$, and the plane goes across a camera center O at time $t_c$. The tops (white circles) of a triangle on the plane at the respective times are projected on a retina of an eyeball (or a spherical camera) in the form of cross points (black circles) between lines coupling the camera center O with the respective tops and a surface of the eyeball (or a spherical camera). Hereinafter, for the purpose of simplification, it is assumed that the diameter of the eyeball (or a spherical camera) is given by 1. Consequently, the vector coupling the camera center O with the black circle offers a "unit vector" of magnitude 1.

1.1. The Principles of Measuring a Three-dimensional Azimuth $n_s$ of a Plane

Figure 5:
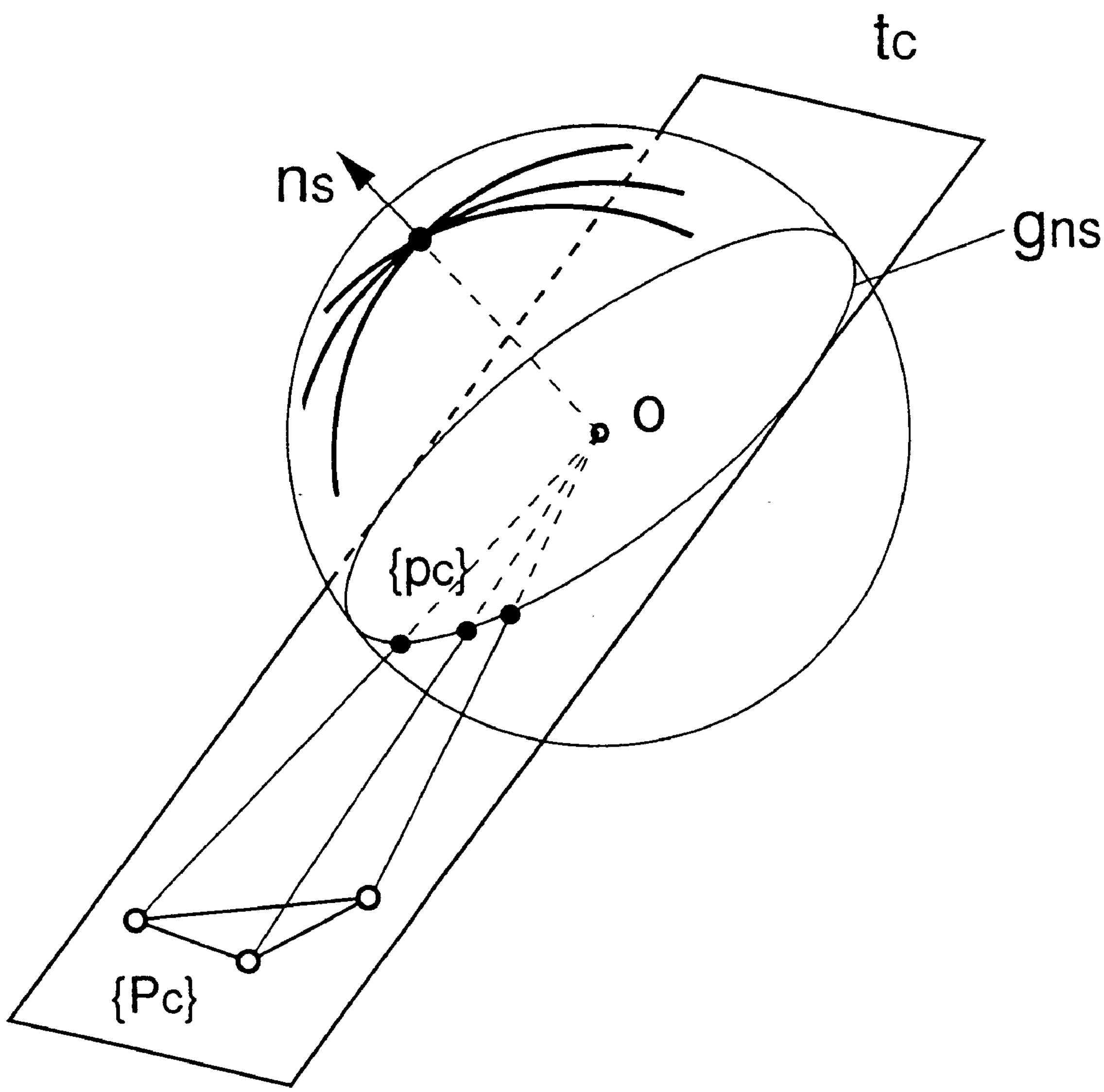
FIG. 5 is an explanatory view useful for understanding a principle of measuring a three-dimensional azimuth of a plane.

FIG. 5 is an explanatory view useful for understanding a principle of measuring a three-dimensional azimuth of a plane. FIG. 5 shows a state at time $t_c$. At that time, the plane passes through the camera center O. Accordingly, a dot group (white circles) on a plane is projected on a sphere in the form of a "dot group (black circles) on a large circle $g_{ns}$" through a degeneration. This large circle is a line of intersection of the plane with the sphere. Consequently, the vector $p_c$ perpendicularly intersects with the normal vector $n_s$ of the plane. From this relation, the normal vector $n_s$ of the plane can be measured in the form of a "polar transformation" of the vector $p_c$ as follows. That is, when a large circle (the largest circle on the sphere) is drawn on each of the vectors $p_c$ taking it as a center, a group of large circles intersect at one point so that a normal vector (that is, a three-dimensional azimuth) $n_s$ of the plane is measured in the form of the cross point. In this manner, a determination of $p_c$ on a plurality of points makes it possible to determine a three-dimensional azimuth of the plane through the polar transformation. Here, the term of the polar transformation will be explained. The points $p_c$ and the large circles on the sphere are referred to as "poles" and "polar lines", respectively, and an operation of transferring the pole $p_c$ to the polar line (large circle) is referred to as the "polar transformation" or a "duality".

1.2. The Principles of Measuring a Normalized Time ${}_nt_c$ up to Going Across a Plane.

The principle of measuring the normalized time ${}_nt_c$ will be described. Here, the normalized time is defined as a time wherein time $t_c$ up to crossing a plane is normalized with a time difference Δt between the present time to and the subsequent time $t_1$, and is expressed by the following equation (1).

$$ {}_nt_c=t_c/\Delta t \quad (1)$$

$$\Delta t=t_1-t_0 \quad (2)$$

Figure 6:
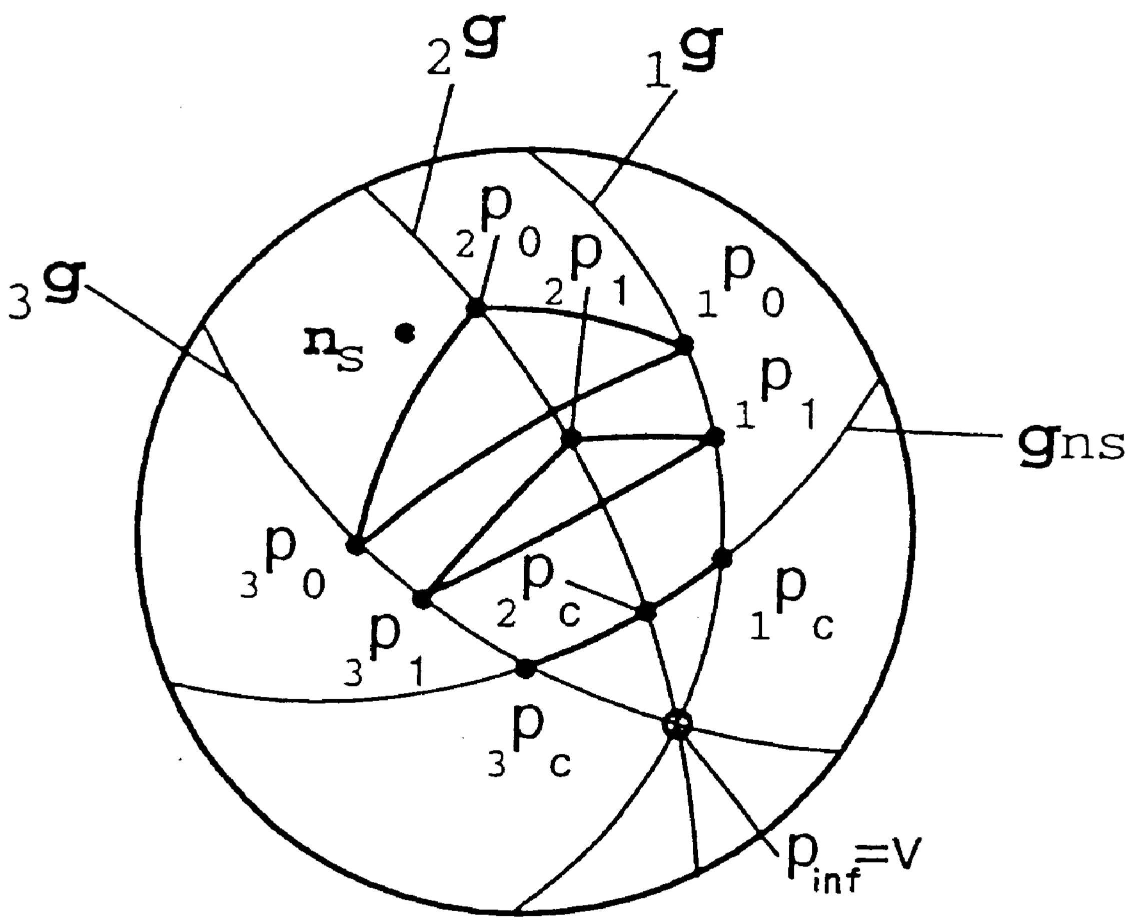
FIG. 6 is a view showing a state that a triangle, which is projected on a sphere shown in FIG. 4, is moved.

FIG. 6 is a view showing a state that a triangle (black circles), which is projected on a sphere shown in FIG. 4, is moved. A triangle ${}_1p_0$, ${}_2p_0$, ${}_3p_0$ at the present time $t_0$ is moved to ${}_1p_1$, ${}_2p_1$, ${}_3p_1$ at the subsequent time $t_1$, and is moved, at the time $t_c$ crossing a plane, to three points ${}_1p_c$, ${}_2p_c$, ${}_3p_c$ on the "large circle $g_{ns}$ perpendicularly intersecting with the normal vector $n_s$ of a plane" through a degeneration, and finally converges in a moving direction v after the infinite time elapses. The three tops are moved on "large circles ${}_1g$, ${}_2g$, ${}_3g$ coupling those with the moving direction v", respectively. It is noted that the moving direction v is involved in a position after the infinite time elapses and thus is also denoted by $p_{inf}$ hereinafter.

Figure 7:
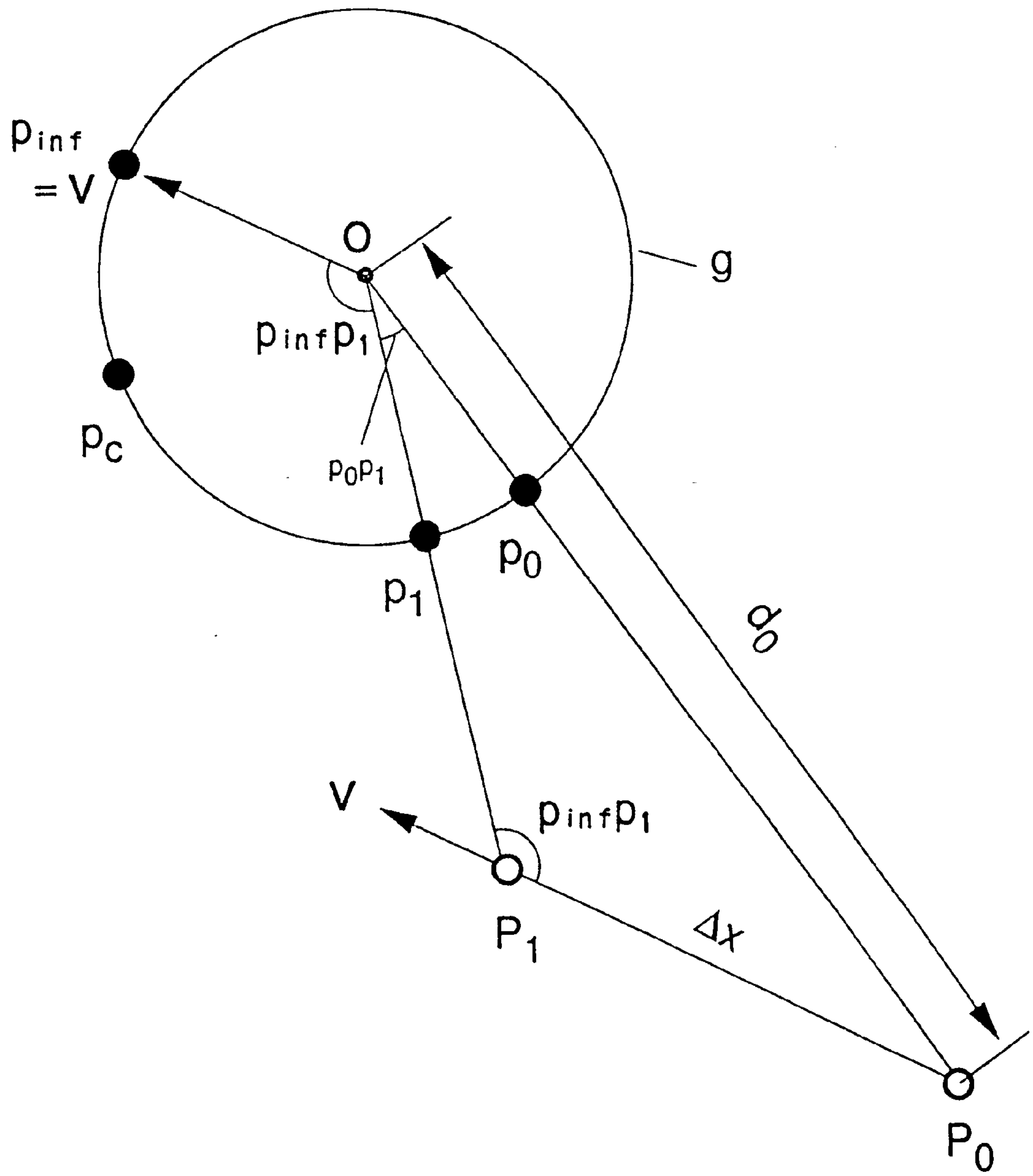
FIG. 7 is an explanatory view useful for understanding a principle of measuring a distance up to a point.

FIG. 7 is an explanatory view useful for understanding a principle of measuring a distance up to a As a preparation for measuring the normalized time ${}_nt_c$, it is possible that a position $p_0$ at the present time, a position $p_1$ at the subsequent time, and a position $p_{inf}$ after the infinite time elapses are determined so that a three-dimensional distance $d_0$ of a point at the present time (or a distance from the camera center O to the point $p_0$) can be measured. FIG. 7 shows a sectional view wherein a sphere is cut at "one (g) of the large circles each representative of a moving locus" shown in FIG. 6. When a sine theorem is applied to a triangle O $p_0p_1$, there is a relation as set forth between a distance $d_0$ to a point $p_0$ and a "moving distance Δx from the present time to the subsequent time".

$$\Delta x/\sin(p_0p_1)=d_0/\sin(p_{inf}p_1) \quad (3)$$

Where $p_0p_1$ denotes a central angle from $p_0$ to $p_1$, and $p_{inf}p_1$ denotes a central angle from $p_{inf}$ to $p_1$. When the equation (3) is modified, the distance $d_0$ to the point $p_0$ is expressed by the following equation.

$$d_0=\Delta x\ \sin(p_{inf}p_1)/\sin(p_0p_1) \quad (4)$$

where a "simple ratio (a b c) as to three points a, b, c of the large circle is defined (cf. "Projective Geometry (by Gurevic, G.B., Tokyo Books)", page 6) as follows.

$$(abc)=ac/bc=\sin(ac)/\sin(bc) \quad (5)$$

when the simple ratio is used, the equation (4) is expressed by the equation (6). The adoption of the expression of the simple ratio may avoid the necessity of the adoption of the scheme of the central projection, and thus makes it possible to measure the distance $d_0$ from not only the above-mentioned three points $p_0$, $p_1$, $p_c$ moving on the large circle of a "spherical camera or an eyeball", but also three points $p_0$, $p_1$, $p_c$ moving on a "straight line of an image on a planar camera". That is, it is possible to measure the distance $d_0$ of a point on a three-dimensional basis regardless of a camera system for a photography of an image.

$$d_0=\Delta x(p_{inf}p_0p_1) \quad (6)$$

Figure 8:
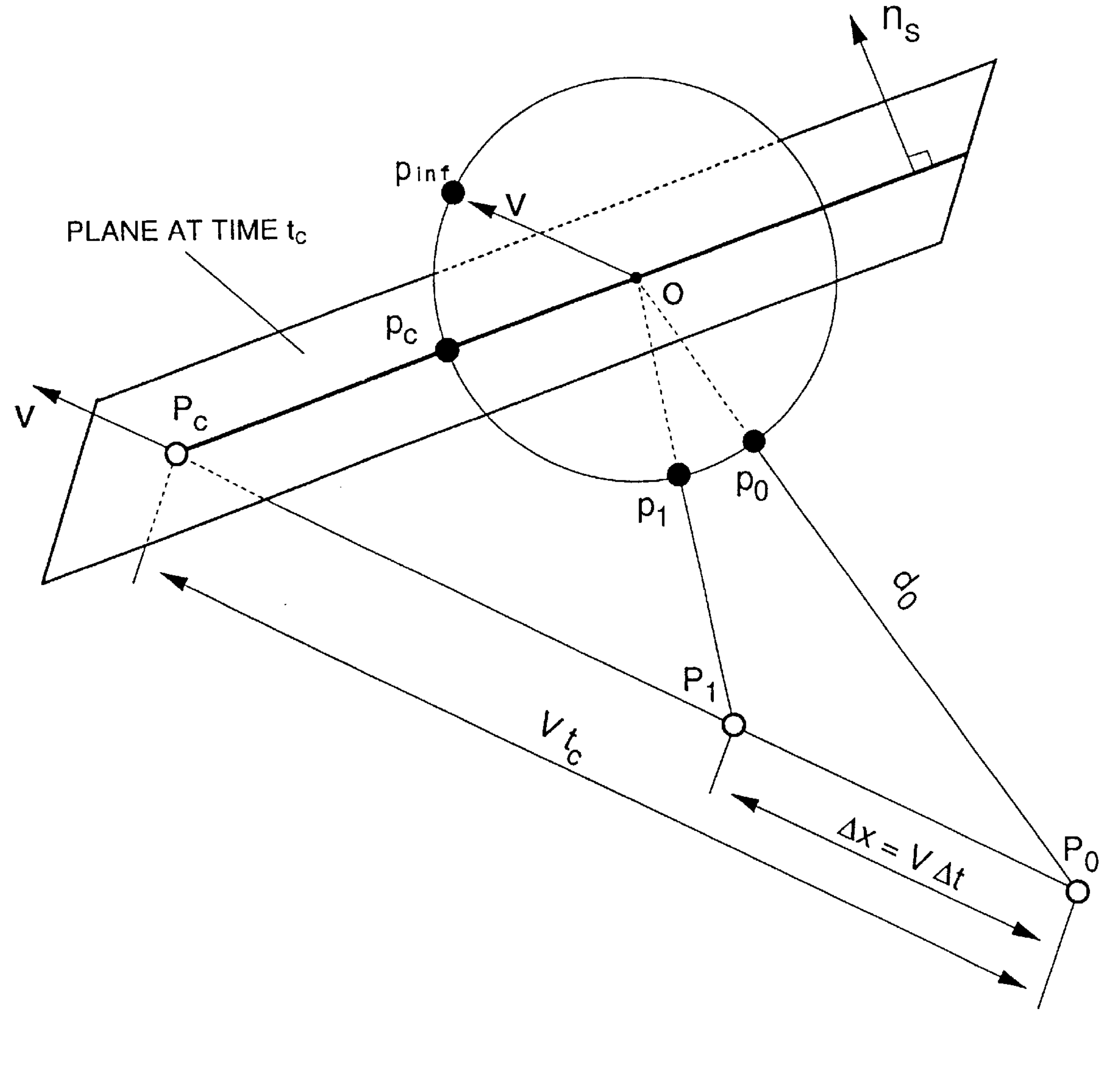
FIG. 8 is an explanatory view useful for understanding a principle of measuring a normalized time.

Next, there will be explained the principle of measuring the normalized time ${}_nt_c$ on the basis of the above-mentioned preparation. FIG. 8 is an explanatory view useful for understanding a principle of measuring a normalized time. FIG. 8 is equivalent to a figure in which a "plane crossing the camera center O at the time $t_c$" is added into FIG. 7. Assuming that a moving velocity is given by v, a relation between the "moving distance Δx from the present time to the subsequent time" and the time difference Δt between the present time and the subsequent time is expressed by the following equation (7).

$$\Delta x=V\Delta t \quad (7)$$

When the equation (7) is substituted for the equation (4) and the equation (6), the following equations (8a) and (8b) can be obtained.

$$d_0 = V\Delta t\sin(p_{inf}p_1)/\sin(p_0p_1) \quad (8a)$$

$$= V\Delta t(p_{inf}p_0p_1) \quad (8b)$$

Assuming that time up to crossing the plane is expressed by $t_c$, when a sine theorem is applied to a triangle O $p_0$ $p_c$, the distance $d_0$ can be determined in accordance with the following equations (9a) and (9b).

$$d_0 = Vt_c\sin(p_{inf}p_c)/\sin(p_0p_c) \quad (9a)$$

$$= Vt_c(p_{inf}p_0p_c) \quad (9b)$$

From the ratio of the equations (8a) and (8b) and the equations (9a) and (9b), the normalized time ${}_nt_c$ up to going across the plane can be determined in accordance with the following equations (10a) and (10b).

$${}_nt_c = t_c/\Delta t$$

$$= (\sin(p_{inf}p_1)/\sin(p_0p_1))/(\sin(p_{inf}p_c)/\sin(p_0p_c)) \quad (10a)$$

-continued $$= (p_{inf}\,p_0\,p_1) / (p_{inf}\,p_0\,p_c) \quad (10b)$$

Here, the compound ratio {a b c d} as to four points a, b, c, d on the large circle is defined by the following equation (11a) in the form of the "ratio of two simple ratios (a b c) and (a b d)", and is expressed by the relation set forth in the following equation (11b) (cf. "Projective Geometry (by Gurevic, G. B., Tokyo Books)", pages 257 and 119).

$$\{abcd\} = (abc) / (abd)$$

$$= (ac/bc) / (ad/bd) \quad (11a)$$

$$= (\sin(ac)/\sin(bc)) / (\sin(ad)/\sin(bd)) \quad (11b)$$

$$\{abcd\} = \{badc\} = \{cdab\} = \{dcba\} \quad (11c)$$

When the definition of the compound ratio equation (11a) is used, the equations (10a) and (10b) are expressed by the following equation (12a).

$$_nt_c = \{p_{inf} p_0 p_1 p_c\} \quad (12a)$$

In this manner, a determination of four points $p_0$, $p_1$, $p_c$, $p_{inf}$ on the moving locus makes it possible to determine the normalized time $_nt_c$ in the form of the compound ratio of the equation (12a).

Here, let us consider the projective geometric meaning of the equation (12a). According to the description at page 86 of "Projective Geometry (by Yanaga and Hirano, Asakura Book Store)", the compound ratio is defined such that "the coordinates λ of d by the basic point system a, b, c is referred to as the compound ratio, and is represented by {a b c d}" (also at page 119 of "Projective Geometry (by Gurevic, G. B., Tokyo Books)", there is the similar description). In this definition, when the basic point system a, b, c is replaced by the basic point system $p_{inf}$, $p_0$, $p_1$, and the valueλ of the compound ratio is replaced by $_nt_c$, the definition of the compound ratio is changed to read as "the coordinates $_nt_c$ of $p_c$ by the basic point system $p_{inf}$, $p_0$, $p_1$, is referred to as the compound ratio, and is represented by {$p_{inf}$, $p_0$, $p_1$, $p_c$}". Consequently, the equation (12a) means on a projective geometric basis "the normalized time $_nt_c$ is coordinates of $p_c$ which is measured by a basic point system wherein the original point, the infinite-point and the unit point are given by $p_0$, $p_{inf}$, $p_1$, respectively". (12b)

The compound ratio of the equation (12a) is the basic invariant of the projective geometry, and is constant for the arbitrary projection and cut. That is, the compound ratio is constant for an "image on an arbitrary camera system" of a spherical camera, a planar camera and the like. Consequently, it is possible to measure in the form of the compound ratio the "normalized time $_nt_c$ up to crossing a plane" from not only the above-mentioned four points $p_0$, $p_1$, $p_c$, $p_{inf}$ moving on the large circle of a "spherical camera or an eyeball", but also four points $p_0$, $p_1$, $p_c$, $p_{inf}$ moving on a "straight line of an image on a planar camera". That is, it is possible to measure the normalized time $_nt_c$ regardless of a camera system for a photography of an image.

1.3. A Method of Determining a Three-dimensional Geometric Information of a Plane by a Compound Ratio Transformation and a Polar Transformation.

Let us consider as to whether it is possible to know four positions $p_0$, $p_1$, $p_c$, $p_{inf}$ used in the above-mentioned principle. First, the position $p_0$ at the present time and the position $p_1$ at the subsequent time can be known from an image on a camera. Next, the position at the infinite time can be known since it is equivalent to a moving direction v of the plane (or the camera). Of the above-mentioned four positions, what is impossible to be known directly is the position $p_c$ at the time $t_c$ wherein the plane goes across the camera center.

The position $p_c$ can be estimated by the "compound ratio transformation" which is obtained through a modification of the equation (10a) or the equation (12a). The three-dimensional geometric information (a three-dimensional azimuth $n_{s0}$ and a normalized time $_nt_{c0}$ up to crossing) of a plane can be measured through the "polar transformation" of $p_c$ in accordance with the method of 1.1. These matters will be explained hereinafter.

1.3.1 A Compound Ratio Transformation

According to this compound ratio transformation, the normalized time $_nt_c$ and positions $p_0$, $p_1$, $p_{inf}$ at three times are determined, and "the above-mentioned position $p_c$", which is important for determination of the three-dimensional geometric information, is computed. Since four variables $_nt_c$, $p_0$, $p_1$, $p_{inf}$ can be determined in the equation (12a), it is possible to determine the remaining variable $p_c$. This computation is well known as a method of computation for a compound ratio of a projective geometry.

Figure 9:
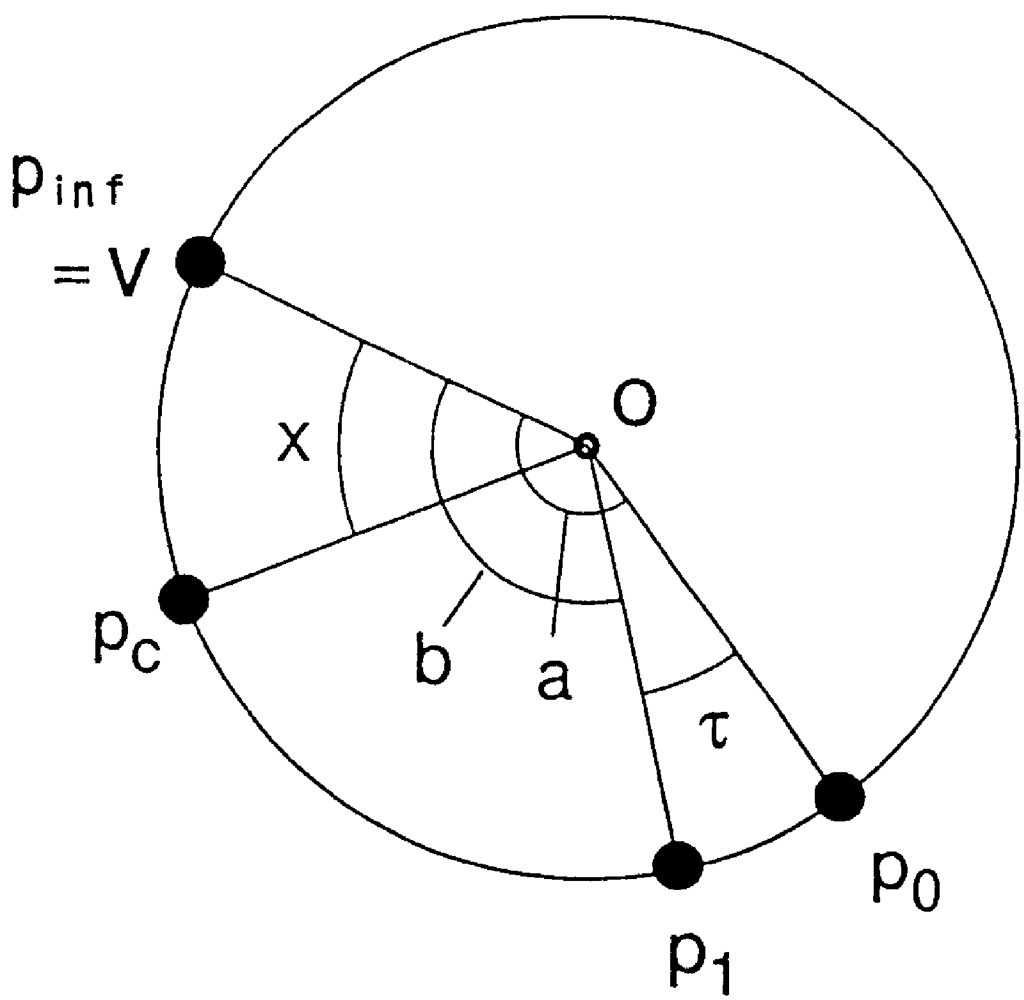
FIG. 9 is an explanatory view useful for understanding a definition of the central angle.

This computation will be given by a mathematical expression. FIG. 9 shows a sectional portion of the sphere extracted from FIG. 8. The positions of $p_0$, $p_1$, $p_c$ are represented by the central angles a, b, x taking $p_{inf}$ as the basic point (it is acceptable that the basic point may be an arbitrary position). The various central angles are as follows.

$$p_{inf}p_0 = a \quad (13)$$

$$p_{inf}p_1 = b \quad (13)$$

$$p_{inf}p_c = x \quad (13)$$

$$p_0p_c = b - a \quad (13)$$

$$p_0p_c = x - a \quad (13)$$

The above-mentioned compound ratio transformation will be given by the mathematical expression using those central angles. When the right-hand member of the equation (10a), that is, the compound ratio is expressed by the use of the central angles shown in the equation (13), the following equation is obtained.

$$_nt_c = (\sin(b/\sin(b-a)) / (\sin(x)/\sin(x-a)) \quad (14a)$$

When it is modified, the central angle x between $p_c$ and $p_{inf}$ is given by the following equation.

$$x = \tan^{-1}((\sin(a)\sin(b)) / (\cos(a)\sin(b) - {}_nt_c\,\sin(b-a))) \quad (14b)$$

Accordingly, when the normalized time $_nt_c$ and "positions $p_0$, $p_1$, $p_{inf}$ at three times" are given, the position $p_c$ at the time crossing a plane is computed in accordance with the equation (14b). That is, the mathematical expressions for the compound ratio transformation are shown.

In the general dynamic picture image processing and the optical flow, it often happens that "change $p_1 - p_0$ from the present time (that is, it is the motion parallax τ and is expressed by the central angle $p_0p_1$)" instead of the position $p_1$ at the subsequent time" is treated. The respective arrows of the optical flow pattern (FIG. 1) correspond to this change, and the starting point and the terminating point of the arrow correspond to the present time position $p_0$ and the subsequent time position $p_1$, respectively. In FIG. 9, such a change is represented by the angle τ. In this case, the mathematical expressions for the compound ratio transformation will be set forth below.

The various central angles are given as follows.

$$p_{inf}p_0=a \quad (15)$$

$$p_{inf}p_1=\tau \quad (15)$$

$$p_{inf}p_c=x \quad (15)$$

$$p_{inf}p_1=a+\tau \quad (15)$$

$$p_0p_c=x-a \quad (15)$$

When the right-hand member of the equation (10a) is expressed using the central angles of the equation (15), the following equation can be obtained.

$$_nt_c=(\sin(a+\tau)/\sin(\tau))/(\sin(x)/\sin(x-a)) \quad (16a)$$

When this is modified, the central angle x between $p_c$ and $p_{inf}$ is given by the following equation.

$$x=\tan^{-1}((\sin(a)\sin(a+\tau))/(\cos(a)\sin(a+\tau)-{}_nt_c\sin(\tau))) \quad (16b)$$

Thus, additional mathematical expressions for the compound ratio transformation can be obtained.

1.3.2 A Method of Determining a Three-dimensional Azimuth of a Plane and a Normalized Time Up to Going Across the Plane There will be explained a method of determining a three-dimensional azimuth $n_s$ of a plane and a normalized time $_nt_c$ up to going across the plane. It is performed in the following four steps.

(1) Set up arbitrarily a normalized time parameter $_nt_c$.

(2) With respect to the respective points of an image, determine the positions $p_0$, $p_1$ at the present time and the subsequent time from the image on a camera, respectively, and determine the position $p_{inf}$ after the infinite time elapses from the moving direction v, and substitute those positions for the equation (14b) or the equation (16b) to perform the compound ratio transformation so that the position $p_c$ is computed.

(3) Determine candidates for the normal vector $n_s$ of a plane in accordance with "the principles of measuring a three-dimensional azimuth $n_s$ of a plane" of 1.1. That is, $p_c$ determined in the step (2) is subjected to the polar transformation to draw large circles on a sphere. Here there will be explained the meaning of drawing the large circles. If the normalized time parameter $_nt_c$ given in the step (1) is a true normalized time $_nt_{c0}$, as described in connection with FIG. 5, it is possible to determine the normal vector $n_{s0}$ of a plane in the form of the cross point of the large circles. However, in the step (1), the parameter $_nt_c$ is arbitrarily set up and thus generally the large circles do not intersect with each other at one point. Therefore, the large circles drawn here mean determining candidates for the normal vector $n_s$ of a plane. Incidentally, intensity of the large circle corresponds to "brightness of position $p_0$ in an image", and in the place wherein a plurality of large circles intersect with each other, intensity of the large circles is added.

(4) The above-mentioned steps (1) to (3) are repeatedly carried out through changing the normalized time parameter $_nt_c$ to determine a parameter value $_nt_{c0}$ wherein a plurality of large circles drawn in the step (3) intersect with each other at one point. Thus, a "normalized time $_nt_{c0}$ up to crossing a plane" is obtained in the form of the parameter value. Further, the azimuth $n_{s0}$ of a plane is obtained in the form of coordinates of the above-mentioned cross point. It is acceptable that a point wherein intensity offers a peak is detected instead of detection of the above-mentioned cross point.

Here, there will be described a geometric meaning of the position $p_c$ computed through the compound ratio transformation in the step (2). The position $p_c$ is one in which the position at the arbitrarily time $_nt_c\Delta t$ is "predicted". This prediction is apparent from the derivation process of the equation (10a) which is the base for the compound ratio transformation. On the other hand, intuitively, the equation (12b) may be understood as follows:

"In order to predict the position at the arbitrarily time $_nt_c\Delta t$ (that is, the normalized time parameter $_nt_c$), it is effective to determine the position $p_c$ of $_nt_c$ in coordinates in a basic point system wherein the original point, the infinite-point and the unit point are given by $p_0$, $p_{inf}$, $p_1$, respectively"

The time, in which the positions $p_c$ thus predicted are located on the large circles, corresponds to the "time $_nt_{c0}\Delta t$ in which a plane crosses the camera center (that is, the time $t_{c0}$)", and the "normalized time $_nt_{c0}$ up to crossing a plane" is determined in accordance with that time. The large circles, in which those positions $p_c$ are subjected to the polar transformation, intersect with each other at one point, so that the three-dimensional azimuth $n_{s0}$ of a plane is determined in the form of the coordinates of the cross point (cf. FIG. 5).

1.3.3 Geometric Meaning of the Above-mentioned Steps

Geometric meaning of the above-mentioned steps will be explained in conjunction with FIGS. 10(A) and 10(B). As shown in FIG. 10(A), the respective points on an image on a spherical camera move from the position $p_0$ at the present time to the position $p_1$ at the subsequent time, pass through the position $p_c$ at the "time in which a plane crosses the camera center", and finally after the infinite time elapses, reach the "position $p_{inf}$ equivalent to the moving direction v of a plane (or a camera)" (cf. FIG. 6).

Determination of the position $p_c$ (Meaning of the step (2)): The "positions $p_0$, $p_1$ at the present time and the subsequent time" and the "normalized time parameter $_nt_c$" given by the step (1) are subjected to the compound ratio transformation in accordance with the equation (14b) so that the position $p_c$ at the "time in which a plane crosses the camera center" is determined. This is shown in FIG. 10(A). Incidentally, in the event that the compound ratio transformation according to the equation (16b) is used, a "difference vector $\tau$ from the position $p_0$ at the present time to the position $p_1$ at the subsequent time" is used instead of the position $p_1$ at the subsequent time.

Drawing of a candidate group $\{n_s\}$ of a planer azimuth (Meaning of the step (3)): The position $p_c$ determined as mentioned above is subjected to the polar transformation to draw on a sphere a large circle or a candidate group $\{n_s\}$ of a planer azimuth as shown in FIG. 10(A). If the normalized time parameter $_nt_c$ given in the step (1) is a true normalized time $_nt_{c0}$, it is possible to determine the normal vector $n_{s0}$ of a plane in the form of the cross point of these large circles associated with a plurality of points on the image.

Determination of three-dimensional geometric information in the form of coordinate value of a cylindrical arrangement (Meaning of the step (4)): A sphere shown in FIG. 10(A) is projected onto the plane to transform the image on the sphere into the inside of the "circle". As a projecting method, there are known an isometric solid angle projection, an equidistant projection, an orthogonal projection, etc. ("Problems associated with newest lens design course 23 lens design (1) (by Nakagawa, Photography Industry, 1982)": Section 4.2.2.1, "Report of Sho. 59 Utility Nuclear Electric Power Generation Institution Robot Development Contract Research (Advanced Robot Technology Research Association)"; Section 4.2.2.1, "Report of Sho. 60 Utility Nuclear Electric Power Generation Institution Robot Development Contract Research (Advanced Robot Technology Research Association)". The circles are accumulated taking the normalized time parameter, ${}_nt_c$ as a vertical axis to form the "cylindrical arrangement" as shown in FIG. 10(B). This feature makes the geometric meaning of the step (1) clear. That is, it means that the "normalized time parameter ${}_nt_c$" arbitrarily given by the step (1) designates height coordinates of this cylinder, and in the steps (2) and (3) the sectional circle at that height, or one in which a spherical image shown in FIG. 10(A) is transformed inside the "circle", is drawn. In step (1), the parameter ${}_nt_c$ is arbitrarily given, and thus, as seen from FIG. 10(B), the large circles do not intersect with each other at one point. However, on the sectional circle, in which it's height is equivalent to the true normalized time ${}_nt_{c0}$, the large circles intersect with each other at one point. Thus, it is possible to obtain the normalized time ${}_nt_{c0}$ of a plane in the form of the "height coordinates" of the cylinder, and also to obtain the three-dimensional azimuth $n_s$ in the form of the "intersection coordinates inside a sectional circle" (FIG. 10(B)).

1.4 A Confirmation by a Simulation

It will be shown by a computer simulation that the "algorithm of measuring three-dimensional geometric information of a plane" explained in 1.3.2 and 1.3.3 is correct (FIG. 11). The simulation was carried out in accordance with a flow of an embodiment A-1.

First, there will be described input data. There is a vertical plane right in front of a spherical camera (or an eyeball), and a distance up to the camera center is 3 m. The plane moves in a direction vertical to the plane (that is, a direction parallel with the normal vector $n_{s0}$ of the plane) toward the camera at the velocity 1 m/second. There are eight points on the plane. The "positions $p_0$, $p_1$ on the sphere at the present time and the subsequent time" are observed in the form of input image data. A time difference $\Delta t$ between the present time and the subsequent time is 0.05 second. The position $p_{inf}$ at the infinite time is equivalent to a moving direction v and is located at the center of the visual field. From the above, the time $t_c$ until the camera goes across the plane is 3/1=3 second, and thus the normalized time ${}_nt_{c0}$ is 3/0.05=60. The normal vector $n_{s0}$ of the plane is located at the center of the visual field.

FIG. 11 is an illustration showing a result of a computer simulation in which three-dimensional geometric information of a plane (${}_nt_{c0}$ and $n_{s0}$) is determined from the positions $p_0$, $p_1$ at the present time and the subsequent time and the position $p_{inf}$ after the infinite time elapses in accordance with the above-mentioned algorithm (the compound ratio transformation and the polar transformation). In FIG. 11, there are shown the "sectional circles of cylinder" at the respective normalized time parameters ${}_nt_c$ explained in connection with 1.3.3. Each of the sectional circles is obtained through a projection of the sphere of FIG. 10(A) onto a plane passing through the sphere in accordance with the "equidistant projection (cf. the equation (103c) explained 1.3.3". The lower right is of the sectional circle at time ${}_nt_c$=0 corresponding to the present time, and the respective sectional circles are arranged in such an order that the parameter ${}_nt_c$ is incremented toward ${}_nt_c$=infinity corresponding to the infinite time of the upper left. Next, there will be explained the respective sectional circles. In each of the sectional circles, the position $p_c$, which is computed through the "compound ratio transformation" on the basis of the positions $p_0$, $p_1$ and the parameter ${}_nt_c$, is drawn in the form of a dot. Eight positions $p_c$ associated with eight points on the plane are drawn. Those positions $p_c$ are, as described in 1.3.2, to "predict" the positions wherein the respective points are observed at an arbitrarily time ${}_nt_c\Delta t$. Next, eight large circles, wherein those positions $p_c$ are subjected to the "polar transformation", are drawn.

On the first sectional circle (lower right, ${}_nt_c$=0), those large circles are scattered. As the parameter ${}_nt_c$ is incremented, the large circles are converged, and on the sectional circle (the second circle from the upper of the right) wherein ${}_nt_c$ is 60, those large circles intersect with each other at one point. When the parameter ${}_nt_c$ is further incremented, those large circles are scattered again. In this manner, the large circles intersect with each other at one point only in the height ${}_nt_c$=60. This height ${}_nt_c$ is equivalent to the value 60 of the above-mentioned "normalized time ${}_nt_{c0}$ up to going across a plane". The azimuth of intersecting with one point is in the center of the visual field, and is equivalent to the "normal vector $n_{s0}$ of the plane". From the above-mentioned simulation, it has been confirmed that "algorithm of measuring three-dimensional geometric information of a plane" explained in 1.3.2 and 1.3.3 is correct.

1.5 A Method of Measuring a Normalized Distance ${}_nd_c$ up to Going Across a Plane in a Moving Direction The normalized distance ${}_nd_c$ is one in which the "distance $d_c$ up to going across a plane in a moving direction" (this distance is V $t_c$ in FIG. 8) is normalized with the "moving distance $\Delta x$ from the present time to the subsequent time". The normalized distance ${}_nd_c$ is expressed by the following equation.

$$\begin{aligned} {}_nd_c &= d_c / \Delta x \\ &= V t_c / \Delta x \end{aligned} \tag{17a}$$

The equation (7) is substituted for the equation (17a), and the equation (17a) is modified. Thus, the following expression can be obtained.

$$\begin{aligned} {}_nd_c &= V t_c / (V \Delta t) = t_c / \Delta t \\ &= {}_nt_c \end{aligned} \tag{17b}$$

This shows that the normalized distance ${}_nd_c$ is equivalent to the above-mentioned "normalized time ${}_nt_c$". Therefore, it is possible to measure the normalized distance ${}_nd_c$ using the method (1.3.2) of determining the normalized time ${}_nt_c$ as it is.

1.6 A method in Which it is Acceptable that the Moving Direction v is Unknown

In the above, there is described a method of measuring the three-dimensional azimuth $n_s$ of a plane and the normalized time ${}_nt_c$ up to crossing the plane, under the condition that the moving direction v is known. That is, the "position $p_{inf}$ after the infinite time elapses" is determined from the direction v, then the compound ratio transformation is performed using the position thus determined, and finally the polar transformation is performed, so that the three-dimensional azimuth $n_s$ and the normalized time ${}_nt_c$ are determined.

Here, there is provided a method capable of measuring "the three-dimensional azimuth $n_s$ and the normalized time ${}_nt_c$" even if the moving direction v is unknown. According to this method, even if the moving direction on photography as to an image of an internet, a video, a movie, etc., for instance, is unknown, it is possible to measure the "azimuth and time". Further, in the event that a plane moves, generally, the moving direction is unknown. However, even in such a case, it is possible to measure the "azimuth and time" together with the moving direction v. The outline of the method will be described hereinafter. Assuming that there is a possibility that the moving direction v takes any direction, "a compound ratio transformation and a polar transformation" in 1.3.2 is performed for each of the moving directions to draw a polar line. When the moving direction, wherein the polar lines intersect with each other at one point, is determined, it is a true moving direction $v_0$, and it is possible to determine a three-dimensional azimuth $n_s$ of a plane and a normalized time ${}_nt_c$ in the form of the coordinates of the cross point. This is carried out in the following steps.

(1) Set up arbitrarily a moving direction parameter v.

(2) Give a direction of the parameter v in the form of "position $p_{inf}$ after the infinite time elapses".

(3) Execute the steps (1) to (4) in 1.3.2 so that polar lines for all the normalized time parameters ${}_nt_c$ are drawn inside the cylindrical arrangement (FIG. 10(B)).

(4) The above-mentioned steps (1) to (3) are repeatedly carried out through changing the moving direction parameter v to determine a parameter value $v_0$ wherein a plurality of polar lines drawn in the step (3) intersect with each other at one point. This parameter value is a true moving direction $v_0$. Thus, an azimuth $n_{s0}$ of a plane and a normalized time ${}_nt_{c0}$ up to crossing a plane are obtained in the form of coordinates of the above-mentioned cross point. It is acceptable that a point wherein intensity offers a peak is detected instead of detection of the above-mentioned cross point.

2. A method of Measuring the Normalization Shortest Distance up to a Plane

There is provided a method of measuring a three-dimensional azimuth $n_s$ of a plane and a normalization shortest distance ${}_nd_s$ up to a plane. The normalization shortest distance is one in which the shortest distance $d_s$ up to a plane is normalized with the "moving distance Δx of a camera (or a plane) from the present time to the subsequent time". The normalization shortest distance is expressed by the following equation (19).

$$ {}_nd_s=d_s/\Delta x \quad (19)$$

Between the normalization shortest distance ${}_nd_s$ and the "normalized time ${}_nt_c$ explained in 1", there is a relation as expressed by the following equation (20) where $n_s$ denotes a plane a three-dimensional azimuth of a plane, v denotes a moving direction, and ( ) denotes a scalar product.

$$ {}_nd_s={}_nt_c(n_s\cdot v) \quad (20)$$

The reason will be described using FIG. 12 (FIG. 12 shows a section of a plane wherein a vector $n_s$ of the plane and a moving direction v lie). The "shortest distance $d_c$ up to a plane from the camera center O" is a normal direction component of the "distance V $t_c$ up to going across a plane in the moving direction". Consequently, the following equation consists.

$$ d_s=Vt_c(n_s\cdot v) \quad (21)$$

where V denotes a magnitude of a moving velocity

When both members of the equation (21) is normalized with the moving distance Δx, the following equation is obtained.

$$ \begin{aligned} {}_nd_s &= d_s/\Delta x \quad (22)\\ &= (Vt_c/\Delta x)(n_s\cdot v)\\ &= (Vt_c/(V\Delta t))(n_s\cdot v) \end{aligned} $$

-continued $$ = {}_nt_c(n_s\cdot v) $$

The equation (22) is equivalent to the equation (20). In the modification as referenced above, the following relation between the "time difference Δt between the present time $t_0$ and the subsequent time $t_1$" and the "distance Δx moving during that period of time" is used.

$$ \Delta x=V\Delta t \quad (23)$$

2.1 A Method of Measuring a Normalization Shortest Distance ${}_nd_s$ up to a Plane and a Three-dimensional Azimuth $n_s$ of a Plane A combination of the "relation between ${}_nd_s$ and ${}_nt_c$ (the equation (20))" with the algorithm (the compound ratio transformation and the polar transformation) as mentioned in 1.3.2 makes it possible to measure a three-dimensional azimuth $n_s$ of a plane and a normalization shortest distance ${}_nd_s$ up to a plane.

This will be explained in conjunction with FIG. 13. It is implemented in accordance with the following six steps.

(1) Set up arbitrarily a normalization shortest distance parameter ${}_nd_s$.

(2) Consider a small circle taking a moving direction v as the center, and set up arbitrarily a radius r of the circle (FIG. 13). Determine "three-dimensional azimuth candidates $n_s$ of a plane" on the small circle in accordance with a step (4). In order to implement this step, there is a need to set up the normalized time parameter ${}_nt_c$ to a value determined by the following equation.

$$ {}_nt_c={}_nd_s/\cos(r) \quad (24)$$

The reason why this is to $d_0$ so is as follows. Since the candidates $n_s$ are located on the "small circle having a radius r taking the moving direction v as the center", there is the relation among $n_s$, v and r, as given by the following equation.

$$ \cos(r)=(n_s\cdot v) \quad (25a)$$

Since there is a need that $n_s$ satisfies the equation (20), the equation (25a) is substituted for equation (20). Thus, following equation is obtained.

$$ {}_nd_s={}_nt_c\cos(r) \quad (25b)$$

When this is modified, the equation (24) can be obtained.

(3) With respect to the respective points of an image, determine the positions $p_0$, $p_1$ at the present time and the subsequent time from the image on a camera, respectively, and determine the position $p_{inf}$ after the infinite time elapses from the moving direction v, and substitute those positions and the normalized time parameter ${}_nt_c$ for the equation (14b) or the equation (16b) to perform the compound ratio transformation so that the position $p_c$ is computed.

(4) $p_c$ determined in the step (3) is subjected to the polar transformation to draw a large circle $g_{pc}$ on a sphere. Two cross points ${}_rn_{s+}$, ${}_rn_{s-}$ of the large circle and the small circle in the step (2) are the "three-dimensional azimuth candidates of a planes" (FIG. 13). It will be described later that the cross point is expressed by the equation (29).

(5) The above-mentioned steps (2) to (4) are repeatedly carried out through changing the radius r so as to draw a curved line consisting of the two cross points ${}_rn_{s+}$, ${}_rn_{s-}$ determined in the step (4) (FIG. 13). This curved line becomes, as will be described in 2.2, a "small circle taking $p_0$ as the center". If the normalization shortest distance parameter ${}_nd_s$ given in the step (1) is a true normalization shortest distance ${}_nd_{s0}$, it is possible to determine the normal vector $n_{s0}$ of a plane in the form of the cross point of the curved lines. However, in the step (1), the parameter ${}_nd_s$ is arbitrarily set up and thus generally the curved lines do not cross at one point. Therefore, the curved lines drawn here mean determining candidates for the normal vector $n_s$ of a plane. Incidentally, intensity of the curved line corresponds to "brightness of position $p_0$ in an image", and in the place wherein a plurality of curved lines intersect with each other, intensity of the curved lines is added.

(6) The above-mentioned steps (1) to (5) are repeatedly carried out through changing the normalization shortest distance parameter ${}_nd_s$ to determine a parameter value ${}_nd_{s0}$ wherein a plurality of curved lines drawn in the step (5) intersect with each other at one point. Thus, a "normalization shortest distance ${}_nd_{s0}$ from the camera center O to a plane" is obtained in the form of the parameter value. Further, the azimuth $n_{s0}$ of a plane is obtained in the form of coordinates of the above-mentioned cross point. It is acceptable that a point wherein intensity offers a peak is detected instead of detection of the above-mentioned cross point.

2.2 Another Method of Measuring a Normalization Shortest Distance ${}_nd_s$ up to a Plane and a Three-dimensional Azimuth $n_s$ of a Plane First, it is shown that the curved line drawn in the step (5) of 2.1 is a small circle, and then there will be explained a method of measuring a normalization shortest distance ${}_nd_{s0}$ up to a plane and a three-dimensional azimuth $n_{s0}$ of a plane.

2.2.1 Proof that a Curved Line Becomes a Small Circle

FIG. 14 shows, for the purpose of proof, one in which various parameters are drawn in FIG. 13. The steps (3) to (5) of 2.1 are expressed with following mathematical expression using those parameters, and it will be shown that the curved line of the step (5) of 2.1 is a small circle.

First, the "position $p_c$" described in the step (3) is given by the mathematical expression. That is, the central angle x (FIG. 9) of $p_c$ and $p_{inf}$ is expressed by the following equation through substituting the equation (24) for the equation (16b). Incidentally, while the equation (16b) is used, it is acceptable that the equation (14b), which is equivalent to the equation (16b), is also used for proof.

$$tax(x) = (\sin(a)\sin(a+\tau))/(\cos(a)\sin(a+\tau) - ({}_nd_s/\cos(r))\sin(\tau)) \tag{26}$$

Next, the cross point of the "large circle wherein the position $p_c$ is subjected to the polar transformations" with the "small circle of the step (2)", that is, the three-dimensional azimuth candidates ${}_rn_{s+}$, ${}_rn_{s-}$ of a plane are given by the mathematical expression. When the cosine theorem is applied to the triangle ${}_rn_{s+}$ $p_c$ v, the following equation can be obtained.

$$\begin{aligned}\cos(\pi/2) &= \cos(r)\cos(-x) + \sin(r)\sin(-x)\cos(\pi - ({}_r\alpha_{s+} - \alpha_a)) \\ &= \cos(r)\cos(x) + \sin(r)\sin(x)\cos({}_r\alpha_{s+} - \alpha_a\end{aligned} \tag{27}$$

$\pi/2$ of the equation (27) is owing to the fact that the azimuth candidate point ${}_rn_{s+}$ is located on the "polar line of $p_c$." When the equation (26) is substituted for the equation (27) and x is erased, the following equation can be obtained.

$$\begin{aligned}\cos({}_r\alpha_{s+} - \alpha_a) &= -\cot(r)\cot(x) \\ &= -\cot(r)(\cos(a)\sin(a+\tau) - ({}_nd_s/\cos(r))\sin(\tau))/(\sin(a)\sin(a+\tau)) \\ &= -(\cos(r)\cos(a)\sin(a+\tau) - {}_nd_s\sin(\tau))/(\sin(r)\sin(a)\sin(a+\tau))\end{aligned}$$

Further, when this equation is transferred, the following equation can be obtained.

$$\cos(r)\cos(a) + \sin(r)\sin(a)\cos({}_r\alpha_{s+} - \alpha_a) = {}_nd_s\sin(\tau)/\sin(a+\tau) \tag{28}$$

Longitudinal coordinates points ${}_r\alpha_{s+}$, ${}_r\alpha_{s-}$ of the azimuth candidates points ${}_rn_{s+}$, ${}_rn_{s-}$ of a plane are computed by the following equations through a modification of the equation (28).

$$\begin{aligned}{}_r\alpha_{s+} &= \alpha_a + ({}_r\alpha_{s+} - \alpha_a) \\ &= \alpha_a + \cos^{-1}((({}_nd_s\sin(\tau)/\sin(a+\tau)) - \cos(r)\cos(a))/(\sin(r)\sin(a))) \\ {}_r\alpha_{s-} &= \alpha_a - ({}_r\alpha_{s+} - \alpha_a) \\ &= \alpha_a - \cos^{-1}((({}_nd_s\sin(\tau)/\sin(a+\tau)) - \cos(r)\cos(a))/(\sin(r)\sin(a)))\end{aligned}$$

Accordingly, longitudinal coordinates r of the azimuth candidates points ${}_rn_{s+}$, ${}_rn_{s-}$ of a plane are expressed in the form of the "radius r of the small circle of the step (2)", and the longitudinal coordinates points ${}_r\alpha_{s+}$, ${}_r\alpha_{s-}$ are expressed by the equation (29).

It will be explained on the basis of the above-mentioned preparation that the "curved line consisting of two cross points ${}_rn_{s+}$, ${}_rn_{s-}$" is a small circle taking $p_0$ as its center. The small circle of the radius R taking $p_0$ as its center is expressed by the following equation (30), when the cosine theorem is applied to the triangle ${}_rn_{s+}$ $p_0$ v ("Geometry Dictionary 2 (I. Iwata, Maki Book Shop)", page 72).

$$\cos(r)\cos(a)+\sin(r)\sin(a)\cos({}_r\alpha_{s+}-\alpha_a)=\cos(R) \tag{30}$$

When the equation (30) is compared with the equation (28), it is understood that the equation (28), that is, the "curved line consisting of two cross points ${}_rn_{s+}$, ${}_rn_{s-}$", is the "small circle taking $p_0$ as its center wherein the radius R is expressed by the following equation".

$$R=\cos^{-1}({}_nd_s\ \sin(\tau)/\sin(a+\tau)) \tag{31}$$

Thus, it is shown that the curved line consisting of two cross points ${}_rn_{s+}$, ${}_rn_{s-}$ shown in FIG. 14 (that is, the equation (28)) is the "small circle of the radius R taking $p_0$ as its center". This implies that it is possible to transfer an arbitrary point $p_0$ to the small circle. This transformation is referred to as a "small circle transformation". Here, the equation (31) may be expressed with a position $p_0$ at the present time, a position $p_1$ at the subsequent time, and a position $p_{inf}$ after the infinite time elapses. When $\tau$ and a+$\tau$ are expressed by the central angle of the equation (15), the equation (31) is given by the following equation.

$$R=\cos^{-1}({}_nd_s\ \sin(p_0p_1)/\sin(p_{inf}p_1)) \tag{32}$$

The equation (31) expresses the radius R using motion parallax $\tau$. However, in the event that the position $p_1$ at the subsequent time is known, the radius R is given by the following equation through substituting the equation (13) for the equation (32).

$$R=\cos^{-1}({}_nd_s\,\sin(b-a)/\sin(b)) \tag{33}$$

2.2.2 Geometric Meaning of the Small Circle Transformation (1) Geometric meaning of the radius R When the equation (32) is modified using the equation (4), the following equation can be obtained.

$$R=\cos^{-1}({}_nd_s/(d_0/\Delta x)) \tag{34a}$$

Further, the equation (34a) is modified through substituting the equation (19), the following equation can be obtained.

$$\begin{aligned} R &= \cos^{-1}((d_s/\Delta x)/(d_0/\Delta x)) \\ &= \cos^{-1}(d_s/d_0) \end{aligned} \tag{34b}$$

Next, the geometric meaning of the radius R will be explained in conjunction with FIG. 15. The radius R determined by the equation (34b) indicates a necessary condition for the existence of a plane passing the "point $p_0$ located at the distance $d_0$ from the camera center O" wherein the shortest distance is given by $d_s$. That is, the radius R determined by the equation (34b) indicates that the azimuth $n_s$ has to be inclined from the direction $p_0$ of the point by the "angle R determined by the equation (34b)" for existence of the plane.

There are a lot of such "plane passing the point $p_0$ wherein the shortest distance is given by $d_s$" taking $p_0$ as a rotary axis. When all the feet of perpendicular of those planes are drawn, there is formed a base of the "right circular cone (length of an edge: $d_s$, dihedral angle: 2R) taking the camera center O as a vertex" shown in FIG. 16. The line of intersection of the edge of the right circular cone with the "unit sphere taking O as its center" forms a small circle. The small circle transformation described in 2.2.1 implies that the "direction $p_0$ of the point" is transformed to the small circle thus formed.

Incidentally, the equation (34b) can be expressed in the form of the equation (35) using the "normalization shortest distance ${}_nd_s$ of a plane" and the "normalization shortest distance ${}_nd_0$ of a point" defined by the equation (36).

$$R=\cos^{-1}({}_nd_s/{}_nd_0) \tag{35}$$

$${}_nd_0=d_0/\Delta x \tag{36}$$

Further, the equation (34b) can be also expressed in the form of the following equation (37) through substituting the equation (6) for the equation (34a).

$$R=\cos^{-1}({}_nd_s/(p_{inf}p_0p_1)) \tag{37}$$

(2) Geometric meaning of the small circle transformation

From the above-mentioned consideration, it would be understood that the small circle transformation on the sphere in 2.2.1 is equivalent to the subsequent transformation in the three-dimensional space. In other words, it is equivalent to the transformation of the "point $p_0$ in the space (direction $p_0$, distance $d_0$)" to the circumference of the right circular cone shown in FIG. 16, that is, the normal vector group $\{n_s\}$ of the "whole plane passing through $p_0$ wherein the shortest distance from the camera center O is given by $d_s$". This is the geometric meaning of the small circle transformation.

2.2.3 Another Method of Measuring a Normalization Shortest Distance ${}_nd_s$ up to a Plane and a Three-dimensional Azimuth $n_s$ of a Plane There will be explained a method of measuring a normalization shortest distance ${}_nd_s$ up to a plane and a three-dimensional azimuth $n_s$ of a plane using the "small circle transformation" explained in 2.2.2. It is implemented in accordance with the following four steps.

(1) Set up arbitrarily a normalization shortest distance parameter ${}_nd_s$.

(2) With respect to the respective points of an image, determine the positions $p_0$, $p_1$ at the present time and the subsequent time from the image on a camera, respectively, and determine the position $p_{inf}$ after the infinite time elapses from the moving direction v, and compute the radius R of a small circle transformation in accordance with the equation (32).

(3) The respective points $p_0$ are subjected to the small circle transformation to draw on a sphere a small circle of the radius R taking $p_0$ as its center. Here there will be explained the meaning of drawing the small circle. If the normalization shortest distance parameter ${}_nd_s$ given in the step (1) is a true normalization shortest distance ${}_nd_{s0}$, it is possible to determine the normal vector $n_{s0}$ of a plane in the form of the cross point of the small circles. However, in the step (1), the parameter ${}_nd_s$ is arbitrarily set up and thus generally the small circles do not intersect with each other at one point. Therefore, the small circles drawn here mean determining candidates for the normal vector $n_s$ of a plane. Incidentally, intensity of the small circle corresponds to "brightness of position $p_0$ in an image", and in the place wherein a plurality of small circles intersect with each other, intensity of the small circles is added.

(4) The above-mentioned steps (1) to (3) are repeatedly carried out through changing the normalization shortest distance parameter ${}_nd_s$ to determine a parameter value ${}_nd_{s0}$ wherein a plurality of small circles drawn in the step (3) intersect with each other at one point. Thus, a "normalization shortest distance ${}_nd_{s0}$ from the camera center O to a plane" is obtained in the form of the parameter value. Further, the azimuth $n_{s0}$ of a plane is obtained in the form of coordinates of the above-mentioned cross point. It is acceptable that a point wherein intensity offers a peak is detected instead of detection of the above-mentioned cross point.

Here, there will be described the above-mentioned small circle transformation method on a geometric basis in reference to FIG. 17. With respect to the respective points of an image, determine the positions $p_0$, $p_1$ at the present time and the subsequent time from the image on a camera, respectively, and determine the position $p_{inf}$ after the infinite time elapses from the moving direction v, and give the normalization shortest distance parameter ${}_nd_s$ in the step (1). Those are substituted for the equation (32) to determine the radius R, so that the small circle transformation is performed as shown in FIG. 17(A). That is, the small circle of the radius R is drawn on the sphere taking $p_0$ as its center. Next, the sphere shown in FIG. 17(A) is projected onto a plane in a similar fashion to that of the step (4) in 1.3.3, so that an image on the sphere is transformed inside the "circle". The circles are accumulated taking the normalization shortest distance parameter ${}_nd_s$ as a vertical axis to form the "cylindrical arrangement" as shown in FIG. 17(B).

It means that the normalization shortest distance parameter ${}_nd_s$ arbitrarily given by the step (1) designates height coordinates of this cylinder, and in the steps (2) and (3) the sectional circle at that height, or one in which a spherical image is transformed inside the "circle", is drawn. In step (1), the parameter ${}_nd_s$ is arbitrarily given, and thus, as seen from FIG. 17(B), the small circles do not intersect with each other at one point. However, on the sectional circle, in which it's height is equivalent to the true normalization shortest distance ${}_nd_{s0}$, the small circles intersect with each other at one point. Thus, it is possible to obtain the normalization shortest distance ${}_nd_{s0}$ of a plane in the form of the "height coordinates" of the cylinder, and also to obtain the three-dimensional azimuth $n_s$ in the form of the "intersection coordinates inside a sectional circle".

Now, let us consider a range and properties of the parameter ${}_nd_s$ wherein the small circle transformation is formed. The small circle transformation is formed on the following condition. That is, in the equation (35), $$\cos(R)|\leqq 1, \text{ that is,}$$

$$|{}_nd_s|\leqq|{}_nd_0| \tag{38}$$

In this range, the radius R varies in accordance with the parameter ${}_nd_s$ as follows. At ${}_nd_s=0$, the radius R of the small circle is $\pi/2$ (large circle). As $|{}_nd_s$ becomes larger, the radius R becomes smaller. At $|{}_nd_s|\leqq|{}_nd_0|$, the radius R becomes zero. "${}_nd_s$ wherein the radius R becomes zero" corresponds to the "plane passing through the point $p_0$ and perpendicularly intersecting with the vector $\mathbf{0}p_0$" in FIG. 15.

In accordance with the above-mentioned consideration, there will be described as to how an arbitrary point $p_0$ in an image is subjected to the small circle transformation in a geometric figure in the cylindrical arrangement with reference to FIG. 17(C). The center of the small circle to be transformed is located at $p_0$ regardless of the height ${}_nd_s$, and the radius R varies as described above. Thus, the point $p_0$ is subjected to the small circle transformation onto a surface of the "solid like a spheroid". The vertex is denoted by ${}_nd_0$, and the axis of rotation is denoted by $p_0$ When a plurality of points exist in an image, "spheroid surfaces" wherein the plurality of points are subjected to the small circle transformation are intersect with each other at one point, so that the three-dimensional azimuth $n_{s0}$ of a plane and a normalization shortest distance ${}_nd_{s0}$ can be obtained in the form of coordinates of the cross point. Incidentally, in FIG. 17(C), the "spheroid", wherein $p_0$ is located at the center of the cylinder, is drawn. On the other hand, in the event that $p_0$ is located out of the center of the cylinder, the spheroid is out of the cylinder. It is acceptable that this portion can be omitted in drawing.

2.3 A confirmation by a Simulation

It will be shown by a computer simulation that the "algorithm of measuring three-dimensional geometric information of a plane" explained in 2.2.3 is correct (FIG. 18). The simulation was carried out in accordance with a flow of an embodiment A-3.

First, there will be described input data. There is a vertical plane right in front of a spherical camera (or an eyeball), and a distance up to the camera center O is 3 m. The plane moves in a direction vertical to the plane (that is, a direction parallel with the normal vector $n_{s0}$ of the plane) toward the camera at the velocity 1 m/second. There are eight points on the plane. The "positions $p_0$, $p_1$ on the sphere at the present time and the subsequent time" are observed in the form of input image data. A time difference $\Delta t$ between the present time and the subsequent time is 0.05 second. Therefore, a moving distance $\Delta x$ from the present time to the subsequent time is $0.05\times1=0.05$ m. The position $p_{inf}$ at the infinite time is equivalent to a moving direction v and is located at the center of the visual field. From the above, the normalization shortest distance ${}_nd_{s0}$ of the plane is $3/0.05=60$. The normal vector $n_{s0}$ of the plane is located at the center of the visual field.

FIG. 18 is an illustration showing a result of a computer simulation in which three-dimensional geometric information of a plane (${}_nd_{s0}$ and $n_{s0}$) is determined from the positions $p_0$, $p_1$ at the present time and the subsequent time and the position $p_{inf}$ after the infinite time elapses in accordance with the small circle transformation algorithm described in 2.2.3. In FIG. 18, there are shown the "sectional circles of cylinders at the respective normalization shortest distance parameters ${}_nd_s$" explained in connection with FIG. 17(B). Each of the sectional circles is obtained through a projection of the sphere of FIG. 17(A) onto a plane passing through the sphere in accordance with the "equidistant projection (cf. the equation (107c) explained 1.3.3". The lower right is of the sectional circle at ${}_nd_s=0$, and the respective sectional circles are arranged in such an order that the parameter ${}_nd_s$ is incremented toward the upper left. Next, there will be explained the respective sectional circles. In each of the sectional circles, the position $p_0$ at the present time is drawn in the form of a dot. Eight "small circles each having the radius R computed in accordance with the equation (32)" are drawn in association with eight points on the plane taking $p_0$ as their centers.

On the first sectional circle (lower right, ${}_nd_s=0$), those small circles are scattered. As the parameter ${}_nd_s$ is incremented, the small circles are converged, and on the sectional circle (the second circle from the upper of the right) wherein ${}_nd_s$ is 60, those small circles intersect with each other at one point. When the parameter ${}_nd_s$ is further incremented, those small circles are scattered again. In this manner, the small circles intersect with each other at one point only in the height ${}_nd_s=60$. This height ${}_nd_s$ is equivalent to the value 60 of the above-mentioned "normalized time ${}_nd_{s0}$ up to going across a plane". The azimuth of intersecting with one point is in the center of the visual field, and is equivalent to the "normal vector $n_{s0}$ of the plane". From the above-mentioned simulation, it has been confirmed that the "small circle transformation algorithm" explained in 2.2.3 is correct. Incidentally, it has been confirmed through the simulation that the three-dimensional geometric information of a plane can be accurately determined in accordance with the method in 2.1 too.

2.4 A method in Which it is Acceptable That the Moving Direction v is Unknown

In 2.1 and 2.2.3, there is described a method of measuring the three-dimensional azimuth $n_s$ of a plane and the normalization shortest distance ${}_nd_s$, under the condition that the moving direction v is known. Here, there is provided a method capable of measuring the azimuth and the distance even if the moving direction v is unknown. This method is similar to that of 1.6. According to this method, even if the moving direction on photography as to an image of an internet, a video, a movie, etc., for instance, is unknown, it is possible to measure the "azimuth and distance". Further, in the event that a plane moves, generally, the moving direction is unknown. However, even in such a case, it is possible to measure the "azimuth and distance" together with the moving direction v. The outline of the method will be described with respect to 2.2.3 (also 2.1). Assuming that there is a possibility that the moving direction v takes any direction, "a small circle transformation" in 2.2.3 is performed for each of the moving directions to draw a small circle. When the moving direction, wherein the small circles intersect with each other at one point, is determined, it is a true moving direction $v_0$, and it is possible to determine a three-dimensional azimuth $n_s$ of a plane and a normalization shortest distance ${}_nd_s$ in the form of the coordinates of the cross point. This is carried out in the following steps.

(1) Set up arbitrarily a moving direction parameter v.

(2) Give a direction of the parameter v in the form of position $p_{inf}$ after the infinite time elapses". (3) Execute the steps (1) to (4) in 2.2.3 so that small circles for all the normalization shortest distance parameter $_nd_s$ are drawn inside the cylindrical arrangement (FIG. 17(B)).

(4) The above-mentioned steps (1) to (3) are repeatedly carried out through changing the moving direction parameter v to determine a parameter value $v_0$ wherein a plurality of small circles drawn in the step (3) intersect with each other at one point. This parameter value is a true moving direction $v_0$. Thus, an azimuth $n_{s0}$ of a plane and a normalization shortest distance $_nd_{s0}$ are obtained in the form of coordinates of the above-mentioned cross point. It is acceptable that a point wherein intensity offers a peak is detected instead of detection of the above-mentioned cross point.

3. Generalization

3.1 Planar Movement and Camera Movement

While the above description explains a case where a plane moves, also in the event that a camera moves, it is possible to measure three-dimensional geometric information of a plane in accordance with the same algorithm. The planar movement and the camera movement are relative movement. Accordingly, when the moving direction v is reversed, they are involved in the same algorithm. The equivalence will be explained with reference to FIGS. 19(A) and 19(B).

FIG. 19(B) shows a case where a plane moves in a direction v. A point on the plane also moves in the space to $p_0$, $p_1$ as the plane moves. The positions $p_0$, $p_1$ on the sphere at the respective times (FIG. 8) are determined through an observation in the form of angles $\alpha_0$, $\alpha_1$ looking from the camera center O, respectively. The position $p_{inf}$ on the sphere after the infinite time elapses is equivalent to the moving direction v of the plane. From these three positions $p_0$, $p_1$, $p_{inf}$ on the sphere, the "position $p_c$ on the sphere at the time wherein the plane goes across the camera center" is predicted through the compound ratio transformation, and then the position $p_c$ is subjected to the polar transformation so that the three-dimensional geometric information (a three-dimensional azimuth $n_s$, a normalized time $_nt_c$ up to crossing, and a normalization shortest distance $_nd_s$) of a plane can be measured. This is described in 1.3.2 and 2.2.3. Incidentally, $t_c$, $\Delta t$, $\Delta x$, V denote a time up to going across the plane, a time difference between the present time and the subsequent time, a moving distance up to the subsequent time, and a magnitude of a moving velocity, respectively.

On the other hand, FIG. 19(A) shows a case where a camera moves. When the camera center moves, looking a point on the plane, to $O_0$, $O_1$, $O_c$ in the named order, the point on the plane is observed in the form of angles $\alpha_0$, $\alpha_1$, $\alpha_c$ looking from the camera center, so that the positions $p_0$, $p_1$, $p_c$ on the sphere are determined. The position $p_{inf}$ on the sphere after the infinite time elapses is equivalent to the moving direction v of the plane. When FIG. 19(A) is modified in such a manner that those positions $p_0$, $p_1$, $p_c$, $p_{inf}$ are drawn on the sphere, the modified figure is the same as the "figure (FIG. 19(B)) in a case where a plane moves" but a matter that the moving direction is opposite. Thus, also in the event that the camera moves, simply reversing the moving direction makes it possible to determine the three-dimensional geometric information of a plane using the above-mentioned "algorithm (1.3.2, 2.1, and 2.2.3) wherein a plane moves". Likely, also in the measurement of a point distance in a case where a camera moves, it is possible to measure the point distance using the "algorithm (equation (6)) wherein a plane moves".

3.2 Voting to Cylindrical Arrangement

In FIG. 10(B), the "curved line wherein a large circle on a sphere is projected onto a plane" is "drawn" on each of the sectional circles of the cylinder. Instead of such a drawing, it is acceptable that the respective sectional circles are arranged in the form of a memory arrangement or a register arrangement, and a voting is made for memory or register associated with the curved line.

In FIG. 17(B), the "curved line wherein a small circle on a sphere is projected onto a plane" is "drawn" on each of the sectional circles of the cylinder. Instead of such a drawing, it is acceptable that the respective sectional circles are arranged in the form of a memory arrangement or a register arrangement, and a voting is made for memory or register associated with the curved line.

3.3 Polar Transformation on a Plane

First, there will be explained the general definition of a polar transformation (or a duality transformation) with reference to FIG. 20. Let us consider an arbitrary vector a and a "plane π passing through a center O wherein the vector a is given as a normal vector". A transformation from the vector a to the plane π is the "polar transformation (or a duality transformation)" in the broad sense. In order to express this vector and the plane on a two-dimensional basis, there is used a cross point or a line of intersection with the sphere or the plane.

In case of the sphere, when the cross point with the vector a and the line of intersection with the plane π are denoted by $a_{sphere}$ and g, respectively, $a_{sphere}$ and g are pole and polar line of the sphere, respectively. The transformation from the pole $a_{sphere}$ to the polar line g is the "polar transformation on the sphere". On the other hand, in case of the plane, when the cross point with the vector a and the line of intersection (or straight line) with the plane π are denoted by $a_{plane}$ and 1, respectively, a plane and 1 are pole and polar line on the plane, respectively. The transformation from the pole a plane to the polar line 1 is the "polar transformation on the plane".

In 1.3.2(3), the polar line, wherein $p_c$ is subjected to the polar transformation, is drawn in the form of the "large circle on the sphere". In accordance with the above-mentioned explanation, it is acceptable that such a polar line is drawn in the form of the "straight line on the plane".

Further, in 2.1(5), 2.2.3(3), the small circle, wherein $p_c$ is subjected to the small circle transformation, is drawn on "the sphere". It is acceptable that such a small circle is drawn in the form of the ellipse through projection of the small circle from the camera center onto the "arbitrary plane".

3.4. A Method of Measuring the Normalized Distance $_nd_0$ up to a Point

It will be shown with reference to FIG. 7 that the normalized distance $_nd_0$ up to a point can be measured through determination of the positions on the sphere: $p_0$, $p_1$, at the present time and the subsequent time, respectively, and the position on the sphere: $p_{inf}$ after the infinite time elapses. The normalized distance $_nd_0$ is a distance in which a distance $d_0$ up to a point, that is, a distance from the camera center O in FIG. 7 to the point $p_0$, is normalized with the moving distance $\Delta x$ of a camera (or a plane) from the present time to the subsequent time. The measurement method will be explained hereinafter.

It has been described in 1.2 that the distance $d_0$ up to a point can be measured in accordance with the equation (6) using the above-mentioned three positions $p_0$, $p_1$, $p_{inf}$. When the both sides of the equation (6) are normalized with camera moving distance, the normalized distance is expressed by the following equation (39a).

$$
\begin{aligned}
{}_n d_0 &= d_0/\Delta x \quad (39a)\\
&= (p_{inf}\, p_0\, p_1)
\end{aligned}
$$

Accordingly, it is shown that the normalized distance ${}_n d_0$ can be measured in the form of the simple ratio $(p_{inf} p_0 p_1)$ When the equation (13) (or equation (15)) is substituted for the equation (39a), and it is expressed with the central angle, then the following equation can be obtained.

$$ {}_n d_0 = \sin(b)/\sin(b-a) \quad (39b) $$

$$ = \sin(a+\tau)/\sin(\tau) \quad (39c) $$

3.5 Planer Camera

While the above-mentioned explanation has been made wherein an image on a spherical camera (or an eyeball) is used, it is possible also to use an image on a planer camera (FIG. 21). In such a case, it is effective that the image (a triangle of white circles) photographed by the planer camera is transformed to the image on the sphere (a triangle of black circles), and the above-mentioned "algorithm on the sphere" is carried out.

4. A Method of Measuring Three-dimensional Geometric Information from a Stereo Image An alteration of the parameter name of the above-mentioned movement vision algorithm, that is, an algorithm wherein a camera (or a plane) is moved to measure three-dimensional geometric information of a plane, to a name of binocular vision makes it possible to measure three-dimensional geometric information from the stereo image. That is, when the position $p_0$ at the present time, the position $p_1$ at the subsequent time, and the position $p_1$, $p_{inf}$ after the infinite time elapses, on the movement vision algorithm are replaced by the position $p_R$ on an image on a right camera, the position $p_L$ on an image on a left camera, and the "position $p_{axis}$ on an optical axis coupling between the right camera and the left camera", it is possible to determine from the stereo image, using the algorithm, (i) a three-dimensional azimuth $n_s$ of a plane, (ii) a normalized distance ${}_n d_s$ up to going across a plane in an optical axis, (iii) a normalization shortest distance ${}_n d_s$ up to a plane, and (iv) a normalized distance ${}_n d_0$ up to a point. There will be described a method of measuring the azimuth and the distance hereinafter. Here, the normalized distance ${}_n d_c$ up to going across a plane in an optical axis, the normalization shortest distance ${}_n d_s$ up to a plane, and the normalized distance ${}_n d_0$ up to a point are ones wherein "a distance $d_c$ from the right camera up to going across a plane in an optical axis", "a shortest distance $d_s$ from the right camera up to a plane", and "a distance $d_0$ from the right camera up to a point" are normalized with a distance $\Delta X_{RL}$ between the right camera and the left camera (cf. FIGS. 22(A) and (B)). Those distances are expressed by the following equations. Incidentally, it is acceptable that the right camera and the left camera are exchanged one another.

$$ {}_n d_c = d_c/\Delta X_{LR} \quad (50) $$

$$ {}_n d_s = d_s/\Delta X_{LR} \quad (51) $$

$$ {}_n d_0 = d_0/\Delta X_{LR} \quad (52) $$

4.1 Association with Movement Vision

The parameter (cf. FIGS. 22(A) and (B)) of the binocular vision is associated with the parameter (cf. FIGS. 19(A) and (B)) in the following manner.

FIG. 22(A) shows a state that the "point P on a plane" is observed through both eyes. Angles $\alpha_L$, $\alpha_R$ of a point P looking from the centers $O_L$, $O_R$ of the left camera and the right camera are observed so that the positions $p_L$, $p_R$ on the spheres are determined. A position $p_{axis}$, on the optical axis coupling the left camera with the right camera, which corresponds to the position $p_{inf}$ (e.g. FIG. 19(B) after the infinite time elapses, is equivalent to an optical axis direction $a_{xis}$. $O_c$ denotes a position of the camera center wherein it is considered that the right camera moves up to going across a plane in the optical axis direction. Angle $\alpha_c$ of the point P looking from $O_c$ is observed so that the position $p_c$ on the sphere is determined.

As FIG. 22(A) is compared with FIG. 19(A), both the figures are completely the same as each other but names. That is, in FIG. 19(A), when the position $p_0$ at the present time, the position $p_1$ at the subsequent time, the position $p_{inf}$ after the infinite time elapses, the unit moving distance $\Delta x$, and the distance V $t_c$ up to going across a plane in a moving direction are replaced by the position $p_R$ on an image on the right camera, the position $p_L$ on an image on the left camera, the position $p_{axis}$ on the optical axis, the distance $\Delta X_{RL}$ between the right camera and the left camera, and the distance $d_c$ up to going across the plane in the optical axis, respectively, FIG. 19(A) is equivalent to FIG. 22(A). FIG. 22(B) is one modified from FIG. 22(A) in such a manner that four positions $p_R$, $p_L$, $p_c$, $p_{axis}$ are superposed on the "sphere taking $O_c$ as the center" in FIG. 22(A). When those four positions are replaced by $p_0$, $p_1$, $p_c$, $p_{inf}$ in the movement vision", FIG. 19(B) is equivalent to FIG. 22(B).

As described above, the geometric relation between the movement vision and the stereo vision is completely the same as one another when the names of the parameters are exchanged. Thus, it would be understood that an alteration of the names of the parameters of the above-mentioned movement vision algorithm (1.3.2, 2.1, 2.2.3) makes it possible to measure three-dimensional geometric information of a plane through the stereo image in accordance with the same algorithm.

4.2 A method of Measuring a Three-dimensional Azimuth $n_s$ of a Plane and "a Normalized Distance ${}_n d_c$ up to Going Across a Plane in an Optical Axis Direction"

It is possible to measure a three-dimensional azimuth $n_s$ of a plane and "a normalized distance ${}_n d_c$ up to going across a plane in an optical axis direction" in accordance with the procedure similar to the movement vision algorithm (1.2, 1.3).

4.2.1 Expression of the Normalized Distance ${}_n d_c$ by the Compound Ratio $\{p_{axis} p_R p_L p_c\}$ In FIG. 22(B), when the sine theorem is applied to the triangle $p_R p_L O_c$, between the distance $d_0$ from $O_c$ to the point $p_R$ and the distance $\Delta X_{LR}$ between the left camera and the right camera, there is a following relation.

$$ \Delta X_{LR}/\sin(\alpha_L-\alpha_R)=d_0/\sin(\pi-\alpha_L) \quad (53a) $$

When this is expressed with the positions $p_L$, $p_R$, $p_{axis}$ on a sphere, the following equation can be obtained.

$$ \Delta X_{LR}/\sin(p_R p_L)=-d_0/\sin(p_{axis} p_L) \quad (53b) $$

When this is modified, the distance $d_0$ can be determined in accordance with the following equation.

$$d_0 = -\Delta x_{LR}\sin(p_{axis}p_L)/\sin(p_Rp_L) \quad (54a)$$

$$= -\Delta x_{LR}(p_{axis}p_Rp_L) \quad (54b)$$

When the sine theorem is applied to the triangle $p_Rp_LO_c$, and the similar modification is made, the distance $d_0$ can be determined in accordance with the following equation.

$$d_0 = -d_c\sin(p_{axis}p_c)/\sin(p_Rp_c) \quad (55a)$$

$$= -d_c(p_{axis}p_Rp_c) \quad (55b)$$

When the ratio of the equation (54) to the equation (55) is given and then rearranged, the normalized distance ${}_nd_c$ is determined in the form of the compound ratio $\{p_{axis}p_Rp_Lp_c\}$ in accordance with the following equation $${}_nd_c = d_c/\Delta x_{LR} \quad (56a)$$

$$= (\sin(p_{axis}p_L)/\sin(p_Rp_L))/(\sin(p_{axis}p_c)/\sin(p_Rp_c))$$

$$= \{p_{axis}p_Rp_Lp_c\} \quad (56b)$$

Incidentally, the equation (56b) is equivalent to one wherein in the equation (12a) the "movement vision parameters ${}_nt_c$, $p_{inf}$, $p_0$, $p_1$, $p_c$" are replaced by the "binocular vision parameters ${}_nd_c$, $p_{axis}$, $p_R$, $p_L$, $p_c$", respectively.

4.2.2 Compound Ratio Transformation

The compound ratio transformation is a transformation in which four variables ${}_nd_c$, $p_R$, $p_L$, $p_{axis}$ are determined, and the remaining variable $p_c$ is computed using the equation (56). This corresponds to the compound ratio transformation (1.3.1) in case of the movement vision.

This compound ratio transformation will be shown by the mathematical expression. FIG. 23 shows one in which a cross section of the sphere shown in FIG. 22(B) is picked up. The positions $p_R$, $p_L$, $p_c$ are indicated with the central angles c, d, x, taking $p_{axis}$ as the basic point (it is acceptable that this basic point is selected at an arbitrary position). Those central angles are as follows:

$$p_{axis}p_R=C \quad (57)$$

$$p_{axis}p_L=d \quad (57)$$

$$p_{axis}p_c=x \quad (57)$$

$$p_Rp_L=d-c \quad (57)$$

$$p_Rp_c=x-c \quad (57)$$

The compound ratio transformation will be shown by the mathematical expression using those central angles. When the right-hand member of the equation (56a), that is, the compound ratio, is expressed using the central angles, the following equation can be obtained.

$${}_nd_c=(\sin(d)/\sin(d-c))/(\sin(x)/\sin(x-c)) \quad (58a)$$

When this is modified, the central angle x between $p_c$ and $p_{axis}$ are given by the following expression.

$$x=\tan((\sin(c)\sin(d))/(\cos(c)\sin(d)-{}_nd_c\sin(d-c))) \quad (58b)$$

Accordingly, when the normalized distance ${}_nd_c$ and "three positions $p_R$, $p_L$, $p_{axis}$, on the sphere" are given, "the position $p_c$ at the time where the right camera goes across the plane (FIG. 22(B))" may be computed in accordance with the equation (56a). This is the mathematical expression of the compound ratio transformation. Incidentally, the equation (58b) is equivalent to one wherein in the equation (14b) the parameters of the movement vision (the normalized time ${}_nt_c$ and the central angles $p_{inf}p_0$, $p_{inf}p_1$, $p_0p_1$, $p_{inf}p_c$) are replaced by the parameters of the binocular vision (the normalized distance ${}_nd_c$ and the central angles $p_{axis}p_R$, $p_{axis}p_L$, $p_Rp_L$, $p_{axis}p_c$), that is, the parameters of the movement vision (the normalized time ${}_nt_c$ and the positions on the sphere $p_{inf}$, $p_0$, $p_1$, $p_c$) are replaced by the parameters of the binocular vision (the normalized distance ${}_nd_c$ and the central angles $p_{axis}$, $p_R$, $p_L$, $p_c$)

Here, according to the study of the general image stereo image processing, it often happens that "the variable component $p_L-p_R$ from the right camera (that is, the binocular parallax σ, represented by the central angle $p_R-p_L$)" is dealt with, instead of "the position $p_L$ of the left camera". In this case, the mathematical expression of the compound ratio transformation will be set forth below. The various sorts of central angles are given as follows:

$$p_{axis}p_R=c \quad (59)$$

$$p_Rp_L=\sigma \quad (59)$$

$$p_{axis}p_c=x \quad (59)$$

$$p_{axis}p_L=c+\sigma \quad (59)$$

$$p_Rp_c=x-c \quad (59)$$

When the right-hand member of the equation (56a) is expressed using the central angles of the equation (59), the following expression can be obtained.

$${}_nd_c=(\sin(c+\sigma)/\sin(\sigma))/(\sin(x)/\sin(x-c)) \quad (60a)$$

When this is modified, the central angle X between $p_c$ and $p_{inf}$ is given by the following expression.

$$x=\tan^{-1}((\sin(c)\sin(c+\sigma))/(\cos(c)\sin(c+\sigma)-{}_nd_c\sin(\sigma))) \quad (60b)$$

Thus, an alternative mathematical expression for the compound ratio transformation is obtained. Incidentally, the equation (60b) is equivalent to one wherein in the equation (16b) the parameters of the movement vision (the normalized time ${}_nt_c$ and the central angles $p_{inf}p_0$, $p_{inf}p_1$, $p_0p_1$, $p_{inf}p_c$) are replaced by the parameters of the binocular vision (the normalized distance ${}_nd_c$ and the central angles $p_{axis}p_R$, $p_{axis}p_L$, $p_Rp_L$, $p_{axis}p_c$) that is, the parameters of the movement vision (the normalized time ${}_nt_c$ and the positions on the sphere $p_{inf}$, $p_0$, $p_1$, $p_c$) are replaced by the parameters of the binocular vision (the normalized distance ${}_nd_c$ and the positions on the sphere $p_{axis}$, $p_R$, $p_L$, $p_c$).

4.2.3 A method of Determining a Three-dimensional Azimuth $n_s$ of a Plane and a Normalized Distance ${}_nd_c$ There will be explained a method of determining a three-dimensional azimuth $n_s$ of a plane and a normalized distance ${}_nd_c$. This is performed in a similar fashion to that of the case of the movement vision (1.3.2). It is performed in the following four steps.

(1) Set up arbitrarily a normalized distance parameter ${}_nd_c$.

(2) With respect to the respective points of an image, determine the positions $p_L$, $p_R$ at the left camera and the right camera from images on the cameras, respectively, and determine the position $p_{axis}$ on the optical axis from the optical axis direction $a_{xis}$, and substitute those positions for the equation (58b) or the equation (60b) to perform the compound ratio transformation so that the position $p_c$ is computed.

(3) Determine candidates for the normal vector $n_s$ of a plane in accordance with "the principles of measuring a three-dimensional azimuth $n_s$ of a plane" of 1.1. That is, $p_c$ determined in the step (2) is subjected to the polar transformation to draw large circles on a sphere. Here there will be explained the meaning of drawing the large circles. If the normalized distance parameter $_nd_c$ given in the step (1) is a true normalized distance $_nd_{c0}$, as described in connection with FIG. 5, it is possible to determine the normal vector $n_{s0}$ of a plane in the form of the cross point of the large circles. However, in the step (1), the parameter $_nd_c$ is arbitrarily set up and thus generally the large circles do not intersect with each other at one point. Therefore, the large circles drawn here mean determining candidates for the normal vector $n_s$ of a plane. Incidentally, intensity of the large circle corresponds to "brightness of position $p_R$ in an image", and in the place wherein a plurality of large circles intersect with each other, intensity of the large circles is added.

(4) The above-mentioned steps (1) to (3) are repeatedly carried out through changing the normalized distance parameter $_nd_c$ to determine a parameter value $_nd_{c0}$ wherein a plurality of large circles drawn in the step (3) intersect with each other at one point. Thus, a "normalized distance $_ndc_0$ up to crossing a plane in the optical axis direction" is obtained in the form of the parameter value. Further, the azimuth $n_{s0}$ of a plane is obtained in the form of coordinates of the above-mentioned cross point. It is acceptable that a point wherein intensity offers a peak is detected instead of detection of the above-mentioned cross point.

Incidentally, this method is equivalent to one wherein in 1.3.2 the movement vision parameters (the normalized time $_nt_c$, and the positions on the sphere $p_{inf}$, $p_0$, p1) are replaced by the binocular vision parameters (the normalized distance $_nd_c$, and the positions on the sphere $p_{axis}$, $p_R$, $p_L$), respectively.

4.2.4 Geometric Meaning of the Above-mentioned Steps

Geometric meaning of the above-mentioned steps will be explained in conjunction with FIGS. 24(A) and 24(B). In the "geometric meaning in the case of the movement vision" mentioned in 1.3.3, the movement vision parameters are replaced by the binocular vision parameters.

Drawing of a can did ate group $\{n_s\}$ of a planer azimuth (the step (3)): The position $p_c$ which is determined through the compound ratio transformation in the step (2), is subjected to the polar transformation to draw on a sphere a large circle or a candidate group $\{n_s\}$ of a planer azimuth as shown in FIG. 24(A).

Determination of three-dimensional geometric information in the form of coordinate value of a cylindrical arrangement (Meaning of the step (4)): A sphere shown in FIG. 24(A) is projected onto the plane, in a similar fashion to that of the step (4) of 1.3.3, so as to transform the image on the sphere into the inside of the "circle". The circles are accumulated taking the normalization shortest distance parameter $_nd_c$ as a vertical axis to form the "cylindrical arrangement" as shown in FIG. 24(B). This feature makes the geometric meaning of the step (1) clear. That is, it means that the "normalized distance parameter $_nd_c$ arbitrarily given by the step (1) designates height coordinates of this cylinder, and in the steps (2) and (3) the sectional circle at that height, or one in which a spherical image shown in FIG. 24(A) is transformed inside the "circle", is drawn. In step (1), the parameter $_nd_c$ is arbitrarily given, and thus, as seen from FIG. 24(B), the large circles do not intersect with each other at one point. However, on the sectional circle, in which it's height is equivalent to the true normalized distance $_nd_{c0}$, the large circles intersect with each other at one point. Thus, it is possible to obtain the normalized distance $_nd_{c0}$ of a plane in the form of the "height coordinates" of the cylinder, and also to obtain the three-dimensional azimuth $n_s$ in the form of the "intersection coordinates inside a sectional circle" (FIG. 24(B)).

4.2.5 A method in Which it is Acceptable that the Optical Axis Direction $a_{xis}$ is Unknown In the above, there is described a method of measuring the three-dimensional azimuth $n_s$ of a plane and the normalized distance $_nd_c$, under the condition that the optical axis direction $a_{xis}$ is known. That is, as the position on the sphere equal to the direction $a_{xis}$ $p_{axis}$" is determined, then the compound ratio transformation is performed using the position thus determined, and finally the polar transformation is performed, so that the three-dimensional azimuth $n_s$ and the normalized distance $_nd_c$ are determined.

Here, there is provided a method capable of measuring "the three-dimensional azimuth $n_s$ and the normalized distance $_nd_c$" even if the optical axis direction $a_{xis}$ is unknown. This method is similar to that of 1.6. According to this method, even if the moving direction on photography as to an image of an internet, a video, a movie, etc., for instance, is unknown, it is possible to measure the "azimuth and distance". Further, in the event that a plane moves, generally, the optical axis direction is unknown. However, even in such a case, it is possible to measure the "azimuth and distance" together with the optical axis direction $a_{xis}$. The outline of the method will be described hereinafter. Assuming that there is a possibility that the optical axis direction $a_{xis}$ takes any direction, "a compound ratio transformation and a polar transformation" in 4.2.3 is performed for each of the optical axis directions to draw a polar line. When the optical axis direction, wherein the polar lines intersect with each other at one point, is determined, it is a true optical axis direction $a_{xis0}$, and it is possible to determine a three-dimensional azimuth $n_s$ of a plane and a normalized distance $_nd_c$ in the form of the coordinates of the cross point. This is carried out in the following steps.

(1) Set up arbitrarily an optical axis direction $a_{xis}$.

(2) Give a direction of the parameter $a_{xis}$ in the form of "position $p_{axis}$ on the sphere".

(3) Execute the steps (1) to (4) in 4.2.3 so that polar lines for all the normalized distance parameters $_nd_c$ are drawn inside the cylindrical arrangement (FIG. 24(B)).

(4) The above-mentioned steps (1) to (3) are repeatedly carried out through changing the optical axis direction parameter $a_{xis}$ to determine a parameter value $a_{xis0}$ wherein a plurality of polar lines drawn in the step (3) intersect with each other at one point. This parameter value is a true optical axis direction $a_{xis0}$. Thus, an azimuth $n_{s0}$ of a plane and a normalized distance $_nd_{c0}$ up to crossing a plane are obtained in the form of coordinates of the above-mentioned cross point. It is acceptable that a point wherein intensity offers a peak is detected instead of detection of the above-mentioned cross point.

4.3 A method of Measuring the Normalization Shortest Distance up to a Plane

There is provided a method of measuring a three-dimensional azimuth $n_s$ of a plane and "a normalization shortest distance $_nd_s$ of the equation (51)". This is performed in a similar fashion to the algorithm of the movement vision described in 2. Between the normalization shortest distance $_nd_s$ and the "normalized distance $_nd_c$ explained in 4.2.3", there is a relation as expressed by the following equation

(61) where $n_s$ denotes a plane a three-dimensional azimuth of a plane, $a_{xis}$ denotes an optical axis direction, and ( ) denotes a scalar product.

$$_n d_s = {}_n d_c (n_s \cdot a_{xis}) \quad (61)$$

The reason will be described using FIG. 25 (FIG. 25 shows a section of a plane wherein a normal vector $n_s$ of the plane and an optical axis direction $a_{xis}$ lie. The "shortest distance $d_s$ up to a plane from the right camera center $O_R$" is a normal direction component of the "distance $d_c$ up to going across a plane in the optical axis direction". Consequently, the following equation consists.

$$d_s = d_c (n_s \cdot a_{xis}) \quad (62)$$

When both members of the equation (62) is normalized with the camera-to-camera distance $\Delta x_{LR}$, the following equation is obtained.

$$\begin{aligned} {}_n d_s &= d_s / \Delta x_{LR} = (d_c / \Delta x_{LR})(n_s \cdot a_{xis}) \\ &= {}_n d_c (n_s \cdot a_{xis}) \end{aligned} \quad (63)$$

The equation (63) is equivalent to the equation (61).

4.3.1 A method of Measuring a Normalization Shortest Distance $_n d_s$ up to a Plane and a Three-dimensional Azimuth $n_s$ of a Plane A combination of the "relation between $_n d_s$ and $_n d_c$ (the equation (61))" with the algorithm (the compound ratio transformation and the polar transformation) as mentioned in 4.2.3 makes it possible to measure a three-dimensional azimuth $n_s$ of a plane and a normalization shortest distance $_n d_s$ up to a plane.

This will be explained in conjunction with FIG. 26. This is performed in a similar fashion to the algorithm of the movement vision described in 2.1. It is implemented in accordance with the following six steps.

(1) Set up arbitrarily a normalization shortest distance parameter $_n d_s$.

(2) Consider a small circle taking an optical axis direction $a_{xis}$ as the center, and set up arbitrarily a radius r of the circle (FIG. 26). Determine "three-dimensional azimuth candidates $n_s$ of a plane" on the small circle in accordance with a step (4). In order to implement this step, there is a need to set up the normalized distance parameter $_n d_c$ to a value determined by the following equation.

$$_n d_c = {}_n d_s / \cos(r) \quad (64)$$

The reason why this is to do so is as follows. Since the candidates $n_s$ are located on the "small circle having a radius r taking the optical axis direction $a_{xis}$ as the center", there is the relation among $n_s$, $a_{xis}$ and r, as given by the following equation.

$$\cos(r) = (n_s \cdot a_{xi}) \quad (65a)$$

Since there is a need that $n_s$ satisfies the equation (61), the equation (65a) is substituted for equation (61). Thus, following equation is obtained.

$$_n d_s = {}_n d_c \cos(r) \quad (65b)$$

When this is modified, the equation (64) can be obtained.

(3) With respect to the respective points of an image, determine the spherical positions $p_L$, $p_R$ on the light camera and the right camera from the images on the cameras, respectively, and determine the position $p_{axis}$ on the optical axis from the optical axis direction $a_{xis}$, and substitute those positions and the normalized distance parameter $_n d_c$ for the equation (58b) or the equation (60b) to perform the compound ratio transformation so that the position $p_c$ is computed.

(4) $p_c$ determined in the step (3) is subjected to the polar transformation to draw a large circle $g_{pc}$ on a sphere. Two cross points $_r n_{s+}$, $_r n_{s-}$ of the large circle and the small circle in the step (2) are the "three-dimensional azimuth candidates of a plane" (FIG. 26). Incidentally, the latitudinal coordinates of this cross point is given by r (cf. FIG. 26). Longitudinal coordinates points $_r\alpha_{s+}$, $_r\alpha_{s-}$ are computed by the following equations through a substitution of the "movement vision parameters $\alpha_c$, a, $\tau$" for the "binocular vision parameters $\alpha_c$, c, $\sigma$" in the equation (29).

$$_r\alpha_{s+} = \alpha_c + \cos^{-1}(((_n d_s \sin(\sigma)/\sin(c+\sigma)) - \cos(r)\cos(c))/(\sin(r)\sin(c))),\ {}_r\alpha_{s-} = \alpha_c - \cos^{-1}(((_n d_s \sin(\sigma)/\sin(c+\sigma)) - \cos(r)\cos(c))/(\sin(r)\sin(c))) \quad (65)$$

Where $\alpha_c$ and c are the longitudinal coordinates and the latitudinal coordinates of $p_R$ for "the movement vision parameters $\alpha_a$ and a in FIG. 14 (that is, the longitudinal coordinates and the latitudinal coordinates of pc)", respectively.

(5) The above-mentioned steps (2) to (4) are repeatedly carried out through changing the radius r so as to draw a curved line consisting of the two cross points $_r n_{s+}$, $_r n_{s-}$ determined in the step (4) (FIG. 26). This curved line becomes, as will be described in 4.3.2, a "small circle taking $p_R$ as the center". If the normalization shortest distance parameter $_n d_s$ given in the step (1) is a true normalization shortest distance $_n d_{s0}$, it is possible to determine the normal vector $_n d_{s0}$ of a plane in the form of the cross point of the curved lines. However, in the step (1), the parameter $_n d_s$ is arbitrarily set up and thus generally the curved lines do not cross at one point. Therefore, the curved lines drawn here mean determining candidates for the normal vector $n_s$ of a plane. Incidentally, intensity of the curved line corresponds to "brightness of position $p_R$ in an image", and in the place wherein a plurality of curved lines intersect with each other, intensity of the curved lines is added.

(6) The above-mentioned steps (1) to (5) are repeatedly carried out through changing the normalization shortest distance parameter $_n d_s$ to determine a parameter value $_n d_{s0}$ wherein a plurality of curved lines drawn in the step (5) intersect with each other at one point. Thus, a "normalization shortest distance $_n d_{s0}$ from the right camera center $O_R$ to a plane" is obtained in the form of the parameter value. Further, the azimuth $n_{s0}$ of a plane is obtained in the form of coordinates of the above-mentioned cross point. It is acceptable that a point wherein intensity offers a peak is detected instead of detection of the above-mentioned cross point.

4.3.2 Another Method of Measuring a Normalization Shortest Distance $_n d_s$ up to a Plane and a Three-dimensional Azimuth $n_s$ of a Plane When the "parameters $p_R$, $p_L$, $p_{axis}$, $a_{xis}$ as to the binocular vision" is replaced by the "parameters $p_0$, $p_1$, $p_{inf}$, V as to the movement vision", FIG. 26 is equivalent to FIG. 13. Consequently, the curved line of the step (5) in 4.3.1, to which the proof in 2.2.1 can be applied, is the "small circle of radius R taking $p_0$ as its center". The radius R is expressed by the following equation, wherein "the movement vision parameters $\tau$, a, $p_0p_1$, $p_{inf}p_1$" are replaced by "the binocular vision parameters $\sigma$, c, $p_Rp_L$, $p_{axis}p_L$".

$$R = \cos^{-1}({}_nd_s\sin(\sigma)/\sin(c+\sigma)) \quad (66a)$$

$$= \cos^{-1}({}_nd_s\sin(p_Rp_L)/\sin(p_{axis}p_L)) \quad (66b)$$

Thus, it is shown that the curved line consisting of two cross points ${}_rn_{s+}$, ${}_rn_{s-}$ shown in FIG. 26 is the "small circle of the radius R taking $p_R$ as its center". This implies that it is possible to transfer an arbitrary point $p_R$ to the small circle. This transformation is referred to as a "small circle transformation". The nature of the small circle transformation is the same as the movement vision, and is shown in 2.2.2. The equation (66a) expresses the radius R using binocular parallax σ. However, in the event that the position $p_L$ on the left camera is known, the radius R is given by the following equation through substituting the equation (57) for the equation (66b).

$$R=\cos^{-1}({}_nd_s \sin(d-c)/\sin(d)) \quad (66c)$$

In accordance with the above preparation, there will be explained another method of measuring a normalization shortest distance ${}_nd_s$ up to a plane and a three-dimensional azimuth $n_s$ of a plane using the "small circle transformation". It is implemented in accordance with the following four steps. This is similar to the algorithm of the movement vision described in 2.2.3.

(1) Set up arbitrarily a normalization shortest distance parameter ${}_nd_s$.

(2) With respect to the respective points of an image, determine the positions $p_L$, $p_R$ at the left camera and the right camera from images on the cameras, respectively, and determine the "position $p_{axis}$ on the optical axis coupling the left camera and the right camera from the optical axis direction $a_{axis}$, and compute the radius R of a small circle transformation in accordance with the equation (66b).

(3) The respective points $p_R$ are subjected to the small circle transformation to draw on a sphere a small circle of the radius R taking $p_R$ as its center. Here there will be explained the meaning of drawing the small circle. If the normalization shortest distance parameter ${}_nd_s$ given in the step (1) is a true normalization shortest distance ${}_nd_{s0}$, it is possible to determine the normal vector $n_{s0}$ of a plane in the form of the cross point of the small circles. However, in the step (1), the parameter ${}_nd_s$ is arbitrarily set up and thus generally the small circles do not intersect with each other at one point. Therefore, the small circles drawn here mean determining candidates for the normal vector $n_s$ of a plane. Incidentally, intensity of the small circle corresponds to "brightness of position $p_R$ in an image", and in the place wherein a plurality of small circles intersect with each other, intensity of the small circles is added.

(4) The above-mentioned steps (1) to (3) are repeatedly carried out through changing the normalization shortest distance parameter ${}_nd_s$ to determine a parameter value ${}_nd_{s0}$ wherein a plurality of small circles drawn in the step (3) intersect with each other at one point. Thus, a "normalization shortest distance ${}_nd_{s0}$ from the camera center $O_R$ to a plane" is obtained in the form of the parameter value. Further, the azimuth $n_{s0}$ of a plane is obtained in the form of coordinates of the above-mentioned cross point. It is acceptable that a point wherein intensity offers a peak is detected instead of detection of the above-mentioned cross point.

Here, there will be described the above-mentioned small circle transformation method on a geometric basis in reference to FIG. 27. With respect to the respective points of an image, determine the positions $p_L$, $p_R$ at the left camera and the right camera from images on the cameras, respectively, and determine the "position $p_{axis}$ on the optical axis coupling the left camera and the right camera" from the optical axis direction $a_{axis}$, and give the normalization shortest distance parameter ${}_nd_s$ in the step (1). Those are substituted for the equation (66b) to determine the radius R, so that the small circle transformation is performed as shown in FIG. 27(A). That is, the small circle of the radius R is drawn on the sphere taking $p_R$ as its center. Next, the sphere shown in FIG. 27(A) is projected onto a plane in a similar fashion to that of the step (4) in 1.3.3, so that an image on the sphere is transformed inside the "circle". The circles are accumulated taking the normalization shortest distance parameter ${}_nd_s$ as a vertical axis to form the "cylindrical arrangement" as shown in FIG. 27(B).

It means that the normalization shortest distance parameter ${}_nd_s$ arbitrarily given by the step (1) designates height coordinates of this cylinder, and in the steps (2) and (3) the sectional circle at that height, or one in which a spherical image is transformed inside the "circle", is drawn. In step (1), the parameter ${}_nd_s$ is arbitrarily given, and thus, as seen from FIG. 27(B), the small circles do not intersect with each other at one point. However, on the sectional circle, in which it's height is equivalent to the true normalization shortest distance ${}_nd_{s0}$, the small circles intersect with each other at one point. Thus, it is possible to obtain the normalization shortest distance ${}_nd_0$ of a plane in the form of the "height coordinates" of the cylinder, and also to obtain the three-dimensional azimuth $n_s$ in the form of the "intersection coordinates inside a sectional circle".

4.3.3 A Method in Which it is Acceptable that the Optical Axis Direction $a_{xis}$ is Unknown In 4.3.1 and 4.3.2, there is described a method of measuring the three-dimensional azimuth $n_s$ of a plane and the normalization shortest distance ${}_nd_s$, under the condition that the optical axis direction $a_{xis}$ is known. Here, there is provided a method capable of measuring the azimuth and the distance even if the optical axis direction $a_{xis}$ is unknown. This method is similar to that of 2.5. According to this method, even if the optical axis direction on photography as to an image of an internet, a video, a movie, etc., for instance, is unknown, it is possible to measure the "azimuth and distance". Further, in the event that a plane moves, generally, the optical axis direction is unknown. However, even in such a case, it is possible to measure the "azimuth and distance" together with the optical axis direction $a_{xis}$. The outline of the method will be described with respect to 4.3.2 (also 4.3.1). Assuming that there is a possibility that the optical axis direction $a_{xis}$ takes any direction, "a small circle transformation" in 4.3.2 is performed for each of the optical axis directions $a_{xis}$ to draw a small circle. When the optical axis direction, wherein the small circles intersect with each other at one point, is determined, it is a true optical axis direction $a_{xis0}$, and it is possible to determine a three-dimensional azimuth $n_s$ of a plane and a normalization shortest distance ${}_nd_s$ in the form of the coordinates of the cross point. This is carried out in the following steps.

(1) Set up arbitrarily an optical axis direction parameter $a_{xis}$.

(2) Give a direction of the parameter $a_{xis}$ in the form of "position $p_{axis}$ on the sphere".

(3) Execute the steps (1) to (4) in 4.3.2 so that small circles for all the normalization shortest distance parameter ${}_nd_s$ are drawn inside the cylindrical arrangement (FIG. 27(B)).

(4) The above-mentioned steps (1) to (3) are repeatedly carried out through changing the optical axis direction parameter $a_{xis}$ to determine a parameter value $a_{xis0}$ wherein a plurality of small circles drawn in the step (3) intersect with each other at one point. This parameter value is a true optical axis direction $a_{xis0}$. Thus, an azimuth $n_{s0}$ of a plane and a normalization shortest distance $_{n}d_{s0}$ are obtained in the form of coordinates of the above-mentioned cross point. It is acceptable that a point wherein intensity offers a peak is detected instead of detection of the above-mentioned cross point.

4.4 Generalization 4.4.1 Voting to Cylindrical Arrangement

In FIG. 24(B), the "curved line wherein a large circle on a sphere is projected onto a plane" is "drawn" on each of the sectional circles of the cylinder. Instead of such a drawing, it is acceptable that the respective sectional circles are arranged in the form of a memory arrangement or a register arrangement, and a voting is made for memory or register associated with the curved line.

In FIG. 27(B), the "curved line wherein a small circle on a sphere is projected onto a plane" is "drawn" on each of the sectional circles of the cylinder. Instead of such a drawing, it is acceptable that the respective sectional circles are arranged in the form of a memory arrangement or a register arrangement, and a voting is made for memory or register associated with the curved line.

4.4.2 Polar Transformation on a Plane

In 4.2.3 (3), the polar line, wherein $p_c$ is subjected to the polar transformation, is drawn in the form of the "large circle on the sphere". In a similar fashion to that of 3.3, it is acceptable that such a polar line is drawn in the form of the "straight line on the plane".

Further, in 4.3.1 (5), 4.3.2 (3), the small circle, wherein $p_R$ is subjected to the small circle transformation, is drawn on "the sphere". It is acceptable that such a small circle is drawn in the form of the ellipse through projection of the small circle from the camera center onto the "arbitrary plane".

4.4.3 A Method of Measuring the Normalized Distance $_{n}d_0$ Up to a Point

In the equation (39a), when the "movement vision parameters $\Delta x$, $p_0$, $p_1$, $p_{inf}$" are replaced by the "binocular vision parameters $\Delta x_{LR}$, $p_R$, $p_L$, $p_{axis}$", the normalized distance is expressed by the following equation (67a).

$$\begin{aligned} {}_{n}d_0 &= d_0/\Delta x_{LR} \\ &= (p_{axis} p_R p_L) \end{aligned} \tag{67a}$$

In accordance with this equation, it is possible to measure the normalized distance $_{n}d_0$. When the equation (57) (or equation (59)) is substituted for the equation (67a), and it is expressed with the central angle, then the following equation can be obtained.

$${}_{n}d_0 = \sin(d)/\sin(d-c) \tag{67b}$$

$$= \sin(c+\sigma)/\sin(\sigma) \tag{67c}$$

4.4.4 Planer Camera

While the above-mentioned explanation has been made wherein an image on a spherical camera (or an eyeball) is used, it is possible also to use an image on a planer camera. In such a case, in a similar fashion to that of 3.5, it is effective that the image photographed by the planer camera is transformed to the image on the sphere, and the above-mentioned "algorithm on the sphere" is carried out.

Here, the explanation for the principles of the present invention is terminated, and hereinafter there will be described the various embodiments of the present invention. Incidentally, the various block diagrams, which will be explained hereinafter, may be understood as the functional blocks of the computer system 300 shown in FIGS. 2 and 3, and also be understood as the various embodiments of an image measurement apparatus according to the present invention where the image measurement apparatus is constructed with the hardware. Further, the various flowcharts, which will be explained hereinafter, may be understood as the various embodiments of the image measurement programs referred to in the present invention, which are executed when they are installed in the computer system 300 shown in FIGS. 2 and 3, and also be understood as the various embodiments of an image measurement method according to the present invention.

Embodiment A Movement Vision

Embodiment A-1. (Measurement of a Three-dimensional Azimuth $n_{s0}$ of a Plane and a Normalized Time $t_{c0}$ Up to Going Across the Plane)

This measurement, that is, the method of 1.3.2 will be explained in conjunction with the embodiment of FIG. 28. It is performed in accordance with the following flowchart shown in FIG. 29.

(Start)

(1) Set up a position $p_{inf}$ at the infinite time as follows (A-1-1). Positions $\{{}_{i}p_0\}$ and $\{{}_{i}p_1\}$ on all points at the present time and the subsequent time, which are obtained through a camera 11, are fed from a "register 12 for images at the present time $t_0$" and a "register 13 for images at the subsequent time $t_1$" to an "extraction unit 14 for a moving direction v", respectively to extract the moving direction v. With respect to a method of extracting the moving direction v, it is disclosed in Japanese Patent (Japanese Patent Publication Hei. 06-14355). Next, set up the "position $p_{inf}$ at the infinite time", as being equal to the moving direction v, by a "$p_{inf}$ set unit 15".

(2) Scan a normalized time parameter $_{n}t_c$ by a "scan unit for $_{n}t_c$ parameter 16" from the minimum value $_{n}t_{c,\,min}$ to the maximum value $_{n}t_{c,\,max}$ (A-1-2, A-1-3, A-1-16).

(Scan $_{n}t_c$)

(3) Scan the respective addresses from the minimum value $i_{min}$ to the maximum value $i_{max}$ (A-1-4, A-1-5, A-1-15).

(Scan i)

(4) Output positions $_{i}p_0$ and $_{i}p_1$ at the present time and the subsequent time from the "register 12 for images at the present time $t_0$" and the "register 13 for images at the subsequent time $t_1$", respectively (A-1-6).

(5) Feed four parameters $_{n}t_c$, $_{i}p_0$, $_{i}p_1$, $p_{inf}$ thus set up to a "compound ratio transformation unit 17" and output a position $_{i}p_c$. A computation of the position $_{i}p_c$ is performed by the "compound ratio transformation unit 17" in following two steps.

(a) Computation of a Central Angle $_{i}x$ Between $_{i}p_c$ and $p_{inf}$ (A-1-7)

From $_{n}t_c$, $_{i}p_0$, $_{i}p_1$, $p_{inf}$, the central angle $_{i}x$ is computed in accordance with the following equation based on the equation (14b) (cf. FIG. 9).

$${}_{i}x = \tan^{-1}((\sin({}_{i}a)\sin({}_{i}b))/(\cos({}_{i}a)\sin({}_{i}b) - {}_{n}t_c \cdot \sin(({}_{i}b)-({}_{i}a)))) \tag{100a}$$

(b) Computation of $_{i}p_c$ (A-1-8)

Compute the position $_ip_c$ on the sphere, using the above-mentioned central angle $_ix$, in accordance with the following equation.

$$_ip_c=\cos(_ix)\Gamma_x+\sin(_ix)\Gamma_y \quad (100b)$$

Here, $\Gamma_x$ and $\Gamma_y$ are computed in accordance with following equations where [X] and | | denote the exterior product operation and the absolute value operation, respectively.

$$\Gamma_x=v$$

$$\Gamma_z=[v\times {_ip_0}]/|[v\times {_ip_0}]|$$

$$\Gamma_y=[\Gamma_z\times\Gamma_x] \quad (100c)$$

(6) The above-mentioned position $_ip_c$ is subjected to a polar transformation into a large circle on a sphere by a "polar transformation unit 18" (cf. 1.3.3, and FIG. 10(A)). The polar transformation is performed by the "polar transformation unit 18" in following two steps (cf. FIG. 30(A)).

(a) Transformation of $_ip_1$ to Polar Coordinates (A-1-9)

$_ip_c$ is expressed on the rectangular coordinates and the "polar coordinates on a sphere" as follows.

$$_ip_c=(_ip_{cX},\ _ip_{cY},\ _ip_{cZ}) \quad (101a)$$

$$=(_i\alpha_c,\ _i\beta_c) \quad (101b)$$

Polar coordinates components (longitude $_i\alpha_c$ latitude $_i\beta_c$) of $_ip_c$ are computed in accordance with the following equations.

$$_{i\alpha c}=\tan^{-1}(_ip_{cY}/_ip_{cX}) \quad (101c)$$

$$_{i\beta c}=\tan^{-1}(\sqrt{(_ip_{cX}^2+_ip_{cY}^2}/_ip_{cZ})) \quad (101d)$$

Here, O denotes a unit vector of the "original point on a sphere", X and Y denote unit vectors of an X-axis and a Y-axis, respectively.

(Scan k)

(b) Polar Transformation of $_ip_c$ (A-1-12)

A large circle on a sphere, wherein the position $_ip_c$ is subjected to the polar transformation, that is, coordinates (longitude $_k\alpha_{GC}$ latitude $_k\beta_{GC}$) of an arbitrary point $_kp_{GC}$ (the address is given by k) constituting the large circle, is determined by the coordinates $_{i\alpha c}$ and $_{i\beta c}$ of $_ip_c$, and is expressed by the equation (102b) ("Geometry Dictionary 2 (I. Iwata, Maki Book Shop)", page 72).

$$_kp_{GC}=(_k\alpha_{GC},\ _{k\beta GC}) \quad (102a)$$

$$\cos(_k\alpha_{GC}-{_i\alpha_c})=-\cot(_k\beta_{GC})\cot(_i\beta_c) \quad (102b)$$

A computation for the large circle is performed as follows in such a manner that k is scanned from the minimum value $k_{min}$ to the maximum value $k_{max}$. The latitude $_k\beta_{GC}$is computed together $k\Delta\beta_{GC}$where $\Delta\beta_{GC}$denotes a latitudinal resolution, and the longitude $_k\alpha_{GC}$ is computed in accordance with the following equation using the latitude.

$$_k\alpha_{GC}={_i\alpha_c}+\cos^{-1}(\cot(_k\beta_{GC})\cot(_i\beta_c)) \quad (102c)$$

(7) Points $_kp_{GC}$ constituting the above-mentioned large circle are transformed to points $_kp_{GC,Proj}$ represented by polar coordinates (inclination $_k\alpha_{GC,Proj}$ and radius $_k\beta_{GC,Proj}$) in the sectional circle of height $_nt_c$ of a "cylindrical arrangement voting unit 19", and voting is performed (A-1-13). The voting is performed through adding "brightness of the position $_ip_0$" (cf. 1.3.3, FIG. 10(B), and FIG. 30(B)). This transformation is expressed by the following expressions wherein f ( ) is generally given as the projective function.

$$_k\beta_{GC,Proj}=f(_k\beta_{GC}) \quad (103a)$$

$$_k\alpha_{GC,Proj}={_k\alpha_{GC}} \quad (103b)$$

With respect to details of f ( ), please refer to the publication ("Problems associated with newest lens design course 23 lens design (1) (by Nakagawa, Photography Industry, 1982)": Section 4.2.2.1, "Report of Sho. 59 Utility Nuclear Electric Power Generation Institution Robot Development Contract Research (Advanced Robot Technology Research Association)"). In case of the equidistant projection, f ( )=1, and $_k\beta_{GC,Proj}$ is given by the following equation.

$$_k\beta_{GC,Proj}={_k\beta_{GC}} \quad (103c)$$

To summarize the above, the "points $_kp_{GC}$ on the sphere", which constitute the large circle, are transformed to the "points $_kp_{GC,Proj}$ on the plane" in the sectional circle, and the "brightness of the position $_ip_0$" is voted for (added to) the points thus transformed. It is possible to implement the respective sectional circle with a register arrangement or a memory arrangement. The "algorithm for the polar transformation on the sphere to the large circle" and the "algorithm for voting through projecting the large circle into the circle" are described in details in the publication (Section 4.2.2.1, "Report of Sho. 60 Utility Nuclear Electric Power Generation Institution Robot Development Contract Research (Advanced Robot Technology Research Association)").

(Scan k (A-1-14)

(8) In the processing up to here, there is drawn one large circle, wherein the point of the position $_ip_0$ is subjected to "the compound ratio transformation and the polar transformation", in the sectional circle of $_nt_c$ in height. It is noted that the large circle has been transformed in accordance with the equations (103a) to (103c).

(Scan i (A-1-15))

(9) In the processing up to here, there are drawn large circles, wherein "all the points $\{_ip_0\}$ in the image" are subjected to the compound ratio transformation and the polar transformation, in the sectional circle of $_nt_c$ in height. With respect to the hardware of voting the polar transformation on the sphere for the "register arrangement corresponding to the inside of the circle", it is described in details in Japanese Patent Publication Hei. 01-57831, Japanese Patent Publication Hei. 01-59619, Japanese Patent Publication Hei. 06-70795, Japanese Patent Publication Hei. 06-70796.

(Scan $_nt_c$ (A-1-16))

(10) In the processing up to here, there are drawn large circles, wherein "all the points $\{_ip_0\}$ in the image" are subjected to the compound ratio transformation and the polar transformation, in the sectional circles of $\{_nt_c\}$ in all the heights. That is, the voting is performed for the inside of all the sectional circles of the cylindrical arrangement.

(11) Extract a "point wherein the voted intensity offers the maximum (peak)" in the cylindrical arrangement, by a "peak extraction unit 20". This maximum point is a "place wherein the large circles intersect with each other at one point". The "normalized time $_nt_{c0}$ up to going across the plane" is determined in the form of a "height coordinates" of the maximum point, and the "three-dimensional azimuth $n_{s0}$ of the plane" is determined in the form of a "sectional circle inside coordinates" (A-1-17). FIG. 11 shows a result of a computer simulation which is performed using the above-mentioned flow.

(End)

Embodiment A-2. (Measurement of a Three-dimensional Azimuth $n_{s0}$ of a Plane and a Normalized Time $t_{c0}$ Up to Going Across the Plane Without Determination of a Moving Direction v)

This measurement, that is, the method of 1.6, will be explained in conjunction with the embodiment of FIG. 31, which is one wherein the embodiment A-1 is modified. It is performed in accordance with a flowchart shown in FIG. 32. The following steps (2)–(10) are the same as the corresponding steps of the embodiment A-1.

(Start)

(0) Scan a "moving direction parameter v" over any possible directions (from the minimum value $v_{min}$ to the maximum value $v_{max}$) by a "scan unit for v parameter 21".

(Scan v)

(1) Set up the "position $p_{inf}$ after the infinite time elapses", as being equal to the parameter v, by a "$p_{inf}$ set unit 15" (A-2-3).

(2) Scan a normalized time parameter ${}_nt_c$ by a "scan unit for ${}_nt_c$ parameter 16" from the minimum value ${}_nt_{c,\,min}$ to the maximum value ${}_nt_{c,\,max}$ (A-2-4, A-2-5, A-2-16).

(Scan ${}_nt_c$)

(3) Scan the respective addresses from the minimum value $i_{min}$ to the maximum value $i_{max}$ (A-2-6, A-2-7, A-2-15).

(Scan i)

(4) Output positions ${}_ip_0$ and ${}_ip_1$ at the present time and the subsequent time from the "register 12 for images at the present time $t_0$" and the "register 13 for images at the subsequent time $t_1$", respectively (A-2-8).

(5) Feed four parameters ${}_nt_c$, ${}_ip_0$, ${}_ip_1$, $p_{inf}$ thus set up to a "compound ratio transformation unit 17" and output a position ${}_ip_c$ (A-2-9).

(6) The above-mentioned position ${}_ip_c$ is subjected to a polar transformation into a large circle on a sphere by a "polar transformation unit 18" (A-2-10).

(Scan k)

(7) Points ${}_kp_{GC}$ constituting the above-mentioned large circle are transformed to "points in the sectional circle of height ${}_nt_c$" of a "cylindrical arrangement voting unit 19", and voting is performed (A-2-14).

(Scan k (A-2-14)

(8) In the processing up to here, there is drawn one large circle, wherein the point of the position ${}_ip_0$ is subjected to "the compound ratio transformation and the polar transformation", in the sectional circle of ${}_nt_c$ in height. It is noted that the large circle has been transformed in accordance with the equations (103a) to (103c).

(Scan i (A-2-15))

(9) In the processing up to here, there are drawn large circles, wherein "all the points $\{{}_ip_0\}$ in the image" are subjected to the compound ratio transformation and the polar transformation, in the sectional circle of ${}_nt_c$ in height.

(Scan ${}_nt_c$ (A-2-16))

(10) In the processing up to here, there are drawn large circles, wherein "all the points $\{{}_ip_0\}$ in the image" are subjected to the compound ratio transformation and the polar transformation, in the sectional circles of $\{{}_nt_c\}$ in all the heights. That is, the voting is performed for the inside of all the sectional circles of the cylindrical arrangement.

(Scan v (A-2-17))

(11) In the processing up to here, the voting is performed for all the sectional circles of the "cylindrical arrangements for all the moving direction parameters v".

(12) Extract a "specified cylindrical arrangement" wherein the intensity offers the maximum from among the cylindrical arrangements, by a "peak extraction unit 20". Thus, a true moving direction $v_0$ is determined in the form of the moving direction parameter for this arrangement. When a point, wherein the intensity offers the peak in the cylindrical arrangement, is extracted, the normalized time ${}_nt_{c0}$ up to going across the plane is determined in the form of a "height coordinates" of the maximum point, and the three-dimensional azimuth $n_{s0}$ of the plane is determined in the form of a "sectional circle inside coordinates" (A-2-18).

(End)

Embodiment A-3. (Measurement of a Three-dimensional Azimuth $n_{s0}$ of a Plane and a Normalization Shortest Distance ${}_nd_{s0}$)

This measurement, that is, the method of 2.2.3 will be explained in conjunction with the embodiment of FIG. 33. It is performed in accordance with the following flowchart shown in FIG. 34.

(Start)

(1) A moving direction v is extracted by an "extraction unit 14 for a moving direction v" in a similar fashion to that of the step (1) of the Embodiment A-1. Next, set up the "position $p_{inf}$ at the infinite time", as being equal to the moving direction v, by a "$p_{inf}$ set unit 15" (A-3-1).

(2) Scan a normalization shortest distance parameter ${}_nd_s$ by a "scan unit for ${}_nd_s$ parameter 22" from the minimum value ${}_nd_{s,\,min}$ to the maximum value ${}_nd_{s,\,max}$ (A-3-2, A-3-3, A-3-15).

(Scan ${}_nd_s$)

(3) Scan the respective addresses from the minimum value $i_{min}$ to the maximum value $i_{max}$ (A-3-4, A-3-5, A-3-14).

(Scan i)

(4) Output positions ${}_ip_0$ and ${}_ip_1$ at the present time and the subsequent time from the "register 12 for images at the present time $t_0$" and the "register 13 for images at the subsequent time $t_1$", respectively (A-3-6).

(5) Feed four parameters ${}_nd_s$, ${}_ip_0$, ${}_ip_1$, $p_{inf}$ thus set up to a "computing unit 23 for radius R" and output a radius ${}_1R$ and a position ${}_ip_0$ (A-3-7). In the unit 23, the radius ${}_1R$ is computed with the following equation based on the equation (33).

$$ {}_iR=\cos^{-1}({}_nd_s\ \sin({}_ib-{}_ia)/\sin({}_ib)) \tag{104} $$

(6) The above-mentioned radius ${}_iR$ and position ${}_ip_0$ are fed to a "small circle transformation unit 24" to perform a small circle transformation wherein the position ${}_ip_0$ is transformed to a "small circle on a sphere" of the radius ${}_iR$ taking the position ${}_ip_0$ as the center (cf. 2.2.1, and FIG. 17(A)). The small circle transformation is performed by the unit in following two steps (cf. FIG. 35(A)).

(a) Transformation of ${}_ip_0$ to Polar Coordinates (A-3-8)

${}_ip_0$ is expressed on the rectangular coordinates and the "polar coordinates on a sphere" as follows.

$$ {}_ip_0=({}_ip_{0X},\ {}_ip_{0Y},\ {}_ip_{0Z}) \tag{105a} $$

$$ =({}_i\alpha_0,\ {}_i\beta_0) \tag{105b} $$

Polar coordinates components (longitude ${}_i\alpha_0$ latitude ${}_i\beta_0$) of ${}_ip_0$ are computed in accordance with the following equations.

$$_i\alpha_0=\tan^{-1}(_ip_{0Y}/_ip_{0X}) \quad (105c)$$

$$_i\beta_0=\tan^{-1}(\sqrt{(_ip_{0X}^2+_ip_{0Y}^2)}/_ip_{0Z})) \quad (105d)$$

(Scan k (A-3-9, A-3-10, A-3-13))

(b) Small Circle Transformation (A-3-11)

A large circle on a sphere, wherein the position $_ip_0$ is subjected to the small circle transformation, that is, coordinates (longitude $_k\alpha_{SC}$ latitude $_k\beta_{SC}$) of an arbitrary point $_kp_{SC}$ (the address is given by k) constituting the small circle, is determined by the coordinates $_i\alpha_0$ and $_i\beta_0$ of $_ip_0$, and is expressed by the equation (106b). This equation is equivalent to one in which the equation (30) is expressed using the parameters in FIG. 35(A).

$$_kp_{SC}=(_k\alpha_{SC}, {}_k\beta_{SC}) \quad (106a)$$

$$\cos(_k\beta_{SC})\cos(_i\beta_0)+\sin(_k\beta_{SC})\sin(_i\beta_0)\cos(_k\alpha_{SC}-{}_i\alpha_0)=\cos(_iR) \quad (106b)$$

A computation for the small circle is performed as follows in such a manner that k is scanned. The latitude $_k\beta_{SC}$ is computed together $_k\Delta\beta_{SC}$ where $\Delta\alpha_{SC}$ denotes a latitudinal resolution, and the longitude $_k\alpha_{SC}$ is computed in accordance with the following equation using the latitude.

$$_k\alpha_{SC}={}_i\alpha_0+\cos^{-1}((\cos(_iR)-\cos(_k\beta_{SC})\cos(_i\beta_0))/(\sin(_k\beta_{SC})\sin(_i\beta_0))) \quad (106c)$$

(7) Points $_kp_{SC}$ constituting the above-mentioned small circle are transformed to points $_kp_{SC,Proj}$ represented by polar coordinates (inclination $_k\alpha_{SC,Proj}$ and radius $_k\beta_{SC,Proj}$) in the sectional circle of height $_nd_s$ of a "cylindrical arrangement voting unit 25", and voting is performed (A-3-12). The voting is performed through adding "brightness of the position $_ip_0$" (cf. 2.2.3, FIG. 17(B), and FIG. 35(B)). This transformation is expressed by the following expressions wherein f ( ) is given as the projective function.

$$_k\beta_{SC,Proj}=f(_k\beta_{SC}) \quad (107a)$$

$$_k\alpha_{SC,Proj}={}_k\beta_{SC} \quad (107b)$$

In case of the equidistant projection, f ( )=1, and $_k\beta_{SC,Proj}$ is given by the following equation (cf. the step (7) of the embodiment A-1).

$$_k\beta_{SC,Proj}={}_k\beta_{SC} \quad (107c)$$

To summarize the above, the "points $_kp_{SC}$ on the sphere", which constitute the small circle, are transformed to the "points $_kp_{SC,Proj}$ on the plane" in the sectional circle, and the "brightness of the position $_ip_0$" is voted for (added to) the points thus transformed. It is possible to implement the respective sectional circle with a register arrangement or a memory arrangement.

(Scan k (A-3-13)

(8) In the processing up to here, there is drawn one small circle, wherein the point of the position $_ip_0$ is subjected to the transformation, in the sectional circle of $_nd_s$ in height. It is noted that the small circle has been transformed in accordance with the equations (107a) to (107c).

(Scan i (A-3-14))

(9) In the processing up to here, there are drawn small circles, wherein "all the points $\{_ip_0\}$ in the image" are subjected to the transformation, in the sectional circle of $_nd_s$ in height.

(Scan $_nd_s$ (A-3-15))

(10) In the processing up to here, there are drawn small circles, wherein "all the points $\{_ip_0\}$ in the image" are subjected to the transformation, in the sectional circles of $\{_nd_s\}$ in all the heights. That is, the voting is performed for the inside of all the sectional circles of the cylindrical arrangement.

(11) Extract a "point wherein the voted intensity offers the maximum (peak)" in the cylindrical arrangement, by a "peak extraction unit 26". This maximum point is a "place wherein the small circles intersect with each other at one point". The normalization shortest distance $_nd_s$ is determined in the form of a "height coordinates" of the maximum point, and the "three-dimensional azimuth $n_{s0}$ of the plane" is determined in the form of a "sectional circle inside coordinates" (A-3-16). FIG. 18 shows a result of a computer simulation which is performed using the above-mentioned flow.

(End)

Embodiment A-4. (Measurement of a Three-dimensional Azimuth $n_{s0}$ of a Plane and a Normalization Shortest Distance $_nd_{s0}$ Without Determination of a Moving Direction v)

This measurement, that is, the method of 2.4 will be explained in conjunction with the embodiment of FIG. 36, which is one wherein the embodiment A-3 is modified. It is performed in accordance with a flowchart shown in FIG. 37. The following steps (2)–(10) are the same as the corresponding steps of the embodiment A-3.

(Start)

(0) Scan a "moving direction parameter v" over any possible directions (from the minimum value $v_{min}$ to the maximum value $v_{max}$) by a "scan unit for v parameter 21" (A-4-1, A-4-2, A-4-17).

(Scan v)

(1) Set up the "position $p_{inf}$ after the infinite time elapses", as being equal to the parameter v, by a "$p_{inf}$ set unit 15" (A-4-3).

(2) Scan a normalization shortest distance parameter $_nd_s$ by a "scan unit for $_nd_s$ parameter 22" from the minimum value $_nd_{s,\,min}$ to the maximum value $_nd_{s,\,max}$ (A-4-4, A-4-5, A-4-16).

(Scan $_nd_s$)

(3) Scan the respective addresses from the minimum value $i_{min}$ to the maximum value $i_{max}$ (A-4-6, A-4-7, A-4-15).

(Scan i)

(4) Output positions $_ip_0$ and $_ip_1$ at the present time and the subsequent time from the "register 12 for images at the present time $t_0$" and the "register 13 for images at the subsequent time $t_1$", respectively (A-4-8).

(5) Feed four parameters $_nd_s$, $_ip_0$, $_ip_1$, $p_{inf}$ thus set up to a "computing unit 23 for radius R" and output a radius $_iR$ and a position $_ip_0$ (A-4-9).

(6) The above-mentioned radius $_iR$ and position $_1p_0$ are fed to a "small circle transformation unit 24" to perform a small circle transformation wherein the position $_ip_0$ is transformed to a "small circle on a sphere" of the radius $_iR$ taking the position $_ip_0$ as the center (A-4-10).

(7) Points $_kp_{SC}$ constituting the above-mentioned small circle are transformed to points $_kp_{SC,Proj}$ represented by polar coordinates (inclination $_k\alpha_{SC,Proj}$ and radius $_k\beta_{SC,Proj}$) in the sectional circle of height $_nd_s$ of a "cylindrical arrangement voting unit 25", and voting is performed (A-4-13).

(Scan k (A-4-14)

(8) In the processing up to here, there is drawn one small circle, wherein the point of the position $_ip_0$ is subjected to the transformation, in the sectional circle of $_nd_s$ in height. It is noted that the small circle has been transformed in accordance with the equations (107a) to (107c).

(Scan i (A-4-15))

(9) In the processing up to here, there are drawn small circles, wherein "all the points $\{{}_i p_0\}$ in the image" are subjected to the transformation, in the sectional circle of ${}_n d_s$ in height.

(Scan ${}_n d_s$ (A-4-16))

(10) In the processing up to here, there are drawn small circles, wherein "all the points $\{{}_i p_0\}$ in the image" are subjected to the transformation, in the sectional circles of $\{{}_n d_s\}$ in all the heights. That is, the voting is performed for the inside of all the sectional circles of the cylindrical arrangement.

(Scan v (A-4-17)

(11) In the processing up to here, the voting is performed for all the sectional circles of the "cylindrical arrangements for all the moving direction parameters v".

(12) Extract a "specified cylindrical arrangement" wherein the intensity offers the maximum from among the cylindrical arrangements, by a "peak extraction unit 26". Thus, a true moving direction $v_0$ is determined in the form of the moving direction parameter for this arrangement. When a point, wherein the intensity offers the peak in the cylindrical arrangement, is extracted, the normalization shortest distance ${}_n d_s$ is determined in the form of a "height coordinates" of the maximum point, and the three-dimensional azimuth $n_{s0}$ of the plane is determined in the form of a "sectional circle inside coordinates (A-4-18).

(End)

Embodiment A-5. (Measurement of a "Normalized Distance ${}_n d_0$ of a Point")

This measurement, that is, the method of 3.4 will be explained in conjunction with the embodiment of FIG. 38. It is performed in accordance with the following flowchart shown in FIG. 39.

(Start)

(1) A moving direction v is extracted by an "extraction unit 14 for a moving direction v" in a similar fashion to that of the step (1) of the Embodiment A-1. Next, set up the "position $p_{inf}$ after the infinite time elapses", as being equal to the moving direction v, by a "$p_{inf}$ set unit 15" (A-5-1).

(2) Output positions $p_0$ and $p_1$ at the present time and the subsequent time from the "register 12 for images at the present time $t_0$" and the "register 13 for images at the subsequent time $t_1$", respectively (A-5-2).

(3) Feed three parameters $p_0$, $p_1$, $p_{inf}$ thus set up to a "computing unit 27 for point distance" and output a normalized distance ${}_n d_0$ up to a point (A-5-3). In the unit 27, the normalized distance ${}_n d_0$ is computed with the equation (39b).

(End)

Embodiment A-6. (Measurement of a Three-dimensional Azimuth $n_{s0}$ of a Plane and a Normalized Time ${}_n t_{c0}$ Up to Going Across the Plane Through the Motion Parallax τ)

This measurement, that is, a case wherein in the method of 1.3.2 the "compound ratio transformation by the motion parallax τ (the equation (16b))" is used, will be explained in conjunction with the embodiment of FIG. 40. It is performed in accordance with a flowchart shown in FIG. 41. The following steps (7)–(12) are the same as the corresponding steps of the embodiment A-1.

(Start)

(1) A moving direction v is extracted by an "extraction unit 14 for a moving direction v" in a similar fashion to that of the step (1) of the Embodiment A-1. Next, set up the "position $p_{inf}$ at the infinite time", as being equal to the moving direction v, by a "$p_{inf}$ set unit 15" (A-6-1).

(2) Scan a normalized time parameter ${}_n t_c$ by a "scan unit for ${}_n t_c$ parameter 16" from the minimum value ${}_n t_{c,\,min}$ to the maximum value ${}_n t_{c,\,max}$ (A-6-2, A-6-3, A-6-16).

(Scan ${}_n t_c$)

(3) Scan the respective addresses from the minimum value $i_{min}$ to the maximum value $i_{max}$ (A-6-4, A-6-5, A-6-15).

(Scan i)

(4) Output positions ${}_i p_0$ and ${}_i p_1$ at the present time and the subsequent time from the "register 12 for images at the present time $t_0$" and the "register 13 for images at the subsequent time $t_1$", respectively (A-6-6).

(5) Feed positions ${}_i p_0$ and ${}_i p_1$ at the present time and the subsequent time to a "τ determination unit 28" and output a motion parallax τ (that is, ${}_i p_1 - {}_i p_0$) (A-6-7). This motion parallax is the local motion which has been described in the "Description of the Related Art". The algorithm for measuring the motion parallax and the method of implementing the algorithm are disclosed, for example, in Japanese Patent Laid Open Gazettes Hei. 05-165956, Hei. 05-165957, Hei. 06-044364, and Hei. 09-081369; "A method of performing a two-dimensional correlation and a convolution along the ρ coordinates on the Hough plane on a one-dimensional basis by Kawakami, S. and Okamoto, H., SINNGAKUGIHOU, vol. IE96-19, pp. 31–38, 1996; and "A cell model for the detection of local image motion on the magnocellular pathway of the visual cortex," Kawakami, S. and Okamoto, H., Vision Research, vol. 36, pp. 117–147, 1996.

(6) Feed four parameters ${}_n t_c$, ${}_i\tau$, ${}_i p_0$, $p_{inf}$ thus set up to a "compound ratio transformation unit 17" and output a position ${}_i p_c$. A computation of the position ${}_i p_c$ is performed by the "compound ratio transformation unit 17" in following two steps.

(a) Computation of a Central Angle ${}_i x$ Between ${}_i p_c$ and $p_{inf}$ (A-6-8)

From ${}_n t_c$, ${}_i p_0$, ${}_i p_1$, $p_{inf}$, the central angle ${}_i x$ is computed in accordance with the following equation based on the equation (16b).

$$ {}_i x = \tan^{-1}(\sin({}_i a)\sin({}_i a + {}_i\tau))/(\cos({}_i a)\sin({}_i a + {}_{i\tau}) - {}_n t_c \sin({}_i\tau))) \tag{110a}$$

(b) Computation of ${}_i p_c$ (A-6-9)

Compute the position ${}_i p_c$ on the sphere, using the above-mentioned central angle ${}_i x$, in accordance with the following equation.

$$ p_c = \cos({}_i x)\Gamma_x + \sin({}_i x)\Gamma_y \tag{110b}$$

Here, $\Gamma_x$ and $\Gamma_y$ are computed in accordance with the equation (100c) in the embodiment A-1.

(7) The above-mentioned position ${}_i p_c$ is subjected to a polar transformation into a large circle on a sphere by a "polar transformation unit 18" (A-6-10).

(Scan k (A-6-11, A-6-12, A-6-14)

(8) Points ${}_k p_{GC}$ constituting the above-mentioned large circle are transformed to points ${}_k p_{GC,Proj}$ represented by polar coordinates (inclination ${}_k\alpha_{GC,Proj}$ and radius ${}_k\beta_{GC,Proj}$) in the sectional circle of height ${}_n t_c$ of a "cylindrical arrangement voting unit 19", and voting is performed (A-6-13).

(Scan k (A-6-14)

(9) In the processing up to here, there is drawn one large circle, wherein the point of the position ${}_i p_0$ is subjected to "the compound ratio transformation and the polar transformation", in the sectional circle of ${}_nt_c$ in height. It is noted that the large circle has been transformed in accordance with the equations (103a) to (103c).

(Scan i (A-6-15))

(10) In the processing up to here, there are drawn large circles, wherein "all the points $\{{}_ip_0\}$ in the image" are subjected to the compound ratio transformation and the polar transformation, in the sectional circle of ${}_nt_c$ in height.

(Scan ${}_nt_c$ (A-6-16))

(11) In the processing up to here, there are drawn large circles, wherein "all the points $\{{}_ip_0\}$ in the image" are subjected to the compound ratio transformation and the polar transformation, in the sectional circles of $\{{}_nt_c\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 20". This maximum point is a "place wherein the large circles intersect with each other at one point". The "normalized time ${}_nt_{c0}$ up to going across the plane" is determined in the form of a "height coordinates" of the maximum point, and the "three-dimensional azimuth $n_{s0}$ of the plane" is determined in the form of a "sectional circle inside coordinates" (A-6-17).

(End)

Embodiment A-7.

(Measurement of a Three-dimensional Azimuth $n_{s0}$ of a Plane and a Normalized Time ${}_nt_{c0}$ Up to Going Across the Plane, Without Determination of a Moving Direction v, Through the Motion Parallax $\tau$)

This measurement, that is, a case wherein in the method of 1.6 the "compound ratio transformation by the motion parallax $\tau$ (the equation (16b))" is used, will be explained in conjunction with the embodiment of FIG. 42, which is one wherein the embodiment A-6 is modified. It is performed in accordance with a flowchart shown in FIG. 43. The following steps (2)–(11) are the same as the corresponding steps of the embodiment A-6.

(Start)

(0) Scan a "moving direction parameter v" over any possible directions (from the minimum value $v_{min}$ to the maximum value $v_{max}$) by a "scan unit for v parameter 21".

(Scan v)

(1) Set up the "position $p_{inf}$ after the infinite time elapses", as being equal to the parameter v, by a "$p_{inf}$ set unit 15" (A-7-3).

(2) Scan a normalized time parameter ${}_nt_c$ by a "scan unit for ${}_nt_c$ parameter 16" from the minimum value ${}_nt_{c,\,min}$ to the maximum value ${}_nt_{c,\,max}$ (A-7-4, A-7-5, A-7-17).

(Scan ${}_nt_c$)

(3) Scan the respective addresses from the minimum value $i_{min}$ to the maximum value $i_{max}$ (A-7-6, A-7-7, A-7-16).

(Scan i)

(4) Output positions ${}_ip_0$ and ${}_ip_1$ at the present time and the subsequent time from the "register 12 for images at the present time $t_0$" and the "register 13 for images at the subsequent time $t_1$", respectively (A-7-8).

(5) Feed positions ${}_ip_0$ and ${}_ip_1$ at the present time and the subsequent time to a "$\tau$ determination unit 28" and output a motion parallax $\tau$ (that is, ${}_ip_1-{}_ip_0$) (A-7-9).

(6) Feed four parameters ${}_nt_c$, ${}_i\tau$, ${}_ip_0$, $p_{inf}$ thus set up to a "compound ratio transformation unit 17" and output a position ${}_ip_c$ (A-7-10).

(7) The above-mentioned position ${}_ip_c$ is subjected to a polar transformation into a large circle on a sphere by a "polar transformation unit 18" (A-7-11).

(Scan k (A-7-12, A-7-13, A-7-15)

(8) Points ${}_kp_{GC}$ constituting the above-mentioned large circle are transformed to points ${}_kp_{GC,Proj}$ represented by polar coordinates (inclination ${}_k\alpha_{GC,Proj}$ and radius ${}_k\beta_{GC,Proj}$) in the sectional circle of height ${}_nt_c$ of a "cylindrical arrangement voting unit 19", and voting is performed (A-7-14).

(Scan k (A-7-15)

(9) In the processing up to here, there is drawn one large circle, wherein the point of the position ${}_ip_0$ is subjected to "the compound ratio transformation and the polar transformation", in the sectional circle of ${}_nt_c$ in height. It is noted that the large circle has been transformed in accordance with the equations (103a) to (103c).

(Scan i (A-7-16))

(10) In the processing up to here, there are drawn large circles, wherein "all the points $\{{}_ip_0\}$ in the image" are subjected to the compound ratio transformation and the polar transformation, in the sectional circle of ${}_nt_c$ in height.

(Scan ${}_nt_c$ (A-7-17))

(11) In the processing up to here, there are drawn large circles, wherein "all the points $\{{}_ip_0\}$ in the image" are subjected to the compound ratio transformation and the polar transformation, in the sectional circles of $\{{}_nt_c\}$ in all the heights. That is, the voting is performed for the inside of all the sectional circles of the cylindrical arrangement.

(Scan v (A-7-18))

(12) In the processing up to here, the voting is performed for all the sectional circles of the "cylindrical arrangements for all the moving direction parameters v".

(13) Extract a "specified cylindrical arrangement" wherein the intensity offers the maximum from among the cylindrical arrangements, by a "peak extraction unit 20". Thus, a true moving direction $v_0$ is determined in the form of the moving direction parameter for this arrangement. When a point, wherein the intensity offers the peak in the cylindrical arrangement, is extracted, the normalized time ${}_nt_{c0}$ up to going across the plane is determined in the form of a "height coordinates" of the maximum point, and the three-dimensional azimuth $n_{s0}$ of the plane is determined in the form of a "sectional circle inside coordinates" (A-7-19).

(End)

Embodiment A-8. (Measurement of a Three-dimensional Azimuth $n_{s0}$ of a Plane and a Normalization Shortest Distance ${}_nd_{s0}$ Through the Motion Parallax $\tau$)

This measurement, that is, a case wherein in the method of 2.2.3 the "small circle transformation by the motion parallax $\tau$ (the equation (31b))" is used, will be explained in conjunction with the embodiment of FIG. 44. It is performed in accordance with a flowchart shown in FIG. 45. The following steps (1)–(4) and (7)–(12) are the same as the corresponding steps of the embodiment A-3. Further, the following step (5) is the same as the corresponding step of the embodiment A-6.

(Start)

(1) A moving direction v is extracted by an "extraction unit 14 for a moving direction v" in a similar fashion to that of the step (1) of the Embodiment A-1. Next, set up the "position $p_{inf}$ at the infinite time", as being equal to the moving direction v, by a "$p_{inf}$ set unit 15" (A-8-1).

(2) Scan a normalization shortest distance parameter ${}_nd_s$, by a "scan unit for ${}_nd_s$ parameter 22" from the minimum value ${}_nd_{s,\,min}$ to the maximum value ${}_nd_{s,\,max}$ (A-8-2, A-8-3, A-8-15).

(Scan $_n d_s$)

(3) Scan the respective addresses from the minimum value $i_{min}$ to the maximum value $i_{max}$ (A-8-4, A-8-5, A-8-14).

(Scan i)

(4) Output positions $_i p_0$ and $_i p_1$ at the present time and the subsequent time from the "register 12 for images at the present time $t_0$" and the "register 13 for images at the subsequent time $t_1$", respectively (A-8-6).

(5) Feed positions $_i p_0$ and $_i p_1$ at the present time and the subsequent time to a "τ determination unit 28" and output a motion parallax τ (that is, $_i p_1 - _i p_0$ (A-8-7).

(6) Feed four parameters $_n d_s$, $_i\tau$, $_i p_0$, $p_{inf}$ thus set up to a "computing unit 23 for radius R" and output a radius $_i R$ and a position $_i p_0$ (A-8-8). In the unit 23, the radius $_i R$ is computed with the following equation based on the equation (31).

$$_iR = \cos^{-1}(_n d_s \sin(_i\tau)/\sin(_i a + _i\tau) \qquad (115)$$

(7) The above-mentioned radius $_i R$ and position $_i p_0$ are fed to a "small circle transformation unit 24" to perform a small circle transformation wherein the position $_i p_0$ is transformed to a "small circle on a sphere" of the radius $_i R$ taking the position $_i p_0$ as the center (A-8-9).

(Scan k (A-8-10, A-8-11, A-8-13)

(8) Points $_k p_{SC}$ constituting the above-mentioned small circle are transformed to points $_k p_{SC,Proj}$ represented by polar coordinates (inclination $_k\alpha_{SC,Proj}$ and radius $_k\beta_{SC,Proj}$) in the sectional circle of height $_n d_s$ of a "cylindrical arrangement voting unit 25", and voting is performed (A-8-12).

(Scan k (A-8-13)

(9) In the processing up to here, there is drawn one small circle, wherein the point of the position $_i p_0$ is subjected to the transformation, in the sectional circle of $_n d_s$ in height. It is noted that the small circle has been transformed in accordance with the equations (107a) to (107c).

(Scan i (A-8-14))

(10) In the processing up to here, there are drawn small circles, wherein "all the points $\{_i p_0\}$ in the image" are subjected to the transformation, in the sectional circle of $_n d_s$ in height.

(Scan $_n d_s$ (A-8-15))

(11) In the processing up to here, there are drawn small circles, wherein "all the points $\{_i p_0\}$ in the image" are subjected to the transformation, in the sectional circles of $\{_n d_s\}$ in all the heights. That is, the voting is performed for the inside of all the sectional circles of the cylindrical arrangement.

(12) Extract a "Point wherein the voted intensity offers the maximum (peak)" in the cylindrical arrangement, by a "peak extraction unit 26". This maximum point is a "place wherein the small circles intersect with each other at one point". The normalization shortest distance $_n d_s$ is determined in the form of a "height coordinates" of the maximum point, and the "three-dimensional azimuth $n_{s0}$ of the plane" is determined in the form of a "sectional circle inside coordinates" (A-8-16). FIG. 18 shows a result of a computer simulation which is performed using the above-mentioned flow.

(End)

Embodiment A-9.

(Measurement of a Three-dimensional Azimuth $n_{s0}$ of a Plane and a Normalization Shortest Distance $_n d_{s0}$, Without Determination of a Moving Direction v, Through the Motion Parallax τ)

This measurement, that is, a case wherein in the method of 2.5 the "small circle transformation by the motion parallax τ (the equation (31))" is used, will be explained in conjunction with the embodiment of FIG. 46, which is one wherein the embodiment A-8 is modified. It is performed in accordance with a flowchart shown in FIG. 47.

The following steps (2)–(11) are the same as the corresponding steps of the embodiment A-8.

(Start)

(0) Scan a "moving direction parameter v" over any possible directions (from the minimum value $v_{min}$ to the maximum value $v_{max}$) by a "scan unit for v parameter 21" (A-9-1, A-9-2, A-9-18).

(Scan v)

(1) Set up the "position $p_{inf}$ after the infinite time elapses", as being equal to the parameter v, by a "$p_{inf}$ set unit 15" (A-9-3).

(2) Scan a normalization shortest distance parameter $_n d_s$ by a "scan unit for $_n d_s$ parameter 22" from the minimum value $_n d_{s,\,min}$ to the maximum value $_n d_{s,\,max}$ (A-9-4, A-9-5, A-9-17).

(Scan $_n d_s$)

(3) Scan the respective addresses from the minimum value $i_{min}$ to the maximum value $i_{max}$ (A-9-6, A-9-7, A-9-16).

(Scan i)

(4) Output positions $_i p_0$ and $_i p_1$ at the present time and the subsequent time from the "register 12 for images at the present time $t_0$" and the "register 13 for images at the subsequent time $t_1$, respectively (A-9-8).

(5) Feed positions $_i p_0$ and $_i p_1$ at the present time and the subsequent time to a "τ determination unit 28" and output a motion parallax τ (that is, $_i p_1 - _i p_0$ (A-9-9).

(6) Feed four parameters $_n d_s$, $_i\tau$, $_i p_0$, $p_{inf}$ thus set up to a "computing unit 23 for radius R" and output a radius $_i R$ and a position $_i p_0$ (A-9-10).

(7) The above-mentioned radius $_i R$ and position $_i p_0$ are fed to a "small circle transformation unit 24" to perform a small circle transformation wherein the position $_i p_0$ is transformed to a "small circle on a sphere" of the radius $_i R$ taking the position $_i p_0$ as the center (A-9-11).

(Scan k (A-9-12, A-9-13, A-9-15)

(8) Points $_k p_{SC}$ constituting the above-mentioned small circle are transformed to points $_k p_{SC,Proj}$ represented by polar coordinates (inclination $_k\alpha_{SC,Proj}$ and radius $_k\beta_{SC,Proj}$) in the sectional circle of height $_n d_s$ of a cylindrical arrangement voting unit 25", and voting is performed (A-9-14).

(Scan k (A-9-15) (9) In the processing up to here, there is drawn one small circle, wherein the point of the position $_i p_0$ is subjected to the transformation, in the sectional circle of $_n d_s$ in height. It is noted that the small circle has been transformed in accordance with the equations (107a) to (107c).

(Scan i (A-9-16))

(10) In the processing up to here, there are drawn small circles, wherein "all the points $\{_i p_0\}$ in the image" are subjected to the transformation, in the sectional circle of $_n d_s$ in height.

(Scan $_n d_s$ (A-9-17))

(11) In the processing up to here, there are drawn small circles, wherein "all the points $\{_i p_0\}$ in the image" are subjected to the transformation, in the sectional circles of $\{_n d_s\}$ in all the heights. That is, the voting is performed for the inside of all the sectional circles of the cylindrical arrangement.

(Scan v (A-9-18))

(12) In the processing up to here, the voting is performed for all the sectional circles of the "cylindrical arrangements for all the moving direction parameters v".

(13) Extract a "specified cylindrical arrangement" wherein the intensity offers the maximum from among the cylindrical arrangements, by a "peak extraction unit 26". Thus, a true moving direction $v_0$ is determined in the form of the moving direction parameter for this arrangement. When a point, wherein the intensity offers the peak in the cylindrical arrangement, is extracted, the normalization shortest distance ${}_nd_s$ of the plane is determined in the form of a "height coordinates" of the maximum point, and the three-dimensional azimuth $n_{s0}$ of the plane is determined in the form of a "sectional circle inside coordinates" (A-9-19).

(End)

Embodiment A-10. (Measurement of a "Normalized Distance ${}_nd_{s0}$" of a Point Through the Motion Parallax $\tau$)

This measurement, that is, a case wherein in the method of 3.4 the "measurement method by the motion parallax $\tau$ (the equation (39c))" is used, will be explained in conjunction with the embodiment of FIG. 48. It is performed in accordance with a flowchart shown in FIG. 49.

(Start)

(1) A moving direction v is extracted by an "extraction unit 14 for a moving direction v" in a similar fashion to that of the step (1) of the Embodiment A-1. Next, set up the "position $p_{inf}$ after the infinite time elapses", as being equal to the moving direction v, by a $p_{inf}$ set unit 15" (A-10-1).

(2) Output positions $p_0$ and $p_1$ at the present time and the subsequent time from the "register 12 for images at the present time $t_0$" and the "register 13 for images at the subsequent time $t_1$", respectively (A-10-2).

(3) Feed positions ${}_ip_0$ and ${}_ip_1$ at the present time and the subsequent time to a "$\tau$ determination unit 28" and output a motion parallax $\tau$ (that is, ${}_ip_1-{}_ip_0$ (A-10-3).

(4) Feed three parameters $p_0$, $p_1$, $p_{inf}$ thus set up to a "computing unit 27 for point distance" and output a normalized distance ${}_nd_0$ up to a point (A-10-4). In the unit 27, the normalized distance ${}_nd_0$ is computed with the equation (39c).

(End)

Embodiment B Binocular Vision

Embodiment B-1. (Measurement of a Three-dimensional Azimuth $n_{s0}$ of a Plane and a Normalized Distance ${}_nd_{s0}$ Up to Going Across the Plane)

This measurement, that is, the method of 4.2.3 will be explained in conjunction with the embodiment of FIG. 50. It is performed in accordance with the following flowchart shown in FIG. 51. The step (6) et seqq. are the same as the embodiment A-1.

(Start)

(1) The "optical axis direction $a_{xis}$ coupling the right camera and the left camera" is generally known from the geometric position of the stereo cameras. Set up the "position $p_{axis}$ on the optical axis", as being equal to the optical axis direction $a_{xis}$, by a "$p_{axis}$ set unit 115".

(2) Scan a normalized distance parameter ${}_nd_c$ by a scan unit for ${}_nd_c$ parameter 116" from the minimum value ${}_nd_{c,\,min}$ to the maximum value ${}_nd_{c,\,max}$ (B-1-2, B-1-3, B-1-16).

(Scan ${}_nd_c$)

(3) Scan the respective addresses from the minimum value $i_{min}$ to the maximum value $i_{max}$ (B-1-4, B-1-5, B-1-15).

(Scan i)

(4) Output positions ${}_ip_R$ and ${}_ip_L$ on the right camera and the left camera from the "register 112 for an image on right cameras and the "register 113 for an image on left camera", respectively (B-1-6).

(5) Feed four parameters ${}_nd_c$, ${}_ip_R$, ${}_ip_L$, $p_{axis}$ thus set up-to a "compound ratio transformation unit 117" and output a position ${}_ip_c$. A computation of the position ${}_ip_c$ is performed by the "compound ratio transformation unit 117" in following two steps.

(a) Computation of a Central Angle ${}_ix$ Between ${}_ip_c$ and $p_{axis}$ (B-1-7)

From ${}_nd_c$, ${}_ip_R$, ${}_ip_L$, $p_{axis}$, the central angle ${}_ix$ is computed in accordance with the following equation based on the equation (58b) (cf. FIG. 23).

$$ {}_ix=\tan^{-1}(\sin({}_ic)\sin({}_id))/(\cos({}_ic)\sin({}_id)-{}_nd_s\ \sin({}_id)-({}_ic))) \tag{150a}$$

(b) Computation of ${}_ip_c$ (B-1-8)

Compute the position ${}_ip_c$ on the sphere, using the above-mentioned central angle ${}_ix$, in accordance with the following equation.

$$ {}_ip_c=\cos({}_ix)\Gamma_x+\sin({}_ix)\Gamma_y \tag{150b}$$

Here, $\Gamma_x$ and $\Gamma_y$ are computed in accordance with following equations where [X] and | | denote the exterior product operation and the absolute value operation, respectively.

$$\Gamma_x=a_{xis}$$

$$\Gamma_z=[a_{xis}\times{}_ip_R]/\|[a_{xis}\times{}_ip_R]\|$$

$$\Gamma_y=[\Gamma_z\times\Gamma_x] \tag{150c}$$

(6) The above-mentioned position ${}_ip_c$ is subjected to a polar transformation into a large circle on a sphere by a "polar transformation unit 118" (cf. FIG. 24(A)). The polar transformation is performed by the "polar transformation unit 118" in following two steps (cf. FIG. 30(A)).

(a) Transformation of ${}_ip_c$ to Polar Coordinates (B-1-9)

${}_ip_c$ is expressed on the rectangular coordinates and the "polar coordinates on a sphere" as follows.

$$ {}_ip_c=({}_ip_{cX},\ {}_ip_{cY},\ {}_ip_{cZ}) \tag{151a}$$

$$ =({}_i\alpha_c,\ {}_i\beta_c) \tag{151b}$$

Polar coordinates components (longitude ${}_i\alpha_c$ latitude ${}_i\beta_c$) of ${}_ip_c$ are computed in accordance with the following equations.

$$ {}_i\alpha_c=\tan^{-1}({}_ip_{cY}/{}_ip_{cX}) \tag{151c}$$

$$ {}_i\beta_c=\tan^{-1}(\sqrt{({}_ip_{cX}{}^2+{}_ip_{cY}{}^2)}/{}_ip_{cZ})) \tag{151d}$$

(Scan k (B-1-10, B-1-11, B-1-14)

(b) Polar Transformation of ${}_ip_c$ (B-1-12)

A large circle on a sphere, wherein the position ${}_ip_c$ is subjected to the polar transformation, that is, coordinates (longitude ${}_k\alpha_{GC}$ latitude ${}_k\beta_{GC}$) of an arbitrary point ${}_kp_{GC}$ (the address is given by k) constituting the large circle, is determined by the coordinates ${}_i\alpha_c$ and ${}_i\beta_c$ of ${}_ip_c$, and is expressed by the equation (152b).

$$_k p_{GC} = ({}_k\alpha_{GC},\ {}_k\beta_{GC}) \quad (152a)$$

$$\cos({}_k\alpha_{GC} - {}_i\alpha_c) = -\cot({}_k\beta_{GC})\cot({}_i\beta_c) \quad (152b)$$

A computation for the large circle is performed as follows in such a manner that k is scanned from the minimum value $k_{min}$ to the maximum value $k_{max}$. The latitude $_k\beta_{GC}$ is computed together $k\Delta\beta_{GC}$ where $\Delta\beta_{GC}$ denotes a latitudinal resolution, and the longitude $_k\alpha_{GC}$ is computed in accordance with the following equation using the latitude.

$$_k\alpha_{GC} = {}_i\alpha_c + \cos^{-1}(\cot({}_k\beta_{GC})\cot({}_i\beta_c)) \quad (152c)$$

(7) Points $_k p_{GC}$ constituting the above-mentioned large circle are transformed to points $_k p_{GC,Proj}$ represented by polar coordinates (inclination $_k\alpha_{GC,Proj}$ and radius $_k\beta_{GC,Proj}$) in the sectional circle of height $_n d_c$ of a "cylindrical arrangement voting unit 19", and voting is performed (B-1-13). This transformation is expressed by the following expressions wherein f ( ) is generally given as the projective function.

$$_k\beta_{GC,Proj} = f({}_k\beta_{GC}) \quad (153a)$$

$$_k\alpha_{GC,Proj} = {}_k\alpha_{GC} \quad (153b)$$

In case of the equidistant projection, f ( )=1, and $_k\beta_{GC,Proj}$ is given by the following equation.

$$_k\beta_{GC,Proj} = {}_k\beta_{GC} \quad (153c)$$

To summarize the above, the "points $_k p_{GC}$ on the sphere", which constitute the large circle, are transformed to the "points $_k p_{GC,Proj}$ on the plane" in the sectional circle, and the "brightness of the position $_i p_R$" is voted for (added to) the points thus transformed. It is possible to implement the respective sectional circle with a register arrangement or a memory arrangement.

(Scan k (B-1-14)

(8) In the processing up to here, there is drawn one large circle, wherein the point of the position $_i p_R$ is subjected to "the compound ratio transformation and the polar transformation", in the sectional circle of $_n d_c$ in height. It is noted that the large circle has been transformed in accordance with the equations (153a) to (153c).

(Scan i (B-1-15))

(9) In the processing up to here, there are drawn large circles, wherein "all the points $\{t_i p_R\}$ in the image" are subjected to the compound ratio transformation and the polar transformation, in the sectional circle of $_n d_c$ in height.

(Scan $_n d_c$ (B-1-16))

(10) In the processing up to here, there are drawn large circles, wherein "all the points $\{_i p_R\}$ in the image" are subjected to the compound ratio transformation and the polar transformation, in the sectional circles of $\{_n d_c\}$ in all the heights. That is, the voting is performed for the inside of all the sectional circles of the cylindrical arrangement.

(11) Extract a "point wherein the voted intensity offers the maximum (peak)" in the cylindrical arrangement, by a "peak extraction unit 120". This maximum point is a "place wherein the large circles intersect with each other at one point". The "normalized distance $_n d_{c0}$ up to going across the plane" is determined in the form of a "height coordinates" of the maximum point, and the "three-dimensional azimuth $n_{s0}$ of the plane" is determined in the form of a "sectional circle inside coordinates" (B-1-17).

(End)

Embodiment B-2. (Measurement of a Three-dimensional Azimuth $n_{s0}$ of a Plane and a Normalized Distance $_n d_{s0}$ Without Determination of an Optical Axis Direction $a_{xis}$)

This measurement, that is, the method of 4.2.5, will be explained in conjunction with the embodiment of FIG. 52, which is one wherein the embodiment B-1 is modified. It is performed in accordance with a.flowchart shown in FIG. 53. The following steps (2)–(10) are the same as the corresponding steps of the embodiment B-1.

(Start)

(0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 121" (B-2-1, B-2-2, B-2-17).

(Scan $a_{xis}$)

(1) Set up the "position $p_{axis}$ on the optical axis", as being equal to the parameter $a_{xis}$, by a "$p_{axis}$ set unit 115" (B-2-3).

(2) Scan a normalized distance parameter $_n d_c$ by a "scan unit for $_n d_s$ parameter 116" from the minimum value $_n d_{c,\ min}$ to the maximum value $_n d_{c,\ max}$ (B-2-4, B-2-5, B-2-16).

(Scan $_n d_c$)

(3) Scan the respective addresses from the minimum value $i_{min}$ to the maximum value $i_{max}$ (B-2-6, B-2-7, B-2-15).

(Scan i)

(4) Output positions $_i p_R$ and $_i p_L$ on the right camera and the left camera from the "register 112 for an image on the right camera and the "register 113 for an image on the left camera", respectively (B-2-8).

(5) Feed four parameters $_n d_s$, $_i p_R$, $_i p_L$, $p_{axis}$ thus set up to a "compound ratio transformation unit 117" and output a position $_i p_c$ (B-2-9).

(6) The above-mentioned position $_i p_1$ is subjected to a polar transformation into a large circle on a sphere by a "polar transformation unit 118" (B-2-10).

(Scan k (B-2-11, B-2-12, B-12-14)

(7) Points $_k p_{GC}$ constituting the above-mentioned large circle are transformed to "points in the sectional circle of height $_n d_c$" of a "cylindrical arrangement voting unit 119", and voting is performed (B-2-13).

(8) In the processing up to here, there is drawn one large circle, wherein the point of the position $_i p_R$ is subjected to "the compound ratio transformation and the polar transformation", in the sectional circle of $_n d_s$ in height. It is noted that the large circle has been transformed in accordance with the equations (153a) to (153c).

(Scan i (B-2-15))

(9) In the processing up to here, there are drawn large circles, wherein "all the points $\{_i p_R\}$ in the image" are subjected to the compound ratio transformation and the polar transformation, in the sectional circle of $_n d_c$ in height.

(Scan $_n d_c$ (B-2-16))

(10) In the processing up to here, there are drawn large circles, wherein "all the points $\{_i p_R\}$ in the image" are subjected to the compound ratio transformation and the polar transformation, in the sectional circles of $\{_n d_c\}$ in all the heights. That is, the voting is performed for the inside of all the sectional circles of the cylindrical arrangement.

(Scan $a_{xis}$ (B-2-17))

(11) In the processing up to here, the voting is performed for all the sectional circles of the "cylindrical arrangements for all the optical axis direction parameters $a_{xis}$".

(12) Extract a "specified cylindrical arrangement" wherein the intensity offers the maximum from among the cylindrical arrangements, by a "peak extraction unit 120". Thus, a true optical axis direction parameters $a_{xis0}$ is determined in the form of the optical axis direction parameters for this arrangement. When a point, wherein the intensity offers the peak in the cylindrical arrangement, is extracted, the normalized distance ${}_nd_{c0}$ up to going across the plane is determined in the form of a " height coordinates" of the maximum point, and the three-dimensional azimuth $n_{s0}$ of the plane is determined in the form of a "sectional circle inside coordinates" (B-2-18).

(End)

Embodiment B-3. (Measurement of a Three-dimensional Azimuth $n_{s0}$ of a Plane and a Normalization Shortest Distance ${}_nd_{s0}$)

This measurement, that is, the method of 4.3.2 will be explained in conjunction with the embodiment of FIG. 54. It is performed in accordance with the following flowchart shown in FIG. 55. The step (7) et seqq. are the same as those in the embodiment A-3.

(Start)

(1) Set up the "position $p_{axis}$ on the optical axis", as being equal to the optical axis direction $a_{xis}$ by a "$p_{axis}$ set unit 115" (cf. the embodiment B-1 (B-3-1)).

(2) Scan a normalization shortest distance parameter ${}_nd_s$, by a "scan unit for ${}_nd_s$ parameter 122" from the minimum value ${}_nd_{s,\,min}$ to the maximum value ${}_nd_{s,\,max}$ (B-3-2, B-3-3, B-3-15).

(Scan ${}_nd_s$)

(3) Scan the respective addresses from the minimum value $i_{min}$ to the maximum value $i_{max}$ (B-3-4, B-3-5, B-3-14).

(Scan i)

(4) Output positions ${}_ip_R$ and ${}_ip_L$ on the right camera and the left camera from the "register 112 for an image on right camera" and the "register 113 for an image on left camera", respectively (B-3-6).

(5) Feed four parameters ${}_nd_s$, ${}_ip_R$, ${}_ip_L$, $p_{axis}$ thus set up to a "computing unit 123 for radius R" and output a radius ${}_iR$ and a position ${}_ip_R$ (B-3-7). In the unit 123, the radius ${}_iR$ is computed with the following equation based on the equation (66c).

$$ {}_iR=\cos^{-1}({}_nd_s\ \sin({}_id-{}_ic)/\sin({}_id)) \quad (154)$$

(6) The above-mentioned radius ${}_iR$ and position ${}_ip_R$ are fed to a "small circle transformation unit 124" to perform a small circle transformation wherein the position ${}_ip_R$ is transformed to a "small circle on a sphere" of the radius ${}_iR$ taking the position ${}_ip_R$ as the center (cf. 4.3.2, and FIG. 27(A)). The small circle transformation is performed by the unit in following two steps (cf. FIG. 56(A)).

(a) Transformation of ${}_ip_R$ to Polar Coordinates (B-3-8)

${}_ip_R$ is expressed on the rectangular coordinates and the "polar coordinates on a sphere" as follows.

$$ {}_ip_R=({}_ip_{RX},\ {}_ip_{RY},\ {}_ip_{RZ})) \quad (155a)$$

$$ =({}_i\alpha_R,\ {}_i\beta_R) \quad (155b)$$

Polar coordinates components (longitude ${}_i\alpha_R$ latitude ${}_i\beta_R$) of ${}_ip_R$ are computed in accordance with the following equations.

$$ {}_i\alpha_0=\tan^{-1}({}_ip_{RY}/{}_ip_{RX}) \quad (155c)$$

$$ {}_i\beta_0=\tan^{-1}(\sqrt{({}_ip_{RX}^2+{}_ip_{RY}^2)}/{}_ip_{RZ}) \quad (155d)$$

(Scan k)

(b) Small Circle Transformation (B-3-11)

A large circle on a sphere, wherein the position ${}_ip_R$ is subjected to the small circle transformation, that is, coordinates (longitude ${}_k\alpha_{SC}$ latitude ${}_k\beta_{SC}$) of an arbitrary point ${}_kp_{SC}$ (the address is given by k) constituting the small circle, is determined by the coordinates ${}_i\alpha_r$ and ${}_i\beta_R$ of ${}_ip_R$, and is expressed by the equation (156b). This equation is equivalent to one in which the equation (30) is expressed using the parameters in FIG. 56(A).

$$ {}_kp_{SC}=({}_k\alpha_{SC},\ {}_k\beta_{SC}) \quad (156a)$$

$$ \cos({}_k\beta_{SC})\cos({}_i\beta_R)+\sin({}_k\beta_{SC})\sin({}_i\beta_R)\cos({}_k\alpha_{SC}-{}_i\alpha_R)=\cos({}_iR) \quad (156b)$$

A computation for the small circle is performed as follows in such a manner that k is scanned. The latitude ${}_k\beta_{SC}$ is computed together $k\Delta\beta_{SC}$ where $\Delta\beta_{SC}$ denotes a latitudinal resolution, and the longitude ${}_k\alpha_{SC}$ is computed in accordance with the following equation using the latitude.

$$ {}_k\alpha_{SC}={}_i\alpha_R+\cos^{-1}((\cos({}_iR)-\cos({}_k\beta_{SC})\cos({}_i\beta_R))/(\sin({}_k\beta_{SC})\sin({}_i\beta_R))) \quad (156c)$$

(7) Points ${}_kp_{SC}$ constituting the above-mentioned small circle are transformed to points ${}_kp_{SC,Proj}$ represented by polar coordinates (inclination ${}_k\alpha_{SC,Proj}$ and radius ${}_k\beta_{SC,Proj}$) in the sectional circle of height ${}_nd_s$ of a "cylindrical arrangement voting unit 125", and voting is performed (B-3-12). This transformation is expressed by the following expressions wherein f ( ) is given as the projective function.

$$ {}_k\beta_{SC,Proj}=f({}_k\beta_{SC}) \quad (157a)$$

$$ {}_k\alpha_{SC,Proj}={}_k\alpha_{SC} \quad (157b)$$

In case of the equidistant projection, f ( )=1, and ${}_k\beta_{SC,Proj}$ is given by the following equation.

$$ {}_k\beta_{SC,Proj}={}_k\beta_{SC} \quad (157c)$$

To summarize the above, the "points ${}_kp_{SC}$ on the sphere", which constitute the small circle, are transformed to the "points ${}_kp_{SC,Proj}$ on the plane" in the sectional circle, and the "brightness of the position ${}_ip_R$" is voted for (added to) the points thus transformed. It is possible to implement the respective sectional circle with a register arrangement or a memory arrangement.

(Scan k (B-3-13)

(8) In the processing up to here, there is drawn one small circle, wherein the point of the position ${}_ip_R$ is subjected to the transformation, in the sectional circle of ${}_nd_s$ in height. It is noted that the small circle has been transformed in accordance with the equations (157a) to (157c).

(Scan i (B-3-14))

(9) In the processing up to here, there are drawn small circles, wherein "all the points $\{{}_ip_R\}$ in the image" are subjected to the transformation, in the sectional circle of ${}_nd_s$ in height.

(Scan ${}_nd_s$, (B-3-15))

(10) In the processing up to here, there are drawn small circles, wherein "all the points $\{{}_ip_R\}$ in the image" are subjected to the transformation, in the sectional circles of $\{{}_nd_s\}$ in all the heights. That is, the voting is performed for the inside of all the sectional circles of the cylindrical arrangement.

(11) Extract a "point wherein the voted intensity offers the maximum (peak)" in the cylindrical arrangement, by a "peak extraction unit 26". This maximum point is a "place wherein the small circles intersect with each other at one point". The normalization shortest distance ${}_nd_s$ is determined in the form of a "height coordinates" of the maximum point, and the "three-dimensional azimuth $n_{s0}$ of the plane" is determined in the form of a "sectional circle inside coordinates" (B-3-16).

(End)

Embodiment 8-4. (Measurement of a Three-dimensional Azimuth $n_{s0}$ of a Plane and a Normalization Shortest Distance $_nd_{s0}$ Without Determination of an Optical Axis Direction $a_{xis}$)

This measurement, that is, the method of 4.3.3 will be explained in conjunction with the embodiment of FIG. 57, which is one wherein the embodiment B-3 is modified. It is performed in accordance with a flowchart shown in FIG. 58. The following steps (2)–(10) are the same as the corresponding steps of the embodiment B-3.

(Start)

(0) Scan an "optical axis direction $a_{xis}$" over any possible directions (from the minimum value $a_{xis,\ min}$ to the maximum value $a_{xis,\ max}$) by a "scan unit for $a_{xis}$ parameter 121" (B-4-1, B-4-2, B-4-17).

(Scan $a_{xis}$)

(1) Set up the "position $p_{axis}$ on the optical axis", as being equal to the parameter $a_{xis}$, by a "$p_{axis}$ set unit 115" (B-4-3).

(2) Scan a normalization shortest distance parameter $_nd_s$ by a "scan unit for $_nd_s$ parameter 122" from the minimum value $_nd_{s,\ min}$ to the maximum value $_nd_{s,\ max}$ (B-4-4, B-4-5, B-4-16).

(Scan $_nd_s$)

(3) Scan the respective addresses from the minimum value $i_{min}$ to the maximum value $i_{max}$ (B-4-6, B-4-7, B-4-15).

(Scan i)

(4) Output positions $_ip_R$ and $_ip_L$ on the right camera and the left camera from the "register 112 for an image on the right camera" and the "register 113 for an image on the left camera", respectively (B-4-8).

(5) Feed four parameters $_nd_s$, $_ip_R$, $_ip_L$, $p_{axis}$ thus set up to a "computing unit 123 for radius R" and output a radius $_iR$ and a position $_ip_R$ (B-4-9).

(6) The above-mentioned radius $_iR$ and position $_ip_R$ are fed to a "small circle transformation unit 124" to perform a small circle transformation wherein the position $_ip_R$ is transformed to a "small circle on a sphere" of the radius $_iR$ taking the position $_ip_R$ as the center (B-4-10).

(7) Points $_kp_{SC}$ constituting the above-mentioned small circle are transformed to points $_kp_{SC,Proj}$ represented by polar coordinates (inclination $_k\alpha_{SC,Proj}$ and radius $_k\beta_{SC,Proj}$) in the sectional circle of height $_nd_s$ of a "cylindrical arrangement voting unit 125", and voting is performed (B-4-13).

(Scan k (B-4-14)

(8) In the processing up to here, there is drawn one small circle, wherein the point of the position $_ip_R$ is subjected to the transformation, in the sectional circle of $_nd_s$ in height. It is noted that the small circle has been transformed in accordance with the equations (157a) to (157c).

(Scan i (B-4-15))

(9) In the processing up to here, there are drawn small circles, wherein "all the points $\{_ip_R\}$ in the image" are subjected to the transformation, in the sectional circle of $_nd_s$ in height.

(Scan $_nd_s$ (B-4-16))

(10) In the processing up to here, there are drawn small circles, wherein "all the points $\{_ip_R\}$ in the image" are subjected to the transformation, in the sectional circles of $\{_nd_s\}$ in all the heights. That is, the voting is performed for the inside of all the sectional circles of the cylindrical arrangement.

(Scan v (B-4-17))

(11) In the processing up to here, the voting is performed for all the sectional circles of the "cylindrical arrangements for all the optical axis direction parameters $a_{xis}$".

(12) Extract a "specified cylindrical arrangement" wherein the intensity offers the maximum from among the cylindrical arrangements, by a "peak extraction unit 26". Thus, a true moving direction $a_{xis0}$ is determined in the form of the optical axis direction parameter for this arrangement. When a point, wherein the intensity offers the peak in the cylindrical arrangement, is extracted, the normalization shortest distance $_nd_s$ is determined in the form of a "height coordinates" of the maximum point, and the three-dimensional azimuth $n_{s0}$ of the plane is determined in the form of a "sectional circle inside coordinates" (B-4-18).

(End)

Embodiment B-5. (Measurement of a "Normalized Distance $_nd_0$ of a Point")

This measurement, that is, the method of 4.4.3 will be explained in conjunction with the embodiment of FIG. 59. It is performed in accordance with the following flowchart shown in FIG. 60.

(Start)

(1) Set up the "position $p_{axis}$ on the optical axis", as being equal to the optical axis direction $a_{xis}$, by a "$p_{axis}$ set unit 115" (cf. the embodiment B-1 (B-5-1)).

(2) Output positions $p_R$ and $p_L$ on the right camera and the left camera from the "register 112 for an image on right camera" and the "register 113 for an image on left camera", respectively (B-5-2).

(3) Feed three parameters $p_R$, $p_L$, $p_{axis}$ thus set up to a "computing unit 127 for point distance" and output a normalized distance $_nd_0$ up to a point (B-5-3). In the unit 27, the normalized distance $_nd_0$ is computed with the equation (67b).

(End)

Embodiment B-6. (Measurement of a Three-dimensional Azimuth $n_{s0}$ of a Plane and a Normalized Distance $_nd_{c0}$ Through the Binocular Parallax $\sigma$)

This measurement, that is, a case wherein in the method of 4.2.3 the "compound ratio transformation by the binocular parallax $\sigma$ (the equation (60b))" is used, will be explained in conjunction with the embodiment of FIG. 61. It is performed in accordance with a flowchart shown in FIG. 62. The following steps (7)–(12) are the same as the corresponding steps of the embodiment B-1.

(Start)

(1) Set up the "position $p_{axis}$ on the optical axis", as being equal to the optical axis direction $a_{xis}$ by a "$p_{axis}$ set unit 115" (cf. the embodiment B-1).

(2) Scan a normalized distance parameter $_nd_c$ by a "scan unit for $_nd_c$ parameter 116" from the minimum value $_nd_{c,\ min}$ to the maximum value $_nd_{c,\ max}$ (B-6-2, B-6-3, B-6-16).

(Scan $_nd_c$)

(3) Scan the respective addresses from the minimum value $i_{min}$ to the maximum value $i_{max}$ (B-6-4, B-6-5, B-6-15).

(Scan i)

(4) Output positions $_ip_R$ and $_ip_L$ on the right camera and the left camera from the "register 112 for an image on right camera" and the "register 113 for an image on left camera", respectively (B-6-6).

(5) Feed positions $_ip_R$ and $_ip_L$ on the right camera and the left camera to a "σ determination unit 128" and output a binocular parallax $_i\sigma$ (that is, $_ipL\text{-}_ip_R$) (B-6-7). The algorithm for measuring the binocular parallax and the method of implementing the algorithm are disclosed, for example, in Japanese Patent Laid Open Gazettes Hei. 05-165956, Hei. 05-165957, Hei. 06-044364, and Hei. 09-081369; "A method of performing a two-dimensional correlation and a convolution along the ρ coordinates on the Hough plane on a one-dimensional basis by Kawakami, S. and Okamoto, H., SINNGAKUGIHOU, vol. IE96-19, pp. 31–38, 1996.

(6) Feed four parameters $_nd_c$, $_i\sigma$, $_ip_R$, $p_{axis}$ thus set up to a "compound ratio transformation unit 117" and output a position $_ip_c$. A computation of the position $_ip_c$ is performed by the "compound ratio transformation unit 117" in following two steps.

(a) Computation of a Central Angle $_ix$ Between $_ip_c$ and $p_{axis}$ (B-6-8)

From $_nd_c$, $_i\sigma$, $_ip_R$, $p_{axis}$, the central angle $_ix$ is computed in accordance with the following equation based on the equation (60b).

$$_ix=\tan^{-1}((\sin(_ic)\sin(_ic+_1\sigma))/(\cos(_ic)\sin(_ic+_i\sigma)-_nd_c\sin(_i\sigma))) \quad (160a)$$

(b) Computation of $_ip_c$ (B-6-9)

Compute the position $_ip_c$ on the sphere, using the above-mentioned central angle $_ix$, in accordance with the following equation.

$$_ip_c=\cos(_ix)\Gamma_x+\sin(_ix)\Gamma_y \quad (160b)$$

Here, $\Gamma_x$, and $\Gamma_y$ are computed in accordance with the equation (150c) in the embodiment B-1.

(7) The above-mentioned position $_ip_c$ is subjected to a polar transformation into a large circle on a sphere by a "polar transformation unit 118" (B-6-10).

(Scan k (B-6-11, B-6-12, B-6-14)

(8) Points $_kp_{GC}$ constituting the above-mentioned large circle are transformed to points $_kp_{GC,Proj}$ represented by polar coordinates (inclination $_k\alpha_{GC,Proj}$ and radius $_k\beta_{GC,Proj}$) in the sectional circle of height $_nd_c$ of a cylindrical arrangement voting unit 119", and voting is performed (B-6-13).

(Scan k (B-6-14))

(9) In the processing up to here, there is drawn one large circle, wherein the point of the position $_ip_R$ is subjected to "the compound ratio transformation and the polar transformation", in the sectional circle of $_nd_c$ in height. It is noted that the large circle has been transformed in accordance with the equations (153a) to (153c).

(Scan i (B-6-15))

(10) In the processing up to here, there are drawn large circles, wherein "all the points $\{_ip_R\}$ in the image" are subjected to the compound ratio transformation and the polar transformation, in the sectional circle of $_nd_c$ in height.

(Scan $_nd_c$ (B-6-16))

(11) In the processing up to here, there are drawn large circles, wherein "all the points $\{_ip_R\}$ in the image" are subjected to the compound ratio transformation and the polar transformation, in the sectional circles of $\{_nd_c\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 120". This maximum point is a "place wherein the large circles intersect with each other at one point". The "normalized distance $_nd_0$ up to going across the plane" is determined in the form of a "height coordinates" of the maximum point, and the "three-dimensional azimuth $n_{s0}$ of the plane" is determined in the form of a "sectional circle inside coordinates" (B-6-17).

(End)

Embodiment B-7.

(Measurement of a Three-dimensional Azimuth $n_{s0}$ of a Plane and a Normalized Distance $_nd_{c0}$ Up to Going Across the Plane, Without Determination of an Optical Axis Direction $a_{xis}$, Through the Binocular Parallax σ)

This measurement, that is, a case wherein in the method of 4.2.5 the "compound ratio transformation by the binocular parallax σ (the equation (60b))" is used, will be explained in conjunction with the embodiment of FIG. 63, which is one wherein the embodiment B-6 is modified. It is performed in accordance with a flowchart shown in FIG. 64.

The following steps (2)–(11) are the same as the corresponding steps of the embodiment B-6.

(Start)

(0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 121".

(Scan $a_{xis}$)

(1) Set up the "position $p_{axis}$ on the optical axis", as being equal to the parameter $a_{xis}$, by a "$p_{axis}$ set unit 115" (B-7-3).

(2) Scan a normalized distance parameter $_nd_c$ by a "scan unit for $_nd_c$ parameter 116" from the minimum value $_nd_{c,\ min}$ to the maximum value $_nd_{c,\ max}$ (B-7-4, B-7-5, B-7-17).

(Scan $_nd_c$)

(3) Scan the respective addresses from the minimum value $i_{min}$ to the maximum value $i_{max}$ (B7-6, B-7-7, B-7-16).

(Scan i)

(4) Output positions $_ip_R$ and $_ip_L$ on the right camera and the left camera from the "register 112 for an image on right camera" and the "register 113 for an image on left camera", respectively (B-7-8).

(5) Feed positions $_ip_R$ and $_ip_L$ on the right camera and the left camera to a "σ determination unit 128" and output a binocular parallax $_i\sigma$ (that is, $_ip_L-_ip_R$) (B-7-9).

(6) Feed four parameters $_nd_c$, $_i\sigma$, $_ip_R$, $p_{axis}$ thus set up to a "compound ratio transformation unit 117" and output a position $_ip_c$ (B-7-10).

(7) The above-mentioned position $_ip_c$ is subjected to a polar transformation into a large circle on a sphere by a "polar transformation unit 118" (B-7-11).

(Scan k (B-7-12, B-7-13, B-7-15)

(8) Points $_kp_{GC}$ constituting the above-mentioned large circle are transformed to points $_kp_{GC,Proj}$ represented by polar coordinates (inclination $_k\alpha_{GC,Proj}$ and radius $_k\beta_{GC,Proj}$) in the sectional circle of height $_nd_c$ of a "cylindrical arrangement voting unit 119", and voting is performed (B-7-14).

(Scan k (B-7-15))

(9) In the processing up to here, there is drawn one large circle, wherein the point of the position $_ip_R$ is subjected to "the compound ratio transformation and the polar transformation", in the sectional circle of $_nd_c$ in height. It is noted that the large circle has been transformed in accordance with the equations (153a) to (153c).

(Scan i (B-7-16))

(10) In the processing up to here, there are drawn large circles, wherein "all the points $\{_ip_R\}$ in the image" are subjected to the compound ratio transformation and the polar transformation, in the sectional circle of $_nd_c$ in height.

(Scan $_nd_c$ (B-7-17))

(11) In the processing up to here, there are drawn large circles, wherein "all the points $\{_ip_R\}$ in the image" are subjected to the compound ratio transformation and the polar transformation, in the sectional circles of $\{{}_nd_c\}$ in all the heights. That is, the voting is performed for the inside of all the sectional circles of the cylindrical arrangement.

(Scan $a_{xis}$ (B-7-18))

(12) In the processing up to here, the voting is performed for all the sectional circles of the "cylindrical arrangements for all the optical axis direction parameters $a_{xis}$".

(13) Extract a "specified cylindrical arrangement" wherein the intensity offers the maximum from among the cylindrical arrangements, by a "peak extraction unit 120". Thus, a true optical axis direction $a_{xis0}$ is determined in the form of the optical axis direction parameter for this arrangement. When a point, wherein the intensity offers the peak in the cylindrical arrangement, is extracted, the normalized distance ${}_nd_{c0}$ up to going across the plane is determined in the form of a "height coordinates" of the maximum point, and the three-dimensional azimuth $n_{s0}$ of the plane is determined in the form of a "sectional circle inside coordinates" (B-7-19).

(End)

Embodiment B-8. (Measurement of a Three-dimensional Azimuth $n_{s0}$ of a Plane and a Normalization Shortest Distance ${}_nd_{s0}$ Through the Binocular Parallax σ)

This measurement, that is, a case wherein in the method of 4.3.2 the "small circle transformation by the binocular parallax σ (the equation (66b))" is used, will be explained in conjunction with the embodiment of FIG. 65. It is performed in accordance with a flowchart shown in FIG. 66. The following steps (1)–(4) and (7)–(12) are the same as the corresponding steps of the embodiment B-3. Further, the following step (5) is the same as the corresponding step of the embodiment B-6.

(Start)

(1) Set up the "position $p_{axis}$ on the optical axis", as being equal to the optical axis direction $a_{xis}$, by a "$p_{axis}$ set unit 115" (cf. the embodiment B-1 (B-8-1)).

(2) Scan a normalization shortest distance parameter ${}_nd_s$ by a "scan unit for ${}_nd_s$ parameter 122" from the minimum value ${}_nd_{s,\,min}$ to the maximum value ${}_nd_{s,\,max}$ (B-8-2, B-8-3, B-8-15).

(Scan ${}_nd_s$)

(3) Scan the respective addresses from the minimum value $i_{min}$ to the maximum value $i_{max}$ (B-8-4, B-8-5, B-8-14).

(Scan i)

(4) Output positions ${}_ip_R$ and ${}_ip_L$ on the right camera and the left camera from the "register 112 for an image on right camera" and the "register 113 for an image on left camera", respectively (B-8-6).

(5) Feed positions ${}_ip_R$ and ${}_ip_L$ on the right camera and the left camera to a "σ determination unit 128" and output a binocular parallax σ (that is, ${}_ip_L-{}_ip_R$) (B-8-7).

(6) Feed four parameters ${}_nd_s$, ${}_i\sigma$, ${}_ip_R$, $p_{axis}$ thus set up to a "computing unit 123 for radius R" and output a radius ${}_iR$ and a position ${}_ip_R$ (B-8-8). In the unit 123, the radius ${}_iR$ is computed with the following equation based on the equation (66a).

$${}_iR=\cos^{-1}({}_nd_s\,\sin({}_i\sigma)/\sin({}_ic+{}_i\sigma)) \quad (161)$$

(7) The above-mentioned radius ${}_iR$ and position ${}_ip_R$ are fed to a "small circle transformation unit 124" to perform a small circle transformation wherein the position ${}_ip_R$ is transformed to a "small circle on a sphere" of the radius ${}_iR$ taking the position ${}_ip_R$ as the center (B-8-9).

(Scan k (B-8-10, B-8-11, B-8-13))

(8) Points ${}_kp_{SC}$ constituting the above-mentioned small circle are transformed to points ${}_kp_{SC,Proj}$ represented by polar coordinates (inclination ${}_k\alpha_{SC,Proj}$ and radius ${}_k\beta_{SC,Proj}$) in the sectional circle of height ${}_nd_s$ of a "cylindrical arrangement voting unit 125", and voting is performed (B-8-12).

(Scan k (B-8-13))

(9) In the processing up to here, there is drawn one small circle, wherein the point of the position ${}_ip_R$ is subjected to the transformation, in the sectional circle of ${}_nd_s$ in height. It is noted that the small circle has been transformed in accordance with the equations (157a) to (157c).

(Scan i (B-8-14))

(10) In the processing up to here, there are drawn small circles, wherein "all the points $\{{}_ip_R\}$ in the image" are subjected to the transformation, in the sectional circle of ${}_nd_s$ in height.

(Scan ${}_nd_s$ (B-8-15))

(11) In the processing up to here, there are drawn small circles, wherein "all the points $\{{}_ip_R\}$ in the image" are subjected to the transformation, in the sectional circles of $\{{}_nd_s\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 126". This maximum point is a "place wherein the small circles intersect with each other at one point". The normalization shortest distance ${}_nd_0$ is determined in the form of a "height coordinates" of the maximum point, and the "three-dimensional azimuth $n_{s0}$ of the plane" is determined in the form of a "sectional circle inside coordinates" (B-8-16).

(End)

Embodiment B-9.

(Measurement of a Three-dimensional Azimuth $n_{s0}$ of a Plane and a Normalization Shortest Distance ${}_nd_{s0}$ Without Determination of an Optical Axis Direction $a_{xis}$, Through the Binocular Parallax σ)

This measurement, that is, a case wherein in the method of 4.3.3 the "small circle transformation by the binocular parallax σ (the equation (66a))" is used, will be explained in conjunction with the embodiment of FIG. 67, which is one wherein the embodiment B-8 is modified. It is performed in accordance with a flowchart shown in FIG. 68. The following steps (2)–(11) are the same as the corresponding steps of the embodiment B-8.

(Start)

(0) Scan an "optical axis direction parameter $a_{xis}$ over any possible directions (from the minimum value $a_{xis,\,min}$ to the maximum value $a_{xis,\,max}$)by a "scan unit for $a_{xis}$ parameter 121".

(Scan $a_{xis}$)

(1) Set up the "position $p_{axis}$ on the optical axis", as being equal to the parameter $a_{xis}$, by a "$p_{axis}$ set unit 115" (B-9-3).

(2) Scan a normalization shortest distance parameter ${}_nd_s$ by a "scan unit for ${}_nd_s$, parameter 122" from the minimum value ${}_nd_s$, min to the maximum value ${}_nd_{s,\,max}$ (B-9-4, B-9-5, B-9-17).

(Scan ${}_nd_s$)

(3) Scan the respective addresses from the minimum value $i_{min}$ to the maximum value $i_{max}$ (B-9-6, B-9-7, B9-16).

(Scan i)

(4) Output positions ${}_ip_R$ and ${}_ip_L$ on the right camera and the left camera from the "register 112 for an image on right camera" and the "register 113 for an image on left camera", respectively (B-9-8).

(5) Feed positions ${}_ip_R$ and ${}_ip_L$ on the right camera and the left camera to a "σ determination unit 128" and output a binocular parallax σ (that is, ${}_ip_L - {}_ip_R$) (B-9-9).

(6) Feed four parameters ${}_nd_s$, ${}_i\sigma$, ${}_ip_R$, $p_{axis}$ thus set up to a "computing unit 123 for radius R" and output a radius ${}_iR$ and a position ${}_ip_R$ (B-9-10).

(7) The above-mentioned radius ${}_iR$ and position ${}_ip_R$ are fed to a "small circle transformation unit 124" to perform a small circle transformation wherein the position ${}_ip_R$ is transformed to a "small circle on a sphere" of the radius ${}_iR$ taking the position ${}_ip_R$ as the center (B-9-11).

(Scan k (B-9-12, B-9-13, B-9-15)

(8) Points ${}_kp_{SC}$ constituting the above-mentioned small circle are transformed to points ${}_kp_{SC,Proj}$ represented by polar coordinates (inclination ${}_k\alpha_{SC,Proj}$ and radius ${}_k\beta_{SC,Proj}$) in the sectional circle of height ${}_nd_s$ of a "cylindrical arrangement voting unit 125", and voting is performed (B-9-14).

(Scan k (B-9-15))

(9) In the processing up to here, there is drawn one small circle, wherein the point of the position ${}_ip_R$ is subjected to the transformation, in the sectional circle of ${}_nd_s$ in height. It is noted that the small circle has been transformed in accordance with the equations (157a) to (157c).

(Scan i (B-9-16))

(10) In the processing up to here, there are drawn small circles, wherein "all the points ${}_ip_R$) in the image" are subjected to the transformation, in the sectional circle of ${}_nd_s$ in height.

(Scan ${}_nd_s$ (B-9-17))

(11) In the processing up to here, there are drawn small circles, wherein "all the points $\{{}_ip_R\}$ in the image" are subjected to the transformation, in the sectional circles of $\{{}_nd_s\}$ in all the heights. That is, the voting is performed for the inside of all the sectional circles of the cylindrical arrangement.

(Scan $a_{xis}$ (B-9-18))

(12) In the processing up to here, the voting is performed for all the sectional circles of the "cylindrical arrangements for all the optical axis direction parameters $a_{xis}$".

(13) Extract a "specified cylindrical arrangement" wherein the intensity offers the maximum from among the cylindrical arrangements, by a "peak extraction unit 126". Thus, a true optical axis direction $a_{xis0}$ is determined in the form of the optical axis direction parameter for this arrangement. When a point, wherein the intensity offers the peak in the cylindrical arrangement, is extracted, the normalization shortest distance ${}_nd_s$ of the plane is determined in the form of a "height coordinates" of the maximum point, and the three-dimensional azimuth $n_{s0}$ of the plane is determined in the form of a "sectional circle inside coordinates" (B-9-19).

(End)

Embodiment B-10. (Measurement of a "Normalized Distance ${}_nd_0$ of a Point Through the Binocular Parallax σ)

This measurement, that is, a case wherein in the method of 4.4.3 the "measurement method by the binocular parallax σ (the equation (67c))" is used, will be explained in conjunction with the embodiment of FIG. 69. It is performed in accordance with a flowchart shown in FIG. 70.

(Start)

(1) Set up the "position $p_{axis}$ on the optical axis", as being equal to the optical axis direction $a_{xis}$, by a "$p_{axis}$ set unit 115" (cf. the embodiment B-1) (B-10-1).

(2) Output positions $p_R$ and $p_L$ on the right camera and the left camera from the "register 112 for an image on right camera" and the "register 113 for an image on left camera", respectively (B-10-2).

(3) Feed positions ${}_ip_R$ and ${}_ip_L$ on the right camera and the left camera to a"σ determination unit 128" and output a binocular parallax ${}_i\sigma$ (that is, ${}_ip_L - {}_ip_R$) (B-10-3).

(4) Feed three parameters $p_R$, σ, $p_{axis}$ thus set up to a "computing unit 127 for point distance" and output a normalized distance ${}_nd_0$ up to a point (B-10-4). In the unit 127, the normalized distance ${}_nd_0$ is computed with the equation (67c).

(End)

Embodiment C-1. (Measurement of a Three-dimensional Azimuth $n_{s0}$ of a Plane and a Normalization Shortest Distance ${}_nd_{s0}$ Through the Motion Parallax τ)

This measurement, that is, a case wherein in the method of 2.1 the motion parallax τ is used, will be explained in conjunction with the embodiment of FIG. 71. It is performed in accordance with a flowchart shown in FIG. 72.

(Start)

(1) A moving direction v is extracted by an "extraction unit 14 for a moving direction v" in a similar fashion to that of the step (1) of the Embodiment A-1. Next, set up the "position $p_{inf}$ at the infinite time", as being equal to the moving direction v, by a "$p_{inf}$ set unit 15" (C-1-1).

(2) Scan a normalization shortest distance parameter ${}_nd_s$ by a "scan unit for ${}_nd_s$ parameter 221" from the minimum value ${}_nd_{s,\,min}$ to the maximum value ${}_nd_{s,\,max}$ (C-1-2, C-1-3, C-1-14).

(Scan ${}_nd_s$)

(3) Scan the respective addresses from the minimum value $i_{min}$ to the maximum value $i_{max}$ (C-1-4, C-1-5, C-1-13).

(Scan i)

(4) Output positions ${}_ip_0$ and ${}_ip_1$ at the present time and the subsequent time from the "register 12 for images at the present time $t_0$" and the "register 13 for images at the subsequent time $t_1$", respectively (C-1-6).

(5) Feed positions ${}_ip_0$ and ${}_ip_1$ at the present time and the subsequent time to a "τ determination unit 28" in a similar fashion to that of the step (5) of the embodiment A-6, and output a motion parallax ${}_i\tau$ (that is, ${}_ip_1 - {}_ip_0$) (C-1-7).

(6) Consider a circle (FIG. 13) of radius r taking the moving direction v as the center, and scan the radius r from 0 to π/2 by a "scan unit for radius r 222" (C-1-8, C-1-9, C-1-12).

(7) Feed five parameters ${}_nd_s$, ${}_ip_0$, $p_{inf}$, ${}_i\tau$, r thus set up to a "computing unit 223 for small circle structural element ${}^i_rn_{s+}$, ${}^i_rn_{s-}$" and output two cross points ${}^i_rn_{s+}$, ${}^i_rn_{s-}$ in 2.1 (4) (C-1-10). As proved in 2.2.1, those cross points are structural elements of the "small circle of the radius ${}_iR$ taking ${}_ip_0$ as its center". "Polar coordinates (longitudes ${}^i_r\alpha_{s+}$, ${}^i_r\alpha_{s-}$ latitudes ${}^i_r\beta_{s+}$, ${}^i_r\beta_{s-}$) of the cross points ${}^i_rn_{s+}$, ${}^i_rn_{s-}$ are computed in accordance with the following equations based on the equation (29).

$${}^i_r\beta_{s+}=r$$

$${}^i_r\beta_{s-}=r \tag{200}$$

$${}^i_r\alpha_{s+}={}_i\alpha_a+\cos^{-1}(((({}_nd_s\sin({}_i\tau)/\sin({}_ia+{}_i\tau))-\cos(r)\cos({}_ia))/(\sin(r)-\sin({}_ia)))$$

$${}^i_r\alpha_{s-}={}_i\alpha_a-\cos^{-1}(((({}_nd_s\sin({}_i\tau)/\sin({}_ia+{}_i\tau))-\cos(r)\cos({}_ia))/\sin(r)-\sin({}_ia))) \tag{200b}$$

where ${}_i\alpha_a$ and ${}_ia$ denote the longitude coordinates and the latitude coordinates of ${}_ip_0$, respectively (cf. FIG. 14).

(8) Points ${}^i{}_rn_{s+}$, ${}^i{}_rn_{s-}$ constituting the above-mentioned small circle are transformed to points ${}^i{}_rn_{s+,Proj}$, ${}^i{}_rn_{s-,Proj}$ represented by polar coordinates (inclination ${}^i{}_r\alpha_{s+,Proj}$, ${}^i{}_r\alpha_{s-,Proj}$, and radius ${}^i{}_r\beta_{s+,Proj}$, ${}^i{}_r\beta_{s-,Proj}$) in the sectional circle of height ${}_nd_s$ of a "cylindrical arrangement voting unit 224", and voting is performed (C-1-11). The voting is performed through adding "brightness of the position ${}_ip_0$". This transformation is expressed by the following expressions wherein f ( ) is given as the projective function (cf. the step (7) of the embodiment A-1.

$${}^i{}_r\beta_{s+,Proj}=f({}^i{}_r\beta_{s+})$$

$${}^i{}_r\beta_{s-,Proj}=f({}^i{}_r\beta_{s-}) \quad (201a)$$

$${}^i{}_r\alpha_{s+,Proj}={}^i{}_r\alpha_{s+}$$

$${}^i{}_r\alpha_{s-,Proj}={}^i{}_r\alpha_{s-} \quad (201b)$$

In case of the equidistant projection, f ( )=1, and ${}_r\beta_{s+}$, ${}_r\beta_{s-}$ are given by the following equation.

$${}^i{}_r\beta_{s+,Proj}={}^i{}_r\beta_{s+}$$

$${}^i{}_r\beta_{s-,Proj}={}^i{}_r\beta_{s-} \quad (201c)$$

To summarize the above, the "points ${}^i{}_rn_{s+}$, ${}^i{}_rn_{s-}$ on the sphere", which constitute the small circle, are transformed to the "points ${}^i{}_rn_{s+,Proj}$, ${}^i{}_rn_{s-,Proj}$ on the plane" in the sectional circle, and the "brightness of the position ${}_ip_0$" is voted for (added to) the points thus transformed. It is possible to implement the respective sectional circle with a register arrangement or a memory arrangement.

(Scan r (C-1-12)

(9) In the processing up to here, there is drawn one small circle, wherein the point of the position ${}_ip_0$ is subjected to the transformation, in the sectional circle of ${}_nd_s$ in height. It is noted that the small circle has been transformed in accordance with the equations (201a) to (201c).

(Scan i (C-1-13))

(10) In the processing up to here, there are drawn small circles, wherein "all the points $\{{}_ip_0\}$ in the image" are subjected to the transformation, in the sectional circle of ${}_nd_s$ in height.

(Scan ${}_nd_s$ (C-1-14))

(11) In the processing up to here, there are drawn small circles, wherein "all the points $\{{}_ip_0\}$ in the image" are subjected to the transformation, in the sectional circles of $\{{}_nd_s\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 225" (C-1-15). This maximum point is a "place wherein the small circles intersect with each other at one point". The normalization shortest distance ${}_nd_s$ is determined in the form of a "height coordinates" of the maximum point, and the "three-dimensional azimuth $n_{s0}$ of the plane" is determined in the form of a "sectional circle inside coordinates"

(End)

Embodiment C-2.

(Measurement of a Three-dimensional Azimuth $n_{s0}$ of a Plane and a Normalization Shortest Distance ${}_nd_{s0}$, Without Determination of a Moving Direction v, Through the Motion Parallax $\tau$)

This measurement, that is, a case wherein in the method of 2.5 the "small circle transformation by the motion parallax $\tau$" in 2.1 is used, will be explained in conjunction with the embodiment of FIG. 73. It is performed in accordance with a flowchart shown in FIG. 74. The following steps (2)–(11) are the same as the corresponding steps of the embodiment C-1.

(Start)

(0) Scan a "moving direction parameter v" over any possible directions (from the minimum value $v_{min}$ to the maximum value $v_{max}$) by a "scan unit for v parameter 21" (C-2-1, C-2-2, C-2-17).

(Scan v)

(1) Set up the "position $p_{inf}$ after the infinite time elapses", as being equal to the parameter v, by a "$p_{inf}$ set unit 15" (C-2-3).

(2) Scan a normalization shortest distance parameter ${}_nd_s$ by a "scan unit for ${}_nd_s$ parameter 221" from the minimum value ${}_nd_{s,\,min}$ to the maximum value ${}_nd_{s,\,max}$ (C-2-4, C-2-5, C-2-16).

(Scan ${}_nd_s$)

(3) Scan the respective addresses from the minimum value $i_{min}$ to the maximum value $i_{max}$ (C-2-6, C-2-7, C-2-15).

(Scan i)

(4) Output positions ${}_ip_0$ and ${}_ip_1$ at the present time and the subsequent time from the "register 12 for images at the present time $t_0$" and the "register 13 for images at the subsequent time $t_1$", respectively (C-2-8).

(5) Feed positions ${}_ip_0$ and ${}_ip_1$ at the present time and the subsequent time to a "$\tau$ determination unit 28" in a similar fashion to that of the step (5) of the embodiment A-6 and output a motion parallax ${}_i\tau$ (that is, ${}_ip_1-{}_ip_0$) (C-2-9).

(6) Consider a circle (FIG. 13) of radius r taking the moving direction v as the center, and scan the radius r from 0 to $\pi/2$ by a "scan unit for radius r 222" (C-2-10, C-2-11, C-2-14).

(7) Feed five parameters ${}_nd_s$, ${}_ip_0$, $p_{inf}$, ${}_i\tau$, r thus set up to a "computing unit 223 for small circle structural element ${}^i{}_rn_{s+}$, ${}^i{}_rn_{s-}$" and output two cross points ${}^i{}_rn_{s+}$, ${}^i{}_rn_{s-}$ in 2.1 (4) (C-2-12).

(8) Points ${}^i{}_rn_{s+}$, ${}^i{}_rn_{s-}$ constituting the above-mentioned small circle are transformed to points ${}^i{}_rn_{s+,Proj}$, ${}^i{}_rn_{s-,Proj}$ represented by polar coordinates (inclination ${}^i{}_r\alpha_{s+,Proj}$, ${}^i{}_r\alpha_{s-,Proj}$, and radius ${}^i{}_r\beta_{s+,Proj}$, ${}^i{}_r\beta_{s-,Proj}$) in the sectional circle of height ${}_nd_s$ of a "cylindrical arrangement voting unit 224", and voting is performed (C-2-13).

(Scan r (C-2-16)

(9) In the processing up to here, there is drawn one small circle, wherein the point of the position ${}_ip_0$ is subjected to the transformation, in the sectional circle of ${}_nd_s$, in height. It is noted that the small circle has been transformed in accordance with the equations (201a) to (201c).

(Scan i (C-2-15))

(10) In the processing up to here, there are drawn small circles, wherein "all the points $\{{}_ip_0\}$ in the image" are subjected to the transformation, in the sectional circle of ${}_nd_s$ in height.

(Scan ${}_nd_s$ (C-1-14))

(11) In the processing up to here, there are drawn small circles, wherein "all the points $\{{}_ip_0\}$ in the image" are subjected to the transformation, in the sectional circles of $\{{}_nd_s\}$ in all the heights. That is, the voting is performed for the inside of all the sectional circles of the cylindrical arrangement.

(Scan v (C-2-17))

(12) In the processing up to here, the voting is performed for all the sectional circles of the "cylindrical arrangements for all the moving direction parameters v".

(13) Extract a "specified cylindrical arrangement" wherein the intensity offers the maximum from among the cylindrical arrangements, by a "peak extraction unit 225". Thus, a true moving direction $v_0$ is determined in the form of the moving direction parameter for this arrangement. When a point, wherein the intensity offers the peak in the cylindrical arrangement, is extracted, the normalization shortest distance ${}_nd_s$ of the plane is determined in the form of a "height coordinates" of the maximum point, and the three-dimensional azimuth $n_{s0}$ of the plane is determined in the form of a "sectional circle inside coordinates" (C-2-18).

(End)

Embodiment C-3. (Measurement of a Three-dimensional Azimuth $n_{s0}$ of a Plane and a Normalization Shortest Distance ${}_nd_{s0}$ Through the Binocular Parallax σ)

This measurement, that is, a case wherein in the method of 4.3.1 the binocular parallax σ is used, will be explained in conjunction with the embodiment of FIG. 75. It is performed in accordance with a flowchart shown in FIG. 76. The steps (8) et seqq. are the same as the corresponding steps of the embodiment C-1 when ${}_ip_R$ and $\{{}_ip_R\}$ are replaced by ${}_ip_0$ and $\{{}_ip_0\}$, respectively.

(Start)

(1) Set up the "position $p_{axis}$ on the optical axis", as being equal to the optical axis direction $a_{xis}$, by a "$p_{axis}$ set unit 115" (cf. the step (1) of the embodiment B-1).

(2) Scan a normalization shortest distance parameter ${}_nd_s$ by a "scan unit for ${}_nd_s$ parameter 221" from the minimum value ${}_nd_{s,\ min}$ to the maximum value ${}_nd_{s,\ max}$ (C-3-2, C-3-3, C-3-14).

(Scan ${}_nd_s$)

(3) Scan the respective addresses from the minimum value $i_{min}$ to the maximum value $i_{max}$ (C-3-4, C-3-5, C-3-13).

(Scan i)

(4) Output positions ${}_ip_R$ and ${}_ip_L$ on the right camera and the left camera from the "register 112 for an image on right camera" and the "register 113 for an image on left camera", respectively (C-3-6).

(5) Feed positions ${}_ip_R$ and ${}_ip_L$ on the right camera and the left camera to a "σ determination unit 128" and output a binocular parallax ${}_i\sigma$ (that is, ${}_ip_L - {}_ip_R$) (cf. the step (5) of the embodiment B-6 (C-3-7)).

(6) Consider a circle (FIG. 26) of radius r taking the moving direction v as the center, and scan the radius r from 0 to π/2 by a "scan unit for radius r 222" (C-3-8, C-3-9, C-3-12).

(Scan r)

(7) Feed five parameters ${}_nd_s$, ${}_ip_0$, $p_{inf}$, ${}_i\sigma$, r thus set up to a "computing unit 223 for small circle structural element ${}^i{}_rn_{s+}$, ${}^i{}_rn_{s-}$" and output two cross points ${}^i{}_rn_{s+}$, ${}^i{}_rn_{s-}$ in 4.3.1 (4) (C-3-10). As proved in 4.3.2, those cross points are structural elements of the "small circle of the radius ${}_iR$ taking ${}_ip_0$ as its center". "Polar coordinates (longitudes ${}^i{}_r\alpha_{s+}$, ${}^i{}_r\alpha_{s-}$, latitudes ${}^i{}_r\beta_{s+}$, ${}^i{}_r\beta_{s-}$) of the cross points ${}^i{}_rn_{s+}$, ${}^i{}_rn_{s-}$ are computed in accordance with the following equations as described in 4.3.1 (4).

$${}^i{}_r\beta_+ = r$$

$${}^i{}_r\beta_- = r \tag{210a}$$

$${}^i{}_r\alpha_{s+} = {}_i\alpha_c + \cos^{-1}(((_nd_s\ \sin({}_i\sigma)/\sin({}_ic+{}_i\sigma)) - \cos(r)\cos({}_ic))/(\sin(r)-\sin({}_ic)))$$

$${}^i{}_r\alpha_{s-} = {}_i\alpha_c - \cos^{-1}(((_nd_s\ \sin({}_i\sigma)/\sin({}_ic+{}_i\sigma)) - \cos(r)\cos({}_ic))/(\sin(r)-\sin({}_ic))) \tag{210b}$$

(8) Points ${}^i{}_rn_{s+}$, ${}^i{}_rn_{s-}$ constituting the above-mentioned small circle are transformed to points ${}^i{}_rn_{s+,Proj}$, ${}^i{}_rn_{s-,Proj}$ represented by polar coordinates (inclination ${}^i{}_r\alpha_{s+,Proj}$, ${}^i{}_r\alpha_{s-,Proj}$, and radius ${}^i{}_r\beta_{s+,Proj}$, ${}^i{}_r\beta_{s-,Proj}$) in the sectional circle of height ${}_nd_s$ of a "cylindrical arrangement voting unit 224", and voting is performed (C-3-11).

(Scan r (C-3-12).

(9) In the processing up to here, there is drawn one small circle, wherein the point of the position ${}_ip_R$ is subjected to the transformation, in the sectional circle of ${}_nd_s$ in height. It is noted that the small circle has been transformed in accordance with the equations (201a) to (201c).

(Scan i (C-3-13))

(10) In the processing up to here, there are drawn small circles, wherein "all the points $\{{}_ip_R\}$ in the image" are subjected to the transformation, in the sectional circle of ${}_nd_s$ in height.

(Scan ${}_nd_s$ (C-3-14))

(11) In the processing up to here, there are drawn small circles, wherein "all the points $\{{}_ip_R\}$ in the image" are subjected to the transformation, in the sectional circles of $\{{}_nd_s\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 225" (C-3-15). This maximum point is a "place wherein the small circles intersect with each other at one point". The normalization shortest distance ${}_nd_s$ is determined in the form of a "height coordinates" of the maximum point, and the "three-dimensional azimuth $n_{s0}$ of the plane" is determined in the form of a "sectional circle inside coordinates"

(End)

Embodiment C-4.

(Measurement of a Three-dimensional Azimuth $n_{s0}$ of a Plane and a Normalization Shortest Distance ${}_nd_{s0}$, Without Determination of an Optical Axis Direction $a_{xis}$, Through the Binocular Parallax σ)

This measurement, that is, a case wherein in the method of 4.3.3 the binocular parallax τ is used with respect to 4.3.1, will be explained in conjunction with the embodiment of FIG. 77, which is one wherein the embodiment C-3 is modified. It is performed in accordance with a flowchart shown in FIG. 78. The following steps (1)–(11) are the same as the corresponding steps of the embodiment C-3.

(Start)

(0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 121" (C-4-1, C-4-2, C-4-17).

(Scan $a_{xis}$)

(1) Set up the "position $p_{axis}$ on the optical axis", as being equal to the parameter $a_{xis}$, by a "$p_{axis}$ set unit 115" (C-4-3).

(2) Scan a normalization shortest distance parameter ${}_nd_s$ by a "scan unit for ${}_nd_s$ parameter 221" from the minimum value ${}_nd_{s,\ min}$ to the maximum value ${}_nd_{s,\ max}$ (C-4-4, C-4-5, C-4-16).

(Scan ${}_nd_s$)

(3) Scan the respective addresses from the minimum value $i_{min}$ to the maximum value $i_{max}$ (C-4-6, C-4-7, C-4-15).

(Scan i)

(4) Output positions ${}_ip_R$ and ${}_ip_L$ on the right camera and the left camera from the "register 112 for an image on right camera" and the "register 113 for an image on left camera", respectively (C-4-8).

(5) Feed positions ${}_ip_R$ and ${}_ip_L$ on the right camera and the left camera to a "σ determination unit 128" and output a binocular parallax ${}_i\sigma$ (that is, ${}_ip_L - {}_ip_R$) (C-4-9).

(6) Consider a circle (FIG. 26) of radius r taking the moving direction v as the center, and scan the radius r from 0 to π/2 by a "scan unit for radius r 222" (C-4-10, C-4-11, C-4-14).

(7) Feed five parameters ${}_nd_s$, ${}_ip_0$, $p_{inf}$, ${}_i\sigma$, r thus set up to a "computing unit 223 for small circle structural element ${}^i{}_rn_{s+}$, ${}^i{}_rn_{s-}$" and output two cross points ${}^i{}_rn_{s+}$, ${}^i{}_rn_{s-}$ in 4.3.1 (4) (C-4-12).

(8) Points ${}^i{}_rn_{s+}$, ${}^i{}_rn_{s-}$ constituting the above-mentioned small circle are transformed to points ${}^i{}_rn_{s+,Proj}$, ${}^i{}_rn_{s-,Proj}$ represented by polar coordinates (inclination ${}^i{}_r\alpha_{s+,Proj}$, ${}^i{}_r\alpha_{s-,Proj}$, and radius ${}^i{}_r\beta_{s+,Proj}$, ${}^i{}_r\beta_{s-,Proj}$) in the sectional circle of height ${}_nd_s$ of a "cylindrical arrangement voting unit 224", and voting is performed (C-4-13).

(Scan r (C-4-14).

(9) In the processing up to here, there is drawn one small circle, wherein the point of the position ${}_ip_R$ is subjected to the transformation, in the sectional circle of ${}_nd_s$ in height. It is noted that the small circle has been transformed in accordance with the equations (201a) to (201c).

(Scan i (C-4-15))

(10) In the processing up to here, there are drawn small circles, wherein "all the points $\{{}_ip_R\}$ in the image" are subjected to the transformation, in the sectional circle of ${}_nd_s$ in height.

(Scan ${}_nd_s$ (C-4-16))

(11) In the processing up to here, there are drawn small circles, wherein "all the points $\{{}_ip_R\}$ in the image" are subjected to the transformation, in the sectional circles of $\{{}_nd_s\}$ in all the heights. That is, the voting is performed for the inside of all the sectional circles of the cylindrical arrangement.

(Scan $a_{xis}$ (C-4-17))

(12) In the processing up to here, the voting is performed for all the sectional circles of the "cylindrical arrangements for all the optical axis direction parameters $a_{xis}$".

(13) Extract a "specified cylindrical arrangement" wherein the intensity offers the maximum from among the cylindrical arrangements, by a "peak extraction unit 225". Thus, a true optical axis direction $a_{xis0}$ is determined in the form of the optical axis direction parameter for this arrangement. When a point, wherein the intensity offers the peak in the cylindrical arrangement, is extracted, the normalization shortest distance ${}_nd_s$ of the plane is determined in the form of a "height coordinates" of the maximum point, and the three-dimensional azimuth $n_{s0}$ of the plane is determined in the form of a "sectional circle inside coordinates" (C-4-18).

(End)

Embodiment C-5. (Measurement of a Three-dimensional Azimuth $n_{s0}$ of a Plane and a Normalization Shortest Distance ${}_nd_{s0}$)

This measurement, that is, the method of 2.1 will be explained in conjunction with the embodiment of FIG. 79. It is performed in accordance with the following flowchart shown in FIG. 80. The following steps (7)–(11) are the same as the steps (8)–(12) of the embodiment C-1.

(Start)

(1) A moving direction v is extracted by an "extraction unit 14 for a moving direction v" in a similar fashion to that of the step (1) of the Embodiment A-1. Next, set up the "position $p_{inf}$ at the infinite time", as being equal to the moving direction v, by a "$p_{inf}$ set unit 15" (C-5-1).

(2) Scan a normalization shortest distance parameter ${}_nd_s$ by a "scan unit for ${}_nd_s$ parameter 221" from the minimum value ${}_nd_{s,\,min}$ to the maximum value ${}_nd_{s,\,max}$ (C-5-2, C-5-3, C-5-13).

(Scan ${}_nd_s$)

(3) Scan the respective addresses from the minimum value $i_{min}$ to the maximum value $i_{max}$ (C-5-4, C-5-5, C-5-12).

(Scan i)

(4) Output positions ${}_ip_0$ and ${}_ip_1$ at the present time and the subsequent time from the "register 12 for images at the present time $t_0$" and the "register 13 for images at the subsequent time $t_1$", respectively.

(5) Consider a circle (FIG. 13) of radius r taking the moving direction v as the center, and scan the radius r from 0 to π/2 by a "scan unit for radius r 222" (C-5-7, C-5-8, C-5-11).

(6) Feed five parameters ${}_nd_s$, ${}_ip_0$, ${}_ip_1$, $p_{inf}$, r thus set up to a "computing unit 223 for small circle structural element ${}^i{}_rn_{s+}$, ${}^i{}_rn_{s-}$" and output two cross points ${}^i{}_rn_{s+}$, ${}^i{}_rn_{s-}$ in 2.1 (4). As proved in 2.2.1, those cross points are structural elements of the "small circle of the radius ${}_1R$ taking ${}_ip_0$ as its center. "Polar coordinates (longitudes ${}^i{}_r\alpha_{s+}$, ${}^i{}_r\alpha_{s-}$, latitudes ${}^i{}_r\beta_{s+}$, ${}^i{}_r\beta_{s-}$) of the cross points ${}^i{}_rn_{s+}$, ${}^i{}_rn_{s-}$ are computed in accordance with the following equations with modification of the equation (29).

$$
\begin{aligned}
&{}^i{}_r\beta_{s+}=r\\
&{}^i{}_r\beta_{s-}=r && (220a)\\
&{}^i{}_r\alpha_{s+}={}_i\alpha_a+\cos^{-1}((({}_nd_s\ \sin({}_ib-{}_ia)/\sin({}_ib))-\cos(r)\cos({}_ia))/(\sin(r)-\sin({}_ia)))\\
&{}^i{}_r\alpha_{s-}={}_i\alpha_a-\cos^{-1}((({}_nd_s\ \sin({}_ib-{}_ia)/\sin({}_ib))-\cos(r)\cos({}_ia))/(\sin(r)-\sin({}_ia))) && (220b)
\end{aligned}
$$

where ${}_i\alpha_a$ and ${}_ia$ denote the longitude coordinates and the latitude coordinates of ${}_ip_0$, respectively, and ${}_ib$ denotes the latitude coordinates of ${}_ip_1$ (cf. FIG. 14 and FIG. 9).

(7) Points ${}^i{}_rn_{s+}$, ${}^i{}_rn_{s-}$ constituting the above-mentioned small circle are transformed to points ${}^i{}_rn_{s+,Proj}$, ${}^i{}_rn_{s-,Proj}$ represented by polar coordinates (inclination ${}^i{}_r\alpha_{s+,Proj}$, ${}^i{}_r\alpha_{s-,Proj}$, and radius ${}^i{}_r\beta_{s+,Proj}$, ${}^i{}_r\beta_{s-,Proj}$) in the sectional circle of height ${}_nd_s$, of a "cylindrical arrangement voting unit 224", and voting is performed (cf. the step (8) of the embodiment C-1 (C-5-10).

(Scan r (C-5-11)

(8) In the processing up to here, there is drawn one small circle, wherein the point of the position ${}_ip_0$ is subjected to the transformation, in the sectional circle of ${}_nd_s$ in height. It is noted that the small circle has been transformed in accordance with the equations (201a) to (201c).

(Scan i (C-5-12))

(9) In the processing up to here, there are drawn small circles, wherein "all the points $\{{}_ip_0\}$ in the image" are subjected to the transformation, in the sectional circle of ${}_nd_s$ in height.

(Scan ${}_nd_s$ (C-5-12))

(10) In the processing up to here, there are drawn small circles, wherein "all the points $\{{}_ip_0\}$ in the image" are subjected to the transformation, in the sectional circles of $\{{}_nd_s\}$ in all the heights. That is, the voting is performed for the inside of all the sectional circles of the cylindrical arrangement.

(11) Extract a "point wherein the voted intensity offers the maximum (peak)" in the cylindrical arrangement, by a "peak extraction unit 225". This maximum point is a place wherein the small circles intersect with each other at one point". The normalization shortest distance ${}_n d_s$ is determined in the form of a "height coordinates" of the maximum point, and the "three-dimensional azimuth $n_{s0}$ of the plane" is determined in the form of a "sectional circle inside coordinates" (C-5-14).

(End)

Embodiment C-6. (Measurement of a Three-dimensional Azimuth $n_{s0}$ of a Plane and a Normalization Shortest Distance ${}_n d_{s0}$ Without Determination of a Moving Direction v)

This measurement, that is, the method of 2.5 will be explained in conjunction with the embodiment of FIG. 81 in connection with 2.1. It is performed in accordance with a flowchart shown in FIG. 82. The following steps (2)–(10) are the same as the corresponding steps of the embodiment C-5.

(Start)

(0) Scan a "moving direction parameter v" over any possible directions (from the minimum value $v_{min}$ to the maximum value $v_{max}$) by a "scan unit for v parameter 21" (C-6-1, C-6-2, C-6-16).

(Scan v)

(1) Set up the "position $p_{inf}$ after the infinite time elapses", as being equal to the parameter v, by a "$p_{inf}$ set unit 15" (C-6-3).

(2) Scan a normalization shortest distance parameter ${}_n d_s$ by a "scan unit for ${}_n d_s$ parameter 221" from the minimum value ${}_n d_{s,\,min}$ to the maximum value ${}_n d_{s,\,max}$ (C-6-4, C-6-5, C-6-15).

(Scan ${}_n d_s$)

(3) Scan the respective addresses from the minimum value $i_{min}$ to the maximum value $i_{max}$ (C-6-6, C-6-7, C-6-14).

(Scan i)

(4) Output positions ${}_i p_0$ and ${}_i p_1$ at the present time and the subsequent time from the "register 12 for images at the present time $t_0$" and the "register 13 for images at the subsequent time $t_1$", respectively (C-6-8).

(5) Consider a circle (FIG. 13) of radius r taking the moving direction v as the center, and scan the radius r from 0 to $\pi/2$ by a "scan unit for radius r 222" (C-6-9, C-6-10, C-6-13).

(6) Feed five parameters ${}_n d_s$, ${}_i p_0$, ${}_i p_1$, $p_{inf}$, r thus set up to a "computing unit 223 for small circle structural element ${}^i{}_r n_{s+}$, ${}^i{}_r n_{s-}$" and output two cross points ${}^i{}_r n_{s+}$, ${}^i{}_r n_{s-}$ in 2.1 (4) (C-6-11).

(7) Points ${}^i{}_r n_{s+}$, ${}^i{}_r n_{s-}$ constituting the above-mentioned small circle are transformed to points ${}^i{}_r n_{s+,Proj}$, ${}^i{}_r n_{s-,Proj}$ represented by polar coordinates (inclination ${}^i{}_r \alpha_{s+,Proj}$, ${}^i{}_r \alpha_{s-,Proj}$, and radius ${}^i{}_r \beta_{s+,Proj}$, ${}^i{}_r \beta_{s-,Proj}$)in the sectional circle of height ${}_n d_s$ of a "cylindrical arrangement voting unit 224", and voting is performed (cf. the step (8) of the embodiment C-1 (C-6-12).

(Scan r (C-6-13)

(8) In the processing up to here, there is drawn one small circle, wherein the point of the position ${}_i p_0$ is subjected to the transformation, in the sectional circle of ${}_n d_s$ in height. It is noted that the small circle has been transformed in accordance with the equations (201a) to (201c).

(Scan i (C-6-14))

(9) In the processing up to here, there are drawn small circles, wherein "all the points $\{{}_i p_0\}$ in the image" are subjected to the transformation, in the sectional circle of ${}_n d_s$ in height.

(Scan ${}_n d_s$ (C-6-15))

(10) In the processing up to here, there are drawn small circles, wherein "all the points $\{{}_i p_0\}$ in the image" are subjected to the transformation, in the sectional circles of $\{{}_n d_s\}$ in all the heights. That is, the voting is performed for the inside of all the sectional circles of the cylindrical arrangement.

(Scan v (C-6-16)

(11) In the processing up to here, the voting is performed for all the sectional circles of the "cylindrical arrangements for all the moving direction parameters v".

(12) Extract a "specified cylindrical arrangement" wherein the intensity offers the maximum from among the cylindrical arrangements, by a speak extraction unit 225". Thus, a true moving direction $v_0$ is determined in the form of the moving direction parameter for this arrangement. When a point, wherein the intensity offers the peak in the cylindrical arrangement, is extracted, the normalization shortest distance ${}_n d_s$ is determined in the form of a "height coordinates" of the maximum point, and the three-dimensional azimuth $n_{s0}$ of the plane is determined in the form of a "sectional circle inside coordinates" (C-6-17).

(End)

Embodiment C-7. (Measurement of a Three-dimensional Azimuth $n_{s0}$ of a Plane and a Normalization Shortest Distance ${}_n d_{s0}$)

This measurement, that is, the method of 4.3.1 will be explained in conjunction with the embodiment of FIG. 83. It is performed in accordance with the following flowchart shown in FIG. 84. The step (7) et seqq. are the same as those in the embodiment C-5, when ${}_i p_R$ and $\{{}_i p_R\}$ are replaced by ${}_i p_0$ and $\{{}_i p_0\}$, respectively.

(Start)

(1) Set up the "position $p_{axis}$ on the optical axis", as being equal to the optical axis direction $a_{xis}$, by a "$p_{axis}$ set unit 115" (cf. the embodiment B-1 (C-7-1)).

(2) Scan a normalization shortest distance parameter ${}_n d_s$ by a "scan unit for $d_5$ parameter 221" from the minimum value ${}_n d_{s,\,min}$ to the maximum value ${}_n d_{s,\,max}$ (C-7-2, C-7-3, C-7-13).

(Scan ${}_n d_s$)

(3) Scan the respective addresses from the minimum value $i_{min}$ to the maximum value $i_{max}$ (C-7-4, C-7-5, C-7-12).

(Scan i)

(4) Output positions ${}_i p_R$ and ${}_i p_L$ on the right camera and the left camera from the "register 112 for an image on right camera" and the "register 113 for an image on left camera", respectively (C-7-6).

(5) Consider a circle (FIG. 26) of radius r taking the moving direction v as the center, and scan the radius r from 0 to $\pi/2$ by a "scan unit for radius r 222" (C-7-8, C-7-9, C-7-11).

(6) Feed five parameters ${}_n d_s$, ${}_i p_R$, ${}_i p_L$, $p_{axis}$, r thus set up to a "computing unit 223 for small circle structural element ${}^i{}_r n_{s+}$, ${}^i{}_r n_{s-}$" and output two cross points ${}^i{}_r n_{s+}$, ${}^i{}_r n_{s-}$ in 4.3.1 (4). As proved in 4.3.2, those cross points are structural elements of the "small circle of the radius ${}_i R$ taking ${}_i p_R$ as its center". "Polar coordinates (longitudes ${}^i{}_r \alpha_{s+}$, ${}^i{}_r \alpha_{s-}$, latitudes ${}^i{}_r \beta_{s+}$, ${}^i{}_r \beta_{s-}$) of the cross points ${}^i{}_r n_{s+}$, ${}^i{}_r n_{s-}$ are computed in accordance with the following equations with modification of the equation (65c).

$${}^i{}_r \beta_{s+} = r$$

$$^{i}{}_{r}\beta_{s-}=r \quad (230a)$$

$$^{i}{}_{r}\alpha_{s+}={}_{i}\alpha_{c}+\cos^{-1}(((_{n}d_{s}\sin(_{i}d-_{i}c)/\sin(_{i}d))-\cos(r)\cos(_{i}c))/(\sin(r)-\sin(_{i}c)))$$

$$^{i}{}_{r}\alpha_{s-}={}_{i}\alpha_{c}-\cos^{-1}(((_{n}d_{s}\sin(_{i}d-_{i}c)/\sin(_{i}d))-\cos(r)\cos(_{i}c))/(\sin(r)-\sin(_{i}c))) \quad (230b)$$

where ${}_{i}\alpha_{c}$ and ${}_{i}c$ denote the longitude coordinates and the latitude coordinates of ${}_{i}p_{R}$, respectively, and ${}_{i}d$ denotes the latitude coordinates of ${}_{i}p_{L}$ (cf. FIG. 26 and FIG. 23).

(7) Points $^{i}{}_{r}n_{s+}$, $^{i}{}_{r}n_{s-}$ constituting the above-mentioned small circle are transformed to points $^{i}{}_{r}n_{s+,Proj}$, $^{i}{}_{r}n_{s-,Proj}$ represented by polar coordinates (inclination $^{i}{}_{r}\alpha_{s+,Proj}$, $^{i}{}_{r}\alpha_{s-,Proj}$ and radius $^{i}{}_{r}\beta_{s+,Proj}$, $^{i}{}_{r}\beta_{s-,Proj}$) in the sectional circle of height ${}_{n}d_{s}$ of a "cylindrical arrangement voting unit 224", and voting is performed (C-7-10).

(Scan r (C-7-11)

(8) In the processing up to here, there is drawn one small circle, wherein the point of the position ${}_{i}p_{r}$ is subjected to the transformation, in the sectional circle of ${}_{n}d_{s}$ in height. It is noted that the small circle has been transformed in accordance with the equations (201a) to (201c).

(Scan i (C-7-12))

(9) In the processing up to here, there are drawn small circles, wherein "all the points $\{{}_{i}p_{R}\}$ in the image" are subjected to the transformation, in the sectional circle of ${}_{n}d_{s}$ in height.

(Scan ${}_{n}d_{s}$ (C-7-13))

(10) In the processing up to here, there are drawn small circles, wherein "all the points $\{{}_{i}p_{R}\}$ in the image" are subjected to the transformation, in the sectional circles of $\{{}_{n}d_{s}\}$ in all the heights. That is, the voting is performed for the inside of all the sectional circles of the cylindrical arrangement.

(11) Extract a "point wherein the voted intensity offers the maximum (peak)" in the cylindrical arrangement, by a "peak extraction unit 225". This maximum point is a "place wherein the small circles intersect with each other at one point". The normalization shortest distance ${}_{n}d_{s}$ is determined in the form of a "height coordinates" of the maximum point, and the "three-dimensional azimuth ${}_{n}d_{s}$ of the plane" is determined in the form of a "sectional circle inside coordinates" (C-7-14).

(End)

Embodiment C-8. (Measurement of a Three-dimensional Azimuth $n_{s0}$ of a Plane and a Normalization Shortest Distance ${}_{n}d_{s0}$ Without Determination of an Optical Axis Direction $a_{xis}$)

This measurement, that is, the method of 4.3.3 will be explained in conjunction with the embodiment of. FIG. 85 with respect to 4.3.1, which is one wherein the embodiment C-7 is modified. It is performed in accordance with a flowchart shown in FIG. 86. The following steps (2)–(10) are the same as the corresponding steps of the embodiment B-3.

(Start)

(0) Scan an "optical axis direction $a_{xis}$" over any possible directions (from the minimum value $a_{xis,\,min}$ to the maximum value $a_{xis,\,max}$) by a "scan unit for $a_{xis}$ parameter 121" (C-8-1, C-8-2, C-8-16).

(Scan $a_{xis}$)

(1) Set up the "position $p_{axis}$ on the optical axis", as being equal to the parameter $a_{xis}$ by a "$p_{axis}$ set unit 115" (C-8-3).

(2) Scan a normalization shortest distance parameter ${}_{n}d_{s}$ by a "scan unit for ${}_{n}d_{s}$ parameter 221" from the minimum value ${}_{n}d_{s,\,min}$ to the maximum value ${}_{n}d_{s,\,max}$ (C-8-4, C-8-5, C-8-15).

(Scan ${}_{n}d_{s}$)

(3) Scan the respective addresses from the minimum value $i_{min}$ to the maximum value $i_{max}$ (C-8-6, C-8-7, C-8-14).

(Scan i)

(4) Output positions ${}_{i}p_{R}$ and ${}_{i}p_{L}$ on the right camera and the left camera from the "register 112 for an image on right camera" and the "register 113 for an image on left camera", respectively (C-8-8).

(5) Consider a circle (FIG. 26) of radius r taking the moving direction v as the center, and scan the radius r from 0 to π/2 by a "scan unit for radius r 222" (C-8-9, C-8-10, C-8-13).

(6) Feed five parameters ${}_{n}d_{s}$, ${}_{i}p_{R}$, ${}_{i}p_{L}$, r thus set up to a "computing unit 223 for small circle structural element $^{i}{}_{r}n_{s+}$, $^{i}{}_{r}n_{s-}$" and output two cross points $^{i}{}_{r}n_{s+}$, $^{i}{}_{r}n_{s-}$ in 4.3.1 (4) (C-8-11).

(7) Points $^{i}{}_{r}n_{s+}$, $^{i}{}_{r}n_{s-}$ constituting the above-mentioned small circle are transformed to points $^{i}{}_{r}n_{s+,Proj}$, $^{i}{}_{r}n_{s-,Proj}$ represented by polar coordinates (inclination $^{i}{}_{r}\alpha_{s+,Proj}$, $^{i}{}_{r}\alpha_{s-,Proj}$, and radius $^{i}{}_{r}\beta_{s+,Proj}$, $^{i}{}_{r}\beta_{s-,Proj}$) in the sectional circle of height ${}_{n}d_{s}$ of a "cylindrical arrangement voting unit 224", and voting is performed (C-8-12).

(Scan r (C-8-13)

(8) In the processing up to here, there is drawn one small circle, wherein the point of the position ${}_{i}p_{0}$ is subjected to the transformation, in the sectional circle of ${}_{n}d_{s}$, in height. It is noted that the small circle has been transformed in accordance with the equations (201a) to (201c).

(Scan i (C-8-14))

(9) In the processing up to here, there are drawn small circles, wherein "all the points $\{{}_{i}p_{R}\}$ in the image" are subjected to the transformation, in the sectional circle of ${}_{n}d_{s}$ in height.

(Scan ${}_{n}d_{s}$ (C-8-15))

(10) In the processing up to here, there are drawn small circles, wherein "all the points $\{{}_{i}p_{R}\}$ in the image" are subjected to the transformation, in the sectional circles of $\{{}_{n}d_{s}\}$ in all the heights. That is, the voting is performed for the inside of all the sectional circles of the cylindrical arrangement.

(Scan $a_{xis}$ (C-8-16))

(11) In the processing up to here, the voting is performed for all the sectional circles of the "cylindrical arrangements for all the optical axis direction parameters $a_{xis}$".

(12) Extract a "specified cylindrical arrangement" wherein the intensity offers the maximum from among the cylindrical arrangements, by a "peak extraction unit 225". Thus, a true moving direction $a_{xis0}$ is determined in the form of the optical axis direction parameter for this arrangement. When a point, wherein the intensity offers the peak in the cylindrical arrangement, is extracted, the normalization shortest distance ${}_{n}d_{s}$ is determined in the form of a "height coordinates" of the maximum point, and the three-dimensional azimuth $n_{s0}$ of the plane is determined in the form of a "sectional circle inside coordinates" (C-8-17).

(End)

Embodiment D-1. (Normalized Time)

This embodiment will be explained in conjunction with the embodiment of FIG. 87. It is performed in accordance with the following flowchart shown in FIG. 88.

(1) Extract the moving direction v in a similar fashion to that of the step (1) in the embodiment A-1, and set up the "position $p_{inf}$ after the infinite time elapses", as being equal to the moving direction v, by a "$p_{inf}$ set unit 15" (D-1-1).

(2) Scan the respective addresses i from the minimum value $i_{min}$ to the maximum value $i_{max}$ by a "scan unit 401 for pixel No. i" (D-1-2, D-1-3, D-1-17).

(Scan i)

Figure 1:
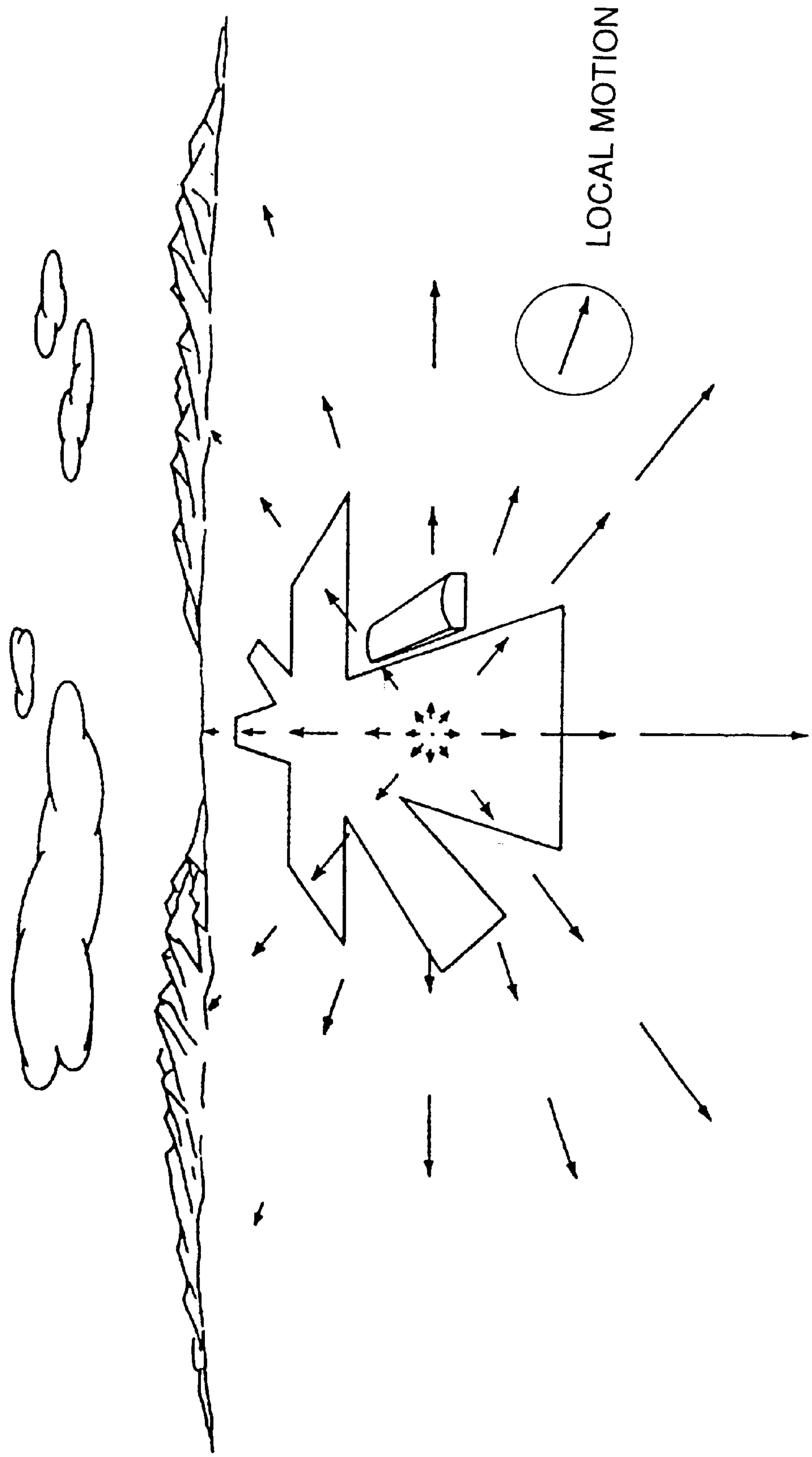
FIG. 1 is an explanatory view useful for understanding an optical flow pattern.

(3) Cut and bring down images on local areas taking a "pixel ${}_ip_0$ associated with the address i" as the center from images at present time $t_0$ and the subsequent time $t_1$, which are obtained by a camera 11, as to the present time $t_0$ and the subsequent time $t_1$, respectively, as shown in FIG. 159, by a "unit 402 for cutting and bringing down images on local areas taking ${}_ip_0$ as the center" (cf. FIG. 1 of Japanese Patent Laid Open Gazette Hei. 09-081369; and FIG. 1 of SINNGAKUGIHOU (Kawakami, Okamoto, vol. IE-19, pp. 31–38, 1996) (D-1-4).

(4) Scan the motion parallax No. k from the minimum value $k_{min}$ to the maximum value $k_{max}$ by a "scan unit 403 for motion parallax No. k" (D-1-5, D-1-6, D-1-16).

(Scan k)

(5) The number k is a serial number of the motion parallax, and is associated with the motion parallax ${}_k\tau$, that is, the motion vector $({}_k\tau_x, {}_k\tau_y)$, as shown in FIG. 160. Such an association is performed by a "transformation unit 404 for motion parallax ${}_k\tau$" to output the motion parallax ${}_k\tau$ (D-1-7).

In the event that the direction of the motion parallax ${}_k\tau$, that is, the motion vector $({}_k\tau_x, {}_k\tau_y)$ is different from the "direction from ${}_ip_0$ to v (that is, $p_{inf}$)" in FIG. 10(A), it is the motion parallax which conflicts with this moving direction v. Thus, in this case, the process skips to the step (10) (D-1-8).

(6) Feed the "images on local areas at present time $t_0$ and the subsequent time $t_1$" and the "motion parallax ${}_k\tau$" to a "motion parallax detection unit 405" (cf. FIG. 159) to compute the response intensity in accordance with the following equation (D-1-9).

$$\text{Response intensity}=\Sigma_x\Sigma_y\, {}_ia_0(x, y)\, {}_ia_1(x-{}_k\tau_x, y-{}_k\tau_y) \tag{301}$$

Here, ${}_ia_0$ (x, y) and ${}_ia_1$ (x, y) denote intensity of (x, y) pixels on an image on a local area at the present time (cf. the upper left of FIG. 159) and intensity of (x, y) pixels on an image on a local area at the subsequent time (cf. the lower left of FIG. 159), respectively.

Incidentally, with respect to the computation of the above-mentioned response intensity, for the purpose of simplification, there is shown the two-dimensional correlation. However, it is acceptable to adopt a two-dimensional correlation according to the difference absolute value generally used in the MPEG2 encoder for example, a two-dimensional correlation according to the multiplicative operation, and a correlation according to the Hough transformation and the inverse Hough transformation ("A method of performing a two-dimensional correlation and a convolution along the σ coordinates on the Hough plane on a one-dimensional basis" by Kawakami, S. and Okamoto, H., SINNGAKUGIHOU, vol. IE96-19, pp. 31–38, 1996; and Japanese Patent Laid Open Gazettes Hei. 05-165956, Hei. 05-165957, Hei. 06-044364, and Hei. 09-081369). Further, it is also acceptable to adopt a method of detecting the velocity such as a differential gradient method. That is, anyone is acceptable, as the response intensity, which is determined in accordance with intensity of a pixel. In this respect, the theory is applicable to all the embodiments of the present invention which are involved in determination of the response intensity.

(7) Scan a normalized time parameter ${}_nt_c$ by a "scan unit for ${}_nt_c$ parameter 16" from the minimum value ${}_nt_{c,\,min}$ to the maximum value ${}_nt_{c,\,max}$ (D-1-10, D-1-11, D-1-15).

(Scan ${}_nt_c$)

The following processing is performed in a similar fashion to that of the above-mentioned embodiment A-6. But, the present embodiment D-1 is different from the embodiment A-6 in the point that in the step (10) such a processing that "the response intensity of the motion parallax detection unit is voted" is performed.

(8) Transform the pixel No. i to the pixel ${}_ip_0$ in an "${}_ip_0$ transformation unit 406", and feed four parameters ${}_nt_c$, ${}_k\tau$, ${}_ip_0$, $p_{inf}$ thus set up to a "compound ratio transformation unit 17" and output a position ${}_{ik}p_c$ (D-1-12).

(9) The above-mentioned position ${}_{ik}p_c$ is subjected to a polar transformation into a large circle on a sphere by a "polar transformation unit 18" to output the position $\{i_kp_{GC}\}$ of points constituting the large circle (D-1-13).

Incidentally, in the embodiment A-6, ${}_{ik}\tau$, ${}_{ik}p_c$, ${}_{ik}p_{Gc}$ are replaced by ${}_i\tau$, ${}_ip_c$, ${}_ip_{GC}$.

(10) The "response intensity of the motion parallax detection unit 405" is voted for "points on the large circle of height ${}_nt_c$ of a "cylindrical arrangement voting unit 19" (D-1-14). In the processing up to here, there is drawn one large circle, wherein the point of the position ${}_ip_0$ is subjected to "the compound ratio transformation and the polar transformation", in the sectional circle of ${}_nt_c$ in height.

In the above, the cylindrical arrangement is referred to. However, there is no need that all the embodiments of the present invention (including all the figures) are involved in the 'cylinder', and it is acceptable that the arrangement is generalized in the form of a three-degree-of-freedom arrangement. In this case, the above-mentioned large circle becomes the associated curved line.

(Scan ${}_nt_c$ (D-1-15))

(Scan k (D-1-16))

(Scan i (D-1-17))

(11) In the processing up to here, there are drawn large circles, wherein "all the points $\{{}_ip_0\}$ in the image" are subjected to the compound ratio transformation and the polar transformation, in the sectional circles of $\{{}_nt_c\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 20". This maximum point is a place wherein the large circles intersect with each other at one point". The "normalized time ${}_nt_{c0}$ up to going across the plane" is determined in the form of a "height coordinates" of the maximum point, and the "three-dimensional azimuth $n_{s0}$ of the plane" is determined in the form of a "sectional circle inside coordinates" (D-1-18).

In the above, the normalized time ${}_nt_c$ is referred to. However, since Δt is constant, it is acceptable that the time is replaced by the absolute time $t_c$ (that is, ${}_nt_c$ Δt). In this respect, the theory is applicable to all the embodiments dealing with the normalized time ${}_nt_c$.

Embodiment D-2. (Normalized Time+v Unknown)

The present embodiment will be explained in conjunction with FIG. 89. It is performed in accordance with a flowchart shown in FIG. 90.

The following steps (2)–(11) are the same as the corresponding steps of the embodiment D-1.

(0) Scan a "moving direction parameter v" over any possible directions (from the minimum value $v_{min}$ to the maximum value $v_{max}$) by a "scan unit for v parameter 21" (D-2-1, D-2-2, D-2-20).

(Scan v)

(1) Set up the "position $p_{inf}$ after the infinite time elapses", as being equal to the parameter v, by a "$p_{inf}$ set unit 15" (D-2-3).

(2) Scan the respective addresses i from the minimum value $i_{min}$ to the maximum value $i_{max}$ by a "scan unit 401 for pixel No. i" (D-2-4, D-2-5, D-2-19).

(Scan i)

(3) Cut and bring down images on local areas taking a "pixel $_ip_0$ associated with the address i" as the center from images at present time $t_0$ and the subsequent time $t_1$, which are obtained by a camera 11, as to the present time $t_0$ and the subsequent time $t_1$, respectively, by a "unit 402 for cutting and bringing down images on local areas taking $_ip_0$ as the center", in a similar fashion to that of the step (3) of the embodiment D-1 (D-2-6).

(4) Scan the motion parallax No. k from the minimum value $k_{min}$ to the maximum value $k_{max}$ by a "scan unit 403 for motion parallax No. k" (D-2-7, D-2-8, D-2-18).

(Scan k)

(5) The number k is associated with the motion parallax $_k\tau$, that is, the motion vector ($_k\tau_x$ $_k\tau_y$), in a similar fashion to that of the step (5) of the embodiment D-1. Such an association is performed by a "transformation unit 404 for motion parallax $_k\tau$" to output the motion parallax $_k\tau$ (D-2-9).

In the event that the direction of the motion parallax $_k\tau$, that is, the motion vector ($_k\tau_x$ $_k\tau_y$)is different from the "direction from $_ip_0$ to v (that is, $p_{inf}$) in FIG. 10(A), it is the motion parallax which conflicts with this moving direction. Thus, in this case, the process skips to the step (10) (D-2-10).

(6) Feed the "images on local areas at present time t o and the subsequent time $_1$" and the "motion parallax $_k\tau$" to a "motion parallax detection unit 405" (cf. FIG. 159) to compute the response intensity in accordance with the following equation (D-2-9).

$$\text{Response intensity}=\Sigma_x\Sigma_y\ {}_ia_0(x,y)_ia_1(x-{}_k\tau_x,\ y-{}_k\tau_y))$$

(7) Scan a normalized time parameter $_nt_c$ by a "scan unit for $_nt_c$ parameter 16" from the minimum value $_nt_{c,\ min}$ to the maximum value $_nt_{c,\ max}$ (D-2-12, D-2-13, D-2-17).

(Scan $_nt_c$)

The following processing is performed in a similar fashion to that of the above-mentioned embodiment A-6. But, the present embodiment D-2 is different from the embodiment A-6 in the point that in the step (10) such a processing that "the response intensity of the motion parallax detection unit is voted" is performed.

(8) Transform the pixel No. i to the pixel $_ip_0$ in an $_ip_0$ transformation unit (406), and feed four parameters $_nt_c$, $_k\tau$, $_ip_0$, $p_{inf}$ thus set up to a "compound ratio transformation unit 17" and output a position $_{ik}p_c$ (D-2-14).

(9) The above-mentioned position $_{ik}$pis subjected to a polar transformation into a large circle on a sphere by a "polar transformation unit 18" to output the position $\{_{ik}p_{GC}\}$ of points constituting the large circle (D-2-15).

(10) The "response intensity of the motion parallax detection unit 405" is voted for "points on the large circle of height $_nt_c$" of a "cylindrical arrangement voting unit 19" (D-2-16). In the processing up to here, there is drawn one large circle, wherein the point of the position $_ip_0$ is subjected to "the compound ratio transformation and the polar transformation", in the sectional circle of $_nt_c$ in height.

(Scan $_nt_c$ (D-2-17))

(Scan k (D-2-18))

(Scan i (D-2-19))

(11) In the processing up to here, there are drawn large circles, wherein "all the points $\{_ip_0\}$ in the image" are subjected to the compound ratio transformation and the polar transformation, in the sectional circles of $\{_nt_c\}$ in all the heights. That is, the voting is performed for the inside of all the sectional circles of the cylindrical arrangement.

(12) In the processing up to here, the voting is performed for all the sectional circles of the "cylindrical arrangements for all the moving direction parameters v".

(13) Extract a "specified cylindrical arrangement" wherein the intensity offers the maximum from among the cylindrical arrangements, by a "peak extraction unit 20". Thus, a true moving direction $v_0$ is determined in the form of the moving direction parameter for this arrangement. When a point, wherein the intensity offers the peak in the cylindrical arrangement, is extracted, the normalized time $_nt_{c0}$ up to going across the plane is determined in the form of a "height coordinates" of the maximum point, and the three-dimensional azimuth $n_{s0}$ of the plane is determined in the form of a "sectional circle inside coordinates" (D-2-21).

Embodiment D-3. (Normalization Shortest Distance)

FIG. 91 is a block diagram of an embodiment D-3 of the present invention. FIG. 92 is a flowchart of the embodiment D-3.

(1) A moving direction v is extracted in a similar fashion to that of the step (1) of the Embodiment A-1. Next, set up the "position $p_{inf}$ at the infinite time", as being equal to the moving direction v, by a "$p_{inf}$ set unit 15" (D-3-1).

(2) Scan the respective addresses i from the minimum value $i_{min}$ to the maximum value $i_{max}$ by a "scan unit 401 for pixel No. i" (D-3-2, D-3-3, D-3-17).

(Scan i)

(3) Cut and bring down images on local areas taking a "pixel $_ip_0$ associated with the address i" as the center from images at present time $t_0$ and the subsequent time $t_1$, which are obtained by a camera 11, as to the present time $t_0$ and the subsequent time $t_1$, respectively, by a "unit 402 for cutting and bringing down images on local areas taking $_ip_0$ as the center", in a similar fashion to that of the step (3) of the embodiment D-1 (D-3-4).

(4) Scan the motion parallax No. k from the minimum value $k_{min}$ to the maximum value $k_{max}$ by a "scan unit 403 for motion parallax No. k" (D-3-5, D-3-6, D-3-16).

(Scan k)

(5) The number k is associated with the motion parallax $_k\tau$, that is, the motion vector ($_k\tau_x$ $_k\tau_y$), in a similar fashion to that of the step (5) of the embodiment D-1. Such an association is performed by a "transformation unit 404 for motion parallax $_k\tau$" to output the motion parallax $_k\tau$ (D-3-7). In the event that the direction of the motion parallax $_k\tau$, that is, the motion vector ($_k\tau_x$ $_k\tau_y$) is different from the "direction from $_ip_0$ to v (that is, $p_{inf}$) in FIG. 10(A), it is the motion parallax which conflicts with this moving direction. Thus, in this case, the process skips to the step (10) (D-3-8).

(6) In a similar fashion to that of the step (6) of the embodiment D-1, feed the "images on local areas at present time $t_0$ and the subsequent time $t_1$" and the "motion parallax $_k\tau$" to a "motion parallax detection unit 405" (cf. FIG. 159) to compute the response intensity in accordance with the following equation (D-3-9).

$$\text{Response intensity}=\Sigma_x\Sigma_y\ {}_ia_0(x,y)_ia_1(x-{}_k\tau_x,\ y-{}_k\tau_y)$$

(7) Scan a normalization shortest distance parameter $_nd_s$ by a "scan unit for $_nd_s$ parameter 22" from the minimum value $_nd_{s,\ min}$ to the maximum value $_nd_{s,\ max}$ (Scan $_n d_s$)

The following processing is performed in a similar fashion to that of the above-mentioned embodiment A-8. But, the present embodiment D-3 is different from the embodiment A-8 in the point that in the step (10) such a processing that "the response intensity of the motion parallax detection unit is voted" is performed.

(8) Transform the pixel No. i to the pixel $_i p_0$ in an $_i p_0$ transformation unit (406), and in a similar fashion to that of the step (6) of the above-mentioned embodiment A-8, feed four parameters $_n d_s$, $_k\tau$, $_i p_0$, $p_{inf}$ thus set up to a "computing unit 23 for radius R" and output a radius $_{ik}R$ and a position $_i p_0$ (D-3-12). In the unit 23, the radius $_{ik}R$ is computed with the following equation based on the equation $$_{ik}R=\cos^{-1}(_n d_s \sin {_k\tau}/\sin(_i a+{_k\tau}))$$

(9) In a similar fashion to that of the step (7) of the above-mentioned embodiment A-8, the above-mentioned radius $_{ik}R$ and position $_i p_0$ are fed to a "small circle transformation unit 24" to perform a small circle transformation wherein the position $_i p_0$ is transformed to a "small circle on a sphere" of the radius $_{ik}R$ taking the position $_i p_0$ as the center (D-3-13).

(10) In a similar fashion to that of the steps (8) to (9) of the embodiment A-8, the response intensity of the motion parallax detection unit 405 of the step (6) is voted for "points on the small circle of height $_n d_s$" of a "cylindrical arrangement voting unit 25" (D-3-14). In the processing up to here, there is drawn one small circle, wherein the point of the position $_i p_0$ is subjected to "the small circle transformation", in the sectional circle of $_n d_s$ in height.

(Scan $_n d_s$ (D-3-15))

(Scan k (D-3-16))

(Scan i (D-3-17))

(11) In the processing up to here, there are drawn small circles, wherein "all the points $\{_i p_0\}$ in the image" are subjected to the small circle transformation, in the sectional circles of $\{_n d_s\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 26". This maximum point is a "place wherein the small circles intersect with each other at one point". The normalization shortest distance $_n d_{s0}$ is determined in the form of a "height coordinates" of the maximum point, and the "three-dimensional azimuth $n_{s0}$ of the plane" is determined in the form of a "sectional circle inside coordinates" (D-3-18).

Embodiment D-4. (Normalization Shortest Distance+v Unknown)

The present embodiment will be explained in conjunction with FIG. 93. It is performed in accordance with a flowchart shown in FIG. 94. The following steps (2)–(11) are the same as the corresponding steps of the embodiment D-3.

(0) Scan a "moving direction parameter v" over any possible directions (from the minimum value $v_{min}$ to the maximum value $v_{max}$) by a "scan unit for v parameter 21" (D-4-1, D-4-2, D-4-20).

(Scan v)

(1) Set up the "position $p_{inf}$ after the infinite time elapses", as being equal to the parameter v, by a "$p_{inf}$ set unit 15" (D-4-3).

(2) Scan the respective addresses i from the minimum value $i_{min}$ to the maximum value $i_{max}$ by a "scan unit 401 for pixel No. i" (D-4-4, D-4-5, D-4-19).

(Scan i)

(3) Cut and bring down images on local areas taking a "pixel $_i p_0$ associated with the address i" as the center from images at present time $t_0$ and the subsequent time $t_1$, which are obtained by a camera 11, as to the present time $t_0$ and the subsequent time $t_1$, respectively, by a "unit 402 for cutting and bringing down images on local areas taking $_i p_0$ as the center", in a similar fashion to that of the step (3) of the embodiment D-1 (D-4-6).

(4) Scan the motion parallax No. k from the minimum value $k_{min}$ to the maximum value $k_{max}$ by a "scan unit 403 for motion parallax No. k" (D-4-7, D-4-8, D-4-18).

(Scan k)

(5) The number k is associated with the motion parallax $_k\tau$, that is, the motion vector $(_k\tau_x\ _k\tau_y)$, in a similar fashion to that of the step (5) of the embodiment D-1. Such an association is performed by a "transformation unit 404 for motion parallax $_k\tau$" to output the motion parallax $_k\tau$ (D-2-9). In the event that the direction of the motion parallax $_k\tau$, that is, the motion vector $(_k\tau_x\ _k\tau_y)$ is different from the "direction from $_i p_0$ to v (that is, $p_{inf}$) in FIG. 10(A), it is the motion parallax which conflicts with this moving direction. Thus, in this case, the process skips to the step (10) (D-4-10).

(6) In a similar fashion to that of the step (5) of the embodiment D-1, feed the "images on local areas at present time $t_0$ and the subsequent time $t_1$" and the "motion parallax $_k\tau$" a "motion parallax detection unit 405" (cf. FIG. 159) to compute the response intensity in accordance with the following equation (D-4-11).

$$\text{Response intensity}=\Sigma_x\Sigma_y\ {_i a_0}(x, y)\,{_i a_1}(x-{_k\tau_x}, y-{_k\tau_y})$$

(7) Scan a normalization shortest distance parameter $_n d_s$ by a "scan unit for $_n d_s$ parameter 22" from the minimum value $_n d_{s,\ min}$ to the maximum value $_n d_{s,\ max}$.

(Scan $_n d_s$)

The following processing is performed in a similar fashion to that of the above-mentioned embodiment A-8. But, the present embodiment D-3 is different from the embodiment A-8 in the point that in the step (10) such a processing that "the response intensity of the motion parallax detection unit is voted" is performed.

(8) Transform the pixel No. i to the pixel $_i p_0$ in an $_i p_0$ transformation unit (406), and in a similar fashion to that of the step (6) of the above-mentioned embodiment A-8, feed four parameters $_n d_s$, $_k\tau$, $_i p_0$, $p_{inf}$ thus set up to a "computing unit 23 for radius R" and output a radius $_{ik}R$ and a position $_i p_0$ (D-4-14). In the unit 23, the radius $_{ik}R$ is computed with the following equation based on the equation $$_{ik}R=\cos^{-1}(_n d_s \sin {_k\tau}/\sin(_i a+{_k\tau}))$$

(9) In a similar fashion to that of the step (7) of the above-mentioned embodiment A-8, the above-mentioned radius $_{ik}R$ and position $_i p_0$ are fed to a "small circle transformation unit 24" to perform a small circle transformation wherein the position $_i p_0$ is transformed to a "small circle on a sphere" of the radius $_{ik}R$ taking the position $_i p_0$ as the center (D-4-15).

(10) In a similar fashion to that of the steps (8) to (9) of the embodiment A-8, the response intensity of the motion parallax detection unit 405 of the step (6) is voted for "points on the small circle of height $_n d_s$" of a "cylindrical arrangement voting unit 25" (D-4-14). In the processing up to here, there is drawn one small circle, wherein the point of the position $_i p_0$ is subjected to "the small circle transformation", in the sectional circle of $_n d_s$ in height.

(Scan ${}_nd_s$ (D-4-17))

(Scan k (D-4-18))

(Scan i (D-4-19))

(11) In the processing up to here, there are drawn small circles, wherein "all the points $\{{}_ip_0\}$ in the image" are subjected to the small circle transformation, in the sectional circles of $\{{}_nd_s\}$ in all the heights. That is, the voting is performed for the inside of all the sectional circles of the cylindrical arrangement.

(12) In the processing up to here, the voting is performed for all the sectional circles of the "cylindrical arrangements for all the moving direction parameters v".

(13) Extract a "specified cylindrical arrangement" wherein the intensity offers the maximum from among the cylindrical arrangements, by a "peak extraction unit 26". Thus, a true moving direction $v_0$ is determined in the form of the moving direction parameter for this arrangement. When a point, wherein the intensity offers the peak in the cylindrical arrangement, is extracted, the normalization shortest distance ${}_nd_s$ is determined in the form of a "height coordinates" of the maximum point, and the three-dimensional azimuth $n_{s0}$ of the plane is determined in the form of a "sectional circle inside coordinates" (D-4-21).

Embodiment D-5. (Stereo+a Normalized Distance)

FIG. 95 is a block diagram of an embodiment D-5 of the present invention. FIG. 96 is a flowchart of the embodiment D-5.

(1) In a similar fashion to that of the embodiment B-1, set up the "position $p_{axis}$ on the optical axis", as being equal to the optical axis direction $a_{xis}$, by a "$p_{axis}$ set unit 115" (D-5-1).

(2) Scan the respective addresses i from the minimum value $i_{min}$ to the maximum value $i_{max}$ by a "scan unit 421 for pixel No. i" (D-5-2, D-5-3, D-5-17).

(Scan i)

(3) Cut and bring down images on local areas taking a "pixel ${}_ip_R$ associated with the address i" as the center from images, which are obtained by a right camera 412 and a left camera 413 respectively, as shown in FIG. 167, by a "unit 422 for cutting and bringing down images on local areas taking ${}_ip_R$ as the center" (D-5-4).

(4) Scan the binocular parallax No. k from the minimum value $k_{min}$ to the maximum value $k_{max}$ by a "scan unit 423 for binocular parallax No. k" (D-5-5, D-5-6, D-5-16).

(Scan k)

(5) The number k is a serial number of the binocular parallax, and is associated with the binocular parallax ${}_k\sigma$, that is, the parallactic vector $({}_k\sigma_x\ {}_k\sigma_y)$, as shown in FIG. 168. Such an association is performed by a "transformation unit 424 for binocular parallax ${}_k\sigma$" to output the binocular parallax ${}_k\sigma$ (D-5-7).

In the event that the direction of the binocular parallax ${}_k\sigma$, that is, the parallactic vector $({}_k\sigma_x\ {}_k\sigma_y)$ is different from the "direction from ${}_ip_R$ to $a_{xis}$ (that is, $p_{axis}$) in FIG. 24(A), it is the binocular parallax which conflicts with this optical axis direction $a_{xis}$. Thus, in this case, the process skips to the step (10) (D-5-8).

(6) Feed the "images on local areas on the right camera and the left camera" and the "binocular parallax ${}_k\tau$" to a "binocular parallax detection unit 425" (cf. FIG. 167) to compute the response intensity in accordance with the following equation (D-5-9).

Here, ${}_ia_R$ (x, y) and ${}_ia_L$ (x, y) denote intensity of (x, y) pixels on an image on a local area on the right camera (cf. the upper left of FIG. 167) and intensity of (x, y) pixels on an image on a local area on the left camera (cf. the lower left of FIG. 167), respectively.

Incidentally, with respect to the computation of the above-mentioned response intensity, for the purpose of simplification, there is shown the two-dimensional correlation. However, it is acceptable to adopt a two-dimensional correlation according to the difference absolute value generally used in the MPEG2 encoder for example, a two-dimensional correlation according to the multiplicative operation, and a correlation according to the Hough transformation and the inverse Hough transformation ("A method of performing a two-dimensional correlation and a convolution along the σ coordinates on the Hough plane on a one-dimensional basis by Kawakami, S. and Okamoto, H., SINNGAKUGIHOU, vol. IE96-19, pp. 31–38, 1996; and Japanese Patent Laid Open Gazettes Hei. 05-165956, Hei. 06-165957, Hei. 06-044364, and Hei. 09-081369). Further, it is also acceptable to adopt a method of detecting the velocity such as a differential gradient method. That is, anyone is acceptable, as the response intensity, which is determined in accordance with intensity of a pixel.

(7) Scan a normalized time parameter ${}_nd_s$ by a "scan unit for ${}_nd_c$ parameter 116" from the minimum value ${}_nd_{c,\ min}$ to the maximum value ${}_nd_{c,\ max}$ (D-5-10, D-5-11, D-5-15).

(Scan ${}_nd_c$)

The following processing is performed in a similar fashion to that of the above-mentioned embodiment B-6. But, the present embodiment D-5 is different from the embodiment B-6 in the point that in the step (10) such a processing that "the response intensity of the binocular parallax detection unit is voted" is performed.

(8) Transform the pixel No. i to the pixel ${}_ip_R$ in an ${}_ip_R$ transformation unit (426), and feed four parameters ${}_nd_c$, ${}_k\sigma$, ${}_ip_R$, $p_{axis}$ thus set up to a "compound ratio transformation unit 117" and output a position ${}_{ik}p_c$ (D-5-12).

(9) The above-mentioned position ${}_{ik}$pis subjected to a polar transformation into a large circle on a sphere by a "polar transformation unit 118" to output the position $\{{}_{ik}p_{GC}\}$ of points constituting the large circle (D-5-13).

(10) The "response intensity of the binocular parallax detection unit 425" is voted for "points on the large circle of height ${}_nd_c$ of a "cylindrical arrangement voting unit 119" (D-5-14). In the processing up to here, there is drawn one large circle, wherein the point of the position ${}_ip_R$ is subjected to "the compound ratio transformation and the polar transformation", in the sectional circle of ${}_nd_c$ in height.

(Scan ${}_nd_c$ (D-5-15))

(Scan k (D-5-16))

(Scan i (D-5-17))

(11) In the processing up to here, there are drawn large circles, wherein "all the points $\{{}_ip_R\}$ in the image" are subjected to the compound ratio transformation and the polar transformation, in the sectional circles of $\{{}_nd_s\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 120". This maximum point is a place wherein the large circles intersect with each other at one point". The "normalized distance ${}_nd_{c0}$ up to going across the plane" is determined in the form of a "height coordinates" of the maximum point, and the "three-dimensional azimuth $n_{s0}$ of the plane" is determined in the form of a "sectional circle inside coordinates" (D-5-18).

In the above, the normalized distance ${}_nd_s$ is referred to. However, since $\Delta x_{LR}$ is constant, it is acceptable that the distance is replaced by the absolute distance ${}_nd_c$ (that is, ${}_nd_c\Delta_{LR}$). In this respect, the theory is applicable to all the embodiments dealing with the normalized distance ${}_nd_c$.

Embodiment D-6. (Stereo+A Normalized Distance+ $a_{xis}$ Unknown)

FIG. 97 is a block diagram of an embodiment D-6 of the present invention. FIG. 98 is a flowchart of the embodiment D-6.

The following steps (2)–(11) are the same as the corresponding steps of the embodiment D-5.

(0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 121" (D-6-1, D-6-2, D-6-20).

(Scan $a_{xis}$)

(1) Set up the "position $p_{axis}$ on the optical axis", as being equal to the parameter $a_{xis}$, by a "$p_{axis}$ set unit 115" (D-6-3).

(2) Scan the respective addresses i from the minimum value $i_{min}$ to the maximum value $i_{max}$ by a "scan unit 421 for pixel No. i" (D-6-4, D-6-5, D-6-19).

(Scan i)

(3) Cut and bring down images on local areas taking a "pixel ${}_ip_R$ associated with the address i" as the center from images, which are obtained by a right camera 412 and a left camera 413 respectively, as shown in FIG. 167, by a "unit 422 for cutting and bringing down images on local areas taking ${}_ip_R$ as the center" (D-6-6).

(4) Scan the binocular parallax No. k from the minimum value $k_{min}$ to the maximum value $k_{max}$ by a "scan unit 423 for binocular parallax No. k" (D-6-7, D-6-8, D-6-18).

(Scan k)

(5) In a similar fashion to that of the step (5) of the embodiment D-5, the number k is transformed to the binocular parallax kσ by a "transformation unit 424 for binocular parallax ${}_k\sigma$ " to output the binocular parallax ${}_k\sigma$ (D-6-9).

In the event that the direction of the binocular parallax ${}_k\sigma$, that is, the parallactic vector (${}_k\sigma_x\ {}_k\sigma_y$) is different from the "direction from ${}_ip_R$ to $a_{xis}$ (that is, $p_{axis}$) in FIG. 24(A), it is the binocular parallax which conflicts with this optical axis direction $a_{xis}$. Thus, in this case, the process skips to the step (10) (D-6-10).

(6) Feed the "images on local areas on the right camera and the left camera" and the "binocular parallax ${}_k\sigma$" to a "binocular parallax detection unit 425" (cf. FIG. 167) to compute the response intensity in accordance with the following equation (D-6-11).

$$\text{Response intensity}=\Sigma_x\Sigma_y\ {}_ia_R(x,\ y)_ia_L(x-{}_k\sigma_x,\ y-{}_k\sigma_y)$$

(7) Scan a normalized time parameter ${}_nd_c$ by a "scan unit for ${}_nd_c$ parameter 16" from the minimum value ${}_nd_{c,\ min}$ to the maximum value ${}_nd_{c,\ max}$ (D-6-12, D-6-13, D-6-17).

(Scan ${}_nd_c$)

The following processing is performed in a similar fashion to that of the above-mentioned embodiment B-6. But, the present embodiment D-5 is different from the embodiment B-6 in the point that in the step (10) such a processing that "the response intensity of the binocular parallax detection unit is voted" is performed.

(8) Transform the pixel No. i to the pixel ${}_ip_R$ in an "${}_ip_R$ transformation unit (426), and feed four parameters ${}_nd_c$, ${}_k\sigma$, ${}_ip_R$, $p_{axis}$ thus set up to a "compound ratio transformation unit 117" and output a position ${}_{ik}p_c$ (D-6-14).

(9) The above-mentioned position ${}_{ik}p$is subjected to a polar transformation into a large circle on a sphere by a "polar transformation unit 118" to output the position $\{{}_{ik}p_{GC}\}$ of points constituting the large circle (D-6-15).

(10) The "response intensity of the binocular parallax detection unit 425" is voted for "points on the large circle of height ${}_nd_c$ of a "cylindrical arrangement voting unit 119" (D-6-16). In the processing up to here, there is drawn one large circle, wherein the point of the position ${}_ip_R$ is subjected to "the compound ratio transformation and the polar transformation", in the sectional circle of ${}_nd_c$ in height.

(Scan ${}_nd_c$ (D-6-17))

(Scan k (D-6-18))

(Scan i (D-6-19))

(11) In the processing up to here, there are drawn large circles, wherein "all the points $\{{}_ip_R\}$ in the image" are subjected to the compound ratio transformation and the polar transformation, in the sectional circles of $\{{}_nd_c\}$ in all the heights. That is, the voting is performed for the inside of all the sectional circles of the cylindrical arrangement.

(Scan $a_{xis}$ (B-6-20))

(12) In the processing up to here, the voting is performed for all the sectional circles of the "cylindrical arrangements for all the optical axis direction parameters $a_{xis}$".

(13) Extract a "specified cylindrical arrangement" wherein the intensity offers the maximum from among the cylindrical arrangements, by a "peak extraction unit 120" (D-6-21). Thus, a true optical axis direction parameters $a_{xis0}$ is determined in the form of the optical axis direction parameters for this arrangement. When a point, wherein the intensity offers the peak in the cylindrical arrangement, is extracted, the normalized distance ${}_nd_{c0}$ up to going across the plane is determined in the form of a "height coordinates of the maximum point, and the three-dimensional azimuth $n_{s0}$ of the plane is determined in the form of a "sectional circle inside coordinates".

Embodiment D-7. (Stereo+a Normalization Shortest Distance)

FIG. 99 is a block diagram of an embodiment D-6 of the present invention. FIG. 100 is a flowchart of the embodiment D-6.

(1) In a similar fashion to that of the embodiment B-1, set up the "position $p_{axis}$ on the optical axis", as being equal to the optical axis direction $a_{xis}$, by a "$p_{axis}$ set unit 115" (D-7-1).

(2) Scan the respective addresses i from the minimum value $i_{min}$ to the maximum value $i_{max}$ by a "scan unit 421 for pixel No. i" (D-7-2, D-7-3, D-7-17).

(Scan i)

(3) Cut and bring down images on local areas taking a "pixel ${}_ip_R$ associated with the address i" as the center from images, which are obtained by a right camera 412 and a left camera 413 respectively, as shown in FIG. 167, by a "unit 422 for cutting and bringing down images on local areas taking ${}_ip_R$ as the center" (D-7-4).

(4) Scan the binocular parallax No. k from the minimum value $k_{min}$ to the maximum value $k_{max}$ by a "scan unit 423 for binocular parallax No. k" (D-7-5, D-7-6, D-7-16).

(5) The number k is a serial number of the binocular parallax, and is associated with the binocular parallax ${}_k\sigma$, that is, the parallactic vector (${}_k\sigma_{x\ k\sigma y}$) as shown in FIG. 168. Such an association is performed by a "transformation unit 424 for binocular parallax ${}_k\sigma$" to output the binocular parallax ${}_k\sigma$ (D-7-7). In the event that the direction of the binocular parallax ${}_k\sigma$, that is, the parallactic vector (${}_k\sigma_{x\ k\sigma y}$)

is different from the "direction from $_ip_R$ to axis (that is, $p_{axis}$) in FIG. 24(A), it is the binocular parallax which conflicts with this optical axis direction $a_{xis}$. Thus, in this case, the process skips to the step (10) (D-7-8).

(6) In a similar fashion to that of the step (6) of the embodiment D-5, feed the "images on local areas on the right camera and the left camera" and the "binocular parallax $_k\tau$" to a "binocular parallax detection unit 425" (cf. FIG. 167) to compute the response intensity in accordance with the following equation (D-7-9).

$$\text{Response intensity}=\Sigma_x\Sigma_y\ {}_ia_R(x,y)_ia_L(x-{}_k\sigma_x, y-{}_k\sigma_y)$$

(7) Scan a normalized time parameter $_nd_s$ by a "scan unit for $_nd_s$ parameter 122" from the minimum value $_nd_{s,\ min}$ to the maximum value $_nd_{s,\ max}$ (D-7-10, D-7-11, D-7-15).

(Scan $_nd_s$)

The following processing is performed in a similar fashion to that of the above-mentioned embodiment B-8. But, the present embodiment D-7 is different from the embodiment B-8 in the point that in the step (10) such a processing that "the response intensity of the binocular parallax detection unit is voted" is performed.

(8) Transform the pixel No. i to the pixel $_ip_R$ in an $_ip_R$ transformation unit (426), and in a similar fashion to that of the step (6) of the embodiment B-8, feed four parameters $_nd_s$, $_k\sigma$, $_ip_R$, $p_{axis}$ thus set up to a computing unit 123 for radius R" and output a radius $_{ik}R$ and a position $_ip_R$ (D-7-12). In the unit 123, the radius $_{ik}R$ is computed with the following equation.

$$_{ik}R=\cos^{-1}({}_nd_s\ \sin\ {}_k\sigma/\sin({}_ic+{}_k\sigma))$$

(9) In a similar fashion to that of the step (7) of the embodiment B-8, the above-mentioned radius $_{ik}R$ and position $_ip_R$ are fed to a "small circle transformation unit 124" to perform a small circle transformation wherein the position $_ip_R$ is transformed to a "small circle on a sphere" of the radius $_{ik}R$ taking the position $_ip_R$ as the center (D-7-13).

(10) In a similar fashion to that of the steps (8) to (9) of the embodiment B-8, the response intensity of the binocular parallax detection unit 425 is voted for "points on the small circle of height $_nd_s$" of a cylindrical arrangement voting unit 125" (D-7-14). In the processing up to here, there is drawn one small circle, wherein the point of the position $_ip_R$ is subjected to "the small circle transformation", in the sectional circle of $_nd_s$ in height.

(Scan $_nd_s$, (D-7-15))

(Scan k (D-7-16))

(Scan i (D-7-17))

(11) In the processing up to here, there are drawn small circles, wherein "all the points $\{_ip_R\}$ in the image" are subjected to the small circle transformation, in the sectional circles of $\{_nd_s\}$ in all the heights. That is, the voting is performed for the inside of all the sectional circles of the cylindrical arrangement.

(12) Extract a "point wherein the voted intensity offers the maximum (peak)" in the cylindrical arrangement, by a "peak extraction unit 126". This maximum point is a "place wherein the small circles intersect with each other at one point". The "normalized distance $_nd_{s0}$ up to going across the plane" is determined in the form of a "height coordinates" of the maximum point, and the "three-dimensional azimuth $n_{s0}$ of the plane" is determined in the form of a "sectional circle inside coordinates" (D-7-18).

Embodiment D-8. (Stereo+a Normalization Shortest Distance+$a_{xis}$ Unknown

FIG. 101 is a block diagram of an embodiment D-6 of the present invention. FIG. 102 is a flowchart of the embodiment D-6.

The following steps (2)–(11) are the same as the corresponding steps of the embodiment D-7.

(0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 121" (D-8-1, D-8-2, D-8-20).

(Scan $a_{xis}$)

(1) Set up the "position $p_{axis}$ on the optical axis", as being equal to the parameter $a_{xis}$, by a "$p_{axis}$ set unit 115" (D-8-3).

(2) Scan the respective addresses i from the minimum value $i_{min}$ to the maximum value $i_{max}$ by a "scan unit 421 for pixel No. i" (D-8-4, D-8-5, D-8-19).

(Scan i)

(3) Cut and bring down images on local areas taking a "pixel $_ip_R$ associated with the address i" as the center from images, which are obtained by a right camera 412 and a left camera 413 respectively, as shown in FIG. 167, by a "unit 422 for cutting and bringing down images on local areas taking $_ip_R$ as the center" (D-8-6).

(4) Scan the binocular parallax No. k from the minimum value $k_{min}$ to the maximum value $k_{max}$ by a "scan unit 423 for binocular parallax No. k" (D-8-7, D-8-8, D-8-18).

(5) The number k is a serial number of the binocular parallax, and is associated with the binocular parallax $_k\sigma$, that is, the parallactic vector $(_k\sigma_x\ {}_k\sigma_y)$ as shown in FIG. 168. Such an association is performed by a "transformation unit 424 for binocular parallax $_k\sigma$" to output the binocular parallax $_k\sigma$ (D-8-9). In the event that the direction of the binocular parallax $_k\sigma$, that is, the parallactic vector $(_k\sigma_x\ {}_k\sigma_y)$ is different from the "direction from $_ip_R$ to axis (that is, $p_{axis}$) in FIG. 24(A), it is the binocular parallax which conflicts with this optical axis direction $a_{xis}$. Thus, in this case, the process skips to the step (10) (D-8-10).

(6) In a similar fashion to that of the step (6) of the embodiment D-5, feed the "images on local areas on the right camera and the left camera" and the "binocular parallax $_k\sigma$ " to a "binocular parallax detection unit 425" (cf. FIG. 167) to compute the response intensity in accordance with the following equation (D-8-11).

$$\text{Response intensity}=\Sigma_x\Sigma_y\ {}_ia_R(x,y)_ia_L(x-{}_k\sigma_x, y-{}_k\sigma_y)$$

(7) Scan a normalized time parameter $_nd_s$ by a "scan unit for $_nd_s$ parameter 122" from the minimum value $_nd_{s,\ min}$ to the maximum value $_nd_{s,\ max}$ (D-8-12, D-8-13, D-8-17).

(Scan $_nd_s$)

The following processing is performed in a similar fashion to that of the above-mentioned embodiment B-8. But, the present embodiment D-8 is different from the embodiment B-8 in the point that in the step (10) such a processing that "the response,intensity of the binocular parallax detection unit is voted" is performed.

(8) Transform the pixel No. i to the pixel $_ip_R$ in an "$_ip_R$ transformation unit (426), and in a similar fashion to that of the step (6) of the embodiment B-8, feed four parameters $_nd_s$, $_k\sigma$, $_ip_R$, $p_{axis}$ thus set up to a "computing unit 123 for radius R" and output a radius $_{ik}R$ and a position $_ip_R$ (D-8-14). In the unit 123, the radius $_{ik}R$ is computed with the following equation.

$$_{ik}R=\cos^{-1}({}_nd_s\ \sin\ {}_k\sigma/\sin({}_ic+{}_k\sigma))$$

(9) In a similar fashion to that of the step (7) of the embodiment B-8, the above-mentioned radius $_{ik}R$ and position $_ip_R$ are fed to a "small circle transformation unit 124" to perform a small circle transformation wherein the position $_i p_R$ is transformed to a "small circle on a sphere" of the radius $_{ik}R$ taking the position $_i p_R$ as the center (D-8-15).

(10) In a similar fashion to that of the steps (8) to (9) of the embodiment B-8, the response intensity of the binocular parallax detection unit 425 is voted for "points on the small circle of height $_n d_s$" of a "cylindrical arrangement voting unit 125" (D-8-16). In the processing up to here, there is drawn one small circle, wherein the point of the position $_i p_R$ is subjected to "the small circle transformation", in the sectional circle of $_n d_s$ in height.

(Scan $_n d_s$ (D-8-17))

(Scan k (D-8-18))

(Scan i (D-8-19))

(11) In the processing up to here, there are drawn small circles, wherein "all the points $\{_i p_R\}$ in the image" are subjected to the small circle transformation, in the sectional circles of $\{_n d_s\}$ in all the heights. That is, the voting is performed for the inside of all the sectional circles of the cylindrical arrangement.

(12) In the processing up to here, the voting is performed for all the sectional circles of the "cylindrical arrangements for all the optical axis direction parameters $a_{xis}$".

(13) Extract a "specified cylindrical arrangement" wherein the intensity offers the maximum from among the cylindrical arrangements, by a "peak extraction unit 126". Thus, a true moving direction $a_{xis0}$ is determined in the form of the optical axis direction parameter for this arrangement. When a point, wherein the intensity offers the peak in the cylindrical arrangement, is extracted, the normalization shortest distance $_n d_s$ is determined in the form of a "height coordinates" of the maximum point, and the three-dimensional azimuth $n_{s0}$ of the plane is determined in the form of a "sectional circle inside coordinates" (D-8-21).

Embodiment D-9. (Normalization Shortest Distance)

FIG. 103 is a block diagram of an embodiment D-9 of the present invention. FIG. 104 is a flowchart of the embodiment D-9.

(1) A moving direction v is extracted in a similar fashion to that of the step (1) of the Embodiment A-1. Next, set up the "position $p_{inf}$ at the infinite time", as being equal to the moving direction v, by a "$p_{inf}$ set unit 15" (D-9-1).

(2) Scan the respective addresses i from the minimum value $i_{min}$ to the maximum value $i_{max}$ by a "scan unit 401 for pixel No. i" (D-9-2, D-9-3, D-9-19).

(Scan i)

(3) Cut and bring down images on local areas taking a "pixel $_i p_0$ associated with the address i" as the center from images at present time $t_0$ and the subsequent time $t_1$, which are obtained by a camera 11, as to the present time $t_0$ and the subsequent time $t_1$, respectively, by a "unit 402 for cutting and bringing down images on local areas taking $_i p_0$ as the center", in a similar fashion to that of the step (3) of the embodiment D-1 (D-9-4).

(4) Scan the motion parallax No. k from the minimum value $k_{min}$ to the maximum value $k_{max}$ by a "scan unit 403 for motion parallax No. k" (D-9-5, D-9-6, D-9-18).

(Scan k)

(5) The number k is associated with the motion parallax $_k\tau$, that is, the motion vector $(_k\tau_x\ _k\tau_y)$, in a similar fashion to that of the step (5) of the embodiment D-1. Such an association is performed by a "transformation unit 404 for motion parallax $_k\tau$" to output the motion parallax $_k\tau$ (D-9-7). In the event that the direction of the motion parallax $_k\tau$, that is, the motion vector $(_k\tau_x\ _k\tau_y)$ is different from the "direction from $_i p_0$ to v (that is, $p_{inf}$) in FIG. 10(A), it is the motion parallax which conflicts with this moving direction. Thus, in this case, the process skips to the step (11) (D-9-8).

(6) In a similar fashion to that of the step (6) of the embodiment D-1, feed the "images on local areas at present time $t_0$ and the subsequent time $t_1$" and the "motion parallax $_k\tau$" to a "motion parallax detection unit 405" (cf. FIG. 159) to compute the response intensity in accordance with the following equation (D-9-9).

$$\text{Response intensity}=\Sigma_x\Sigma_y\ {}_ia_0(x, y)_ia_1(x-{}_k\tau_x, y-{}_k\tau_y)$$

(7) Scan a normalization shortest distance parameter $_n d_s$ by a "scan unit for $_n d_s$ parameter 22" from the minimum value $_n d_{s,\ min}$ to the maximum value $_n d_{s,\ max}$ (D-9-10, D-9-11, D-9-17).

(Scan $_n d_s$)

(8) Consider a circle (FIG. 13) of radius r taking the moving direction v as the center, and scan the radius r from 0 to $\pi/2$ (D-9-14, D-9-15, D-9-18).

(9) Transform the pixel No. i to the pixel $_i p_0$ in an "$_i p_0$ transformation unit (406), and feed five parameters $_n d_s$, $_i p_0$, $p_{inf}$, $_i\tau$, r thus set up to a computing unit 223 for small circle structural element $^i{}_r n_{s+}$, $^i{}_r n_{s-}$" and output two cross points $^i{}_r n_{s+}$, $^i{}_r n_{s-}$ explained in reference to FIG. 13 (D-9-14).

(10) Points $^i{}_r n_{s+}$, $^i{}_r n_{s-}$ constituting the above-mentioned small circle are transformed to "points in the sectional circle of height $_n d_s$" of a "cylindrical arrangement voting unit 224". Next, "the response intensity of the motion parallax detection unit", which is calculated in the step (6), is voted for those points thus transformed (D-9-15).

(Scan r (D-9-16)

(11) In the processing up to here, there is drawn one small circle, wherein the point of the position $_i p_0$ is subjected to the transformation, in the sectional circle of $_n d_s$ in height.

(Scan $_n d_s$ (D-9-17))

(Scan k (D-9-18))

(Scan i (D-9-19))

(12) In the processing up to here, there are drawn small circles, wherein "all the points $\{_i p_0\}$ in the image" are subjected to the transformation, in the sectional circles of $\{_n d_s\}$ in all the heights. That is, the voting is performed for the inside of all the sectional circles of the cylindrical arrangement.

(13) Extract a "point wherein the voted intensity offers the maximum (peak)" in the cylindrical arrangement, by a "peak extraction unit 225. This maximum point is a place wherein the small circles intersect with each other at one point". The normalization shortest distance $_n d_{s0}$ is determined in the form of a "height coordinates" of the maximum point, and the "three-dimensional azimuth $n_{s0}$ of the plane" is determined in the form of a "sectional circle inside coordinates" (D-9-20).

In the above, the normalization shortest distance $_n d_s$ is referred to. However, since Δx is constant, it is acceptable that the distance is replaced by the shortest distance $_n d_s$ (that is, $_n d_s\Delta x$). In this respect, the theory is applicable to all the embodiments dealing with the normalization shortest distance $_n d_s$,

Embodiment D-10. (Normalization Shortest Distance+v Unknown)

FIG. 105 is a block diagram of an embodiment D-10 of the present invention. FIG. 106 is a flowchart of the embodiment D-10.

The following steps (2)–(11) are the same as the corresponding steps of the embodiment D-9.

(0) Scan a "moving direction parameter v" over any possible directions (from the minimum value $v_{min}$ to the maximum value $v_{max}$) by a "scan unit for v parameter 21" (D-10-1, D-10-2, D-10-22).

(Scan v)

(1) Set up the "position $p_{inf}$ after the infinite time elapses", as being equal to the parameter v, by a "$p_{inf}$ set unit 15" (D-10-3).

(2) Scan the respective addresses i from the minimum value $i_{min}$ to the maximum value $i_{max}$ by a "scan unit 401 for pixel No. i" (D-10-4, D-10-5, D-10-21).

(Scan i)

(3) Cut and bring down images on local areas taking a "pixel ${}_ip_0$ associated with the address i" as the center from images at present time $t_0$ and the subsequent time $t_1$, which are obtained by a camera 11, as to the present time $t_0$ and the subsequent time $t_1$, respectively, by a "unit 402 for cutting and bringing down images on local areas taking ${}_ip_0$ as the center", in a similar fashion to that of the step (3) of the embodiment D-1 (D-10-6).

(4) Scan the motion parallax No. k from the minimum value $k_{min}$ to the maximum value $k_{max}$ by a "scan unit 403 for motion parallax No. k" (D-10-7, D-10-8, D-10-20).

(Scan k)

(5) The number k is associated with the motion parallax ${}_k\tau$, that is, the motion vector (${}_k\tau_x$ ${}_k\tau_y$), in a similar fashion to that of the step (5) of the embodiment D-1. Such an association is performed by a "transformation unit 404 for motion parallax ${}_k\tau$" to output the motion parallax ${}_k\tau$ (D-10-9). In the event that the direction of the motion parallax ${}_k\tau$, that is, the motion vector (${}_k\tau_x$ ${}_k\tau_y$) is different from the "direction from ${}_ip_0$ to v (that is, $p_{inf}$) in FIG. 10(A), it is the motion parallax which conflicts with this moving direction. Thus, in this case, the process skips to the step (11) (D-10-10).

(6) In a similar fashion to that of the step (6) of the embodiment D-1, feed the "images on local areas at present time $t_0$ and the subsequent time $t_1$ and the "motion parallax ${}_k\tau$" to a "motion parallax detection unit 405" (cf. FIG. 159) to compute the response intensity in accordance with the following equation (D-10-11).

$$\text{Response intensity}=\Sigma_x\Sigma_y\ {}_ia_0(x,\ y)_ia_1(x-{}_k\tau_x,\ y-{}_k\tau_y)$$

(7) Scan a normalization shortest distance parameter ${}_nd_s$ by a "scan unit for ${}_nd_s$ parameter 22" from the minimum value ${}_nd_{s,\ min}$ to the maximum value ${}_nd_{s,\ max}$ (D-10-12, D-10-13, D-10-19).

(Scan ${}_nd_s$)

(8) Consider a circle (FIG. 13) of radius r taking the moving direction v as the center, and scan the radius r from 0 to $\pi/2$ (D-10-14, D-10-15, D-10-18).

(9) Transform the pixel No. i to the pixel ${}_ip_0$ in an ${}_ip_0$ transformation unit (406), and feed five parameters ${}_nd_s$, ${}_ip_0$, $p_{inf}$, ${}_i\tau$, r thus set up to a "computing unit 223 for small circle structural element ${}^i{}_rn_{s+}$, ${}^i{}_rn_{s31}$ " and output two cross points ${}^i{}_rn_{s+}$, ${}^i{}_rn_{s31}$ explained in reference to FIG. 13 (D-10-16).

(10) Points ${}^i{}_rn_{s+}$, ${}^i{}_rn_{s31}$ constituting the above-mentioned small circle are transformed to "points in the sectional circle of height ${}_nd_s$ "of a "cylindrical arrangement voting unit 224". Next, "the response intensity of the motion parallax detection unit", which is calculated in the step (6), is voted for those points thus transformed (D-10-17).

(Scan r (D-10-18))

(11) In the processing up to here, there is drawn one small circle, wherein the point of the position ${}_ip_0$ is subjected to the transformation, in the sectional circle of ${}_nd_s$ in height.

(Scan ${}_nd_s$ (D-10-19))

(Scan k (D-10-20))

(Scan i (D-10-21))

(12) In the processing up to here, there are drawn small circles, wherein "all the points $\{{}_ip_0\}$ in the image" are subjected to the transformation, in the sectional circles of $\{{}_nd_s\}$ in all the heights. That is, the voting is performed for the inside of all the sectional circles of the cylindrical arrangement.

(Scan v (D-10-22))

(13) In the processing up to here, the voting is performed for all the sectional circles of the "cylindrical arrangements for all the moving direction parameters v".

(14) Extract a "specified cylindrical arrangement" wherein the intensity offers the maximum from among the cylindrical arrangements, by a "peak extraction unit 225". Thus, a true moving direction $v_0$ is determined in the form of the moving direction parameter for this arrangement. When a point, wherein the intensity offers the peak in the cylindrical arrangement, is extracted, the normalization shortest distance ${}_nd_{s0}$ of the plane is determined in the form of a "height coordinates" of the maximum point, and the three-dimensional azimuth $n_{s0}$ of the plane is determined in the form of a "sectional circle inside coordinates" (D-10-23).

Embodiment D-11. (Stereo+a Normalization Shortest Distance)

FIG. 107 is a block diagram of an embodiment D-11 of the present invention. FIG. 108 is a flowchart of the embodiment D-11.

(1) In a similar fashion to that of the embodiment B-1, set up the "position $p_{axis}$ on the optical axis", as being equal to the optical axis direction $a_{xis}$, by a "$p_{axis}$ set unit 115" (D-11-1).

(2) Scan the respective addresses i from the minimum value $i_{min}$ to the maximum value $i_{max}$ by a "scan unit 421 for pixel No. i" (D-11-2, D-11-3, D-11-19).

(Scan i)

(3) Cut and bring down images on local areas taking a "pixel ${}_ip_R$ associated with the address i" as the center from images, which are obtained by a right camera 412 and a left camera 413 respectively, as shown in FIG. 167, by a "unit 422 for cutting and bringing down images on local areas taking ${}_ip_R$ as the center" (D-11-4).

(4) Scan the binocular parallax No. k from the minimum value $k_{min}$ to the maximum value $k_{max}$ by a "scan unit 423 for binocular parallax No. k" (D-11-5, D-11-6, D-11-18).

(5) The number k is a serial number of the binocular parallax, and is associated with the binocular parallax $k_\sigma$, that is, the parallactic vector (${}_k\sigma_x$ ${}_k\sigma_y$), as shown in FIG. 168. Such an association is performed by a "transformation unit 424 for binocular parallax ${}_k\sigma$" to output the binocular parallax ${}_k\sigma$ (D-11-7). In the event that the direction of the binocular parallax ${}_k\sigma$, that is, the parallactic vector (${}_k\sigma_x$ ${}_k\sigma_y$) is different from the "direction from ${}_ip_R$ to $a_{xis}$ (that is, $p_{axis}$) in FIG. 24(A), it is the binocular parallax which conflicts with this optical axis direction $a_{xis}$. Thus, in this case, the process skips to the step (10) (D-11-8).

(6) In a similar fashion to that of the step (6) of the embodiment D-5, feed the "images on local areas on the right camera and the left camera "and the "binocular parallax ${}_k\sigma$ " to a "binocular parallax detection unit 425" (cf. FIG. 167) to compute the response intensity in accordance with the following equation (D-11-9).

$$\text{Response intensity}=\Sigma_x\Sigma_y\ {}_ia_R(x,\ y)_ia_L(x-{}_k\sigma_x,\ y-{}_k\sigma_y)$$

(7) Scan a normalized time parameter ${}_n d_s$ by a "scan unit for ${}_n d_s$ parameter 122" from the minimum value ${}_n d_{s,\ min}$ to the maximum value ${}_n d_{s,\ max}$ (D-11-10, D-11-11, D-11-17).

(Scan ${}_n d_s$)

The following processing is performed in a similar fashion to that of the above-mentioned embodiment C-3. But, the present embodiment D-11 is different from the embodiment C-3 in the point that in the step (10) such a processing that "the response intensity of the binocular parallax detection unit is voted" is performed.

(8) Consider a circle (FIG. 26) of radius r taking the moving direction v as the center, and scan the radius r from 0 to π/2 by a "scan unit for radius r 222" (D-11-12, D-11-13, D-11-16).

(Scan r)

(9) Transform the pixel No. i to the pixel ${}_i p_R$ in an ${}_i p_R$ transformation unit (426), and feed five parameters ${}_n d_s$, ${}_i p_R$, $p_{inf}$, ${}_i\sigma$, r thus set up to a "computing unit 223 for small circle structural element ${}^i{}_r n_{s+}$, ${}^i{}_r n_{s-}$" and output two cross points ${}^i{}_r n_{s+}$, ${}^i{}_r n_{s-}$ explained with reference to FIG. 26 (D-11-14).

(10) Points ${}^i{}_r n_{s+}$, ${}^i{}_r n_{s-}$ constituting the above-mentioned small circle are transformed to points in the sectional circle of height ${}_n d_s$ of a "cylindrical arrangement voting unit 224". Next, "the response intensity of the binocular parallax detection unit", which is calculated in the step (6), is voted for those points thus transformed (D-11-15).

(Scan r (D-11-16)).

(11) In the processing up to here, there is drawn one small circle, wherein the point of the position ${}_i p_R$ is subjected to the transformation, in the sectional circle of ${}_n d_s$ in height.

(Scan ${}_n d_s$ (D-11-17))

(Scan k (D-11-18))

(Scan i (D-11-19))

(12) In the processing up to here, there are drawn small circles, wherein "all the points $\{{}_i p_R\}$ in the image" are subjected to the small circle transformation, in the sectional circles of $\{{}_n d_s\}$ in all the heights. That is, the voting is performed for the inside of all the sectional circles of the cylindrical arrangement.

(13) Extract a "point wherein the voted intensity offers the maximum (peak)" in the cylindrical arrangement, by a "peak extraction unit 225" (C-1-15). This maximum point is a "place wherein the small circles intersect with each other at one point". The normalization shortest distance ${}_n d_{s0}$ is determined in the form of a "height coordinates" of the maximum point, and the "three-dimensional azimuth $n_{s0}$ of the plane" is determined in the form of a "sectional circle inside coordinates".

In the above, the normalization shortest distance ${}_n d_s$ is referred to. However, since $\Delta x_{LR}$ is constant, it is acceptable that the distance is replaced by the shortest distance $d_s$ (that is, ${}_n d_s \Delta x_{LR}$). In this respect, the theory is applicable to all the embodiments dealing with the normalization shortest distance ${}_n d_s$.

Embodiment D-12. (Stereo+a Normalization Shortest Distance $a_{xis}$ Unknown)

FIG. 109 is a block diagram of an embodiment D-12 of the present invention. FIG. 110 is a flowchart of the embodiment D-12.

The following steps (2)–(11) are the same as the corresponding steps of the embodiment D-11.

(0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 121" (D-12-1, D-12-2, D-12-22).

(1) Set up the "position $p_{axis}$ on the optical axis", as being equal to the parameter $a_{xis}$, by a "$p_{axis}$ set unit 115" (D-12-3).

(Scan $a_{xis}$)

(2) Scan the respective addresses i from the minimum value $i_{min}$ to the maximum value $i_{max}$ by a "scan unit 421 for pixel No. i" (D-12-4, D-12-5, D-12-21).

(Scan i)

(3) Cut and bring down images on local areas taking a "pixel ${}_i p_R$ associated with the address i" as the center from images, which are obtained by a right camera 412 and a left camera 413 respectively, as shown in FIG. 167, by a "unit 422 for cutting and bringing down images on local areas taking ${}_i p_R$ as the center" (D-12-6).

(4) Scan the binocular parallax No. k from the minimum value $k_{min}$ to the maximum value $k_{max}$ by a "scan unit 423 for binocular parallax No. k" (D-12-7, D-12-8, D-12-20).

(5) The number k is a serial number of the binocular parallax, and is associated with the binocular parallax ${}_k\sigma$, that is, the parallactic vector (${}_k\sigma_x\ {}_k\sigma_y$) as shown in FIG. 168. Such an association is performed by a "transformation unit 424 for binocular parallax ${}_k\sigma$" to output the binocular parallax ${}_k\sigma$ (D-12-9). In the event that the direction of the binocular parallax ${}_k\sigma$, that is, the parallactic vector (${}_k\sigma_x\ {}_k\sigma_y$) is different from the "direction from ${}_i p_R$ to $a_{xis}$ (that is, $p_{axis}$) in FIG. 24(A), it is the binocular parallax which conflicts with this optical axis direction $a_{xis}$. Thus, in this case, the process skips to the step (10) (D-12-10).

(6) In a similar fashion to that of the step (6) of the embodiment D-5, feed the "images on local areas on the right camera and the left camera "and the "binocular parallax ${}_k\sigma$" to a "binocular parallax detection unit 425" (cf. FIG. 167) to compute the response intensity in accordance with the following equation (D-12-11).

$$\text{Response intensity} = \Sigma_x \Sigma_y\ {}_i a_R(x, y)\, {}_i a_L(x - {}_k\sigma_x,\ y - {}_k\sigma_y)$$

(7) Scan a normalized time parameter ${}_n d_s$ by a "scan unit for ${}_n d_s$ parameter 122" from the minimum value ${}_n d_{s,\ min}$ to the maximum value ${}_n d_{s,\ max}$ (D-12-12, D-12-13, D-12-19).

(Scan ${}_n d_s$)

The following processing is performed in a similar fashion to that of the above-mentioned embodiment C-4. But, the present embodiment D-12 is different from the embodiment C-4 in the point that in the step (10) such a processing that "the response intensity of the binocular parallax detection unit is voted" is performed.

(8) Consider a circle (FIG. 26) of radius r taking the moving direction v as the center, and scan the radius r from 0 to π/2 by a "scan unit for radius r 222" (D-12-14, D-12-15, D-12-18).

(Scan r)

(9) Transform the pixel No. i to the pixel ${}_i p_R$ in an ${}_i p_R$ transformation unit (426), and feed five parameters ${}_n d_s$, ${}_i p_R$, $p_{inf}$, ${}_i\sigma$, r thus set up to a "computing unit 223 for small circle structural element ${}^i{}_r n_{s+}$, ${}^i{}_r n_{s-}$" and output two cross points ${}^i{}_r n_{s+}$, ${}^i{}_r n_{s-}$ explained with reference to FIG. 26 (D-12-16).

(10) Points ${}^i{}_r n_{s+}$, ${}^i{}_r n_{s-}$ constituting the above-mentioned small circle are transformed to points in the sectional circle of height ${}_n d_s$ of a "cylindrical arrangement voting unit 224". Next, "the response intensity of the binocular parallax detection unit", which is calculated in the step (6), is voted for those points thus transformed (D-12-17).

(Scan r (D-12-18)).

(11) In the processing up to here, there is drawn one small circle, wherein the point of the position ${}_i p_R$ is subjected to the transformation, in the sectional circle of ${}_n d_s$ in height.

(Scan ${}_n d_s$ (D-12-19))

(Scan k (D-12-20))

(Scan i (D-12-21))

(12) In the processing up to here, there are drawn small circles, wherein "all the points $\{_iP_R\}$ in the image" are subjected to the transformation, in the sectional circles of $\{_nd_s\}$ in all the heights. That is, the voting is performed for the inside of all the sectional circles of the cylindrical arrangement.

(Scan axis (D-12-22))

(13) In the processing up to here, the voting is performed for all the sectional circles of the "cylindrical arrangements for all the optical axis direction parameters $a_{xis}$".

(14) Extract a "specified cylindrical arrangement" wherein the intensity offers the maximum from among the cylindrical arrangements, by a "peak extraction unit 225". Thus, a true optical axis direction $a_{xis}$ is determined in the form of the optical axis direction parameter for this arrangement. When a point, wherein the intensity offers the peak in the cylindrical arrangement, is extracted, the normalization shortest distance $_nd_{s0}$ of the plane is determined in the form of a "height coordinates" of the maximum point, and the three-dimensional azimuth $n_{s0}$ of the plane is determined in the form of a "sectional circle inside coordinates" (D-12-23).

Embodiment E-1. (Normalized Time)

Figure 111A:
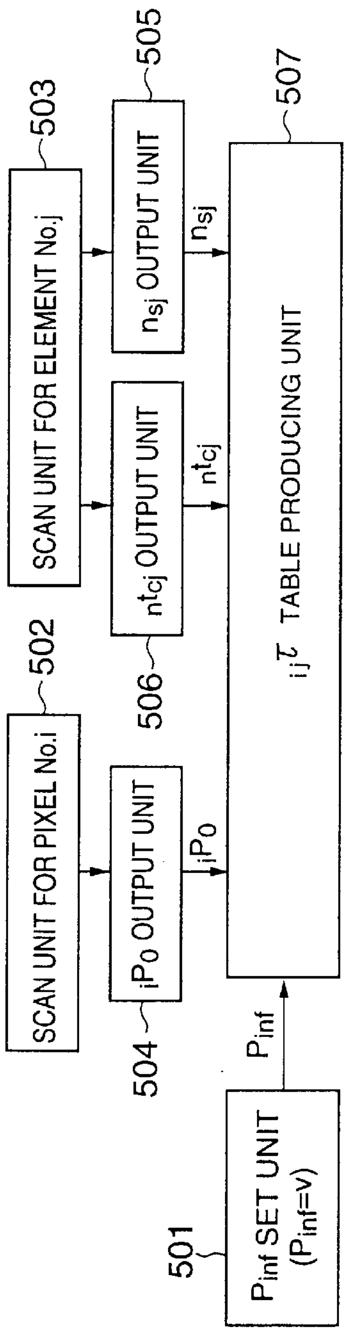
Figure 111B:
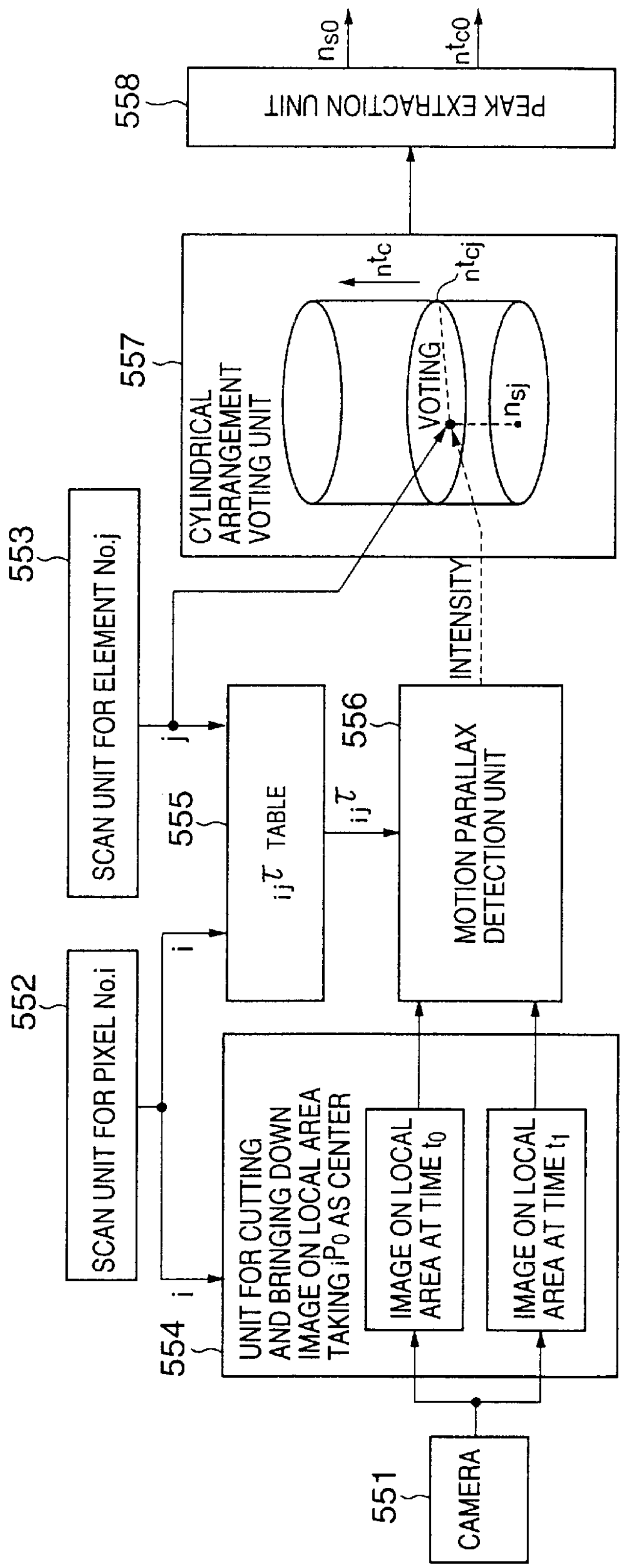

FIGS. 111(A) and 111(B) are block diagrams of an embodiment E-1 of the present invention. FIGS. 112 and 113 are flowcharts of the embodiment E-1.

(α) Prepare an $_{ij}\tau$ table (FIG. 163), that is, a table for retrieving and outputting a motion parallax $_{ij}\tau$ from a pixel number i of an input image and an element number j of a cylindrical arrangement (cf. FIG. 111(A), FIG. 112).

(α1) Extract the moving direction v in a similar fashion to that of the step (1) in the embodiment A-1, and set up the "position $p_{inf}$ after the infinite time elapses", as being equal to the moving direction v, by a "$p_{inf}$ set unit 501" (E-1α-1).

(α2) Scan addresses i of the respective points $_ip_0$ on an image from the minimum value $i_{min}$ to the maximum value $i_{max}$ by a "scan unit 502 for pixel No. i" (E-1α-2, E-1α-3, E-1α-10).

(Scan i)

(α3) Scan addresses j of elements ($n_{sj}$, $_nt_{cj}$) on a cylindrical arrangement from the minimum value $j_{min}$ to the maximum value $j_{max}$ by a "scan unit 503 for element No. j" (E-1α-4, E-1α-5, E-1α-9).

(Scan j)

(α4) Output pixels $_ip_0$ on the image and the elements ($n_{sj}$, $_nt_{cj}$) on the cylindrical arrangement, which are associated with the addresses (i, j), by an "$_ip_0$ output unit 504", an "$n_{sj}$ output unit 505" and an "$_nt_{cj}$ output unit 506" (E-1α-6).

(α5) Feed four parameters $n_{sj}$, $_nt_{cj}$, $_ip_0$, $p_{inf}$ thus set up to an "$_{ij}\tau$ table producing unit 507" and compute the motion parallax $_{ij}\tau$ in accordance with a method shown in (A-1) of the appendix (E-1α-7).

For the purpose of avoiding troublesomeness, the following motion direction (a direction of motion from $_ip_0$ to $_ip_1$, that is, $_{ij}\phi$) and the like are omitted. First, there is a need that $_{ij}\phi$ is determined from $p_1$ computed in (A) of the appendix to form the content of an $_{ij}\phi$ table, and further there is a need to vote only when $_{ij}\phi$ is coincident with a direction $\tan^{-1}(_{ij}\tau_y/_{ij}\tau_x)$ of the motion vector ($_{ij}\tau_x$, $_{ij}\tau_y$) to be detected in the following step (β5). However, those are omitted. In this respect, it is the same also in the embodiments involving the similar processing, which will be described hereinafter.

It is acceptable that the motion parallax $_{ij}\tau$ is computed in accordance with any one of methods, not restricted to the method shown in (A-1) of the appendix. In this respect, it is the same also in all the embodiments in which a computation of motion parallax is performed in accordance with the method shown in (A-1) of the appendix.

Further, according to the present embodiment, the $_{ij}\tau$ table is prepared, and in the actual voting, $_{ij}\tau$ is derived from the $_{ij}\tau$ table thus prepared. However, there is no need to prepare the $_{ij}\tau$ table beforehand. it is acceptable that $_{ij}\tau$ is computed when an operation for the voting is carried out.

(α6) Store the motion parallax $_{ij}\tau$ in the form of the content associated with the addresses (i, j) of the $_{ij}\tau$ table (FIG. 163) (E-1α-8).

(Scan j (E-1α-9)

(Scan i (E-1α-10)

Thus, the $_{ij}\tau$ table (FIG. 163) is obtained.

(β) Using the ij" table thus prepared, detect the planar azimuth $n_{s0}$ and the normalized time $_nt_{c0}$ (cf. FIG. 111(B) and FIG. 113).

(β1) Scan addresses i of the respective points $_ip_0$ on an image from the minimum value $i_{min}$ to the maximum value $i_{max}$ by a "scan unit 552 for pixel No. i" (E-1β-1, E-1β-2, E-1β-10).

(Scan i)

(β2) In a similar fashion to that of the step (3) of the embodiment D-1, cut and bring down images on local areas taking a "pixel $_ip_0$ associated with the address i" as the center from images at present time $t_0$ and the subsequent time $t_1$, which are obtained by a camera 11, as to the present time $t_0$ and the subsequent time $t_1$, respectively, by a "unit 554 for cutting and bringing down images on local areas taking $_ip_0$ as the center" (E-1β-3).

(β3) Scan addresses j of elements ($n_{sj}$, $_nt_{cj}$) on a cylindrical arrangement from the minimum value $j_{min}$ to the maximum value $j_{max}$ by a "scan unit 553 for element No. j" (E-1β-4, E-1β-5, E-1β-9).

(Scan j)

(β4) Feed those addresses (i, j) to an $_{ij}\tau$ table 555 (FIG. 163) and output the motion parallax $_{ij}\tau$ (E-1β-6).

(β5) In a similar fashion to that of the step (6) of the embodiment D-1, feed the "images on local areas at present time $t_0$ and the subsequent time $t_1$" and the "motion parallax $_k\tau$" to a "motion parallax detection unit 556" (cf. FIG. 159) to compute the response intensity in accordance with the following equation (E-1β-7).

$$\text{Response intensity}=\Sigma_x\Sigma_y\ {}_ia_0(x,y)_ia_1(x-{}_{ij}\tau_x,\ y-{}_{ij}\tau_y)$$

(β6) The response intensity is voted for elements ($n_{sj}$, $_nt_{cj}$) on a "cylindrical arrangement voting unit 557" (E-1β-8).

(Scan j (E-1β-9))

(Scan i (E-1β-10))

(β7) Extract a "point wherein the voted intensity offers the maximum (peak)" in the cylindrical arrangement, by a "peak extraction unit 558". This maximum point is a "place wherein the large circles intersect with each other at one point". The "normalized time $_nt_{c0}$ up to going across the plane" is determined in the form of a "height coordinates" of the maximum point, and the "three-dimensional azimuth $n_{s0}$ of the plane" is determined in the form of a "sectional circle inside coordinates" (E-1β-11).

Embodiment E-2. (Normalized Time+v Unknown)

Figure 114A:
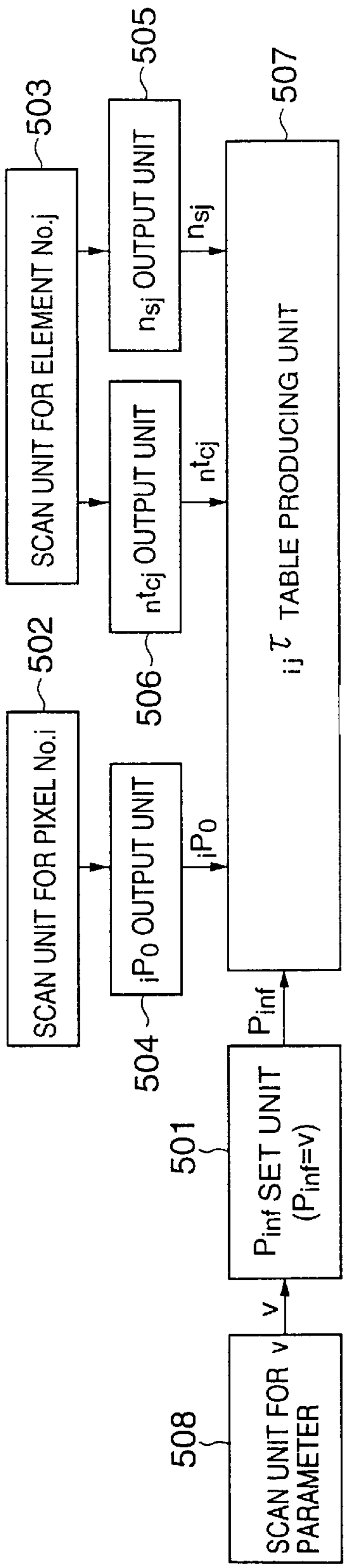
Figure 114B:
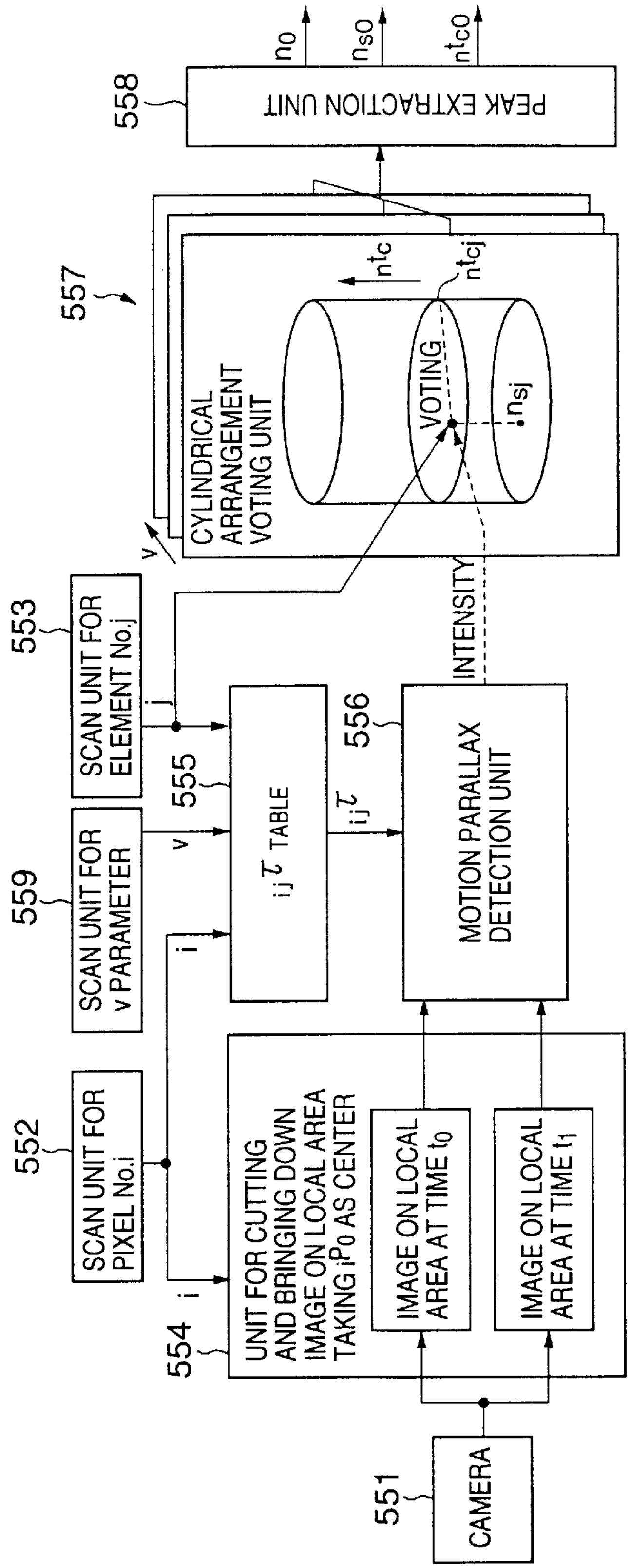

FIGS. 114(A) and 114(B) are block diagrams of an embodiment E-2 of the present invention. FIGS. 115 and 116 are flowcharts of the embodiment E-2.

(α) Prepare an $_{ij}\tau$ table (FIG. 164) for all the moving direction {v}, that is, a table for retrieving and outputting a motion parallax ${}_{ij}\tau$ from a pixel number i of an input image, an element number j of a cylindrical arrangement, and the moving direction v (cf. FIG. 114(A), FIG. 115).

The following step (α2) to (α6) are the same as the corresponding steps of the embodiment E-1(α).

(α0) Scan a "moving direction parameter v" over any possible directions (from the minimum value $v_{min}$ to the maximum value $v_{max}$) by a "scan unit for v parameter 508" (E-2α-1, E-2α-2, E-2α-13).

(Scan v)

(α1) Set up the "position $p_{inf}$ after the infinite time elapses", as being equal to the parameter v, by a "$p_{inf}$ set unit 501" (E-2α-3).

(α2) Scan addresses i of the respective points ${}_ip_0$ on an image from the minimum value $i_{min}$ to the maximum value $i_{max}$ by a "scan unit 502 for pixel No. i" (E-2 α-4, E-2α-5, E-2α-12).

(Scan i)

(α3) Scan addresses j of elements ($n_{sj}$, ${}_nt_{cj}$) on a cylindrical arrangement from the minimum value $j_{min}$ to the maximum value $j_{max}$ by a "scan unit 503 for element No. j" (E-2α-6, E-2α-7, E-2α-11).

(Scan j)

(α4) Output pixels ${}_ip_0$ on the image and the elements ($n_{sj}$, ${}_nt_{cj}$) on the cylindrical arrangement, which are associated with the addresses (i, j), by an "${}_ip_0$ output unit 504", an "$n_{sj}$ output unit 505" and an "${}_nt_{cj}$ output unit 506" (E-2α-8).

(α-5) Feed four parameters $n_{sj}$, ${}_nt_{cj}$, ${}_ip_0$, $p_{inf}$ thus set up to an "${}_{ij}\tau$ table producing unit 507" and compute the motion parallax ${}_{ij}\tau$ in accordance with a method shown in (A-1) of the appendix (E-2α-9).

(α-6) Store the motion parallax ${}_{ij}\tau$ in the form of the content associated with the addresses (i, j) of the ${}_{ij}\tau$ table (FIG. 164) (E-2α-10).

(Scan j (E-2α-11)

(Scan i (E-2α-12)

(α-7) In the processing up to here, there are obtained the ${}_{ij}\tau$ table for the respective moving directions v.

Thus, the ${}_{ij}\tau$ table (FIG. 164) for all the moving directions {v} is obtained.

(β) Using the ${}_{ij}\tau$ table thus prepared, detect the planar azimuth $n_{s0}$ and the normalized time ${}_nt_{c0}$ (cf. FIG. 114(B) and FIG. 116)

The following step (β1) to (β6) are the same as the corresponding steps of the embodiment E-1.

(β0) Scan a "moving direction parameter v" over any possible directions (from the minimum value $v_{min}$ to the maximum value $v_{max}$) by a "scan unit for v parameter 559" (E-2β-1, E-2β-2, E-2β-13).

(Scan v)

(β1) Scan addresses i of the respective points ${}_ip_0$ on an image from the minimum value $i_{min}$ to the maximum value $i_{max}$ by a "scan unit 552 for pixel No. i" (E-2β-3, E-2β-4, E-2β-12).

(Scan i)

(β2) In a similar fashion to that of the step (3) of the embodiment D-1, cut and bring down images on local areas taking a "pixel ${}_ip_0$ associated with the address i" as the center from images at present time $t_0$ and the subsequent time $t_1$, which are obtained by a camera 11, as to the present time $t_0$ and the subsequent time $t_1$, respectively, by a "unit 554 for cutting and bringing down images on local areas taking ${}_ip_0$ as the center"0 (E-2β-5).

(β3) Scan addresses j of elements ($n_{sj}$, ${}_nt_{cj}$) on a cylindrical arrangement from the minimum value $j_{min}$ to the maximum value $j_{max}$ by a "scan unit 553 for element No. j" (E-2β-6, E-2β-7, E-2β-11).

(Scan j)

(β4) Feed those addresses (i, j) to an ${}_{ij}\tau$ table 555 (FIG. 164) and output the motion parallax ${}_{ij}\tau$ (E-2β-8).

(β5) In a similar fashion to that of the step (6) of the embodiment D-1, feed the "images on local areas at present time $t_0$ and the subsequent time $t_1$" and the "motion parallax ${}_k\tau$" to a "motion parallax detection unit 556" (cf. FIG. 159) to compute the response intensity in accordance with the following equation (E-2β-9).

$$\text{Response intensity}=\Sigma_x\Sigma_y\ {}_ia_0(x, y)_ia_1(x-{}_{ij}\tau_x, y-{}_{ij}\tau_y)$$

(β6) The response intensity is voted for elements ($n_{sj}$, ${}_nt_{cj}$) on a "cylindrical arrangement voting unit 557" (E-2β-10).

(Scan j (E-2β-11))

(Scan i (E-2β-12))

(β7) In the processing up to here, the voting is performed for all the elements of the cylindrical arrangement.

(Scan v (E-2β-13))

(β8) In the processing up to here, the voting is performed for all the elements of the cylindrical arrangements for all the moving direction parameters v.

(β9) Extract a "specified cylindrical arrangement" wherein the intensity offers the maximum from among the cylindrical arrangements, by a "peak extraction unit 558". Thus, a true moving direction $v_0$ is determined in the form of the moving direction parameter for this arrangement. When a point, wherein the intensity offers the peak in the cylindrical arrangement, is extracted, the normalized time ${}_nt_{c0}$ up to going across the plane is determined in the form of a "height coordinates" of the maximum point, and the three-dimensional azimuth $n_{s0}$ of the plane is determined in the form of a "sectional circle inside coordinates" (E-2β-14).

Embodiment E-3. (Normalization Shortest Distance)

Figure 117A:
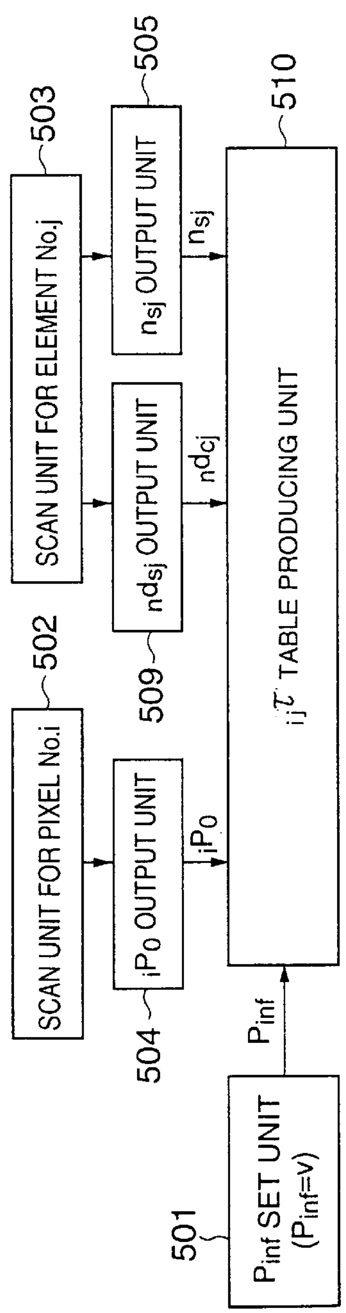
Figure 117B:
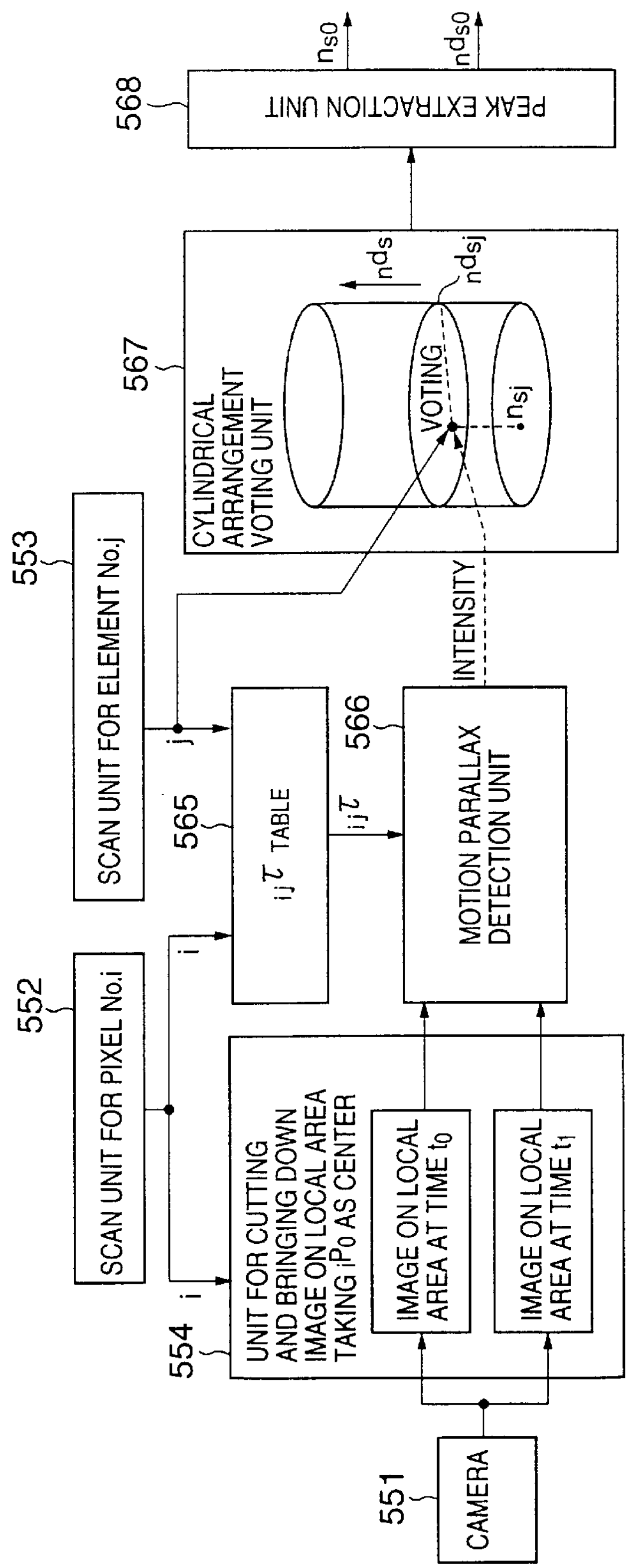

FIGS. 117(A) and 117(B) are block diagrams of an embodiment E-3 of the present invention. FIGS. 118 and 119 are flowcharts of the embodiment E-3.

(α) Prepare an ${}_{ij}\tau$ table (FIG. 163), that is, a table for retrieving and outputting a motion parallax ${}_{ij}\tau$ from a pixel number i of an input image and an element number j of a cylindrical arrangement (cf. FIG. 117(A), FIG. 118).

(α1) Extract the moving direction v in a similar fashion to that of the step (1) in the embodiment A-1, and set up the "position $p_{inf}$ after the infinite time elapses", as being equal to the moving direction v, by a "$p_{inf}$ set unit 501" (E-3α-1).

(α2) Scan addresses i of the respective points ${}_ip_0$ on an image from the minimum value $i_{min}$ to the maximum value $i_{max}$ by a "scan unit 502 for pixel No. i" (E-3α-2, E-3α-3, E-3α-10).

(Scan i)

(α3) Scan addresses j of elements ($n_{sj}$, ${}_nt_{cj}$) on a cylindrical arrangement from the minimum value $j_{min}$ to the maximum value $j_{max}$ by a "scan unit 503 for element No. j" (E-3α-4, E-3α-5, E-3α-9).

(Scan j)

(α4) Output pixels ${}_ip_0$ on the image and the elements ($n_{sj}$, ${}_nt_{cj}$) on the cylindrical arrangement, which are associated with the addresses (i, j), by an "${}_ip_0$ output unit 504", an "$n_{sj}$ output unit 505" and an "${}_nd_{sj}$ output unit 509" (E-3α-6).

(α-5) Feed four parameters $n_{sj}$, ${}_nd_{sj}$, ${}_ip_0$, $p_{inf}$ thus set up to an "${}_{ij}\tau$ table producing unit 510" and compute the motion parallax ${}_{ij}\tau$ in accordance with a method shown in (A-2) of the appendix (E-3α-7).

It is acceptable that the motion parallax $_{ij}\tau$ is computed in accordance with any one of methods, not restricted to the method shown in (A-2) of the appendix. In this respect, it is the same also in all the embodiments in which a computation of motion parallax is performed in accordance with the method shown in (A-2) of the appendix.

(α-6) Store the motion parallax ant in the form of the content associated with the addresses (i, j) of the $_{ij}\tau$ table (FIG. 163) (E-3α-8).

(Scan j (E-3α-9))

(Scan i (E-3α-10))

Thus, the $_{ij}\tau$ table (FIG. 163) is obtained.

(β) Using the $_{ij}\tau$ table thus prepared, detect the planar azimuth $n_{s0}$ and the normalization shortest distance $_nd_{s0}$ (cf. FIG. 117(B) and FIG. 119).

(β1) Scan addresses i of the respective points $_ip_0$ on an image from the minimum value $i_{min}$ to the maximum value $i_{max}$ by a "scan unit 552 for pixel No. i" (E-3β-1, E-3β-2, E-3β-10).

(Scan i)

(β2) In a similar fashion to that of the step (3) of the embodiment D-1, cut and bring down images on local areas taking a "pixel $_ip_0$ associated with the address i" as the center from images at present time $t_0$ and the subsequent time $t_1$, which are obtained by a camera 11, as to the present time $t_0$ and the subsequent time $t_1$, respectively, by a "unit 554 for cutting and bringing down images on local areas taking $_ip_0$ as the center" (E-3β-3).

(β3) Scan addresses j of elements ($n_{sj}$, $_nd_{sj}$) on a cylindrical arrangement from the minimum value $j_{min}$ to the maximum value $j_{max}$ by a "scan unit 553 for element No. j" (E-3β-4, E-3β-5, E-3β-9).

(Scan j)

(β4) Feed those addresses (i, j) to an $_{ij}\tau$ table 555 and output the motion parallax $_{ij}\tau$ (E-3β-6).

(β5) In a similar fashion to that of the step (6) of the embodiment D-1, feed the "images on local areas at present time $t_0$ and the subsequent time $t_1$" and the "motion parallax $_k\tau$" to a "motion parallax detection unit 556" (cf. FIG. 159) to compute the response intensity in accordance with the following equation (E-3β-7).

$$\text{Response intensity}=\Sigma_x\Sigma_y\ {}_ia_0(x, y)_ia_1(x-{}_{ij}\tau_x, y-{}_{ij}\tau_y)$$

(β6) The response intensity is voted for elements ($n_{sj}$, $_nd_{sj}$) on a "cylindrical arrangement voting unit 557" (E-3β-8).

(Scan j (E-3β-9))

(Scan i (E-3β-10))

(β7) Extract a "point wherein the voted intensity offers the maximum (peak)" in the cylindrical arrangement, by a "peak extraction unit 558". This maximum point is a "place wherein the large circles intersect with each other at one point". The "normalization shortest distance $_nd_{s0}$ up to going across the plane" is determined in the form of a "height coordinates" of the maximum point, and the "three-dimensional azimuth $n_{s0}$ of the plane" is determined in the form of a "sectional circle inside coordinates" (E-3β-11).

Embodiment E-4. (Normalization Shortest Distance+v Unknown)

Figures 120A, 120B:
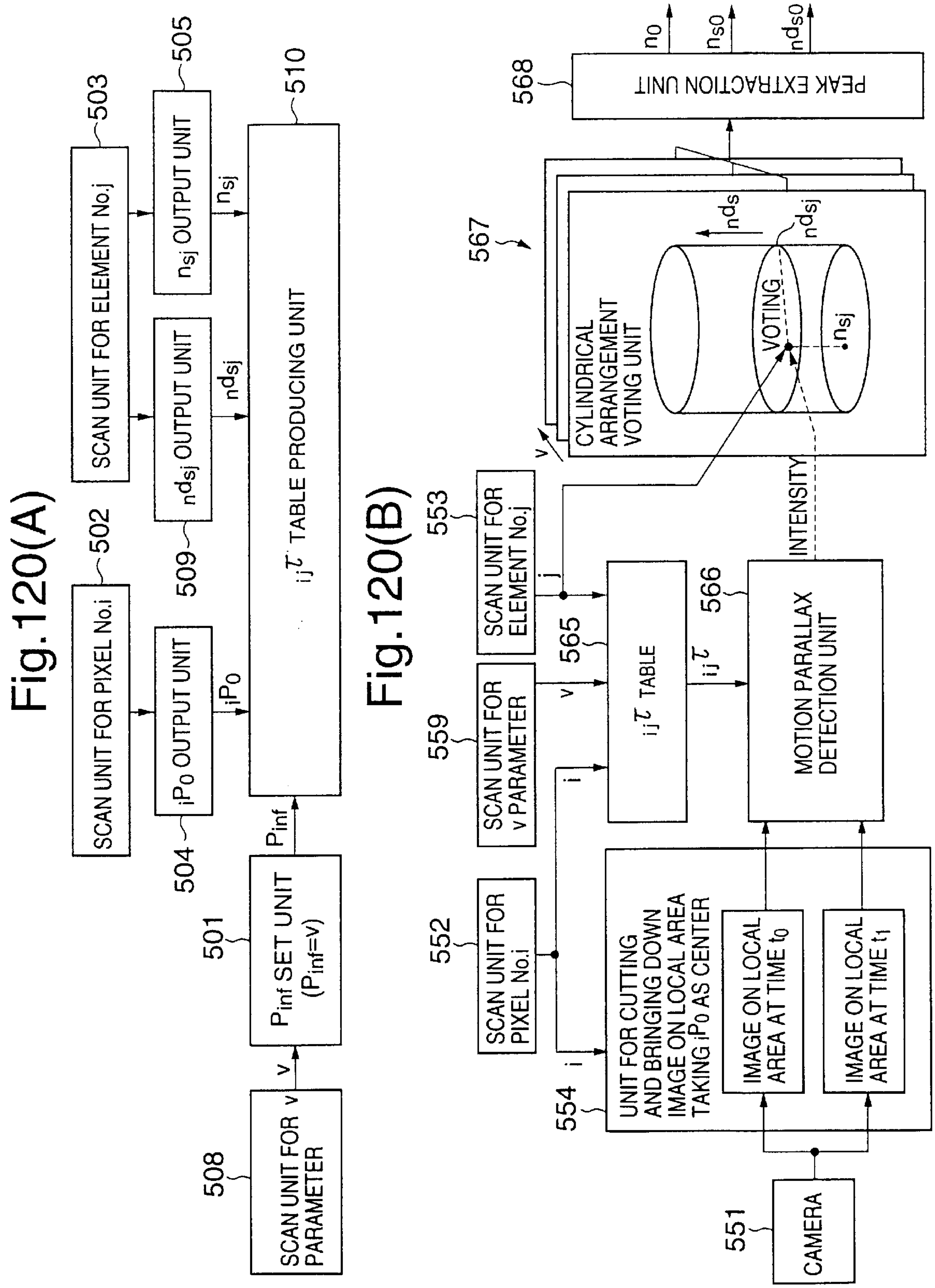

FIGS. 120(A) and 120(B) are block diagrams of an embodiment E-4 of the present invention. FIGS. 121 and 122 are flowcharts of the embodiment E-4.

(α) Prepare an $_{ij}\tau$ table (FIG. 164) for all the moving direction {v}, that is, a table for retrieving and outputting a motion parallax $_{ij}\tau$ from a pixel number i of an input image, an element number j of a cylindrical arrangement, and the moving direction v (cf. FIG. 120(A), FIG. 121).

The following step (α2) to (α6) are the same as the corresponding steps of the embodiment E-3(α).

(α0) Scan a "moving direction parameter v" over any possible directions (from the minimum value $v_{min}$ to the maximum value $v_{max}$) by a "scan unit for v parameter 508" (E-4α-1, E-4α-2, E-4α-13).

(Scan v)

(α1) Set up the "position $p_{inf}$ after the infinite time elapses", as being equal to the parameter v, by a "$p_{inf}$ set unit 501" (E-4α-3).

(α2) Scan addresses i of the respective points $_ip_0$ on an image from the minimum value $i_{min}$ to the maximum value $i_{max}$ by a "scan unit 502 for pixel No. i" (E-4α-4, E-4α-5, E-4α-12).

(Scan i)

(α3) Scan addresses j of elements ($n_{sj}$, $n_{cj}$) on a cylindrical arrangement from the minimum value $j_{min}$ to the maximum value $j_{max}$ by a "scan unit 503 for element No. j" (E-4α-6, E-4α-7, E-4α-11).

(Scan j)

(α4) Output pixels $_ip_0$ on the image and the elements ($n_{sj}$, $_nd_{sj}$) on the cylindrical arrangement, which are associated with the addresses (i, j), by an "$_ip_0$ output unit 504", an "$n_{sj}$ output unit 505" and an "$_nd_{sj}$ output unit 509" (E-4α-8).

(α-5) Feed four parameters $n_{sj}$, $_nd_{sj}$, $_ip_0$, $p_{inf}$ thus set up to an "$_{ij}\tau$ table producing unit 510" and compute the motion parallax $_{ij}\tau$ in accordance with a method shown in (A-1) of the appendix (E-4α-9).

(α-6) Store the motion parallax $_{ij}\tau$ in the form of the content associated with the addresses (i, j) of the $_{ij}\tau$ table (FIG. 164) (E-4α-10).

(Scan j (E-4α-11))

(Scan i (E-4α-12))

(α-7) In the processing up to here, there are obtained the $_{ij}\tau$ table for the respective moving directions v.

Thus, the $_{ij}\tau$ table (FIG. 164) for all the moving directions {v} is obtained.

(β) Using the $_{ij}\tau$ table thus prepared, detect the planar azimuth $n_{s0}$ and the normalization shortest distance $_nd_{sj}$ (cf. FIG. 120(B) and FIG. 122)

The following step (β1) to (β6) are the same as the corresponding steps of the embodiment E-3.

(β0) Scan a "moving direction parameter v" over any possible directions (from the minimum value $v_{min}$ to the maximum value $v_{max}$) by a "scan unit for v parameter 559" (E-4β-1, E-4β-2, E-4β-13).

(Scan v)

(β1) Scan addresses i of the respective points $_ip_0$ on an image from the minimum value $i_{min}$ to the maximum value $i_{max}$ by a "scan unit 552 for pixel No. i" (E-4β-3, E-4β-4, E-4β-12).

(Scan i)

(β2) In a similar fashion to that of the step (3) of the embodiment D-1, cut and bring down images on local areas taking a "pixel $_ip_0$ associated with the address i" as the center from images at present time $t_0$ and the subsequent time $t_1$, which are obtained by a camera 11, as to the present time $t_0$ and the subsequent time $t_1$, respectively, by a "unit 554 for cutting and bringing down images on local areas taking $_ip_0$ as the center" (E-4β-5).

(β3) Scan addresses j of elements ($n_{sj}$, $_nd_{sj}$) on a cylindrical arrangement from the minimum value $j_{min}$ to the maximum value $j_{max}$ by a "scan unit 553 for element No. i" (E-4β-6, E-4β-7, E-4β-11).

(Scan j)

(β4) Feed those addresses (i, j) to an ${}_{ij}\tau$ table 565 (FIG. 164) and output the motion parallax ${}_{ij}\tau$ (E-4β-8).

(β5) In a similar fashion to that of the step (6) of the embodiment D-1, feed the "images on local areas at present time $t_0$ and the subsequent time $t_1$" and the "motion parallax ${}_{k}\tau$" to a "motion parallax detection unit 566" (cf. FIG. 159) to compute the response intensity in accordance with the following equation (E-4β-9).

$$\text{Response intensity}=\Sigma_x\Sigma_y\ {}_ia_0(x,y)_ia_1(x-{}_{ij}\tau_x,\ y-{}_{ij}\tau_y)$$

(β6) The response intensity is voted for elements ($n_{sj}$, ${}_nd_{sj}$) on a "cylindrical arrangement voting unit 567" (E-4β-10).

(Scan j (E-4β-11))

(Scan i (E-4β-12))

(β7) In the processing up to here, the voting is performed for all the elements of the cylindrical arrangement.

(Scan v (E-4β-13))

(β8) In the processing up to here, the voting is performed for all the elements of the cylindrical arrangements for all the moving direction parameters v.

(β9) Extract a "specified cylindrical arrangement" wherein the intensity offers the maximum from among the cylindrical arrangements, by a "peak extraction unit 568". Thus, a true moving direction $v_0$ is determined in the form of the moving direction parameter for this arrangement. When a point, wherein the intensity offers the peak in the cylindrical arrangement, is extracted, the normalization shortest distance ${}_nd_{sj}$ up to going across the plane is determined in the form of a "height coordinates" of the maximum point, and the three-dimensional azimuth $n_{s0}$ of the plane is determined in the form of a "sectional circle inside coordinates" (E-4β-14).

Embodiment E-5. (Stereo+a Normalized Distance)

Figure 123A:
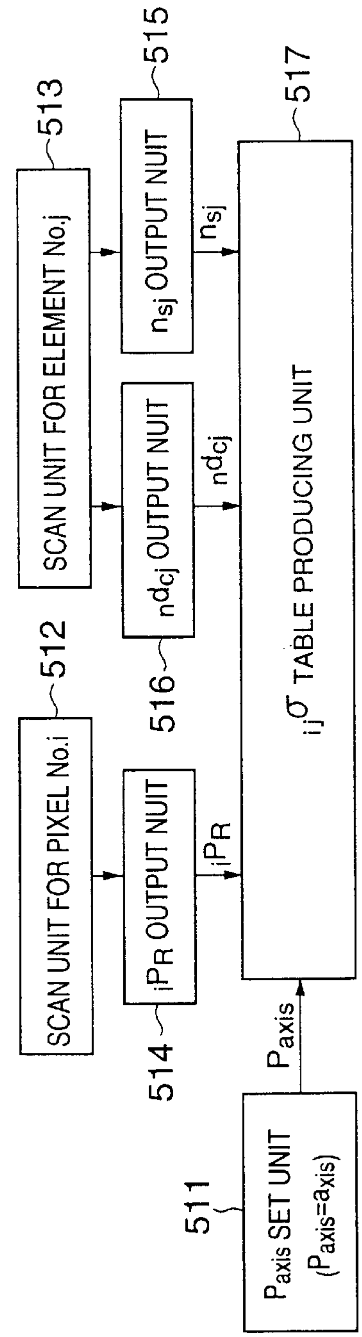
Figure 123B:
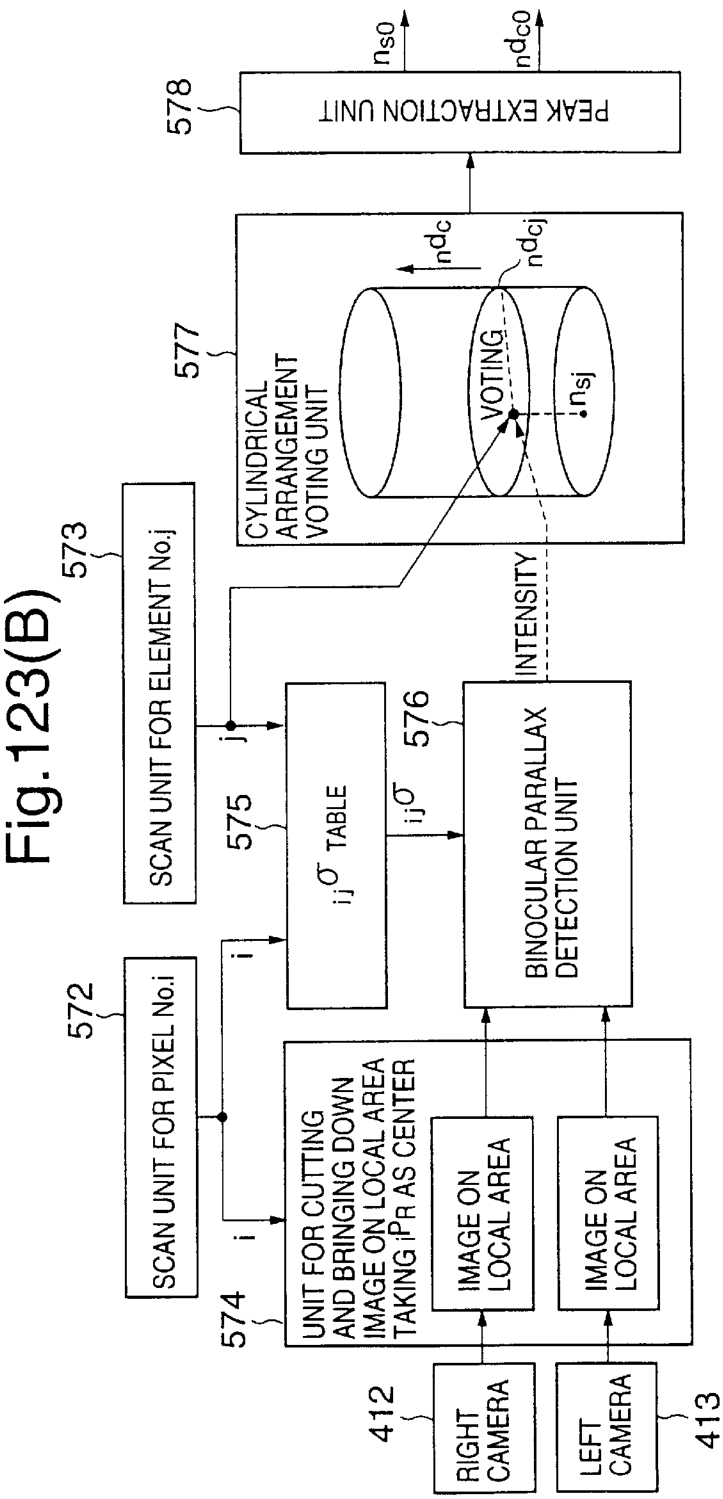

FIGS. 123(A) and 123(B) are block diagrams of an embodiment E-5 of the present invention. FIGS. 124 and 125 are flowcharts of the embodiment E-5.

(α) Prepare an ${}_{ij}\sigma$ table (FIG. 171), that is, a table for retrieving and outputting a binocular parallax ${}_{ij}\sigma$ from a pixel number i of an input image and an element number j of a cylindrical arrangement (cf. FIG. 123(A), FIG. 124).

(α1) In a similar fashion to that of the embodiment B-1, set up the "position $p_{axis}$ on the optical axis", as being equal to the optical axis, direction $a_{xis}$, by a "$p_{axis}$ set unit 511" (E-5α-1).

(α2) Scan addresses i of the respective points ${}_ip_R$ on an image from the minimum value $i_{min}$ to the maximum value $i_{max}$ by a "scan unit 512 for pixel No. i" (E-5α-2, E-5α-3, E-5α-10).

(Scan i)

(α3) Scan addresses j of elements ($n_{sj}$, ${}_nd_{cj}$) on a cylindrical arrangement from the minimum value $j_{min}$ to the maximum value $j_{max}$ by a "scan unit 503 for element No. j" (E-5α-4, E-5α-5, E-5α-9).

(Scan j)

(α4) Output pixels ${}_ip_R$ on the image and the elements ($n_{sj}$, ${}_nd_{cj}$) on the cylindrical arrangement, which are associated with the addresses (i, j), by an "${}_ip_R$ output unit 514", an "$n_{sj}$ output unit 515" and an "${}_nd_{cj}$ output unit 516" (E-5α-6).

(α5) Feed four parameters $n_{sj}$, ${}_nd_{cj}$, ${}_ip_R$, $p_{inf}$ thus set up to an "${}_{ij}\sigma$ table producing unit 517" and compute the binocular parallax ${}_{ij}\sigma$ in accordance with a method shown in (B-1) of the appendix (E-5α-7).

It is acceptable that the binocular parallax ${}_{ij}\sigma$ is computed in accordance with any one of methods, not restricted to the method shown in (B-1) of the appendix. In this respect, it is the same also in all the embodiments in which a computation of binocular parallax is performed in accordance with the method shown in (B-1) of the appendix.

(α-6) Store the binocular parallax ${}_{ij}\sigma$ in the form of the content associated with the addresses (i, j) of the binocular parallax ${}_{ij}\sigma$ table (FIG. 171) (E-5α-8).

(Scan j (E-5α-9))

(Scan i (E-5α-10))

Thus, the ${}_{ij}\sigma$ table (FIG. 171) is obtained.

(β) Using the ${}_{ij}\sigma$ table thus prepared, detect the planar azimuth $n_{s0}$ and the normalized distance ${}_nd_{c0}$ (cf. FIG. 123(B) and FIG. 125).

(β1) Scan addresses i of the respective points ${}_ip_R$ on an image from the minimum value $i_{min}$ to the maximum value $i_{max}$ by a "scan unit 572 for pixel No. i" (E-5β-1, E-5β-2, E-5β-10).

(Scan i)

(β2) Cut and bring down images on local areas taking a "pixel ${}_ip_R$ associated with the address i" as the center from images, which are obtained by a right camera 561 and a left camera 562, respectively, as shown in FIG. 167, by a "unit 574 for cutting and bringing down images on local areas taking ${}_ip_R$ as the center" (E-5β-3).

(β3) Scan addresses j of elements ($n_{sj}$, ${}_nd_{cj}$) on a cylindrical arrangement from the minimum value $j_{min}$ to the maximum value $j_{max}$ by a "scan unit 573 for element No. j" (E-5β-4, E-5β-5, E-5β-9).

(Scan j)

(β4) Feed those addresses (i, j) to an ${}_{ij}\sigma$ table 575 (FIG. 171) and output the binocular parallax ${}_{ij}\sigma$ (E-5β-6).

(β5) In a similar fashion to that of the step (6) of the embodiment D-5, feed the "images on local areas on the right camera and the left camera" and the "binocular parallax ${}_k\sigma$" a to a "binocular parallax detection unit 576" (cf. FIG. 167) to compute the response intensity in accordance with the following equation (E-5β-7).

$$\text{Response intensity}=\Sigma_x\Sigma_y\ {}_ia_R(x,y)_ia_L(x-{}_{ij}\sigma_x,\ y-{}_{ij}\sigma_y)$$

(β6) The response intensity is voted for elements ($n_{sj}$, ${}_nd_{cj}$) on a "cylindrical arrangement voting unit 577" (E-5β-8).

(Scan j (E-5β-9))

(Scan i (E-5β-10))

(β7) Extract a "point wherein the voted intensity offers the maximum (peak)" in the cylindrical arrangement, by a "peak extraction unit 578". This maximum point is a "place wherein the large circles intersect with each other at one point". The "normalized distance ${}_nd_{c0}$ up to going across the plane" is determined in the form of a "height coordinates" of the maximum point, and the "three-dimensional azimuth $n_{s0}$ of the plane" is determined in the form of a "sectional circle inside coordinates" (E-5β-11).

Embodiment E-6. (Stereo+a Normalized Distance+ $a_{xis}$ Unknown)

Figure 126A:
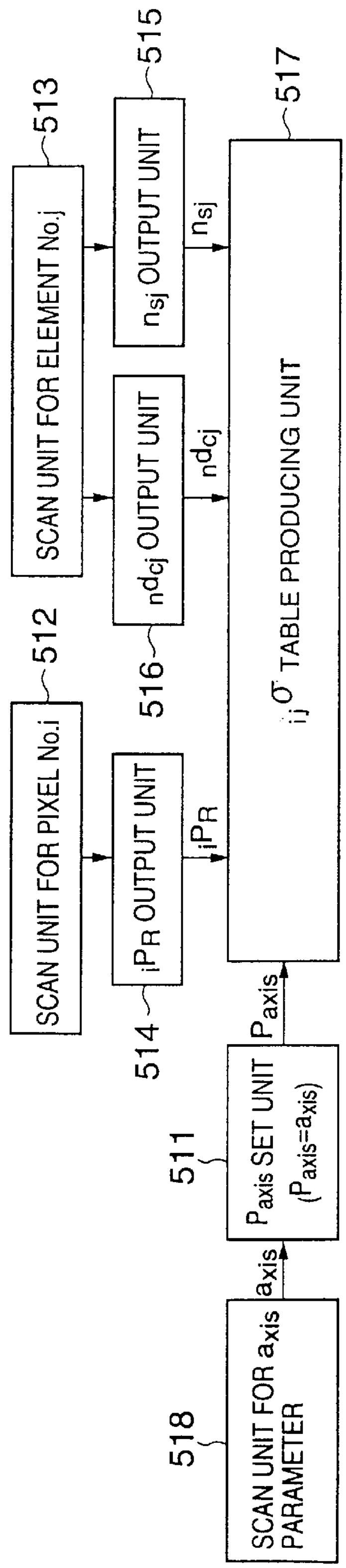
Figure 126B:
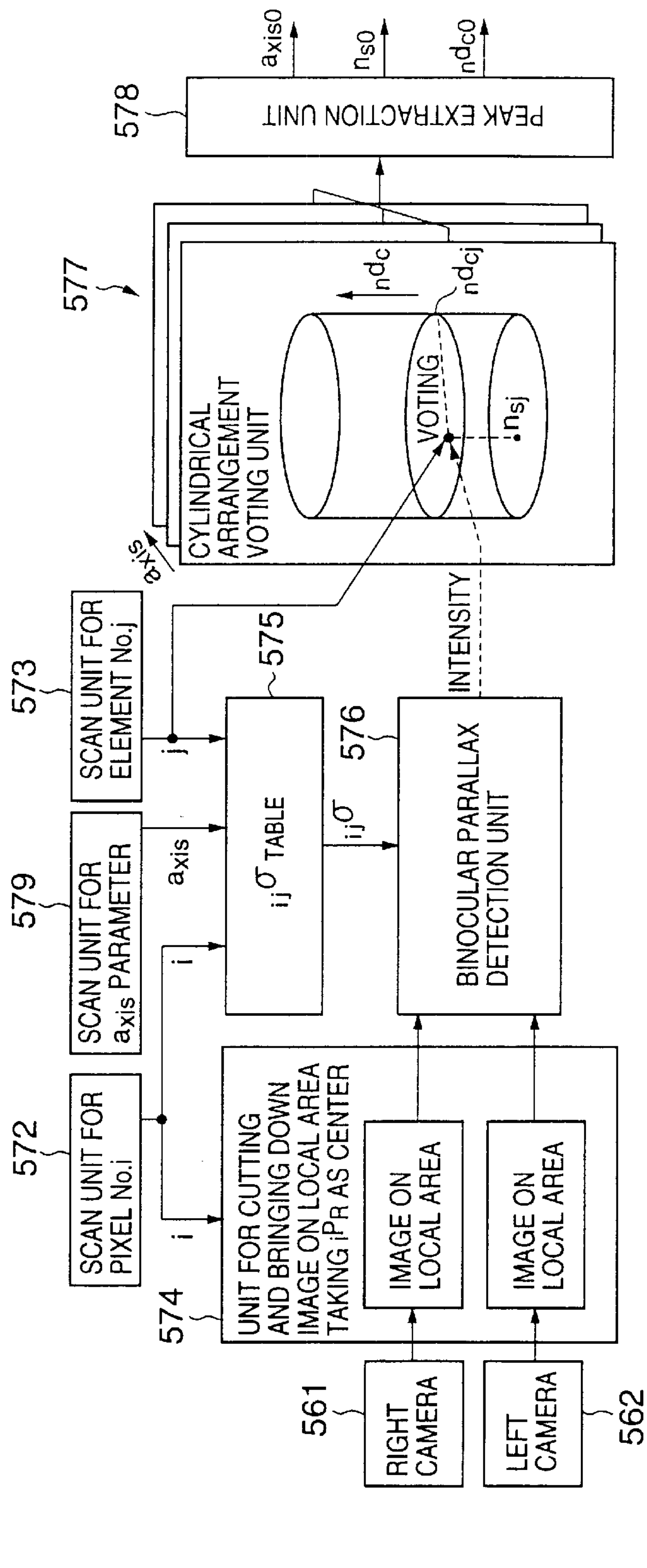

FIGS. 126(A) and 126(B) are block diagrams of an embodiment E-6 of the present invention. FIGS. 127 and 128 are flowcharts of the embodiment E-5.

(α) Prepare an ${}_{ij}\sigma$ table (FIG. 172) for all the optical axis direction $\{a_{xis}\}$, that is, a table for retrieving and outputting a binocular parallax ${}_{ij}\sigma$ from a pixel number i of an input image, an element number j of a cylindrical arrangement, and an optical axis direction $a_{xis}$ (cf. FIG. 126(A), FIG. 127).

The following steps ($\alpha$2)–($\alpha$6) are the same as the corresponding steps of the embodiment E-5 ($\alpha$).

($\alpha$0) Scan an "optical axis direction parameter $a_{xis}$" over any possible directions (from the minimum value $a_{xis, min}$ to the maximum value $a_{xis, max}$) by a "scan unit for $a_{xis}$ parameter 518" (E-6$\alpha$-1, E-6$\alpha$-2, E-6$\alpha$-13).

(Scan $a_{xis}$)

($\alpha$1) Set up the "position $p_{axis}$ on the optical axis", as being equal to the parameter $a_{xis}$, by a "$p_{axis}$ set unit 511" (E-6$\alpha$-3).

($\alpha$2) Scan addresses i of the respective points $_ip_R$ on an image from the minimum value $i_{min}$ to the maximum value $i_{max}$ by a "scan unit 512 for pixel No. i" (E-6$\alpha$-4, E-6$\alpha$-5, E-6$\alpha$-12).

(Scan i)

($\alpha$3) Scan addresses j of elements ($n_{sj}$, $_nd_{cj}$) on a cylindrical arrangement from the minimum value $j_{min}$ to the maximum value $j_{max}$ by a "scan unit 503 for element No. j" (E-6$\alpha$-6, E-6$\alpha$-7, E-6$\alpha$-11).

(Scan j)

($\alpha$4) Output pixels $_ip_R$ on the image and the elements ($n_{sj}$, $_nd_{cj}$) on the cylindrical arrangement, which are associated with the addresses (i, j), by an "$_ip_R$ output unit 514", an "$n_{sj}$ output unit 515" and an "$_nd_{cj}$ output unit 516" (E-6$\alpha$-8).

($\alpha$5) Feed four parameters $n_{sj}$, $_nd_{cj}$, $_ip_R$, $p_{inf}$ thus set up to an "$_{ij}\sigma$ table producing unit 517" and compute the binocular parallax $_{ij}\sigma$ in accordance with a method shown in (B-1) of the appendix (E-6$\alpha$-9).

($\alpha$-6) Store the binocular parallax $_{ij}\sigma$ in the form of the content associated with the addresses (i, j) of the binocular parallax $_{ij}\sigma$ table (FIG. 172) (E-6$\alpha$-10).

(Scan j (E-6$\alpha$-11))

(Scan i (E-6$\alpha$-12))

($\alpha$-7) In the processing up to here, there are obtained an $_{ij}\sigma$ table for the respective optical axis direction $a_{xis}$.

(Scan $a_{xis}$ (E-6$\alpha$-13))

Thus, the $_{ij}\sigma$ table (FIG. 172) for all the optical axis direction $\{a_{xis}\}$ is obtained.

($\beta$) Using the $_{ij}\sigma$ table thus prepared, detect the planar azimuth $n_{s0}$ and the normalization shortest distance $_nd_{c0}$ (cf. FIG. 126(B) and FIG. 128).

The following step ($\beta$1) to ($\beta$6) are the same as the corresponding steps of the embodiment E-5.

($\beta$0) Scan an "optical axis direction parameter $a_{xis}$" over any possible directions (from the minimum value $a_{xis, min}$ to the maximum value $a_{xis, max}$) by a "scan unit for $a_{xis}$ parameter 579" (E-6$\beta$-1, E-6$\beta$-2, E-6$\beta$-13).

(Scan $a_{xis}$)

($\beta$1) Scan addresses i of the respective points $_ip_0$ on an image from the minimum value $i_{min}$ to the maximum value $i_{max}$ by a "scan unit 572 for pixel No. i" (E-6$\beta$-3, E-6$\beta$-4, E-6$\beta$-12).

(Scan i)

($\beta$2) Cut and bring down images on local areas taking a "pixel $_ip_R$ associated with the address i" as the center from images, which are obtained by a right camera 561 and a left camera 562, respectively, as shown in FIG. 167, by a "unit 574 for cutting and bringing down images on local areas taking $_ip_R$ as the center" (E-6$\beta$-5).

($\beta$3) Scan addresses j of elements ($n_{sj}$, $_nd_{cj}$) on a cylindrical arrangement from the minimum value $j_{min}$ to the maximum value $j_{max}$ by a "scan unit 573 for element No. j" (E-6$\beta$-6, E-6$\beta$-7, E-6$\beta$-11).

(Scan j)

($\beta$4) Feed those addresses (i, j) to an $_{ij}\sigma$ table 575 (FIG. 171) and output the binocular parallax $_{ij}\sigma$ (E-6$\beta$-8).

($\beta$5) In a similar fashion to that of the step (6) of the embodiment D-5, feed the "images on local areas on the right camera and the left camera" and the "binocular parallax $_k\sigma$" to a "binocular parallax detection unit 576" (cf. FIG. 167) to compute the response intensity in accordance with the following equation (E-6$\beta$-9).

$$\text{Response intensity}=\Sigma_x\Sigma_y\ {}_ia_R(x, y)_ia_L(x-{}_{ij}\sigma_x, y-{}_{ij}\sigma_y)$$

($\beta$6) The response intensity is voted for elements ($n_{sj}$, $_nd_{cj}$) on a "cylindrical arrangement voting unit 577" (E-6$\beta$-10).

(Scan j (E-6$\beta$-11))

(Scan i (E-6$\beta$-12))

($\beta$7) In the processing up to here, the voting is performed for all the elements of the "cylindrical arrangement voting unit 577".

(Scan $a_{xis}$ (E-6$\beta$-13))

($\beta$8) In the processing up to here, the voting is performed for all the elements of the "cylindrical arrangements for all the optical axis direction parameters $a_{xis}$".

($\beta$9) Extract a "specified cylindrical arrangement" wherein the intensity offers the maximum from among the cylindrical arrangements, by a "peak extraction unit 578". Thus, a true optical axis direction parameters $a_{xis0}$ is determined in the form of the optical axis direction parameters for this arrangement. When a point, wherein the intensity offers the peak in the cylindrical arrangement, is extracted, the normalized distance $_nd_{c0}$ up to going across the plane is determined in the form of a "height coordinates" of the maximum point, and the three-dimensional azimuth $n_{s0}$ of the plane is determined in the form of a "sectional circle inside coordinates" (E-6$\beta$-14).

Embodiment E-7. (Stereo+a Normalization Shortest Distance)

Figure 129A:
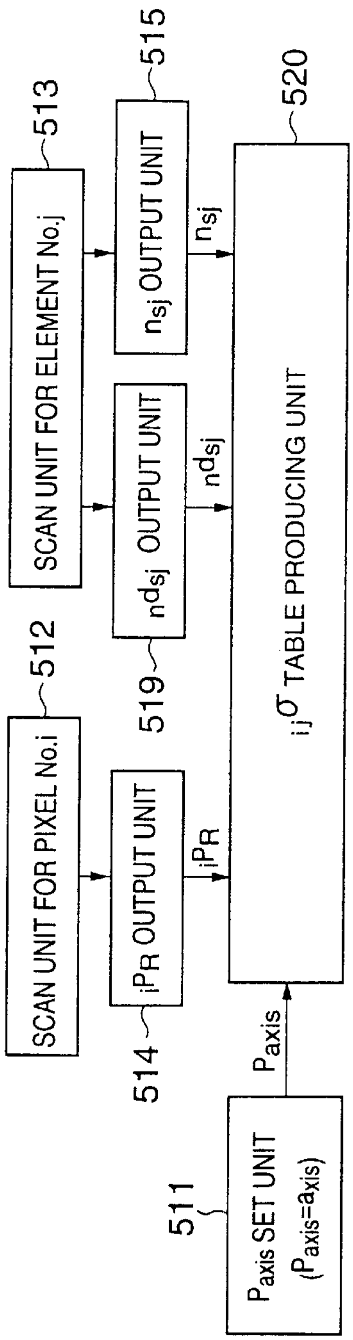
Figure 129B:
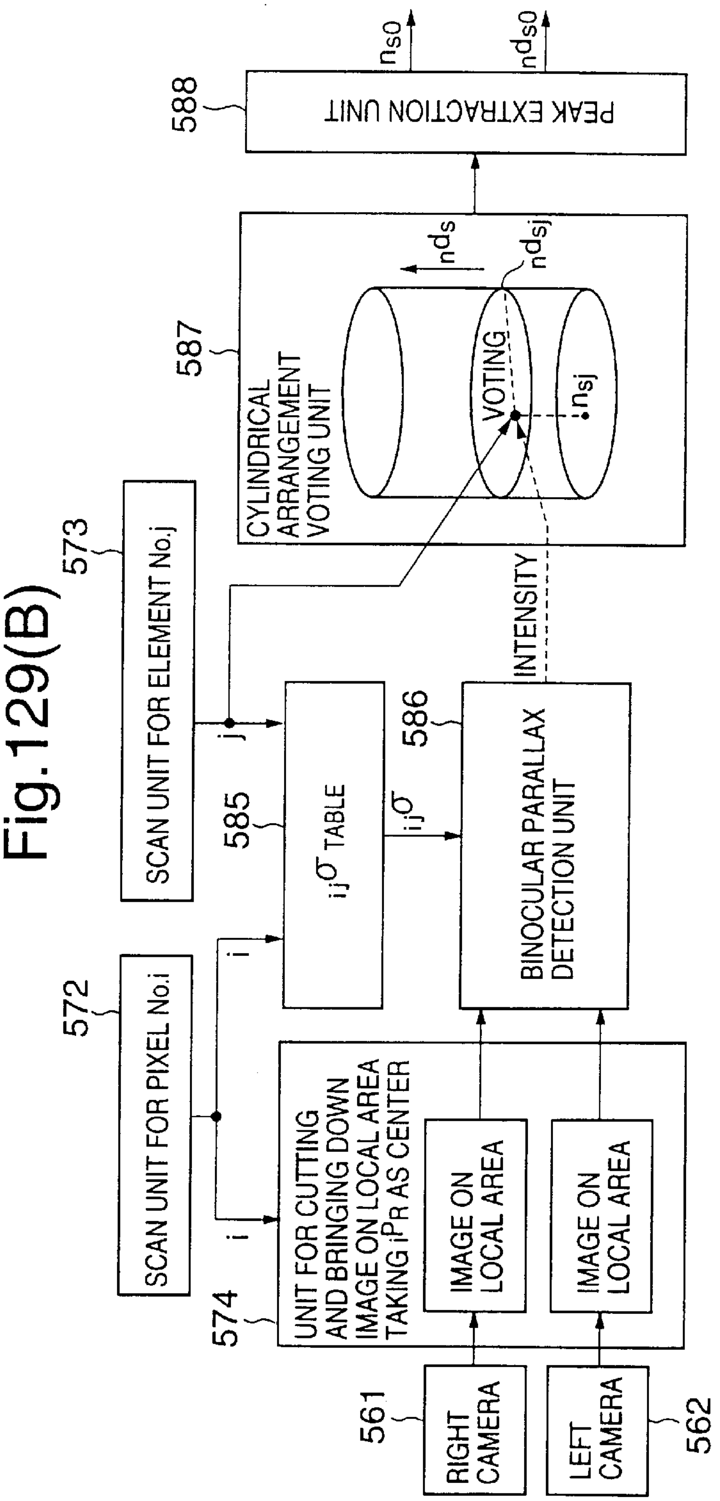

FIGS. 129(A) and 129(B) are block diagrams of an embodiment E-7 of the present invention. FIGS. 130 and 131 are flowcharts of the embodiment E-7.

($\alpha$) Prepare an $_{ij}\sigma$ table (FIG. 171), that is, a table for retrieving and outputting a binocular parallax $_{ij}\sigma$ from a pixel number i of an input image and an element number j of a cylindrical arrangement (cf. FIG. 129(A), FIG. 130).

($\alpha$1) In a similar fashion to that of the embodiment B-1, set up the "position $p_{axis}$ on the optical axis", as being equal to the optical axis direction $a_{xis}$, by a "$P_{axis}$ set unit 511" (E-7$\alpha$-1).

($\alpha$2) Scan addresses i of the respective points $_ip_R$ on an image from the minimum value $i_{min}$ to the maximum value $i_{max}$ by a "scan unit 512 for pixel No. i" (E-7$\alpha$-2, E-7$\alpha$-3, E-7$\alpha$-10).

(Scan i)

($\alpha$3) Scan addresses j of elements ($n_{sj}$, $_nd_{sj}$) on a cylindrical arrangement from the minimum value $j_{min}$ to the maximum value $j_{max}$ by a "scan unit 513 for element No. j" (E-7$\alpha$-4, E-7$\alpha$-5, E-7$\alpha$-9).

(Scan j)

($\alpha$4) Output pixels $_ip_R$ on the image and the elements ($n_{sj}$, $_nd_{sj}$) on the cylindrical arrangement, which are associated with the addresses (i, j), by an "$_ip_R$ output unit 514", an "$n_{sj}$ output unit 515" and an "$_nd_{sj}$ output unit 519" (E-7$\alpha$-6).

($\alpha$5) Feed four parameters $n_{sj}$, $_nd_{sj}$, $_ip_R$, $p_{inf}$ thus set up to an "$_{ij}\sigma$ table producing unit 517" and compute the binocular parallax ${}_{ij}\sigma$ in accordance with a method shown in (B-2) of the appendix (E-7α-7).

It is acceptable that the binocular parallax ${}_{ij}\sigma$ is computed in accordance with any one of methods, not restricted to the method shown in (B-2) of the appendix. In this respect, it is the same also in all the embodiments in which a computation of binocular parallax is performed in accordance with the method shown in (B-2) of the appendix.

(α-6) Store the binocular parallax ${}_{ij}\sigma$ in the form of the content associated with the addresses (i, j) of the binocular parallax ${}_{ij}\sigma$ table (FIG. 171) (E-7α-8).

(Scan j (E-7α-9))

(Scan i (E-7α-10))

Thus, the ${}_{ij}\sigma$ table (FIG. 171) is obtained.

(β) Using the ${}_{ij}\sigma$ table thus prepared, detect the planar azimuth $n_{s0}$ and the normalization shortest distance ${}_{n}d_{s0}$ (cf. FIG. 129(B) and FIG. 131).

(β1) Scan addresses i of the respective points ${}_{i}p_R$ on an image from the minimum value $i_{min}$ to the maximum value $i_{max}$ by a "scan unit 572 for pixel No. i" (E-7β-1, E-7β-2, E-7β-10).

(Scan i)

(β2) Cut and bring down images on local areas taking a "pixel ${}_{i}p_R$ associated with the address i" as the center from images, which are obtained by a right camera 561 and a left camera 562, respectively, as shown in FIG. 167, by a "unit 574 for cutting and bringing down images on local areas taking ${}_{i}p_R$ as the center" (E-7β-3).

(β3) Scan addresses j of elements ($n_{sj}$, ${}_{n}d_{sj}$) on a cylindrical arrangement from the minimum value $j_{min}$ to the maximum value $j_{max}$ by a "scan unit 573 for element No. j" (E-7β-4, E-7β-5, E-7β-9).

(Scan j)

(β4) Feed those addresses (i, j) to an ${}_{ij}\sigma$ table 585 (FIG. 171) and output the binocular parallax ${}_{ij}\sigma$ (E-7β-6).

(β5) In a similar fashion to that of the step (6) of the embodiment D-5, feed the "images on local areas on the right camera and the left camera" and the "binocular parallax ${}_{k}\sigma$" a to a "binocular parallax detection unit 586" (cf. FIG. 167) to compute the response intensity in accordance with the following equation (E-7β-7).

$$\text{Response intensity}=\Sigma_x\Sigma_y\ {}_{i}a_R(x,y)_{i}a_L(x-{}_{ij}\sigma_x,\ y-{}_{ij}\sigma_y)$$

(β6) The response intensity is voted for elements ($n_{sj}$, ${}_{n}d_{sj}$) on a "cylindrical arrangement voting unit 587" (E-7β-8).

(Scan j (E-7β-9))

(Scan i (E-7β-10))

(β7) Extract a "point wherein the voted intensity offers the maximum (peak)" in the cylindrical arrangement, by a "peak extraction unit 578". This maximum point is a "place wherein the large circles intersect with each other at one point". The "normalization shortest distance ${}_{n}d_{s0}$ up to going across the plane" is determined in the form of a "height coordinates" of the maximum point, and the "three-dimensional azimuth $n_{s0}$ of the plane" is determined in the form of a "sectional circle inside coordinates" (E-7β-11).

Embodiment E-8. (Stereo+a Normalization Shortest Distance+$a_{xis}$ Unknown)

Figure 132A:
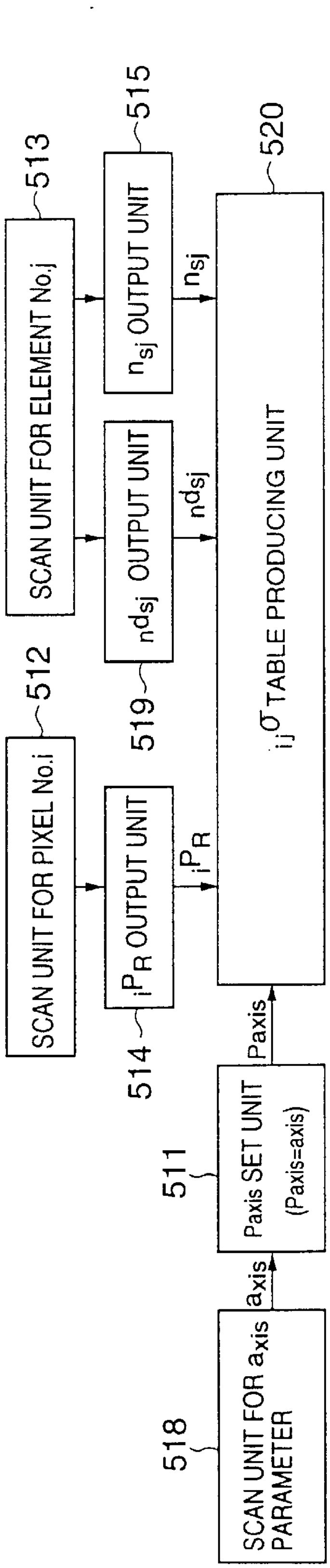
Figure 132B:
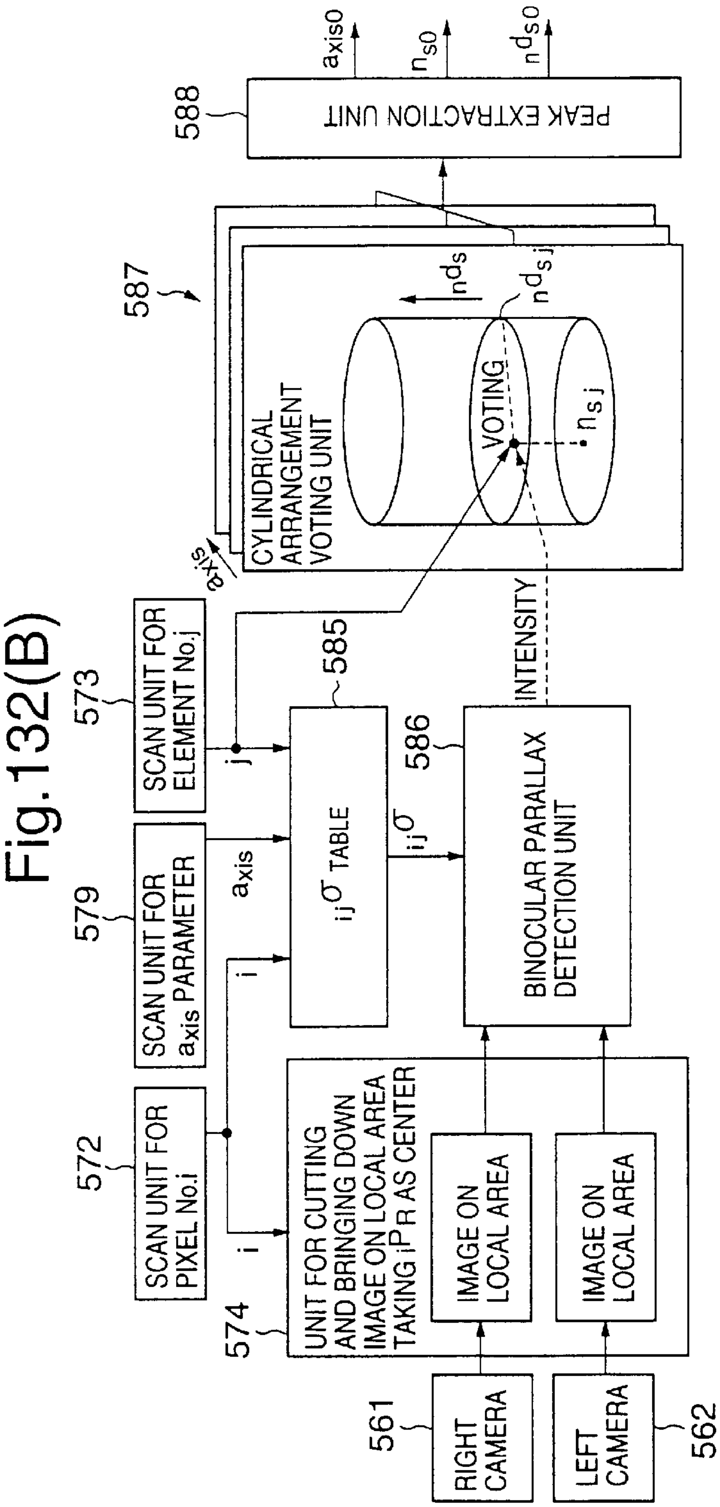

FIGS. 132(A) and 132(B) are block diagrams of an embodiment E-8 of the present invention. FIGS. 133 and 134 are flowcharts of the embodiment E-8.

(α) Prepare an ${}_{ij}\sigma$ table (FIG. 172) for all the optical axis direction $\{a_{xis}\}$, that is, a table for retrieving and outputting a binocular parallax ${}_{ij}\sigma$ from a pixel number i of an input image, an element number j of a cylindrical arrangement, and an optical axis direction $a_{xis}$ (cf. FIG. 132(A), FIG. 133).

The following steps (α2)–(β6) are the same as the corresponding steps of the embodiment E-7 (α).

(α0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 518" (E-8α-1, E-8α-2, E-8α-13).

(Scan $a_{xis}$)

(α1) Set up the "position $p_{axis}$ on the optical axis", as being equal to the parameter $a_{xis}$, by a "$p_{axis}$ set unit 511" (E-8α-3).

(α2) Scan addresses i of the respective points ${}_{i}p_R$ on an image from the minimum value $i_{min}$ to the maximum value $i_{max}$ by a "scan unit 512 for pixel No. i" (E-8α-4, E-8α-5, E-8α-12).

(Scan i)

(α3) Scan addresses j of elements ($n_{sj}$, ${}_{n}d_{cj}$) on a cylindrical arrangement from the minimum value $j_{min}$ to the maximum value $j_{max}$ by a "scan unit 513 for element No. j" (E-8α-6, E-8α-7, E-8α-11).

(Scan j)

(α4) Output pixels ${}_{i}p_R$ on the image and the elements ($n_{sj}$, ${}_{n}d_{sj}$) on the cylindrical arrangement, which are associated with the addresses (i, j), by an "${}_{i}p_R$ output unit 514", an "$n_{sj}$ output unit 515" and an "${}_{n}d_{sj}$ output unit 519" (E-8α-8).

(α5) Feed four parameters $n_{sj}$, ${}_{n}d_{sj}$, ${}_{i}p_R$, $p_{inf}$ thus set up to an "${}_{ij}\sigma$ table producing unit 517" and compute the binocular parallax ${}_{ij}\sigma$ in accordance with a method shown in (B-2) of the appendix (E-8α-9).

(α-6) Store the binocular parallax ${}_{ij}\sigma$ in the form of the content associated with the addresses (i, j) of the binocular parallax ${}_{ij}\sigma$ table (FIG. 172) (E-8α-10).

(Scan j (E-8α-11))

(Scan i (E-8α-12))

(α-7) In the processing up to here, there are obtained an ${}_{ij}\sigma$ table for the respective optical axis direction $a_{xis}$.

(Scan $a_{xis}$ (E-8α-13))

Thus, the ${}_{ij}\sigma$ table (FIG. 172) for all the optical axis direction $\{a_{xis}\}$ is obtained.

(β) Using the ${}_{ij}\sigma$ table thus prepared, detect the planar azimuth $n_{s0}$ and the normalization shortest distance ${}_{n}d_{s0}$ (cf. FIG. 132(B) and FIG. 134).

The following step (β1) to (β6) are the same as the corresponding steps of the embodiment E-7.

(β0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 579" (E-8β-1, E-8β-2, E-8β-13).

(Scan $a_{xis}$)

(β1) Scan addresses i of the respective points ${}_{i}p_0$ on an image from the minimum value $i_{min}$ to the maximum value $i_{max}$ by a "scan unit 572 for pixel No. i" (E-8β-3, E-8β-4, E-8β-12).

(Scan i)

(β2) Cut and bring down images on local areas taking a "pixel ${}_{i}p_R$ associated with the address i" as the center from images, which are obtained by a right camera 561 and a left camera 562, respectively, as shown in FIG. 167, by a "unit 574 for cutting and bringing down images on local areas taking ${}_{i}p_R$ as the center" (E-8β-5).

(β3) Scan addresses j of elements ($n_{sj}$, ${}_{n}d_{sj}$) on a cylindrical arrangement from the minimum value $j_{min}$ to the maximum value $j_{max}$ by a "scan unit 573 for element No. j" (E-8β-6, E-8β-7, E-8β-11).

(Scan j)

(β4) Feed those addresses (i, j) to an ${}_{ij}\sigma$ table 585 (FIG. 172) and output the binocular parallax ${}_{ij}\sigma$ (E-8β-8).

(β5) In a similar fashion to that of the step (6) of the embodiment D-5, feed the "images on local areas on the right camera and the left camera" and the "binocular parallax ${}_{k}\sigma$" to a "binocular parallax detection unit 586" (cf. FIG. 167) to compute the response intensity in accordance with the following equation (E-8β-9).

$$\text{Response intensity}=\Sigma_x\Sigma_y\ {}_ia_R(x,y)_ia_L(x-{}_{ij}\sigma_x,\ y-{}_{ij}\sigma_y)$$

(β6) The response intensity is voted for elements ($n_{sj}$, ${}_nd_{sj}$) on a "cylindrical arrangement voting unit 587" (E-8β-10).

(Scan j (E-8β-11))

(Scan i (E-8β-12))

(β7) In the processing up to here, the voting is performed for all the elements of the "cylindrical arrangement voting unit 587".

(Scan $a_{xis}$ (E-8β-13))

(β8) In the processing up to here, the voting is performed for all the elements of the "cylindrical arrangements for all the optical axis direction parameters $a_{xis}$".

(β9) Extract a "specified cylindrical arrangement" wherein the intensity offers the maximum from among the cylindrical arrangements, by a "peak extraction unit 588". Thus, a true optical axis direction parameters $a_{xis0}$ is determined in the form of the optical axis direction parameters for this arrangement. When a point, wherein the intensity offers the peak in the cylindrical arrangement, is extracted, the normalization shortest distance ${}_nd_{s0}$ up to going across the plane is determined in the form of a "height coordinates" of the maximum point, and the three-dimensional azimuth $n_{s0}$ of the plane is determined in the form of a "sectional circle inside coordinates" (E-8β-14).

Embodiment F-1. (Normalized Time)

Figure 135A:
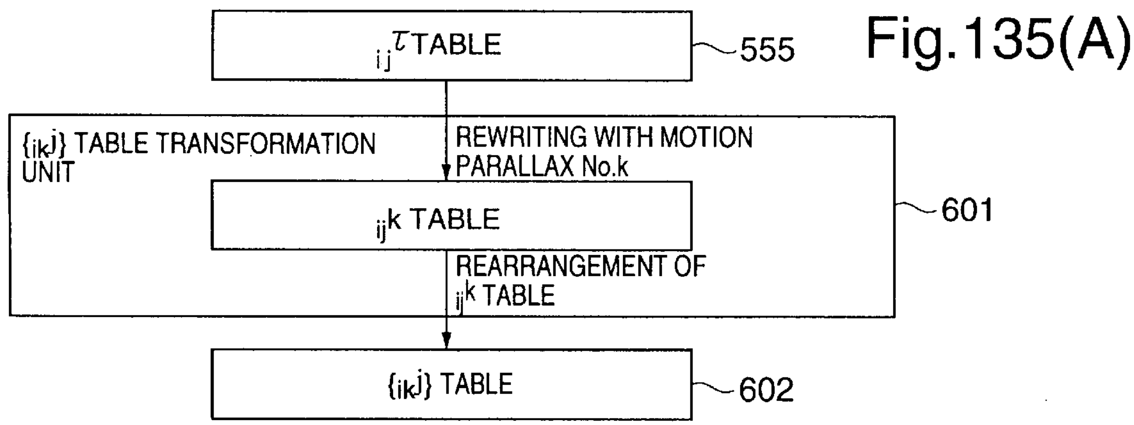
Figure 135B:
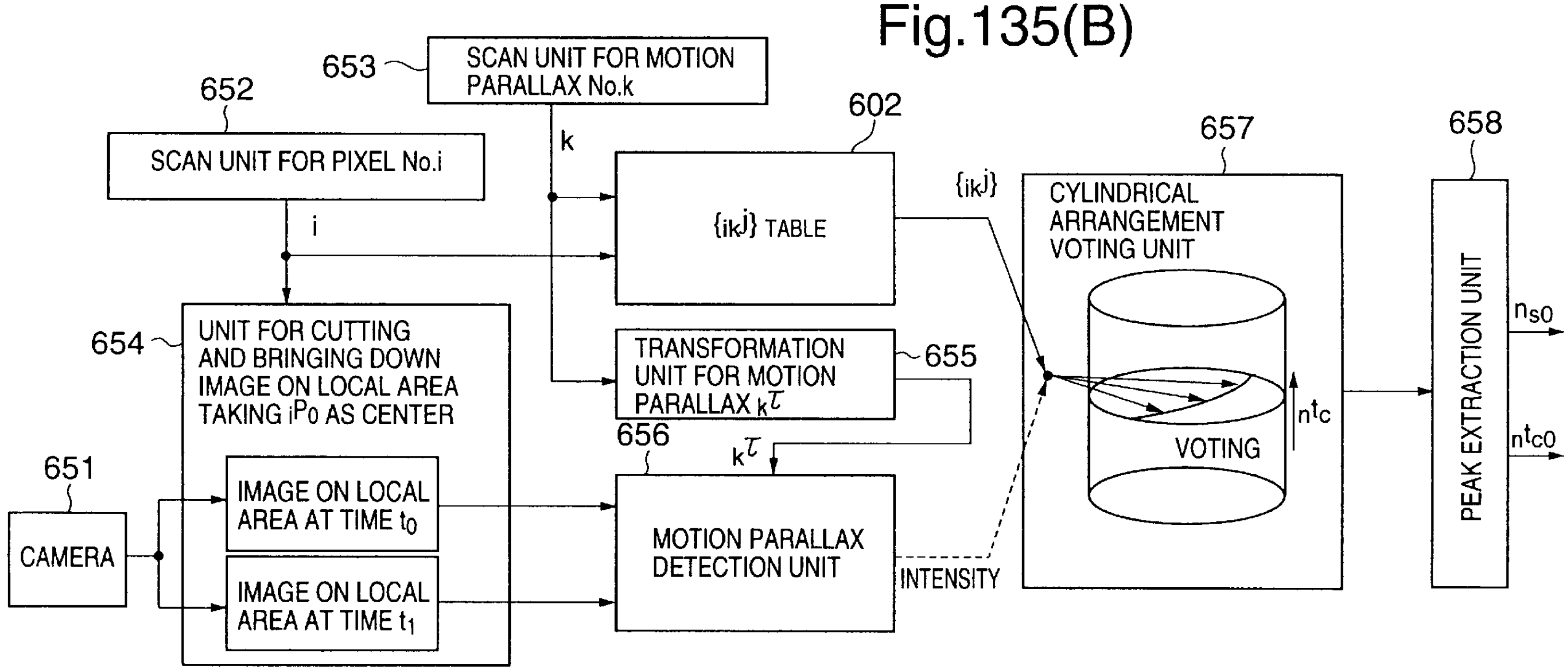

FIGS. 135(A) and 135(B) are block diagrams of an embodiment F-1 of the present invention. FIGS. 136 and 137 are flowcharts of the embodiment F-1.

(α) Transform the ${}_{ij}\tau$ table (FIG. 163) of the embodiment E-1 to a $\{{}_{ik}j\}$ table (cf. FIG. 135(A), FIG. 136).

(α1) Prepare an ${}_{ij}\tau$ table 555 (cf. FIG. 111(A), FIG. 163) in accordance with the processing (cf. FIG. 112) of the embodiment E-1 (F-1α-1), and replace the ${}_{ij}\tau$ table (that is, the motion parallax τ) with a motion parallax number k in accordance with the association of FIG. 160 by a $\{{}_{ik}j\}$ table transformation unit 601 (F-1α-2). Thus, the ${}_{ij}\tau$ table of FIG. 163 is rewritten into an "${}_{ij}k$ table (appearing at middle stage of FIG. 135(A))" wherein an address is (i, j) and the content is ${}_{ij}k$.

(α2) Next, rearrange the ${}_{ij}k$ table by the $\{{}_{ik}j\}$ table transformation unit 601 so as to produce a table 602 wherein an address is (i, k) and the content is an "element number j of the cylindrical arrangement" (F-1α-3). As stated in connection with the embodiment A-6, an arbitrary address (i, k), that is, a pixel wherein a position is ${}_ip_0$, and a motion parallax ${}_K\tau$, is coupled with the "all the points on a large circle of a cylindrical arrangement" through the compound ratio transformation and the polar transformation. Thus, the above-mentioned element number j becomes a set and is expressed by an element number group $\{{}_{ik}j\}$ (cf. FIG. 165).

(α3) Thus, designation of an arbitrary address (i, k) produces the $\{{}_{ik}j\}$ table (FIG. 165) for outputting the element number group $\{{}_{ik}j\}$ of the cylindrical arrangement.

(β) Using the $\{{}_{ik}j\}$ table thus prepared, detect the planar azimuth $n_{s0}$ and the normalized time ${}_nt_{c0}$ (Cf. FIG. 135(B) and FIG. 137).

(β1) Scan addresses i of the respective points ${}_ip_0$ on an image from the minimum value $i_{min}$ to the maximum value $i_{max}$ by a "scan unit 652 for pixel No. i" (F-1β-1, F-1β-2, F-1β-12).

(Scan i)

(β2) In a similar fashion to that of the step (3) of the embodiment D-1, cut and bring down images on local areas taking a "pixel ${}_ip_0$ associated with the address i" as the center from images at present time $t_0$ and the subsequent time $t_1$, which are obtained by a camera 651, as to the present time $t_0$ and the subsequent time $t_1$, respectively, by a "unit 654 for cutting and bringing down images on local areas taking ${}_ip_0$ as the center" (F-1β-3).

(β3) Scan a motion parallax number k from the minimum value $k_{min}$ to the maximum value $k_{max}$ by a "scan unit 653 for motion parallax number k" (F-1β-4, F-1β-5, F-1β-11).

(Scan k)

(β4) Transform the number k, by a "transformation unit 655 for motion parallax ${}_K\tau$", to a motion parallax ${}_K\tau$ in a similar fashion to that of the step (5) of the embodiment D-1 (F-1β-6). In the event that the direction of the motion parallax ${}_k\tau$, that is, the motion vector (${}_k\tau_x$, ${}_k\tau_y$) is different from the "direction from ${}_ip_0$ to v (that is, $p_{inf}$)" in FIG. 10(A), it is the motion parallax which conflicts with this moving direction v. Thus, in this case, the process skips to the step (β7) (F-1β-7).

(β5) In a similar fashion to that of the step (6) of the embodiment D-1, feed the "images on local areas at present time $t_0$ and the subsequent time $t_1$" and the "motion parallax ${}_k\tau$" to a "motion parallax detection unit 656" (cf. FIG. 159) to compute the response intensity in accordance with the following equation (F-1β-8).

$$\text{Response intensity}=\Sigma_x\Sigma_y\ {}_ia_0(x,y)_ia_1(x-{}_k\tau_x,\ y-{}_k\tau_y)$$

(β6) Feed the addresses (i, k) to a $\{{}_{ik}j\}$ table 602 and output the element number group $\{{}_{ik}j\}$ of the cylindrical arrangement (F-1β-9).

(β7) The response intensity, which is computed in the step (β5), is voted for an element number group of a cylindrical arrangement associated with the element number group $\{{}_{ik}j\}$, of a "cylindrical arrangement voting unit 657" (F-1β-10).

(Scan k (F-1β-11))

(Scan i (F-1β-12))

(β8) Extract a "point wherein the voted intensity offers the maximum (peak)" in the cylindrical arrangement, by a "peak extraction unit 658". This maximum point is a "place wherein the large circles intersect with each other at one point". The "normalized time ${}_nt_{c0}$ up to going across the plane" is determined in the form of a "height coordinates" of the maximum point, and the "three-dimensional azimuth $n_{s0}$ of the plane" is determined in the form of a "sectional circle inside coordinates" (F-1β-13).

Embodiment F-2. (Normalized Time+v Unknown)

Figures 138A, 138B:
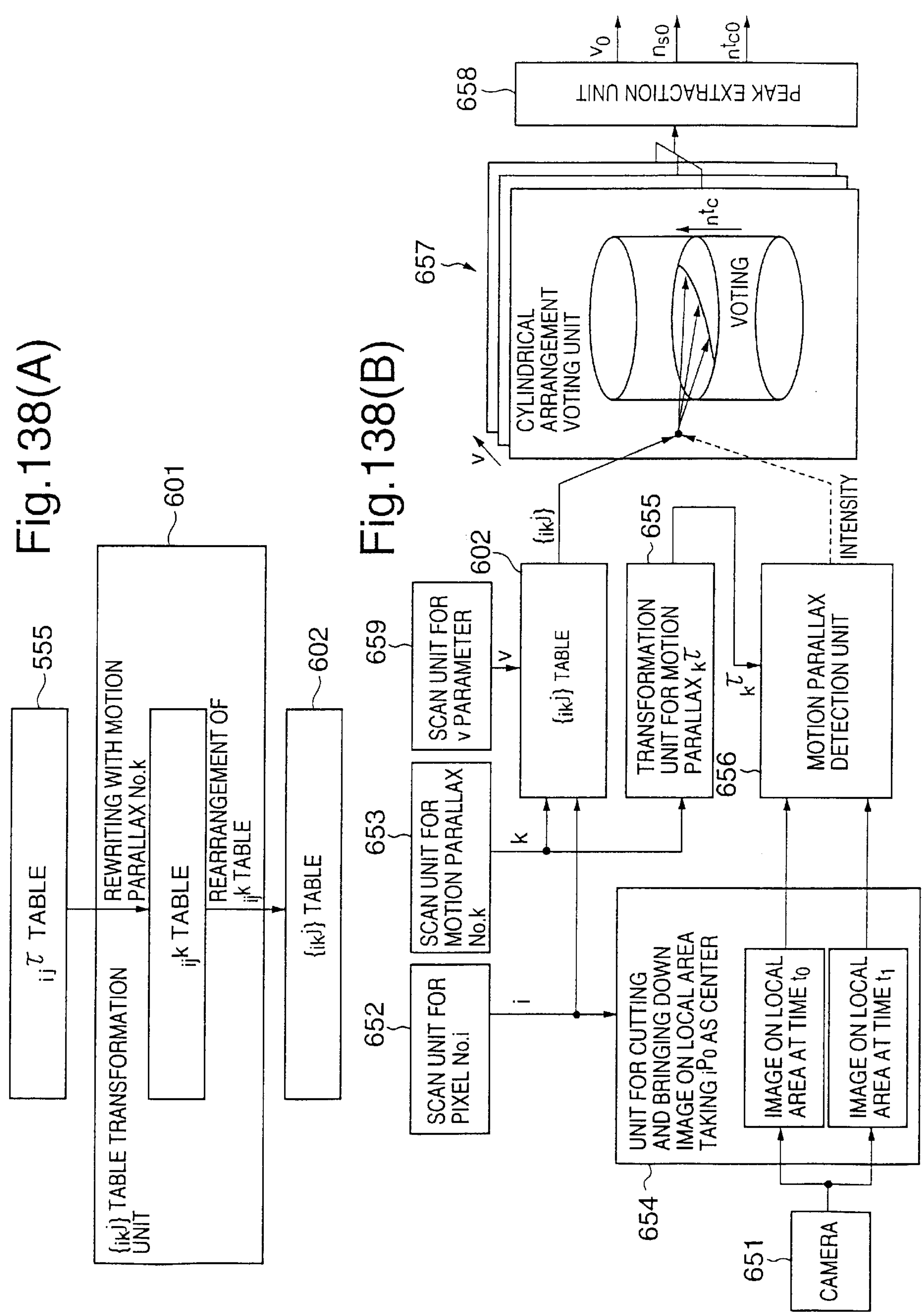

FIGS. 138(A) and 138(B) are block diagrams of an embodiment F-2 of the present invention. FIGS. 139 and 140 are flowcharts of the embodiment F-2.

(α) Prepare a $\{{}_{ik}j\}$ table (FIG. 166) for all the moving direction {v} (cf. FIG. 138(A), FIG. 139).

(α1) Prepare an ${}_{ij}\tau$ table 555 (cf. FIG. 114(A), FIG. 164) in accordance with the processing (cf. FIG. 115) of the embodiment E-2α (F-2α-1), and replace the ${}_{ij}\tau$ table (that is, the motion parallax τ) with a motion parallax number k in accordance with the association of FIG. 160 by a $\{_{ik}j\}$ table transformation unit 601 (F-2α-2). Thus, the ${}_{ij}\tau$ table of FIG. 164 is rewritten into an "${}_{ij}k$ table (appearing at middle stage of FIG. 138(A))" wherein an address is (i, j) and the content is ${}_{ij}k$.

(α2) Next, rearrange the ${}_{ij}k$ table by the $\{_{ik}j\}$ table transformation unit 601 so as to produce a table 602 wherein an address is (i, k) and the content is an "element number j of the cylindrical arrangement" (F-2α-3). As stated in connection with the embodiment A-6, an arbitrary address (i, k), that is, a pixel wherein a position is ${}_{i}p_0$, and a motion parallax ${}_{K}\tau$, is coupled with the "all the points on a large circle of a cylindrical arrangement" through the compound ratio transformation and the polar transformation. Thus, the above-mentioned element number j becomes a set and is expressed by an element number group $\{_{ik}j\}$ (cf. FIG. 166).

(α3) Thus, designation of an arbitrary address (i, k) produces the $\{_{ik}j\}$ table (FIG. 166) for outputting the element number group $\{_{ik}j\}$ of the cylindrical arrangement.

(β) Using the $\{_{ik}j\}$ table thus prepared, detect the planar azimuth $n_{s0}$ and the normalized time ${}_{n}t_{c0}$ (cf.

FIG. 138(B) and FIG. 140).

The following steps (β1) to (β7) are the same as the corresponding steps of the embodiment F-1.

(β0) Scan a "moving direction parameter v" over any possible directions (from the minimum value $v_{min}$ to the maximum value $v_{max}$) by a "scan unit for v parameter 659" (F-2β-1, F-2β-2, F-2β-13).

(Scan v)

(β1) scan addresses i of the respective points ${}_{i}p_0$ on an image from the minimum value $i_{min}$ to the maximum value $i_{max}$ by a "scan unit 652 for pixel No. i" (F-2β-3, F-2β-4, F-2β-14).

(Scan i)

(β2) In a similar fashion to that of the step (3) of the embodiment D-1, cut and bring down images on local areas taking a "pixel ${}_{i}p_0$ associated with the address i" as the center from images at present time $t_0$ and the subsequent time $t_1$, which are obtained by a camera 651, as to the present time $t_0$ and the subsequent time $t_1$, respectively, by a "unit 654 for cutting and bringing down images on local areas taking ${}_{i}p_0$ as the center" (F-2β-5).

(β3) Scan a motion parallax number k from the minimum value $k_{min}$ to the maximum value $k_{max}$ by a "scan unit 653 for motion parallax number k" (F-2β-6, F-2β-7, F-2β-13).

(Scan k)

(β4) Transform the number k, by a "transformation unit 655 for motion parallax ${}_{K}\tau$, to a motion parallax ${}_{K}\tau$ in a similar fashion to that of the step (5) of the embodiment D-1 (F-2β-8). In the event that the direction of the motion parallax ${}_{k}\tau$, that is, the motion vector $({}_{k}\tau_x\ {}_{k}\tau_y)$ is different from the "direction from ${}_{i}p_0$ to v (that is, $p_{inf}$) in FIG. 10(A), it is the motion parallax which conflicts with this moving direction v. Thus, in this case, the process skips to the step (β7) (F-2β-9).

(β5) In a similar fashion to that of the step (6) of the embodiment D-1, feed the "images on local areas at present time $t_0$ and the subsequent time $t_1$" and the "motion parallax ${}_{k}\tau$" to a "motion parallax detection unit 656" (cf. FIG. 159) to compute the response intensity in accordance with the following equation (F-2β-10).

$$\text{Response intensity}=\Sigma_x\Sigma_y\ {}_{i}a_0(x, y)\,{}_{i}a_1(x-{}_{k}\tau_x,\ y-{}_{k}\tau_y)$$

(β6) Feed the addresses (i, k) to a $\{_{ik}j\}$ table 602 and output the element number group $\{_{ik}j\}$ of the cylindrical arrangement (F-2β-11).

(β7) The response intensity, which is computed in the step (β5), is voted for an element number group of a cylindrical arrangement associated with the element number group $\{_{ik}j\}$, of a "cylindrical arrangement voting unit 657" (F-2β-12).

(Scan k (F-2β-13))

(Scan i (F-2β-14))

(β8) In the processing up to here, the voting is performed for all the elements of the cylindrical arrangement.

(Scan v (F-2β-15))

(β9) In the processing up to here, the voting is performed for all the elements of the cylindrical arrangements for all the moving direction parameters v.

(β10) Extract a "specified cylindrical arrangement" wherein the intensity offers the maximum from among the cylindrical arrangements, by a "peak extraction unit 658". Thus, a true moving direction $v_0$ is determined in the form of the moving direction parameter for this arrangement. When a point, wherein the intensity offers the peak in the cylindrical arrangement, is extracted, the normalized time ${}_{n}t_{c0}$ up to going across the plane is determined in the form of a "height coordinates" of the maximum point, and the three-dimensional azimuth $n_{s0}$ of the plane is determined in the form of a "sectional circle inside coordinates" (F-2β-16).

Embodiment F-3. (Normalization Shortest Distance)

Figure 141A:
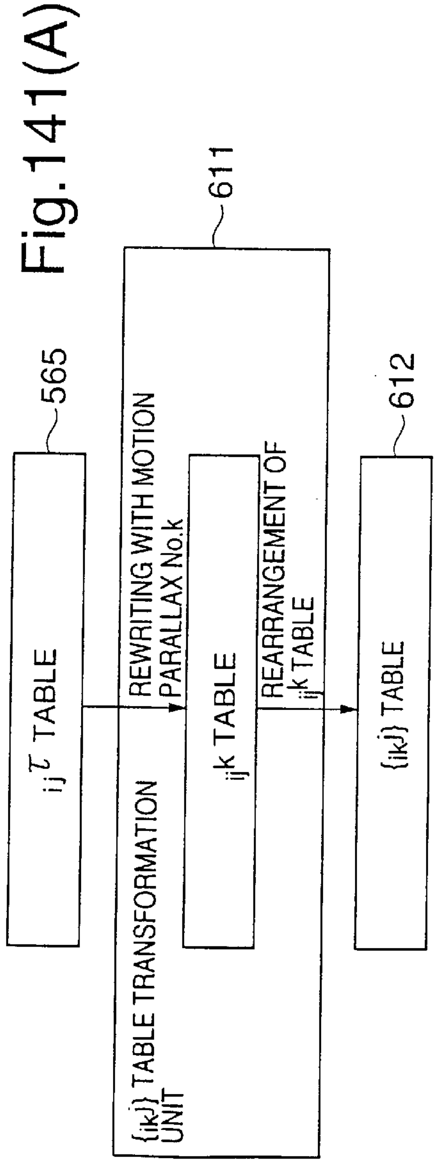
Figure 141B:
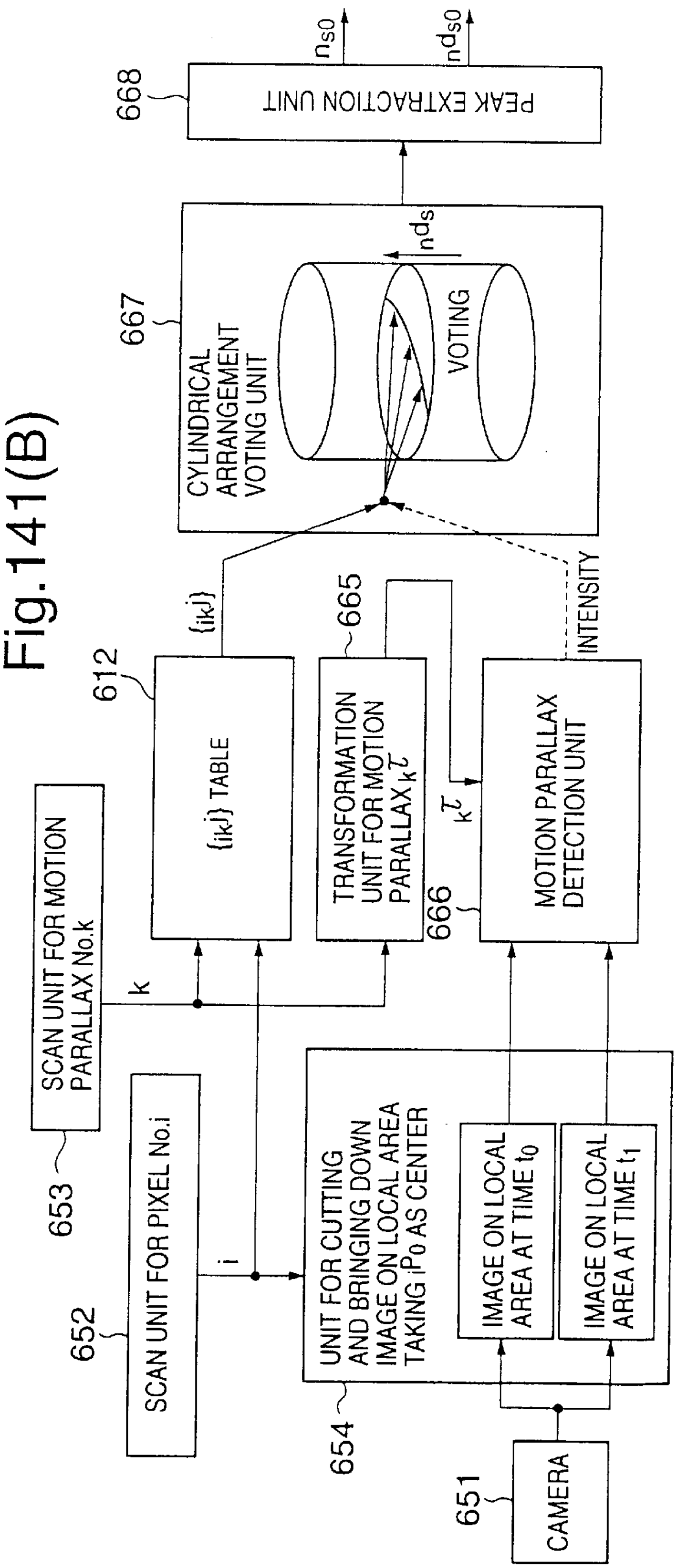

FIGS. 141(A) and 141(B) are block diagrams of an embodiment F-3 of the present invention. FIGS. 142 and 143 are flowcharts of the embodiment F-3.

(α) Transform the ${}_{ij}\tau$ table (FIG. 163) of the embodiment E-3 to a $\{_{ik}j\}$ table (cf. FIG. 141(A), FIG. 142).

(α1) Prepare an ${}_{ij}\tau$ table 565 (cf. FIG. 117(A), FIG. 163) in accordance with the processing (cf. FIG. 118) of the embodiment E-3α (F-3α-1), and replace the ${}_{ij}\tau$ table (that is, the motion parallax τ) with a motion parallax number k in accordance with the association of FIG. 160 by a $\{_{ik}j\}$ table transformation unit 611 (F-3α-2). Thus, the ${}_{ij}\tau$ table of FIG. 163 is rewritten into an "${}_{ij}k$ table (appearing at middle stage of FIG. 141(A))" wherein an address is (i, j) and the content is ${}_{ij}k$.

(α2) Next, rearrange the ${}_{ij}k$ table by the $\{_{ik}j\}$ table transformation unit 611 so as to produce a table 612 wherein an address is (i, k) and the content is an "element number j of the cylindrical arrangement" (F-3α-3). As stated in connection with the embodiment A-8, an arbitrary address (i, k), that is, a pixel wherein a position is ${}_{i}p_0$, and a motion parallax ${}_{K}\tau$, is coupled with the "all the points on a small circle of a cylindrical arrangement" through the small circle transformation. Thus, the above-mentioned element number j becomes a set and is expressed by an element number group $\{_{ik}j\}$ cj (cf. FIG. 165).

(α3) Thus, designation of an arbitrary address (i, k) produces the $\{_{ik}j\}$ table (FIG. 165) for outputting the element number group $\{_{ik}j\}$ of the cylindrical arrangement.

(β) Using the $\{_{ik}j\}$ table thus prepared, detect the planar azimuth $n_{s0}$ and the normalization shortest distance ${}_{n}d_{s0}$ (cf. FIG. 141(B) and FIG. 143).

(β1) Scan addresses i of the respective points ${}_{i}p_0$ on an image from the minimum value $i_{min}$ to the maximum value $i_{max}$ by a "scan unit 652 for pixel No. i" (F-3β-1, F-3β-2, F-3β-12).

(Scan i)

(β2) In a similar fashion to that of the step (3) of the embodiment D-1, cut and bring down images on local areas taking a "pixel ${}_ip_0$ associated with the address i" as the center from images at present time $t_0$ and the subsequent time $t_1$, which are obtained by a camera 651, as to the present time $t_0$ and the subsequent time $t_1$, respectively, by a "unit 654 for cutting and bringing down images on local areas taking ${}_ip_0$ as the center" (F-3β-3).

(β3) Scan a motion parallax number k from the minimum value $k_{min}$ to the maximum value $k_{max}$ by a "scan unit 653 for motion parallax number k" (F-3β-4, F-3β-5, F-3β-11).

(Scan k)

(β4) Transform the number k, by a "transformation unit 665 for motion parallax ${}_K\tau$, to a motion parallax ${}_K\tau$ in a similar fashion to that of the step (5) of the embodiment D-1 (F-3β-6). In the event that the direction of the motion parallax ${}_k\tau$, that is, the motion vector $({}_k\tau_x\ {}_k\tau_y)$ is different from the "direction from ${}_ip_0$ to v (that is, $p_{inf}$) in FIG. 10(A), it is the motion parallax which conflicts with this moving direction v. Thus, in this case, the process skips to the step (β7) (F-3β-7).

(β5) In a similar fashion to that of the step (6) of the embodiment D-1, feed the "images on local areas at present time $t_0$ and the subsequent time $t_1$" and the "motion parallax ${}_k\tau$" to a "motion parallax detection unit 666" (cf. FIG. 159) to compute the response intensity in accordance with the following equation (F-3β-8).

$$\text{Response intensity}=\Sigma_x\Sigma_y\ {}_ia_0(x,y)_ia_1(x-{}_k\tau_x,\ y-{}_k\tau_y)$$

(β6) Feed the addresses (i, k) to a $\{_{ik}j\}$ table 612 and output the element number group $\{_{ik}j\}$ of the cylindrical arrangement (F-3β-9).

(β7) The response intensity, which is computed in the step (β5), is voted for an element number group of a cylindrical arrangement associated with the element number group $\{_{ik}j\}$, of a "cylindrical arrangement voting unit 667" (F-3β-10).

(Scan k (F-3β-11))

(Scan i (F-3β-12))

(β8) Extract a "point wherein the voted intensity offers the maximum (peak)" in the cylindrical arrangement, by a "peak extraction unit 668". This maximum point is a "place wherein the small circles intersect with each other at one point". The "normalization shortest distance ${}_nd_{s0}$ up to going across the plane" is determined in the form of a "height coordinates" of the maximum point, and the "three-dimensional azimuth $n_{s0}$ of the plane" is determined in the form of a "sectional circle inside coordinates" (F-3β-13).

Embodiment F-4. (Normalization Shortest Distance+v Unknown)

Figure 144A:
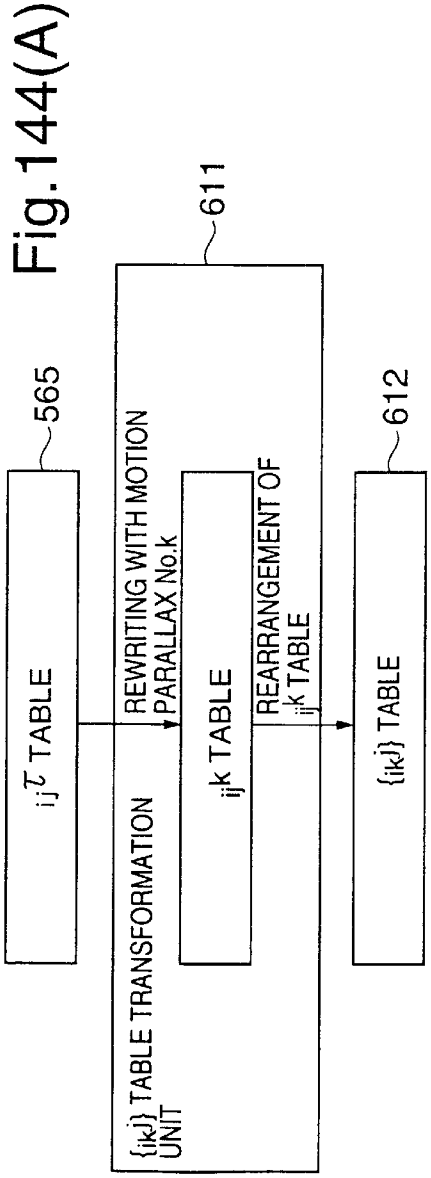
Figure 144B:
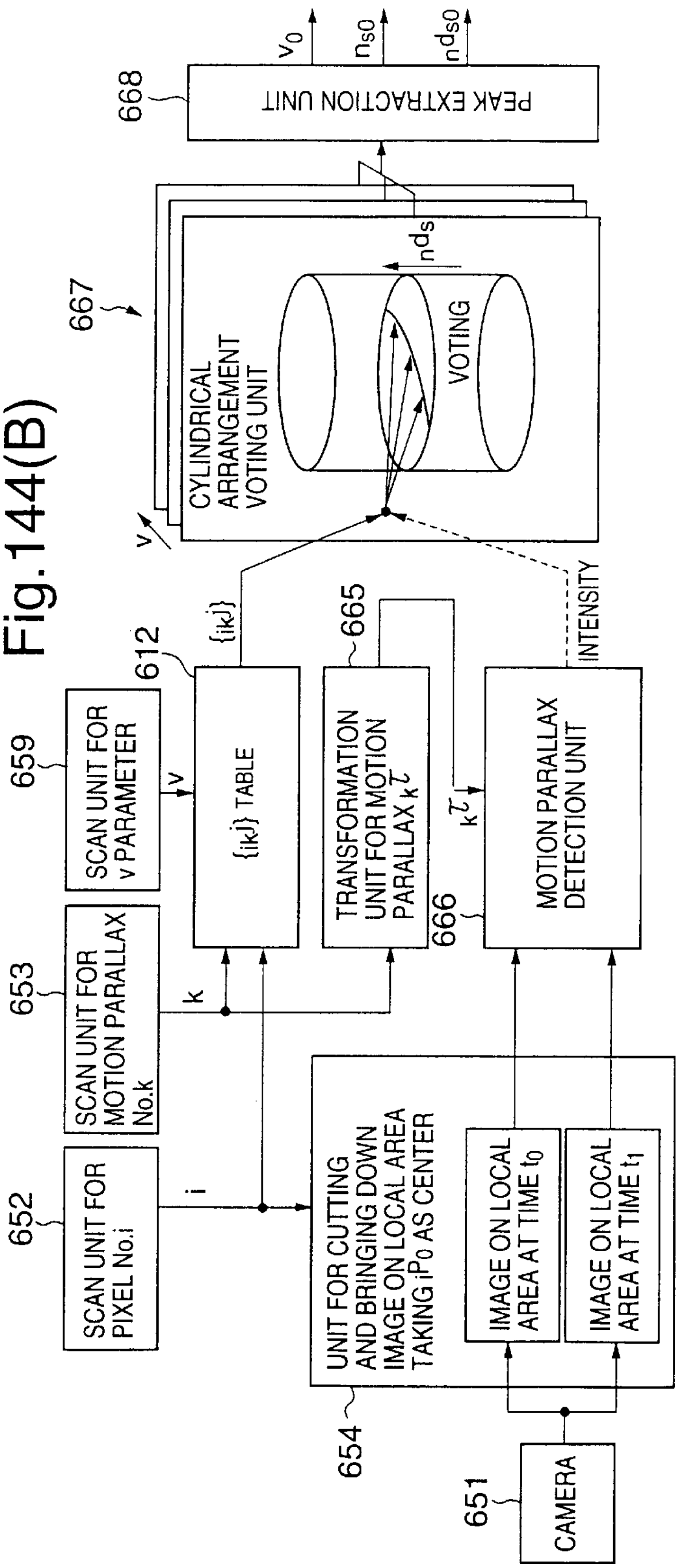

FIGS. 144(A) and 144(B) are block diagrams of an embodiment F-4 of the present invention. FIGS. 145 and 146 are flowcharts of the embodiment F-4.

(α) Transform the ${}_{ij}\tau$ table (FIG. 164) of the embodiment E-4 to a $\{_{ik}j\}$ table (cf. FIG. 144(A), FIG. 145).

(α1) Prepare an ${}_{ij}\tau$ table 565 (cf. FIG. 144(A), FIG. 164) in accordance with the processing of the embodiment E-4α (F-4α-1), and replace the ${}_{ij}\tau$ table (that is, the motion parallax τ) with a motion parallax number k in accordance with the association of FIG. 160 by a $\{_{ik}j\}$ table transformation unit 611 (F-4α-2). Thus, the ${}_{ij}\tau$ table of FIG. 164 is rewritten into an "${}_{ij}k$ table (appearing at middle stage of FIG. 144(A))" wherein an address is (i, j) and the content is ${}_{ij}k$.

(α2) Next, rearrange the ${}_{ij}k$ table by the $\{_{ik}j\}$ table transformation unit 611 so as to produce a table 612 wherein an address is (i, k) and the content is an "element number j of the cylindrical arrangement" (F-4α-3). As stated in connection with the embodiment A-8, an arbitrary address (i, k), that is, a pixel wherein a position is ${}_ip_0$, and a motion parallax ${}_K\tau$, is coupled with the "all the points on a large circle of a cylindrical arrangement" through the small circle transformation. Thus, the above-mentioned element number j becomes a set and is expressed by an element number group $\{_{ik}j\}$ (cf. FIG. 166).

(α3) Thus, designation of an arbitrary address (i, k) produces the $\{_{ik}j\}$ table (FIG. 166) for outputting the element number group $\{_{ik}j\}$ of the cylindrical arrangement.

(β) Using the $\{_{ik}j\}$ table thus prepared, detect the planar azimuth $n_{s0}$ and the normalization shortest distance ${}_nd_{s0}$ (cf. FIG. 144(B) and FIG. 146).

The following steps (β1) to (β7) are the same as the corresponding steps of the embodiment F-3.

(β0) Scan a "moving direction parameter v" over any possible directions (from the minimum value $v_{min}$ to the maximum value $v_{max}$) by a "scan unit for v parameter 659" (F-4β-1, F-4β-2, F-4β-15).

(Scan v)

(β1) Scan addresses i of the respective points ${}_ip_0$ on an image from the minimum value $i_{min}$ to the maximum value $i_{max}$ by a "scan unit 652 for pixel No. i" (F-4β-1, F-4β-2, F-4β-14).

(Scan i)

(β2) In a similar fashion to that of the step (3) of the embodiment D-1, cut and bring down images on local areas taking a "pixel ${}_ip_0$ associated with the address i" as the center from images at present time $t_0$ and the subsequent time $t_1$, which are obtained by a camera 651, as to the present time $t_0$ and the subsequent time $t_1$, respectively, by a "unit 654 for cutting and bringing down images on local areas taking ${}_ip_0$ as the center" (F-4β-5).

(β3) Scan a motion parallax number k from the minimum value k min to the maximum value k max by a "scan unit 653 for motion parallax number k" (F-4-6, F-4-7, F-4β-13).

(Scan k)

(β4) Transform the number k, by a "transformation unit 665 for motion parallax ${}_K\tau$, to a motion parallax ${}_K\tau$ in a similar fashion to that of the step (5) of the embodiment D-1 (F-4β-6). In the event that the direction of the motion parallax ${}_k\tau$, that is, the motion vector $({}_k\tau_x\ {}_k\tau_y)$ is different from the "direction from ${}_ip_0$ to v (that is, $p_{inf}$) in FIG. 10(A), it is the motion parallax which conflicts with this moving direction v. Thus, in this case, the process skips to the step (β7) (F-4β-9).

(β5) In a similar fashion to that of the step (6) of the embodiment D-1, feed the "images on local areas at present time $t_0$ and the subsequent time $t_1$" and the "motion parallax ${}_k\tau$" to a "motion parallax detection unit 666" (cf. FIG. 159) to compute the response intensity in accordance with the following equation (F-4β-10).

$$\text{Response intensity}=\Sigma_x\Sigma_y\ {}_ia_0(x,y)_ia_1(x-{}_k\tau_x,\ y-{}_k\tau_y)$$

(β6) Feed the addresses (i, k) to a $\{_{ik}j\}$ table 612 and output the element number group $\{_{ik}j\}$ of the cylindrical arrangement (F-4β-11).

(β7) The response intensity, which is computed in the step (β5), is voted for an element number group of a cylindrical arrangement associated with the element number group $\{_{ik}j\}$, of a "cylindrical arrangement voting unit 667" (F-4β-12).

(Scan k (F-4β-13))

(Scan i (F-4β-14))

(β8) In the processing up to here, the voting is performed for all the elements of the cylindrical arrangement.

(Scan v (F-4β-15))

(β9) In the processing up to here, the voting is performed for all the elements of the cylindrical arrangements for all the moving direction parameters v.

(β10) Extract a "specified cylindrical arrangement" wherein the intensity offers the maximum from among the cylindrical arrangements, by a "peak extraction unit 668". Thus, a true moving direction $v_0$ is determined in the form of the moving direction parameter for this arrangement. When a point, wherein the intensity offers the peak in the cylindrical arrangement, is extracted, the normalization shortest distance ${}_nd_{s0}$ up to going across the plane is determined in the form of a "height coordinates" of the maximum point, and the three-dimensional azimuth $n_{s0}$ of the plane is determined in the form of a "sectional circle inside coordinates" (F-4β-16).

Embodiment F-5. (Stereo+a Normalized Distance)

Figure 147A:
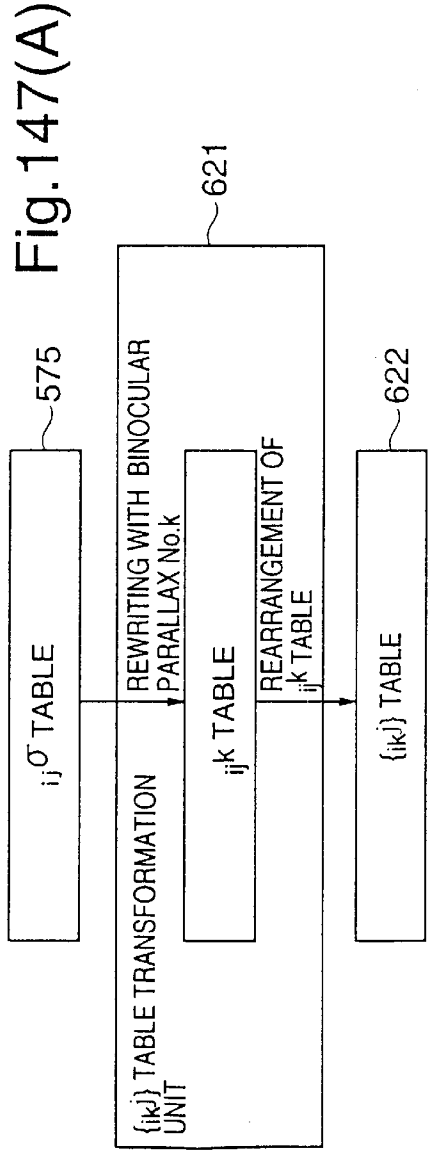
Figure 147B:
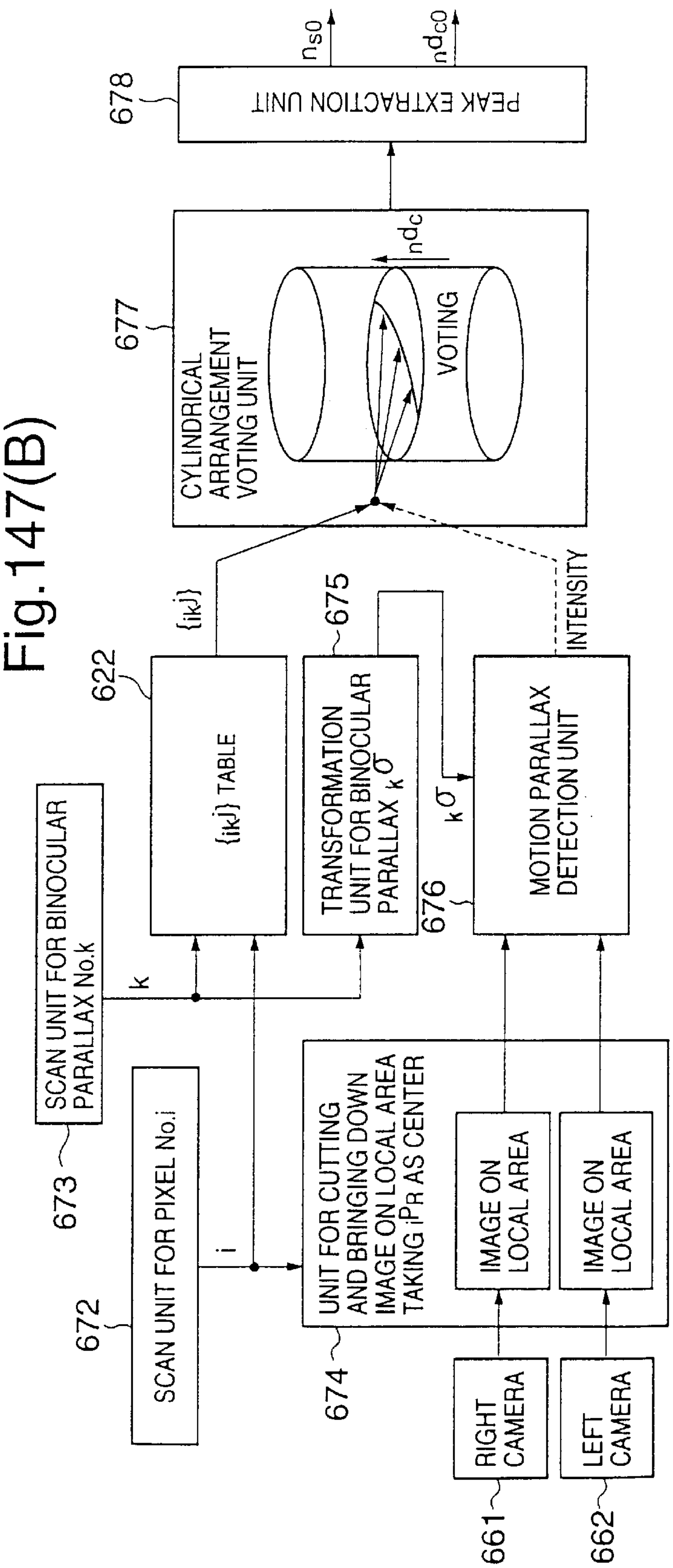

FIGS. 147(A) and 147(B) are block diagrams of an embodiment F-5 of the present invention. FIGS. 124 and 125 are flowcharts of the embodiment F-5.

(α) Transform the ${}_{ij}\sigma$ table (FIG. 171) of the embodiment E-5 to a $\{_{ik}j\}$ table (cf. FIG. 147(A), FIG. 145).

(α1) Prepare an ${}_{ij}\sigma$ table 575 (cf. FIG. 123(A), FIG. 171) in accordance with the processing (cf. FIG. 124) of the embodiment E-5α (F-5α-1), and replace the ${}_{ij}\sigma$ table (that is, the binocular parallax σ) with a binocular parallax number k in accordance with the association of FIG. 168 by a $\{_{ik}j\}$ table transformation unit 621 (F-5α-2). Thus, the ${}_{ij}\sigma$ table of FIG. 171 is rewritten into an "${}_{ij}k$ table (appearing at middle stage of FIG. 147(A))" wherein an address is (i, j) and the content is ${}_{ij}k$.

(α2) Next, rearrange the ${}_{ij}k$ table by the $\{_{ik}j\}$ table transformation unit 621 so as to produce a table 622 wherein an address is (i, k) and the content is an "element number j of the cylindrical arrangement" (F-5α-3). As stated in connection with the embodiment B-6, an arbitrary address (i, k), that is, a pixel wherein a position is ${}_ip_R$, and a binocular parallax ${}_k\sigma$, is coupled with the "all the points on a large circle of a cylindrical arrangement" through the compound ratio transformation and the polar transformation. Thus, the above-mentioned element number j becomes a set and is expressed by an element number group $\{_{ik}j\}$ (cf. FIG. 173).

(α3) Thus, designation of an arbitrary address (i, k) produces the $\{_{ik}j\}$ table (FIG. 173) for outputting the element number group $\{_{ik}j\}$ of the cylindrical arrangement.

(β) Using the $\{_{ik}j\}$ table thus prepared, detect the planar azimuth $n_{s0}$ and the normalized distance ${}_nd_{c0}$ (cf. FIG. 147(B) and FIG. 149).

(β1) Scan addresses i of the respective points ${}_ip_R$ on an image from the minimum value $i_{min}$ to the maximum value $i_{max}$ by a "scan unit 672 for pixel No. i" (F-5β-1, F-5β-2, F-5β-12).

(Scan i)

(β2) Cut and bring down images on local areas taking a "pixel ${}_ip_R$ associated with the address i" as the center from images, which are obtained by a right camera 661 and a left camera 662, as to the right camera and the left camera, respectively, by a "unit 674 for cutting and bringing down images on local areas taking ${}_ip_R$ as the center", as shown in the left of FIG. 167 (F-5β-3).

(β3) Scan a binocular parallax number k from the minimum value $k_{min}$ to the maximum value $k_{max}$ by a "scan unit 673 for binocular parallax number k" (F-5β-4, F-5β-5, F-5β-11).

(Scan k)

(β4) Transform the number k, by a "transformation unit 675 for binocular parallax ${}_K\sigma$, to a binocular parallax ${}_k\sigma$ in a similar fashion to that of the step (5) of the embodiment D-5 (F-5β-6). In the event that the direction of the binocular parallax ${}_k\sigma$, that is, the parallactic vector $({}_k\sigma_x\, {}_k\sigma_y)$ is different from the "direction from ${}_ip_R$ to $a_{xis}$ (that is, $p_{axis}$) in FIG. 24(A), it is the binocular parallax which conflicts with this optical axis direction $a_{xis}$. Thus, in this case, the process skips to the step (β7) (F-5β-7).

(β5) In a similar fashion to that of the step (6) of the embodiment D-5, feed the "images on local areas on the right camera and the left camera" and the "binocular parallax ${}_k\sigma$" to a "binocular parallax detection unit 676" (cf. FIG. 167) to compute the response intensity in accordance with the following equation (F-5β-8).

$$\text{Response intensity}=\Sigma_x\Sigma_y\, {}_ia_R(x, y)_ia_L(x-{}_k\sigma_x, y-{}_k\sigma_y)$$

(β6) Feed the addresses (i, k) to a $\{_{ik}j\}$ table 622 and output the element number group $\{_{ik}j\}$ of the cylindrical arrangement (F-5β-9). β(β7) The response intensity, which is computed in the step (β5), is voted for an element number group of a cylindrical arrangement associated with the element number group $\{_{ik}j\}$, of a "cylindrical arrangement voting unit 677" (F-5β-10).

(Scan k (F-5β-11))

(Scan i (F-5β-12))

(β8) Extract a "point wherein the voted intensity offers the maximum (peak)" in the cylindrical arrangement, by a "peak extraction unit 678". This maximum point is a "place wherein the large circles intersect with each other at one point". The "normalization shortest distance ${}_nd_{c0}$ up to going across the plane" is determined in the form of a "height coordinates" of the maximum point, and the "three-dimensional azimuth $n_{s0}$ of the plane" is determined in the form of a "sectional circle inside coordinates" (F-5β-13).

Embodiment F-6. (Stereo+a Normalized Distance+ $a_{xis}$ Unknown)

Figure 150A:
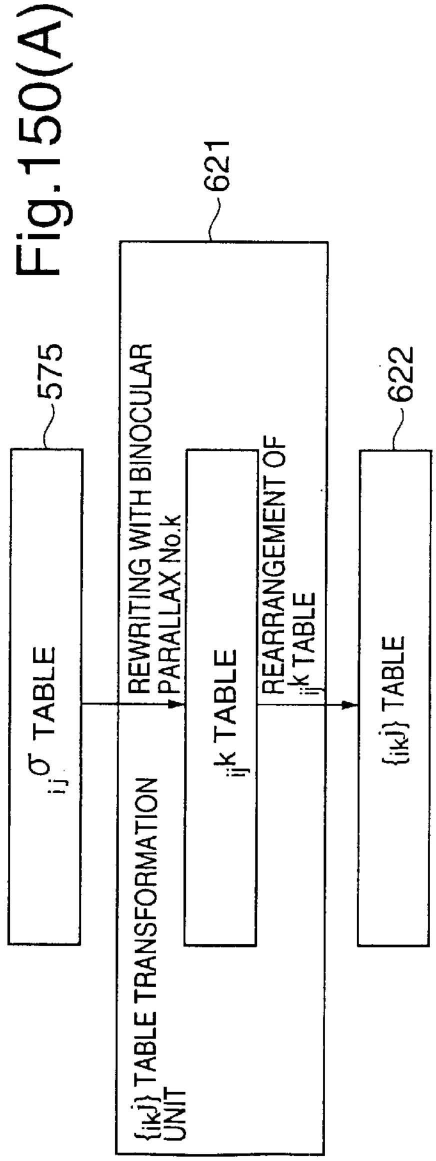
Figure 150B:
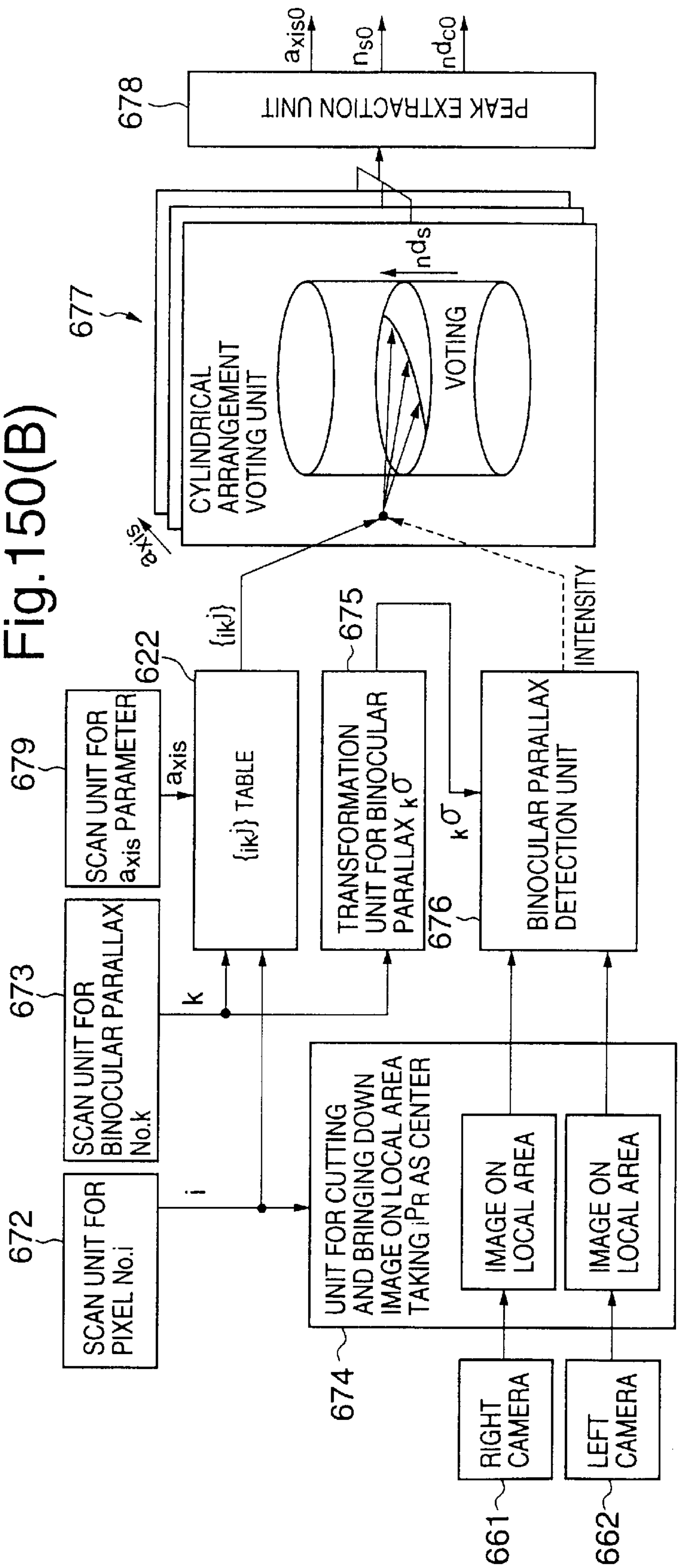

FIGS. 150(A) and 150(B) are block diagrams of an embodiment F-6 of the present invention. FIGS. 151 and 152 are flowcharts of the embodiment F-6.

(α) Prepare a $\{_{ik}j\}$ table (FIG. 166) for all the optical axis direction $\{a_{xis}\}$ (cf. FIG. 150(A), FIG. 151).

(α1) Prepare an ${}_{ij}\sigma$ table 575 (cf. FIG. 126(A), FIG. 172) in accordance with the processing (cf. FIG. 127) of the embodiment E-6α (F-6α-1), and replace the ${}_{ij}\sigma$ table (that is, the binocular parallax σ) with a binocular parallax number k in accordance with the association of FIG. 168 by a $\{_{ik}j\}$ table transformation unit 621 (F-6α-2). Thus, the ${}_{ij}\sigma$ table of FIG. 172 is rewritten into an "${}_{ij}k$ table (appearing at middle stage of FIG. 150(A))" wherein an address is (i, j) and the content is ${}_{ij}k$.

(α2) Next, rearrange the ${}_{ij}k$ table by the $\{_{ik}j\}$ table transformation unit 621 so as to produce a table 622 wherein an address is (i, k) and the content is an "element number j of the cylindrical arrangement" (F-6α-3). As stated in connection with the embodiment B-6, an arbitrary address (i, k), that is, a pixel wherein a position is ${}_ip_R$, and a binocular parallax ${}_k\sigma$, is coupled with the "all the points on a large circle of a cylindrical arrangement" through the compound ratio transformation and the polar transformation. Thus, the above-mentioned element number j becomes a set and is expressed by an element number group $\{_{ik}j\}$ (cf. FIG. 174).

(α3) Thus, designation of an arbitrary address (i, k) produces the $\{_{ik}j\}$ table (FIG. 173) for outputting the element number group $\{_{ik}j\}$ of the cylindrical arrangement.

(β) Using the $\{_{ik}j\}$ table thus prepared, detect the planar azimuth $n_{s0}$ and the normalized distance $_{n}d_{c0}$ (cf. FIG. 150(B) and FIG. 152).

The following steps (β1) to (β7) are the same as the corresponding steps of the embodiment F-5.

(β0) Scan an "optical axis direction parameter $a_{xis}$" over any possible directions (from the minimum value $a_{xis,\ min}$ to the maximum value $a_{xis,\ max}$) by a "scan unit for $a_{xis}$ parameter 679" (F-6β-1, F-6β-2, F-6β-15).

(Scan $a_{xis}$)

(β1) Scan addresses i of the respective points $_{i}p_{R}$ on an image from the minimum value $i_{min}$ to the maximum value $i_{max}$ by a "scan unit 672 for pixel No. i" (F-6β-3, F-6β-4, F-6β-14).

(Scan i)

(β2) Cut and bring down images on local areas taking a "pixel $_{i}p_{R}$ associated with the address i" as the center from images, which are obtained by a right camera 661 and a left camera 662, as to the right camera and the left camera, respectively, by a "unit 674 for cutting and bringing down images on local areas taking $_{i}p_{R}$ as the center", as shown in the left of FIG. 167 (F-6β-5).

(β3) Scan a binocular parallax number k from the minimum value $k_{min}$ to the maximum value $k_{max}$ by a "scan unit 673 for binocular parallax number k" (F-6β-4, F-6β-5, F-6β-13).

(Scan k)

(β4) Transform the number k, by a "transformation unit 675 for binocular parallax $_{k}\sigma$, to a binocular parallax $_{k}\sigma$ in a similar fashion to that of the step (5) of the embodiment D-5 (F-6β-8). In the event that the direction of the binocular parallax $_{k}\sigma$, that is, the parallactic vector $(_{k}\sigma_{x}\ _{k}\sigma_{y})$ is different from the "direction from $_{i}p_{R}$ to $a_{xis}$ (that is, $p_{axis}$) in FIG. 24(A), it is the binocular parallax which conflicts with this optical axis direction $a_{xis}$. Thus, in this case, the process skips to the step (β7) (F-6β-9).

(β5) In a similar fashion to that of the step (6) of the embodiment D-5, feed the "images on local areas on the right camera and the left camera" and the "binocular parallax $_{k}\sigma$" to a "binocular parallax detection unit 676" (cf. FIG. 167) to compute the response intensity in accordance with the following equation (F-6β-8).

$$\text{Response intensity}=\Sigma_x\Sigma_y\ {}_{i}a_R(x,\ y)_{i}a_L(x-{}_{k}\sigma_x,\ y-{}_{k}\sigma_y)$$

(β6) Feed the addresses (i, k) and the optical axis direction $a_{xis}$ to a $\{_{ik}j\}$ table 622 and output the element number group $\{_{ik}j\}$ of the cylindrical arrangement (F-6β-11).

(β7) The response intensity, which is computed in the step (β5), is voted for an element number group of a cylindrical arrangement associated with the element number group $\{_{ik}j\}$, of a "cylindrical arrangement voting unit 677" (F-6β-12).

(Scan k (F-6β-13))

(Scan i (F-6β-14))

(β8) In the processing up to here, the voting is performed for all the elements of the "cylindrical arrangement voting unit 677".

scan $a_{xis}$ (E-6β-15))

(β9) In the processing up to here, the voting is performed for all the elements of the "cylindrical arrangements for all the optical axis direction parameters $a_{xis}$".

(β10) Extract a "specified cylindrical arrangement" wherein the intensity offers the maximum from among the cylindrical arrangements, by a "peak extraction unit 678". Thus, a true optical axis direction parameters $a_{xis0}$ is determined in the form of the optical axis direction parameters for this arrangement. When a point, wherein the intensity offers the peak in the cylindrical arrangement, is extracted, the normalized distance $_{n}d_{c0}$ up to going across the plane is determined in the form of a "height coordinates" of the maximum point, and the three-dimensional azimuth $n_{s0}$ of the plane is determined in the form of a "sectional circle inside coordinates" (E-6β-16).

Embodiment F-7. (Stereo+a Normalization Shortest Distance)

Figure 153A:
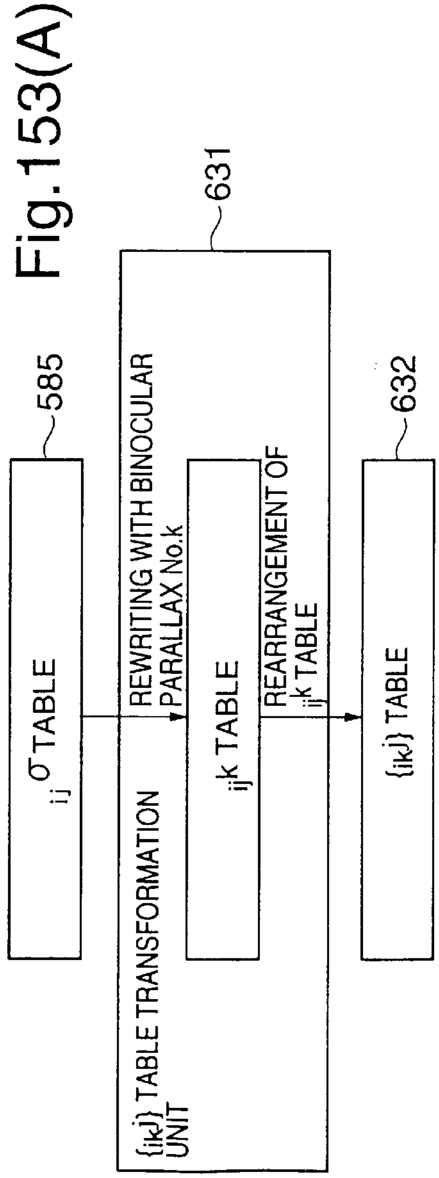
Figure 153B:
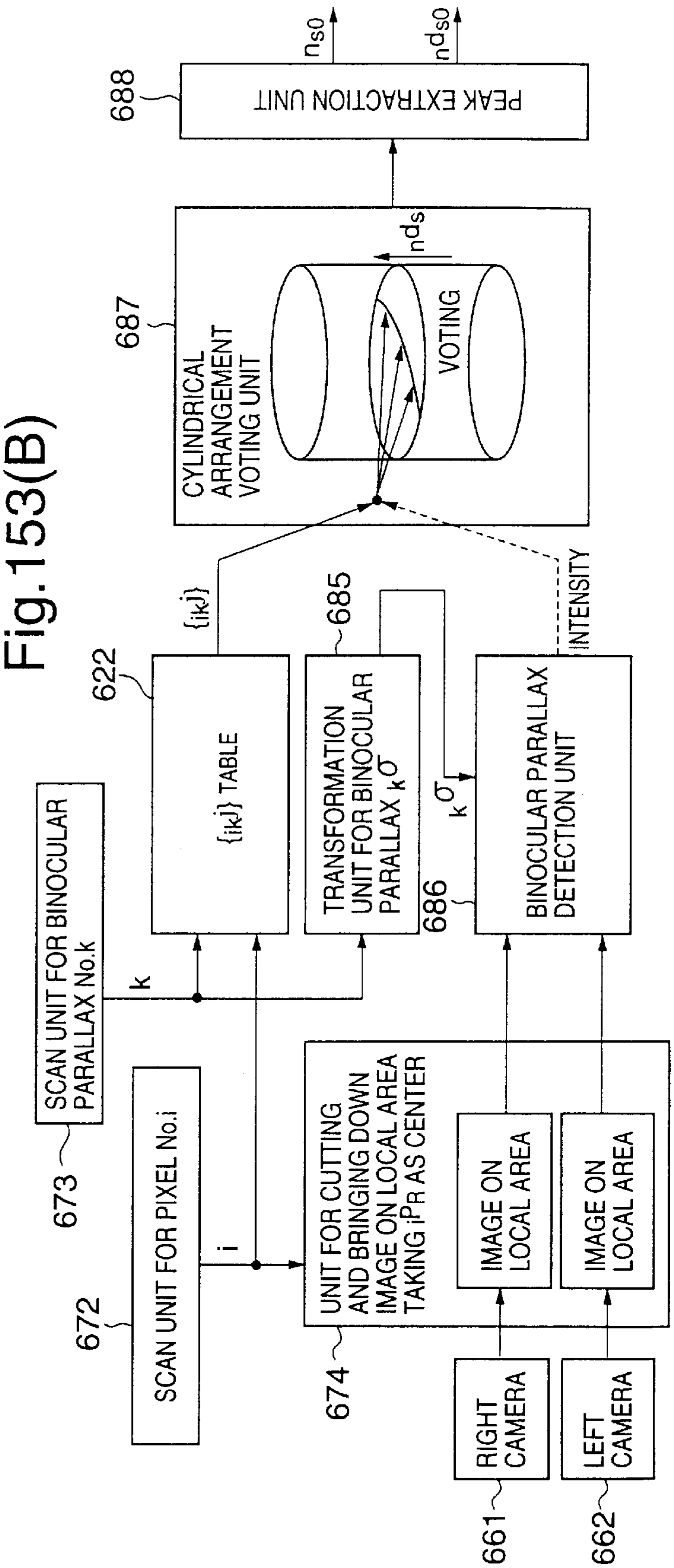

FIGS. 153(A) and 153(B) are block diagrams of an embodiment F-7 of the present invention. FIGS. 154 and 155 are flowcharts of the embodiment F-7.

(α) Transform the $_{ij}\sigma$ table (FIG. 171) of the embodiment E-7 to a $\{_{ik}j\}$ table (cf. FIG. 153(A), FIG. 154).

(α1) Prepare an $_{ij}\sigma$ table 585 (cf. FIG. 129(A), FIG. 171) in accordance with the processing (cf. FIG. 130) of the embodiment E-7α (F-7α-1), and replace the $_{ij}\sigma$ table (that is, the binocular parallax σ) with a binocular parallax number k in accordance with the association of FIG. 168 by a $\{_{ik}j\}$ table transformation unit 631 (F-7α-2). Thus, the $_{ij}\sigma$ table of FIG. 171 is rewritten into an "$_{ij}k$ table (appearing at middle stage of FIG. 153(A))" wherein an address is (i, j) and the content is $_{ij}k$.

(α2) Next, rearrange the $_{ij}k$ table by the $\{_{ik}j\}$ table transformation unit 621 so as to produce a table 631 wherein an address is (i, k) and the content is an "element number j of the cylindrical arrangement" (F-7α-3). As stated in connection with the embodiment B-8, an arbitrary address (i, k), that is, a pixel wherein a position is $_{i}p_{R}$, and a binocular parallax $_{k}\sigma$, is coupled with the "all the points on a small circle of a cylindrical arrangement" through the small circle transformation. Thus, the above-mentioned element number j becomes a set and is expressed by an element number group $\{_{ik}j\}$ (cf. FIG. 173).

(α3) Thus, designation of an arbitrary address (i, k) produces the $\{_{ik}j\}$ table (FIG. 173) for outputting the element number group $\{_{ik}j\}$ of the cylindrical arrangement.

(β) Using the $\{_{ik}j\}$ table thus prepared, detect the planar azimuth $n_{s0}$ and the normalized distance $_{n}d_{s0}$ (cf. FIG. 153(B) and FIG. 155).

(β1) Scan addresses i of the respective points $_{i}p_{R}$ on an image from the minimum value $i_{min}$ to the maximum value $i_{max}$ by a "scan unit 672 for pixel No. i" (F-7β-1, F-7β-2, F-7β-12).

(Scan i)

(β2) Cut and bring down images on local areas taking a "pixel $_{i}p_{R}$ associated with the address i" as the center from images, which are obtained by a right camera 661 and a left camera 662, as to the right camera and the left camera, respectively, by a "unit 674 for cutting and bringing down images on local areas taking $_{i}p_{R}$ as the center", as shown in the left of FIG. 167 (F-7β-3).

(β3) Scan a binocular parallax number k from the minimum value $k_{min}$ to the maximum value $k_{max}$ by a "scan unit 673 for binocular parallax number k" (F-7β-4, F-7β-5, F-7β-11).

(Scan k)

(β4) Transform the number k, by a "transformation unit 685 for binocular parallax $_k\sigma$, to a binocular parallax $_k\sigma$ in a similar fashion to that of the step (5) of the embodiment D-5 (F-7β-6). In the event that the direction of the binocular parallax $_k\sigma$, that is, the parallactic vector $({}_k\sigma_x\, {}_k\sigma_y)$ is different from the "direction from $_ip_R$ to $a_{xis}$ (that is, $p_{axis}$) in FIG. 24(A), it is the binocular parallax which conflicts with this optical axis direction $a_{xis}$. Thus, in this case, the process skips to the step (β7) (F-7β-7).

(β5) In a similar fashion to that of the step (6) of the embodiment D-5, feed the "images on local areas on the right camera and the left camera" and the "binocular parallax $_k\sigma$" to a "binocular parallax detection unit 686" (cf. FIG. 167) to compute the response intensity in accordance with the following equation (F-7β-8).

$$\text{Response intensity} = \Sigma_x \Sigma_y\, {}_i a_R(x, y)\, {}_i a_L(x - {}_k\sigma_x, y - {}_k\sigma_y)$$

(β6) Feed the addresses (i, k) to a $\{_{ik}j\}$ table 622 and output the element number group $\{_{ik}j\}$ of the cylindrical arrangement (F-7β-9).

(β7) The response intensity, which is computed in the step (β5), is voted for an element number group of a cylindrical arrangement associated with the element number group $\{_{ik}j\}$, of a "cylindrical arrangement voting unit 687" (F-7β-10).

(Scan k (F-7β-11))

(Scan i (F-7β-12))

(β8) Extract a "point wherein the voted intensity offers the maximum (peak)" in the cylindrical arrangement, by a "peak extraction unit 688". This maximum point is a "place wherein the large circles intersect with each other at one point". The "normalization shortest distance $_nd_{s0}$ up to going across the plane" is determined in the form of a "height coordinates" of the maximum point, and the "three-dimensional azimuth $n_{s0}$ of the plane" is determined in the form of a "sectional circle inside coordinates" (F-7β-13).

Embodiment F-8. (Stereo+a Normalization Shortest Distance+$a_{xis}$ Unknown)

Figure 156A:
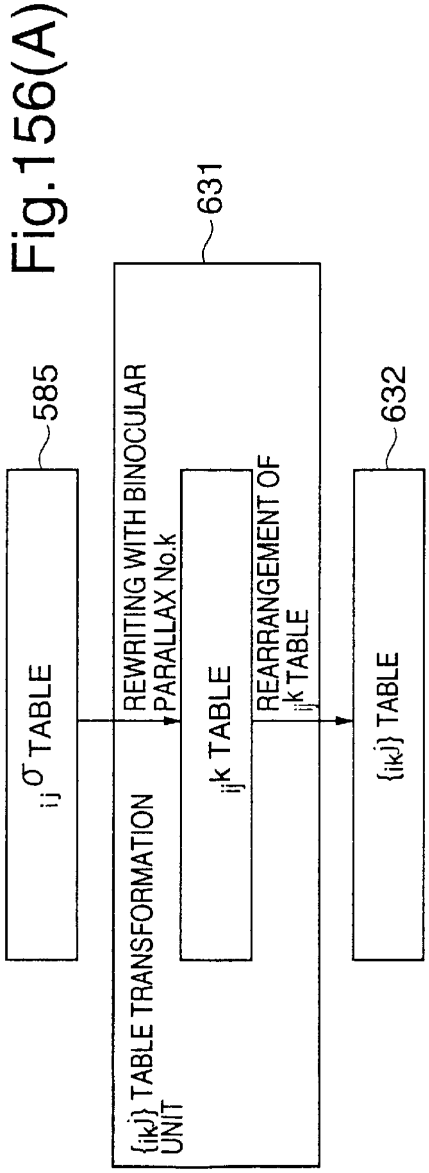
Figure 156B:
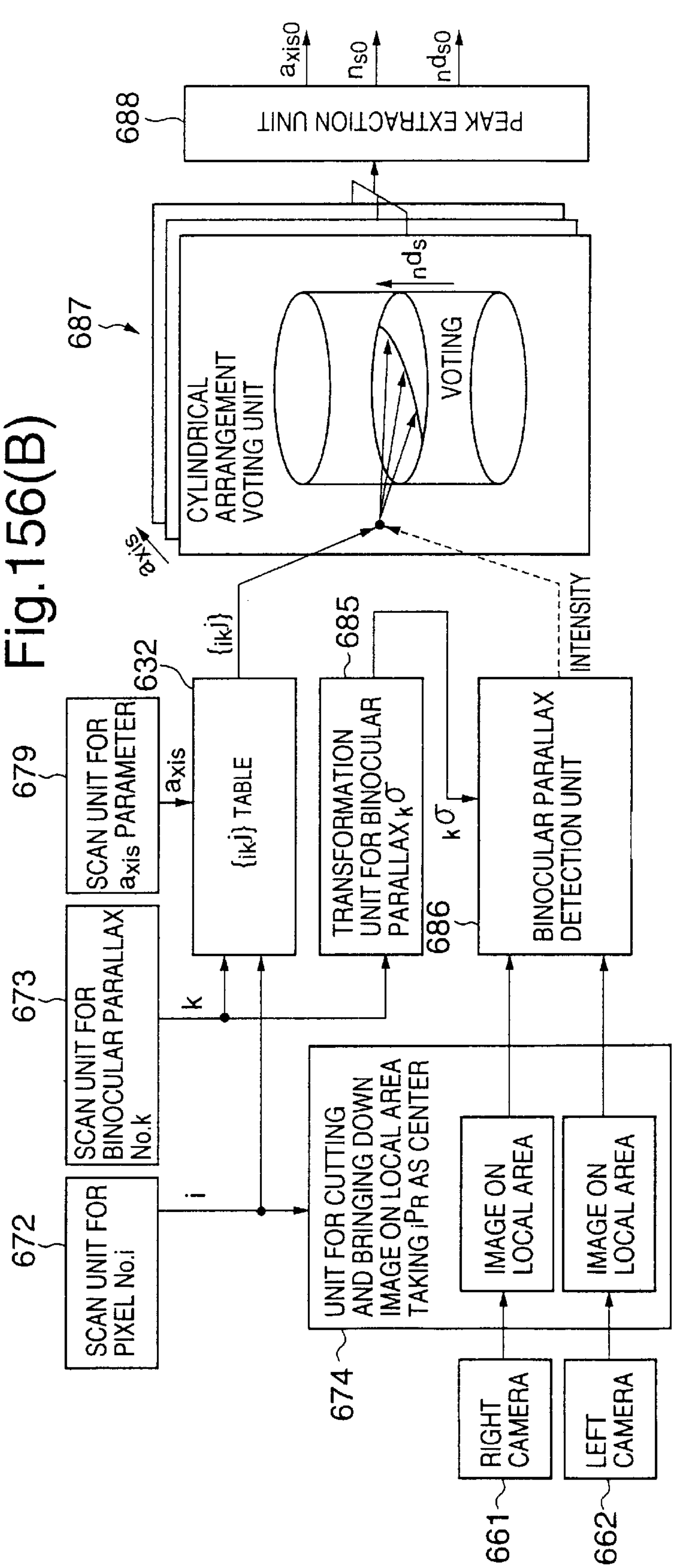

FIGS. 156(A) and 156(B) are block diagrams of an embodiment F-8 of the present invention. FIGS. 157 and 158 are flowcharts of the embodiment F-8.

(α) Transform the $_{ij}\sigma$ table (FIG. 172) of the embodiment E-8 to a $\{_{ik}j\}$ table (cf. FIG. 156(A), FIG. 157).

(α1) Prepare an $_{ij}\sigma$ table 585 (cf. FIG. 132(A), FIG. 172) in accordance with the processing (cf. FIG. 133) of the embodiment E-8α (F-8α-1), and replace the $_{ij}\sigma$ table (that is, the binocular parallax σ) with a binocular parallax number k in accordance with the association of FIG. 168 by a $\{_{ik}j\}$ table transformation unit 631 (F-8α-2). Thus, the $_{ij}\sigma$ table of FIG. 172 is rewritten into an "$_{ij}$k table (appearing at middle stage of FIG. 156(A))" wherein an address is (i, j) and the content is $_{ij}$k.

(α2) Next, rearrange the $_{ij}$k table by the $\{_{ik}j\}$ table transformation unit 631 so as to produce a table 632 wherein an address is (i, k) and the content is an "element number j of the cylindrical arrangement" (F-8α-3). As stated in connection with the embodiment B-8, an arbitrary address (i, k), that is, a pixel wherein a position is $_ip_R$, and a binocular parallax $_k\sigma$, is coupled with the "all the points on a small circle of a cylindrical arrangement" through the small circle transformation. Thus, the above-mentioned element number j becomes a set and is expressed by an element number group $\{_{ik}j\}$ (cf. FIG. 174).

(α3) Thus, designation of an arbitrary address (i, k) produces the $\{_{ik}j\}$ table (FIG. 174) for outputting the element number group $\{_{ik}j\}$ of the cylindrical arrangement.

(β) Using the $\{_{ik}j\}$ table thus prepared, detect the planar azimuth $n_{s0}$ and the normalization shortest distance $_nd_{s0}$ (cf. FIG. 156(B) and FIG. 158).

The following steps (β1) to (β7) are the same as the corresponding steps of the embodiment F-7.

(β0) Scan an "optical axis direction parameter $a_{xis}$" over any possible directions (from the minimum value $a_{xis,\,min}$ to the maximum value $a_{xis,\,max}$) by a "scan unit for $a_{xis}$ parameter 679" (F-8β-1, F-8β-2, F-8β-15).

(Scan $a_{xis}$)

(β1) Scan addresses i of the respective points $_ip_R$ on an image from the minimum value $i_{min}$ to the maximum value $i_{max}$ by a "scan unit 672 for pixel No. i" (F-8β-3, F-8β-4, F-8β-14).

(Scan i)

(β2) Cut and bring down images on local areas taking a "pixel $_ip_R$ associated with the address i" as the center from images, which are obtained by a right camera 661 and a left camera 662, as to the right camera and the left camera, respectively, by a "unit 674 for cutting and bringing down images on local areas taking $_ip_R$ as the center", as shown in the left of FIG. 167 (F-8β-5).

(β3) Scan a binocular parallax number k from the minimum value $k_{min}$ to the maximum value $k_{max}$ by a "scan unit 673 for binocular parallax number k" (F-8β-6, F-8β-7, F-8β-13).

(Scan k)

(β4) Transform the number k, by a "transformation unit 685 for binocular parallax $_k\sigma$, to a binocular parallax $_k\sigma$ in a similar fashion to that of the step (5) of the embodiment D-5 (F-8β-8). In the event that the direction of the binocular parallax $_k\sigma$, that is, the parallactic vector $({}_k\sigma_x\, {}_k\sigma_y)$ is different from the "direction from $_ip_R$ to $a_{xis}$ (that is, $p_{axis}$) in FIG. 24(A), it is the binocular parallax which conflicts with this optical axis direction $a_{xis}$. Thus, in this case, the process skips to the step (β7) (F-8β-9).

(β5) In a similar fashion to that of the step (6) of the embodiment D-5, feed the "images on local areas on the right camera and the left camera" and the "binocular parallax $_k\sigma$" to a "binocular parallax detection unit 686" (cf. FIG. 167) to compute the response intensity in accordance with the following equation (F-8β-10).

$$\text{Response intensity} = \Sigma_x \Sigma_y\, {}_i a_R(x, y)\, {}_i a_L(x - {}_k\sigma_x, y - {}_k\sigma_y)$$

(β6) Feed the addresses (i, k) to a $\{_{ik}j\}$ table 632 and output the element number group $\{_{ik}j\}$ of the cylindrical arrangement (F-8β-11).

(β7) The response intensity, which is computed in the step (β5), is voted for an element number group of a cylindrical arrangement associated with the element number group $\{_{ik}j\}$, of a "cylindrical arrangement voting unit 687" (F-8β-12).

(Scan k (F-8β-13))

(Scan i (F-8β-14))

(β8) In the processing up to here, the voting is performed for all the elements of the "cylindrical arrangement voting unit 687".

(scan $a_{xis}$ (E-8β-15))

(β9) In the processing up to here, the voting is performed for all the elements of the "cylindrical arrangements for all the optical axis direction parameters $a_{xis}$".

(β10) Extract a "specified cylindrical arrangement" wherein the intensity offers the maximum from among the cylindrical arrangements, by a "peak extraction unit 688". Thus, a true optical axis direction parameters $a_{xis0}$ is determined in the form of the optical axis direction parameters for this arrangement. When a point, wherein the intensity offers the peak in the cylindrical arrangement, is extracted, the normalization shortest distance ${}_n d_{s0}$ up to going across the plane is determined in the form of a "height coordinates" of the maximum point, and the three-dimensional azimuth $n_{s0}$ of the plane is determined in the form of a "sectional circle inside coordinates (F-8β-16).

Appendix: Methods of Computation for the Motion Parallax and the Binocular Parallax (A) Motion Parallax (A-1) Hereinafter, There Will be Described two Types of Methods of Computing a Motion Parallax τ From a Normalized Time ${}_n t_c$, a Planar Azimuth $n_s$, a Present Time Position $p_0$ and an Infinite Time Position $p_{inf}$ (a Moving Direction v).

(A-1-1) Method 1: A Method According to the Compound Ratio and the Polar Transformation (FIGS. 161(A) and 161(B))

Step 1: Set up a normalized time ${}_n t_c$, a planar azimuth $n_s$, a present time position $p_0$ and an infinite time position $p_{inf}$.

Step 2: Determination of $p_c$ $p_c$ is an intersection point of a "large circle passing through $p_0$ and $p_{inf}$ and a "polar line $n_s$" (FIG. 161(A)), and thus is determined in accordance with the following equation. Incidentally, the "vector product with $n_s$" of the following equation is owing to the polar transformation of the above-mentioned paragraph 1.3.2.

$$p_c=[[p_0\times p_{inf}]\times n_S]/|[p_0\times p_{inf}]\times n_S| \quad \text{(Appendix-1a)}$$

Step 3: Determination of τ or $COS^{-1}$ $(p_0p_1)$

Among ${}_n t_c$, $p_{inf}$, $p_0$, $p_1$, and $p_c$, there is a relationship of a compound ratio as set forth below (cf. equation (12a)).

$${}_n t_c=\{p_{inf}p_0p_1p_c\} \quad \text{(Appendix-2a)}$$

When $p_{inf}$, $p_0$, $p_1$, and $p_c$ are represented by the central angle (the above-mentioned paragraph 1.3.1, FIG. 161(B)) and are substituted for the equation (Appendix-2a), the following equation is obtained (cf. equation (16a)).

$${}_n t_c=(\sin(a+\tau)/\sin(\tau))/(\sin(x)/\sin(x-a)) \quad \text{(Appendix-2b)}$$

When this equation is solved as to τ, the following equation is obtained.

$$\tau=\tan^{-1}(\sin a\,\sin(x-a)/({}_n t_c\,\sin x-\cos a\,\sin(x-a)) \quad \text{(Appendix-3)}$$

Thus, the motion parallax τ is determined. Here, a and x are computed in accordance with the following equations.

$$a=cos^{-1}(p_{inf}p_0) \quad \text{(Appendix-4a)}$$

$$x=cos^{-1}(p_{inf}p_c) \quad \text{(Appendix-4b)}$$

In the even that it is desired that the subsequent time position $p_1$ is determined, it is possible to compute the subsequent time position $p_1$ in accordance with the following equation.

$$p_1=\cos\tau\,\xi+\sin\tau\,\eta \quad \text{(Appendix-5a)}$$

ξ and η are given by the following equations.

$$\xi=p_0 \quad \text{(Appendix-5b)}$$

$$\eta=[[p_0\times p_{inf}]\times p_0]/|[p_0\times p_{inf}]\times p_0| \quad \text{(Appendix-5c)}$$

(A-1-2) Method 2: An Alternative Method

It is also possible to determine the motion parallax τ in accordance with the following method.

Step 1: Set up a normalized time ${}_n t_c$, a planar azimuth $n_s$, a present time position $p_0$ and an infinite time position $p_{inf}$.

Step 2: Set up arbitrarily a unit moving distance Δx and compute a distance $d_c$ ($Vt_c$ in FIG. 12) from the camera center to a plane in accordance with the following equation.

$$d_c={}_n t_c\Delta x \quad \text{(Appendix-6)}$$

Step 3: Determine a plane wherein an azimuth is $n_s$ and a distance is $d_c$. Compute a point $p_0$ intersecting with the plane through extension from the camera center to a direction of $p_0$.

Step 4: Compute a point $p_1$ wherein the point $p_0$ is moved by Δx in a direction of $p_{inf}$.

Step 5: $p_1$, wherein the point $p_1$ is normalized in accordance with the following equation, is a position on a sphere as to the subsequent time.

$$p_1=P_1/|P_1| \quad \text{(Appendix-7)}$$

Step 6: The motion parallax τ can be determined from this position $p_1$ and the present time position $p_0$ in accordance with the following equation. Incidentally, the motion parallax is independent of a variation of the unit moving distance Δx arbitrarily set up in the step 2.

$$\tau=\cos^{-1}(p_0p_1) \quad \text{(Appendix-8)}$$

(A-2) In Case of a Normalization Shortest Distance ${}_n d_s$

Hereinafter, there will be described two types of methods of computing a motion parallax τ from a normalization shortest distance ${}_n d_s$, a planar azimuth $n_s$, a present time position $p_0$ and an infinite time position $p_{inf}$ (a moving direction v).

(A-2-1) Method 1: A Method According to the Small Circle Transformation (FIGS. 162(A) and 162(B))

Step 1: Set up a normalization shortest distance ${}_n d_s$, a planar azimuth $n_s$, a present time position $p_0$ and an infinite time position $p_{inf}$.

Step 2: Determine a radius R of a small circle transformation (the above-mentioned paragraph 2.2, FIG. 162(A))

$$R=\cos^{-1}(p_0n_s) \quad \text{(Appendix-11)}$$

Step 3: Determination of τ or $\cos^{-1}$ $(p_0p_1)$

As stated in the above-mentioned paragraph 2.2, there is a relationship give by the following equation (FIG. 162(B)).

$$\begin{aligned}\cos R &= {}_n d_s/(p_{inf}\,p_0\,p_1)\\ &= {}_n d_s\sin\tau/\sin(a+\tau)\end{aligned} \quad \text{(Appendix - 12)}$$

When this equation is solved as to τ, the following equation is obtained.

$$\tau=\tan^{-1}(\sin a\,\cos R/({}_n d_s-\cos a\,\cos R)) \quad \text{(Appendix-13)}$$

Thus, the motion parallax *τ0 is determined.*

In the event that it is desired that the subsequent time position $p_1$ is determined, in a similar fashion to that of the equation (Appendix-5a), it is possible to compute the subsequent time position $p_1$ in accordance with the following equation.

$$p_1=\cos\tau\,\xi+\sin\tau\,\eta \quad \text{(Appendix-14)}$$

(A-2-2) Method 2: An Alternative Method

It is also possible to determine the motion parallax $\tau$ in accordance with the following method.

Step 1: Set up a normalization shortest distance $_nd_s$, a planar azimuth $n_s$, a present time position $p_0$ and an infinite time position $p_{inf}$.

Step 2: Set up arbitrarily a unit moving distance $\Delta x$ and compute a shortest distance $d_s$ (FIG. 12) from the camera center to a plane in accordance with the following equation.

$$d_s = {_n}d_s \Delta x \quad \text{(Appendix-15)}$$

Step 3: Determine a plane wherein an azimuth is $n_s$ and a shortest distance is $d_s$. Compute a point $p_0$ intersecting with the plane through extension from the camera center to a direction of $p_0$.

Step 4: Compute a point $p_1$ wherein the point $p_0$ is moved by $\Delta x$ in a direction of $p_{inf}$.

Step 5: $p_1$, wherein the point $p_1$ is normalized in accordance with the following equation, is a position on a sphere as to the subsequent time.

$$p_1 = P_1/|P_1| \quad \text{(Appendix-16)}$$

Step 6: The motion parallax $\tau$ can be determined from this position $p_1$ and the present time position $p_0$ in accordance with the following equation. Incidentally, the motion parallax is independent of a variation of the unit moving distance $\Delta x$ arbitrarily set up in the step 2.

$$\tau = \cos^{-1}(p_0 p_1) \quad \text{(Appendix-17)}$$

(B) Binocular Parallax (B-1) In Case of a Normalized Distance $_nd_c$

Hereinafter, there will be described two types of methods of computing a binocular parallax $\sigma$ from a normalized distance $_nd_c$, a planar azimuth $n_s$, a right camera image position $p_R$ and a position $p_{axis}$ (a moving direction $a_{xis}$) on an optical axis coupling a right camera and a left camera.

(B-1-1) Method 1: A Method According to the Compound Ratio and the Polar Transformation (FIGS. 169(A) and 169(B))

Step 1: Set up a normalized distance $_nd_c$, a planar azimuth $n_s$, a right camera image position $p_R$ and a position $p_{axis}$ on an optical axis coupling a right camera and a left camera.

Step 2: Determination of $p_c$ $p_c$ is an intersection point of a "large circle passing through $p_R$ and $p_{axis}$ (FIG. 169(A)), and thus is determined in accordance with the following equation. Incidentally, the "vector product with $n_s$" of the following equation is owing to the polar transformation of the above-mentioned paragraph 4.2.3.

$$p_c = [[p_R \times p_{axis}] \times n_s] / |[p_R \times p_{axis}] \times n_s| \quad \text{(Appendix-21a)}$$

Step 3: Determination of $\sigma$ or $\cos^{-1}(p_R p_L)$

Among $_nd_c$, $p_{axis}$, $p_R$, $p_L$, and $p_c$, there is a relationship of a compound ratio as set forth below (cf. 4.2).

$$_nd_c = \{p_{axis} p_R p_L p_c\} \quad \text{(Appendix-22a)}$$

When $p_{axis}$, $p_R$, $p_L$, and $p_c$ are represented by the central angle (the above-mentioned paragraph 4.2, FIG. 169(B)) and are substituted for the equation (Appendix-22a), the following equation is obtained (cf. equation (60a)).

$$_nd_c = (\sin(c+\sigma)/\sin(\sigma))/(\sin(x)/\sin(x-c)) \quad \text{(Appendix-22b)}$$

When this equation is solved as to $\sigma$, the following equation is obtained.

$$\sigma = \tan^{-1}(\sin c \sin(x-c)/({_n}d_c \sin x - \cos c \sin(x-c)) \quad \text{(Appendix-23)}$$

Thus, the binocular parallax $\sigma$ is determined. Here, c and x are computed in accordance with the following equations.

$$C = \cos^{-1}(p_{axis} p_R) \quad \text{(Appendix-24a)}$$

$$x = \cos^{-1}(p_{axis} p_c) \quad \text{(Appendix-24b)}$$

In the event that it is desired that the position $p_L$ on the left camera is determined, it is possible to compute the position $p_L$ in accordance with the following equation.

$$p_L = \cos\sigma\,\xi + \sin\sigma\,\eta \quad \text{(Appendix-25a)}$$

$\xi$ and $\eta$ are given by the following equations.

$$\xi = p_R \quad \text{(Appendix-25b)}$$

$$\eta = [[p_R \times p_{axis}] \times p_R] / |[p_R \times p_{axis}] \times p_R| \quad \text{(Appendix-25c)}$$

(B-1-2) Method 2: An Alternative Method

It is also possible to determine the binocular parallax $\sigma$ in accordance with the following method.

Step 1: Set up a normalized distance $_nd_c$, a planar azimuth $n_s$, a right camera image position $p_R$ and a position $p_{axis}$ on an optical axis coupling a right camera and a left camera.

Step 2: Set up arbitrarily a left camera-to-right camera distance $\Delta x_{LR}$ and compute a distance $d_c$ (FIG. 22) from the camera center to a plane in accordance with the following equation.

$$d_c = {_n}d_c \Delta x_{LR} \quad \text{(Appendix-26)}$$

Step 3: Determine a plane wherein an azimuth is $n_s$ and a distance is $d_c$. Compute a point $p_R$ intersecting with the plane through extension from the camera center to a direction of $p_R$.

Step 4: Compute a point $p_L$ wherein the point $p_R$ is moved by $\Delta x_{LR}$ in a direction of $p_{axis}$.

Step 5: $p_1$, wherein the point $p_L$ is normalized in accordance with the following equation, is a position as to an image on the left camera.

$$p_L = P_L/|P_L| \quad \text{(Appendix-27)}$$

Step 6: The binocular parallax $\sigma$ can be determined from this position $p_L$ and the present time position $p_R$ in accordance with the following equation. Incidentally, the binocular parallax is independent of a variation of the left camera-to-right camera distance $\Delta x_{LR}$ set up in the step 2.

$$\sigma = \cos^{-1}(p_R p_L) \quad \text{(Appendix-28)}$$

(B-2) In Case of a Normalization Shortest Distance $_nd_s$

Hereinafter, there will be described two types of methods of computing a binocular parallax $\sigma$ from a normalization shortest distance $_nd_s$, a planar azimuth $n_s$, a right camera image position $p_R$ and a position $p_{axis}$ (a moving direction $a_{xis}$) on an optical axis coupling a right camera and a left camera.

(B-2-1) Method 1: A Method According to the Small Circle Transformation (FIGS. 170(A) and 170(B))

Step 1: Set up a normalization shortest distance $_nd_s$, a planar azimuth $n_s$, a right camera image position $p_R$ and a position $p_{axis}$ on an optical axis coupling a right camera and a left camera.

Figure 170:
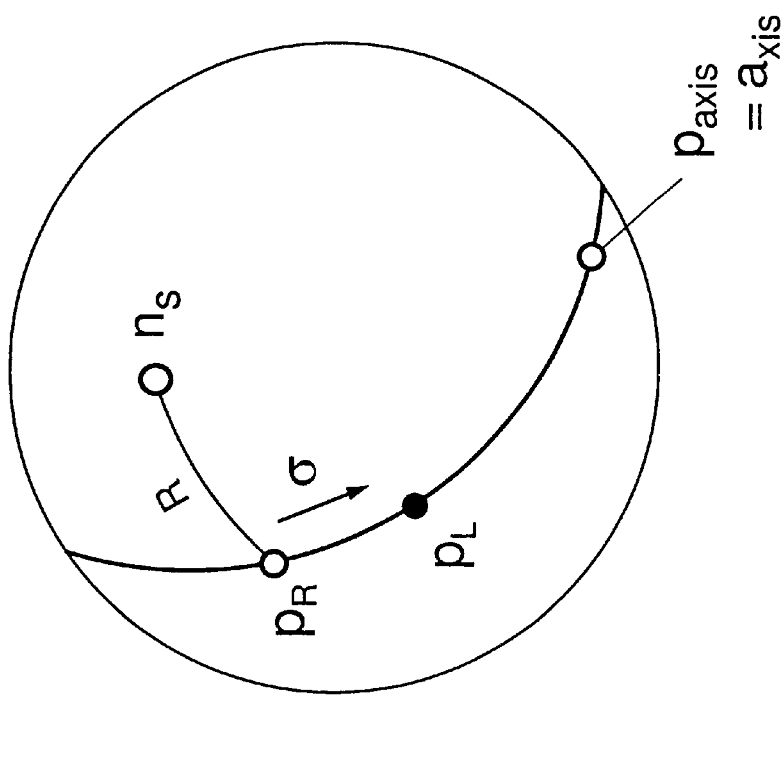

Step 2: Determine a Radius R of a Small Circle Transformation (the Above-mentioned Paragraph 4.3, FIG. 170 (A))

$$R=\cos^{-1}(p_0 p_s) \quad \text{(Appendix-31)}$$

Step 3: Determination of σ or $\cos^{-1}(p_0 p_L)$

As stated in the above-mentioned paragraph 4.3, there is a relationship give by the following equation (FIG. 170(B)).

$$\begin{aligned}\cos R &= {}_n d_s / (p_{axis} p_R p_L) \\ &= {}_n d_s \sin\sigma / \sin(c+\sigma)\end{aligned} \quad \text{(Appendix - 32)}$$

When this equation is solved as to σ, the following equation is obtained.

$$\sigma=\tan^{-1}(\sin c \cos R/({}_n d_s-\cos c \cos R)) \quad \text{(Appendix-33)}$$

Thus, the binocular parallax σ is determined.

In the even that it is desired that the subsequent time position $p_L$ is determined, in a similar fashion to that of the equation ((Appendix-25a), it is possible to compute the subsequent time position $p_L$ in accordance with the following equation.

$$p_L=\cos\sigma\,\xi+\sin\sigma\,\eta \quad \text{(Appendix-34)}$$

(B-2-2) Method 2: An Alternative Method

It is also possible to determine the binocular parallax σ in accordance with the following method.

Step 1: Set up a normalization shortest distance ${}_n d_s$, a planar azimuth $n_s$, a right camera image position $p_R$ and a position $p_{axis}$ on an optical axis coupling a right camera and a left camera.

Step 2: Set up arbitrarily a left camera-to-right camera distance $\Delta x_{LR}$ and compute a shortest distance $d_s$ from the camera center to a plane in accordance with the following equation.

$$d_s={}_n d_s \Delta x_{LR} \quad \text{(Appendix-35)}$$

Step 3: Determine a plane wherein an azimuth is $n_s$ and a shortest distance is $d_s$. Compute a point $P_R$ intersecting with the plane through extension from the camera center to a direction of $p_R$.

Step 4: Compute a point $p_L$ wherein the point $p_R$ is moved by $\Delta x_{LR}$ in a direction of $p_{axis}$.

Step 5: $p_L$, wherein the point $p_L$ is normalized in accordance with the following equation, is a position as to an image on the left camera.

$$p_L=P_L/|P_L| \quad \text{(Appendix-36)}$$

Step 6: The binocular parallax σ can be determined from this position $p_L$ and the right camera image position $p_R$ in accordance with the following equation. Incidentally, the binocular parallax is independent of a variation of the left camera-to-right camera distance $\Delta x_{LR}$ arbitrarily set up in the step 2.

$$\sigma-\cos^{-1}(p_R p_L) \quad \text{(Appendix-37)}$$

Effect of the Invention

1. Movement Vision Algorithm (1) Effects of a Method of Determining a Normalized Time ${}_n t_c$ As stated in the paragraph 1.3.2, it is possible to determine a three-dimensional azimuth $n_s$ of a plane and a normalized time ${}_n t_c$ up to going across the plane through determination of the positions $p_0$, $p_1$ at the present time and the subsequent time, respectively, and determination of the position $p_{inf}$ after the infinite time elapses.

This method of determining a normalized time is very useful for a traveling of a robot, an automatic traveling of an automobile, an autoland of an airplane, etc. There will be described an example wherein a robot walks on a passage. When the robot moves obliquely with respect to the passage (that is, in a direction wherein the robot runs against a wall of the passage), a one point of the cylindrical arrangement of FIG. 10(B) is flashed, so that a "normalized time ${}_n t_c$ up to going across the wall (running against the wall)" and a "normal vector $n_s$ of the wall" are obtained in the form of the height coordinates and the sectional circle inside coordinates, respectively. When the normalized time ${}_n t_c$ is multiplied by a "time difference from the present time to the subsequent time (that is, a time difference between the image frames) Δt", it is transformed into a time $t_c$ up to running against the plane. In accordance with the time $t_c$ and the normal vector $n_s$, the robot can take an avoidance action as follows. That is, when the measured $t_c$ is less than a "limit of an avoidance time which is determined by velocity, inertia, driving torque, etc. of the robot", there is provided such a control that the robot turns to a direction not so as to run against the wall (that is, a direction perpendicular to the measured normal vector $n_s$). When the robot turns, the "time $t_c$ up to running against the wall" returns to a value exceeding the avoidance limit. Further, when the avoidance is advanced so that the robot begins to move in parallel to the wall, the time $t_c$ becomes infinity. Thus, it is possible to grasp that movement in such a direction may avoid a collision. In this manner, measurement of the three-dimensional azimuth $n_s$ of a plane and the time $t_c$ up to running against the wall makes it possible for the robot to move without a collision even if it is a meandering passage.

This method is characterized in the point that only determination of the positions $p_0$, $p_1$ and $p_{inf}$ at three times permits the prediction of the "time $t_c$ up to running against the wall", even if the moving velocity V is unknown. According to a scheme wherein a distance is measured by a ultrasound and the like, it is indispensable that the moving velocity V is measured to transform the measured distance to the "time up to running against the wall".

Further, according to the method described in paragraph 1.6, it is possible to measure $n_s$ and n $t_c$ only through determination of positions $p_0$ and $p_1$ at two times, even if $p_{inf}$ (a moving direction v) is unknown. According to this method, for example, in connection with an image on an internet, video and movie, even if the moving direction in photography is unknown, it is possible to measure a three-dimensional azimuth $n_s$ of a plane and a normalized time ${}_n t_c$ up to going across the plane. In the event that a plane is moved, generally, it is impossible to decide the moving direction. However, also in this case, according to the method described in paragraph 1.6, it is possible to measure $n_s$ and ${}_n t_c$ together with the moving direction v.

The above-mentioned methods are not reported.

(2) Effects of a Method of Determining a Normalization Shortest Distance ${}_n d_s$ As stated in the paragraphs 2.1 and 2.2.3, it is possible to determine a three-dimensional azimuth $n_s$ of a plane and a normalization shortest distance ${}_n d_s$ through determination of the positions $p_0$, $p_1$ at the present time and the subsequent time, respectively, and determination of the position $p_{inf}$ after the infinite time elapses.

This method of determining a normalization shortest distance is very useful for a "separation of a plurality of objects and environments which look like that they are superposed" (referred to as a depth separation). That is, a "relative depth" and a "gradient" of a plane constituting the objects and the environments can be measured in the form of the normalization shortest distance ${}_nd_s$ and the three-dimensional azimuth $n_s$. Thus, it is possible to separate and identify the objects and the environments even if they are superposed.

This depth separation is characterized in the point that only determination of the positions $p_0$, $p_1$ and $p_{inf}$ at three times permits the separations even if the moving velocity V and "time difference Δt between the present time and the subsequent time and the moving distance Δx" are unknown. In the event that a shortest distance $d_s$ to the plane is needed, it is possible to obtain the shortest distance $d_s$ by means of multiplying the "moving distance Δx from the present time to the subsequent time" by the normalization shortest distance ${}_nd_s$.

Further, according to the method described in paragraph 2.5, it is possible to measure the normalization shortest distance ${}_nd_s$ and the azimuth $n_s$ only through determination of positions $p_0$ and $p_1$ at two times, even if $p_{inf}$ (a moving direction v) is unknown. According to this method, for example, in connection with an image on an internet, video and movie, even if the moving direction in photography is unknowns it is possible to measure the "three-dimensional azimuth $n_s$ and the normalization shortest distance ${}_nd_s$", so that the depth separation can be performed. In the event that a plane is moved, generally, it is impossible to decide the moving direction. However, also in this case, according to the method described in paragraph 2.5, it is possible to measure "$n_s$ and ${}_nd_s$" together with the moving direction v.

The above-mentioned methods are not reported.

2. Binocular Vision Algorithm (1) Effects of a Method of Determining a Normalization Shortest Distance ${}_nd_s$ As stated in the paragraphs 4.3.1 and 4.3.2, it is possible to determine a three-dimensional azimuth $n_s$ of a plane and a normalization shortest distance ${}_nd_s$ through determination of the positions $p_L$, $p_R$ on images as to the left camera and the right camera, respectively, and determination of the "position $p_{axis}$ on an optical axis coupling the left camera and the right camera".

This method of determining a normalization shortest distance is very useful for a "depth separation of a plurality of objects and environments which look like that they are superposed". That is, a "relative depth" and a "gradient" of a plane constituting the objects and the environments can be measured in the form of the normalization shortest distance ${}_nd_s$ and the three-dimensional azimuth $n_s$. Thus, it is possible to separate and identify the objects and the environments even if they are superposed.

This depth separation is characterized in the point that only determination of the positions $p_L$, $p_R$ on the left camera and the right camera and $p_{axis}$ on the optical axis permits the separation$_s$ even if the left camera-to-right camera distance $\Delta x_{LR}$ is unknown. In the event that a shortest distance $d_s$ to the plane is needed, it is possible to obtain the shortest distance $d_s$ by means of multiplying the "left camera-to-right camera distance $\Delta x_{LR}$" by the normalization shortest distance ${}_nd_s$.

Further, according to the method described in paragraph 4.3.3, it is possible to measure the normalization shortest distance ${}_nd_s$ and the azimuth $n_s$ only through determination of positions $p_L$ and $p_R$ on the left camera and the right camera, even if $p_{axis}$ (a optical axis direction $a_{xis}$) is unknown. According to this method, for example, in connection with a stereo image on an internet, even if the optical axis direction in photography is unknown$_s$ it is possible to measure the "three-dimensional azimuth $n_s$ and the normalization shortest distance ${}_nd_s$", so that the depth separation can be performed.

Incidentally, the above-mentioned depth separation can be implemented using the "normalized distance ${}_nd_c$ up to crossing a plane in the optical axis direction" and the "three-dimensional azimuth $n_s$ of a plane" which are measured in the paragraph 4.2.3.

The above-mentioned methods are not reported.

What is claimed is:

1. An image measurement method of determining an azimuth of a measuring plane and/or a physical quantity indexing a superposing time in which the measuring plane is superposed on a predetermined observation point, using a compound ratio $\{p_{inf}\, p_0\, p_1\, p_c\}$, which is determined by four positions $p_{inf}$, $p_0$, $p_1$, $p_c$ of a measuring point, or an operation equivalent to said compound ratio, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, and $p_c$ denotes a position of the measuring point at a superposing time in which a measuring plane including the measuring point is superposed on the observation point in the moving continuous state.

2. An image measurement method according to claim 1, wherein said compound ratio $\{p_{inf}\, p_0\, p_1\, p_c\}$ or the operation equivalent to said compound ratio include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$ at the two measuring times on the measuring point.

3. An image measurement method according to claim 1, wherein as said physical quantity indexing the superposing time, a normalized time ${}_nt_c$, which is expressed by the following equations is adopted, $${}_nt_c=t_c/\Delta t$$

where $t_c$ denotes a time between the one measuring time of said two measuring times and said superposing time, and Δt denotes a time between said two measuring times, and said normalized time ${}_nt_c$ is determined in accordance with the following equation $${}_nt_c=\{p_{inf}p_0p_1p_c\}$$

or an equation equivalent to the above equation.

4. An image measurement method according to claim 1, wherein an azimuth of a measuring plane including a plurality of measuring points associated with a plurality of polar lines intersecting at a cross point and/or a physical quantity indexing a superposing time in which the measuring plane is superposed on the observation point are determined in such a manner that a process of determining a polar line associated with the position $p_c$ of the measuring point at the superposing time through a polar transformation for the position $p_c$ is executed as to a plurality of measuring points existing in the measurement space, and cross points of polar lines, which are formed when a plurality of polar lines determined through an execution of said process are drawn on a polar line drawing space, are determined.

5. An image measurement method according to claim 1, wherein the measuring point appearing on the image has information as to intensity, and an azimuth of a measuring plane including a plurality of measuring points associated with a plurality of polar lines joining a voting for a maximal point and/or a physical quantity indexing a superposing time in which the measuring plane is superposed on the observation point are determined in such a manner that a process of determining a polar line associated with the measuring point through a polar transformation for the position $p_c$ at the superposing time on the measuring point, and of voting a value associated with intensity of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value.

6. An image measurement method according to claim 1, wherein the measuring point appearing on the image has information as to intensity, and an azimuth of a measuring plane including a plurality of measuring points associated with a plurality of polar lines joining a voting for a maximal point and/or a physical quantity indexing a superposing time in which the measuring plane is superposed on the observation point are determined in such a manner that a process of determining a polar line associated with the measuring point through a polar transformation for the position $p_c$ at the superposing time on the measuring point, and determining a response intensity associated with a motion parallax $\tau$ between the two measuring positions $p_0$ and $p_1$ of the measuring point at the two measuring times, and of voting the response intensity associated with the motion parallax $\tau$ of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value is determined.

7. An image measurement method according to claim 4, wherein the position $p_c$ of the measuring point at the superposing time is determined using said compound ratio $\{p_{inf}\, p_0\, p_1\, p_c\}$ or the operation equivalent to said compound ratio, upon determination of a physical quantity indexing the superposing time, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state.

8. An image measurement method according to claim 1 comprising:

a first step of setting up the physical quantity indexing the superposing time in form of a parameter;

a second step of determining the position $p_c$ of the measuring point at the superposing time, using said compound ratio $\{p_{inf}\, p_0\, p_1\, p_c\}$ or the operation equivalent to said compound ratio, in accordance with the physical quantity indexing the superposing time set up in the first step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state; and a third step of determining a polar line associated with the measuring point through a polar transformation of the position $p_c$ of the measuring point at the superposing time, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing a superposing time in which the measuring plane is superposed on the observation point in such a manner that cross points of polar lines, which are formed when a plurality of polar lines determined through a repetition of said first to third steps by a plurality of number of times are drawn on a polar line drawing space, are determined.

9. An image measurement method according to claim 8, wherein the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of execution of said first to third steps by a plurality of number of times offers a maximal value, instead of determining of the cross point, is determined.

10. An image measurement method according to claim 8, wherein the measuring point appearing on the image has information as to intensity, said image measurement method further comprises a fifth step of setting up a motion parallax $\tau$, which is a positional difference between the two measuring positions $p_0$ and $p_1$ at the two measuring times on the measuring point, in form of a second parameter, said second step is a step of determining the position $p_c$ of the measuring point at the superposing time using the physical quantity indexing the superposing time, which is set up in said first step, the measuring position $p_0$ at one measuring time of said two measuring times on said measuring point, the motion parallax τ, which is set up in said fifth step, and the position $p_{inf}$ of the measuring point after an infinite time elapses in the moving continuous state, said third step is a step of determining a polar line associated with the measuring point, and determining a response intensity associated with the motion parallax τ on the measuring point, and of voting the response intensity associated with the motion parallax τ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of said first, fifth, second and third steps by a plurality of number of times offers a maximal value is determined, instead of determination of said cross point.

11. An image measurement method according to claim 8, wherein said third step is a step of determining a polar line drawn on a sphere in form of a large circle through a polar transformation of the position $p_c$.

12. An image measurement method according to claim 8, wherein said third step is a step of determining a polar line drawn in form of a large circle on a sphere through a polar transformation of the position $p_c$, and projected into an inside of a circle on a plane.

13. An image measurement method according to claim 8, wherein said third step is a step of determining a polar line drawn on a plane in form of a straight line through a polar transformation of the position $p_c$.

14. An image measurement method according to claim 1 comprising:

a first step of setting up the position $p_{inf}$ of the measuring point after an infinite time elapses in the moving continuous state through setting up the moving direction v in form of a first parameter;

a second step of setting up the physical quantity indexing the superposing time in form of a second parameter;

a third step of determining the position $p_c$ of the measuring point at the superposing time, using said compound ratio $\{p_{inf}\, p_0\, p_1\, p_c\}$ or the operation equivalent to said compound ratio, in accordance with the position $p_{inf}$ set up in said first step, the physical quantity indexing the superposing time set up in the second step, and the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point; and a fourth step of determining a polar line associated with the measuring point through a polar transformation of the position $p_c$ of the measuring point at the superposing time, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true moving direction, and of determining an azimuth of a measuring plane including a plurality of measuring points associated with a plurality of polar lines intersecting at a cross point determined on a polar line drawing space associated with the true moving direction, and/or a physical quantity indexing a superposing time in which the measuring plane is superposed on the observation point in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true moving direction relative to said observation point on said measuring point is selected in accordance with information as to a number of polar lines intersecting at the cross points.

15. An image measurement method according to claim 14, wherein the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of said first to fourth steps offers a maximal value, instead of determining of the cross point, is determined on each polar line drawing space, and a polar line drawing space associated with the true moving direction is selected in accordance with information as to a maximal value at the maximal point.

16. An image measurement method according to claim 14, wherein the measuring point appearing on the image has information as to intensity, said image measurement method further comprises a sixth step of setting up a motion parallax τ, which is a positional difference between the two measuring positions $p_0$ and $p_1$ at the two measuring times on the measuring point, in form of a third parameter, said third step is a step of determining the position $p_c$ of the measuring point at the superposing time using the position $p_{inf}$, which is set up in said first step, the physical quantity indexing the superposing time, which is set up in said second step, the measuring position $p_0$ at one measuring time of said two measuring times on said measuring point, and the motion parallax $\tau$, which is set up in said sixth step, said fourth step is a step of determining a polar line associated with the measuring point, and determining a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of the first, second$_s$ sixth, third and fourth steps by a plurality of number of times offers a maximal value, instead of determining of the cross point, is determined on each polar line drawing space, and a polar line drawing space associated with the true moving direction is selected in accordance with information as to a maximal value at the maximal point.

17. An image measurement method of determining an azimuth $n_s$ of a measuring plane and/or a physical quantity indexing a shortest distance from a predetermined observation point to the measuring plane at one measuring time of two measuring times, using a compound ratio $\{p_{inf}\, p_0\, p_1\, p_c\}$, which is determined by four positions $p_{inf}$, $p_0$, $p_1$, $p_c$ of a measuring point, or an operation equivalent to said compound ratio, and an inner product $(n_s \cdot v)$ of the azimuth $n_s$ of the measuring plane and a moving direction v, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, $p_c$ denotes a position of the measuring point at a superposing time in which a measuring plane including the measuring point is superposed on the observation point in the moving continuous state, and $n_s$ denotes the azimuth of the measuring plane.

18. An image measurement method according to claim 17, wherein said compound ratio $\{p_{inf}\, p_0\, p_1\, p_c\}$ or the operation equivalent to said compound ratio include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

19. An image measurement method according to claim 17, wherein as said physical quantity indexing the shortest distance, a normalization shortest distance $_n d_s$, which is expressed by the following equation, is adopted, $$_n d_s = d_s/\Delta x$$

and said normalization shortest distance $_n d_s$ is determined in accordance with the following equation, $$_n d_s = {_n t_c}(n_s \cdot v)$$

using a normalized time $_n t_c$, which is expressed by the following equation, and the inner product $(n_s \cdot v)$ $$_n t_c = t_c/\Delta t$$

where $d_s$ denotes a shortest distance between the observation point and the measuring plane at one measuring time of said two measuring times, $t_c$ denotes a time between the one measuring time of said two measuring times and said superposing time, Δx denotes a moving distance of the measuring point, which is relative to the observation point, between said two measuring times, and Δt denotes a time between said two measuring times.

20. An image measurement method according to claim 17 comprising:

a first step of setting up the physical quantity indexing the shortest distance in form of a first parameter;

a second step of setting up the inner product $(n_s \cdot v)$ in form of a second parameter;

a third step of determining the position $p_c$ of the measuring point at the superposing time, using said compound ratio $\{p_{inf}\, p_0\, p_1\, p_c\}$ or the operation equivalent to said compound ratio, in accordance with the physical quantity indexing the shortest distance set up in the first step, the inner product $(n_s \cdot v)$ set up in the second step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state;

a fourth step of determining a polar line associated with the position $p_c$ of the measuring point at the superposing time through a polar transformation of the position $p_c$, and a fifth step of determining a point on the polar line, said point being given with an angle r with respect to the moving direction v, $$r = \cos^{-1}(n_s \cdot v)$$

wherein said third step to said fifth step, of said first step to said fifth step, are repeated by a plurality of number of times on a plurality of measuring points in said measurement space, while values of Said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is $varied_s$ is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance from said observation point to the measuring plane at one measuring time of the two measuring times in such a manner that cross points of curved lines, which are formed when a plurality of curved lines determined through a repetition of said first to fifth steps by a plurality of number of times are drawn on a curved line drawing space, are determined.

21. An image measurement method according to claim 20, wherein the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of said first to fifth steps by a plurality of number of times offers a maximal value, instead of determining of the cross point, is determined.

22. An image measurement method according to claim 20, wherein the measuring point appearing on the image has information as to intensity, said image measurement method further comprises a seventh step of setting up a motion parallax $\tau$, which is a positional difference between the two measuring positions $p_0$ and $p_1$ at the two measuring times on the measuring point, in form of a third parameter, said third step is a step of determining the position $p_c$ of the measuring point at the superposing time using the physical quantity indexing the shortest distance set up in the first step, the inner product $(n_s \cdot v)$ set up in the second step, the measuring position $p_0$ at one measuring time of said two measuring times on said measuring point, the motion parallax $\tau$, which is set up in said seventh step, and the position $p_{inf}$ of the measuring point after an infinite time elapses in the moving continuous state, said fifth step is a step of determining said point on a polar line associated with the measuring point, and determining a response intensity associated with the motion parallax $\tau$ on the measuring point, and of voting the response intensity associated with the motion parallax $\tau$ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of said first, second, seventh and third to fifth steps by a plurality of number of times offers a maximal value is determined, instead of determination of said cross point.

23. An image measurement method according to claim 20, wherein said fifth step is a step of determining a curved line drawn on a sphere in form of a curved line coupling a plurality of lines involved in one measuring point, which is determined through repetition of said fifth step.

24. An image measurement method according to claim 20, wherein said fifth step is a step of determining a curved line drawn on a sphere in form of a curved line coupling a plurality of lines involved in one measuring point, which is determined through repetition of said fifth step, said curved line being projected into an inside of a circle on a plane.

25. An image measurement method according to claim 17 comprising:

a first step of setting up the position $p_{inf}$ of the measuring point after an infinite time elapses in the moving continuous state through setting up the moving direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the measuring point at the superposing time, using said compound ratio $\{p_{inf}\, p_0\, p_1\, p_c\}$ or the operation equivalent to said compound ratio, in accordance with the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point;

a fifth step of determining a polar line associated with the position $p_c$ of the measuring point at the superposing time through a polar transformation of the position $p_c$; and a sixth step of determining a point on the polar line, said point being given with an angle r with respect to the moving direction v, $$r=\cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true moving direction, and of determining an azimuth $n_s$ of a measuring plane including a plurality of measuring points associated with a plurality of curved lines intersecting at a cross point determined on a curved line drawing space associated with the true moving direction, and/or a physical quantity indexing a shortest distance from the observation point to the measuring plane at one measuring time of the two measuring times in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true moving direction relative to said observation point on said measuring point is selected in accordance with information as to a number of curved lines intersecting at the cross points.

26. An image measurement method according to claim 25, wherein the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of said first to sixth steps offers a maximal value, instead of determining of the cross point, is determined on each curved line drawing space, and a curved line drawing space associated with the true moving direction is selected in accordance with information as to a maximal value at the maximal point.

27. An image measurement method according to claim 25, wherein the measuring point appearing on the image has information as to intensity, said image measurement method further comprises an eighth step of setting up a motion parallax $\tau$, which is a positional difference between the two measuring positions $p_0$ and $p_1$ at the two measuring times on the measuring point, in form of a fourth parameter, said fourth step is a step of determining the position $p_c$ of the measuring point at the superposing time using the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, the measuring position $p_0$ at one measuring time of said two measuring times on said measuring point, and a motion parallax $\tau$, which is set up in said eighth step, said sixth step is a step of determining said point associated with the measuring point, and determining a response intensity associated with the motion parallax $\tau$ on the measuring point, and of voting the response intensity associated with the motion parallax $\tau$ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true moving direction, and of determining an azimuth ns of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true moving direction is selected in accordance with information as to a maximal value at the maximal point.

28. An image measurement method of determining an azimuth of a measuring plane and/or a physical quantity indexing a shortest distance from a predetermined observation point to the measuring plane at one measuring time of two measuring times, using a simple ratio $(p_{inf}\, p_0\, p_1)$, which is determined by three positions $p_{inf}$, $p_0$, $p_1$ of a measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

29. An image measurement method according to claim 28, wherein said simple ratio $(p_{inf}\ p_0\ p_1)$ or the operation equivalent to said simple ratio include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

30. An image measurement method according to claim 28, wherein as the positions $p_{inf}$, $p_0$, $p_1$ of the measuring point, positions projected on a sphere are adopted$_s$ and as said physical quantity indexing the shortest distance, a normalization shortest distance $_nd_s$, which is expressed by the following equation, is adopted, $$_nd_s=d_s/\Delta x$$

where $d_s$ denotes a shortest distance between the observation point and the measuring plane at one measuring time of said two measuring times, and Δx denotes a moving distance of the measuring point, which is relative to the observation point, between said two measuring times, wherein said image measurement method comprises:

a first step of setting up the normalization shortest distance $_nd_s$ in form of a parameter;

a second step of determining a radius R defined by the following equation or the equivalent equation;

$$R=\cos^{-1}(_nd_s/(p_{inf}p_0p_1))$$

using the normalization shortest distance $_nd_s$ set up in the first step and the simple ratio ($p_{inf}$ $p_0$ $p_1$) or the operation equivalent to said simple ratio; and a third step of determining a small circle of a radius R taking as a center a measuring position of the measuring point at one measuring time of said two measuring times, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance $_nd_{s0}$ on the measuring plane in such a manner that cross points of small circles, which are formed when a plurality of small circles determined through a repetition of said first to third steps by a plurality of number of times are drawn on a small circle drawing space, are determined.

31. An image measurement method according to claim 30, wherein the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of said first to third steps by a plurality of number of times offers a maximal value, instead of determining of the cross point, is determined.

32. An image measurement method according to claim 30, wherein the measuring point appearing on the image has information as to intensity, said image measurement method further comprises a fifth step of setting up a motion parallax τ, which is a positional difference between the two measuring positions $p_0$ and $p_1$ at the two measuring times on the measuring point, in form of a second parameter, said second step is a step of determining the radius R using the normalization shortest distance $_nd_s$ set up in the first step, the position $p_{inf}$ of the measuring point after an infinite time elapses in the moving continuous state, the measuring position $p_0$ at one measuring time of said two measuring times on said measuring point, and the motion parallax τ, which is set up in said fifth step, said third step is a step of determining said small circle associated with the measuring point, and determining a response intensity associated with the motion parallax τ on the measuring point, and of voting the response intensity associated with the motion parallax τ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of said first, fifth, second and third steps by a plurality of number of times offers a maximal value is determined, instead of determination of said cross point.

33. An image measurement method according to claim 28, wherein said third step is a step of determining a small circle of a radius R on the sphere, and also determining a small circle in which said small circle of a radius R on the sphere is projected into an inside of a circle on a plane.

34. An image measurement method according to claim 28, wherein as the positions $p_{inf}$, $p_0$, $p_1$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x$$

where $d_s$ denotes a shortest distance between the observation point and the measuring plane at one measuring time of said two measuring times, and Δx denotes a moving distance of the measuring point, which is relative to the observation point, between said two measuring times, wherein said image measurement method comprises:

a first step of setting up the position $p_{inf}$ of the measuring point after an infinite time elapses in the moving continuous state through setting up the moving direction v in form of a first parameter;

a second step of setting up the normalization shortest distance $_nd_s$ in form of a second parameter;

a third step of determining a radius R defined by the following equation or the equivalent equation;

$$R=\cos^{-1}(_nd_s/(p_{inf}p_0p_1))$$

using the position $p_{inf}$ of the measuring point after an infinite time elapses in the moving continuous state, which is set up in the first step, the normalization shortest distance $_nd_s$ set up in the second step and the simple ratio ($p_{inf}$ $p_0$ $p_1$) or the operation equivalent to said simple ratio; and a fourth step of determining a small circle of a radius R taking as a center a measuring position of the measuring point at one measuring time of said two measuring times, wherein said third step and said fourth step are repeated by a plurality of number of times on a plurality of measuring points in said measurement space, while values of the first and second parameters are altered in said first step and said second step, and thereafter, effected is a fifth step of determining a true moving direction, and of determining an azimuth $n_{s0}$ of a measuring plane including a plurality of measuring points associated with a plurality of small circles intersecting at a cross point determined on a small circle drawing space associated with the true moving direction, and/or a a normalization shortest distance $_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true moving direction relative to said observation point on said measuring point is selected in accordance with information as to a number of small circles intersecting at the cross points.

35. An image measurement method according to claim 34, wherein the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance $_nd_{s0}$ on the measuring plane in such a manner that a maximal point wherein a value by a voting through a repetition of execution of said first to fourth steps by, a plurality of number of times offers a maximal value, instead of determining of the cross point, is determined on each small circle drawing space, and a small circle drawing space associated with the true moving direction is selected in accordance with information as to the maximal value on the maximal point.

36. An image measurement method according to claim 34, wherein the measuring point appearing on the image has information as to intensity, said image measurement method further comprises a sixth step of setting up a motion parallax $\tau$, which is a positional difference between the two measuring positions $p_0$ and $p_1$ at the two measuring times on the measuring point, in form of a third parameter, said second step is a step of determining the radius R using the position $p_{inf}$ of the measuring point after an infinite time elapses in the moving continuous state, which is set up in said first step, the normalization shortest distance $_nd_s$ set up in the second step, the measuring position $p_0$ at one measuring time of said two measuring times on said measuring point, and the motion parallax $\tau$, which is set up in said fifth step, said fourth step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance $_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true moving direction is selected in accordance with information as to the maximal value on the maximal point.

37. An image measurement method of determining a physical quantity indexing a distance between a predetermined observation point and a measuring point at one measuring time of two measuring times, using a simple ratio ($p_{inf}$ $p_0$ $p_1$), which is determined by three positions $p_{inf}$, $p_0$, $p_1$ of the measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

38. An image measurement method according to claim 37, wherein said simple ratio ($p_{inf}$ $p_0$ $p_1$) or the operation equivalent to said simple ratio include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

39. An image measurement method according to claim 37, wherein as said physical quantity indexing the distance, a normalized distance ${}_nd_0$, which is expressed by the following equation, is adopted, $${}_nd_0=d_0/\Delta x$$

where $d_0$ denotes a distance between the observation point and the measuring point at one measuring time of the two measuring times, and Δx denotes a moving distance of the measuring point between said two measuring times with respect to the observation point, and said normalized distance ${}_nd_0$ is determined in accordance with the following equation $${}_nd_0=(p_{inf}p_0p_1)$$

or an equation equivalent to the above equation.

40. An image measurement method comprising:

a first step of setting up coordinates in a voting space in form of a parameter, said coordinates being defined by a physical quantity indexing a superposing time in which a measuring plane, including an arbitrary measuring point appearing on an image obtained through viewing a predetermined measurement space from a predetermined observation point inside the measurement space, is superposed on the observation point, and an azimuth $n_s$ of the measuring plane, in a moving continuous state wherein it is expected that a movement of the measuring point appearing on an image obtained through viewing the measurement space from the observation point inside the measurement space, said measuring point being relative with respect to the observation point, is continued in a direction identical to a moving direction relative with respect to the observation point between mutually different two measuring times on the measuring point and at a velocity identical to a moving velocity between said two measuring times;

a second step of determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ of the measuring point after an infinite time elapses in the moving continuous state, and the coordinates in the voting space, which is set up in the first step;

a third step of determining a response intensity associated with the motion parallax τ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

41. An image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a superposing time in which a measuring plane including the measuring point is superposed on the observation point, and an azimuth $n_s$ of the measuring plane;

a third step of determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax τ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

42. An image measurement method comprising:

a first step of setting up coordinates in a voting space in form of a parameter, said coordinates being defined by a physical quantity indexing a shortest distance between a predetermined observation point inside a predetermined measurement space for observation of the measurement space and a measuring plane, including an arbitrary measuring point appearing on an image obtained through viewing the measurement space from the observation point inside the measurement space, at one measuring time of mutually different two measuring times, and an azimuth $n_s$ of the measuring plane;

a second step of determining a motion parallax τ, which is a positional difference between two measuring positions $p_0$ and $p_1$ at the two measuring times on the measuring point, in accordance with a measuring position $p_0$ at one measuring time of the two measuring times on the measuring point, a position $p_{inf}$ of the measuring point after an infinite time elapses in a moving continuous state wherein it is expected that a movement of the measuring point is continued in a direction identical to a moving direction relative with respect to the observation point between mutually different two measuring times and at a velocity identical to a moving velocity between said two measuring times, and the coordinates in the voting space, which is set up in the first step;

a third step of determining a response intensity associated with the motion parallax τ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

43. An image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a shortest distance from the observation point to a measuring plane including the measuring point at one measuring time of the two measuring times, and an azimuth $n_s$ of the measuring plane;

a third step of determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax $\tau$ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

44. An image measurement method comprising:

a first step of setting up in form of a parameter a motion parallax $\tau$, which is a positional difference between two measuring positions $p_0$ and $p_1$ at mutually different two measuring times, of an arbitrary measuring point appearing on an image obtained through viewing a predetermined measurement space from a predetermined observation point inside the measurement space;

a second step of determining coordinates in a voting space, said coordinates being defined by a physical quantity indexing a superposing time in which a measuring plane, including the measuring point, is superposed on the observation point, and an azimuth $n_s$ of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, in accordance with a measuring position $p_0$ at one measuring time of said two measuring times on said measuring point, a position $p_{inf}$ of the measuring point after an infinite time elapses in the moving continuous state, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

45. An image measurement method comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a superposing time in which a measuring plane, including the measuring point, is superposed on the observation point, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

46. An image measurement method comprising:

a first step of setting up in form of a parameter a motion parallax $\tau$, which is a positional difference between two measuring positions $p_0$ and $p_1$ at mutually different two measuring times on the measuring point, of an arbitrary measuring point appearing on an image obtained through viewing a predetermined measurement space from a predetermined observation point inside the measurement space;

a second step of determining coordinates in a voting space, said coordinates being defined by a physical quantity indexing a shortest distance from the observation point to a measuring plane including the measuring point at one measuring time of the two measuring times, and an azimuth $n_s$ of the measuring plane, in accordance with a measuring position $p_0$ at one measuring time of said two measuring times on said measuring point, a position $p_{inf}$ of the measuring point after an infinite time elapses in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

47. An image measurement method comprising:

a first step of setting up in form of a first parameter a moving direction v of an arbitrary measuring point appearing on an image obtained through viewing a predetermined measurement space from a predetermined observation point inside the measurement space, said moving-direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a shortest distance from the observation point to a measuring plane including the measuring point at one measuring time of the two measuring times, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

48. An image measurement method comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the first step and the second step are effected by a plurality of number of times on a plurality of measuring points in the measurement space.

49. An image measurement method according to claim 48, wherein said image measurement method further comprises a third step of determining an azimuth of a measuring plane including a plurality of measuring points joining a voting for a maximal point and/or a physical quantity indexing a superposing time in which the measuring plane is superposed on the observation point in such a manner that a maximal point wherein a value by said voting in the voting space offers a maximal value is determined.

50. An image measurement method comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the second step and the third step, of the first to third steps, are effected by a plurality of number of times on a plurality of measuring points in the measurement space, while a value of the parameter is altered in the first step.

51. An image measurement method according to claim 50, wherein said image measurement method further comprises a fourth step of determining a true moving direction relative to the observation point on the measuring point, and of determining an azimuth of a measuring plane including a plurality of measuring points joining a voting for a maximal point determined on a voting space associated with the true moving direction, and/or a physical quantity indexing a superposing time in which the measuring plane is superposed on the observation point, in such a manner that a maximal point wherein a value by a voting is determined on each voting space, and the voting space associated with the true moving direction is selected in accordance with information as to the maximal value on the maximal point.

52. An image measurement method comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a shortest distance from the observation point to a measuring plane, including the measuring point, at one measuring time of the two measuring times, and an azimuth of the measuring plane;

wherein the first step and the second step are effected by a plurality of number of times on a plurality of measuring points in the measurement space.

53. An image measurement method according to claim 52, wherein said image measurement method further comprises a third step of determining an azimuth of a measuring plane including a plurality of measuring points joining a voting for a maximal point and/or a physical quantity indexing a shortest distance from the observation point to the measuring plane at one measuring time of the two measuring times in such a manner that a maximal point wherein a value by said voting offers a maximal value is determined in the voting space.

54. An image measurement method comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a shortest distance from the observation point to the measuring plane at one measuring time of the two measuring times, including the measuring point, and an azimuth of the measuring plane;

wherein the second step and the third step, of the first to third steps, are effected by a plurality of number of times on a plurality of measuring points in the measurement space, while a value of the parameter is altered in the first step.

55. An image measurement method according to claim 54, wherein said image measurement method further comprises a fourth step of determining a true moving direction, and of determining an azimuth of a measuring plane including a plurality of measuring points joining a voting for a maximal point determined on a voting space associated with the true moving direction, and/or a shortest distance from the observation point to the measuring plane at one measuring time of the two measuring times, in such a manner that a maximal point wherein a value by said voting offers a maximal value is determined on each voting space, and a voting space associated with the true moving direction relative to the observation point on the measuring point is selected in accordance with information as to the maximal value on the maximal point.

56. An image measurement method of determining an azimuth of a measuring plane and/or a physical quantity indexing a distance between the measuring plane and one observation point of predetermined two observation points in an optical axis direction v coupling said two observation points, using a compound ratio $\{p_{axis}\ p_R\ p_L\ p_c\}$ which is determined by four positions $p_{axis}$, $p_R$, $p_L$, $p_c$, or an operation equivalent to said compound ratio, where $p_R$ and $p_L$ denote measuring positions through observation of said two observation points on an arbitrary measuring point appearing on an image obtained through viewing a predetermined measurement space from said two observation points inside the measurement space, respectively, $p_{axis}$ denotes a position of an infinite-point on a straight line extending in a direction identical to the optical axis direction v, including the measuring point, and $p_c$ denotes a position of an intersection point with said straight line on an observation plane extending in parallel to a measuring plane including the measuring point, including one observation point of said two observation points.

57. An image measurement method according to claim 56, wherein said compound ratio $\{p_{axis}\ p_R\ p_L\ p_c\}$ or the operation equivalent to said compound ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

58. An image measurement method according to claim 56, wherein as said physical quantity indexing a distance between the measuring plane and one observation point of said two observation points in the optical axis direction, a normalized distance ${}_nd_c$, which is expressed by the following equation, is adopted, $$ {}_nd_c=d_c/\Delta x_{LR} $$

where $d_c$ denotes a distance between the measuring plane and one observation point of said two observation points in the optical axis direction, and $\Delta x_{LR}$ denotes a distance between said two observation points, and said normalized distance ${}_nd_c$ is determined in accordance with the following equation $$ {}_nd_c=\{p_{axis}p_Rp_Lp_c\} $$

or an equation equivalent to the above equation.

59. An image measurement method according to claim 56, wherein an azimuth of a measuring plane including a plurality of measuring points associated with a plurality of polar lines intersecting at a cross point and/or a physical quantity indexing a distance between the measuring plane and one observation point of said two observation points in the optical axis direction are determined in such a manner that a process of determining a polar line associated with the position $p_c$ of the intersection point on the observation plane through a polar transformation for the position $p_c$ is executed as to a plurality of measuring points existing in the measurement space, and cross points of polar lines, which are formed when a plurality of polar lines determined through an execution of said process are drawn on a polar line drawing space, are determined.

60. An image measurement method according to claim 56, wherein the measuring point appearing on the image has information as to intensity, and an azimuth of a measuring plane including a plurality of measuring points associated with a plurality of polar lines joining a voting for a maximal point and/or a physical quantity indexing a distance between the measuring plane and one observation point of said two observation points in the optical axis direction are determined in such a manner that a process of determining a polar line associated with the measuring point through a polar transformation for the position $p_c$ of the intersection point on the observation plane, and of voting a value associated with intensity of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value.

61. An image measurement method according to claim 56, wherein the measuring point appearing on the image has information as to intensity, and an azimuth of a measuring plane including a plurality of measuring points associated with a plurality of polar lines joining a voting for a maximal point and/or a physical quantity indexing a distance between the measuring plane and one observation point of said two observation points in the optical axis direction are determined in such a manner that a process of determining a polar line associated with the measuring point through a polar transformation for the position $p_c$ of the intersection point on the observation plane, and determining a response intensity associated with a binocular parallax σ, which is a positional difference between the two measuring positions $p_R$ and $p_L$ through observation on said measuring point from said two observation points, and of voting the response intensity associated with the binocular parallax σ of a measuring point associated with the polar line for each point on a locus of the polar line, which is formed when the polar line thus determined is drawn on a polar line drawing space, is executed as to a plurality of measuring points existing in the measurement space, and a maximal point wherein a value by a voting through an execution of said process offers a maximal value is determined.

62. An image measurement method according to claim 59, wherein the position $p_c$ of the intersection point on the observation plane is determined using said compound ratio $\{p_{axis}\ p_R\ p_L\ p_c\}$ or the operation equivalent to said compound ratio, upon determination of a physical quantity indexing a distance between the measuring plane and one observation point of said two observation points in the optical axis direction, the two measuring positions $p_R$ and $p_L$ of the measuring point through observation from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point.

63. An image measurement method according to claim 56 comprising:

a first step of setting up the physical quantity indexing a distance between the measuring plane and one observation point of said two observation points in the optical axis direction in form of a parameter;

a second step of determining the position $p_c$ of the intersection point on the observation plane, using said compound ratio $\{p_{axis}\ p_R\ p_L\ p_c\}$ or the operation equivalent to said compound ratio, in accordance with the physical quantity indexing a distance between the measuring plane and one observation point of said two observation points in the optical axis direction set up in the first step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point; and a third step of determining a polar line associated with the measuring point through a polar transformation of the position $p_c$ of the intersection point on the observation plane, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing said physical quantity indexing a distance between the measuring plane and one observation point of said two observation points in the optical axis direction in such a manner that cross points of polar lines, which are formed when a plurality of polar lines determined through a repetition of said first to third steps by a plurality of number of times are drawn on a polar line drawing space, are determined.

64. An image measurement method according to claim 63, wherein the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of said first to third steps by a plurality of number of times offers a maximal value, instead of determining of the cross point, is determined.

65. An image measurement method according to claim 63, wherein the measuring point appearing on the image has information as to intensity, said image measurement method further comprises a fifth step of setting up a binocular parallax σ, which is a positional difference between the two measuring positions $p_R$ and $p_L$ through observation on said measuring point from said two observation points, in the form of a second parameter, said second step is a step of determining the position $p_c$ of the intersection point on the observation plane using the physical quantity indexing a distance between the measuring plane and one observation point of said two observation points in the optical axis direction, which is set up in said first step, the measuring position $p_R$ through observation on said measuring point from one observation point of said two observation points, the binocular parallax σ, which is set up in said fifth step, and the position $p_{axis}$ of said infinite-point of the measuring point, said third step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of said first, fifth, second and third steps by a plurality of number of times offers a maximal value is determined, instead of determination of said cross point.

66. An image measurement method according to claim 63, wherein said third step is a step of determining a polar line drawn on a sphere in form of a large circle through a polar transformation of the position $p_c$.

67. An image measurement method according to claim 63, wherein said third step is a step of determining a polar line drawn in form of a large circle on a sphere through a polar transformation of the position $p_c$, and projected into an inside of a circle on a plane.

68. An image measurement method according to claim 63, wherein said third step is a step of determining a polar line drawn on a plane in form of a straight line through a polar transformation of the position $p_c$.

69. An image measurement method according to claim 56 comprising:

a first step of setting up the position $p_{axis}$ of said infinite-point of the measuring point through setting up the optical axis direction v in form of a first parameter;

a second step of setting up the physical quantity indexing a distance between the measuring plane and one observation point of said two observation points in the optical axis direction in form of a second parameter;

a third step of determining the position $p_c$ of the intersection point on the observation plane, using said compound ratio $\{p_{axis}\ p_R\ p_L\ p_c\}$ or the operation equivalent to said compound ratio, in accordance with the position $p_{axis}$ set up in said first step, the physical quantity indexing a distance between the measuring plane and one observation point of said two observation points in the optical axis direction set up in the second step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a fourth step of determining a polar line associated with the measuring point through a polar transformation of the position $p_c$ of the intersection point on the observation plane, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true optical axis direction, and of determining an azimuth of a measuring plane including a plurality of measuring points associated with a plurality of polar lines intersecting at a cross point determined on a polar line drawing space associated with the true optical axis direction, and/or said physical quantity indexing a distance between the measuring plane and one observation point of said two observation points in the optical axis direction in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true optical axis direction relative to said observation point on said measuring point is selected in accordance with information as to a number of polar lines intersecting at the cross points.

70. An image measurement method according to claim 69, wherein the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction and/or said physical quantity indexing a distance between the measuring plane and one observation point of said two observation points in the optical axis direction in such a manner that a maximal point wherein a value by a voting through a repetition of execution of said first to fourth steps offers a maximal value, instead of determining of the cross point, is determined on each polar line drawing space, and a polar line drawing space associated with the true optical axis direction is selected in accordance with information as to a maximal value at the maximal point.

71. An image measurement method according to claim 69, wherein the measuring point appearing on the image has information as to intensity, said image measurement method further comprises a sixth step of setting up a binocular parallax $\sigma$, which is a positional difference between the two measuring positions $p_R$ and $p_L$ through observation on said measuring point from said two observation points, in the form of a third parameter, said third step is a step of determining the position $p_c$ of the intersection point on the observation plane using the position $p_{axis}$, which is set up in said first step, the physical quantity indexing a distance between the measuring plane and one observation point of said two observation points in the optical axis direction, which is set up in said second step, the measuring position $p_R$ through observation on said measuring point from one observation point of said two observation points, and the binocular parallax $\sigma$, which is set up in said sixth step, said fourth step is a step of determining a polar line associated with the measuring point, and determining a response intensity associated with the binocular parallax $\sigma$ on the measuring point, and of voting the response intensity associated with the binocular parallax $\sigma$ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true optical axis direction is selected in accordance with information as to a maximal value at the maximal point.

72. An image measurement method of determining an azimuth $n_s$ of a measuring plane and/or a physical quantity indexing a shortest distance between the measuring plane and one observation point of predetermined two observation points, using a compound ratio $\{p_{axis}\ p_R\ p_L\ p_c\}$, which is determined by four positions $p_{axis}$, $p_R$, $p_L$, $p_c$ of a measuring point, or an operation equivalent to said compound ratio, and an inner product $(n_s \cdot v)$ of the azimuth $n_s$ of the measuring plane and an optical axis direction v, where $p_R$ and $p_L$ denote measuring positions through observation of said two observation points on an arbitrary measuring point appearing on an image obtained through viewing a predetermined measurement space from predetermined two observation points inside the measurement space, respectively, v denotes the optical axis direction coupling said two observation points, $p_{axis}$ denotes a position of an infinite-point on a straight line extending in a direction identical to the optical axis direction v, including the measuring point, $p_c$ denotes a position of an intersection point with said straight line on an observation plane extending in parallel to a measuring plane including the measuring point, including one observation point of said two observation points, and $n_s$ denotes the azimuth of the measuring plane.

73. An image measurement method according to claim 72, wherein said compound ratio $\{p_{axis}\ p_R\ p_L\ p_c\}$ or the operation equivalent to said compound ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

74. An image measurement method according to claim 72, wherein as said physical quantity indexing the shortest distance, a normalization shortest distance ${}_nd_s$, which is expressed by the following equation, is adopted, $$ {}_nd_s = d_s/\Delta x_{LR} $$

and said normalization shortest distance ${}_nd_s$ is determined in accordance with the following equation, $$ {}_nd_s = {}_nd_c(n_s \cdot v) $$

using a normalized distance ${}_nd_c$, which is expressed by the following equation, and the inner product $(n_s \cdot v)$ $$ {}_nd_c = d_c/\Delta x_{LR} $$

where $d_s$ denotes a shortest distance between the measuring plane and one observation point of said two observation points, $d_c$ denotes a distance between the measuring plane and one observation point of said two observation points in an optical axis direction, and $\Delta x_{LR}$ denotes a distance between said two observation points.

75. An image measurement method according to claim 72 comprising:

a first step of setting up the physical quantity indexing the shortest distance in form of a first parameter;

a second step of setting up the inner product $(n_s \cdot v)$ in form of a second parameter;

a third step of determining the position $p_c$ of the intersection point on the observation plane, using said compound ratio $\{p_{axis}\ p_R\ p_L\ p_c\}$ or the operation equivalent to said compound ratio, in accordance with the physical quantity indexing the shortest distance set up in the first step, the inner product $(n_s \cdot v)$ set up in the second step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points, and the position $p_{axis}$ of said infinite-point of the measuring point;

a fourth step of determining a polar line associated with the position $p_c$ of the intersection point on the observation plane through a polar transformation of the position $p_c$, and a fifth step of determining a point on the polar line, said point being given with an angle r with respect to the optical axis direction v, $$ r = \cos^{-1}(n_s \cdot v) $$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance between the measuring plane and one observation point of said two observation points in such a manner that cross points of curved lines, which are formed when a plurality of curved lines determined through a repetition of said first to fifth steps by a plurality of number of times are drawn on a curved line drawing space, are determined.

76. An image measurement method according to claim 75, wherein the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of predetermined two observation points in such a manner that a maximal point wherein a value by a voting through a repetition of execution of said first to fifth steps by a plurality of number of times offers a maximal value, instead of determining of the cross point, is determined.

77. An image measurement method according to claim 75, wherein the measuring point appearing on the image has information as to intensity, said image measurement method further comprises a seventh step of setting up a binocular parallax σ, which is a positional difference between the two measuring positions $p_R$ and $p_L$ through observation on said measuring point from said two observation points, in the form of a third parameter, said third step is a step of determining the position $p_c$ of the intersection point on the observation plane using the physical quantity indexing the shortest distance set up in the first step, the inner product $(n_s \cdot v)$ set up in the second step, the measuring position $p_R$ through observation on said measuring point from one observation point of said two observation points, the binocular parallax σ, which is set up in said seventh step, and the position $p_{axis}$ of said infinite-point of the measuring point, said fifth step is a step of determining said point on a polar line associated with the measuring point, and determining a response intensity associated with the binocular parallax σ on the measuring point, and of voting the response intensity associated with the binocular parallax σ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of said two observation points in such a manner that a maximal point wherein a value by a voting through a repetition of said first, second, seventh and third to fifth steps by a plurality of number of times offers a maximal value is determined, instead of determination of said cross point.

78. An image measurement method according to claim 75, wherein said fifth step is a step of determining a curved line drawn on a sphere in form of a curved line coupling a plurality of lines involved in one measuring point, which is determined through repetition of said fifth step.

79. An image measurement method according to claim 75, wherein said fifth step is a step of determining a curved line drawn on a sphere in form of a curved line coupling a plurality of lines involved in one measuring point, which is determined through repetition of said fifth step, said curved line being projected into an inside of a circle on a plane.

80. An image measurement method according to claim 72 comprising:

a first step of setting up the position $p_{axis}$ of said infinite-point of the measuring point through setting up the optical axis direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the intersection point on the observation plane, using said compound ratio $\{p_{axis} p_R p_L p_C\}$ or the operation equivalent to said compound ratio, in accordance with the position $p_{axis}$ of said infinite-point of the measuring point, which is set up in said first step, the physical quantity indexing the shortest distance, which is set up in the second step, the inner product $(n_s \cdot v)$ set up in the third step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points;

a fifth step of determining a polar line associated with the position $p_c$ of the intersection point on the observation plane through a polar transformation of the position $p_c$; and a sixth step of determining a point on the polar line, said point being given with an angle r with respect to the optical axis direction v, $$r = \cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true optical axis direction , and of determining an azimuth $n_s$ of a measuring plane including a plurality of measuring points associated with a plurality of curved lines intersecting at a cross point determined on a curved line drawing space associated with the true optical axis direction, and/or a physical quantity indexing a shortest distance between the measuring plane and one observation point of predetermined two observation points in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true optical axis direction relative to said observation point on said measuring point is selected in accordance with information as to a number of curved lines intersecting at the cross points.

81. An image measurement method according to claim 80, wherein the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of said first to sixth steps offers a maximal value, instead of determining of the cross point, is determined on each curved line drawing space, and a curved line drawing space associated with the true optical axis direction is selected in accordance with information as to a maximal value at the maximal point.

82. An image measurement method according to claim 80, wherein the measuring point appearing on the image has information as to intensity, said image measurement method further comprises a eighth step of setting up a binocular parallax σ, which is a positional difference between the two measuring positions $p_R$ and $p_L$ through observation on said measuring point from said two observation points, in the form of a fourth parameter, said fourth step is a step of determining the position $p_c$ of the intersection point on the observation plane using the position $p_{axis}$ of said infinite-point of the measuring point, which is set up in said first step, the physical quantity indexing the shortest distance, which is set up in the second step, the inner product $(n_s \cdot v)$ set up in the third step, the measuring position $p_R$ through observation on said measuring point from one observation point of said two observation points, and a binocular parallax σ, which is set up in said eighth step, said sixth step is a step of determining said point associated with the measuring point, and determining a response intensity associated with the binocular parallax σ on the measuring point, and of voting the response intensity associated with the binocular parallax σ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true optical axis direction is selected in accordance with information as to a maximal value at the maximal point.

83. An image measurement method of determining an azimuth of a measuring plane and/or a physical quantity indexing a shortest distance between the measuring plane and one observation point of predetermined two observation points, using a simple ratio $(p_{axis}p_Rp_L)$, which is determined by three positions $p_{axis}$, $p_R$, $p_L$ of a measuring point, or an operation equivalent to said simple ratio, where $p_R$ and $p_L$ denote measuring positions through observation of said two observation points on an arbitrary measuring point appearing on an image obtained through viewing a predetermined measurement space from a predetermined observation point inside the measurement space, respectively, v denotes an optical axis direction coupling said two observation points, and $p_{axis}$ denotes a position of an infinite-point on a straight line extending in a direction identical to the optical axis direction v, including the measuring point.

84. An image measurement method according to claim 83, wherein said simple ratio $(p_{axis}p_Rp_L)$ or the operation equivalent to said simple ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

85. An image measurement method according to claim 83, wherein as the positions $p_{axis}$, $p_R$, $p_L$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x_{LR}$$

where $d_s$ denotes a shortest distance between the measuring plane and one observation point of said two observation points, and $\Delta x_{LR}$ denotes a distance between said two observation points, wherein said image measurement method comprises:

a first step of setting up the normalization shortest distance $_nd_s$ in form of a parameter;

a second step of determining a radius R defined by the following equation or the equivalent equation;

$$R=\cos^{-1}(_nd_s/(p_{axis}p_Rp_L))$$

using the normalization shortest distance $_nd_s$ set up in the first step and the simple ratio $(p_{axis}p_Rp_L)$ or the operation equivalent to said simple ratio; and a third step of determining a small circle of a radius R taking as a center a measuring position through observation on said measuring point from one observation point of said two observation points, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance $_nd_{s0}$ on the measuring plane in such a manner that cross points of small circles, which are formed when a plurality of small circles determined through a repetition of said first to third steps by a plurality of number of times are drawn on a small circle drawing space, are determined.

86. An image measurement method according to claim 85, wherein the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of said first to third steps by a plurality of number of times offers a maximal value, instead of determining of the cross point, is determined.

87. An image measurement method according to claim 85, wherein the measuring point appearing on the image has information as to intensity, said image measurement method further comprises a fifth step of setting up a binocular parallax σ, which is a positional difference between the two measuring positions $p_R$ and $p_L$ through observation on said measuring point from said two observation points, in form of a second parameter, said second step is a step of determining the radius R using the normalization shortest distance ${}_nd_s$ set up in the first step, the position $p_{axis}$ of said infinite-point of the measuring point, the measuring position $p_R$ through observation on said measuring point from one observation point of said two observation points, and the binocular parallax σ, which is set up in said fifth step, said third step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of said first, fifth, second and third steps by a plurality of number of times offers a maximal value is determined, instead of determination of said cross point.

88. An image measurement method according to claim 83, wherein said third step is a step of determining a small circle of a radius R on the sphere, and also determining a small circle in which said small circle of a radius R on the sphere is projected into an inside of a circle on a plane.

89. An image measurement method according to claim 83, wherein as the positions $p_{axis}$, $p_R$, $p_L$ of the measuring point, positions projected on a sphere are adopted, and as said physical quantity indexing the shortest distance, a normalization shortest distance ${}_nd_s$, which is expressed by the following equation, is adopted, $$ {}_nd_s = d_s / \Delta x_{LR} $$

where $d_s$ denotes a shortest distance between the measuring plane and one observation point of said two observation points, and $\Delta x_{LR}$ denotes a distance between said two observation points, wherein said image measurement method comprises:

a first step of setting up the position $p_{axis}$ of said infinite-point of the measuring point through setting up the optical axis direction v in form of a first parameter;

a second step of setting up the normalization shortest distance ${}_nd_s$ in form of a second parameter;

a third step of determining a radius R defined by the following equation or the equivalent equation;

$$ R = \cos^{-1}({}_nd_s / (p_{axis} p_R p_L)) $$

using the position $p_{axis}$ of said infinite-point of the measuring point, which is set up in the first step, the normalization shortest distance ${}_nd_s$ set up in the second step and the simple ratio $(p_{axis} p_R p_L)$ or the operation equivalent to said simple ratio, and a fourth step of determining a small circle of a radius R taking as a center a measuring position through observation on said measuring point from one observation point of said two observation points, wherein said third step and said fourth step are repeated by a plurality of number of times on a plurality of measuring points in said measurement space, while values of the first and second parameters are altered in said first step and said second step, and thereafter, effected is a fifth step of determining a true optical axis direction, and of determining an azimuth $n_{s0}$ of a measuring plane including a plurality of measuring points associated with a plurality of small circles intersecting at a cross point determined on a small circle drawing space associated with the true optical axis direction, and/or a a normalization shortest distance ${}_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true optical axis direction relative to said observation point on said measuring point is selected in accordance with information as to a number of small circles intersecting at the cross points.

90. An image measurement method according to claim 89, wherein the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_0$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

91. An image measurement method according to claim 89, wherein the measuring point appearing on the image has information as to intensity, said image measurement method further comprises a sixth step of setting up a binocular parallax σ, which is a positional difference between the two measuring positions $p_R$ and $p_L$ through observation on said measuring point from said two observation points, in form of a third parameter, said third step is a step of determining the radius R using the position $p_{axis}$ of said infinite-point of the measuring point, which is set up in said first step, the normalization shortest distance ${}_nd_s$ set up in the second step, the measuring position $p_R$ through observation on said measuring point from one observation point of said two observation points, and the binocular parallax σ, which is set up in said sixth step, said fourth step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

92. An image measurement method of determining a physical quantity indexing a distance between an arbitrary measuring point appearing on an image obtained through viewing a predetermined measurement space from a predetermined observation point inside the measurement space and one observation point of predetermined two observation points, using a simple ratio $(p_{axis}p_Rp_L)$, which is determined by three positions $p_{axis}$, $p_R$, $p_L$ of the measuring point, or an operation equivalent to said simple ratio, where $p_R$ and $p_L$ denote measuring positions through observation of said two observation points on the measuring point, respectively, and $p_{axis}$ denotes a position of an infinite-point on a straight line extending in a direction identical to an optical axis direction v coupling said two observation points, including the measuring point.

93. An image measurement method according to claim 92, wherein said simple ratio $(p_{axis}p_Rp_L)$ or the operation equivalent to said simple ratio include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

94. An image measurement method according to claim 92, wherein as said physical quantity indexing the distance, a normalized distance ${}_nd_0$, which is expressed by the following equation, is adopted, $${}_nd_0=d_0/\Delta x_{LR}$$

where $d_0$ denotes a distance between the measuring point and one observation point of said two observation points, and $\Delta x_{LR}$ denotes a distance between said two observation points, and said normalized distance ${}_nd_0$ is determined in accordance with the following equation $${}_nd_0=(p_{axis}p_Rp_L)$$

or an equation equivalent to the above equation.

95. An image measurement method comprising:

a first step of setting up coordinates in a voting space in form of a parameter, said coordinates being defined by a physical quantity indexing a distance between a measuring plane, including an arbitrary measuring point appearing on an image obtained through viewing a predetermined measuring space from predetermined two observation points in the measuring space and one observation point of said two observation points in an optical axis direction coupling said two observation points, and an azimuth of the measuring plane;

a second step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax σ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

96. An image measurement method comprising:

a first step of setting up in form of a first parameter an optical axis direction v coupling predetermined two observation points through viewing a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a distance between a measuring plane, including the measuring point and one observation point of said two observation points in an optical axis direction, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

97. An image measurement method comprising:

a first step of setting up coordinates in a voting space in form of a parameter, said coordinates being defined by a physical quantity indexing a shortest distance between one observation point of predetermined two observation points inside a predetermined measurement space for observation of the measurement space and a measuring plane, including an arbitrary measuring point appearing on an image obtained through viewing the measurement space from the two observation points, and an azimuth $n_s$ of the measuring plane;

a second step of determining a binocular parallax σ, which is a positional difference between two measuring positions $p_R$ and $p_L$ through observation on said measuring point from said two observation points, in accordance with a measuring position $p_R$ through observation on said measuring point from one observation point of the two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax σ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

98. An image measurement method comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a shortest distance from one observation point of the two observation points to a measuring plane including the measuring point, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

99. An image measurement method comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a distance between a measuring plane, including the measuring point and one observation point of said two observation points in an optical axis direction, and an azimuth $n_s$ of the measuring plane;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

100. An image measurement method comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a distance between a measuring plane, including the measuring point and one observation point of said two observation points in an optical axis direction, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

101. An image measurement method comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of said two observation points, a position $p_{axis}$ of an infinite-point on a straight line extending in a direction identical to the optical axis direction, including the measuring point, and the binocular parallax σ set up in the first step;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

102. An image measurement method comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

103. An image measurement method comprising:

a first step of determining a response intensity associated with a binocular parallax, which is a positional difference between two measuring positions through observation of predetermine two observation points on an arbitrary measuring point in a predetermined measurement space, in accordance with two images obtained through viewing the measurement space from said two observation points; and a second step of voting the response intensity determined in the first step for coordinates associated with the measuring point and the binocular parallax in a voting space, said coordinates being defined by a physical quantity indexing a distance between a measuring plane, including the measuring point, and one observation point of said two observation points in an optical axis direction coupling said two observation points, and an azimuth of the measuring plane;

wherein the first step and the second step are effected by a plurality of number of times on a plurality of measuring points in the measurement space.

104. An image measurement method according to claim 103, wherein said image measurement method further comprises a third step of determining an azimuth of a measuring plane including a plurality of measuring points joining a voting for a maximal point and/or a physical quantity indexing a distance between the measuring plane and one observation point of said two observation points in the optical axis direction in such a manner that a maximal point wherein a value by said voting in the voting space offers a maximal value is determined.

105. An image measurement method comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on an arbitrary measuring point in the measurement space from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a distance between a measuring plane, including the measuring point and one observation point of said two observation points in the optical axis direction, and an azimuth of the measuring plane;

wherein the second step and the third step, of the first to third steps, are effected by a plurality of number of times on a plurality of measuring points in the measurement space, while a value of the parameter is altered in the first step.

106. An image measurement method according to claim 105, wherein said image measurement method further comprises a fourth step of determining a true optical axis direction, and of determining an azimuth of a measuring plane including a plurality of measuring points joining a voting for a maximal point determined on a voting space associated with the true optical axis direction, and/or a physical quantity indexing a physical quantity indexing a distance between the measuring plane and one observation point of said two observation points in the true optical axis direction, in such a manner that a maximal point wherein a value by a voting is determined on each voting space, and the voting space associated with the true optical axis direction is selected in accordance with information as to the maximal value on the maximal point.

107. An image measurement method comprising:

a first step of determining a response intensity associated with a binocular parallax σ, which is a positional difference between two measuring positions through observation on an arbitrary measuring point in a measurement space from predetermined two observation points, in accordance with two images obtained through viewing the measurement space from said two observation points; and a second step of voting the response intensity determined in the first step for coordinates associated with the measuring point and the binocular parallax σ in a voting space, said coordinates being defined by a physical quantity indexing a shortest distance between one observation point of the two observation points and a measuring plane, including the measuring point, and an azimuth of the measuring plane;

wherein the first step and the second step are effected by a plurality of number of times on a plurality of measuring points in the measurement space.

108. An image measurement method according to claim 107, wherein said image measurement method further comprises a third step of determining an azimuth $n_s$ of a measuring plane including a plurality of measuring points joining a voting for a maximal point and/or a physical quantity indexing a shortest distance between one observation point of said two observation points and the measuring plane in such a manner that a maximal point wherein a value by said voting offers a maximal value is determined in the voting space.

109. An image measurement method comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on said measuring point from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a shortest distance between one observation point of said two observation points and a measuring plane including the measuring point, and an azimuth of the measuring plane;

wherein the second step and the third step, of the first to third steps, are effected by a plurality of number of times on a plurality of measuring points in the measurement space, while a value of the parameter is altered in the first step.

110. An image measurement method according to claim 109, wherein said image measurement method further comprises a fourth step of determining a true optical axis direction, and of determining an azimuth of a measuring plane including a plurality of measuring points joining a voting for a maximal point determined on a voting space associated with the true optical axis direction, and/or a shortest distance between one observation point of said two observation points and the measuring plane, in such a manner that a maximal point wherein a value by said voting offers a maximal value is determined on each voting space, and a voting space associated with the true optical axis direction relative to the observation point on the measuring point is selected in accordance with information as to the maximal value on the maximal point.

111. An image measurement apparatus comprising an operating unit for determining an azimuth of a measuring plane and/or a physical quantity indexing a superposing time in which the measuring plane is superposed on a predetermined observation point, using a compound ratio $\{p_{inf}p_0p_1p_c\}$, which is determined by four positions $p_{inf}$, $p_0$, $p_1$, $p_c$ of a measuring point, or an operation equivalent to said compound ratio, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, and $p_c$ denotes a position of the measuring point at a superposing time in which a measuring plane including the measuring point is superposed on the observation point in the moving continuous state.

112. An image measurement apparatus according to claim 111, wherein said compound ratio $\{p_{inf}p_0p_1p_c\}$ or the operation equivalent to said compound ratio, which are executed in said operating unit, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

113. An image measurement apparatus according to claim 111, wherein in said operating unit, as said physical quantity indexing the superposing time, a normalized time $_nt_c$, which is expressed by the following equation, is adopted, $$_nt_c=t_c/\Delta t$$

where $t_c$ denotes a time between the one measuring time of said two measuring times and said superposing time, and $\Delta t$ denotes a time between said two measuring times, and said normalized time $_nt_c$ is determined in accordance with the following equation $$_nt_c=\{p_{inf}p_0p_1p_c\}$$

or an equation equivalent to the above equation.

114. An image measurement apparatus according to claim 111, wherein said operating unit comprises:

a parameter altering unit for altering a value of a parameter in which the physical quantity indexing the superposing time is set up in form of the parameter;

a compound ratio transformation unit for determining the position $p_c$ of the measuring point at the superposing time, using said compound ratio $\{p_{inf}p_0p_1p_c\}$ or the operation equivalent to said compound ratio, in accordance with the physical quantity indexing the superposing time set up in the first step, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state; and a polar transformation unit for determining a polar line associated with the measuring point through a polar transformation of the position $p_c$ of the measuring point at the superposing time, wherein said compound ratio transformation unit and said polar transformation unit repeatedly perform operations by a plurality of number of times on a plurality of measuring points in said measurement space, while a value of said parameter is altered in said parameter altering unit, and said operating unit further comprises a detection unit for determining an azimuth of a measuring plane including a plurality of measuring points associated with a plurality of polar lines intersecting at a cross point and/or a physical quantity indexing a superposing time in which the measuring plane is superposed on the observation point in such a manner that cross points of polar lines, which are formed when a plurality of polar lines determined through a repetition of execution of operations of said parameter altering unit, said compound ratio transformation unit and said polar transformation unit by a plurality of number of times are drawn on a polar line drawing space, are determined.

115. An image measurement apparatus according to claim 114, wherein the measuring point appearing on the image has information as to intensity, said polar transformation unit determines the polar line, and votes a value associated with intensity of a measuring point associated with the polar line for each point on a locus of the polar line, which is formed when the polar line thus determined is drawn on a polar line drawing space, and said detection unit determines an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of execution of said parameter altering unit, said compound ratio transformation unit and said polar transformation unit by a plurality of number of times offers a maximal value, instead of determining of the cross point, is determined.

116. An image measurement apparatus according to claim 114, wherein the measuring point appearing on the image has information as to intensity, said operating unit further comprises a second parameter altering unit for altering a value of a second parameter in which a motion parallax $\tau$, which is a positional difference between the two measuring positions $p_0$ and P1 at the two measuring times on the measuring point, is set up in form of the second parameter, said compound ratio transformation unit determines the position $p_c$ of the measuring point at the superposing time using the physical quantity indexing the superposing time, which is set up in said parameter altering unit, the measuring position $p_0$ at one measuring time of said two measuring times on said measuring point, the motion parallax $\tau$, which is set up in said second parameter altering unit, and the position $p_{inf}$ of the measuring point after an infinite time elapses in the moving continuous state, said polar transformation unit determines a polar line associated with the measuring point, and determines a response intensity associated with the motion parallax $\tau$ on the measuring point, and votes the response intensity associated with the motion parallax $\tau$ of a measuring point associated with the polar line for each point on a locus of the polar line, which is formed when the polar line thus determined is drawn on a polar line drawing space, said compound ratio transformation unit and said polar transformation unit repeatedly perform operations by a plurality of number of times on a plurality of measuring points in said measurement space, while values of said parameters are altered in said parameter altering unit and said second parameter altering unit, and said detection unit determines an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition execution of operations of said parameter altering unit and said second parameter altering unit, said compound ratio transformation unit and said polar transformation unit by a plurality of number of times offers a maximal value is determined, instead of determination of said cross point.

117. An image measurement apparatus according to claim 111, wherein said operating unit comprising:

a first parameter altering unit for altering the position $p_{inf}$ of the measuring point after an infinite time elapses in the moving continuous state through altering a value of a first parameter in which the moving direction v is set up in form of the first parameter;

a second parameter altering unit for altering a value of a second parameter in which the physical quantity indexing the superposing time is set up in form of the second parameter;

a compound ratio transformation unit for determining the position $p_c$ of the measuring point at the superposing time, using said compound ratio $\{p_{inf}p_0p_1p_c\}$ or the operation equivalent to said compound ratio, in accordance with the position $p_{inf}$ set up in said first parameter altering unit, the physical quantity indexing the superposing time set up in the second parameter unit, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point,; and a polar transformation unit for determining a polar line associated with the measuring point through a polar transformation of the position $p_c$ of the measuring point at the superposing time, wherein said compound ratio transformation unit and said polar transformation unit repeatedly perform operations by a plurality of number of times on a plurality of measuring points in said measurement space, while values of said first parameter and said second parameter are altered in said first parameter altering unit and said parameter altering unit, respectively, and said operating unit further comprises a detection unit for determining a true moving direction, and for determining an azimuth of a measuring plane including a plurality of measuring points associated with a plurality of polar lines intersecting at a cross point determined on a polar line drawing space associated with the true moving direction, and/or a physical quantity indexing a superposing time in which the measuring plane is superposed on the observation point in such a manner that cross points of polar lines, which are formed when a plurality of polar lines determined through a repetition of execution of operations of said first parameter altering unit, said second parameter altering unit, said compound ratio transformation unit and said polar transformation unit are drawn on an associated polar line drawing space of a plurality of polar line drawing spaces according to said first parameter, are determined on each polar line drawing space, and a polar line drawing space associated with the true moving direction relative to said observation point on said measuring point is selected in accordance with information as to a number of polar lines intersecting at the cross points.

118. An image measurement apparatus according to claim 117, wherein the measuring point appearing on the image has information as to intensity, said polar transformation unit determines the polar line, and votes a value associated with intensity of a measuring point associated with the polar line for each point on a locus of the polar line, which is formed when the polar line thus determined is drawn on the polar line drawing space, said detection unit determines the true moving direction, and determines an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of operations of said compound ratio transformation unit and said polar transformation unit offers a maximal value, instead of determining of the cross point, is determined on each polar line drawing space, and a polar line drawing space associated with the true moving direction is selected in accordance with information as to a maximal value at the maximal point.

119. An image measurement apparatus according to claim 117, wherein the measuring point appearing on the image has information as to intensity, said operating unit further comprises a third parameter altering unit for altering a value of a third parameter in which a motion parallax $\tau$, which is a positional difference between the two measuring positions $p_0$ and $p_1$ at the two measuring times on the measuring point, is set up in form of the third parameter, said compound ratio transformation unit determines the position $p_c$ of the measuring point at the superposing time using the position $p_{inf}$, which is set up in said first parameter altering unit, the physical quantity indexing the superposing time, which is set up in said second parameter altering unit, the measuring position $p_0$ at one measuring time of said two measuring times on said measuring point, and the motion parallax $\tau$, which is set up in said third parameter altering unit, said polar transformation unit determines a polar line associated with the measuring point, and determines a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said compound ratio transformation unit and said polar transformation unit repeatedly perform operations by a plurality of number of times on a plurality of measuring points in said measurement space, while values of said parameters are altered in said second parameter altering unit and said third parameter altering unit, and said detection unit determines the true moving direction, and determines an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of said first parameter altering unit, said second parameter altering unit, said third parameter altering unit, said compound ratio transformation unit and said polar transformation unit by a plurality of number of times offers a maximal value, instead of determining of the cross point, is determined on each polar line drawing space, and a polar line drawing space associated with the true moving direction is selected in accordance with information as to a maximal value at the maximal point.

120. An image measurement apparatus comprising an operating unit for determining an azimuth $n_s$ of a measuring plane and/or a physical quantity indexing a shortest distance from a predetermined observation point to the measuring plane at one measuring time of two measuring times, using a compound ratio $\{p_{inf}p_0p_1p_c\}$, which is determined by four positions $p_{inf}$, $p_0$, $p_1$, $p_c$ of a measuring point, or an operation equivalent to said compound ratio, and an inner product $(n_s \cdot v)$ of the azimuth $n_s$ of the measuring plane and a moving direction v, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, $p_c$ denotes a position of the measuring point at a superposing time in which a measuring plane including the measuring point is superposed on the observation point in the moving continuous state, and $n_s$ denotes the azimuth of the measuring plane.

121. An image measurement apparatus according to claim 120, wherein said compound ratio $\{p_{inf}p_0p_1p_c\}$ or the operation equivalent to said compound ratio, which are executed in said operating unit, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

122. An image measurement apparatus according to claim 120, wherein in said operating unit, as said physical quantity indexing the shortest distance, a normalization shortest distance ${}_nd_s$, which is expressed by the following equation, is adopted, $$ {}_nd_s = d_s/\Delta x $$

and said normalization shortest distance ${}_nd_s$ is determined in accordance with the following equation, $$ {}_nd_s = {}_nt_c(n_s \cdot v) $$

using a normalized time ${}_nt_c$, which is expressed by the following equation, and the inner product $(n_s \cdot v)$ $$ {}_nt_c = t_c/\Delta t $$

where $d_s$ denotes a shortest distance between the observation point and the measuring plane at one measuring time of said two measuring times, $t_c$ denotes a time between the one measuring time of said two measuring times and said superposing time, $\Delta x$ denotes a moving distance of the measuring point, which is relative to the observation point, between said two measuring times, and $\Delta t$ denotes a time between said two measuring times.

123. An image measurement apparatus according to claim 120, wherein said operating unit comprises:

a first parameter altering unit for altering a value of a first parameter in which the physical quantity indexing the shortest distance is set up in form of the first parameter;

a second parameter altering unit for altering a value of a second parameter in which the inner product $(n_s \cdot v)$ in form of the second parameter;

a compound ratio transformation unit for determining the position $p_c$ of the measuring point at the superposing time, using said compound ratio $\{p_{inf}p_0p_1p_c\}$ or the operation equivalent to said compound ratio, in accordance with the physical quantity indexing the shortest distance set up in the first parameter altering unit, the inner product $(n_s \cdot v)$ set up in the second parameter altering unit, the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state;

a polar transformation unit for determining a polar line associated with the position $p_c$ of the measuring point at the superposing time through a polar transformation of the position $p_c$, and a point operating unit for determining a point on the polar line, said point being given with an angle r with respect to the moving direction v, $$ r = \cos^{-1}(n_s \cdot v) $$

wherein said compound ratio transformation unit, said polar transformation unit and said point operating unit repeatedly perform operations by a plurality of number of times on a plurality of measuring points in said measurement space, while values of said first parameter and said second parameter are altered in said first parameter altering unit and said second parameter altering unit, so that a curved line, which couples a plurality of points determined through an execution of said point operating unit as to one measuring point by a plurality of number of times wherein a value of said first parameter is identical and a value of said second parameter is varied, is determined on the plurality of measuring points for each value of said first parameter, and, said operating unit further comprises a detection unit for determining an azimuth$n_s$ of a measuring plane including a plurality of measuring points associated with a plurality of curved lines intersecting at a cross point and/or a physical quantity indexing a shortest distance from said observation point to the measuring plane at one measuring time of the two measuring times in such a manner that cross points of curved lines, which are formed when a plurality of curved lines determined through a repetition of execution of operations of said compound ratio transformation unit, said polar transformation unit and said point operating unit by a plurality of number of times are drawn on a curved line drawing space, are determined.

124. An image measurement apparatus according to claim 123, wherein the measuring point appearing on the image has information as to intensity, said point operating unit determines said point, and votes a value associated with intensity of a measuring point associated with said point for a point associated with said point in said curved line drawing space, said detection unit determines an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of said compound ratio transformation unit, said polar transformation unit and said point operating unit by a plurality of number of times offers a maximal value, instead of determining of the cross point, is determined.

125. An image measurement apparatus according to claim 123, wherein the measuring point appearing on the image has information as to intensity, said operating unit further comprises a third parameter altering unit for altering a value of a third parameter in which a motion parallax $\tau$, which is a positional difference between the two measuring positions $p_0$ and $p_1$ at the two measuring times on the measuring point, is set up in form of the third parameter, said compound ratio transformation unit determines the position $p_c$ of the measuring point at the superposing time using the physical quantity indexing the shortest distance set up in said first parameter altering unit, the inner product $(n_s \cdot v)$ set up in said second parameter altering unit, the measuring position $p_0$ at one measuring time of said two measuring times on said measuring point, the motion parallax $\tau$, which is set up in said third parameter altering unit, and the position $p_{inf}$ of the measuring point after an infinite time elapses in the moving continuous state, said point operating unit determines said point on a polar line associated with the measuring point, and determining a response intensity associated with the motion parallax $\tau$ on the measuring point, and of voting the response intensity associated with the motion parallax $\tau$ of a measuring point associated with said point on the polar line for a point associated with said point on the polar line in said curved line drawing space, said compound ratio transformation unit, said polar transformation unit and said point operating unit repeatedly perform operations by a plurality of number of times on a plurality of measuring points in said measurement space, while values of the parameters are altered in said first parameter altering unit, said second parameter altering unit and said third parameter altering unit, and said detection unit determines an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of operations of said first, second, third parameter altering units and said compound ratio transformation unit, said polar transformation unit and said point operating unit by a plurality of number of times offers a maximal value is determined, instead of determination of said cross point.

126. An image measurement apparatus according to claim 120, wherein said operating unit comprises:

a first parameter altering unit for altering the position $p_{inf}$ of the measuring point after an infinite time elapses in the moving continuous state through altering a value of a first parameter in which the moving direction v is set up in form of the first parameter;

a second parameter altering unit for altering a value of a second parameter in which the physical quantity indexing the shortest distance is set up in form of the second parameter;

a third parameter altering unit for altering a value of a third parameter in which the inner product $(n_s \cdot v)$ is set up in form of the third parameter;

a compound ratio transformation unit for determining the position $p_c$ of the measuring point at the superposing time, using said compound ratio $\{p_{inf}p_0p_1p_c\}$ or the operation equivalent to said compound ratio, in accordance with the position $p_{inf}$ of the measuring point after an infinite time elapses in the moving continuous state, which is set up in said first parameter altering unit, the physical quantity indexing the shortest distance, which is set up in the second parameter altering unit, the inner product $(n_s \cdot v)$ set up in the third parameter altering unit, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point;

a polar transformation unit for determining a polar line associated with the position $p_c$ of the measuring point at the superposing time through a polar transformation of the position $p_c$; and a point operating unit for determining a point on the polar line, said point being given with an angle r with respect to the moving direction v, $$r=\cos^{-1}(n_s \cdot v)$$

wherein said compound ratio transformation unit, said polar transformation unit and said point operating unit repeatedly perform operations by a plurality of number of times on a plurality of measuring points in said measurement space, while values of said first parameter to said third parameter are altered in said first parameter altering unit to said third parameter altering unit, so that a curved line, which couples a plurality of points determined through an execution of said point operating unit as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and said operating unit further comprises a detection unit for determining a true moving direction, and of determining an azimuth $n_s$ of a measuring plane including a plurality of measuring points associated with a plurality of curved lines intersecting at a cross point determined on a curved line drawing space associated with the true moving direction, and/or a physical quantity indexing a shortest distance from the observation point to the measuring plane at one measuring time of the two measuring times in such a manner that cross points of curved lines, which are formed when a plurality of curved lines determined through a repetition of execution of operations of said compound ratio transformation unit, said polar transformation and said point operating unit are drawn on an associated curved line drawing space of a plurality of curved line drawing spaces according to said first parameter, are determined on each curved line drawing space, and a curved line drawing space associated with the true moving direction relative to said observation point on said measuring point is selected in accordance with information as to a number of curved lines intersecting at the cross points.

127. An image measurement apparatus according to claim 126, wherein the measuring point appearing on the image has information as to intensity, said point operating unit determines said point, and of voting a value associated with intensity of a measuring point associated with said point for points in the curved line drawing space wherein a curved line including said point is drawn, said detection unit determines the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of operations of said compound ratio transformation unit, said polar transformation and said point operating unit offers a maximal value, instead of determining of the cross point, is determined on each curved line drawing space, and a curved line drawing space associated with the true moving direction is selected in accordance with information as to a maximal value at the maximal point.

128. An image measurement apparatus according to claim 126, wherein the measuring point appearing on the image has information as to intensity, said operating unit further comprises a fourth parameter altering unit of setting up a motion parallax τ, which is a positional difference between the two measuring positions $p_0$ and $p_1$ at the two measuring times on the measuring point, in the form of a fourth parameter, said compound ratio transformation unit determines the position $p_c$ of the measuring point at the superposing time using the position $p_{inf}$ of the measuring point after an infinite time elapses in the moving continuous state, which is set up in said first parameter altering unit, the physical quantity indexing the shortest distance, which is set up in the second parameter altering unit, the inner product $(n_s \cdot v)$ set up in the third parameter altering unit, the measuring position $p_0$ at one measuring time of said two measuring times on said measuring point, and a motion parallax τ, which is set up in said fourth parameter altering unit, said point operating unit determines said point associated with the measuring point, and determines a response intensity associated with the motion parallax τ on the measuring point, and votes the response intensity associated with the motion parallax τ of a measuring point associated with said point on the polar line for points in the curved line drawing space, said compound ratio transformation unit, said polar transformation and said point operating unit repeatedly perform operations by a plurality of number of times on a plurality of measuring points in said measurement space, while values of said parameters are altered in said first, second, third and fourth parameter altering units, and said detection unit determines the true moving direction, and determines an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of operations of said first, second, third, fourth parameter altering units, and said compound ratio transformation unit, said polar transformation and said point operating unit by a plurality of number of times offers a maximal value, instead of determining of the cross point, is determined on each curved line drawing space, and a curved line drawing space associated with the true moving direction is selected in accordance with information as to a maximal value at the maximal point.

129. An image measurement apparatus comprising an operating unit for determining an azimuth of a measuring plane and/or a physical quantity indexing a shortest distance from a predetermined observation point to the measuring plane at one measuring time of two measuring times, using a simple ratio$(p_{inf}p_0p_1)$, which is determined by three positions $p_{inf}$, $p_0$, $p_1$ of a measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

130. An image measurement apparatus according to claim 129, wherein said simple ratio $(p_{inf}p_0p_1)$ or the operation equivalent to said simple ratio, which are executed in said operating unit, include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$ at the two measuring times on the measuring point.

131. An image measurement apparatus according to claim 129, wherein in said operating unit, as the positions $p_{inf}$, $p_0$, $p_1$ of the measuring point, positions projected on a sphere are adopted, and as said physical quantity indexing the shortest distance, a normalization shortest distance $_nd_s$, which is expressed by the following equation, is adopted, $$_nd_s=d_s/\Delta x$$

where $d_s$ denotes a shortest distance between the observation point and the measuring plane at one measuring time of said two measuring times, and Δx denotes a moving distance of the measuring point, which is relative to the observation point, between said two measuring times, wherein said operating unit comprises:

a parameter altering unit for altering a parameter in which the normalization shortest distance d is set up in form of the parameter;

a parameter operating unit for determining a radius R defined by the following equation or the equivalent equation;

$$R=\cos^{-1}(_nd_s/(p_{inf}p_0p_1))$$

using the normalization shortest distance $_nd_s$ set up in said parameter altering unit and the simple ratio $(p_{inf}p_0p_1)$ or the operation equivalent to said simple ratio; and a small circle operating unit for determining a small circle of a radius R taking as a center a measuring position of the measuring point at one measuring time of said two measuring times, wherein said parameter operating unit and said small circle operating unit repeatedly perform oprations by a plurality of number of times on a plurality of measuring points in said measurement space, while the parameter is altered in said parameter operating unit, and said operating unit further comprises a detection unit for determining an azimuth $n_{s0}$ of a measuring plane including a plurality of measuring points associated with a plurality of small circles intersecting at a cross point and/or a normalization shortest distance $n_dd_{s0}$ on the measuring plane in such a manner that cross points of small circles, which are formed when a plurality of small circles determined through a repetition of execution of operations of said parameter operating unit, said small circle operating unit and said parameter altering unit by a plurality of number of times are drawn on a small circle drawing space, are determined.

132. An image measurement apparatus according to claim 131, wherein the measuring point appearing on the image has information as to intensity, said small circle operating unit determines said small circle, and votes a value associated with intensity of a measuring point associated with said small circle for each point on a locus of the small circle, which is formed when the small circle thus determined is drawn on a small circle drawing space, said detection unit determines an azimuth $n_{s0}$ of a measuring plane including a plurality of measuring points associated with a plurality of small circles joining a voting for a maximal point and/or a normalization shortest distance $_nd_{s0}$ on the measuring plane in such a manner that a maximal point wherein a value by a voting through a repetition of execution of operations of said parameter operating unit, said small circle operating unit and said parameter altering unit by a plurality of number of times offers a maximal value, instead of determining of the cross point, is determined.

133. An image measurement apparatus according to claim 131, wherein the measuring point appearing on the image has information as to intensity, said operating unit further comprises a second parameter altering unit for altering a second parameter in which a motion parallax τ, which is a positional difference between the two measuring positions $p_0$ and $p_1$ at the two measuring times on the measuring point, is set up in form of the second parameter, said parameter operating unit determines the radius R using the normalization shortest distance $_nd_s$ set up in said parameter operating unit, the position $p_{inf}$ of the measuring point after an infinite time elapses in the moving continuous state, the measuring position $p_0$ at one measuring time of said two measuring times on said measuring point, and the motion parallax τ, which is set up in said second parameter altering unit, said small circle operating unit determines said small circle associated with the measuring point, and determines a response intensity associated with the motion parallax τ on the measuring point, and votes the response intensity associated with the motion parallax r of a measuring point associated with said small circle for each point on a locus of the small circle, which is formed when the small circle thus determined is drawn on a small circle drawing space, said parameter operating unit, said small circle operating unit, said parameter altering unit and said second parameter altering unit repeatedly perform operations by a plurality of number of times on a plurality of measuring points in said measurement space, while values of the parameters are altered in said parameter altering unit and said second parameter altering unit, and said detection unit determines an azimuth $n_{s0}$ of a measuring plane including a plurality of measuring points associated with a plurality of small circles joining a voting for a maximal point and/or a normalization shortest distance $n_d d_{s0}$ on the measuring plane in such a manner that a maximal point wherein a value by a voting through a repetition of said parameter altering unit, said second parameter altering unit, said parameter operating unit, and said small circle operating unit by a plurality of number of times offers a maximal value is determined, instead of determination of said cross point.

134. An image measurement apparatus according to claim 129, wherein in said operating unit, as the positions $p_{inf}$, $p_0$, $p_1$ of the measuring point, positions projected on a sphere are adopted, and as said physical quantity indexing the shortest distance, a normalization shortest distance ${}_nd_s$ which is expressed by the following equation, is adopted, $$ {}_nd_s = d_s/\Delta x $$

where $d_s$ denotes a shortest distance between the observation point and the measuring plane at one measuring time of said two measuring times, and $\Delta x$ denotes a moving distance of the measuring point, which is relative to the observation point, between said two measuring times, wherein said operating unit comprises:

a first parameter altering unit for altering the position $p_{inf}$ of the measuring point after an infinite time elapses in the moving continuous state through altering a value of a first parameter in which the moving direction v is set up in form of the first parameter;

a second parameter altering unit for altering a value of a second parameter in which the normalization shortest distance ${}_nd_s$ is set up in form of the second parameter;

a parameter operating unit for determining a radius R defined by the following equation or the equivalent equation;

$$ R = \cos^{-1}({}_nd_s/(p_{inf}p_0p_1)) $$

using the position $p_{inf}$ of the measuring point after an infinite time elapses in the moving continuous state, which is set up in said first parameter altering unit, the normalization shortest distance ${}_nd_s$ set up in said second parameter altering unit and the simple ratio $(p_{inf}p_0p_1)$ or the operation equivalent to said simple ratio; and a small circle operating unit for determining a small circle of a radius R taking as a center a measuring position of the measuring point at one measuring time of said two measuring times, wherein said parameter operating unit and said small circle operating unit repeatedly perform operations by a plurality of number of times on a plurality of measuring points in said measurement space, while values of the first and second parameters are altered in said first parameter altering unit and said second parameter altering unit, and said operating unit further comprises a detection unit for determining a true moving direction, and for determining an azimuth $n_{s0}$ of a measuring plane including a plurality of measuring points associated with a plurality of small circles intersecting at a cross point determined on a small circle drawing space associated with the true moving direction, and/or a normalization shortest distance ${}_nd_s$ on the measuring plane in such a manner that cross points of small circles, which are formed when a plurality of small circles determined through a repetition of execution of operations of said parameter operating unit and said small circle operating unit are drawn on an associated small circle drawing space of a plurality of small circle drawing spaces according to said first parameter, are determined on each small circle drawing space, and a small circle drawing space associated with the true moving direction relative to said observation point on said measuring point is selected in accordance with information as to a number of small circles intersecting at the cross points.

135. An image measurement apparatus according to claim 134, wherein the measuring point appearing on the image has information as to intensity, said small circle operating unit determines said small circle, and votes a value associated with intensity of a measuring point associated with said small circle for each point on a locus of the small circle, which is formed when the small circle thus determined is drawn on a small circle drawing space, said detection unit determines a true moving direction, and determines an azimuth $n_{s0}$ of a measuring plane including a plurality of measuring points associated with a plurality of small circles joining a voting for a maximal point determined on a small circle drawing space associated with the true moving direction, and/or a normalization shortest distance ${}_nd_{s0}$ on the measuring plane in such a manner that a maximal point wherein a value by a voting through a repetition of execution of operation of said parameter operating unit and said small circle operating unit by a plurality of number of times offers a maximal value, instead of determining of the cross point, is determined on each small circle drawing space, and a small circle drawing space associated with the true moving direction is selected in accordance with information as to the maximal value on the maximal point.

136. An image measurement apparatus according to claim 134, wherein the measuring point appearing on the image has information as to intensity, said operating unit further comprises a third parameter altering unit for altering a value of a third parameter in which a motion parallax $\tau$, which is a positional difference between the two measuring positions $p_0$ and $p_1$ at the two measuring times on the measuring point, is set up in form of the third parameter, said parameter altering unit determines the radius R using the position $p_{inf}$ of the measuring point after an infinite time elapses in the moving continuous state, which is set up in said first parameter altering unit, the normalization shortest distance ${}_nd_s$ set up in the second parameter altering unit, the measuring position $p_0$ at one measuring time of said two measuring times on said measuring point, and the motion parallax $\tau$, which is set up in said third parameter altering unit, said small circle operating unit determines said small circle associated with the measuring point, and determines a response intensity associated with the motion parallax $\tau$ on the measuring point, and votes the response intensity associated with the motion parallax $\tau$ of a measuring point associated with said small circle for each point on a locus of the small circle, which is formed when the small circle thus determined is drawn on a small circle drawing space associated with the small circle, said parameter operating unit and said small circle operating unit repeatedly perform operations by a plurality of number of times on a plurality of measuring points in said measurement space, while values of the parameters are altered in said first parameter altering unit, said second parameter altering unit and said third parameter unit, and said detection unit determines a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance $_nd_{s0}$ on the measuring plane in such a manner that a maximal point wherein a value by a voting through a repetition of execution of operations of said first parameter altering unit, said second parameter altering unit, said third parameter altering unit, said parameter operating unit and said small circle operating unit by a plurality of number of times offers a maximal value, instead of determining of the cross point, is determined on each small circle drawing space, and a small circle drawing space associated with the true moving direction is selected in accordance with information as to the maximal value on the maximal point.

137. An image measurement apparatus comprising an operating unit for determining a physical quantity indexing a distance between a predetermined observation point and a measuring point at one measuring time of two measuring times, using a simple ratio ($p_{inf}p_0P1$), which is determined by three positions $p_{inf}$, $p_0$, $p_1$ of the measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

138. An image measurement apparatus according to claim 137, wherein said simple ratio ($p_{inf}p_0p_1$) or the operation equivalent to said simple ratio, which are executed in said operating unit, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

139. An image measurement apparatus according to claim 137, wherein in said operating unit, as said physical quantity indexing the distance, a normalized distance $_nd_0$, which is expressed by the following equation, is adopted, $$_nd_0=d_0/\Delta x$$

where $d_0$ denotes a distance between the observation point and the measuring point at one measuring time of the two measuring times, and $\Delta x$ denotes a moving distance of the measuring point between said two measuring times with respect to the observation point, and said normalized distance $_nd_0$ is determined in accordance with the following equation $$_nd_0=(p_{inf}p_0p_1)$$

or an equation equivalent to the above equation.

140. An image measurement apparatus comprising a parameter setting unit for setting up coordinates in a voting space in form of a parameter, said coordinates being defined by a physical quantity indexing a superposing time in which a measuring plane, including an arbitrary measuring point appearing on an image obtained through viewing a predetermined measurement space from a predetermined observation point inside the measurement space, is superposed on the observation point, and an azimuth $n_s$ of the measuring plane, in a moving continuous state wherein it is expected that a movement of the measuring point appearing on an image obtained through viewing the measurement space from the observation point inside the measurement space, said measuring point being relative with respect to the observation point, is continued in a direction identical to a moving direction relative with respect to the observation point between mutually different two measuring times on the measuring point and at a velocity identical to a moving velocity between said two measuring times;

a motion parallax operating unit for determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ of the measuring point after an infinite time elapses in the moving continuous state, and the coordinates in the voting space, which is set up in said parameter setting unit;

a response intensity operating unit for determining a response intensity associated with the motion parallax $\tau$ of the measuring point in accordance with two images obtained through viewing the measurement space from the observation point at the two measuring times; and a voting unit for voting the response intensity determined in said response intensity operating unit for the coordinates in the voting space, which is set up in said parameter setting unit, wherein said motion parallax operating unit, said response intensity operating unit, and said voting unit perform operations by a plurality of number of times on a plurality of measuring points in the measurement space, while a value of the parameter is altered in said parameter setting unit.

141. An image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up coordinates in a voting space according to the first parameter in form of a second parameter, said coordinates being defined by a physical quantity indexing a superposing time in which a measuring plane including the measuring point is superposed on the observation point, and an azimuth $n_s$ of the measuring plane;

a motion parallax operating unit for determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in said first parameter setting unit, and the coordinates in the voting space, which is set up in said second parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space according to the first parameter, said coordinates being set up in the second parameter setting unit, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

142. An image measurement apparatus comprising:

a parameter setting unit for setting up coordinates in a voting space in form of a parameter, said coordinates being defined by a physical quantity indexing a shortest distance between a predetermined observation point inside a predetermined measurement space for observation of the measurement space and a measuring plane, including an arbitrary measuring point appearing on an image obtained through viewing the measurement space from the observation point inside the measurement space, at one measuring time of mutually different two measuring times, and an azimuth $n_s$ of the measuring plane;

a motion parallax operating unit for determining a motion parallax τ, which is a positional difference between two measuring positions $p_0$ and $p_1$ at the two measuring times on the measuring point, in accordance with a measuring position $p_0$ at one measuring time of the two measuring times on the measuring point, a position $p_{inf}$ of the measuring point after an infinite time elapses in a moving continuous state wherein it is expected that a movement of the measuring point is continued in a direction identical to a moving direction relative with respect to the observation point between mutually different two measuring times and at a velocity identical to a moving velocity between said two measuring times, and the coordinates in the voting space, which is set up in said parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space, which is set up in said parameter setting unit;

wherein said motion parallax operating unit, said response intensity operating unit, and said voting unit perform operations by a plurality of number of times on a plurality of measuring points in the measurement space, while a value of the parameter is altered in said parameter setting unit.

143. An image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up coordinates in a voting space according to the first parameter in form of a second parameter, said coordinates being defined by a physical quantity indexing a shortest distance from the observation point to a measuring plane including the measuring point at one measuring time of the two measuring times, and an azimuth $n_s$ of the measuring plane;

a motion parallax operating unit for determining a motion parallax τ, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in said first parameter setting unit, and the coordinates in the voting space, which is set up in said second parameter setting unit;

a response intensity operating unit for determining a response intensity associated with the motion parallax τ of the measuring point in accordance with two images obtained through viewing the measurement space from the observation point at the two measuring times; and a voting unit for voting the response intensity determined in said response intensity operating unit for the coordinates in the voting space according to the first parameter, said coordinates being set up in said second parameter setting unit, wherein said motion parallax operating unit, said response intensity operating unit, and said voting unit perform operations by a plurality of number of times on a plurality of measuring points in the measurement space, while values of the parameters are altered in said first parameter setting unit and said second parameter setting unit.

144. An image measurement apparatus comprising:

a parameter setting unit for setting up in form of a parameter a motion parallax τ, which is a positional difference between two measuring positions $p_0$ and $p_1$ at mutually different two measuring times, of an arbitrary measuring point appearing on an image obtained through viewing a predetermined measurement space from a predetermined observation point inside the measurement space;

a coordinates operating unit for determining coordinates in a voting space, said coordinates being defined by a physical quantity indexing a superposing time in which a measuring plane, including the measuring point, is superposed on the observation point, and an azimuth $n_s$ of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, in accordance with a measuring position $p_0$ at one measuring time of said two measuring times on said measuring point, a position $p_{inf}$ of the measuring point after an infinite time elapses in the moving continuous state, and the motion parallax τ set up in said parameter setting unit;

a response intensity operating unit for determining a response intensity associated with the motion parallax τ of the measuring point, which is set up in said parameter setting unit; in accordance with two images obtained through viewing the measurement space from the observation point at the two measuring times; and a voting unit for voting the response intensity determined in said response intensity operating unit for the coordinates in the voting space, said coordinates being set up in said coordinates operating unit, wherein said coordinates operating unit, said response intensity operating unit, and said voting unit perform operations by a plurality of number of times on a plurality of measuring points in the measurement space, while a value of the parameter is altered in said parameter setting unit.

145. An image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up in form of a second parameter a motion parallax τ, which is a positional difference between two measuring positions $p_0$ and $p_1$ at the two measuring times on the measuring point;

a coordinates operating unit for determining coordinates in a voting space according to the first parameter, said coordinates being defined by a physical quantity indexing a superposing time in which a measuring plane, including the measuring point, is superposed on the observation point, and an azimuth $n_s$ of the measuring plane, in the moving continuous state, in accordance with a measuring position $p_0$ at one measuring time of said two measuring times on the measuring point, a position $p_{inf}$ set up in said first parameter setting unit, and the motion parallax τ set up in said second parameter setting unit;

a response intensity operating unit for determining a response intensity associated with the motion parallax τ of the measuring point, which is set up in said second parameter setting unit, in accordance with two images obtained through viewing the measurement space from the observation point at the two measuring times; and a voting unit for voting the response intensity determined in said response intensity operating unit for the coordinates in the voting space according to the first parameter, said coordinates being set up in the coordinates operating unit, wherein said coordinates operating unit, said response intensity operating unit, and said voting unit perform operations by a plurality of number of times on a plurality of measuring points in the measurement space, while values of the parameters are altered in the first parameter setting unit and said second parameter setting unit.

146. An image measurement apparatus comprising:

a parameter setting unit for setting up in form of a parameter a motion parallax τ, which is a positional difference between two measuring positions $p_0$ and $p_1$ at mutually different two measuring times on the measuring point, of an arbitrary measuring point appearing on an image obtained through viewing a predetermined measurement space from a predetermined observation point inside the measurement space;

a coordinates operating unit for determining coordinates in a voting space, said coordinates being defined by a physical quantity indexing a shortest distance from the observation point to a measuring plane including the measuring point at one measuring time of the two measuring times, and an azimuth $n_s$ of the measuring plane, in accordance with a measuring position $p_0$ at one measuring time of said two measuring times on said measuring point, a position $p_{inf}$ of the measuring point after an infinite time elapses in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, and the motion parallax τ set up in the first parameter setting unit;

a response intensity operating unit for determining a response intensity associated with the motion parallax τ of the measuring point, which is set up in said parameter setting unit, in accordance with two images obtained through viewing the measurement space from the observation point at the two measuring times; and a voting unit for voting the response intensity determined in said response intensity operating unit for the coordinates in the voting space, said coordinates being set up in said coordinates operating unit, wherein said coordinates parallax operating unit, said response intensity operating unit, and said voting unit perform operations by a plurality of number of times on a plurality of measuring points in the measurement space, while a value of the parameter is altered in said parameter setting unit.

147. An image measurement apparatus comprising:

a first parameter setting unit for setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second parameter setting unit for setting up in form of a second parameter a motion parallax τ, which is a positional difference between two measuring positions $p_0$ and $p_1$ at the two measuring times on the measuring point;

a coordinates operating unit for determining coordinates in a voting space according to the first parameter, said coordinates being defined by a physical quantity indexing a shortest distance from the observation point to a measuring plane including the measuring point at one measuring time of the two measuring times, and an azimuth $n_s$ of the measuring plane, in the moving continuous state, in accordance with a measuring position $p_0$ at one measuring time of said two measuring times on the measuring point, a position $p_{inf}$ set up in said first parameter setting unit, and the motion parallax τ set up in said second parameter setting unit;

a response intensity operating unit for determining a response intensity associated with the motion parallax τ of the measuring point, which is set up in said second parameter setting unit, in accordance with two images obtained through viewing the measurement space from the observation point at the two measuring times; and a voting unit for voting the response intensity determined in said response intensity operating unit for the coordinates in the voting space according to the first parameter, said coordinates being set up in said coordinates operating unit, wherein said coordinates operating unit, and said voting unit perform operations by a plurality of number of times on a plurality of measuring points in the measurement space, while values of the parameters are altered in the first parameter setting unit and said second parameter setting unit.

148. An image measurement apparatus comprising:

a response intensity operating unit for determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a voting unit for of voting the response intensity determined in said response intensity operating unit for coordinates associated with the measuring point and the motion parallax in a voting space, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein said response intensity operating unit and said voting unit perform operation by a plurality of number of times on a plurality of measuring points in the measurement space.

149. An image measurement apparatus according to claim 148, wherein said image measurement apparatus further comprises a detection unit for determining an azimuth of a measuring plane including a plurality of measuring points joining a voting for a maximal point and/or a physical quantity indexing a superposing time in which the measuring plane is superposed on the observation point in such a manner that a maximal point wherein a value by said voting in the voting space offers a maximal value is determined.

150. An image measurement apparatus comprising:

a parameter setting unit for setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a response intensity operating unit for determining a response intensity associated with a motion parallax, which is a positional difference between two measuring positions at the two measuring times on the measuring point, in accordance with two images obtained through viewing the measurement space from the observation point at the two measuring times; and a voting unit of voting the response intensity determined in said response intensity operating unit for coordinates associated with the measuring point and the motion parallax in a voting space according to the parameter set up in the parameter setting unit, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein said response intensity operating unit and said voting unit perform operations by a plurality of number of times on a plurality of measuring points in the measurement space, while a value of the parameter is altered in said parameter setting unit.

151. An image measurement apparatus according to claim 150, wherein said image measurement apparatus further comprises a detection unit of determining a true moving direction relative to the observation point on the measuring point, and of determining an azimuth of a measuring plane including a plurality of measuring points joining a voting for a maximal point determined on a voting space associated with the true moving direction, and/or a physical quantity indexing a superposing time in which the measuring plane is superposed on the observation point, in such a manner that a maximal point wherein a value by a voting is determined on each voting space, and the voting space associated with the true moving direction is selected in accordance with information as to the maximal value on the maximal point.

152. An image measurement apparatus comprising:

a response intensity operating unit for determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a voting unit for voting the response intensity determined in said response intensity operating unit for coordinates associated with the measuring point and the motion parallax in a voting space, said coordinates being defined by a physical quantity indexing a shortest distance from the observation point to a measuring plane, including the measuring point, at one measuring time of the two measuring times, and an azimuth of the measuring plane;

wherein said response intensity operating unit and said voting unit perform operations by a plurality of number of times on a plurality of measuring points in the measurement space.

153. An image measurement apparatus according to claim 152, wherein said measurement apparatus further comprises a detection unit for determining an azimuth of a measuring plane including a plurality of measuring points joining a voting for a maximal point and/or a physical quantity indexing a shortest distance from the observation point to the measuring plane at one measuring time of the two measuring times in such a manner that a maximal point wherein a value by said voting offers a maximal value is determined in the voting space.

154. An image measurement apparatus comprising a parameter setting unit for setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a response intensity operating unit for determining a response intensity associated with a motion parallax, which is a positional difference between two measuring positions at the two measuring times on the measuring point, in accordance with two images obtained through viewing the measurement space from the observation point at the two measuring times; and a voting unit for voting the response intensity determined in said response intensity operating unit for coordinates associated with the measuring point and the motion parallax in a voting space according to the parameter set up in said parameter setting unit, said coordinates being defined by a physical quantity indexing a shortest distance from the observation point to the measuring plane at one measuring time of the two measuring times, including the measuring point, and an azimuth of the measuring plane;

wherein said response intensity operating unit and said voting unit perform operations by a plurality of number of times on a plurality of measuring points in the measurement space, while a value of the parameter is altered in said parameter setting unit.

155. An image measurement apparatus according to claim 154, wherein said image measurement apparatus further comprises a detection unit for determining a true moving direction, and determining an azimuth of a measuring plane including a plurality of measuring points joining a voting for a maximal point determined on a voting space associated with the true moving direction, and/or a shortest distance from the observation point to the measuring plane at one measuring time of the two measuring times, in such a manner that a maximal point wherein a value by said voting offers a maximal value is determined on each voting space, and a voting space associated with the true moving direction relative to the observation point on the measuring point is selected in accordance with information as to the maximal value on the maximal point.

156. An image measurement apparatus comprising an operating unit for determining an azimuth of a measuring plane and/or a physical quantity indexing a distance between the measuring plane and one observation point of predetermined two observation points in an optical axis direction v coupling said two observation points, using a compound ratio $\{p_{axis}p_Rp_Lp_c\}$, which is determined by four positions $p_{axis}$, $p_R$, $p_L$, $p_c$, or an operation equivalent to said compound ratio, where $p_R$ and $p_L$ denote measuring positions through observation of said two observation points on an arbitrary measuring point appearing on an image obtained through viewing a predetermined measurement space from said two observation points inside the measurement space, respectively, $p_{axis}$ denotes a position of an infinite-point on a straight line extending in a direction identical to the optical axis direction v, including the measuring point, and $p_c$ denotes a position of an intersection point with said straight line on an observation plane extending in parallel to a measuring plane including the measuring point, including one observation point of said two observation points.

157. An image measurement apparatus according to claim 156, wherein said compound ratio $\{p_{axis}p_Rp_Lp_c\}$ or the operation equivalent to said compound ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

158. An image measurement apparatus according to claim 156, wherein in said operating unit, as said physical quantity indexing a distance between the measuring plane and one observation point of said two observation points in the optical axis direction, a normalized distance $_nd_c$, which is expressed by the following equation, is adopted, $$_nd_c=d_c/\Delta x_{LR}$$

where $d_c$ denotes a distance between the measuring plane and one observation point of said two observation points in the optical axis direction, and $\Delta x_{LR}$ denotes a distance between said two observation points, and said normalized distance $_nd_s$ is determined in accordance with the following equation $$_nd_c=\{p_{axis}p_Rp_Lp_c\}$$

or an equation equivalent to the above equation.

159. An image measurement apparatus according to claim 156, wherein said operating unit comprises:

a parameter altering unit for altering a value of a parameter in which the physical quantity indexing a distance between the measuring plane and one observation point of said two observation points in the optical axis direction is set up in form of a parameter;

a compound ratio transformation unit for determining the position $p_c$ of the intersection point on the observation plane, using said compound ratio $\{p_{axis}p_R p_L p_c\}$ or the operation equivalent to said compound ratio, in accordance with the physical quantity indexing a distance between the measuring plane and one observation point of said two observation points in the optical axis direction set up in said parameter altering unit, the two measuring positions $p_R$ and $p_L$ of the measuring point through observation on said measuring point from said two observation points or the measuring position $p_R$ through observation on said measuring point from one observation point of said two observation points and a binocular parallax 94 , which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point; and a polar transformation unit for determining a polar line associated with the measuring point through a polar transformation of the position $p_c$ of the intersection point on the observation plane, wherein said compound ratio transformation unit and said polar transformation unit repeatedly perform operations by a plurality of number of times on a plurality of measuring points in said measurement space, while a value of said parameter is altered in said parameter altering unit, and said operating unit further comprises a detection unit for determining an azimuth of a measuring plane including a plurality of measuring points associated with a plurality of polar lines intersecting at a cross point and/or a physical quantity indexing said physical quantity indexing a distance between the measuring plane and one observation point of said two observation points in the optical axis direction in such a manner that cross points of polar lines, which are formed when a plurality of polar lines determined through a repetition of execution of operations of said parameter altering unit, said compound ratio transformation unit and said polar transformation unit by a plurality of number of times are drawn on a polar line drawing space, are determined.

160. An image measurement apparatus according to claim 159, wherein the measuring point appearing on the image has information as to intensity, said polar transformation unit determines the polar line, and votes a value associated with intensity of a measuring point associated with the polar line for each point on a locus of the polar line, which is formed when the polar line thus determined is drawn on a polar line drawing space, and said detection unit determines an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of operations of said parameter altering unit, said compound ratio transformation unit and said polar transformation unit by a plurality of number of times offers a maximal value, instead of determining of the cross point, is determined.

161. An image measurement apparatus according to claim 159, wherein the measuring point appearing on the image has information as to intensity, said operating unit further comprises a second parameter altering unit for altering a value of a second parameter in which a binocular parallax σ, which is a positional difference between the two measuring positions $p_R$ and $p_L$ through observation on said measuring point from said two observation points, is set up in form of the second parameter, said compound ratio transformation unit determines the position $p_c$ of the intersection point on the observation plane using the physical quantity indexing a distance between the measuring plane and one observation point of said two observation points in the optical axis direction, which is set up in said parameter altering unit, the measuring position $p_R$ through observation on said measuring point from one observation point of said two observation points, the binocular parallax σ, which is set up in said fifth step, and the position $p_{axis}$ of said infinite-point of the measuring point, said polar transformation unit determines a polar line associated with the measuring point, and determines a response intensity associated with the binocular parallax σ on the measuring point, and votes the response intensity associated with the binocular parallax σ of a measuring point associated with the polar line for each point on a locus of the polar line, which is formed when the polar line thus determined is drawn on a polar line drawing space, said compound ratio transformation unit and said polar transformation unit repeatedly perform operations by a plurality of number of times on a plurality of measuring points in said measurement space, while values of said parameters are altered in said parameter altering unit and said second parameter altering unit, and said detection unit determines an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of operations of said first parameter altering unit, said second parameter altering unit, said compound ratio transformation unit and said polar transformation unit by a plurality of number of times offers a maximal value is determined, instead of determination of said cross point.

162. An image measurement apparatus according to claim 156 comprising:

a first parameter altering unit for altering a value of a first parameter in which the position $p_{axis}$ of said infinite-point of the measuring point through setting up the optical axis direction v is altered in form of the first parameter;

a second parameter altering unit for altering a value of a second parameter in which the physical quantity indexing a distance between the measuring plane and one observation point of said two observation points in the optical axis direction is set up in form of the second parameter;

a compound ratio transformation unit for determining the position $p_c$ of the intersection point on the observation plane, using said compound ratio $\{p_{axis}p_Rp_Lp_c\}$ or the operation equivalent to said compound ratio, in accordance with the position $p_{axis}$ set up in said first parameter altering unit, the physical quantity indexing a distance between the measuring plane and one observation point of said two observation points in the optical axis direction set up in the second step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a polar transformation unit for determining a polar line associated with the measuring point through a polar transformation of the position $p_c$ of the intersection point on the observation plane, wherein said compound ratio transformation unit and said polar transformation unit repeatedly perform operations by a plurality of number of times on a plurality of measuring points in said measurement space, while values of said first parameter and said second parameter are altered in said first parameter altering unit and said second parameter altering unit, and said operating unit further comprises a detection unit for determining a true optical axis direction, and of determining an azimuth of a measuring plane including a plurality of measuring points associated with a plurality of polar lines intersecting at a cross point determined on a polar line drawing space associated with the true optical axis direction, and/or said physical quantity indexing a distance between the measuring plane and one observation point of said two observation points in the optical axis direction in such a manner that cross points of polar lines, which are formed when a plurality of polar lines determined through a repetition of execution of operations of said first parameter altering unit, said second parameter altering unit, said compound ratio transformation unit and said polar transformation unit are drawn on an associated polar line drawing space of a plurality of polar line drawing spaces according to said first parameter, are determined on each polar line drawing space, and a polar line drawing space associated with the true optical axis direction relative to said observation point on said measuring point is selected in accordance with information as to a number of polar lines intersecting at the cross points.

163. An image measurement apparatus according to claim 162, wherein the measuring point appearing on the image has information as to intensity, said polar transformation unit determines the polar line, and votes a value associated with intensity of a measuring point associated with the polar line for each point on a locus of the polar line, which is formed when the polar line thus determined is drawn on the polar line drawing space, said detection unit determines the true optical axis direction, and determines an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of execution of operations of said first parameter altering unit, said second parameter altering unit, said compound ratio transformation unit and said polar transformation unit offers a maximal value, instead of determining of the cross point, is determined on each polar line drawing space, and a polar line drawing space associated with the true optical axis direction is selected in accordance with information as to a maximal value at the maximal point.

164. An image measurement apparatus according to claim 162, wherein the measuring point appearing on the image has information as to intensity, said operating unit further comprises a third parameter unit for setting up a binocular parallax σ, which is a positional difference between the two measuring positions $p_R$ and $p_L$ through observation on said measuring point from said two observation points, in the form of a third parameter, said compound ratio transformation unit determines the position $p_c$ of the intersection point on the observation plane using the position $p_{axis}$, which is set up in said first parameter altering unit, the physical quantity indexing a distance between the measuring plane and one observation point of said two observation points in the optical axis direction, which is set up in said second parameter altering unit, the measuring position $p_R$ through observation on said measuring point from one observation point of said two observation points, and the binocular parallax σ, which is set up in said third parameter altering unit, said polar transformation unit determines a polar line associated with the measuring point, and determines a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said compound ratio transformation unit and said polar transformation unit perform operations by a plurality of number of times on a plurality of measuring points in said measurement space, while values of said parameters are altered in said first, second and third parameter units, and said detection unit determines the true optical axis direction, and determines an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of operations of said first parameter altering unit, said second parameter altering unit, said third parameter altering unit, said compound ratio transformation unit and said polar transformation unit by a plurality of number of times offers a maximal value, instead of determining of the cross point, is determined on each polar line drawing space, and a polar line drawing space associated with the true optical axis direction is selected in accordance with information as to a maximal value at the maximal point.

165. An image measurement apparatus comprising an operating unit for determining an azimuth $n_s$ of a measuring plane and/or a physical quantity indexing a shortest distance between the measuring plane and one observation point of predetermined two observation points, using a compound ratio $\{p_{axis}p_Rp_Lp_c\}$, which is determined by four positions $p_{axis}$, $p_R$, $p_L$, $p_c$ of a measuring point, or an operation equivalent to said compound ratio, and an inner product $(n_s \cdot v)$ of the azimuth $n_s$ of the measuring plane and an optical axis direction v, where $p_R$ and $p_L$ denote measuring positions through observation of said two observation points on an arbitrary measuring point appearing on an image obtained through viewing a predetermined measurement space from predetermined two observation points inside the measurement space, respectively, v denotes the optical axis direction coupling said two observation points, $p_{axis}$ denotes a position of an infinite-point on a straight line extending in a direction identical to the optical axis direction v, including the measuring point, $p_c$ denotes a position of an intersection point with said straight line on an observation plane extending in parallel to a measuring plane including the measuring point, including one observation point of said two observation points, and $n_s$ denotes the azimuth of the measuring plane.

166. An image measurement apparatus according to claim 165, wherein said compound ratio $\{p_{axis}p_Rp_Lp_c\}$ or the operation equivalent to said compound ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

167. An image measurement apparatus according to claim 165, wherein as said physical quantity indexing the shortest distance, a normalization shortest distance $_nd_s$, which is expressed by the following equation, is adopted, $$_nd_s = d_s/\Delta x_{LR}$$

and said normalization shortest distance $_nd_s$ is determined in accordance with the following equation, $$_nd_s = {_nd_c}(n_s \cdot v)$$

using a normalized distance $_nd_c$, which is expressed by the following equation, and the inner product $(n_s \cdot v)$ $$_nd_c = d_c/\Delta x_{LR}$$

where $d_s$ denotes a shortest distance between the measuring plane and one observation point of said two observation points, $d_c$ denotes a distance between the measuring plane and one observation point of said two observation points in an optical axis direction, and $\Delta x_{LR}$ denotes a distance between said two observation points.

168. An image measurement apparatus according to claim 165, wherein said operating unit comprising:

a first parameter altering unit for setting up the physical quantity indexing the shortest distance in form of a first parameter;

a second parameter altering unit for setting up the inner product $(n_s \cdot v)$ in form of a second parameter;

a compound ratio transformation unit for determining position $p_c$ of the intersection point on the observation plane, using said compound ratio $\{p_{axis}p_Rp_Lp_c\}$ or the operation equivalent to said compound ratio, in accordance with the physical quantity indexing the shortest distance set up in the first parameter altering unit, the inner product $(n_s \cdot v)$ set up in the second parameter altering unit, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points, and the position $p_{axis}$ of said infinite-point of the measuring point;

a polar transformation unit for determining a polar line associated with the position $p_c$ of the intersection point on the observation plane through a polar transformation of the position $p_c$, and a point operating unit for determining a point on the polar line, said point being given with an angle r with respect to the optical axis direction v, $$r = \cos^{-1}(n_s \cdot v)$$

wherein said compound ratio transformation unit, said polar transformation unit and said point operating unit repeatedly perform operations by a plurality of number of times on a plurality of measuring points in said measurement space, while values of said first parameter and said second parameter are altered in said first parameter altering unit and said second parameter altering unit, so that a curved line, which couples a plurality of points determined through an execution of said point operating unit as to one measuring point by a plurality of number of times wherein a value of said first parameter is identical and a value of said second parameter is varied, is determined on the plurality of measuring points for each value of said first parameter, and said operating unit further comprises a detection unit for determining an azimuth $n_s$ of a measuring plane including a plurality of measuring points associated with a plurality of curved lines intersecting at a cross point and/or a physical quantity indexing a shortest distance between the measuring plane and one observation point of said two observation points in such a manner that cross points of curved lines, which are formed when a plurality of curved lines determined through a repetition of execution of operations of said compound ratio transformation unit, said polar transformation unit and said point operating unit by a plurality of number of times are drawn on a curved line drawing space, are determined.

169. An image measurement apparatus according to claim 168, wherein the measuring point appearing on the image has information as to intensity, said point operating unit determines said point, and votes a value associated with intensity of a measuring point associated with said point for a point associated with said point in said curved line drawing space, said detection unit determines an azimuth $n_s$ of a measuring plane including a plurality of measuring points associated with a plurality of curved lines joining a voting for a maximal point and/or a physical quantity indexing a shortest distance between the measuring plane and one observation point of predetermined two observation points in such a manner that a maximal point wherein a value by a voting through a repetition of execution of operations of said compound ratio transformation unit, said polar transformation unit and said point operating unit by a plurality of number of times offers a maximal value, instead of determining of the cross point, is determined.

170. An image measurement apparatus according to claim 168, wherein the measuring point appearing on the image has information as to intensity, said operating unit further comprises a third parameter altering unit for altering a value of a third parameter in which a binocular parallax σ, which is a positional difference between the two measuring positions $p_R$ and $p_L$ through observation on said measuring point from said two observation points, is set up in the form of the third parameter, said compound ratio transformation unit determines the position $p_c$ of the intersection point on the observation plane using the physical quantity indexing the shortest distance set up in the first parameter altering unit, the inner product $(n_s \cdot v)$ set up in the second parameter altering unit step, the measuring position $p_R$ through observation on said measuring point from one observation point of said two observation points, the binocular parallax σ, which is set up in said third parameter altering unit, and the position $p_{axis}$ of said infinite-point of the measuring point, said point operating unit determines said point on a polar line associated with the measuring point, and determining a response intensity associated with the binocular parallax σ on the measuring point, and of voting the response intensity associated with the binocular parallax σ of a measuring point associated with said point on the polar line for a point associated with said point on the polar line in said curved line drawing space, said compound ratio transformation unit, said polar transformation unit and said point operating unit repeatedly perform operations by a plurality of number of times on a plurality of measuring points in said measurement space, while values of the parameters are altered in said first step, second and third parameter altering unit, and said detection unit determines an azimuth $n_s$ of a measuring plane including a plurality of measuring points associated with a plurality of curved lines joining a voting for a maximal point and/or a physical quantity indexing a shortest distance between the measuring plane and one observation point of said two observation points in such a manner that a maximal point wherein a value by a voting through a repetition of execution of operations of said first, second and third parameter altering units, said compound ratio transformation unit, said polar transformation unit and said point operating unit by a plurality of number of times offers a maximal value is determined, instead of determination of said cross point.

171. An image measurement apparatus according to claim 165, wherein said operating unit comprising:

a first parameter altering unit for altering the position $p_{axis}$ of said infinite-point of the measuring point through altering a value of a first parameter in which the optical axis direction v is set up in form of the first parameter;

a second parameter altering unit for altering a value of a second parameter in which the physical quantity indexing the shortest distance is set up in form of the second parameter;

a third parameter altering unit for altering a value of a third parameter in which the inner product $(n_s \cdot v)$ in form of the third parameter;

a compound ratio transformation unit for determining the position $p_c$ of the intersection point on the observation plane, using said compound ratio $\{p_{axis}p_Rp_Lp_c\}$ or the operation equivalent to said compound ratio, in accordance with the position $p_{axis}$ of said infinite-point of the measuring point, which is set up in said first parameter altering unit, the physical quantity indexing the shortest distance, which is set up in said second parameter altering unit, the inner product $(n_s \cdot v)$ set up in said third parameter altering unit, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a polar transformation unit for determining a polar line associated with the position $p_c$ of the intersection point on the observation plane through a polar transformation of the position $p_c$, and a point transformation unit for determining a point on the polar line, said point being given with an angle r with respect to the optical axis direction v, $$r = \cos^{-1}(n_s \cdot v)$$

wherein said first, second and third parameter altering units, said compound ratio transformation unit, said polar transformation unit and said point operating unit repeatedly perform operations by a plurality of number of times on a plurality of measuring points in said measurement space, while values of said first parameter to said third parameter are altered in said first parameter altering unit, and said second parameter altering unit and said third parameter altering unit, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and said operating unit further comprises a detection unit for determining a true optical axis direction, and for determining an azimuth $n_s$ of a measuring plane including a plurality of measuring points associated with a plurality of curved lines intersecting at a cross point determined on a curved line drawing space associated with the true optical axis direction, and/or a physical quantity indexing a shortest distance between the measuring plane and one observation point of predetermined two observation points in such a manner that cross points of curved lines, which are formed when a plurality of curved lines determined through a repetition of execution of operations of said parameter altering unit, said compound ratio transformation unit and said polar transformation unit are drawn on an associated curved line drawing space of a plurality of curved line drawing spaces according to said first parameter, are determined on each curved line drawing space, and a curved line drawing space associated with the true optical axis direction relative to said observation point on said measuring point is selected in accordance with information as to a number of curved lines intersecting at the cross points.

172. An image measurement apparatus according to claim 171, wherein the measuring point appearing on the image has information as to intensity, said point operating unit determines said point, and of voting a value associated with intensity of a measuring point associated with said point for points in the curved line drawing space wherein a curved line including said point is drawn, said detection unit determines the true optical axis direction, and determines an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of operations of said parameter altering unit, said compound ratio transformation unit and said polar transformation unit offers a maximal value, instead of determining of the cross point, is determined on each curved line drawing space, and a curved line drawing space associated with the true optical axis direction is selected in accordance with information as to a maximal value at the maximal point.

173. An image measurement apparatus according to claim 171, wherein the measuring point appearing on the image has information as to intensity, said operating unit further comprises a fourth parameter altering unit for altering a value of a fourth parameter in which a binocular parallax σ, which is a positional difference between the two measuring positions $p_R$ and $p_L$ through observation on said measuring point from said two observation points, is set up in form of the fourth parameter, said compound ratio transformation unit determines the position $p_c$ of the intersection point on the observation plane using the position $p_{axis}$ of said infinite-point of the measuring point, which is set up in said first parameter altering unit, the physical quantity indexing the shortest distance, which is set up in the second parameter altering unit, the inner product $(n_s \cdot v)$ set up in the third parameter altering unit, the measuring position $p_R$ through observation on said measuring point from one observation point of said two observation points, and a binocular parallax σ, which is set up in said fourth parameter altering unit, said point operating unit determines said point associated with the measuring point, and determines a response intensity associated with the binocular parallax σ on the measuring point, and votes the response intensity associated with the binocular parallax σ of a measuring point associated with said point on the polar line for points in the curved line drawing space, said compound ratio transformation unit, said polar transformation unit and point operating unit repeatedly perform operations by a plurality of number of times on a plurality of measuring points in said measurement space, while values of said parameters are altered in said first, second, third and fourth parameter altering units, and said detection unit determines the true optical axis direction, and determines an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of operations of said first, second and third parameter altering units, said compound ratio transformation unit, said polar transformation unit and said point operating unit by a plurality of number of times offers a maximal value, instead of determining of the cross point, is determined on each curved line drawing space, and a curved line drawing space associated with the true optical axis direction is selected in accordance with information as to a maximal value at the maximal point.

174. An image measurement apparatus comprising an operating unit for determining an azimuth of a measuring plane and/or a physical quantity indexing a shortest distance between the measuring plane and one observation point of predetermined two observation points, using a simple ratio $(p_{axis} p_R p_L)$, which is determined by three positions $p_{axis}$, $p_R$, $p_L$ of a measuring point, or an operation equivalent to said simple ratio, where $p_R$ and $p_L$ denote measuring positions through observation of said two observation points on an arbitrary measuring point appearing on an image obtained through viewing a predetermined measurement space from a predetermined observation point inside the measurement space, respectively, v denotes an optical axis direction coupling said two observation points, and $p_{axis}$ denotes a position of an infinite-point on a straight line extending in a direction identical to the optical axis direction v, including the measuring point.

175. An image measurement apparatus according to claim 174, wherein said simple ratio $(p_{axis} p_R p_L)$ or the operation equivalent to said simple ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

176. An image measurement apparatus according to claim 174, wherein in said operating unit, as the positions $p_{axis}$, $p_R$, $p_L$ of the measuring point, positions projected on a sphere are adopted, and as said physical quantity indexing the shortest distance, a normalization shortest distance ${}_nd_s$, which is expressed by the following equation, is adopted, $${}_nd_s=d_s/\Delta x_{LR}$$

where $d_s$ denotes a shortest distance between the measuring plane and one observation point of said two observation points, and $\Delta x_{LR}$ denotes a distance between said two observation points, wherein said operating unit comprises:

a parameter altering unit for altering a parameter in which the normalization shortest distance ${}_nd_s$ is set up in form of the parameter;

a parameter operating unit for determining a radius R defined by the following equation or the equivalent equation;

$$R=\cos^{-1}({}_nd_s/(p_{axis}p_Rp_L))$$

using the normalization shortest distance ${}_nd_s$ set up in said parameter altering unit and the simple ratio $(p_{axis}p_Rp_L)$ or the operation equivalent to said simple ratio; and a small circle operating unit for determining a small circle of a radius R taking as a center a measuring position through observation on said measuring point from one observation point of said two observation points, wherein said parameter operating unit and said small circle operating unit repeatedly perform operations by a plurality of number of times on a plurality of measuring points in said measurement space, while the parameter is altered in said parameter altering unit, and said operating unit further comprises a detection unit for determining an azimuth $n_{s0}$ of a measuring plane including a plurality of measuring points associated with a plurality of small circles intersecting at a cross point and/or a normalization shortest distance ${}_nd_{s0}$ on the measuring plane in such a manner that cross points of small circles, which are formed when a plurality of small circles determined through a repetition of said parameter altering unit, said parameter operating unit and said small circle operating unit by a plurality of number of times are drawn on a small circle drawing space, are determined.

177. An image measurement apparatus according to claim 176, wherein the measuring point appearing on the image has information as to intensity, said small circle operating unit determines said small circle, and of voting a value associated with intensity of a measuring point associated with said small circle for each point on a locus of the small circle, which is formed when the small circle thus determined is drawn on a small circle drawing space, said detection unit determines an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of execution of operations of said parameter operating unit and said small circle operating unit by a plurality of number of times offers a maximal value, instead of determining of the cross point, is determined.

178. An image measurement apparatus according to claim 176, wherein the measuring point appearing on the image has information as to intensity, said operating unit further comprises a fifth step of setting up a binocular parallax σ, which is a positional difference between the two measuring positions $p_R$ and $p_L$ through observation on said measuring point from said two observation points, in form of a second parameter, said parameter operating unit determines the radius R using the normalization shortest distance ${}_nd_s$ set up in said parameter altering unit, the position $p_{axis}$ of said infinite-point of the measuring point, the measuring position $p_R$ through observation on said measuring point from one observation point of said two observation points, and the binocular parallax σ, which is set up in said second parameter altering unit, said small circle operating unit determines said small circle associated with the measuring point, and determines a response intensity associated with the binocular parallax σ on the measuring point, and votes the response intensity associated with the binocular parallax σ of a measuring point associated with said small circle for each point on a locus of the small circle, which is formed when the small circle thus determined is drawn on a small circle drawing space, said parameter altering unit, said parameter operating unit, said small circle operating unit, said second parameter altering unit repeatedly perform operations by a plurality of number of times on a plurality of measuring points in said measurement space, while values of the parameters are altered in said parameter altering unit and said second parameter altering unit, and said detection unit determines an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of execution of operations of said parameter altering unit, said second parameter altering unit, said parameter operating unit and said small circle operating unit by a plurality of number of times offers a maximal value is determined, instead of determination of said cross point.

179. An image measurement apparatus according to claim 174, wherein in said operating unit, as the positions $p_{axis}$, $p_R$, $p_L$ of the measuring point, positions projected on a sphere are adopted, and as said physical quantity indexing the shortest distance, a normalization shortest distance ${}_nd_s$, which is expressed by the following equation, is adopted, $${}_nd_s=d_s/\Delta x_{LR}$$

where $d_s$ denotes a shortest distance between the measuring plane and one observation point of said two observation points, and $\Delta x_{LR}$ denotes a distance between said two observation points, wherein said operating unit comprises:

a first parameter altering unit for altering the position $p_{axis}$ of said infinite-point of the measuring point through altering a value of a first parameter in which the optical axis direction v is set up in form of the first parameter;

a second parameter altering unit for altering a value of a second parameter in which the normalization shortest distance ${}_nd_s$ is set up in form of the second parameter;

a parameter operating unit for determining a radius R defined by the following equation or the equivalent equation;

$$R=\cos^{-1}({}_n d_s/(p_{axis} p_R p_L))$$

using the position $p_{axis}$ of said infinite-point of the measuring point, which is set up in said parameter altering unit, the normalization shortest distance ${}_n d_s$ set up in said second parameter altering unit and the simple ratio ($p_{axis} p_R p_L$) or the operation equivalent to said simple ratio; and a small circle operating unit for determining a small circle of a radius R taking as a center a measuring position through observation on said measuring point from one observation point of said two observation points , wherein said parameter operating unit and said small circle operating unit repeatedly perform operations by a plurality of number of times on a plurality of measuring points in said measurement space, while values of the first and second parameters are altered in said first parameter altering unit and said second parameter altering unit, and said operating unit further comprises a detection unit for determining a true optical axis direction, and for determining an azimuth $n_{s0}$ of a measuring plane including a plurality of measuring points associated with a plurality of small circles intersecting at a cross point determined on a small circle drawing space associated with the true optical axis direction, and/or a a normalization shortest distance ${}_n d_{s0}$ on the measuring plane in such a manner that cross points of small circles, which are formed when a plurality of small circles determined through a repetition of execution of operations of said first parameter altering unit, said second parameter altering unit, said parameter operating unit and said small circle operating unit are drawn on an associated small circle drawing space of a plurality of small circle drawing spaces according to said first parameter, are determined on each small circle drawing space, and a small circle drawing space associated with the true optical axis direction relative to said observation point on said measuring point is selected in accordance with information as to a number of small circles intersecting at the cross points.

180. An image measurement apparatus according to claim 179, wherein the measuring point appearing on the image has information as to intensity, said small circle operating unit determines said small circle, and votes a value associated with intensity of a measuring point associated with said small circle for each point on a locus of the small circle, which is formed when the small circle thus determined is drawn on a small circle drawing space, said detection unit determines a true optical axis direction, and determines an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_n d_{s0}$ on the measuring plane in such a manner that a maximal point wherein a value by a voting through a repetition of execution of operations of said parameter operating unit and said small circle operating unit by a plurality of number of times offers a maximal value, instead of determining of the cross point, is determined on each small circle drawing space, and a small circle drawing space associated with the true optical axis direction is selected in accordance with information as to the maximal value on the maximal point.

181. An image measurement apparatus according to claim 179, wherein the measuring point appearing on the image has information as to intensity, said operating unit further comprises a third parameter altering unit for altering a value of a third parameter in which a binocular parallax σ, which is a positional difference between the two measuring positions $p_R$ and $p_L$ through observation on said measuring point from said two observation points, is set up in form of the third parameter, said parameter operating unit determines the radius R using the position $p_{axis}$ of said infinite-point of the measuring point, which is set up in said first parameter altering unit, the normalization shortest distance ${}_n d_s$ set up in the second parameter altering unit step, the measuring position $p_R$ through observation on said measuring point from one observation point of said two observation points, and the binocular parallax σ, which is set up in said parameter altering unit, said small circle operating unit determines said small circle associated with the measuring point, and determines a response intensity associated with the binocular parallax σ on the measuring point, and votes the response intensity associated with the binocular parallax σ of a measuring point associated with said small circle for each point on a locus of the small circle, which is formed when the small circle thus determined is drawn on a small circle drawing space associated with the small circle, said parameter operating unit and said small circle operating unit repeatedly perform operations by a plurality of number of times on a plurality of measuring points in said measurement space, while values of the parameters are altered in said first parameter operating unit, said second parameter operating unit and said third parameter operating unit, and said detection unit determines a true optical axis direction, and determines an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_n d_{s0}$ on the measuring plane in such a manner that a maximal point wherein a value by a voting through a repetition of execution of operations of said first parameter altering unit, said second parameter altering unit, said third parameter altering unit, said parameter operating unit and said small circle operating unit by a plurality of number of times offers a maximal value, instead of determining of the cross point, is determined on each small circle drawing space, and a small circle drawing space associated with the true optical axis direction is selected in accordance with information as to the maximal value on the maximal point.

182. An image measurement apparatus comprising an operating unit for determining a physical quantity indexing a distance between an arbitrary measuring point appearing on an image obtained through viewing a predetermined measurement space from a predetermined observation point inside the measurement space and one observation point of predetermined two observation points, using a simple ratio ($p_{axis}p_Rp_L$), which is determined by three positions $p_{axis}$, $p_R$, $p_L$ of the measuring point, or an operation equivalent to said simple ratio, where $p_R$ and $p_L$ denote measuring positions through observation of said two observation points on the measuring point, respectively, and $p_{axis}$ denotes a position of an infinite-point on a straight line extending in a direction identical to an optical axis direction v coupling said two observation points, including the measuring point.

183. An image measurement apparatus according to claim 182, wherein said simple ratio ($p_{axis}p_L$) or the operation equivalent to said simple ratio, which are executed in said operating unit, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

184. An image measurement apparatus according to claim 182, wherein as said physical quantity indexing the distance, a normalized distance ${}_nd_0$, which is expressed by the following equation, is adopted, $${}_nd_0 = d_0/\Delta x_{LR}$$

where $d_0$ denotes a distance between the measuring point and one observation point of said two observation points, and $\Delta x_{LR}$ denotes a distance between said two observation points, and said normalized distance ${}_nd_0$ is determined in accordance with the following equation $${}_nd_0 = (p_{axis}p_Rp_L)$$

or an equation equivalent to the above equation.

185. An image measurement apparatus comprising a parameter setting unit for setting up coordinates in a voting space in form of a parameter, said coordinates being defined by a physical quantity indexing a distance between a measuring plane, including an arbitrary measuring point appearing on an image obtained through viewing a predetermined measuring space from predetermined two observation points in the measuring space and one observation point of said two observation points in an optical axis direction coupling said two observation points, and an azimuth of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ of an infinite-point on a straight line extending in a direction identical to the optical axis direction, including the measuring point, and the coordinates in the voting space, which is set up in said parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space, which is set up in said parameter setting unit;

wherein said binocular parallax operating unit, said response intensity operating unit, and said voting unit perform operations by a plurality of number of times on a plurality of measuring points in the measurement space, while a value of the parameter is altered in said parameter setting unit.

186. An image measurement apparatus comprising:

a first parameter setting unit for setting up in form of a first parameter an optical axis direction v coupling predetermined two observation points through viewing a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up coordinates in a voting space according to the first parameter in form of a second parameter, said coordinates being defined by a physical quantity indexing a distance between a measuring plane, including the measuring point and one observation point of said two observation points in an optical axis direction, and an azimuth $n_s$ of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first parameter setting unit, and the coordinates in the voting space, which is set up in said second parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space according to the first parameter, said coordinates being set up in the second step, wherein said binocular parallax operating unit, said response intensity operating unit and said voting unit perform operations by a plurality of number of times on a plurality of measuring points in the measurement space, while values of the parameters are altered in the first parameter setting unit and said second parameter setting unit.

187. An image measurement apparatus comprising:

a parameter setting unit for setting up coordinates in a voting space in form of a parameter, said coordinates being defined by a physical quantity indexing a shortest distance between one observation point of predetermined two observation points inside a predetermined measurement space for observation of the measurement space and a measuring plane, including an arbitrary measuring point appearing on an image obtained through viewing the measurement space from the two observation points, and an azimuth $n_s$ of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of the two observation points, a position $p_{axis}$ of an infinite-point on a straight line extending in a direction identical to the optical axis direction, including the measuring point, and the coordinates in the voting space, which is set up in said parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space, which is set up in said parameter setting unit;

wherein said motion parallax operating unit, said response intensity operating unit, and said voting unit perform operations by a plurality of number of times on a plurality of measuring points in the measurement space, while a value of the parameter is altered in said parameter setting unit.

188. An image measurement apparatus comprising:

a first parameter setting unit for setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up coordinates in a voting space according to the first parameter in form of a second parameter, said coordinates being defined by a physical quantity indexing a shortest distance from one observation point of the two observation points to a measuring plane including the measuring point, and an azimuth $n_s$ of the measuring plane;

a binocular parallax operating unit for determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first parameter setting unit, and the coordinates in the voting space, which is set up in said second parameter setting unit;

a response intensity operating unit for determining a response intensity associated with the binocular parallax σ of the measuring point in accordance with two images obtained through viewing the measurement space from said two observation points; and a voting unit for voting the response intensity determined in said response intensity operating unit for the coordinates in the voting space according to the first parameter, said coordinates being set up in the second step, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

189. An image measurement apparatus comprising:

a parameter setting unit for setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a coordinates operating unit for determining coordinates in a voting space, said coordinates being defined by a physical quantity indexing a distance between a measuring plane, including the measuring point and one observation point of said two observation points in an optical axis direction, and an azimuth $n_s$ of the measuring plane;

a response intensity operating unit for determining a response intensity associated with the binocular parallax σ of the measuring point, which is set up in said parameter setting unit; in accordance with two images obtained through viewing the measurement space from said two observation points; and a voting unit for voting the response intensity determined in said response intensity operating unit for the coordinates in the voting space, said coordinates being set up in the second step, wherein said motion parallax operating unit, said response intensity operating unit, and said voting unit perform operations by a plurality of number of times on a plurality of measuring points in the measurement space, while a value of the parameter is altered in said parameter setting unit.

190. An image measurement apparatus comprising:

a first parameter setting unit for setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up in form of a second parameter a binocular parallax σ, which is a positional difference between two measuring positions $p_R$ and $p_L$ through observation on said measuring point from said two observation points;

a coordinates operating unit for determining coordinates in a voting space according to the first parameter, said coordinates being defined by a physical quantity indexing a distance between a measuring plane, including the measuring point and one observation point of said two observation points in an optical axis direction, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a response intensity operating unit for determining a response intensity associated with the binocular parallax σ of the measuring point, which is set up in the second step, in accordance with two images obtained through viewing the measurement space from said two observation points; and a voting unit for voting the response intensity determined in said response intensity operating unit for the coordinates in the voting space according to the first parameter, said coordinates being set up in the third step, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

191. An image measurement apparatus comprising:

a parameter setting unit for setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a coordinates operating unit for determining coordinates in a voting space, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of said two observation points, a position $p_{axis}$ of an infinite-point on a straight line extending in a direction identical to the optical axis direction, including the measuring point, and the binocular parallax σ set up in the first step;

a response intensity operating unit for determining a response intensity associated with the binocular parallax σ of the measuring point, which is set up in said parameter setting unit, in accordance with two images obtained through viewing the measurement space from said two observation points; and a voting unit for voting the response intensity determined in said response intensity operating unit for the coordinates in the voting space, said coordinates being set up in the second step, wherein said motion parallax operating unit, said response intensity operating unit, and said voting unit perform operations by a plurality of number of times on a plurality of measuring points in the measurement space, while a value of the parameter is altered in said parameter setting unit.

192. An image measurement apparatus comprising:

a first parameter setting unit for setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second parameter setting unit for setting up in form of a second parameter a binocular parallax σ, which is a positional difference between two measuring positions $p_R$ and $p_L$ through observation on said measuring point from said two observation points;

a coordinates operating unit for determining coordinates in a voting space according to the first parameter, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of the two observation points, a position $P_{axis}$ set up in the first parameter setting unit, and the binocular parallax σ set up in the second parameter setting unit;

a response intensity operating unit for determining a response intensity associated with the binocular parallax σ of the measuring point, which is set up in the second parameter setting unit, in accordance with two images obtained through viewing the measurement space from said two observation points; and a voting unit for voting the response intensity determined in said response intensity operating unit for the coordinates in the voting space according to the first parameter, said coordinates being set up in said response intensity operating unit, wherein said motion parallax operating unit, said response intensity operating unit, and said voting unit perform operations by a plurality of number of times on a plurality of measuring points in the measurement space, while values of the parameters are altered in the first parameter setting unit and said second parameter setting unit.

193. An image measurement apparatus comprising:

a response intensity operating unit for determining a response intensity associated with a binocular parallax, which is a positional difference between two measuring positions through observation of predetermine two observation points on an arbitrary measuring point in a predetermined measurement space, in accordance with two images obtained through viewing the measurement space from said two observation points; and a voting unit for voting the response intensity determined in said response intensity operating unit for coordinates associated with the measuring point and the binocular parallax in a voting space, said coordinates being defined by a physical quantity indexing a distance between a measuring plane, including the measuring point, and one observation point of said two observation points in an optical axis direction coupling said two observation points, and an azimuth of the measuring plane;

wherein said response intensity operating unit said voting unit perform operations by a plurality of number of times on a plurality of measuring points in the measurement space.

194. An image measurement apparatus according to claim 193, wherein said image measurement apparatus further comprises a detecting unit for determining an azimuth of a measuring plane including a plurality of measuring points joining a voting for a maximal point and/or a physical quantity indexing a distance between the measuring plane and one observation point of said two observation points in the optical axis direction in such a manner that a maximal point wherein a value by said voting in the voting space offers a maximal value is determined.

195. An image measurement apparatus comprising:

a parameter setting unit for setting up in form of a parameter an optical axis direction coupling predetermined two observation points for observation of a predetermined measurement space;

a response intensity operating unit for determining a response intensity associated with a binocular parallax, which is a positional difference between two measuring positions through observation on an arbitrary measuring point in the measurement space from said two observation points, in accordance with two images obtained through viewing the measurement space from said two observation points; and a voting unit for voting the response intensity determined in said response intensity operating unit for coordinates associated with the measuring point and the binocular parallax in a voting space according to the parameter set up in the first parameter setting unit, said coordinates being defined by a physical quantity indexing a distance between a measuring plane, including the measuring point and one observation point of said two observation points in the optical axis direction, and an azimuth of the measuring plane;

wherein said response intensity operating unit and said voting unit perform operations by a plurality of number of times on a plurality of measuring points in the measurement space, while a value of the parameter is altered in said parameter setting unit.

196. An image measurement apparatus according to claim 195, wherein said image measurement apparatus further comprises a detection unit for determining a true optical axis direction, and for determining an azimuth of a measuring plane including a plurality of measuring points joining a voting for a maximal point determined on a voting space associated with the true optical axis direction, and/or a physical quantity indexing a physical quantity indexing a distance between the measuring plane and one observation point of said two observation points in the true optical axis direction, in such a manner that a maximal point wherein a value by a voting is determined on each voting space, and the voting space associated with the true optical axis direction is selected in accordance with information as to the maximal value on the maximal point.

197. An image measurement apparatus comprising:

a response intensity operating unit for determining a response intensity associated with a binocular parallax σ, which is a positional difference between two measuring positions through observation on an arbitrary measuring point in a measurement space from predetermined two observation points, in accordance with two images obtained through viewing the measurement space from said two observation points; and a voting unit for voting the response intensity determined in said response intensity operating unit for coordinates associated with the measuring point and the binocular parallax σ in a voting space, said coordinates being defined by a physical quantity indexing a shortest distance between one observation point of the two observation points and a measuring plane, including the measuring point, and an azimuth of the measuring plane;

wherein said response intensity operating unit and said voting unit perform operations by a plurality of number of times on a plurality of measuring points in the measurement space.

198. An image measurement apparatus according to claim 197, wherein said image measurement apparatus further comprises a detection unit for determining an azimuth $_{n}d_{s}$ of a measuring plane including a plurality of measuring points joining a voting for a maximal point and/or a physical quantity indexing a shortest distance between one observation point of said two observation points and the measuring plane in such a manner that a maximal point wherein a value by said voting offers a maximal value is determined in the voting space.

199. An image measurement apparatus comprising:

a parameter setting unit for setting up in form of a parameter an optical axis direction coupling predetermined two observation points for observation of a predetermined measurement space;

a response intensity operating unit for determining a response intensity associated with a binocular parallax, which is a positional difference between two measuring positions through observation on said measuring point from said two observation points, in accordance with two images obtained through viewing the measurement space from said two observation points; and a voting unit for voting the response intensity determined in the second step for coordinates associated with the measuring point and the binocular parallax in a voting space according to the parameter set up in said parameter setting unit, said coordinates being defined by a physical quantity indexing a shortest distance between one observation point of said two observation points and a measuring plane including the measuring point, and an azimuth of the measuring plane;

wherein said response intensity operating unit and said voting unit perform operations by a plurality of number of times on a plurality of measuring points in the measurement space, while a value of the parameter is altered in said parameter setting unit.

200. An image measurement apparatus according to claim 199, wherein said image measurement apparatus further comprises a detection unit for determining a true optical axis direction, and for determining an azimuth of a measuring plane including a plurality of measuring points joining a voting for a maximal point determined on a voting space associated with the true optical axis direction, and/or a shortest distance between one observation point of said two observation points and the measuring plane, in such a manner that a maximal point wherein a value by said voting offers a maximal value is determined on each voting space, and a voting space associated with the true optical axis direction relative to the observation point on the measuring point is selected in accordance with information as to the maximal value on the maximal point.

201. An image measurement program storage medium storing an image measurement program for determining an azimuth of a measuring plane and/or a physical quantity indexing a superposing time in which the measuring plane is superposed on a predetermined observation point, using a compound ratio $\{p_{inf}p_0p_1p_c\}$, which is determined by four positions $p_{inf}$, $p_0$, $p_1$, $p_c$ of a measuring point, or an operation equivalent to said compound ratio, where $p_0$ and $p_1$ denote measuring positions at mutually different two measuring times on an arbitrary measuring point appearing on an image obtained through viewing a predetermined measurement space from a predetermined observation point inside the measurement space, respectively, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, and $p_c$ denotes a position of the measuring point at a superposing time in which a measuring plane including the measuring point is superposed on the observation point in the moving continuous state.

202. An image measurement program storage medium according to claim 201, wherein said compound ratio $\{p_{inf}p_0p_1p_c\}$ or the operation equivalent to said compound ratio, which are executed by said image measurement program, include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$ at the two measuring times on the measuring point.

203. An image measurement program storage medium according to claim 201, wherein in said image measurement program, as said physical quantity indexing the superposing time, a normalized time $_nt_c$, which is expressed by the following equation, is adopted, ti $_nt_c=t_c/\Delta t$ where $t_c$ denotes a time between the one measuring time of said two measuring times and said superposing time, and Δt denotes a time between said two measuring times, and said normalized time $_nt_c$ is determined in accordance with the following equation $$_nt_c=\{p_{inf}p_0p_1p_c\}$$

or an equation equivalent to the above equation.

204. An image measurement program storage medium according to claim 201, wherein said image measurement program comprising:

a first step of setting up the physical quantity indexing the superposing time in form of a parameter;

a second step of determining the position $p_c$ of the measuring point at the superposing time, using said compound ratio $\{p_{inf}p_0p_1p_c\}$ or the operation equivalent to said compound ratio, in accordance with the physical quantity indexing the superposing time set up in the first step, the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state; and a third step of determining a polar line associated with the measuring point through a polar transformation of the position $p_c$ of the measuring point at the superposing time, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing a superposing time in which the measuring plane is superposed on the observation point in such a manner that cross points of polar lines, which are formed when a plurality of polar lines determined through a repetition of said first to third steps by a plurality of number of times are drawn on a polar line drawing space, are determined.

205. An image measurement program storage medium according to claim 204, wherein the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of execution of said first to third steps by a plurality of number of times offers a maximal value, instead of determining of the cross point, is determined.

206. An image measurement program storage medium according to claim 204, wherein the measuring point appearing on the image has information as to intensity, said image measurement program further comprises a fifth step of setting up a motion parallax τ, which is a positional difference between the two measuring positions $p_0$ and $p_1$ at the two measuring times on the measuring point, in the form of a second parameter, said second step is a step of determining the position $p_c$ of the measuring point at the superposing time using the physical quantity indexing the superposing time, which is set up in said first step, the measuring position $p_0$ at one measuring time of said two measuring times on said measuring point, the motion parallax τ, which is set up in said fifth step, and the position $p_{inf}$ of the measuring point after an infinite time elapses in the moving continuous state, said third step is a step of determining a polar line associated with the measuring point, and determining a response intensity associated with the motion parallax τ on the measuring point, and of voting the response intensity associated with the motion parallax τ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or a physical quantity indexing a superposing time in which the measuring plane is superposed on the observation point in such a manner that a maximal point wherein a value by a voting through a repetition of said first, fifth, second and third steps by a plurality of number of times offers a maximal value is determined, instead of determination of said cross point.

207. An image measurement program storage medium according to claim 201, wherein said image measurement program comprising:

a first step of setting up the position $p_{inf}$ of the measuring point after an infinite time elapses in the moving continuous state through setting up the moving direction v in form of a first parameter;

a second step of setting up the physical quantity indexing the superposing time in form of a second parameter;

a third step of determining the position $p_c$ of the measuring point at the superposing time, using said compound ratio $\{p_{inf}p_0p_1p_c\}$ or the operation equivalent to said compound ratio, in accordance with the position $p_{inf}$ set up in said first step, the physical quantity indexing the superposing time set up in the second step, and the two measuring positions $p_0$ and $p_1$ of the measuring point at the two measuring times or the measuring position $p_0$ at one measuring time of said two measuring times on said measuring point and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point,; and a fourth step of determining a polar line associated with the measuring point through a polar transformation of the position $p_c$ of the measuring point at the superposing time, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true moving direction, and of determining an azimuth of a measuring plane including a plurality of measuring points associated with a plurality of polar lines intersecting at a cross point determined on a polar line drawing space associated with the true moving direction, and/or a physical quantity indexing a superposing time in which the measuring plane is superposed on the observation point in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true moving direction relative to said observation point on said measuring point is selected in accordance with information as to a number of polar lines intersecting at the cross points.

208. An image measurement program storage medium according to claim 207, wherein the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of said first to fourth steps offers a maximal value, instead of determining of the cross point, is determined on each polar line drawing space, and a polar line drawing space associated with the true moving direction is selected in accordance with information as to a maximal value at the maximal point.

209. An image measurement program storage medium according to claim 207, wherein the measuring point appearing on the image has information as to intensity, said image measurement program further comprises a sixth step of setting up a motion parallax $\tau$, which is a positional difference between the two measuring positions $p_0$ and $p_1$ at the two measuring times on the measuring point, in the form of a third parameter, said third step is a step of determining the position $p_c$ of the measuring point at the superposing time using the position $p_{inf}$, which is set up in said first step, the physical quantity indexing the superposing time, which is set up in said second step, the measuring position $p_0$ at one measuring time of said two measuring times on said measuring point, and the motion parallax $\tau$, which is set up in said sixth step, said fourth step is a step of determining a polar line associated with the measuring point, and determining a response intensity associated with the motion parallax $\tau$ on the measuring point, and of voting the response intensity associated with the motion parallax $\tau$ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true moving direction, and of determining an azimuth of a measuring plane including a plurality of measuring points associated with a plurality of polar lines joining a voting for a maximal point determined on a polar line drawing space associated with the true moving direction, and/or a physical quantity indexing a superposing time in which the measuring plane is superposed on the observation point in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true moving direction is selected in accordance with information as to a maximal value at the maximal point.

210. An image measurement program storage medium storing an image measurement program for determining an azimuth $n_s$ of a measuring plane and/or a physical quantity indexing a shortest distance from a predetermined observation point to the measuring plane at one measuring time of two measuring times, using a compound ratio $\{p_{inf}p_0p_1p_c\}$, which is determined by four positions $p_{inf}$, $p_0$, $p_1$, $p_c$ of a measuring point, or an operation equivalent to said compound ratio, and an inner product $(n_s \cdot v)$ of the azimuth $n_s$ of the measuring plane and a moving direction v, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times, $p_c$ denotes a position of the measuring point at a superposing time in which a measuring plane including the measuring point is superposed on the observation point in the moving continuous state, and $n_s$ denotes the azimuth of the measuring plane.

211. An image measurement program storage medium according to claim 210, wherein said compound ratio $\{p_{inf}p_0p_1p_c\}$ or the operation equivalent to said compound ratio, which are executed by said image measurement program, include an operation using the measuring position $p_0$ at one measuring time of said two measuring times on said measuring point, and a motion parallax τ, which is a positional difference between the two measuring positions $p_0$ and $p_1$ at the two measuring times on the measuring point, instead of the two measuring positions $p_0$ and $p_1$ at the two measuring times on the measuring point.

212. An image measurement program storage medium according to claim 210, wherein in said image measurement program, as the physical quantity indexing the shortest distance, a normalization shortest distance ${}_nd_s$, which is expressed by the following equation, is adopted, $${}_nd_s = d_s/\Delta x$$

and said normalization shortest distance ${}_nd_s$ is determined in accordance with the following equation, $${}_nd_s = {}_nt_c(n_s \cdot v)$$

using a normalized time ${}_nt_c$, which is expressed by the following equation, and the inner product $(n_s \cdot v)$ $${}_nt_c = t_c/\Delta t$$

where $d_s$ denotes a shortest distance between the observation point and the measuring plane at one measuring time of said two measuring times, $t_c$ denotes a time between the one measuring time of said two measuring times and said superposing time, Δx denotes a moving distance of the measuring point, which is relative to the observation point, between said two measuring times, and Δt denotes a time between said two measuring times.

213. An image measurement program storage medium according to claim 210, wherein said image measurement program comprising:

a first step of setting up the physical quantity indexing the shortest distance in form of a first parameter;

a second step of setting up the inner product $(n_s \cdot v)$ in form of a second parameter;

a third step of determining the position $p_c$ of the measuring point at the superposing time, using said compound ratio $\{p_{inf}p_0p_1p_c\}$ or the operation equivalent to said compound ratio, in accordance with the physical quantity indexing the shortest distance set up in the first step, the inner product $(n_s \cdot v)$ set up in the second step, the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point, and the position $p_{inf}$ of the measuring point after an infinite time elapses in the moving continuous state;

a fourth step of determining a polar line associated with the position $p_c$ of the measuring point at the superposing time through a polar transformation of the position $p_c$, and a fifth step of determining a point on the polar line, said point being given with an angle r with respect to the moving direction v, $$r = \cos^{-1}(n_s \cdot v)$$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance from said observation point to the measuring plane at one measuring time of the two measuring times in such a manner that cross points of curved lines, which are formed when a plurality of curved lines determined through a repetition of said first to fifth steps by a plurality of number of times are drawn on a curved line drawing space, are determined.

214. An image measurement program storage medium according to claim 213, wherein the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of execution of said first to fifth steps by a plurality of number of times offers a maximal value, instead of determining of the cross point, is determined.

215. An image measurement program storage medium according to claim 213, wherein the measuring point appearing on the image has information as to intensity, said image measurement program further comprises a seventh step of setting up a motion parallax τ, which is a positional difference between the two measuring positions $p_0$ and $p_1$ at the two measuring times on the measuring point, in the form of a third parameter, said third step is a step of determining the position $p_c$ of the measuring point at the superposing time using the physical quantity indexing the shortest distance set up in the first step, the inner product $(n_s \cdot v)$ set up in the second step, the measuring position $p_0$ at one measuring time of said two measuring times on said measuring point, the motion parallax τ, which is set up in said seventh step, and the position $p_{inf}$ of the measuring point after an infinite time elapses in the moving continuous state, said fifth step is a step of determining said point on a polar line associated with the measuring point, and determining a response intensity associated with the motion parallax τ on the measuring point, and of voting the response intensity associated with the motion parallax τ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance from the observation point to the measuring plane at one measuring time of the two measuring times in such a manner that a maximal point wherein a value by a voting through a repetition of said first, second, seventh and third to fifth steps by a plurality of number of times offers a maximal value is determined, instead of determination of said cross point.

216. An image measurement program storage medium according to claim 210, wherein said image measurement program comprising:

a first step of setting up the position $p_{inf}$ of the measuring point after an infinite time elapses in the moving continuous state through setting up the moving direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the measuring point at the superposing time, using said compound ratio $\{p_{inf}p_0p_1p_c\}$ or the operation equivalent to said compound ratio, in accordance with the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, and the two measuring positions $p_0$ and $p_1$ of the measuring point at the two measuring times or the measuring position $p_0$ at one measuring time of said two measuring times on said measuring point and a motion parallax τ, which is a positional difference between the two measuring positions $p_0$ and $p_1$ at the two measuring times on the measuring point, instead of the two measuring positions $p_0$ and $p_1$ at the two measuring times on the measuring point,; and a fifth step of determining a polar line associated with the position $p_c$ of the measuring point at the superposing time through a polar transformation of the position $p_c$, and a sixth step of determining a point on the polar line, said point being given with an angle r with respect to the moving direction v, $$r = \cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true moving direction, and of determining an azimuth $n_s$ of a measuring plane including a plurality of measuring points associated with a plurality of curved lines intersecting at a cross point determined on a curved line drawing space associated with the true moving direction, and/or a physical quantity indexing a shortest distance from the observation point to the measuring plane at one measuring time of the two measuring times in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true moving direction relative to said observation point on said measuring point is selected in accordance with information as to a number of curved lines intersecting at the cross points.

217. An image measurement program storage medium according to claim 216, wherein the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of said first to sixth steps offers a maximal value, instead of determining of the cross point, is determined on each curved line drawing space, and a curved line drawing space associated with the true moving direction is selected in accordance with information as to a maximal value at the maximal point.

218. An image measurement program storage medium according to claim 216, wherein the measuring point appearing on the image has information as to intensity, said image measurement program further comprises a eighth step of setting up a motion parallax $\tau$, which is a positional difference between the two measuring positions $p_0$ and $p_1$ at the two measuring times on the measuring point, in the form of a fourth parameter, said fourth step is a step of determining the position $p_c$ of the measuring point at the superposing time using the position $p_{inf}$ of the measuring point after an infinite time elapses in the moving continuous state, which is set up in said first step, the physical quantity indexing the shortest distance, which is set up in the second step, the inner product $(n_s \cdot v)$ set up in the third step, the measuring position $p_0$ at one measuring time of said two measuring times on said measuring point, and a motion parallax $\tau$, which is set up in said eighth step, said sixth step is a step of determining said point associated with the measuring point, and determining a response intensity associated with the motion parallax $\tau$ on the measuring point, and of voting the response intensity associated with the motion parallax $\tau$ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true moving direction, and of determining an azimuth $n_s$ of a measuring plane including a plurality of measuring points associated with a plurality of curved lines joining a voting for a maximal point determined on a curved line drawing space associated with the true moving direction, and/or a physical quantity indexing a shortest distance from the observation point to the measuring plane at one measuring time of the two measuring times in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true moving direction is selected in accordance with information as to a maximal value at the maximal point.

219. An image measurement program storage medium storing an image measurement program for determining an azimuth of a measuring plane and/or a physical quantity indexing a shortest distance from a predetermined observation point to the measuring plane at one measuring time of two measuring times, using a simple ratio $(p_{inf}p_0p_1)$, which is determined by three positions $p_{inf}$, $p_0$, $p_1$ of a measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, v denotes a moving direction between said two measuring times, which is relative with respect to the observation point, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

220. An image measurement program storage medium according to claim 219, wherein said simple ratio $(p_{inf}p_0p_1)$ or the operation equivalent to said simple ratio, which are executed by said image measurement program, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

221. An image measurement program storage medium according to claim 219, wherein in said image measurement program, as the positions $p_{inf}$, $p_0$, $p_1$ of the measuring point, positions projected on a sphere are adopted, and as said physical quantity indexing the shortest distance, a normalization shortest distance ${}_nd_s$, which is expressed by the following equation, is adopted, $$ {}_nd_s = d_s/\Delta x $$

where $d_s$ denotes a shortest distance between the observation point and the measuring plane at one measuring time of said two measuring times, and $\Delta x$ denotes a moving distance of the measuring point, which is relative to the observation point, between said two measuring times, a first step of setting up the normalization shortest distance ${}_nd_s$ in form of a parameter;

a second step of determining a radius R defined by the following equation or the equivalent equation:

$$ R = \cos^{-1}({}_nd_s/(p_{inf}p_0p_1)) $$

using the normalization shortest distance ${}_nd_s$ set up in the first step and the simple ratio $(p_{inf}p_0p_1)$ or the operation equivalent to said simple ratio, and a third step of determining a small circle of a radius R taking as a center a measuring position of the measuring point at one measuring time of said two measuring times, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance ${}_nd_{s0}$ on the measuring plane in such a manner that cross points of small circles, which are formed when a plurality of small circles determined through a repetition of said first to third steps by a plurality of number of times are drawn on a small circle drawing space, are determined.

222. An image measurement program storage medium according to claim 221, wherein the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of execution of said first to third steps by a plurality of number of times offers a maximal value, instead of determining of the cross point, is determined.

223. An image measurement program storage medium according to claim 221, wherein the measuring point appearing on the image has information as to intensity, said image measurement program further comprises a fifth step of setting up a motion parallax $\tau$, which is a positional difference between the two measuring positions $p_0$ and $p_1$ at the two measuring times on the measuring point, in form of a second parameter, said second step is a step of determining the radius R using the normalization shortest distance ${}_nd_s$ set up in the first step, the position $p_{inf}$ of the measuring point after an infinite time elapses in the moving continuous state, the measuring position $p_0$ at one measuring time of said two measuring times on said measuring point, and the motion parallax $\tau$, which is set up in said fifth step, said third step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of said first, fifth, second and third steps by a plurality of number of times offers a maximal value is determined, instead of determination of said cross point.

224. An image measurement program storage medium according to claim 219, wherein in said image measurement program, as the positions $p_{inf}$, $p_0$, $p_1$ of the measuring point, positions projected on a sphere are adopted, and as said physical quantity indexing the shortest distance, a normalization shortest distance ${}_nd_s$, which is expressed by the following equation, is adopted, $${}_nd_s=d_s/\Delta x$$

where $d_s$ denotes a shortest distance between the observation point and the measuring plane at one measuring time of said two measuring times, and $\Delta x$ denotes a moving distance of the measuring point, which is relative to the observation point, between said two measuring times, a first step of setting up the position $p_{inf}$ of the measuring point after an infinite time elapses in the moving continuous state through setting up the moving direction v in form of a first parameter;

a second step of setting up the normalization shortest distance ${}_nd_s$ in form of a second parameter;

a third step of determining a radius R defined by the following equation or the equivalent equation;

$$R=\cos^{-1}({}_nd_s/(p_{inf}p_0p_1)$$

using the position $p_{inf}$ of the measuring point after an infinite time elapses in the moving continuous state, which is set up in the first step, the normalization shortest distance ${}_nd_s$ set up in the second step and the simple ratio $(p_{inf}p_0p_1)$ or the operation equivalent to said simple ratio, and a fourth step of determining a small circle of a radius R taking as a center a measuring position of the measuring point at one measuring time of said two measuring times, wherein said third step and said fourth step are repeated by a plurality of number of times on a plurality of measuring points in said measurement space, while values of the first and second parameters are altered in said first step and said second step, and thereafter, effected is a fifth step of determining a true moving direction, and of determining an azimuth $n_{s0}$ of a measuring plane including a plurality of measuring points associated with a plurality of small circles intersecting at a cross point determined on a small circle drawing space associated with the true moving direction, and/or a a normalization shortest distance ${}_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true moving direction relative to said observation point on said measuring point is selected in accordance with information as to a number of small circles intersecting at the cross points.

225. An image measurement program storage medium according to claim 224, wherein the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance ${}_nd_{s0}$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true moving direction is selected in accordance with information as to the maximal value on the maximal point.

226. An image measurement program storage medium according to claim 224, wherein the measuring point appearing on the image has information as to intensity, said image measurement program further comprises a sixth step of setting up a motion parallax $\tau$, which is a positional difference between the two measuring positions $p_0$ and $p_1$ at the two measuring times on the measuring point, in form of a third parameter, said second step is a step of determining the radius R using the position $p_{inf}$ of the measuring point after an infinite time elapses in the moving continuous state, which is set up in said first step, the normalization shortest distance ${}_nd_s$ set up in the second step, the measuring position $p_0$ at one measuring time of said two measuring times on said measuring point, and the motion parallax $\tau$, which is set up in said fifth step, said fourth step is a step of determining said small circle associated with the measuring point, and determining a response intensity associated with the motion parallax $\tau$ on the measuring point, and of voting the response intensity associated with the motion parallax $\tau$ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true moving direction, and of determining an azimuth $n_{s0}$ of a measuring plane including a plurality of measuring points associated with a plurality of small circles joining a voting for a maximal point determined on a small circle drawing space associated with the true moving direction, and/or a normalization shortest distance ${}_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true moving direction is selected in accordance with information as to the maximal value on the maximal point.

227. An image measurement program storage medium storing an image measurement program for determining a physical quantity indexing a distance between a predetermined observation point and a measuring point at one measuring time of two measuring times, using a simple ratio $(p_{inf}p_0p_1)$, which is determined by three positions $p_{inf}$, $p_0$, $p_1$ of the measuring point, or an operation equivalent to said simple ratio, where $p_0$ and $p_1$ denote measuring positions at mutually different two measuring times on an arbitrary measuring point appearing on an image obtained through viewing a predetermined measurement space from a predetermined observation point inside the measurement space, respectively, and $p_{inf}$ denotes a position of the measuring point after an infinite time elapses in a moving continuous state wherein it is expected that a movement of the measuring point, which is relative with respect to the observation point, is continued in a direction identical to a moving direction v between said two measuring times and at a velocity identical to a moving velocity between said two measuring times.

228. An image measurement program storage medium according to claim 227, wherein said simple ratio $(p_{inf}p_0p_1)$ or the operation equivalent to said simple ratio, which are executed by said image measurement program, include an operation using the measuring position $p_0$ at one measuring time of said two measuring times on said measuring point, and a motion parallax $\tau$, which is a positional difference between the two measuring positions $p_0$ and $p_1$ at the two measuring times on the measuring point, instead of the two measuring positions $p_0$ and $p_1$ at the two measuring times on the measuring point.

229. An image measurement program storage medium according to claim 227, wherein in said image measurement program, as the physical quantity indexing the distance, a normalized distance ${}_nd_0$, which is expressed by the following equation, is adopted, $${}_nd_0=d_0/\Delta x$$

where $d_0$ denotes a distance between the observation point and the measuring point at one measuring time of the two measuring times, and $\Delta x$ denotes a moving distance of the measuring point between said two measuring times with respect to the observation point, and said normalized distance ${}_nd_{s0}$ is determined in accordance with the following equation $${}_nd_0=(p_{inf}p_0p_1)$$

or an equation equivalent to the above equation.

230. An image measurement program storage medium storing an image measurement program comprising:

a first step of setting up coordinates in a voting space in form of a parameter, said coordinates being defined by a physical quantity indexing a superposing time in which a measuring plane, including an arbitrary measuring point appearing on an image obtained through viewing a predetermined measurement space from a predetermined observation point inside the measurement space, is superposed on the observation point, and an azimuth $n_s$ of the measuring plane, in a moving continuous state wherein it is expected that a movement of the measuring point appearing on an image obtained through viewing the measurement space from the observation point inside the measurement space, said measuring point being relative with respect to the observation point, is continued in a direction identical to a moving direction relative with respect to the observation point between mutually different two measuring times on the measuring point and at a velocity identical to a moving velocity between said two measuring times;

a second step of determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ of the measuring point after an infinite time elapses in the moving continuous state, and the coordinates in the voting space, which is set up in the first step;

a third step of determining a response intensity associated with the motion parallax $\tau$ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

231. An image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a superposing time in which a measuring plane including the measuring point is superposed on the observation point, and an azimuth $n_s$ of the measuring plane;

a third step of determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax $\tau$ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

232. An image measurement program storage medium storing an image measurement program comprising:

a first step of setting up coordinates in a voting space in form of a parameter, said coordinates being defined by a physical quantity indexing a shortest distance between a predetermined observation point inside a predetermined measurement space for observation of the measurement space and a measuring plane, including an arbitrary measuring point appearing on an image obtained through viewing the measurement space from the observation point inside the measurement space, at one measuring time of mutually different two measuring times, and an azimuth $n_s$ of the measuring plane;

a second step of determining a motion parallax $\tau$, which is a positional difference between two measuring positions $p_0$ and $p_1$ at the two measuring times on the measuring point, in accordance with a measuring position $p_0$ at one measuring time of the two measuring times on the measuring point, a position $p_{inf}$ of the measuring point after an infinite time elapses in a moving continuous state wherein it is expected that a movement of the measuring point is continued in a direction identical to a moving direction relative with respect to the observation point between mutually different two measuring times and at a velocity identical to a moving velocity between said two measuring times, and the coordinates in the voting space, which is set up in the first step;

a third step of determining a response intensity associated with the motion parallax $\tau$ of the measuring point in accordance with two images obtained through viewing the measurement space from the observation point at the two measuring times; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

233. An image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up coordinates in a voting space according to the first parameter in form of a second parameter, said coordinates being defined by a physical quantity indexing a shortest distance from the observation point to a measuring plane including the measuring point at one measuring time of the two measuring times, and an azimuth $n_s$ of the measuring plane;

a third step of determining a motion parallax $\tau$, which is a positional difference between two measuring positions $p_0$ and $p_1$ at the two measuring times on the measuring point, in accordance with a measuring position $p_0$ at one measuring time of said two measuring times on said measuring point, a position $p_{inf}$ set up in the first step, and the coordinates in the voting space, which is set up in the second step;

a fourth step of determining a response intensity associated with the motion parallax $\tau$ of the measuring point in accordance with two images obtained through viewing the measurement space from the observation point at the two measuring times; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

234. An image measurement program storage medium storing an image measurement program comprising:

a first step of setting up in form of a parameter a motion parallax $\tau$, which is a positional difference between two measuring positions $p_0$ and $p_1$ at mutually different two measuring times, of an arbitrary measuring point appearing on an image obtained through viewing a predetermined measurement space from a predetermined observation point inside the measurement space;

a second step of determining coordinates in a voting space, said coordinates being defined by a physical quantity indexing a superposing time in which a measuring plane, including the measuring point, is superposed on the observation point, and an azimuth $n_s$ of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, in accordance with a measuring position $p_0$ at one measuring time of said two measuring times on said measuring point, a position $p_{inf}$ of the measuring point after an infinite time elapses in the moving continuous state, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

235. An image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a superposing time in which a measuring plane, including the measuring point, is superposed on the observation point, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

236. An image measurement program storage medium storing an image measurement program comprising:

a first step of setting up in form of a parameter a motion parallax $\tau$, which is a positional difference between two measuring positions $p_0$ and $p_1$ at mutually different two measuring times on the measuring point, of an arbitrary measuring point appearing on an image obtained through viewing a predetermined measurement space from a predetermined observation point inside the measurement space;

a second step of determining coordinates in a voting space, said coordinates being defined by a physical quantity indexing a shortest distance from the observation point to a measuring plane including the measuring point at one measuring time of the two measuring times, and an azimuth $n_s$ of the measuring plane, in accordance with a measuring position $p_0$ at one measuring time of said two measuring times on said measuring point, a position $p_{inf}$ of the measuring point after an infinite time elapses in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times, and the motion parallax $\tau$ set up in the first step;

a third step of determining a response intensity associated with the motion parallax $\tau$ of the measuring point, which is set up in the first step, in accordance with two images obtained through viewing the measurement space from the observation point at the two measuring times; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

237. An image measurement program storage medium storing an image measurement program comprising:

a first step of setting up in form of a first parameter a moving direction v of an arbitrary measuring point appearing on an image obtained through viewing a predetermined measurement space from a predetermined observation point inside the measurement space, said moving direction being relative with respect to the observation point between mutually different two measuring times, and setting up a position $p_{inf}$ of the measuring point after an infinite time elapses in a moving continuous state wherein it is expected that a movement of the measuring point is continued in a direction identical to the moving direction v and at a velocity identical to a moving velocity between the two measuring times;

a second step of setting up in form of a second parameter a motion parallax $\tau$, which is a positional difference between two measuring positions $p_0$ and $p_1$ at the two measuring times on the measuring point;

a third step of determining coordinates in a voting space according to the first parameter, said coordinates being defined by a physical quantity indexing a shortest distance from the observation point to a measuring plane including the measuring point at one measuring time of the two measuring times, and an azimuth $n_s$ of the measuring plane, in the moving continuous state, in accordance with a measuring position $p_0$ at one measuring time of said two measuring times on the measuring point, a position $p_{inf}$ set up in the first step, and the motion parallax $\tau$ set up in the second step;

a fourth step of determining a response intensity associated with the motion parallax $\tau$ of the measuring point, which is set up in the second step, in accordance with two images obtained through viewing the measurement space from the observation point at the two measuring times; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

238. An image measurement program storage medium storing an image measurement program comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the first step and the second step are effected by a plurality of number of times on a plurality of measuring points in the measurement space.

239. An image measurement program storage medium according to claim 238, wherein said image measurement program further comprises a third step of determining an azimuth of a measuring plane including a plurality of measuring points joining a voting for a maximal point and/or a physical quantity indexing a superposing time in which the measuring plane is superposed on the observation point in such a manner that a maximal point wherein a value by said voting in the voting space offers a maximal value is determined.

240. An image measurement program storage medium storing an image measurement program comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a superposing time in which a measuring plane, including the measuring point, is superposed on the observation point, and an azimuth of the measuring plane, in a moving continuous state wherein it is expected that a movement of the measuring point, said measuring point being relative with respect to the observation point, is continued in a direction identical to a moving direction relative with respect to the observation point between the two measuring times on the measuring point and at a velocity identical to a moving velocity between the two measuring times;

wherein the second step and the third step, of the first to third steps, are effected by a plurality of number of times on a plurality of measuring points in the measurement space, while a value of the parameter is altered in the first step.

241. An image measurement program storage medium according to claim 240, wherein said image measurement program further comprises a fourth step of determining a true moving direction relative to the observation point on the measuring point, and of determining an azimuth of a measuring plane including a plurality of measuring points joining a voting for a maximal point determined on a voting space associated with the true moving direction, and/or a physical quantity indexing a superposing time in which the measuring plane is superposed on the observation point, in such a manner that a maximal point wherein a value by a voting is determined on each voting space, and the voting space associated with the true moving direction is selected in accordance with information as to the maximal value on the maximal point.

242. An image measurement program storage medium storing an image measurement program comprising:

a first step of determining a response intensity associated with a motion parallax, which is a positional difference between two measuring positions at mutually different two measuring times, of an arbitrary measuring point in a predetermined measurement space, in accordance with two images obtained through viewing the measurement space from a predetermined observation point at mutually different two measuring times; and a second step of voting the response intensity determined in the first step for coordinates associated with the measuring point and the motion parallax in a voting space, said coordinates being defined by a physical quantity indexing a shortest distance from the observation point to a measuring plane, including the measuring point, at one measuring time of the two measuring times, and an azimuth of the measuring plane;

wherein the first step and the second step are effected by a plurality of number of times on a plurality of measuring points in the measurement space.

243. An image measurement program storage medium according to claim 242, wherein said image measurement program further comprises a third step of determining an azimuth of a measuring plane including a plurality of measuring points joining a voting for a maximal point and/or a physical quantity indexing a shortest distance from the observation point to the measuring plane at one measuring time of the two measuring times in such a manner that a maximal point wherein a value by said voting offers a maximal value is determined in the voting space.

244. An image measurement program storage medium storing an image measurement program comprising:

a first step of setting up in form of a parameter a moving direction of an arbitrary measuring point appearing on an image obtained through viewing a predetermined measurement space from a predetermined observation point inside the measurement space, said moving direction being relative with respect to the observation point between mutually different two measuring times;

a second step of determining a response intensity associated with a motion parallax, which is a positional difference between two measuring positions at the two measuring times on the measuring point, in accordance with two images obtained through viewing the measurement space from the observation point at the two measuring times; and a third step of voting the response intensity determined in the second step for coordinates associated with the measuring point and the motion parallax in a voting space according to the parameter set up in the first step, said coordinates being defined by a physical quantity indexing a shortest distance from the observation point to the measuring plane at one measuring time of the two measuring times, including the measuring point, and an azimuth of the measuring plane;

wherein the second step and the third step, of the first to third steps, are effected by a plurality of number of times on a plurality of measuring points in the measurement space, while a value of the parameter is altered in the first step.

245. An image measurement program storage medium according to claim 244, wherein said image measurement program further comprises a fourth step of determining a true moving direction, and of determining an azimuth of a measuring plane including a plurality of measuring points joining a voting for a maximal point determined on a voting space associated with the true moving direction, and/or a shortest distance from the observation point to the measuring plane at one measuring time of the two measuring times, in such a manner that a maximal point wherein a value by said voting offers a maximal value is determined on each voting space, and a voting space associated with the true moving direction relative to the observation point on the measuring point is selected in accordance with information as to the maximal value on the maximal point.

246. An image measurement program storage medium storing an image measurement program for determining an azimuth of a measuring plane and/or a physical quantity indexing a distance between the measuring plane and one observation point of predetermined two observation points in an optical axis direction v coupling said two observation points, using a compound ratio $\{p_{axis}p_R p_L p_c\}$, which is determined by four positions $p_{axis}$, $p_R$, $p_L$, $p_c$, or an operation equivalent to said compound ratio, where $p_R$ and $p_L$ denote measuring positions through observation of said two observation points on an arbitrary measuring point appearing on an image obtained through viewing a predetermined measurement space from said two observation points inside the measurement space, respectively, $p_{axis}$ denotes a position of an infinite-point on a straight line extending in a direction identical to the optical axis direction v, including the measuring point, and $p_c$ denotes a position of an intersection point with said straight line on an observation plane extending in parallel to a measuring plane including the measuring point, including one observation point of said two observation points.

247. An image measurement program storage medium according to claim 246, wherein said compound ratio $\{p_{axis}p_R p_L p_c\}$ or the operation equivalent to said compound ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

248. An image measurement program storage medium according to claim 246, wherein in said image measurement program, as the physical quantity indexing a distance between the measuring plane and one observation point of said two observation points in the optical axis direction, a normalized distance $_n d_c$, which is expressed by the following equation, is adopted, $$_n d_c = d_c / \Delta x_{LR}$$

where $d_c$ denotes a distance between the measuring plane and one observation point of said two observation points in the optical axis direction, and $\Delta x_{LR}$ denotes a distance between said two observation points, and said normalized distance ${}_nd_c$ is determined in accordance with the following equation $${}_nd_c=\{p_{axis}p_Rp_Lp_c\}$$

or an equation equivalent to the above equation.

249. An image measurement program storage medium according to claim 246, wherein said image measurement program comprising:

a first step of setting up the physical quantity indexing a distance between the measuring plane and one observation point of said two observation points in the optical axis direction in form of a parameter;

a second step of determining the position $p_c$ of the intersection point on the observation plane, using said compound ratio $\{p_{axis}p_Rp_Lp_c\}$ or the operation equivalent to said compound ratio, in accordance with the physical quantity indexing a distance between the measuring plane and one observation point of said two observation points in the optical axis direction set up in the first step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$, and the position $p_{axis}$ of said infinite-point of the measuring point; and a third step of determining a polar line associated with the measuring point through a polar transformation of the position $p_c$ of the intersection point on the observation plane, wherein said second step and said third step are repeated by a plurality of number of times on a plurality of measuring points in said measurement space, while a value of said parameter is altered in said first step, and thereafter, effected is a fourth step of determining an azimuth of a measuring plane including a plurality of measuring points associated with a plurality of polar lines intersecting at a cross point and/or a physical quantity indexing said physical quantity indexing a distance between the measuring plane and one observation point of said two observation points in the optical axis direction in such a manner that cross points of polar lines, which are formed when a plurality of polar lines determined through a repetition of said first to third steps by a plurality of number of times are drawn on a polar line drawing space, are determined.

250. An image measurement program storage medium according to claim 249, wherein the measuring point appearing on the image has information as to intensity, said third step is a step of determining the polar line, and of voting a value associated with intensity of a measuring point associated with the polar line for each point on a locus of the polar line, which is formed when the polar line thus determined is drawn on a polar line drawing space, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of execution of said first to third steps by a plurality of number of times offers a maximal value, instead of determining of the cross point, is determined.

251. An image measurement program storage medium according to claim 249, wherein the measuring point appearing on the image has information as to intensity, said image measurement program further comprises a fifth step of setting up a binocular parallax σ, which is a positional difference between the two measuring positions $p_R$ and $p_L$ through observation on said measuring point from said two observation points, in the form of a second parameter, said second step is a step of determining the position $p_c$ of the intersection point on the observation plane using the physical quantity indexing a distance between the measuring plane and one observation point of said two observation points in the optical axis direction, which is set up in said first step, the measuring position $p_R$ through observation on said measuring point from one observation point of said two observation points, the binocular parallax σ, which is set up in said fifth step, and the position $p_{axis}$ of said infinite-point of the measuring point, said third step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said second step and the third step are repeated by a plurality of number of times on a plurality of measuring points in said measurement space, while values of said parameters are altered in said first step and said fifth step, and said fourth step is a step of determining an azimuth of a measuring plane including a plurality of measuring points associated with a plurality of polar lines joining a voting for a maximal point and/or said physical quantity indexing a distance between the measuring plane and one observation point of said two observation points in the optical axis direction in such a manner that a maximal point wherein a value by a voting through a repetition of said first, fifth, second and third steps by a plurality of number of times offers a maximal value is determined, instead of determination of said cross point.

252. An image measurement program storage medium according to claim 246, wherein said image measurement program comprising:

a first step of setting up the position $p_{axis}$ of said infinite-point of the measuring point through setting up the optical axis direction v in form of a first parameter;

a second step of setting up the physical quantity indexing a distance between the measuring plane and one observation point of said two observation points in the optical axis direction in form of a second parameter;

a third step of determining the position $p_c$ of the intersection point on the observation plane, using said compound ratio $\{p_{axis}p_Rp_Lp_c\}$ or the operation equivalent to said compound ratio, in accordance with the position $p_{axis}$ set up in said first step, the physical quantity indexing a distance between the measuring plane and one observation point of said two observation points in the optical axis direction set up in the second step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a fourth step of determining a polar line associated with the measuring point through a polar transformation of the position $p_c$ of the intersection point on the observation plane, wherein said third step and said fourth step of said first step to said fourth step are repeated by a plurality of number of times on a plurality of measuring points in said measurement space, while values of said first parameter and said second parameter are altered in said first step and said second step, and thereafter, effected is a fifth step of determining a true optical axis direction, and of determining an azimuth of a measuring plane including a plurality of measuring points associated with a plurality of polar lines intersecting at a cross point determined on a polar line drawing space associated with the true optical axis direction, and/or said physical quantity indexing a distance between the measuring plane and one observation point of said two observation points in the optical axis direction in such a manner that cross points of polar lines, which are formed when a plurality of polar lines determined through a repetition of said first to fourth steps are drawn on an associated polar line drawing space of a plurality of polar line drawing spaces according to said first parameter, are determined on each polar line drawing space, and a polar line drawing space associated with the true optical axis direction relative to said observation point on said measuring point is selected in accordance with information as to a number of polar lines intersecting at the cross points.

253. An image measurement program storage medium according to claim 252, wherein the measuring point appearing on the image has information as to intensity, said fourth step is a step of determining the polar line, and of voting a value associated with intensity of a measuring point associated with the polar line for each point on a locus of the polar line, which is formed when the polar line thus determined is drawn on the polar line drawing space, said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction, and/or said physical quantity indexing a distance between the measuring plane and one observation point of said two observation points in the optical axis direction in such a manner that a maximal point wherein a value by a voting through a repetition of execution of said first to fourth steps offers a maximal value, instead of determining of the cross point, is determined on each polar line drawing space, and a polar line drawing space associated with the true optical axis direction is selected in accordance with information as to a maximal value at the maximal point.

254. An image measurement program storage medium according to claim 252, wherein the measuring point appearing on the image has information as to intensity, said image measurement program further comprises a sixth step of setting up a binocular parallax σ, which is a positional difference between the two measuring positions $p_R$ and $p_L$ through observation on said measuring point from said two observation points, in the form of a third parameter, said third step is a step of determining the position $p_1$ of the intersection point on the observation plane using the position $p_{axis}$, which is set up in said first step, the physical quantity indexing a distance between the measuring plane and one observation point of said two observation points in the optical axis direction which is set up in said second step, the measuring position $p_R$ through observation on said measuring point from one observation point of said two observation points, and the binocular parallax σ, which is set up in said sixth step, said fourth step is a step of determining a polar line associated with the measuring point, and determining a response intensity associated with the binocular parallax σ on the measuring point, and of voting the response intensity associated with the binocular parallax σ of a measuring point associated with the polar line for each point on a locus of the polar line, which is formed when the polar line thus determined is drawn on a polar line drawing space, said third step and the fourth step are repeated by a plurality of number of times on a plurality of measuring points in said measurement space, while values of said parameters are altered in said second step and said sixth step, and said fifth step is a step of determining the true optical axis direction, and of determining an azimuth of a measuring plane including a plurality of measuring points associated with a plurality of polar lines joining a voting for a maximal point determined on a polar line drawing space associated with the true optical axis direction and/or said physical quantity indexing a distance between the measuring plane and one observation point of said two observation points in the optical axis direction in such a manner that a maximal point wherein a value by a voting through a repetition of execution of the first, second, sixth, third and fourth steps by a plurality of number of times offers a maximal value, instead of determining of the cross point, is determined on each polar line drawing space, and a polar line drawing space associated with the true optical axis direction is selected in accordance with information as to a maximal value at the maximal point.

255. An image measurement program storage medium storing an image measurement program for determining an azimuth $n_s$ of a measuring plane and/or a physical quantity indexing a shortest distance between the measuring plane and one observation point of predetermined two observation points, using a compound ratio $\{p_{axis}p_Rp_Lp_c\}$, which is determined by four positions $p_{axis}$, $p_R$, $p_L$, $p_c$ of a measuring point, or an operation equivalent to said compound ratio, and an inner product $(n_s \cdot v)$ of the azimuth $n_s$ of the measuring plane and an optical axis direction v, where $p_R$ and $p_L$ denote measuring positions through observation of said two observation points on an arbitrary measuring point appearing on an image obtained through viewing a predetermined measurement space from predetermined two observation points inside the measurement space, respectively, v denotes the optical axis direction coupling said two observation points, $p_{axis}$ denotes a position of an infinite-point on a straight line extending in a direction identical to the optical axis direction v, including the measuring point, $p_c$ denotes a position of an intersection point with said straight line on an observation plane extending in parallel to a measuring plane including the measuring point, including one observation point of said two observation points, and $n_s$ denotes the azimuth of the measuring plane.

256. An image measurement program storage medium according to claim 255, wherein said compound ratio $\{p_{axis}p_Rp_Lp_c\}$ or the operation equivalent to said compound ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

257. An image measurement program storage medium according to claim 255, wherein in said image measurement program, as the physical quantity indexing the shortest distance, a normalization shortest distance $_nd_s$, which is expressed by the following equation, is adopted, $$_nd_s=d_s/\Delta x_{LR}$$

and said normalization shortest distance $_nd_s$ is determined in accordance with the following equation, $$_nd_s={}_nd_c(n_s \cdot v)$$

using a normalized distance $_nd_c$, which is expressed by the following equation, and the inner product $(n_s \cdot v)$ $$_nd_c=d_c/\Delta x_{LR}$$

where $d_s$ denotes a shortest distance between the measuring plane and one observation point of said two observation points, $d_c$ denotes a distance between the measuring plane and one observation point of said two observation points in an optical axis direction, and $\Delta x_{LR}$ denotes a distance between said two observation points.

258. An image measurement program storage medium according to claim 255, wherein said image measurement program comprising:

a first step of setting up the physical quantity indexing the shortest distance in form of a first parameter;

a second step of setting up the inner product $(n_s \cdot v)$ in form of a second parameter;

a third step of determining the position $p_c$ of the intersection point on the observation plane, using said compound ratio $\{p_{axis}p_Rp_Lp_c\}$ or the operation equivalent to said compound ratio, in accordance with the physical quantity indexing the shortest distance set up in the first step, the inner product $(n_s \cdot v)$ set up in the second step, the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points, and the position $p_{axis}$ of said infinite-point of the measuring point;

a fourth step of determining a polar line associated with the position $p_c$ of the intersection point on the observation plane through a polar transformation of the position $p_c$, and a fifth step of determining a point on the polar line, said point being given with an angle r with respect to the optical axis direction v, $$r=\cos^{-1}(n_s \cdot v)$$

wherein said third step to said fifth step, of said first step to said fifth step, are repeated by a plurality of number of times on a plurality of measuring points in said measurement space, while values of said first parameter and said second parameter are altered in said first step and said second step, so that a curved line, which couples a plurality of points determined through an execution of said fifth step as to one measuring point by a plurality of number of times wherein a value of said first parameter is identical and a value of said second parameter is varied, is determined on the plurality of measuring points for each value of said first parameter, and thereafter, effected is a sixth step of determining an azimuth $n_s$ of a measuring plane including a plurality of measuring points associated with a plurality of curved lines intersecting at a cross point and/or a physical quantity indexing a shortest distance between the measuring plane and one observation point of said two observation points in such a manner that cross points of curved lines, which are formed when a plurality of curved lines determined through a repetition of said first to fifth steps by a plurality of number of times are drawn on a curved line drawing space, are determined.

259. An image measurement program storage medium according to claim 258, wherein the measuring point appearing on the image has information as to intensity, said fifth step is a step of determining said point, and of voting a value associated with intensity of a measuring point associated with said point for a point associated with said point in said curved line drawing space, said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of predetermined two observation points in such a manner that a maximal point wherein a value by a voting through a repetition of execution of said first to fifth steps by a plurality of number of times offers a maximal value, instead of determining of the cross point, is determined.

260. An image measurement program storage medium according to claim 258, wherein the measuring point appearing on the image has information as to intensity, said image measurement program further comprises a seventh step of setting up a binocular parallax σ, which is a positional difference between the two measuring positions $p_R$ and $p_L$ through observation on said measuring point from said two observation points, in the form of a third parameter, said third step is a step of determining the position $p_c$ of the intersection point on the observation plane using the physical quantity indexing the shortest distance set up in the first step, the inner product $(n_s \cdot v)$ set up in the second step, the measuring position $p_R$ through observation on said measuring point from one observation point of said two observation points, the binocular parallax σ, which is set up in said seventh step, and the position $p_{axis}$ of said infinite-point of the measuring point, said fifth step is a step of determining said point on a polar line associated with the measuring point, and determining a response intensity associated with the binocular parallax σ on the measuring point, and of voting the response intensity associated with the binocular parallax σ of a measuring point associated with said point on the polar line for a point associated with said point on the polar line in said curved line drawing space, said third step to said fifth step are repeated by a plurality of number of times on a plurality of measuring points in said measurement space, while values of the parameters are altered in said first step, said second step and said seventh step, and said sixth step is a step of determining an azimuth $n_s$ of a measuring plane including a plurality of measuring points associated with a plurality of curved lines joining a voting for a maximal point and/or a physical quantity indexing a shortest distance between the measuring plane and one observation point of said two observation points in such a manner that a maximal point wherein a value by a voting through a repetition of said first, second, seventh and third to fifth steps by a plurality of number of times offers a maximal value is determined, instead of determination of said cross point.

261. An image measurement program storage medium according to claim 255, wherein said image measurement program comprising:

a first step of setting up the position $p_{axis}$ of said infinite-point of the measuring point through setting up the optical axis direction v in form of a first parameter;

a second step of setting up the physical quantity indexing the shortest distance in form of a second parameter;

a third step of setting up the inner product $(n_s \cdot v)$ in form of a third parameter;

a fourth step of determining the position $p_c$ of the intersection point on the observation plane, using said compound ratio $\{p_{axis} p_R p_L p_c\}$ or the operation equivalent to said compound ratio, in accordance with the position $p_{axis}$ of said infinite-point of the measuring point, which is set up in said first step, the physical quantity indexing the shortest distance, which is set up in the second step, the inner product $(n_s \cdot v)$ set up in the third step, and the two measuring positions $p_R$ and $p_L$ of the measuring point through observation on said measuring point from said two observation points or the measuring position $p_R$ through observation on said measuring point from one observation point of said two observation points and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points; and a fifth step of determining a polar line associated with the position $p_c$ of the intersection point on the observation plane through a polar transformation of the position $p_c$, and a sixth step of determining a point on the polar line, said point being given with an angle r with respect to the optical axis direction v, $$r = \cos^{-1}(n_s \cdot v)$$

wherein said fourth step to said sixth step, of said first step to said sixth step, are repeated by a plurality of number of times on a plurality of measuring points in said measurement space, while values of said first parameter to said third parameter are altered in said first step to said third step, so that a curved line, which couples a plurality of points determined through an execution of said sixth step as to one measuring point by a plurality of number of times wherein a value of said first parameter is identical and a value of said second parameter is identical, and a value of said third parameter is varied, is determined on the plurality of measuring points for each combination of a respective value of said first parameter and a respective value of said second parameter, and thereafter, effected is a seventh step of determining a true optical axis direction, and of determining an azimuth $n_s$ of a measuring plane including a plurality of measuring points associated with a plurality of curved lines intersecting at a cross point determined on a curved line drawing space associated with the true optical axis direction, and/or a physical quantity indexing a shortest distance between the measuring plane and one observation point of predetermined two observation points in such a manner that cross points of curved lines, which are formed when a plurality of curved lines determined through a repetition of said first to sixth steps are drawn on an associated curved line drawing space of a plurality of curved line drawing spaces according to said first parameter, are determined on each curved line drawing space, and a curved line drawing space associated with the true optical axis direction relative to said observation point on said measuring point is selected in accordance with information as to a number of curved lines intersecting at the cross points.

262. An image measurement program storage medium according to claim 261, wherein the measuring point appearing on the image has information as to intensity, said sixth step is a step of determining said point, and of voting a value associated with intensity of a measuring point associated with said point for points in the curved line drawing space wherein a curved line including said point is drawn, said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of said first to sixth steps offers a maximal value, instead of determining of the cross point, is determined on each curved line drawing space, and a curved line drawing space associated with the true optical axis direction is selected in accordance with information as to a maximal value at the maximal point.

263. An image measurement program storage medium according to claim 261, wherein the measuring point appearing on the image has information as to intensity, said image measurement program further comprises a eighth step of setting up a binocular parallax σ, which is a positional difference between the two measuring positions $p_R$ and $p_L$ through observation on said measuring point from said two observation points, in the form of a fourth parameter, said fourth step is a step of determining the position $p_c$ of the intersection point on the observation plane using the position $p_{axis}$ of said infinite-point of the measuring point, which is set up in said first step, the physical quantity indexing the shortest distance, which is set up in the second step, the inner product $(n_s \cdot v)$ set up in the third step, the measuring position $p_R$ through observation on said measuring point from one observation point of said two observation points, and a binocular parallax σ, which is set up in said eighth step, said sixth step is a step of determining said point associated with the measuring point, and determining a response intensity associated with the binocular parallax σ on the measuring point, and of voting the response intensity associated with the binocular parallax σ of a measuring point associated with said point on the polar line for points in the curved line drawing space, said fourth to sixth steps are repeated by a plurality of number of times on a plurality of measuring points in said measurement space, while values of said parameters are altered in said first, second, third and eighth steps, and said seventh step is a step of determining the true optical axis direction, and of determining an azimuth $n_s$ of a measuring plane including a plurality of measuring points associated with a plurality of curved lines joining a voting for a maximal point determined on a curved line drawing space associated with the true optical axis direction, and/or a physical quantity indexing a shortest distance between the measuring plane and one observation point of predetermined two observation points in such a manner that a maximal point wherein a value by a voting through a repetition of execution of the first, second, third, eighth steps, and the fourth to sixth steps by a plurality of number of times offers a maximal value, instead of determining of the cross point, is determined on each curved line drawing space, and a curved line drawing space associated with the true optical axis direction is selected in accordance with information as to a maximal value at the maximal point.

264. An image measurement program storage medium storing an image measurement program for determining an azimuth of a measuring plane and/or a physical quantity indexing a shortest distance between the measuring plane and one observation point of predetermined two observation points, using a simple ratio $(p_{axis}p_Rp_L)$, which is determined by three positions $p_{axis}$, $p_R$, $p_L$ of a measuring point, or an operation equivalent to said simple ratio, where $p_R$ and $p_L$ denote measuring positions through observation of said two observation points on an arbitrary measuring point appearing on an image obtained through viewing a predetermined measurement space from a predetermined observation point inside the measurement space, respectively, v denotes an optical axis direction coupling said two observation points, and $p_{axis}$ denotes a position of an infinite-point on a straight line extending in a direction identical to the optical axis direction v, including the measuring point.

265. An image measurement program storage medium according to claim 264, wherein said simple ratio $(p_{axis}p_Rp_L)$ or the operation equivalent to said simple ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

266. An image measurement program storage medium according to claim 264, wherein in said image measurement program, as the positions $p_{axis}$, $p_R$, $p_L$ of the measuring point, positions projected on a sphere are adopted, and as said physical quantity indexing the shortest distance, a normalization shortest distance ${}_nd_s$, which is expressed by the following equation, is adopted, $$ {}_nd_s = d_s/\Delta x_{LR} $$

where $d_s$ denotes a shortest distance between the measuring plane and one observation point of said two observation points, and $\Delta x_{LR}$ denotes a distance between said two observation points, a first step of setting up the normalization shortest distance ${}_nd_s$ in form of a parameter;

a second step of determining a radius R defined by the following equation or the equivalent equation;

$$ R = \cos^{-1}({}_nd_s/(p_{axis}p_Rp_L)) $$

using the normalization shortest distance ${}_nd_s$ set up in the first step and the simple ratio $(p_{axis}p_Rp_L)$ or the operation equivalent to said simple ratio, and a third step of determining a small circle of a radius R taking as a center a measuring position through observation on said measuring point from one observation point of said two observation points, wherein said second step and said third step are repeated by a plurality of number of times on a plurality of measuring points in said measurement space, while the parameter is altered in said first step, and thereafter, effected is a fourth step of determining an azimuth $n_{s0}$ of a measuring plane including a plurality of measuring points associated with a plurality of small circles intersecting at a cross point and/or a normalization shortest distance ${}_nd_{s0}$ on the measuring plane in such a manner that cross points of small circles, which are formed when a plurality of small circles determined through a repetition of said first to third steps by a plurality of number of times are drawn on a small circle drawing space, are determined.

267. An image measurement program storage medium according to claim 266, wherein the measuring point appearing on the image has information as to intensity, said third step is a step of determining said small circle, and of voting a value associated with intensity of a measuring point associated with said small circle for each point on a locus of the small circle, which is formed when the small circle thus determined is drawn on a small circle drawing space, said fourth step is a step of determining an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of execution of said first to third steps by a plurality of number of times offers a maximal value, instead of determining of the cross point, is determined.

268. An image measurement program storage medium according to claim 266, wherein the measuring point appearing on the image has information as to intensity, said image measurement program further comprises a fifth step of setting up a binocular parallax σ, which is a positional difference between the two measuring positions $p_R$ and $p_L$ through observation on said measuring point from said two observation points, in form of a second parameter, said second step is a step of determining the radius R using the normalization shortest distance ${}_nd_s$ set up in the first step, the position $p_{axis}$ of said infinite-point of the measuring point, the measuring position $p_R$ through observation on said measuring point from one observation point of said two observation points, and the binocular parallax σ, which is set up in said fifth step, said third step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space, said second step and said third step are repeated by a plurality of number of times on a plurality of measuring points in said measurement space, while values of the parameters are altered in said first step and said fifth step, and said fourth step is a step of determining an azimuth $n_{s0}$ of a measuring plane including a plurality of measuring points associated with a plurality of small circles joining a voting for a maximal point and/or a normalization shortest distance ${}_nd_{s0}$ on the measuring plane in such a manner that a maximal point wherein a value by a voting through a repetition of said first, fifth, second and third steps by a plurality of number of times offers a maximal value is determined, instead of determination of said cross point.

269. An image measurement program storage medium according to claim 264, wherein in said image measurement program, as the positions $p_{axis}$, $p_R$, $p_L$ of the measuring point, positions projected on a sphere are adopted, and as said physical quantity indexing the shortest distance, a normalization shortest distance ${}_nd_s$, which is expressed by the following equation, is adopted, $$ {}_nd_s = {}_nd_s/\Delta x_{LR} $$

where $d_s$ denotes a shortest distance between the measuring plane and one observation point of said two observation points, and $\Delta x_{LR}$ denotes a distance between said two observation points, a first step of setting up the position $p_{axis}$ of said infinite-point of the measuring point through setting up the optical axis direction v in form of a first parameter;

a second step of setting up the normalization shortest distance ${}_nd_s$ in form of a second parameter;

a third step of determining a radius R defined by the following equation or the equivalent equation;

$$ R = \cos^{-1}({}_nd_s/(p_{axis}p_Rp_L)) $$

using the position $p_{axis}$ of said infinite-point of the measuring point, which is set up in the first step, the normalization shortest distance ${}_nd_s$ set up in the second step and the simple ratio $(p_{axis}p_Rp_L)$ or the operation equivalent to said simple ratio, and a fourth step of determining a small circle of a radius R taking as a center a measuring position through observation on said measuring point from one observation point of said two observation points wherein said third step and said fourth step are repeated by a plurality of number of times on a plurality of measuring points in said measurement space, while values of the first and second parameters are altered in said first step and said second step, and thereafter, effected is a fifth step of determining a true optical axis direction, and of determining an azimuth $n_{s0}$ of a measuring plane including a plurality of measuring points associated with a plurality of small circles intersecting at a cross point determined on a small circle drawing space associated with the true optical axis direction, and/or a a normalization shortest distance ${}_nd_{s0}$ on the measuring plane in such a manner that cross points of small circles, which are formed when a plurality of small circles determined through a repetition of said first to fourth steps are drawn on an associated small circle drawing space of a plurality of small circle drawing spaces according to said first parameter, are determined on each small circle drawing space, and a small circle drawing space associated with the true optical axis direction relative to said observation point on said measuring point is selected in accordance with information as to a number of small circles intersecting at the cross points.

270. An image measurement program storage medium according to claim 269, wherein the measuring point appearing on the image has information as to intensity, said fourth step is a step of determining said small circle, and of voting a value associated with intensity of a measuring point associated with said small circle for each point on a locus of the small circle, which is formed when the small circle thus determined is drawn on a small circle drawing space, said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance ${}_nd_{s0}$ on the measuring plane in such a manner that a maximal point wherein a value by a voting through a repetition of execution of said first to fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

271. An image measurement program storage medium according to claim 269, wherein the measuring point appearing on the image has information as to intensity, said image measurement program further comprises a sixth step of setting up a binocular parallax σ, which is a positional difference between the two measuring positions $p_R$ and $p_L$ through observation on said measuring point from said two observation points, in form of a third parameter, said second step is a step of determining the radius R using the position $p_{axis}$ of said infinite-point of the measuring point, which is set up in said first step, the normalization shortest distance $_nd_s$ set up in the second step, the measuring position $p_R$ through observation on said measuring point from one observation point of said two observation points, and the binocular parallax σ, which is set up in said fifth step, said fourth step is a step of determining said small circle associated with the measuring point, and determining a response intensity associated with the binocular parallax σ on the measuring point, and of voting the response intensity associated with the binocular parallax σ of a measuring point associated with said small circle for each point on a locus of the small circle, which is formed when the small circle thus determined is drawn on a small circle drawing space associated with the small circle, said third step and said fourth step are repeated by a plurality of number of times on a plurality of measuring points in said measurement space, while values of the parameters are altered in said first step, said second step and said sixth step, and said fifth step is a step of determining a true optical axis direction, and of determining an azimuth $n_{s0}$ of a measuring plane including a plurality of measuring points associated with a plurality of small circles joining a voting for a maximal point determined on a small circle drawing space associated with the true optical axis direction, and/or a normalization shortest distance $_nd_{s0}$ on the measuring plane in such a manner that a maximal point wherein a value by a voting through a repetition of execution of said first, second, sixth, third and fourth steps by a plurality of number of times offers a maximal value, instead of determining of the cross point, is determined on each small circle drawing space, and a small circle drawing space associated with the true optical axis direction is selected in accordance with information as to the maximal value on the maximal point.

272. An image measurement program storage medium storing an image measurement program for determining a physical quantity indexing a distance between an arbitrary measuring point appearing on an image obtained through viewing a predetermined measurement space from a predetermined observation point inside the measurement space and one observation point of predetermined two observation points, using a simple ratio $(p_{axis}p_Rp_L)$, which is determined by three positions $p_{axis}$, $p_R$, $p_L$ of the measuring point, or an operation equivalent to said simple ratio, where $p_R$ and $p_L$ denote measuring positions through observation of said two observation points on the measuring point, respectively, and $p_{axis}$ denotes a position of an infinite-point on a straight line extending in a direction identical to an optical axis direction v coupling said two observation points, including the measuring point.

273. An image measurement program storage medium according to claim 272, wherein said simple ratio $(p_{axis}p_Rp_L)$ or the operation equivalent to said simple ratio, which are executed by said image measurement program, include an operation using the measuring position $p_R$ through observation on said measuring point from one observation point of said two observation points, and a binocular parallax σ, which is a positional difference between the two measuring positions $p_R$ and $p_L$ through observation on said measuring point from said two observation points, instead of the two measuring positions $p_R$ and $p_L$ through observation on said measuring point from said two observation points.

274. An image measurement program storage medium according to claim 272, wherein in said image measurement program, as the physical quantity indexing the distance, a normalized distance $_nd_0$, which is expressed by the following equation, is adopted, $$_nd_s = d_s/\Delta x_{LR}$$

where $d_0$ denotes a distance between the measuring point and one observation point of said two observation points, and $\Delta x_{LR}$ denotes a distance between said two observation points, and said normalized distance $_nd_0$ is determined in accordance with the following equation $$_nd_0 = (p_{axis}p_Rp_L)$$

or an equation equivalent to the above equation.

275. An image measurement program storage medium storing an image measurement program comprising:

a first step of setting up coordinates in a voting space in form of a parameter, said coordinates being defined by a physical quantity indexing a distance between a measuring plane, including an arbitrary measuring point appearing on an image obtained through viewing a predetermined measuring space from predetermined two observation points in the measuring space and one observation point of said two observation points in an optical axis direction coupling said two observation points, and an azimuth of the measuring plane;

a second step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax σ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

276. An image measurement program storage medium storing an image measurement program comprising:

a first step of setting up in form of a first parameter an optical axis direction v coupling predetermined two observation points through viewing a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a distance between a measuring plane, including the measuring point and one observation point of said two observation points in an optical axis direction, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

277. An image measurement program storage medium storing an image measurement program comprising:

a first step of setting up coordinates in a voting space in form of a parameter, said coordinates being defined by a physical quantity indexing a shortest distance between one observation point of predetermined two observation points inside a predetermined measurement space for observation of the measurement space and a measuring plane, including an arbitrary measuring point appearing on an image obtained through viewing the measurement space from the two observation points, and an azimuth $n_s$ of the measuring plane;

a second step of determining a binocular parallax σ, which is a positional difference between two measuring positions $p_R$ and $p_L$ through observation on said measuring point from said two observation points, in accordance with a measuring position $p_R$ through observation on said measuring point from one observation point of the two observation points, a position $p_{axis}$ of an infinite-point on a straight line extending in a direction identical to the optical axis direction, including the measuring point, and the coordinates in the voting space, which is set up in the first step;

a third step of determining a response intensity associated with the binocular parallax σ of the measuring point in accordance with two images obtained through viewing the measurement space from said two observation points; and a fourth step of voting the response intensity determined in the third step for the coordinates in the voting space, which is set up in the first step, wherein the second step to the fourth step, of the first to fourth steps, are effected by a plurality of number of times on a plurality of measuring points in the measurement space, while a value of the parameter is altered in the first step.

278. An image measurement program storage medium storing an image measurement program comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up coordinates in a voting space according to the first parameter in form of a second parameter, said coordinates being defined by a physical quantity indexing a shortest distance from one observation point of the two observation points to a measuring plane including the measuring point, and an azimuth $n_s$ of the measuring plane;

a third step of determining a binocular parallax σ, which is a positional difference between two measuring positions $p_R$ and $p_L$ through observation on said measuring point from said two observation points, in accordance with a measuring position $p_R$ through observation on said measuring point from one observation point of said two observation points, a position $p_{axis}$ set up in the first step, and the coordinates in the voting space, which is set up in the second step;

a fourth step of determining a response intensity associated with the binocular parallax σ of the measuring point in accordance with two images obtained through viewing the measurement space from said two observation points; and a fifth step of voting the response intensity determined in the fourth step for the coordinates in the voting space according to the first parameter, said coordinates being set up in the second step, wherein the third step to the fifth step, of the first to fifth steps, are effected by a plurality of number of times on a plurality of measuring points in the measurement space, while values of the parameters are altered in the first step and the second step.

279. An image measurement program storage medium storing an image measurement program comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a distance between a measuring plane, including the measuring point and one observation point of said two observation points in an optical axis direction, and an azimuth $n_s$ of the measuring plane;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

280. An image measurement program storage medium storing an image measurement program comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a distance between a measuring plane, including the measuring point and one observation point of said two observation points in an optical axis direction, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

281. An image measurement program storage medium storing an image measurement program comprising:

a first step of setting up in form of a parameter a binocular parallax σ, which is a positional difference between two measuring positions $p_R$ and $p_L$ of an arbitrary measuring point appearing on an image obtained through viewing a predetermined measurement space from predetermined two observation points inside the measurement space;

a second step of determining coordinates in a voting space, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of said two observation points, a position $p_{axis}$ of an infinite-point on a straight line extending in a direction identical to the optical axis direction, including the measuring point, and the binocular parallax σ set up in the first step;

a third step of determining a response intensity associated with the binocular parallax σ of the measuring point, which is set up in the first step, in accordance with two images obtained through viewing the measurement space from said two observation points; and a fourth step of voting the response intensity determined in the third step for the coordinates in the voting space, said coordinates being set up in the second step, wherein the second step to the fourth step, of the first to fourth steps, are effected by a plurality of number of times on a plurality of measuring points in the measurement space, while a value of the parameter is altered in the first step.

282. An image measurement program storage medium storing an image measurement program comprising:

a first step of setting up in form of a first parameter an optical axis direction v coupling predetermined two observation points for observation of a predetermined measurement space, and setting up a position $p_{axis}$ of an infinite-point on a straight line extending in a direction identical to the optical axis direction, including an arbitrary measuring point appearing on an image obtained through viewing the measuring space from said two observation points;

a second step of setting up in form of a second parameter a binocular parallax σ, which is a positional difference between two measuring positions $p_R$ and $p_L$ through observation on said measuring point from said two observation points;

a third step of determining coordinates in a voting space according to the first parameter, said coordinates being defined by a physical quantity indexing a shortest distance between one observation point of the two observation points and a measuring plane including the measuring point, and an azimuth $n_s$ of the measuring plane, in accordance with a measuring position $p_R$ through observation on said measuring point from one observation point of the two observation points, a position $p_{axis}$ set up in the first step, and the binocular parallax σ set up in the second step;

a fourth step of determining a response intensity associated with the binocular parallax σ of the measuring point, which is set up in the second step, in accordance with two images obtained through viewing the measurement space from said two observation points; and a fifth step of voting the response intensity determined in the fourth step for the coordinates in the voting space according to the first parameter, said coordinates being set up in the third step, wherein the third step to the fifth step, of the first to fifth steps, are effected by a plurality of number of times on a plurality of measuring points in the measurement space, while values of the parameters are altered in the first step and the second step.

283. An image measurement program storage medium storing an image measurement program comprising:

a first step of determining a response intensity associated with a binocular parallax, which is a positional difference between two measuring positions through observation of predetermine two observation points-on an arbitrary measuring point in a predetermined measurement space, in accordance with two images obtained through viewing the measurement space from said two observation points; and a second step of voting the response intensity determined in the first step for coordinates associated with the measuring point and the binocular parallax in a voting space, said coordinates being defined by a physical quantity indexing a distance between a measuring plane, including the measuring point, and one observation point of said two observation points in an optical axis direction coupling said two observation points, and an azimuth of the measuring plane;

wherein the first step and the second step are effected by a plurality of number of times on a plurality of measuring points in the measurement space.

284. An image measurement program storage medium according to claim 283, wherein said image measurement program further comprises a third step of determining an azimuth of a measuring plane including a plurality of measuring points joining a voting for a maximal point and/or a physical quantity indexing a distance between the measuring plane and one observation point of said two observation points in the optical axis direction in such a manner that a maximal point wherein a value by said voting in the voting space offers a maximal value is determined.

285. An image measurement program storage medium storing an image measurement program comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on an arbitrary measuring point in the measurement space from said two observation points, in accordance with two images obtained through viewing the measurement space from said two observation points; and a third step of voting the response intensity determined in the second step for coordinates associated with the measuring point and the binocular parallax in a voting space according to the parameter set up in the first step, said coordinates being defined by a physical quantity indexing a distance between a measuring plane, including the measuring point and one observation point of said two observation points in the optical axis direction, and an azimuth of the measuring plane;

wherein the second step and the third step, of the first to third steps, are effected by a plurality of number of times on a plurality of measuring points in the measurement space, while a value of the parameter is altered in the first step.

286. An image measurement program storage medium according to claim 285, wherein said image measurement program further comprises a fourth step of determining a true optical axis direction, and of determining an azimuth of a measuring plane including a plurality of measuring points joining a voting for a maximal point determined on a voting space associated with the true optical axis direction, and/or a physical quantity indexing a physical quantity indexing a distance between the measuring plane and one observation point of said two observation points in the true optical axis direction, in such a manner that a maximal point wherein a value by a voting is determined on each voting space, and the voting space associated with the true optical axis direction is selected in accordance with information as to the maximal value on the maximal point.

287. An image measurement program storage medium storing an image measurement-program comprising:

a first step of determining a response intensity associated with a binocular parallax σ, which is a positional difference between two measuring positions through observation on an arbitrary measuring point in a measurement space from predetermined two observation points, in accordance with two images obtained through viewing the measurement space from said two observation points; and a second step of voting the response intensity determined in the first step for coordinates associated with the measuring point and the binocular parallax σ in a voting space, said coordinates being defined by a physical quantity indexing a shortest distance between one observation point of the two observation points and a measuring plane, including the measuring point, and an azimuth of the measuring plane;

wherein the first step and the second step are effected by a plurality of number of times on a plurality of measuring points in the measurement space.

288. An image measurement program storage medium according to claim 287, wherein said image measurement program further comprises a third step of determining an azimuth $n_s$ of a measuring plane including a plurality of measuring points joining a voting for a maximal point and/or a physical quantity indexing a shortest distance between one observation point of said two observation points and the measuring plane in such a manner that a maximal point wherein a value by said voting offers a maximal value is determined in the voting space.

289. An image measurement program storage medium storing an image measurement program comprising:

a first step of setting up in form of a parameter an optical axis direction coupling predetermined two observation points for observation of a predetermined measurement space;

a second step of determining a response intensity associated with a binocular parallax, which is a positional difference between two measuring positions through observation on said measuring point from said two observation points, in accordance with two images obtained through viewing the measurement space from said two observation points; and a third step of voting the response intensity determined in the second step for coordinates associated with the measuring point and the binocular parallax in a 2voting space according to the parameter set up in the first step, said coordinates being defined by a physical quantity indexing a shortest distance between one observation point of said two observation points and a measuring plane including the measuring point, and an azimuth of the measuring plane;

wherein the second step and the third step, of the first to third steps, are effected by a plurality of number of times on a plurality of measuring points in the measurement space, while a value of the parameter is altered in the first step.

290. An image measurement program storage medium according to claim 289, wherein said image measurement program further comprises a fourth step of determining a true optical axis direction, and of determining an azimuth of a measuring plane including a plurality of measuring points joining a voting for a maximal point determined on a voting space associated with the true optical axis direction, and/or a shortest distance between one observation point of said two observation points and the measuring plane, in such a manner that a maximal point wherein a value by said voting offers a maximal value is determined on each voting space, and a voting space associated with the true optical axis direction relative to the observation point on the measuring point is selected in accordance with information as to the maximal value on the maximal point.

* * * * *

UNITED STATES PATENT AND TRADEMARK OFFICE

CERTIFICATE OF CORRECTION

PATENT NO. : 6,574,361 B1
DATED : June 3, 2003
INVENTOR(S) : Susumi Kawakami et al.

It is certified that error appears in the above-identified patent and that said Letters Patent is hereby corrected as shown below:

<u>Column 277,</u>
Line 27, “second$_s$” should read -- second, --.

Signed and Sealed this

Twenty-eighth Day of October, 2003

JAMES E. ROGAN
*Director of the United States Patent and Trademark Office*